US005258510A

United States Patent [19]

Ogawa et al.

[11] Patent Number: 5,258,510

[45] Date of Patent: Nov. 2, 1993

[54] BENZOHETEROCYCLIC COMPOUNDS

[75] Inventors: Hidenori Ogawa, Tokushima; Hisashi Miyamoto, Kyoto; Kazumi Kondo, Tokushima; Hiroshi Yamashita, Tokushima; Kenji Nakaya, Tokushima; Hajime Komatsu, Tokushima; Michinori Tanaka, Tokushima; Shinya Kora, Nagasaki; Michiaki Tominaga, Tokushima; Yoichi Yabuuchi, Tokushima, all of Japan

[73] Assignee: Otsuka Pharmaceutical Co., Ltd., Tokyo, Japan

[21] Appl. No.: 851,541

[22] Filed: Mar. 13, 1992

Related U.S. Application Data

[63] Continuation-in-part of Ser. No. 762,015, Jun. 19, 1991, abandoned.

[30] Foreign Application Priority Data

| | | | |
|---|---|---|---|
| Oct. 20, 1989 | [JP] | Japan | 1-274338 |
| Mar. 15, 1990 | [JP] | Japan | 2-66063 |
| Apr. 20, 1990 | [JP] | Japan | 2-105580 |
| Jul. 9, 1990 | [JP] | Japan | 2-181858 |
| Apr. 19, 1991 | [JP] | Japan | 3-182066 |

[51] Int. Cl.[5] .................. C07D 223/16; C07D 225/07; C07D 275/14

[52] U.S. Cl. .................................... 540/476; 540/593; 546/165; 546/163; 544/363; 544/125; 544/61

[58] Field of Search ................ 546/165, 168; 540/593, 540/476; 544/363, 125, 61

[56] References Cited

U.S. PATENT DOCUMENTS

| | | | |
|---|---|---|---|
| 3,035,047 | 5/1962 | Perron et al. | 260/239.1 |
| 4,582,909 | 4/1986 | Butler et al. | 548/486 |
| 4,677,112 | 6/1987 | Butler et al. | 514/312 |
| 4,760,064 | 7/1988 | Tominaga et al. | 514/253 |

OTHER PUBLICATIONS

*Science*, vol. 252, pp. 572-574 (Apr. 1991).

*Primary Examiner*—Robert T. Bond

*Attorney, Agent, or Firm*—Sughrue, Mion, Zinn, Macpeak & Seas

[57] ABSTRACT

Novel benzoheterocyclic compounds of the formula:

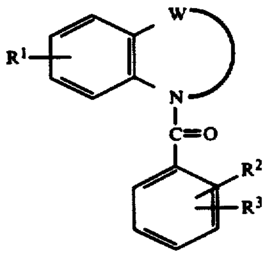

wherein $R^1$ is H, halogen, alkyl, optionally substituted amino, alkoxy; $R^2$ is H, halogen, alkoxy, phenylalkoxy, OH, alkyl, optionally substituted amino, carbamoylalkoxy, optionally substituted amino-alkoxy, optionally substituted benzoyloxy; $R^3$ is a group: —$NR^4R^5$ or —CO—$NR^{11}R^{12}$; $R^4$ is H, optionally substituted benzoyl, alkyl; $R^5$ is a group:

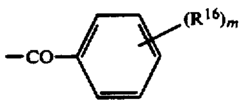

[$R^{16}$ is halogen, optionally substituted alkyl, OH, alkoxy, alkanoyloxy, alkylthio, alkanoyl, carboxy, alkoxycarbonyl, CN, $NO_2$, optionally substituted amino, phenyl, cycloalkyl, etc., or a group: —O—A—$NR^6R^7$; m is 0 to 3], phenyl-alkoxycarbonyl, alkanoyl, phenylalkanoyl, etc.; $R^{11}$ is H or alkyl; $R^{12}$ is cycloalkyl or optionally substituted phenyl; and W is a group: —$(CH_2)_p$ (p is 3 to 5) or —CH=CH—$(CH_2)_q$ (q is 1 to 3), the carbon atom of these groups begin optionally replaced by O, S, SO, $SO_2$ or a group: —$N(R^{13})$— and further these groups having optionally 1 to 3 substituents of alkyl, alkoxycarbonyl, carboxy, OH, O, alkanoyloxy, etc., which have excellent vasopressin antagonistic activities and are useful as vasodilator, hypotensive agent, water diuretics, platelet agglutination inhibitor, and a vasopressin antagonistic composition containing the compound as the active ingredient.

79 Claims, 4 Drawing Sheets

BENZOHETEROCYCLIC COMPOUNDS

This is a continuation-in-part application of U.S. Pat. Ser. No. 07/762,015 filed on Jun. 19, 1991, now abandoned.

TECHNICAL FIELD

This invention relates to novel benzoheterocyclic compounds which have excellent vasopressin antagonistic activities and are useful as vasodilator, hypotensive agent, water diuretics, platelet aggregation inhibitor.

DISCLOSURE OF THE INVENTION

The benzoheterocyclic compounds of this invention have the following formula:

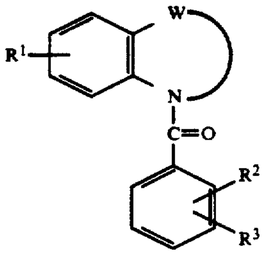

(1)

wherein $R^1$ is hydrogen atom, a halogen atom, a lower alkyl, an amino having optionally a lower alkyl substituent, or a lower alkoxy, $R^2$ is hydrogen atom, a halogen atom, a lower alkoxy, a phenyl(lower)alkoxy, hydroxy, a lower alkyl, an amino having optionally a lower alkyl substituent, a carbamoyl-substituted lower alkoxy, an amino-substituted lower alkoxy having optionally a lower alkyl substituent, or a benzoyloxy which has optionally a halogen substituent on the phenyl ring, $R^3$ is a group of the formula:

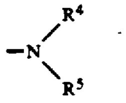

or a group of the formula:

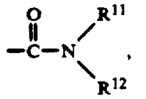

$R^4$ is hydrogen atom, a benzoyl which has optionally a halogen substituent on the phenyl ring, or a lower alkyl, $R^5$ is a group of the formula:

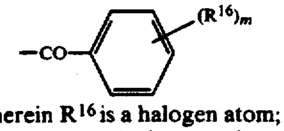

[wherein $R^{16}$ is a halogen atom; a lower alkyl which has optionally a substituent selected from a halogen atom and hydroxy; hydroxy; a lower alkoxy; a lower alkanoyloxy; a lower alkylthio; a lower alkanoyl; carboxy; a lower alkoxycarbonyl; cyano; nitro; an amino which has optionally a substituent selected from a lower alkyl and a lower alkanoyl; phenyl; a cycloalkyl; a lower alkanoyloxy-substituted lower alkoxy; a carboxy-substituted lower alkoxy; a halogen-substituted lower alkoxy; a carbamoyl-substituted lower alkoxy; a hydroxy-substituted lower alkoxy; a lower alkoxycarbonyl-substituted lower alkoxy; a phthalimido-substituted lower alkoxy; an aminocarbonyl-lower alkoxy having a lower alkyl substituent; or a group of the formula:

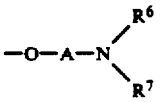

(A is a lower alkylene, and $R^6$ and $R^7$ are the same or different and are each hydrogen atom, a lower alkyl having optionally a hydroxy substituent, a lower alkanoyl, or benzoyl, or $R^6$ and $R^7$ may bind together with nitrogen atom to which they bond to form a 5- or 6-membered saturated heterocyclic group with or without being intervened with nitrogen or oxygen atom wherein the heterocyclic group has optionally a substituent selected from piperidinyl and a lower alkyl); and m is an integer of 0 to 3], a phenyl-lower alkoxycarbonyl, a lower alkanoyl, a phenyl-lower alkanoyl, a cycloalkyl-lower alkanoyl, a cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

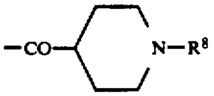

(wherein $R^8$ is hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

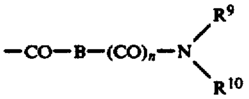

(wherein B is a lower alkylene, n is an integer of 0 or 1, and $R^9$ and $R^{10}$ are the same or different and are each hydrogen atom, a lower alkyl having optionally a hydroxy substituent, a cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with nitrogen atom to which they bond to form a 5- or 6-membered saturated heterocyclic group with or without being intervened with nitrogen or oxygen atom wherein the heterocylic group has optionally a substituent selected from a lower alkyl, a lower alkoxycarboyl and piperidinyl), $R^{11}$ is hydrogen atom or a lower alkyl, $R^{12}$ is a cycloalkyl, or a phenyl which has optionally 1 to 3 substituents selected from a lower alkoxy, a lower alkyl and a halogen atom, W is a group of the formula: $—(CH_2)_p—$ (p is an integer of 3 to 5), or a group of the formula: $—CH{=}CH—(CH_2)_q—$ (q is an integer of 1 to 3), the carbon atom of these groups: $—(CH_2)_p—$ and $—CH{=}CH—(CH_2)_q—$ being optionally replaced by oxygen atom, sulfur atom, sulfinyl, sulfonyl, or a group of the formula:

$$—\underset{}{\overset{R^{13}}{\overset{|}{N}}}—$$

($R^{13}$ is hydrogen atom, a cycloalkyl, or a lower alkyl), and further said $—(CH_2)_p—$ and $—CH{=}CH—(CH_2)_q—$ groups having optionally 1 to 3 substituents selected from a lower alkyl having optionally a hydroxy substituent, a lower alkoxycarbonyl, carboxy, hydroxy, oxo, a lower alkanoyloxy having optionally a halogen substituent, an amino-lower alkyl having optionally a substituent selected from a lower alkyl and a lower alkanoyl, a lower alkanoyloxy-substituted lower alkyl, a lower alkyl sulfonyloxy-lower alkyl, an azido-lower alkyl, a group of the formula:

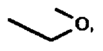

an aminocarbonyloxy having optionally a lower alkyl substituent, a lower alkoxy, a lower alkoxycarbonyl-substituted lower alkoxy, a carboxy-substituted lower alkoxy, an aminocarbonyl-lower alkoxy having optionally a lower alkyl substituent, an amino-lower alkoxy having optionally a substituent selected from a lower alkyl and a lower alkanoyl, a phthalimido-substituted lower alkoxy, hydroxyimino, a lower alkanoyloxy-imino, a lower alkylidene, a halogen atom, azido, sulfoxyimino, a group of the formula:

$$R^{81}—\underset{|}{N}—CH_2COO—$$

($R^{81}$ is hydrogen atom or a lower alkyl), hydrazino, pyrrolyl, an amino-lower alkanoyloxy having optionally a lower alkyl substituent, a group of the formula:

$$—O—A—CO—N\begin{matrix} R^{82} \\ R^{83} \end{matrix}$$

(A is as defined above, and $R^{82}$ and $R^{83}$ are the same or different and are each hydrogen atom, a lower alkyl, a carbamoyl-substituted lower alkyl, a hydroxy-substituted lower alkyl, or a pyridyl-lower alkyl, or $R^{82}$ and $R^{83}$ may bind together with nitrogen atom to which they bond to form a 5- or 6-membered saturated heterocyclic group with or without being intervened with nitrogen, oxygen or sulfur atom wherein the heterocyclic group has optionally a substituent selected from oxo, a lower alkyl, a lower alkanoyl, and carbamoyl), and a group of the formula:

$$—(CO)_n—N\begin{matrix} R^{14} \\ R^{15} \end{matrix}$$

(wherein n is as defined above, and $R^{14}$ and $R^{15}$ are the same or different and are each hydrogen atom, a lower alkyl, a lower alkenyl, a lower alkanoyl, a cycloalkyl, an oxiranyl-substituted lower alkyl, a lower alkyl having optionally 1 to 2 substituents selected from a lower alkoxy, hydroxy and an amino having optionally a lower alkyl substituent, a phenyl-lower alkyl, a pyridyl-lower alkyl, a lower alkylsulfonyl, benzoyl, a lower alkoxycarbonyl, anilinocarbonyl, an aminocarbonyl having optionally a lower alkyl substituent, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperidinyl having optionally a phenyl-lower alkyl substituent on the piperidinyl ring, a halogen-substituted lower alkanoyl, an imidazolyl-substituted lower alkanoyl, an amino-lower alkanoyl having optionally a substituent selected from a lower alkyl and a lower alkoxycarbonyl, an aminocarbonyllower alkyl having optionally a lower alkyl substituent, or a phenyl-lower alkoxycarbonyl, or $R^{14}$ and $R^{15}$ may bind together with nitrogen atom to which they bond to form a 5-or 6-membered saturated heterocyclic group with or without being intervened with nitrogen or oxygen, wherein the heterocyclic group may optionally have a substituent selected from a lower alkyl, a phenyl-lower alkyl or a lower alkanoyl).

The benzoheterocyclic compounds of the formula (1) and their salts have excellent vasopressin antagonistic activities and vasodilating activity, hypotensive activity, activity for inhibiting saccharide release in liver, activity for inhibiting growth of mesangium cells, water diuretic activity, platelet agglutination inhibitory activity and are useful as vasodilator, hypotensive agent, water diuretics, platelet agglutination inhibitor and are used for the prophylaxis and treatment of hypertension, edema, ascites, heart failure, renal function disorder, vasopressin parasecretion syndrome (SIADH), hepatocirrhosis, hyponatremia, hypokaliemia, diabetic, circulation disorder, and the like.

Each group in the above formula (1) includes specifically the following groups.

The "lower alkoxy" includes a straight chain or branched chain alkoxy group having 1 to 6 carbon atoms, for example, methoxy, ethoxy, propoxy, isopropoxy, butoxy, tert-butoxy, pentyloxy, hexyloxy, and the like.

The "lower alkyl" includes a straight chain or branched chain alkyl group having 1 to 6 carbon atoms, for example, methyl, ethyl, propyl, isopropyl, butyl, tert-butyl, pentyl, hexyl, and the like.

The "halogen atom" includes fluorine atom, chlorine atom, bromine atom and iodine atome.

The "amino having optionally a lower alkyl substituent" includes an amino having optionally one or two substituents selected from a straight chain or branched chain alkyl group having 1 to 6 carbon atoms, for example, amino, methylamino, ethylamino, propylamino, isopropylamino, butylamino, tert-butylamino, pentylamino, hexylamino, dimethylamino, diethylamino, dipropylamino, dibutylamino, dipentylamino, dihexylamino, N-methyl-N-ethylamino, N-ethyl-N-propylamino, N-methyl-N-butylamino, N-methyl-N-hexylamino, and the like.

The "lower alkenyl" includes a straight chain or branched chain alkenyl group having 2 to 6 carbon atoms, for example, vinyl, allyl, 2-butenyl, 3-butenyl, 1-methylallyl, 2-pentenyl, 2-hexenyl, and the like.

The "lower alkyl which has optionally a substituent selected from a halogen atom and hydroxy" includes a straight chain or branched chain alkyl group having 1 to 6 carbon atoms which may optionally have 1 to 3 substituents selected from a halogen atom and hydroxy, for example, in addition to the above-mentioned lower alkyl groups, hydroxymethyl, 2-hydroxyethyl, 1-hydroxyethyl, 3-hydroxypropyl, 2,3-dihyroxypropyl, 4-hydroxybutyl, 1,1-dimethyl-2-hydroxyethyl, 5,5,4-trihydroxypentyl, 5-hydroxypentyl, 6-hydroxyhexyl, 1-hydroxyisopropyl, 2-methyl-3-hydroxypropyl, trifluoromethyl, trichloromethyl, chloromethyl, bromomethyl, fluoromethyl, iodomethyl, difluoromethyl, dibromomethyl, 2-chloroethyl, 2,2,2-trifluoroethyl, 2,2,2-trichloroethyl, 3-chloropropyl, 2,3-dichloropropyl, 4,4,4-trichlorobutyl, 4-fluorobutyl, 5-chloropentyl, 3-chloro-2-methylpropyl, 5-bromohexyl, 5,6-dichlorohexyl, and the like.

The "lower alkylene" includes a straight chain or branched chain alkylene group having 1 to 6 carbon atoms, for example, methylene, ethylene, trimethylene, 2-methyltrimethylene, 2,2-dimethyltrimethylene, 1-methyltrimethylene, methylmethylene, ethylmethylene, tetramethylene, pentamethylene, hexamethylene, and the like.

The "lower alkanoyloxy" includes a straight chain or branched chain alkanoyloxy group having 1 to 6 carbon atoms, for example, formyloxy, acetyloxy, propionyloxy, butyryloxy, isobutyryloxy, pentanoyloxy, tert-butylcarbonyloxy, hexanoyloxy, and the like.

The "lower alkylthio" includes a straight chain or branched chain alkylthio group having 1 to 6 carbon atoms, for example, methylthio, ethylthio, propylthio, isopropylthio, butylthio, tert-butylthio, pentylthio, hexylthio, and the like.

The "lower alkanoyl" includes a straight chain or branched chain alkanoyl group having 1 to 6 carbon atoms, for example, formyl, acetyl, propionyl, butyryl, isobutyryl, pentanoyl, tert-butylcarbonyl, hexanolyl, and the like.

The "lower alkoxycarbonyl" includes a straight chain or branched chain alkoxycarbonyl group having 1 to 6 carbon atoms in the alkoxy moiety, for example, methoxycarbonyl, ethoxycarbonyl, propoxycarbonyl, isopropoxycarbonyl, butoxycarbonyl, tert-butoxycarbonyl, pentyloxycarbonyl, hexyloxycarbonyl, and the like.

The "amino having optionally a substituent selected from a lower alkyl and a lower alkanoyl" includes an amino having optionally one or two substituents selected from a straight chain or branched chain alkyl group having 1 to 6 carbon atoms and a straight chain or branched chain alkanoyl group having 1 to 6 carbon atoms, for example, amino, methylamino, ethylamino, propylamino, isopropylamino, butylamino, tert-butylamino, pentylamino, hexylamino, dimethylamino, diethylamino, dipropylamino, dibutylamino, dipentylamino, dihexylamino, N-methyl-N-ethylamino, N-ethyl-N-propylamino, N-methyl-N-butylamino, N-methyl-N-hexylamino, N-methyl-N-acetylamino, N-acetylamino, N-formylamino, N-propionylamino, N-butyrylamino, N-isobutyrylamino, N-pentanoylamino, N-tert-butylcarbonylamino, N-hexanoylamino, N-ethyl-N-acetylamino, and the like.

The "cycloalkyl" includes a cycloalkyl having 3 to 8 carbon atoms, for example, cyclopropyl, cyclobutyl, cyclopentyl, cyclohexyl, cycloheptyl, cyclooctyl, and the like.

The "lower alkanoyloxy-substituted lower alkoxy" includes a straight chain or branched chain alkoxy group having 1 to 6 carbon atoms which is substituted by a straight chain or branched chain alkanoyloxy group having 2 to 6 carbon atoms, for example, acetyloxymethoxy, 2-propionyloxyethoxy, 1-butyryloxyethoxy, 3-acetyloxypropoxy, 4-acetyloxybutoxy, 4-isobutyryloxybutoxy, 5-pentanoyloxypentyloxy, 6-acetyloxyhexyloxy, 6-tert-butylcarbonyloxyhexyloxy, 1,1-dimethyl-2-hexanoyloxyethoxy, 2 methyl-3-acetyloxypropoxy, and the like.

The "carbamoyl-substituted lower alkoxy" includes a carbamoyl-substituted alkoxy group wherein the alkoxy moiety is a straight chain or branched chain alkoxy group having 1 to 6 carbon atoms, for example, carbamoylmethoxy, 2-carbamoylethoxy, 1-carbamoylethoxy, 3-carbamoylpropoxy, 4-carbamoylbutoxy, 5-carbamoylpentyloxy, 6-carbamoylhexyloxy, 1,1-dimethyl-2-carbamoylethoxy, 2-methyl-3-carbamoylpropoxy, and the like.

The "hydroxy-substituted lower alkoxy" includes a straight chain or branched chain alkoxy group having 1 to 6 carbon atoms and having 1 to 3 hydroxy substitutents, for example, hydroxymethoxy, 2-hydroxyethoxy, 1-hydroxyethoxy, 3-hydroxypropoxy, 2,3-dihydroxypropoxy, 4-hydroxybutoxy, 3,4-dihydroxybutoxy, 1,1-dimethyl-2-hydroxyethoxy, 5-hydroxypentyloxy, 6-hydroxyhexyloxy, 2-methyl-3-hydroxypropoxy, 2,3,4-trihydroxybutoxy, and the like.

The "lower alkoxycarbonyl-substituted lower alkoxy" includes an alkoxycarbonyl-substituted straight chain or branched chain alkoxy group having 1 to 6 carbon atoms wherein the alkoxycarbonyl moiety is a straight chain or branched chain alkoxycarbonyl group having 1 to 6 carbon atoms, for example, methoxycarbonylmethoxy, 3-methoxycarbonylpropoxy, ethoxycarboxymethoxy, 3-ethoxycarbonylpropoxy, 4-ethoxycarbonylbutoxy, 5-isopropoxycarbonylpentyloxy, 6-propoxycarbonylhexyloxy, 1,1-dimethyl-2-butoxycarbonylethoxy, 2-methyl-3-tert-butoxycarbonylpropoxy, 2-pentyloxycarbonylethoxy, hexyloxycarbonylmethoxy, and the like.

The "carboxy-substituted lower alkoxy" includes a carboxy-substituted alkoxy group wherein the alkoxy moiety is a straight chain or branched chain alkoxy group having 1 to 6 carbon atoms, for example, carboxymethoxy, 2-carboxyethoxy, 1-carboxyethoxy, 3-carboxypropoxy, 4-carboxybutoxy, 5-carboxypentyloxy, 6-carboxyhexyloxy, 1,1-dimethyl-2-carboxyethoxy, 2-methyl-3-carboxypropoxy, and the like.

The "phthalimido-substituted lower alkoxy" includes a straight chain or branched chain alkoxy group having 1 to 6 carbon atoms which is substituted by phthalimido group, for example, phthalimidomethoxy, 2-phthalimidoethoxy, 1-phthalimidoethoxy, 3-phthalimidopropoxy, 4-phthalimidobutoxy, 5-phthalimidopentyloxy, 6-phthalimidohexyloxy, 1,1-dimethyl-2-phthalimidoethoxy, 2-methyl-3-phthalimidopropoxy, and the like.

The "5- or 6-membered saturated heterocyclic group which is formed by binding the groups $R^6$ and $R^7$ together with the nitrogen atom to which they bond with or without being intervened with nitrogen or oxygen atom" includes, for example, pyrrolidinyl, piperidinyl, piperazinyl, morpholino, and the like.

The "heterocyclic group having a substituent selected from piperidinyl and a lower alkyl" includes a heterocyclic group having 1 to 3 substituents selected from piperidinyl and a straight chain or branched chain alkyl group having 1 to 6 carbon atoms, for example, 4-methylpiperiazinyl, 3,4-dimethyl piperazinyl, 3-ethylpyrrolidinyl, 2-propylpyrrolidinyl, 3,4,5-trimethylpiperidinyl, 4-butylpiperidinyl, 3-pentylmorpholino, 4-hexylpiperazinyl, 4-(1-piperidinyl)piperidinyl, 3-(1-piperidinyl)pyrrolidinyl, 3-(1-piperidinyl)-4-methylpiperazinyl, 3-(1-piperidinyl)morpholino, and the like.

The "phenyl(lower)alkanoyl" includes a phenylalkanoyl wherein the alkanoyl moiety is a straight chain or branched chain alkanoyl group having 2 to 6 carbon atoms, for example, phenylacetyl, 3-phenylpropionyl, 2-phenylpropionyl, 4-phenylbutyryl, 2,2-dimethyl-3-phenylpropionyl, 5-phenylpentanoyl, 6-phenylhexanoyl, and the like.

The "cycloalkyl-lower alkanoyl" includes $C_3$–$C_8$ cycloalkyl-alkanoyl group wherein the alkanoyl moiety is a straight chain or branched chain alkanoyl having 2 to 6 carbon atoms, for example, cyclohexylacetyl, 3-cyclopropylpropionyl, 2-cyclopentylpropionyl, 4-cyclohexylbutyryl, 2,2-dimethyl-3-cycloheptylpropionyl, 5-cycloo-ctylpentanoyl, 6-cyclohexylhexanoyl, and the like.

The "cycloalkylcarbonyl" includes a cycloalkylcarbonyl having 3 to 8 carbon atoms, for example, cyclopropylcarbonyl, cyclobutylcarbonyl, cyclopentylcarbonyl, cyclohexylcarbonyl, cycloheptylcarbonyl, cyclooctylcarbonyl, and the like.

The "amino having optionally a lower alkanoyl substituent" includes an amino having optionally a straight chain or branched chain alkanoyl group having 1 to 6 carbon atoms, for example, amino, formylamino, acetylamino, propionylamino, butyrylamino, isobutyrylamino, pentanoylamino, tert-butylcarbonylamino, hexanoylamino, and the like.

The "phenoxy-lower alkanoyl which phenyl ring has optionally 1 to 3 substituents selected from a lower alkyl, a lower alkoxy and an amino having optionally a lower alkanoyl substituent" includes a phenoxyalkanoyl group wherein the alkanoyl moiety is a straight chain or branched chain alkanoyl having 2 to 6 carbon atoms and the phenyl ring has optionally 1 to 3 substituents selected from a straight chain or branched chain alkyl having 1 to 6 carbon atoms, a straight chain or branched chain alkoxy having 1 to 6 carbon atoms and an amino having optionally a straight chain or branched chain alkanoyl having 1 to 6 carbon atoms, for example, phenoxyacetyl, 3-phenoxypropionyl, 2-phenoxypropionyl, 4-phenoxybutyryl, 2,2-dimethyl-3-phenoxypropionyl, 5-phenoxypentanoyl, 6-phenoxyhexanoyl, (2-aminophenoxy)acetyl, 3-(4-aminophenoxy)propionyl, (2-methylphenoxy)acetyl, (4-methylphenoxy)acetyl, (3-methylphenoxy)acetyl, (3-methoxyphenoxy)acetyl, (3-acetylaminophenoxy)acetyl, 4-(2-propionylaminophenoxy)butyryl, 2,2-dimethyl-3-(4-butyrylaminophenoxy)propionyl, 5-(2-pentanoylaminophenoxy)pentanoyl, 6-(4-hexanoylaminophenoxy)hexanoyl, 3-(2-ethylphenoxy)propionyl, 2-(4-propylphenoxy)propionyl, 4-(4-butylphenoxy)butyryl, 5-(3-pentylphenoxy)pentanoyl, 6-(4-hexylphenoxy)hexanoyl, (2,3-dimethylphenoxy)acetyl, (2,5-dimethylphenoxy)acetyl, (3,4-dimethylphenoxy)acetyl, (3,4,5-trimethylphenoxy)acetyl, 3-(4-ethoxyphenoxy)propionyl, 2-(2-propoxyphenoxy)propionyl, 4-(3-butoxyphenoxy)butyryl, 5-(4-pentyloxyphenoxy)pentanoyl, 6-(4-hexyloxyphenoxy)hexanoyl, (3,4-dimethoxyphenoxy)acetyl, (3,5-dimethoxyphenoxy)acetyl, (2,4-dimethoxyphenoxy)acetyl, (3,4,5-trimethoxyphenoxy)acetyl, (2-acetylamino-4-methylphenoxy)acetyl, (4-acetylamino-3-methoxyphenoxy)acetyl, and the like.

The "phthalimido-substituted lower alkanoyl" includes a straight chain or branched chain alkanoyl group having 2 to 6 carbon atoms which is substituted by phthalimido group, for example, 2-phthalimidoacetyl, 3-phthalimidopropionyl, 2-phthalimidopropionyl, 4-phthalimidobutyryl, 2,2-dimethyl-3-phthalimidopropionyl, 5-phthalimidopentanoyl, 6-phthalimidohexanoyl, 3-methyl-4-phthalimidobutyryl, and the like.

The "lower alkoxycarbonyl-lower alkanoyl" includes an alkoxycarbonyl-alkanoyl group wherein the alkoxy moiety is a straight chain or branched chain alkoxy having 1 to 6 carbon atoms and the alkanoyl moiety is a straight chain or branched chain alkanoyl having 2 to 6 carbon atoms, for example, methoxycarbonylacetyl, 3-methoxycarbonylpropionyl, ethoxycarbonylacetyl, 3-ethoxycarbonylpropionyl, 4-ethoxycarbonylbutyryl, 3-propoxycarbonylpropionyl, 2-methoxycarbonylpropionyl, 6-propoxycarbonylhexanoyl, 5-isopropoxycarbonylpentanoyl, 2,2-dimethyl-3-butoxycarbonylpropionyl, 2-methyl-3-tert-butoxycarbonylpropionyl, pentyloxycarbonylacetyl, hexyloxycarbonylacetyl, and the like.

The "carboxy-lower alkanoyl" includes a carboxyalkanoyl group wherein the alkanoyl moiety is a straight chain or branched chain alkanoyl having 2 to 6 carbon atoms, for example, carboxyacetyl, 3-carboxypropionyl, 2-carboxypropionyl, 4-carboxybutyryl, 2,2-dimethyl-3-carboxypropionyl, 5-carboxypentanoyl, 6-carboxyhexanoyl, and the like.

The "naphthyloxy-lower alkanoyl" includes a naphthyloxy-alkanoyl group wherein the alkanoyl moiety is a straight chain or branched chain alkanoyl having 2 to 6 carbon atoms, for example, naphtyloxyacetyl, 3-naphtyloyypropionyl, 2-naphtyloxypropionyl, 4-naphthyloxybutyryl, 2,2-dimethyl-3-naphthyloxypropionyl, 5-naphthyloxypentanoyl, 6-naphthyloxyhexanoyl, and the like.

The "phenyl-lower alkoxycarbonyl" includes a phenylalkoxycarbonyl wherein the alkoxycarbonyl moiety is a straight chain or branched chain alkoxycarbonyl group having 1 to 6 carbon atoms, for example, benzyloxycarbonyl, 2-phenylethoxycarbonyl, 1-phenylethoxycarbonyl, 3-phenylpropoxycarbonyl, 4-phenylbutoxycarbonyl, 5-phenylpentyloxycarbonyl, 6-phenylhexyloxycarbonyl, 1,1-dimethyl-2-phenylethoxycarbonyl, 2-methyl-3-phenylpropoxycarbonyl, and the like.

The "lower alkyl having optionally a hydroxy substituent" includes a straight chain or branched chain alkyl having 1 to 6 carbon atoms and having optionally 1 to 3 hydroxy substituents, for example, hydroxymethyl, 2-hydroxyethyl, 1-hydroxyethyl, 3-hydroxypropyl, 2,3-dihydroxyethyl, 4-hydroxybutyl, 3,4-dihydroxybutyl, 1,1-dimethyl-2-hydroxyethyl, 5-hydroxypentyl, 6-hydroxyhexyl, 2-methyl-3-hydroxypropyl, 2,3,4-trihydroxybutyl, and the like.

The "phenyl-lower alkyl" includes a phenylalkyl group wherein the alkyl moiety is a straight chain or branched chain alkyl group having 1 to 6 carbon atoms, for example, benzyl, 2-phenylethyl, 1-phenylethyl, 3-phenylpropyl, 4-phenylbutyl, 5-phenylpentyl, 6-phenylhexyl, 1,1-dimethyl-2-phenylethyl, 2-methyl-3-phenylpropyl, and the like.

The "phenoxy-lower alkyl" includes a phenoxyalkyl group wherein the alkyl moiety is a straight chain or branched chain alkyl group having 1 to 6 carbon atoms, for example, phenoxymethyl, 1-phenoxyethyl, 2-phenoxyethyl, 3-phenoxypropyl, 4-henoxybutyl, 5-phenoxypentyl, 6-phenoxyhexyl, 1,1-dimethyl-2-phenoxyethyl, 2-methyl-3-phenoxypropyl, and the like.

The "phenyl which has optionally 1 to 3 substituents selected from a lower alkyl, a lower alkoxy and a halogen atom" includes a phenyl group which has optionally 1 to 3 substituents selected from a straight chain or branched chain alkyl group having 1 to 6 carbon atoms, a straight chain or branched chain alkoxy group having 1 to 6 carbon atoms and a halogen atom, for example, phenyl, 2-methoxyphenyl, 3-methoxyphenyl, 4-methoxyphenyl, 2-ethoxyphenyl, 3-ethoxyphenyl, 4-ethoxyphenyl, 4-isopropoxyphenyl, 4-pentyloxyphenyl, 2,4-dimethoxyphenyl, 4-hexyloxyphenyl, 3,4-dimethoxyphenyl, 3-ethoxy-4-methoxyphenyl, 2,3-dimethoxyphenyl, 3,4-diethoxyphenyl, 2,5-dimethoxyphenyl, 2,6-dimethoxyphenyl, 3,5-dimethoxyphenyl, 3,4-dipentyloxyphenyl, 3,4,5 trimethoxyphenyl, 2-chlorophenyl, 3-chlorophenyl, 4-chlorophenyl, 2-fluorophenyl, 3-fluorophenyl, 4-fluorophenyl, 2-bromophenyl, 3-bromophenyl, 4-bromophenyl, 2-iodophenyl, 3-iodophenyl, 4-iodophenyl, 3,4-dichlorophenyl, 3,5-dichlorophenyl, 2,6-dichlorophenyl, 2,3-dichlorophenyl, 2,4-dichlorophenyl, 3,4-difluorophenyl, 3,5-dibromophenyl, 3,4,5-trichlorophenyl, 2-methoxy-3-chlorophenyl, 2-methylphenyl, 3-methylphenyl, 4-methylphenyl, 2-ethylphenyl, 3-ethylphenyl, 4-ethylphenyl, 4-isopropylphenyl, 3-butylphenyl, 4-pentylphenyl, 4-hexylphenyl, 3,4-dimethylphenyl, 3,4-diethylphenyl, 2,4-dimethylphenyl, 2,5-dimethylphenyl, 2,6-dimethylphenyl, 3,4,5-trimethylphenyl, 3-chloro-4-methylphenyl, 3-methoxy-4-methyl-5-iodophenyl, 3,4-dimethoxy-5-bromophenyl, 3,5-diiodo-4-methoxyphenyl, and the like.

The "amino-lower alkyl having optionally a lower alkyl substituent" includes a straight chain or branched chain alkyl group having 1 to 6 carbon atoms which is substituted by an amino group having optionally 1 to 2 substituents of a straight chain or branched chain alkyl group having 1 to 6 carbon atoms, for example, aminomethyl, 2-aminoethyl, 1-aminoethyl, 3-aminopropyl, 4-aminobutyl, 5-aminopentyl, 6-aminohexyl, 1,1-dimethyl-2-aminoethyl, 2-methyl-3-aminopropyl, methylaminomethyl, 1-ethylaminoethyl, 2-propylaminoethyl, 3-isopropylaminopropyl, 4-butylaminobutyl, 5-pentylaminopentyl, 6-hexylaminohexyl, dimethylaminomethyl, (N-ethyl-N-propylamino)methyl, 2-(N-methyl-N-hexylamino)ethyl, and the like.

The "5- or 6-membered saturated heterocyclic group which is formed by binding the groups $R^9$ and $R^{10}$ together with the nitrogen atom to which they bond with or without being intervened with nitrogen or oxygen atom" includes, for example, pyrrolidinyl, piperidinyl, piperazinyl, morpholino, and the like.

The "heterocyclic group having a substituent selected from a lower alkyl, a lower alkoxycarbonyl and piperidinyl" includes a heterocyclic group having 1 to 3 substituents selected from a straight chain or branched chain alkyl group having 1 to 6 carbon atoms, a straight chain or branched chain alkoxycarbonyl having 1 to 6 carbon atoms and piperidinyl, for example, in addition to the above-mentioned heterocyclic groups having a substituent of a lower alkyl and piperidinyl, 4-methoxycarbonylpiperazinyl, 4-ethoxycarbonylpiperidinyl, 3-propoxycarbonylpyrrolidinyl, 2-pentyloxycarbonylmorpholino, 4-hexyloxycarbonylpiperidinyl, 4-ethoxycarbonyl-3-methylpiperidinyl, 3-methyl-4-ethoxycarbonylpiperazinyl, and the like.

The "5- or 6-membered saturated heterocyclic group which is formed by binding the groups $R^{14}$ and $R^{15}$ together with the nitrogen atom to which they bond with or without being intervened with nitrogen or oxygen atom" includes, for example, pyrrolidinyl, piperidinyl, piperazinyl, morpholino, and the like.

The "heterocyclic group having a lower alkyl substituent" includes a heterocyclic group having 1 to 3 substituents of a straight chain or branched chain alkyl group having 1 to 6 carbon atoms, for example, 4-methylpiperazinyl, 3,4-dimethylpperazinyl, 3-ethylpyrrolidinyl, 2-propylpyrrolidinyl, 3,4,5-trimethylpiperidinyl, 4-butylpiperidinyl, 3-pentylmorpholino, 4-hexylpiperazinyl, and the like.

The heterocyclic ring in the formula (1) includes tetrahydroquinolyl, 2,3,4,5-tetrahydro-1H-benzazepinyl, 1,2,3,4,5,6-hexahydrobenzazocinyl, 1,2-dihydroquinolyl, 2,3-dihydro-1H-benzazepinyl, 1,2,3,4-tetrahydrobenzazocinyl, and the like.

The heterocyclic ring in the formula (1) wherein the carbon atom in the group of the formula: $-(CH_2)_p-$ or $-CH{=}CH-(CH_2)_q-$ for W is replaced by oxygen atom, sulfur atom, sulfinyl, sulfonyl, or a group of the formula:

$$-\overset{\overset{\textstyle R^{13}}{|}}{N}-$$

($R^{13}$ is hydrogen atom or a lower alkyl) includes a heterocylic group wherein the carbon atom in the group of the formula: $-(CH_2)_p-$ or $-CH{=}CH-(CH_2)_q-$ for W is replaced by oxygen atom, sulfur atom, sulfinyl, sulfonyl, or a group of the formula:

($R^{13}$ is hydrogen atom or a straight chain or branched chain alkyl having 1 to 6 carbon atoms), for example, 3,4-dihydro-2H-1,4-benzoxazinyl, 1,2,3,5-tetrahydro-4,1-benzoxazepinyl, 1,2,3,4-tetrahydroquinoxalinyl, 1,2,3,4,5,6-hexahydro-1,5-benzodiazocinyl, 5-methyl-1,2,3,4,5,6-hexahydro-1,5-benzodiazocinyl, 4-methyl-1,2,3,4-tetrahydroquinoxalinyl, 1,2,3,4-tetrahydro-5,1-benzoxazepinyl, 3,4-dihydro-2H-1,4-benzothiazinyl, 2,3,4,5-tetrahydro-1,5-benzothiazepinyl, 1,2,3,5-tetrahydro-4,1-benzothiazepinyl, 4-ethyl-1,2,3,4-tetrahydroquinoxalinyl, 4-propyl-1,2,3,4-tetrahydroquinoxalinyl, 4-butyl-1,2,3,4-tetrahydroquinoxalinyl, 4-pentyl-1,2,3,4-tetrahydro-quinoxalinyl, 4-hexyl-1,2,3,4-tetrahydroquinoxalinyl, 2,3,4,5-tetrahydro-1H-1,4-benzodiazepinyl, 4-methyl-2,3,4,5-tetrahydro-1H-1,4-benzodiazepinyl, 4-ethyl-2,3,4,5-tetrahydro-1H-1,4-benzodiazepinyl, 4-propyl-2,3,4,5-tetrahydro-1H-1,4-benzodiazepinyl, 4-butyl-2,3,4,5-tetrahydro-1H-1,4-benzodiazepinyl, 4 pentyl-2,3,4,5 tetrahydro-1H-1,4-benzodiazepinyl, 4-hexyl-2,3,4,5-tetrahydro-1H-1,4-benzodiazepinyl, 2,3,4,5-tetrahydro-1H-1,5-benzodiazepinyl, 5-methyl-2,3,4,5-tetrahydro-1H-1,5-benzodiazepinyl, 5-ethyl-2,3,4,5-tetrahydro-1H-1,5-benzodiazepinyl, 5-propyl-2,3,4,5-tetrahydro-1H-1,5-benzodiazepinyl, 5-butyl-2,3,4,5-tetrahydro-1H-1,5-benzodiazepinyl, 5-pentyl-2,3,4,5-tetrahydro-1H-1,5-benzodiazepinyl, 5-hexyl-2,3,4,5-tetrahydro-1H-1,5-benzodiazepinyl, 3,4-dihydro-1-oxo-2H-1,4-benzothiazepinyl, 3,4-dihydro-1,1-dioxo-2H-1,4-benzothiazepinyl, 1-oxo-2,3,4,5-tetrahydro-1,5-benzothiazepinyl, 1,1-dioxo-2,3,4,5-tetrahydro-1,5-benzothiazepinyl, 4-oxo-1,2,3,5-tetrahydro-4,1-benzothiazepinyl, 4,4-dioxo-1,2,3,5-tetrahydro-4,1-benzothiazepinyl, and the like.

The "halogen-substituted lower alkoxy" includes a straight chain or branched chain alkoxy group having 1 to 6 carbon atoms which has 1 to 3 substituents of a halogen atom, for example, trifluoromethoxy, trichloromethoxy, chloromethoxy, bromomethoxy, fluoromethoxy, iodomethoxy, difluoromethoxy, dibromomethoxy, 2-chloroethoxy, 2,2,2-trifluoroethoxy, 2,2,2-trichloroethoxy, 3-chloropropoxy, 2,3-dichloropropoxy, 4,4,4-trichlorobutoxy, 4-fluorobutoxy, 5-chloropentyloxy, 3-chloro-2-methylpropoxy, 6-bromohexyloxy, 5,6-dichlorohexyloxy, and the like.

The "halogen-substituted lower alkanoyl" includes a straight chain or branched chain alkanoyl group having 1 to 6 carbon atoms which has 1 to 3 substituents of a halogen atom, for example, 2,2,2-trifluoroacetyl, 2,2,2-trichloroacetyl, 2-chloroacetyl, 2-bromoacetyl, 2-fluoroacetyl, 2-iodoacetyl, 2,2-difluoroacetyl, 2,2-dibromoacetyl, 3,3,3-trifluoropropionyl, 3,3,3-trichloropropionyl, 3-chloropropionyl, 2,3-dichloropropionyl, 4,4,4-trichlorobutyryl, 4-fluorobutyryl, 5-chloropentanoyl, 3-chloro-2-methylpropionyl, 6-bromohexanoyl, 5,6-dibromohexanoyl, and the like.

The "aminocarbonyl-lower alkoxy having a lower alkyl substituent" includes a straight chain or branched chain alkoxy group having 1 to 6 carbon atoms which is substituted by an aminocarbonyl group having 1 to 2 substituents of a straight chain or branched chain alkyl group having 1 to 6 carbon atoms, for example, methylaminocarbonylmethoxy, 1-ethylaminocarbonylethoxy, 2-propylaminocarbonylethoxy, 3-isopropylaminocarbonylpropoxy, 4-butylaminocarbonylbutoxy, 5-pentylaminocarbonylpentyloxy, 6-hexylaminocarbonylhexyloxy, dimethylaminocarbonylmethoxy, 3-diethylaminocarbonylpropoxy, diethylaminocarbonylmethoxy, (N-ethyl-N-propylamino)carbonylmethoxy, 2-(N-methyl-N-hexylamino)carbonylethoxy, and the like.

The "carbamoyl-lower alkyl" includes a carbamoyl-substituted alkyl group wherein the alkyl moiety is a straight chain or branched chain alkyl group having 1 to 6 carbon atoms, for example, carbamoylmethyl, 2-carbamoylethyl, 1-carbamoylethyl, 3-carbamoylpropyl, 4-carbamoylbutyl, 5-carbamoylpentyl, 6-carbamoylhexyl, 1,1-dimethyl-2-carbamoylethyl, 2-methyl-3-carbamoylpropyl, and the like.

The "amino-lower alkanoyl having optionally a lower alkyl substituent" includes a straight chain or branched chain alkanoyl having 2 to 6 carbon atoms which is substituted by an amino group having optionally 1 to 2 substituents of a straight chain or branched chain alkyl group having 1 to 6 carbon atoms, for example, 2-aminoacetyl, 3-aminopropionyl, 2-aminopropionyl, 4-aminobutyryl, 5-aminopentanoyl, 6-aminohexanoyl, 2,2-dimethyl-3-aminopropionyl, 2-methyl-3-aminopropionyl, 2-methylaminoacetyl, 2-ethylaminopropionyl, 3-propylaminopropionyl, 3-isopropylaminopropionyl, 4-butylaminobutyryl, 5-pentylaminopentanoyl, 6-hexylaminohexanoyl, 2-dimethylaminoacetyl, 2-diethylaminoacetyl, 2-(N-ethyl-N-propylamino)acetyl, 3-(N-methyl-N-hexylamino)propionyl, and the like.

The "amino-lower alkyl having optionally a lower alkanoyl substituent" includes a straight chain or branched chain alkyl having 1 to 6 carbon atoms which is substituted by an amino group having optionally a substituent of a straight chain or branched chain alkanoyl group having 1 to 6 carbon atoms, for example, aminomethyl, 2-aminoethyl, 1-aminoethyl, 3-aminopropyl, 4-aminobutyl, 5-aminopentyl, 6-aminohexyl, 1,1-dimethyl-2-aminoethyl, 2-methyl-3-aminopropyl, acetylaminomethyl, 1-acetylaminoethyl, 2-propionylaminoethyl, 3-isopropionylaminopropyl, 4-butyrylaminobutyl, 5-pentanoylaminopentyl, 6-hexanoylaminohexyl, formylaminomethyl, and the like.

The "anilinocarbonyl having optionally a lower alkyl substituent on the phenyl ring" includes an anilinocarbonyl group having optionally 1 to 3 substituents of a straight chain or branched chain alkyl group having 1 to 6 carbon atoms on the phenyl ring, for example, anilinocarbonyl, 2-methylanilinocarbonyl, 3-methylanilinocarbonyl, 4-methylanilinocarbonyl, 2-ethylanilinocarbonyl, 3-ethylanilinocarbonyl, 4-ethylanilinocarbonyl, 4-isopropylanilinocarbonyl, 3-butylanilinocarbonyl, 4-pentylanilinocarbonyl, 4-hexylanilinocarbonyl, 3,4-dimethylanilinocarbonyl, 3,4-diethylanilinocarbonyl, 2,4-dimethylanilinocarbonyl, 2,5-dimethylanilinocarbonyl, 2,6-dimethylanilinocarbonyl, 3,4,5-trimethylanilinocarbonyl, and the like.

The "phenylsulfonyl which has optionally a substituent selected from a halogen and a lower alkyl on the phenyl ring" includes a phenylsulfonyl group which has optionally 1 to 3 substitutents selected from a straight chain or branched chain alkyl group having 1 to 6 carbon atoms and a halogen atom, for example, phenylsulfonyl, 2-chlorophenylsulfonyl, 3-chlorophenylsulfonyl, 4-chlorophenylsulfonyl, 2-fluorophenylsulfonyl, 3-fluorophenylsulfonyl, 4-fluorophenylsulfonyl, 2-bromophenylsulfonyl, 3-bromophenylsulfonyl, 4-bromophenylsulfonyl, 2-iodophenylsulfonyl, 3-iodophenylsulfonyl, 4-iodophenylsulfonyl, 3,4-dichlorophenylsulfonyl, 3,5-dichlorophenylsulfonyl, 2,6-dichlorophenylsulfonyl, 2,3-dichlorophenylsulfonyl, 2,4-dichlorophenylsulfonyl, 3,4-difluorophenylsulfonyl, 3,5-dibromophenylsulfonyl, 3,4,5-trichlorophenylsulfonyl, 2-ethyl-3-chlorophenylsulfonyl, 2-methylphenylsulfonyl, 3-methylphenylsulfonyl, 4-methylphenylsulfonyl, 2-ethylphenylsulfonyl, 3-ethylphenylsulfonyl, 4-ethylphenylsulfonyl, 4-isopropylphenylsulfonyl, 3-butylphenylsulfonyl, 4-pentylphenylsulfonyl, 4-hexylphenylsulfonyl, 3,4-dimethylphenylsulfonyl, 3,4-diethylphenylsulfonyl, 2,4-dimethylphenylsulfonyl, 2,5-dimethylphenylsulfonyl, 2,6-dimethylphenylsulfonyl, 3,4,6-trimethylphenylsulfonyl, 3,4,5-trimethylphenylsulfonyl, 3-chloro-4-methylphenylsulfonyl, 4-methyl-5-iodophenylsulfonyl, 3,4-dimethyl-5-bromophenylsulfonyl, 3,5-diiodo-4-methylphenylsulfonyl, and the like.

The "phthalimido-substituted lower alkyl" includes a straight chain or branched chain alkyl group having 1 to 6 carbon atoms which is substituted by phthalimido group, for example, phthalimidomethyl, 2-phthalimidoethyl, 1-phthal-imidoethyl, 3-phthalimidopropyl, 4-phthalimidobutyl, 5-phthalimidopentyl, 6-phthalimidohexyl, 1,1-dimethyl-2-phthalimidoethyl, 2-methyl-3-phthalimidopropyl, and the like.

The "lower alkynyl" includes a straight chain or branched chain alkynyl having 2 to 6 carbon atoms, for example, ethynyl, 2-propynyl, 2-butynyl, 3-butynyl, 1-methyl-2-propynyl, 2-pentynyl, 2-hexynyl, and the like.

The "benzoyl which has optionally a halogen substituent on the phenyl ring" includes a benzoyl group which has optionally 1 to 3 substituents of a halogen atom on the phenyl ring, for example, benzoyl, 2-chlorobenzoyl, 3-chlorobenzoyl, 4-chlorobenzoyl, 2-fluorobenzoyl, 3-fluorobenzoyl, 4-flourobenzoyl, 2-bromobenzoyl, 3-bromobenzoyl, 4-bromobenzoyl, 2-iodobenzoyl, 3-iodobenzoyl, 4-iodobenzoyl, 3,4-dichlorobenzoyl, 3,5-dichlorobenzoyl, 2,6-dichlorobenzoyl, 2,3-dichlorobenzoyl, 2,4-dichlorobenzoyl, 3,4-difluorobenzoyl, 3,5-dibromobenzoyl, 3,4,5-trichlorobenzoyl, and the like.

The "phenyl-lower alkoxy" includes a phenylalkoxy group wherein the alkoxy moiety is a straight chain or branched chain alkoxy group having 1 to 6 carbon atoms, for example, benzyloxy, 2-phenylethoxy, 1-phenylethoxy, 3-phenylpropoxy, 4-phenylbutoxy, 5-phenylpentyloxy, 6-phenylhexyloxy, 1,1-dimethyl-2-phenylethoxy, 2-methyl-3-phenylpropoxy, and the like.

The "amino-lower alkoxy having optionally a substituent selected from a lower alkyl and a lower alkanoyl" include a straight chain or branched chain alkoxy group having 1 to 6 carbon atoms which is substituted by an amino group having optionally 1 to 2 substituents selected from a straight chain or branched chain alkyl group having 1 to 6 carbon atoms and a straight chain or branched chain alkanoyl group having 1 to 6 carbon atoms, for example, aminomethoxy, 2-aminoethoxy, 1-aminoethoxy, 3-aminopropoxy, 4-aminobutoxy, 5-aminopentyloxy, 6-aminohexyloxy, 1,1-dimethyl-2-aminethoxy, 2-methyl-3-aminopropoxy, acetylaminomethoxy, 1-acetylaminoethoxy, 2-propionylaminoethoxy, 3-isopropionylaminopropoxy, 4-butyrylaminobutoxy, 5-pentanoylaminopentyloxy, 6-hexanoylaminohexyloxy, formylaminomethoxy, methylaminomethoxy, 1-ethylaminoethoxy, 2-propylaminoethoxy, 3-isopropylaminopropoxy, 4-butylaminobutoxy, 5-pentylaminopentyloxy, 6-hexylaminohexyloxy, dimethylaminomethoxy, (N-ethyl-N-propylamino)methoxy, 2-(N-methyl-N-hexylamino)ethoxy, and the like.

The "benzoyloxy which has optionally a halogen substituent on the phenyl ring" includes a benzoyloxy group which has optionally 1 to 3 substituents of a halogen atom on the phenyl ring, for example, benzoyloxy, 2-chlorobenzoyloxy, 3-chlorobenzoyloxy, 4-chlorobenzoyloxy, 2-fluorobenzoyloxy, 3-fluorobenzoyloxy, 4-fluorobenzoyloxy, 2-bromobenzoyloxy, 3-bromobenzoyloxy, 4-bromobenzoyloxy, 2-iodobenzoyloxy, 3-iodobenzoyloxy, 4-iodobenzoyloxy, 3,4-dichlorobenzoyloxy, 3,5-dichlorobenzoyloxy, 2,6-dichlorobenzoyloxy, 2,3-dichlorobenzoyloxy, 2,4-dichlorobenzoyloxy, 3,4-difluorobenzoyloxy, 3,5-dibromobenzoyloxy, 3,4,5-trichlorobenzoyloxy, and the like.

The "lower alkanoyloxy-substituted lower alkyl" includes a straight chain or branched chain alkyl group having 1 to 6 carbon atoms which is substituted by a straight chain or branched chain alkanoyloxy group having 2 to 6 carbon atoms, for example, acetyloxymethyl, 2-propionyloxyethyl, 1-butyryloxyethyl, 3-acetyloxypropyl, 4-acetyloxybutyl, 4-isobutyryloxybutyl, 5-pentanoyloxypentyl, 6-acetyloxyhexyl, 6-tert-butylcarbonyloxyhexyl, 1,1-dimethyl-2-hexanoyloxyethyl, 2-methyl-3-acetyloxypropyl, and the like.

The "lower alkylsulfonyloxy-lower alkyl" includes a straight chain or branched chain alkyl group having 1 to 6 carbon atoms which is substituted by a straight chain or branched chain alkylsulfonyloxy group having 1 to 6 carbon atoms, for example, methylsulfonyloxymethyl, 1-ethyl-sulfonyloxyethyl, 2-propylsulfonyloxyethyl, 3-isopropylsulfonyloxypropyl, 4-butylsulfonyloxybutyl, 5-pentylsulfoyloxypentyl, 6-hexylsulfonyloxyhexyl, 1,1-dimethyl-2-methylsulfoyloxyethyl, 2-methyl-3-ethylsulfonyloxypropyl, and the like.

The "azido-lower alkyl" includes a straight chain or branched chain alkyl group having 1 to 6 carbon atoms which is substituted by an azido group, for example, azidomethyl, 1-azidoethyl, 2-azidoethyl, 3-azidopropyl, 4-azidobutyl, 5-azidopentyl, 6-azidohexyl, 1,1-dimethyl-2-azidoethyl, 2-methyl-3-azidopropyl, and the like.

The "lower alkanoyloxyimino" includes a straight chain or branched chain alkanoyloxyimino group having 1 to 6 carbon atoms, for example, formyloxyimino, acetyloxyimino, propionyloxyimino, butyryloxyimino, isobutyryloxyimino, pentanoyloxyimino, tert-butylcarbonyloxyimino, hexanoyloxyimino, and the like.

The "lower alkylidene" includes a straight chain or branched chain alkylidene group having 1 to 6 carbon atoms, for example, methylidene, ethylidene, propylidene, isopropylidene, butylidene, pentylidene, hexylidene, and the like.

The "oxiranyl-substituted lower alkyl" includes a straight chain or branched chain alkyl group having 1 to 6 carbon atoms which is substituted by oxiranyl group, for example, oxiranylmethyl, 1-oxiranylethyl, 2-oxiranylethyl, 3-oxiranylpropyl, 4-oxiranylbutyl, 5-oxiranylpentyl, 6-oxiranylhexyl, 1,1-dimethyl-2-oxiranylethyl, 2-methyl-3-oxiranylpropyl, and the like.

The "lower alkyl having 1 to 2 substituents selected from a lower alkoxy, hydroxy and an amino having optionally a lower alkyl substituent" includes a straight chain or branched chain alkyl group having 1 to 6 carbon atoms and having 1 to 2 substituents selected from a straight chain or branched chain alkoxy group having 1 to 6 carbon atoms, hydroxy and an amino having optionally a straight chain or branched chain alkyl group having 1 to 6 carbon atoms, for example, methoxymethyl, 1-ethoxyethyl, 2-propoxyethyl, 3-isopropoxypropyl, 4-butoxybutyl, 5-pentyloxypentyl, 6-hexyloxyhexyl, 1,1-dimethyl-2-methoxyethyl, 2-methyl-3-ethoxypropyl, 3-methoxy-2-hydroxypropyl, hydroxymethyl, 2-hydroxyethyl, 1-hydroxyethyl, 3-hydroxypropyl, 2,3-dihydroxyethyl, 4-hydroxybutyl, 3,4-dihydroxybutyl, 1,1-dimethyl-2-hydroxyethyl, 5,6-dihydroxyhexyl, 5-hydroxypentyl, 6-hydroxyhexyl, 6-(N-ethyl-N-methylamino)-5-methoxyhexyl, 2-methyl-3-hydroxypropyl, aminomethyl, 1-aminoethyl, 2-aminoethyl, 3-aminopropyl, 4-aminobutyl, 5-aminopentyl, 6-aminohexyl, 1,1-dimethyl-2-aminoethyl, 2-methyl-3-aminopropyl, methylaminomethyl, ethylaminomethy, propylaminomethyl, isopropylaminomethyl, butylaminomethyl, tertbutylaminomethyl, pentylaminomethyl, hexylaminomethyl, dimethylaminomethyl, diethylaminomethyl, dipropylaminomethyl, dibutylaminomethyl, dipentylaminomethyl, dihexylaminomethyl, N-methyl-N-ethylaminomethyl, N-methyl-N-propylaminomethyl, N-methyl-N-butylaminomethyl, N-methyl-N-hexylaminomethyl, 1-methylaminoethyl, 2-ethylaminoethyl, 3-propylaminopropyl, 4-butylaminobutyl, 1,1-dimethyl-2-pentylaminoethyl, 5-hexylaminopentyl, 6-dimethylaminohexyl, 4-dimethylaminobutyl, 2-diethylaminoethyl, 1-(N-methyl-N-hexylamino)ethyl, 3-dihexylaminopropyl, 6-diethylaminohexyl, 4dibutylaminobutyl, 2-(N-methyl-N-pentylamino)ethyl, 2-hydroxy-3-diethylaminopropyl, 3-hydroxy-4-methylaminobutyl, 5-hydroxy-6-diethylaminohexyl, 4-hydroxy-5-dimethylaminopentyl, 4-hydroxy-5-methylaminopentyl, 4-hydroxy-5-diethylaminopentyl, 5-hydroxy-6-ethylaminohexyl, 5-hydroxy-6-isopropylaminohexyl, 5-hydroxy-6-aminohexyl, and the like.

The "aminocarbonyloxy having optionally a lower alkyl substituent" includes an aminocarbonyloxy group having optionally 1 to 2 substituents of a straight chain or branched chain alkyl group having 1 to 6 carbon atoms, for example, aminocarbonyloxy, methylaminocarbonyloxy, ethylaminocarbonyloxy, propylaminocarbonyloxy, isopropylaminocarbonyloxy, butylaminocarbonyloxy, tert-butylaminocarbonyloxy, pentylaminocarbonyloxy, hexylaminocarbonyloxy, dimethylaminocarbonyloxy, diethylaminocarbonyloxy, dipropylaminocarbonyloxy, dibutylaminocarbonyloxy, dipentylaminocarbonyloxy, dihexylaminocarbonyloxy, N-methyl-N-ethylamino-carbonyloxy, N-ethyl-N-propylaminocarbonyloxy, N-methyl-N-butyl-aminocarbonyloxy, N-methyl-N-hexylaminocarbonyloxy, and the like.

The "lower alkanoyloxy having optionally a halogen substituent" includes a straight chain or branched chain alkanoyloxy group having 1 to 6 carbon atoms which has optionally 1 to 3 substituents of a halogen atom, for example, in addition to the above lower alkanoyl group, 2,2,2-trifluoroacetyloxy, 2,2,2-trichloroacetyloxy, 2-chloroacetyloxy, 2-bromoacetyloxy, 2-fluoroacetyloxy, 2-iodoacetyloxy, 2,2-difluoroacetyloxy, 2,2-dibromoacetyloxy, 3,3,3-trifluoropropionyloxy, 3,3,3-trichloropropionyloxy, 3-chloropropionyloxy, 2,3-dichloropropionyloxy, 4,4,4-trichlorobutyryloxy, 4-fluorobutyryloxy, 5-chloropentanoyloxy, 3-chloro-2-methylpropionyloxy, 6-bromohexanoyloxy, 5,6-dibromohexanoyloxy, and the like.

The "amino-lower alkyl having optionally a substituent selected from a lower alkyl and a lower alkanoyl" include a straight chain or branched chain alkyl group having 1 to 6 carbon atoms which is substituted by an amino group having optionally 1 to 2 substituents selected from a straight chain or branched chain alkyl group having 1 to 6 carbon atoms and a straight chain or branched chain alkanoyl group having 1 to 6 carbon atoms, for example, aminomethyl, 2-aminoethyl, 1-aminoethyl, 3-aminopropyl, 4-aminobutyl, 5-aminopentyl, 6-aminohexyl, 1,1-dimethyl-2-aminoethyl, 2-methyl-3-aminopropyl, acetylaminomethyl, 1-acetylaminoethyl, 2-propionylaminoethyl, 3-isopropionylaminopropyl, 4-butyrylaminobutyl, 5-pentanoylaminopentyl, 6-hexanoylaminohexyl, formylaminomethyl, methylaminomethyl, 1-ethylaminoethyl, 2-propylaminoethyl, 3-isopropylaminopropyl, 4-butylaminobutyl, 5-pentylaminopentyl, 6-hexylaminohexyl, dimethylaminomethyl, (N-ethyl-N-propylamino)methyl, 2-(N-methyl-N-hexylamino)ethyl, and the like.

The "amino-lower alkanoyloxy having optionally a lower alkyl substituent" includes a straight chain or branched chain alkanoyloxy having 2 to 6 carbon atoms which is substituted by an amino group having optionally 1 to 2 substituents of a straight chain or branched chain alkyl group having 1 to 6 carbon atoms, for example, 2-aminoacetyloxy, 3-aminopropionyloxy, 2-aminopropionyloxy, 4-aminobutyryloxy, 5-aminopentanoyloxy, 6-aminohexanoyloxy, 2,2-dimethyl-3-aminopropionyloxy, 2-methyl-3-aminopropionyloxy, 2-methylaminoacetyloxy, 2-ethylaminopropionyloxy, 3-propylaminopropionyloxy, 3-isopropylaminopropionyloxy, 4-butylaminobutyryloxy, 5-pentylaminopentanoyloxy, 6-hexylaminohexanoyloxy, 2-dimethylaminoacetyloxy, 2-diethylaminoacetyloxy, 2-(N-ethyl-N-propylamino)acetyloxy, 3-(N-methyl-N-hexylamino)-propionyloxy, and the like.

The "pyridyl-lower alkyl" include a pyridylalkyl group wherein the alkyl moiety is a straight chain or branched chain alkyl group having 1 to 6 carbon atoms, for example, (4-pyridyl)-methyl, 1-(3-pyridyl)ethyl, 2-(2-pyridyl)ethyl, 3-(2-pyridyl)-propyl, 4-(3-pyridyl)-butyl, 5-(4-pyridyl)pentyl, 6-(2-pyridyl)-hexyl, 1,1-dimethyl-2-(3-pyridyl)ethyl, 2-methyl-3-(4-pyridyl)-propyl, and the like.

The "5- or 6-membered saturated heterocyclic group which is formed by binding the groups $R^{82}$ and $R^{83}$ together with the nitrogen atom to which they bond with or without being intervened with nitrogen, oxygen or sulfur atom" includes, for example, pyrrolidinyl, piperidinyl, piperazinyl, morpholino, thiomorpholino, and the like.

The above heterocyclic group which has a substituent selected from oxo, a lower alkyl, a lower alkanoyl and carbamoyl includes the above heterocyclic groups which have 1 to 3 substituents selected from oxo, a straight chain or branched chain alkyl group having 1 to 6 carbon atoms, a straight chain or branched chain alkanoyl group having 1 to 6 carbon atoms, and carbamoyl group, for example, 4-methylpiperazinyl, 3,4-dimethylpiperazinyl, 3-ethylpyrrolidinyl, 2-propylpyrrolidinyl, 3,4,5-trimethylpiperidinyl, 4-butylpiperidinyl, 3-pentylmorpholino, 4-hexylpiperazinyl, 2-methylthiomorpholino, 4-acetylpiperazinyl, 2-propionylmorpholino, 3-butyrylthiomorpholino, 3-pentanoylpyrrolidinyl, 4-hexanoylpiperidinyl, 3-methyl-4-acetylpiperazinyl, 2-carbamoylpyrrolidinyl, 4-carbamoylpiperazinyl, 3-carbamoylthiomorpholino, 2-carbamoylmorpholino, 3-carbamoylpiperidinyl, 1-oxo-thiomorpholino, 1,1-dioxothiomorpholino, and the like.

The "lower alkylsulfonyl" includes a straight chain or branched chain alkylsulfonyl group having 1 to 6 carbon atoms, for example, methylsulfonyl, ethylsulfonyl, propylsulfonyl, isopropylsulfonyl, butylsulfonyl, tert-butylsulfonyl, pentylsulfonyl, hexylsulfonyl, and the like.

The "aminocarbonyl having optionally a lower alkyl substituent" includes an aminocarbonyl group having optionally 1 to 2 substituents of a straight chain or branched chain alkyl group having 1 to 6 carbon atoms, for example, aminocarbonyl, methylaminocarbonyl, ethylaminocarbonyl, propylaminocarbonyl, isopropylaminocarbonyl, butylaminocarbonyl, tert-butylaminocarbonyl, pentylaminocarbonyl, hexylaminocarbonyl, dimethylaminocarbonyl, diethylaminocarbonyl, dipropylaminocarbonyl, dibutylaminocarbonyl, dipentylaminocarbonyl, dihexylaminocarbonyl, N-methyl-N-ethylaminocarbonyl, N-ethyl-N-propylaminocarbonyl, N-methyl-N-butylaminocarbonyl, N-methyl-N-hexylaminocarbonyl, and the like.

The "cyano-substituted lower alkyl" includes a straight chain or branched chain alkyl group having 1 to 6 carbon atoms which is substituted by cyano group, for example, cyanomethyl, 2-cyanoethyl, 1-cyanoethyl, 3-cyanopropyl, 4-cyanobutyl, 5-cyanopentyl, 6-cyanohexyl, 1,1-dimethyl-2-caynoethyl, 2-methyl-3-cyanopropyl, and the like.

The "lower alkoxycarbonyl-substituted lower alkyl" includes an alkoxycarbonyl-substituted straight chain or branched chain alkyl group having 1 to 6 carbon atoms wherein the alkoxycarbonyl moiety is a straight chain or branched chain alkoxycarbonyl group having 1 to 6 carbon atoms, for example, methoxycarbonylmethyl, 3-methoxycarbonylpropyl, ethoxycarboxymethyl, 3-ethoxycarbonylpropyl, 4-ethoxycarbonylbutyl, 5-isopropoxycarbonylpentyl, 6-propoxycarbonylhexyl, 1,1-dimethyl-2-butoxycarbonylethyl, 2-methyl-3-tert-butoxycarbonylpropyl, 2-pentyloxycarbonylethyl, hexyloxycarbonylmethyl, and the like.

The "carboxy-substituted lower alkyl" includes a carboxy-substituted alkyl group wherein the alkyl moiety is a straight chain or branched chain alkyl group having 1 to 6 carbon atoms, for example, carboxymethyl, 2-carboxyethyl, 1-carboxyethyl, 3-carboxypropyl, 4-carboxybutyl, 5-carboxypentyl, 6-carboxyhexyl, 1,1-dimethyl-2-carboxyethyl, 2-methyl-3-carboxypropyl, and the like.

The "tetrahydropyranyloxy-substituted lower alkyl" includes a tetrahydropyranyloxy-substituted straight chain or branched chain alkyl group having 1 to 6 carbon atoms, for example, (2-tetrahydropyranyloxy)methyl, 2-(3-tetrahydropyranyloxy)ethyl, 1-(4-tetrahydropyranyloxy)ethyl, 3-(2-tetrahydropyranyloxy)propyl, 4-(3-tetrahydropyranyloxy)butyl, 5-(4-tetrahydropyranyloxy)pentyl, 6-(2-tetrahydropyranyloxy)hexyl, 1,1-dimethyl-2-(3-tetrahydropyranyloxy)ethyl, 2-methyl-3-(4-tetrahydropyranyloxy)propyl, and the like.

The "piperidinyl having optionally a phenyl-lower alkyl substituent" includes a piperidinyl which has optionally a substituent of a phenylalkyl group wherein the alkyl moiety is a straight chain or branched chain alkyl group having 1 to 6 carbon atoms, for example, piperidinyl, 1-benzyl-4-piperidinyl, 1-(2-phenylethyl)-3-piperidinyl, 1-(1-phenylethyl)-2-piperidinyl, 1-(3-phenylpropyl)-4-piperidinyl, 1-(4-phenylbutyl)-4-piperidinyl, 1-(5-phenylpentyl)-4-piperidinyl, 1-(6-phenylhexyl)-4-piperidinyl, 1-(1,1-dimethyl-2-phenylethyl)-3-piperidinyl, 1-(2-methyl-3-phenylpropyl)-2-piperidinyl, and the like.

The "imidazolyl-substituted lower alkanoyl" includes an imidazolyl-substituted alkanoyl group wherein the alkanbyl moiety is a straight chain or branched chain alkanoyl group having 2 to 6 carbon atoms, for example, (1-imidazolyl)acetyl, 3-(2-imidazolyl)propionyl, 2-(4-imidazolyl)propionyl, 4-(1-imidazolyl)butyryl, 2,2-dimethyl-3-(2-imidazolyl)propionyl, 5-(4-imidazolyl)-pentanoyl, 6-(1-imidazolyl)hexanoyl, and the like.

The "amino-lower alkanoyl having optionally a substituent selected from a lower alkyl and a lower alkoxycarbonyl" includes a straight chain or branched chain alkanoyl having 2 to 6 carbon atoms which is substituted by an amino group having optionally 1 to 2 substituents selected from a straight chain or branched chain alkyl group having 1 to 6 carbon atoms and a straight chain or branched chain alkoxycarbonyl group having 1 to 6 carbon atoms, for example, 2-aminoacetyl, 3-aminopropionyl, 2-aminopropionyl, 4-aminobutyryl, 5-aminopentanoyl, 6-aminohexanoyl, 2,2-dimethyl-3-aminopropionyl, 2-methyl-3-aminopropionyl, 2-methylaminoacetyl, 2-ethylaminopropionyl, 3-propylaminopropionyl, 3-isopropylaminopropionyl, 4-butylaminobutyryl, 5-pentylaminopentanoyl, 6-hexylaminohexanoyl, 2-dimethylaminoacetyl, 2-diethylaminoacetyl, 2-(N-ethyl-N-propylamino)acetyl, 3-(N-methyl-N-hexylamino)propionyl, 2-methoxycarbonylaminoacetyl, 2-ethoxycarbonylaminoacetyl, 3-propoxycarbonylaminopropionyl, 4-butoxycarbonylaminobutyryl, 2-tert-butoxycarbonylaminoacetyl, 5-pentyloxycarbonylaminopentanoyl, 6-hexyloxycarbonylaminohexanoyl, 2-(N-methyl-N-tert-butoxycarbonylamino)acetyl, and the like.

The "aminocarbonyl-lower alkyl having a lower alkyl substituent" includes a straight chain or branched chain alkyl group having 1 to 6 carbon atoms which is substituted by an aminocarbonyl group having 1 to 2 substituents of a straight chain or branched chain alkyl group having 1 to 6 carbon atoms, for example, methylaminocarbonylmethyl, 1-ethylaminocarbonylethyl, 2-propylaminocarbonylethyl, 3-isopropylaminocarbonylpropyl, 4-butylaminocarbonylbutyl, 5-pentylaminocarbonylpentyl, 6-hexylaminocarbonylhexyl, dimethylaminocarbonylmethyl, 3-diethylaminocarbonylpropyl, diethylaminocarbonylmethyl, (N-ethyl-N-propylamino)carbonylmethyl, 2-(N-methyl-N-hexylamino)carbonylethyl, and the like.

The "amino-substituted lower alkoxy having optionally a lower alkyl substituent" includes an amino-substituted straight chain or branched chain alkoxy having 1 to 6 carbon atoms which has optionally 1 to 2 substituents of a straight chain or branched chain alkyl having 1 to 6 carbon atoms, such as aminomethoxy, 2-aminoethoxy, 1-aminoethoxy, 3-aminopropoxy, 4-aminobutoxy, 5-aminopentyloxy, 6-aminohexyloxy, 1,1-dimethyl-2-aminoethoxy, 2-methyl-3-aminopropoxy, methylaminomethoxy, 1-ethylaminoethoxy, 2-propylaminoethoxy, 3-isopropylaminopropoxy, 4-butylaminobutoxy, 5-pentylaminopentyloxy, 6-hexylaminohexyloxy, dimethylaminomethoxy, (N-ethyl-N-propylamino)methoxy, 2-(N-methyl-N-hexylamino)ethoxy, and the like.

The compounds of the present invention can be prepared by various processes, for example, by the processes shown in the following reaction schemes.

[Reaction Scheme-1]

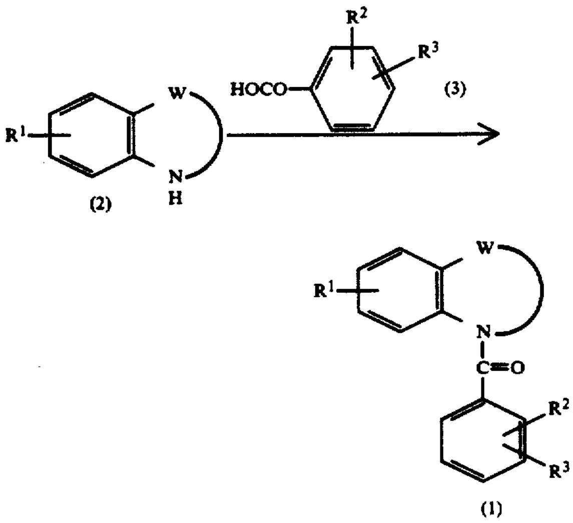

wherein $R^1$, $R^2$, $R^3$, and W are the same as defined above.

The process of Reaction Scheme-1 is carried out by reacting a benzoheterocyclic compound of the formula (2) and a carboxylic acid compound of the formula (3) by a conventional amido bond forming reaction. The amido bond forming reaction can be carried out under the conditions for the conventional amido bond forming reaction, for example, (a) a mixed acid anhydride process, i.e. a process of reacting the carboxylic acid compound (3) with an alkylhalocarboxylic acid to form a mixed acid anhydride and reacting the resultant with the amine compound (2), (b) an activated ester process, i.e. a process of converting the carboxylic acid compound (3) into an activated ester, such as p-nitrophenyl ester, N-hydroxy-succinimide ester, 1-hydroxybenzotriazole ester, etc., and reacting the resultant with the amine compound (2), (c) a carbodiimide process, i.e. a process of condensing the carboxylic acid compound (3) and the amine compound (2) in the presence of an activating agent such as dicyclohexylcarbodiimide, carbonyldiimidazole, etc., (d) other processes, i.e. a process of converting the carboxylic acid compound (3) into a carboxylic anhydride by treatment with a dehydrating agent such as acetic anhydride, and reacting the resultant with the amine compound (2); a process of reacting an ester of the carboxylic acid compound (3) with a lower alcohol and the amine compound (2) at a high temperature under high pressure; a process of reacting an acid halide compound of the carboxylic acid compound (3), i.e. a carboxylic acid halide, with the amine compound (2), and the like.

The mixed acid anhydride used in the above mixed acid anhydride process (a) is obtained by the known Schötten-Baumann reaction, and the reaction product is used without isolation from the reaction mixture for the reaction with the amine compound (2) to give the desired compound of the formula (1). The Schötten-Baumann reaction is usually carried out in the presence of a basic compound. The basic compound is any conventional compounds used for the Schötten-Baumann reaction and includes, for example, organic basic compounds such as trieihylamine, trimethylamine, pyridine, dimethylaniline, N-methylmorpholine, 1,5-diazabicyclo[4.3.0] nonene-5 (DBN), 1,8-diazabicyclo[5.4.0]-undecene-7 (DBU), 1,4-diazabicyclo[2.2.2] octane (DABCO), etc., and inorganic basic compounds such as potassium carbonate, sodium carbonate, potassium hydrogen carbonate, sodium hydrogen carbonate, etc. The reaction is usually carried out at a temperature of from about −20° C. to about 100° C., preferably from about 0° C. to about 50° C., for about 5 minutes to about 10 hours, preferably about 5 minutes to about 2 hours.

The reaction of the thus obtained mixed acid anhydride with the amine compound (2) is usually carried out at a temperature of from about −20° C. to about 150° C., preferably about 10° C. to about 50° C., for about 5 minutes to about 10 hours, preferably about 5 minutes to about 5 hours. The mixed acid anhydride process is usually carried out in an appropriate solvent. The solvent is any conventional solvents which are usually used in the mixed acid anhydride process and includes, for example, halogenated hydrocarbons (e.g. chloroform, dichloromethane dichloroethane, etc.), aromatic hydrocarbons (e.g. benzene, toluene, xylene, etc.), ethers (e.g. diethyl ether, diisopropyl ether, tetrahydrofuran, dimethoxyethane, etc.), esters (e.g. methyl acetate, ethyl acetate, etc.), aprotic polar solvents (e.g. N,N-dimethylformamide, dimethylsulfoxide, hexamethylphosphoric triamide, etc.), or a mixture of these solvents. The alkylhalocarboxylic acid used in the mixed acid anhydride process includes, for example, methyl chloroformate, methyl bromoformate, ethyl chloroformate, ethyl bromoformate, isobutyl chloroformate, and the like. In said process, the carboxylic acid compound (3), the alkylhalocarboxylic acid and the amine (2) are usually used in each equimolar amount, but preferably, the alkylhalocarboxylic acid and the carboxylic acid compound (3) are used each in an amount of about 1 to 1.5 mole to 1 mole of the amine (2).

Among the above other processes (d), in case of the process of reacting the carboxylic acid halide with the amine compound (2), the reaction is usually carried out in the presence of a basic compound in an appropriate solvent. The basic compound is any conventional compounds and includes, in addition to the basic compounds used for the above-mentioned Schötten-Baumann reaction, sodium hydroxide, potassium hydroxide, sodium hydride, potassium hydride. etc. The solvent includes, in addition to the solvents used for the above-mentioned mixed acid anhydride process, alcohols (e.g. methanol, ethanol, propanol, butanol, 3-methoxy-1-butanol, ethylcellosolve, methylcellosolve, etc.), acetonitrile, pyridine, acetone, water, and the like. The amount of the amine compound (2) and the carboxylic acid halide is not critical, but the carboxylic acid halide is usually used at least in equimolar amount, preferably about 1 to 5 moles to 1 mole of the amine compound (2). The reaction is usually carried out at a temperature of from about −20° C. to about 180° C., preferably from about 0° C. to about 150° C., for about 5 minutes to about 30 hours.

The amido bond forming reaction in the above Reaction Scheme-1 may also be carried out by reacting the carboxylic acid compound (3) and the amine (2) in the presence of a condensation agent, i.e. phosphoric compounds such as triphenylphosphine, diphenylphosphinyl chloride, phenyl-N-phenylphosphoramide chloridate, diethyl chlorophosphate, diethyl phosphorocyanidate, diphenylphosphoric azide, bis(2-oxo-3-oxazolidinyl)phosphinic chloride, etc. The reaction is usually carried out in the presence of the solvent and basic compound as used in the above reaction of the carboxylic acid halide and the amine (2) at a temperature of from about −20° C. to about 150° C., preferably about 0° C. to about 100° C., for about 5 minutes to about 30 hours. The condensation agent and the carboxylic acid compound (3) are used at least in equimolar amount, preferably about 1 to 2 moles, to 1 mole of the amine (2).

[Reaction Scheme-2]

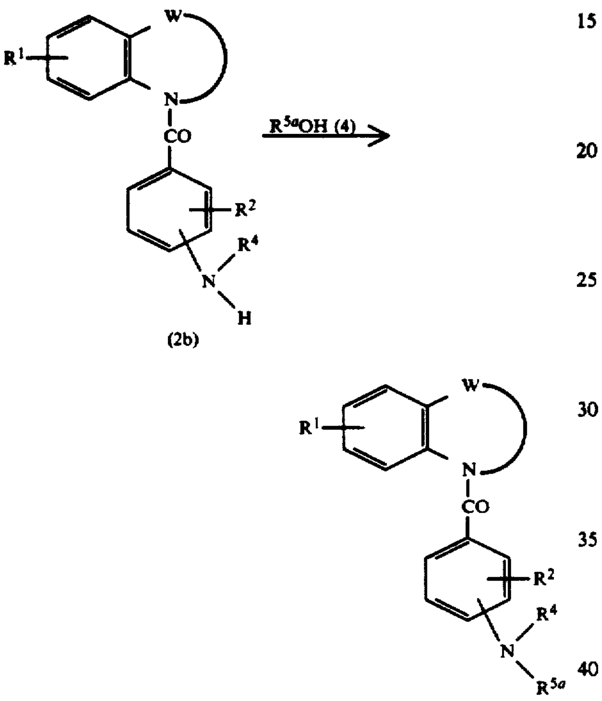

(2b) (1b)

wherein $R^1$, $R^2$, $R^4$ and W are as defined above, $R^{5a}$ is the same as $R^5$ as defined above except excluding an anilinocarbonyl having optionally a lower alkyl substituent on the phenyl ring, a phenylsulfonyl having optionally a substituent selected from a halogen atom and a lower alkyl on the phenyl ring and quinolylsulfonyl.

The reaction of the compound (2b) and the compound (4) is carried out in the same manner as in the reaction of the compound (2) and the compound (3) in the above Reaction Scheme-1.

[Reaction Scheme-3]

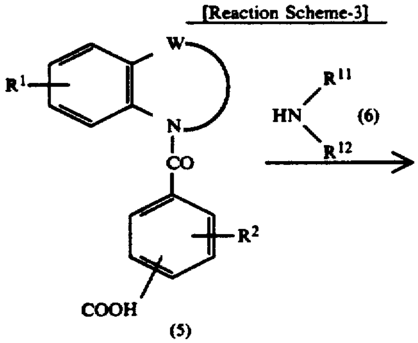

(5)

-continued

[Reaction Scheme-3]

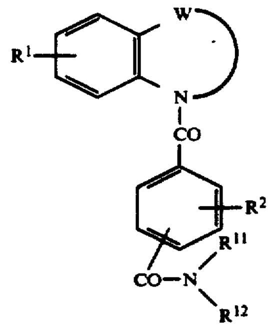

(1c)

wherein $R^1$, $R^2$, $R^{11}$, $R^{12}$ and W are as defined above.

The reaction of the compound (5) and the compound (6) is carried out under the same conditions as used in the reaction of the compound (2) and the compound (b 3) in the above Reaction Scheme-1.

[Reaction Scheme-4]

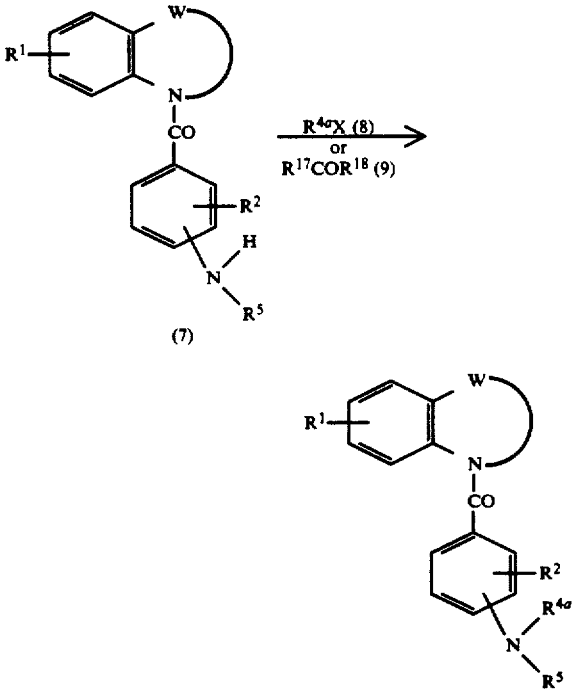

(7) (1d)

wherein $R^1$, $R^2$, $R^5$ and W are as defined above, and $R^{4a}$ is a lower alkyl, $R^{17}$ and $R^{18}$ are each hydrogen atom or a lower alkyl, and X is a halogen atom.

The reaction of the compound (7) and the compound (8) is usually carried out in an insert solvent in the presence or absence of a basic compound. The inert solvent includes, for example, aromatic hydrocarbons (e.g. benzene, toluene, xylene, etc.), ethers (e.g. tetrahydrofuran, dioxane, diethylene glycol dimethyl ether, etc.), halogenated hydrocarbons (e.g. dichloromethane, chloroform, carbon tetrachloride, etc.), lower alcohols (e.g. methanol, ethanol, isopropanol, butanol, tert-butanol, etc.), acetic acid, ethyl acetate, acetone, acetonitrile, pyridine, dimethylsulfoxide, dimethylformamide, hexamethylphosphoric triamide, etc., or a mixture of these solvents. The basic compound includes, for example, carbonates (e.g. sodium carbonate, potassium carbonate, sodium hydrogen carbonate, potassium hydrogen carbonate, etc.), metal hydroxides (e.g. sodium hydroxide, potassium hydroxide, etc.), sodium hydride, potassium, sodium, sodium amide, metal alcoholates (e.g. sodium methoxide, sodium ethoxide, etc.), and organic basic compounds (e.g. pyridine, N-ethyldiisopropylamine, dimethylaminopyridine, triethylamine, 1,5-diazabicyclo-[4.3.0]nonene-(5) (DBN), 1,8-diazabicyclo[5.4.0]undecene-7 (DBU), 1,4-diazabicyclo[2.2.2]octane (DABCO), etc.). The amount of the compound (7) and the compound (8) is not critical, but the compound (8) is usually used at least in equivalent amount, preferably 1 to 10 moles, to 1 mole of the compound (7). The reaction is usually carried out at a temperature of from about 0° C. to about 200° C., preferably from about 0° C. to about 170° C., for about 30 minutes to about 30 hours. In the reaction, an alkali metal halide (e.g. sodium iodide, potassium iodide, etc.) may be added to the reaction system.

The reaction of the compound (7) and the compound (9) is carried out in an appropriate solvent or without solvent in the presence of a reducing agent. The solvent includes, for example, water, alcohols (e.g. methanol, ethanol, isopropanol, etc.), acetonitrile, formic acid, acetic acid, ethers (e.g. dioxane, diethyl ether, diglyme, tetrahydrofuran, etc.), aromatic hydrocarbons (e.g. benzene, toluene; xylene, etc.), or a mixture of these solvents. The reducing agent includes, for example, formic acid, fatty acid alkali metal salts (e.g. sodium formate, etc.), hydrogenating reducing agents (e.g. sodium boro hydride, sodium cyanoboro hydride, lithium aluminum hydride, etc.), catalystic reducing agents (e.g. palladium black, palladium-carbon, platinum oxide, platinum black, Raney nickel, etc.).

When formic acid is used as the reducing agent, the reaction is usually carried out at a temperature of from room temperature to about 200° C., peferably about 50° C. to about 150° C., for about 1 to 10 hours. The formic acid is usually used in a large excess amount to the compound (7).

When a hydrogenating reducing agent is used, the reaction is usually carried out at a temperature of about −30° C. to about 100° C., preferably about 0° C. to about 70° C., for about 30 minutes to 12 hours. The reducing agent is usually used in an amount of 1 to 20 moles, preferably 1 to 6 moles, to 1 mole of the compound (7). When lithium aluminum hydride is used as the reducing agent, it is preferable to use a solvent selected from ethers (e.g. diethyl ether, dioxane, tetrahydrofuran, diglyme, etc.) and aromatic hydrocarbons (e.g. benzene, toluene, xylene, etc.).

When a catalytic reducing agent is used, the reaction is usually carried out under atmospheric pressure to about 20 atm., preferably atmospheric pressure to about 10 atm. under hydrogen atmosphere or in the presence of a hydrogen donor (e.g. formic-acid, ammonium formate, cyclohexene, hydrazine hydrate, etc.) at a temperature of about −30° C. to about 100° C., preferably about 0° C. to about 60° C., for about 1 to 12 hours. The catalytic reducing agent is usually used in an amount of about 0.1 to 40% by weight, preferably about 1 to 20% by weight, of the amount of the compound (7). The compound (9) is usually used at least in equivalent amount, preferably equivalent to a large excess amount, to the compound (7).

[Reaction Scheme-5A]

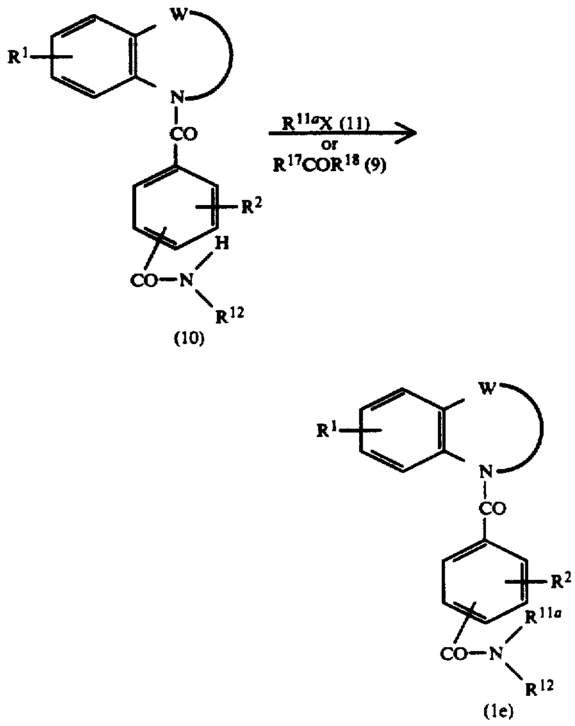

wherein $R^1$, $R^2$, $R^{12}$, $R^{17}$, $R^{18}$, X and W are as defined above, and $R_{11}$ is a lower alkyl.

[Reaction Scheme-5B]

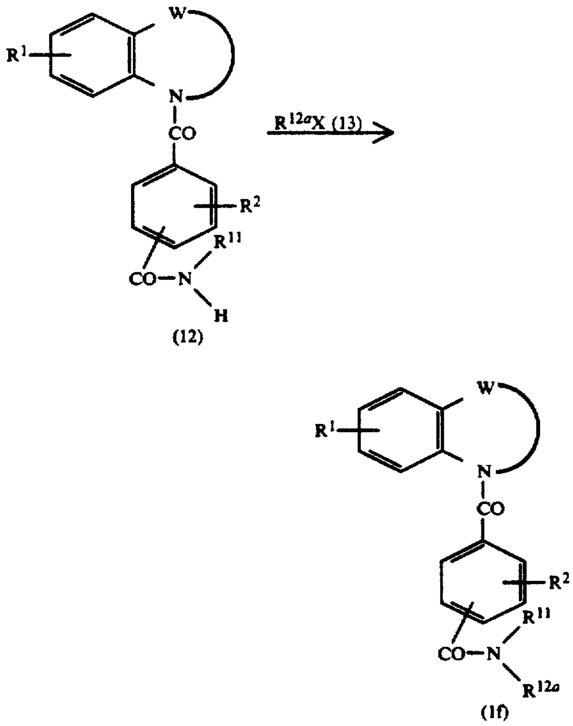

wherein $R^1$, $R^2$, $R^{11}$, X and W are as defined above, and $R^{12a}$ is a cycloalkyl.

The reaction of the compound (10) and the compound (11) in the Reaction Scheme-5A and the reaction of the compound (12) and the compound (13) in the Reaction Scheme-5B are carried out in the same manner as in the reaction of the compound (7) and the compound (8) in the above Reaction Scheme-4.

Besides, the reaction of the compound (10) and the compound (9) in the Reaction Scheme-5A is carried out in the same manner as in the reaction of the compound (7) and the compound (9) in the above Reaction Scheme-4.

[Reaction Scheme-6A]

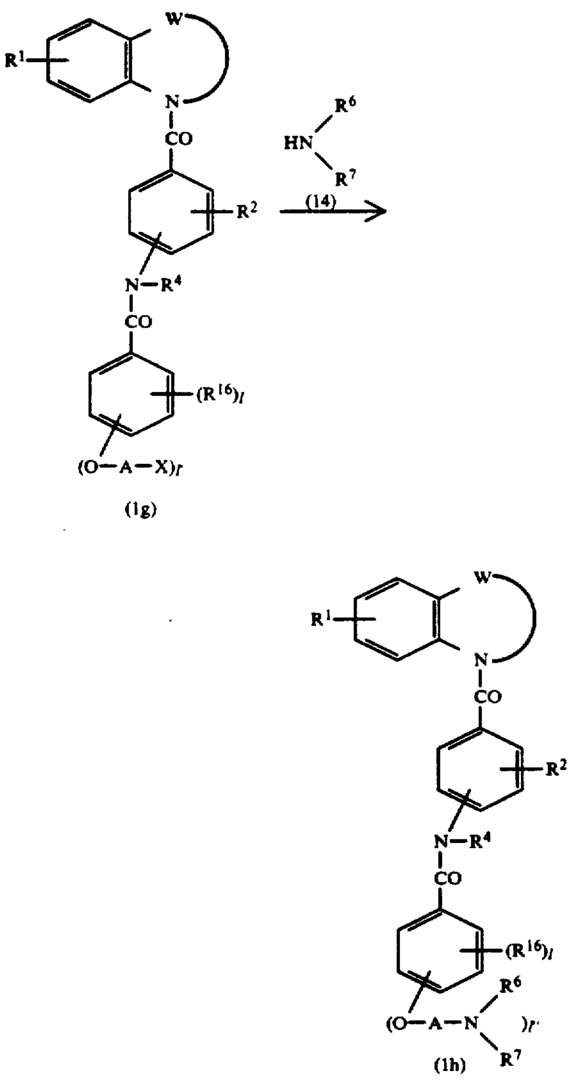

wherein $R^1$, $R^2$, $R^4$, $R^{16}$, $R^6$, $R^7$, X, W, and A are as defined above, l is 0 or an integer of 1 to 3, l' and l'' are each an interger of 1 to 3, provided that l+l'and l+l'' are each an integer not more than 3.

[Reaction Scheme-6B]

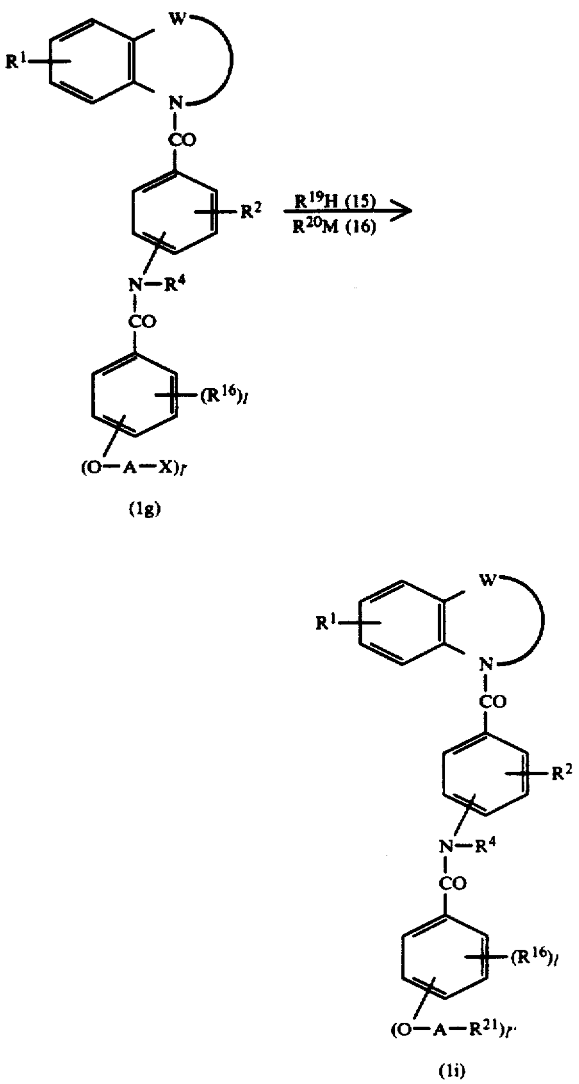

wherein $R^1$, $R^2$, $R^4$, $R^{16}$, X, W, A, l', and l'' are as defined above, and $R^{19}$ is a lower alkanoyloxy, $R^{20}$ is a lower alkanoyloxy, hydroxy or phthalimido, $R^{21}$ is the same as as $R^{19}$ and $R^{20}$, and M is an alkali metal (e.g. potassium, sodium, etc.).

The reaction of the compound (1g) and the compound (14) in the Reaction Scheme-6A and the reaction of the compound (1g) and the compound (15) or (16) in the Reaction Scheme-6B can be carried out under the same conditions as in the reaction of the compound (7) and the compound (8) in the above Reaction Scheme-4. In the reaction, an alkali metal halide (e.g. sodium iodide, potassium iodide, etc.) may be added to the reaction system.

[Reaction Scheme-7]

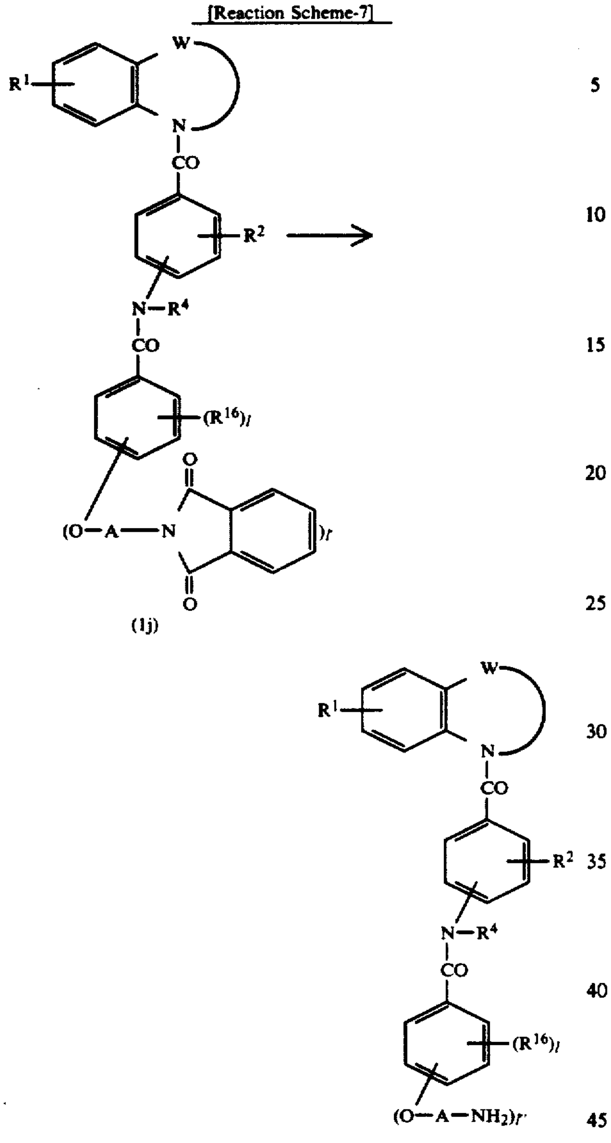

(1j) (1k)

wherein $R^1$, $R^2$, $R^4$, $R^{16}$, W, l, l', l'' and A are as defined above.

The reaction of converting the compound (1j) into the compound (1k) can be carried out by reacting the compound (1j) with hydrazine in an appropriate solvent or by hydrolyzing the compound (1j). The solvent used in the reaction with hydrazine includes water and further the same solvent as used in the reaction of the compound (2b) and the compound (4) in the above Reaction Scheme-2. The reaction is usually carried out at a temperature of from room temperature to about 120° C., preferably about 0° C. to about 100° C., for about 0.5 to 5 hours. Hydrazine is usually used in an amount of at least 1 mole, preferably about 1 to 5 moles, to 1 mole of the compound (1j).

The hydrolysis can be carried out in an appropriate solvent or without solvent in the presence of an acid or a basic compound. The solvent includes, for example, water, lower alcohols (e.g. methanol, ethanol, isopropanol, etc.), ketones (e.g. acetone, methyl ethyl ketone, etc.), ethers (e.g. dioxane, tetrahydrofuran, ethylene glycol dimethyl ether, etc.), fatty acids (e.g. acetic acid, formic acid, etc.), or a mixture of these solvents. The acid includes, for example, mineral acids (e.g. hydrochloric acid, sulfuric acid, hydrobromic acid, etc.) and organic acids (e.g. formic acid, acetic acid, aromatic sulfonic acids, etc.). The basic compound includes, for example, metal carbonates (e.g. sodium carbonate, potassium carbonate, etc.), metal hydroxides (e.g. sodium hydroxide, potassium hydroxide, calcium hydroxide, etc.), and the like. The reaction is usually carried out at a temperature of from room temperature to about 200° C., preferably from room temperature to about 150° C., for about 10 minutes to 25 hours.

[Reaction Scheme-8]

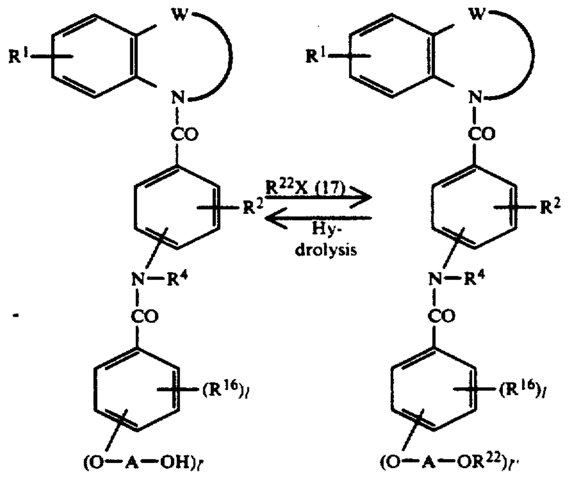

(1l) (1m)

wherein $R^1$, $R^2$, $R^4$, W, $R^{16}$, l, l', l'', X, and A are as defined above, and $R^{22}$ is a lower alkanoyl.

The reaction of the compound (1l) and the compound (17) is carried out under the same conditions as in the reaction of the compound (7) and the compound (8) in the Reaction Scheme-4. In the reaction, an alkali metal halide (e.g. sodium iodide, potassium iodide, etc.) may be added to the reaction system.

The reaction of converting the compound (1m) into the compound (1l) can be carried out under the same condition as in the hydrolysis of the compound (1j) in the Reaction Scheme-7.

[Reaction Scheme-9]

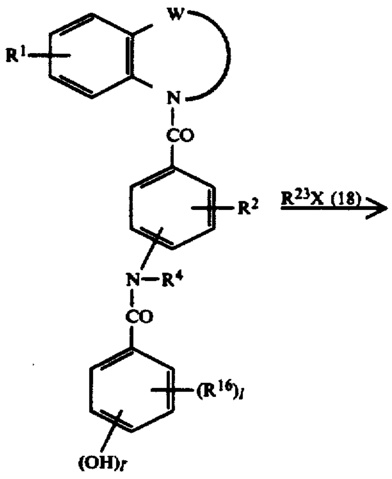

(1n)

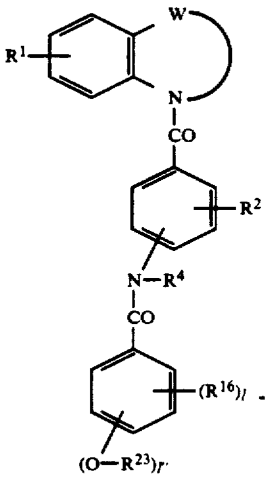

(1o)

wherein $R^1$, $R^2$, $R^4$, W, $R^{16}$, l, l', l'', and X are as defined above, and $R^{23}$ is a lower alkyl, a lower alkanoyloxy-substituted lower alkyl, a halogen-substituted lower alkyl, a carboxy-substituted lower alkyl, a carbamoyl-substituted lower alkyl, a hydroxy-substituted lower alkyl, a lower alkoxycarbonyl-substituted lower alkyl, a phthalimido-substituted lower alkyl, an aminocarbonyl-lower alkyl having optionally a lower alkyl substituent, or a group of the formula:

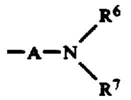

(A, $R^6$ and $R^7$ are as defined above).

The reaction of the compound (1n) and the compound (18) can be carried out under the same conditions as in the reaction of the compound (7) and the compound (8) in the above Reaction Scheme-4. In the reaction, an alkali metal halide (e.g. sodium iodide, potassium iodide, etc.) may be added to the reaction system.

[Reaction Scheme-10]

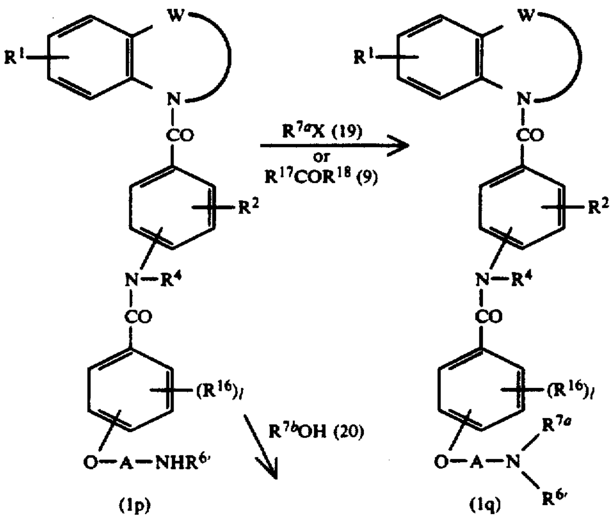

(1p) (1q)

-continued

[Reaction Scheme-10]

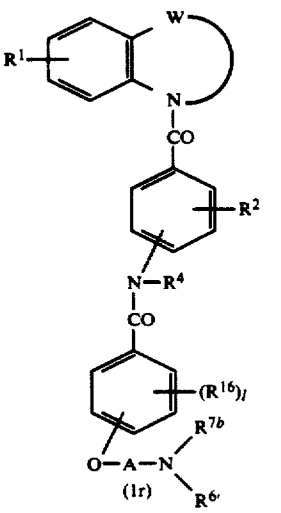

wherein $R^1$, $R^2$, $R^4$, W, $R^{16}$, $R^{17}$, $R^{18}$, l, X, and A are as defined above, and $R^{6'}$ is hydrogen atom, a lower alkyl having optionally a hydroxy substituent, a lower alkanoyl, or benzoyl, $R^{7a}$ is a lower alkyl having optionally a hydroxy substituent, and $R^{7b}$ is a lower alkanoyl or benzoyl.

The reaction of the compound (1p) and the compound (19) or the compound (9) can be carried out under the same conditions as in the reaction of the compound (7) and the compound (8) or the compound (9) in the above Reaction Scheme-4.

The reaction of the compound (1p) and the compound (20) can be carried out under the same conditions as in the reaction of the compound (2) and the compound (3) in the Reaction Scheme-1.

Besides, the compound (1r) can also be obtained by reacting the compound (1p) with a compound of the formula: $(R^{7b})_2O$ ($R^{7b}$ is as defined above). The reaction can be carried out in an appropriate solvent or without solvent in the presence or absence, peferably presence, of a basic. compound. The solvent includes, for example, the above-mentioned aromatic hydrocarbons, lower alcohols (e.g. methanol, ethanol, propanol, etc.), dimethylformamide, dimethylsulfoxide, and further halogenated hydrocarbons (e.g. chloroform, methylene chloride, etc.), acetone, pyridine, etc. The basic compound includes, for example, tertiary amines (e.g. triethylamine, pyridine, etc.), sodium hydroxide, potassium hydroxide, sodium hydride, and the like. The above reaction can also be carried out in a solvent such as acetic acid or benzoic acid in the presence of a mineral acid (e.g. sulfuric acid, etc.). The acid anhydride is usually used in an equimolar amount or more, preferably 1 to 10 moles, to 1 mole of the starting compound, and the reaction is usually carried out at a temperature of about 0° C. to about 200° C., preferably from about 0° C. to about 150° C., for about 0.5 to 15 hours.

[Reaction Scheme-11]

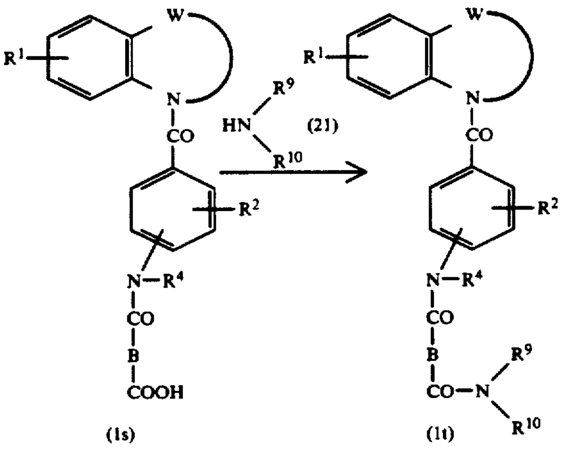

wherein $R^1$, $R^2$, $R^4$, $R^9$, $R^{10}$, W, and B are as defined above.

The reaction of the compound (1s) and the compound (21) can be carried out under the same conditions as in the reaction of the compound (2) and the compound (3) in the above Reaction Scheme-1.

[Reaction Scheme-12]

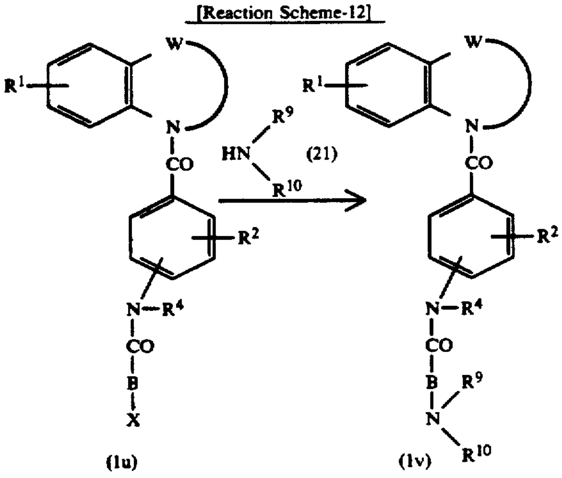

(1u) (1v)

wherein $R^1$, $R^2$, $R^4$, W, $R^9$, $R^{10}$, X, and B are as defined above.

The reaction of the compound (1u) and the compound (21) can be carried out under the same conditions as in the reaction of the compound (7) and the compound (8) in the above Reaction Scheme-4. In the reaction, an alkali metal halide (e.g. sodium iodide, potassium iodide, etc.) may be added to the reaction system.

The reaction of the compound (2b) and the compound (22) can be carried out in an appropriate inert solvent. The inert solvent includes, for example, aromatic hydrocarbons (e.g. benzene, toluene, xylene, etc.), ethers (e.g. tetrahydrofuran, dioxane, diethylene glycol dimethyl ether, etc.), lower alcohols (e.g. methanol, ethanol, isopropaneol, butanol, etc.), halogenated hydrocarbons (e.g. dichloromethane, chloroform, carbon tetrachloride, etc.), acetic acid, ethyl acetate, acetonitrile, dimethylsulfoxide, dimethylformamide, hexamethylphosphoric triamide, and the like. The amount of the compound (2b) and the compound (22) is not critical, but the compound (22) is usually used in an amount of at least one mole, preferably 1 to 2 moles, to 1 mole of the compound (2b). The reaction is usually carried out at a temperature of from about 0° C. to about 150° C., preferably from about 0° C. to about 100° C., for about 30 minutes to about 10 hours.

The esterification of the compound (1w) is usually carried out by reacting the starting compound with an alcohol (e.g. methanol, ethanol, isopropanol, etc.) in the presence of a mineral acid (e.g. hydrochloric acid, sulfuric acid, etc.) and a halogenating agent (e.g. thionyl chloride, phosphorus oxychloride, phosphorus pentachloride, phosphorus trichloride, etc.) at a temperature of 0° C. to 150° C., preferably 50° C. to 100° C., for about 1 to 10 hours.

The hydrolysis of the compound (1x) can be carried out under the same conditions as in the hydrolysis of the compound (1j) in the Reaction Scheme-7.

[Reaction Scheme-13]

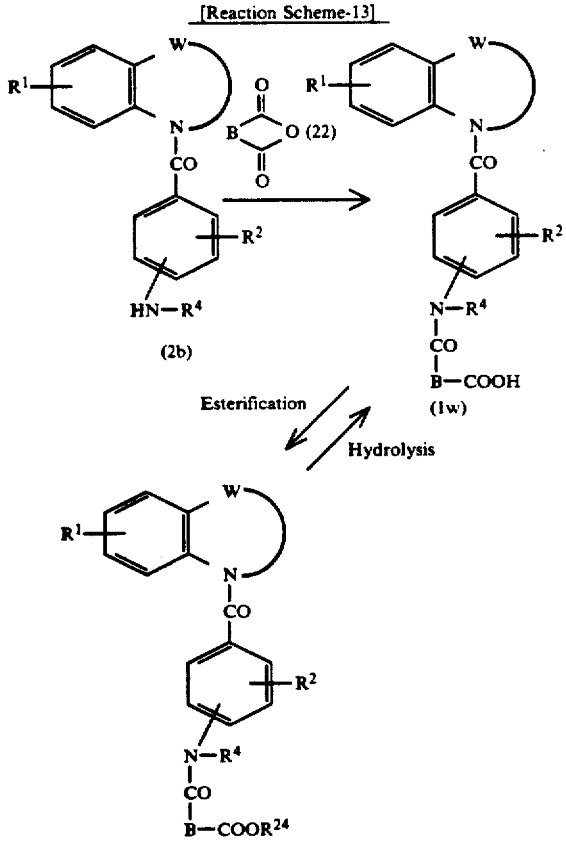

(2b) (1w) (1x)

wherein $R^1$, $R^2$, $R^4$, W, and B are as defined above, and $R^{24}$ is a lower alkyl.

[Reaction Scheme-14]

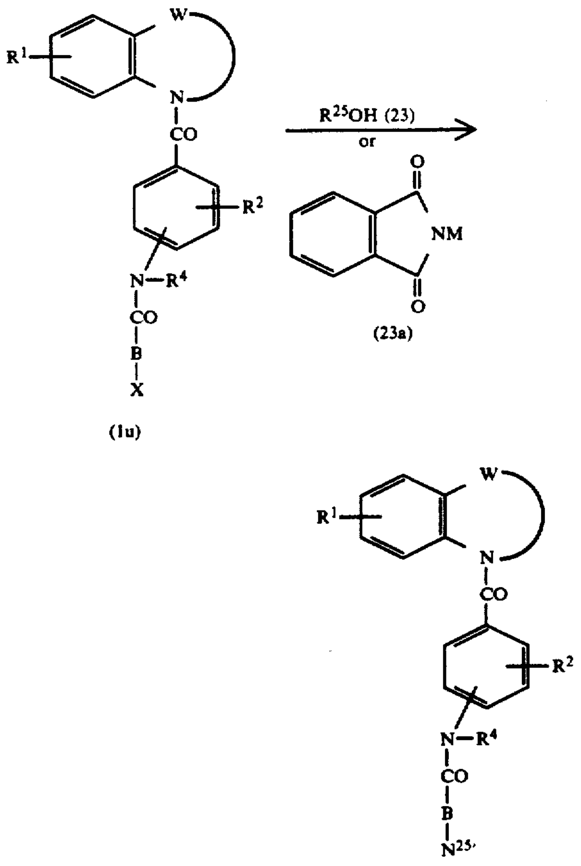

(23a) (1u) (1y)

wherein $R^1$, $R^2$, $R^4$, W, B, M, and X are as defined above, and $R^{25}$ is a phenyl which has optionally 1 to 3 substituents selected from a lower alkyl, a lower alkoxy and an amino having optionally a lower alkanoyl substituent, or naphthyl, and $R^{25'}$ is a phenoxy which has optionally 1 to 3 substituents selected from a lower alkyl, a lower alkoxy and an amino having optionally a lower alkanoyl substituent, naphthyloxy or phthalimido.

The reaction of the compound (1u) and the compound (23) or (23a) can be carried out under the same conditions as in the reaction of the compound (7) and the compound (8) in the above Reaction Scheme-4.

The compound (1y) wherein $R^{25'}$ is phthalimido can be converted into the compound (1y) wherein $R^{25'}$ is amino under the same conditions as in the reaction of converting the compound (1j) into the compound (1k) in the above Reaction Scheme-7.

[Reaction Scheme-15]

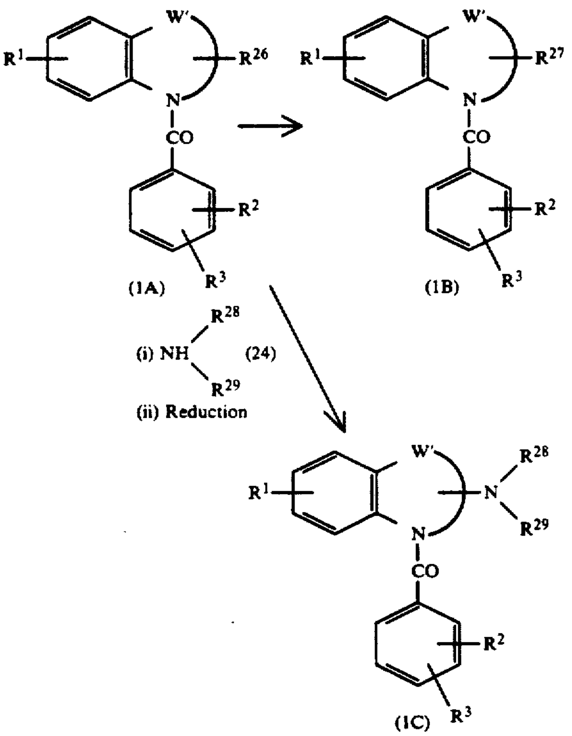

wherein $R^1$, $R^2$, and $R^3$ are as defined above, and $R^{26}$ is oxo, $R^{27}$ is hydroxy, and W' is the same as W, provided that the substituents on the group $-(CH_2)_p-$ or $-CH{=}CH-(CH_2)_q-$ are 0 to 2, and $R^{28}$ and $R^{29}$ are the same or different and are each hydrogen atom, a lower alkenyl, a cycloalkyl, an oxiranyl-substituted lower alkyl, a lower alkyl having 1 to 2 substituents selected from a lower alkoxy, hydroxy and an amino having optionally a lower alkyl substituent, a phenyl-lower alkyl, a pyridyl-lower alkyl, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperidinyl which has optionally a phenyl-lower alkyl substituent, an aminocarbonyl-lower alkyl having optionally a lower alkyl substituent, or a lower alkyl, or $R^{28}$ and $R^{29}$ may bind together with the nitrogen atom to which they bond to form a 5- or 6-membered saturated heterocyclic group with or without being intervened with nitrogen or oxygen atom, which heterocyclic ring may optionally have a substituent selected from a lower alkyl, a phenyl-lower alkyl, or a lower alkanoyl.

The conversion of the compound (1A) into the compound (1B) is carried out by reduction thereof. The reducing reaction is preferably carried out by using a hydrogenating reducing agent (e.g. lithium aluminum hydride, sodium boro hydride, diborane, etc.). The reducing agent is usually used in an amount of at least one mole, preferably 1 to 15 moles, to 1 mole of the starting compound. The reducing reaction is usually carried out in an appropriate solvent, for example, water, alcohols (e.g. methanol, ethanol, isopropanol, etc.), ethers (e.g. tetrahydrofuran, diethyl ether, diisopropyl ether, diglyme, etc.), or a mixture of these solvents, at a temperature of from about −60° C. to about 150° C., peferably about −30° C. to about 100° C., for about 10 minutes to 15 hours. When lithium aluminum hydride or diborane is used as the reducing agent, it is preferable to use an anhydrous solvent such as tetrahydrofuran, diethyl ether, diisopropyl ether, diglyme, etc.

The reaction of converting the compound (1A) into the compound (1C) is usually carried out in an appropriate solvent or without solvent in the presence or absence of a dehydrating agent. The solvent includes, for example, lower alcohols (e.g. methanol, ethanol, isopropanol, etc.), aromatic hydrocarbons (e.g. benzene, toluene, xylene, etc.), halogenated hydrocarbons (e.g. dichloromethane, dichloroethane, chloroform, carbon tetrachloride, etc.), aprotic polar solents (e.g. dimethylformamide, dimethylacetamide, N-methylpyrrolidone, etc.), or a mixture of these solvents. The dehydrating agent includes, for example, conventional drying agent used for dehydrating solvents (e.g. molecular sieves, etc.), mineral acids (e.g. hydrochloric acid, sulfuric acid, borone trifluoride, etc.), organic acids (e.g. p-toluenesulfonic acid, etc.), and the like. The reaction is usually carried out at a temperature of from room temperature to about 250° C., preferably from about 50° C. to about 200° C., for about 1 to 48 hours. The amount of the compound (24) is not critical, but it is usually used at least in an equivalent amount, preferably equimolar to largely excess to the amount of the compound (1A). The dehydrating agent is preferably used in a largely excess amount in case of the drying agent and in a catalytic amount in case of the acid.

The subsequent reducing reaction can be carried out by various methods, for example by catalytically hydrogenating the compound in an appropriate solvent in the presence of a catalyst. The solvent includes, for example, water, acetic acid, alcohols (e.g. methanol, ethanol, iso-propanol, etc.), hydrocarbons (e.g. hexane, cyclohexane, etc.), ethers (e.g. diethylene glycol dimethyl ether, dioxane, tetrahydrofuran, diethyl ether, etc.), esters (e.g. ethyl acetate, methyl acetate, etc.), aprotic polar solvents (e.g. dimethylformamide, etc-), or a mixture of these solvents. The catalyst includes, for example, palladium, palladium black, palladium-carbon, platinum, platinum oxide, copper chromite, Raney nickel, and the like. The catalyst is usually used in an amount of 0.02 to 1 part by weight to 1 part by weight of the starting compound. The reaction is usually carried out at a temperature of from about −20° C. to about 100° C., peferably about 0° C. to about 70° C., under a hydrogen atmospheric pressure of 1 to 10 atm. for about 0.5 to 20 hours.

Although the reducting reaction can be carried out under the above conditions, it is preferably carried out by using a hydrogenating reducing agent. The hydrogenating reducing agent includes, for example, lithium aluminum hydride, sodium borohydride, diborane, etc., and it is usually used in an amount of at least one mole, preferably 1 to 10 moles, to 1 mole of the compound (1A). The reaction is usually carried out in an appropriate solvent, such as water, lower alcohols (e.g. methanol, ethanol, isopropanol, etc.), ethers (e.g. tetrahydrofuran, diethyl ether, diglyme, etc.), dimethylformamide, or a mixture of these solvents, at a temperature of about −60° C. to about 50° C., preferably about −30° C. to room temperature, for about 10 minutes to about 5 hours. When lithium aluminum hydride or diborane is used as the reducing agent, it is preferable to use an anhydrous solvent such as diethyl ether, tetrahydrofuran, diglyme, etc.

The compound (1C) wherein at least one of $R^{28}$ and $R^{29}$ is hydrogen atom can be converted into the compound (1C) wherein at least one of $R^{28}$ and $R^{29}$ is a lower alkyl by reacting the compound (1C) with the compound (8) or the compound (9) under the same conditions as in the reaction of the compound (7) and the compound (8) or (9) in the above Reaction Scheme-4.

[Reaction Scheme-16]

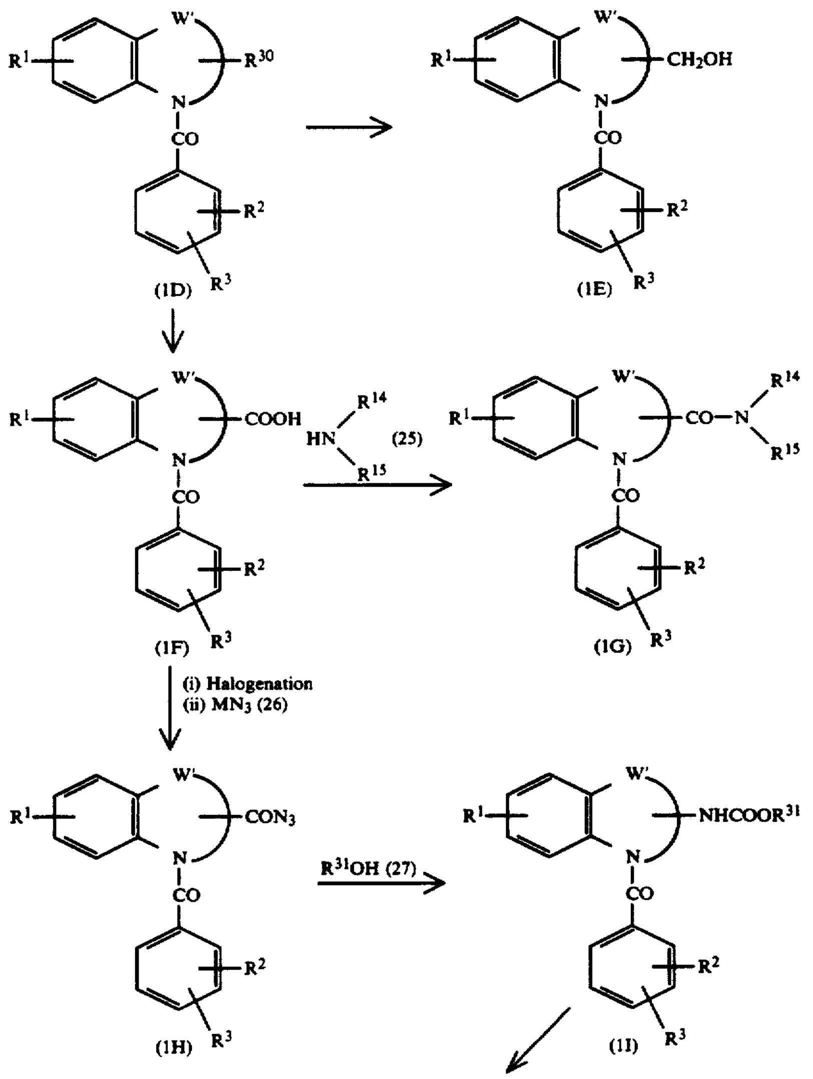

-continued

[Reaction Scheme-16]

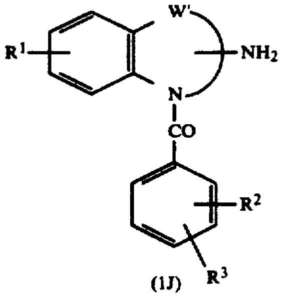

(1J)

wherein $R^1$, $R^2$, $R^3$, $R^{14}$, $R^{15}$, W', and M are as defined above, and $R^{31}$ is a phenyl-lower alkyl, and $R^{30}$ is a lower alkoxycarbonyl.

The reaction of converting the compound (1D) into the compound (1E) can be carried out under the same conditions as in the reaction of converting the compound (1A) into the compound (1B) in the above Reaction Scheme-15.

The reaction of converting the compound (1D) into the compound (1F) can be carried out under the same conditions as in the hydrolysis reaction of the compound (1j) in the above Reaction Scheme-7.

The reaction of the compound (1F) and the compound (25) can be carried out under the same conditions as in the reaction of the compound (2) and the compound (3) in the above Reaction Scheme-1.

The halogenation of the compound (1F) can be carried out under a conventional condition for halogenation of a carboxylic acid. The reaction of the thus-obtained carboxylic acid halide of the compound (1F) with the compound (26) is carried out in an appropriate solvent in the presence or absence of a basic compound. The solvent includes, for example, halogenated hydrocarbons (e.g. methylene chloride, chloroform, etc.), aromatic hydrocarbons (e.g. benzene, toluene, xylene, etc.), ethers (e.g. diethyl ether, tetrahydrofuran, dimethoxyethane, etc.), esters (e.g. methyl acetate, ethyl acetate, etc.), aprotic polar solvents (e.g. N,N-dimethylformamide, dimethylsulfoxide, hexamethylphosphoric triamide, etc.), alcohols (e.g. methanol, ethanol, propanol, butanol, 3-methoxy-1-butanol, ethyl cellosolve, methyl cellosolve, etc.), pyridine, acetone, acetonitrile, water, or a mixture of these solvents. The basic compound includes, for example, organic bases such as triethylamine, trimethylamine, pyridine, dimethylaniline, N-methylmorpholine, DBN, DBU, DABCO, etc., inorganic bases such as potassium carbonate, sodium carbonate, potassium hydroxide, sodium hydroxide -potassium hydride, sodium hydride, silver carbonate, alcoholates (e.g. sodium methylate, sodium ethylate, etc.), and the like. The compound (26) is usually used in an amount of at least 1 mole, preferably 1 to 1.5 mole, to 1 mole of the carboxylic acid halide of the compound (1F). The reaction is usually carried out at a temperature of from $-30°$ C. to about 180° C., preferably from about 0° C. to about 150° C., for about 5 minutes to 30 hours.

The reaction of the compound (1H) and the compound (27) is carried out in an appropriate solvent or without solvent at a temperature of from about 0° C. to about 200° C., preferably from room temperature to about 150° C. The solvent includes the same solvents as used in the above reaction of the carboxylic acid halide of the compound (1F) and the compound (26). The compound (27) is preferably used in an amount largely excess to the the compound (1H). The reaction is usually completed in a reaction time of about 1 to 5 hours.

The reaction of converting the compound (1I) into the compound (1J) can be carried out by reducing the compound. The reducing reaction is usually carried out by catalytically hydrogenating the compound in an appropriate solvent in the presence of a catalyst. The solvent includes, for example, water, acetic acid, alcohols (e.g. methanol, ethanol, isopropanol, etc.), hydrocarbons (e.g. hexane, cyclohexane, etc.), ethers (e.g. dioxane, tetrahydrofuran, diethyl ether, diethylene glycol dimethyl ether, etc.), esters (e.g. ethyl acetate, methyl acetate, etc.), aprotic polar solvents (e.g. N,N-dimethylformamide, etc.), acetic acid, or a mixture of these solvents. The catalyst includes, for example, palladium, palladium black, palladium-carbon, platinum, platinum oxide, copper chromite, Raney nickel, and the like. The catalyst is usually used in an amount of 0.02 to 1 part by weight to 1 part by weight of the starting compound. The reaction is usually carried out at a temperature of from about $-20°$ C. to about 100° C., peferably about 0° C. to about 80° C., under a hydrogen atmospheric pressure of 1 to 10 atm. for about 0.5 to 20 hours.

[Reaction Scheme-17]

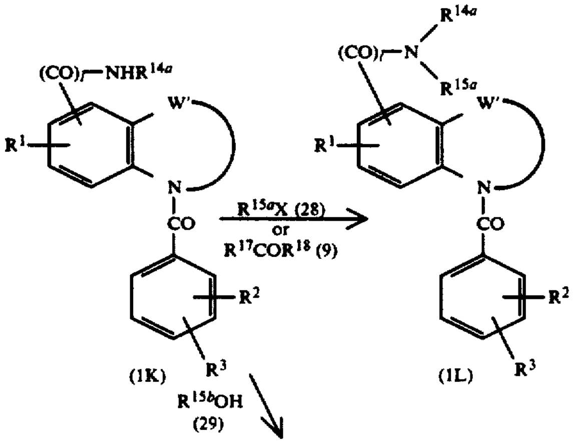

(1K) (1L)

-continued

[Reaction Scheme-17]

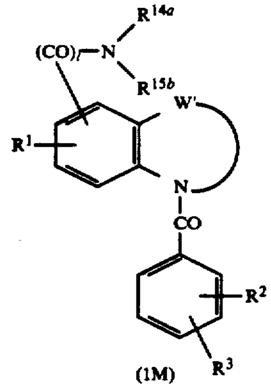

(1M)

wherein $R^1$, $R^2$, $R^3$, W', l, $R^{17}$, $R^{18}$, and X are as defined above, and $R^{14a}$ is hydrogen atom, a lower alkyl, a lower alkanoyl, a lower alkenyl, a cycloalkyl, an oxiranyl-substituted lower alkyl, a lower alkyl having 1 to 2 substituents selected from a lower alkoxy, hydroxy and an amino having optionally a lower alkyl substituent, a phenyl-lower alkyl, a pyridyl-lower alkyl, a lower alkylsulfonyl, benzoyl, a lower alkoxycarbonyl, anilinocarbonyl, an amino-carbonyl having optionally a lower alkyl substituent, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperidinyl having optionally a phenyl-lower alkyl substituent, a halogen-substituted lower alkanoyl, an imiazolyl-substituted lower alkanoyl, an amino-lower alkanoyl having optionally a substituent selected from a lower alkyl and a lower alkoxycarbonyl, an aminocarbonyl-lower alkyl having optionally a lower alkyl substituent, or a phenyl-lower alkoxycarbonyl, $R^{15a}$ is a lower alkyl, a cycloalkyl, an oxiranyl-substituted lower-alkyl, a lower alkyl having 1 to 2 substituents selected from a lower alkoxy, hydroxy and an amino having optionally a lower alkyl substituent, a phenyl-lower alkyl, a pyridyl-lower alkyl, a lower alkylsulfonyl, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperidinyl having optionally a phenyl-lower alkyl substituent, an aminocarbonyl-lower alkyl having optionally a lower alkyl substituent, or a lower alkenyl, and $R^{15b}$ is a lower alkanoyl, a phenyl-lower alkoxycarbonyl, benzoyl, a lower alkoxycarbonyl, a halogen-substituted lower alkanoyl, an imidazolyl-substituted lower alkanoyl, or an amino-lower alkanoyl having optionally a substituent selected from a lower alkyl and a lower alkoxycarbonyl.

The reaction of the compound (1K) and the compound (28) or the compound (9) can be carried out under the same conditions as in the reaction of the compound (7) and the compound (8) or the compound (9) in the above Reaction Scheme-4.

The reaction of the compound (1K) and the compound (29) can be carried out under the same conditions as in the reaction of the compound (2)-and the compound (3) in the above Reaction Scheme-1. The compound (1M) can also be obtained by reacting the compound (1K) with a compound of the formula $(R^{15b})_2O$ (wherein $R^{15b}$ is as defined above). The reaction can be carried out under the same conditions as in the reaction of the compound (1p) and the compound of the formula: $(R^{7b})_2O$ as described hereinbefore.

The compound (1M) wherein $R^{15b}$ is formyl can also be prepared by reacting the compound (1K) with a formate of the formula: $HCOOR^{82}$ ($R^{82}$ is a lower alkyl). The reaction is usually carried out in the solvent as used in the reaction of the compound (7) and the compound (8) in the above Reaction Scheme-4 or without solvent, at a temperature of about 0° C. to about 200° C., preferably about 0° C. to about 170° C., for about 30 minutes to about 30 hours. The formate is preferably used in a largely excess amount to the compound (1K).

[Reaction Scheme-18]

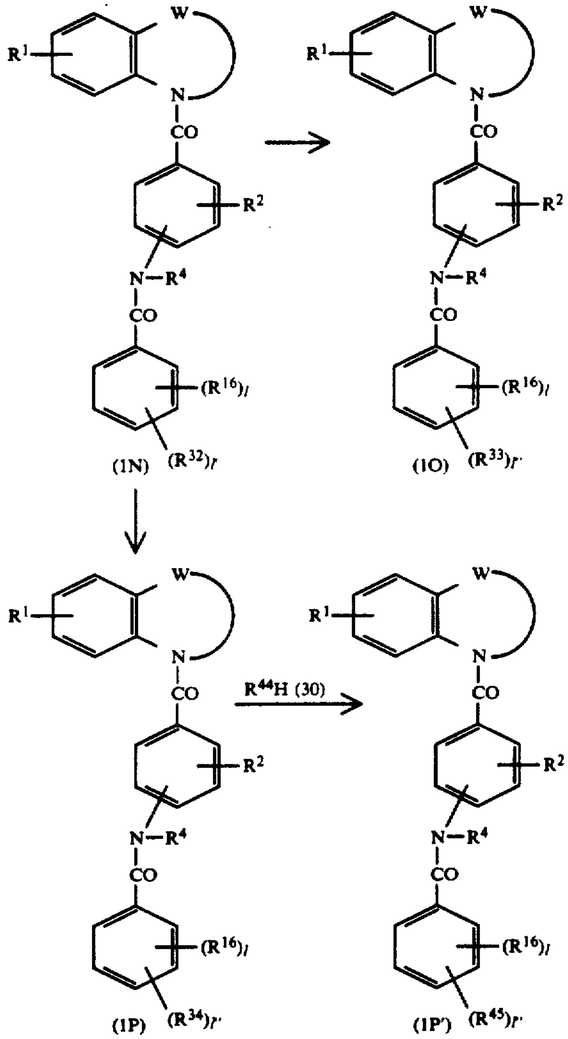

(1N) (1O) (1P) (1P')

wherein $R^1$, $R^2$, $R^4$, $R^{16}$, W, l, l' and l'' are as defined above, and $R^{32}$ is a lower alkoxycarbonyl-substituted lower alkoxy, $R^{33}$ is a carbamoyl-substituted lower alkoxy, $R^{34}$ is a carboxy-substituted lower alkoxy, $R^{44}$ is an amino having optionally a lower alkyl substituent, and $R^{45}$ is an aminocarbonyl-lower alkoxy having optionally a lower alkyl substituent.

The conversion of the compound (1N) into the compound (1O) can be carried out by reacting the compound with aqueous ammonia in an appropriate solvent in an autoclave. The solvent includes the same solvents as used in the reaction of the carboxylic acid halide and the amine (2) in the above Reaction Scheme-1. The aqueous ammonia is used in a largely excess amount to the compound (1N). The reaction proceeds advantageously by adding an ammonium halide (e.g. ammonium chloride, etc.) to the reaction system. The reaction is usually carried out at a temperature of from room temperature to about 200° C., preferably from room temperature to about 150° C., for about 1 to 10 hours.

The reaction of converting the compound (1N) into the compound (1P) can be carried out under the same conditions as in the hydrolysis of the compound (1j) in the above Reaction Scheme-7.

The reaction of the compound (1P) and the compound (30) can be carried out under the same conditions as in the reaction of the compound (2) and the compound (3) in the above Reaction Scheme-1.

[Reaction Scheme-19]

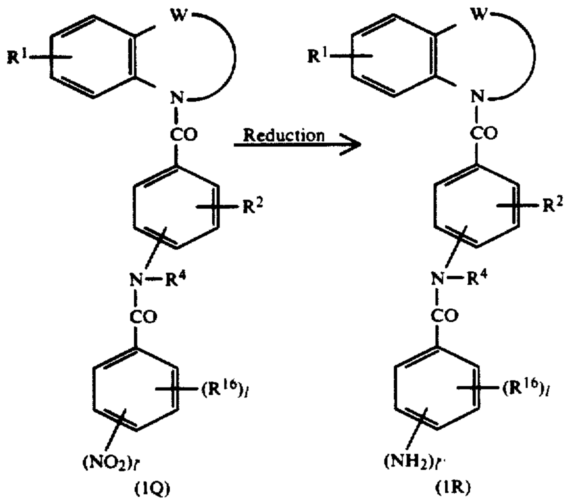

wherein $R^1$, $R^2$, $R^4$, $R^{16}$, W, l, l' and l'' are as defined above.

The reducing reaction in the above reaction scheme is usually carried out, for example, (i) with a reducing catalyst in an appropriate solvent or (ii) with a reducing agent such as a mixture of a metal or metal salt with an acid, or a mixture of a metal or metal salt with an alkali metal hydroxide, a sulfide or an ammonium salt in an appropriate inert solvent.

In case of using a reducing catalyst, the solvent includes, for example, water, acetic acid, alcohols (e.g. methanol, ethanol, isopropanol, etc.), hydrocarbons (e.g. hexane, cyclohexane, etc.), ethers (e.g. dioxane, tetrahydrofuran, diethyl ether, diethylene glycol dimethyl ether, etc.), esters (e.g. ethyl acetate, methyl acetate, etc.), aprotic polar solvents (e.g. N,N-dimethylformamide, etc.), or a mixture of these solvents. The catalyst includes, for example, palladium, palladium black, palladium-carbon, platinum, platinum oxide, copper chromite, Raney nickel, and the like. The catalyst is usually used in an amount of 0.02 to 1 part by weight to 1 part by weight of the starting compound. The reaction is usually carried out at a temperature of from about −20° C. to about 150° C., peferably about 0° C. to about 100° C., under a hydrogen pressure of 1 to 10 atm. for about 0.5 to 10 hours. In the reaction, an acid such as hydrochloric acid may optionally added to the reaction system.

In case of the above method (ii), the reducing agent includes a mixture of iron, zinc, tin or stannous chloride and a mineral acid (e.g. hydrochloric acid, sulfuric acid, etc.), or a mixture of iron, ferrous sulfate, zinc or tin and an alkali metal hydroxide (e.g. sodium hydroxide, etc.), a sulfide (e.g. ammonium sulfide, etc.), aqueous ammonia, or an ammonium salt (e.g. ammonium chloride, etc.). The inert solvent includes, for example water, acetic acid, methanol, ethanol, dioxane, and the like. The reducing reaction conditions are determined depending on the kinds of the reducting agent, but in case of using a reducing agent comprising stannous chloride and hydrochloric acid, for example, it is preferably carried out at a temperature of about 0° C. to room temperature for about 0.5 to 10 hours. The reducing agent is usually used in an amount of at least one mole, preferably 1 to 5 moles, to 1 mole of the starting compound.

[Reaction Scheme-20]

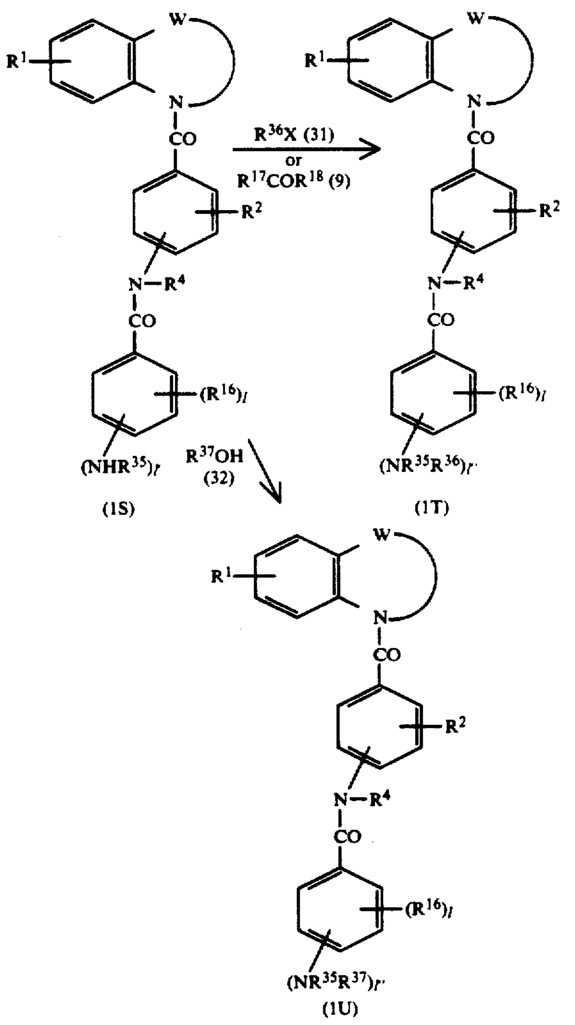

wherein $R^1$, $R^2$, $R^4$, $R^{16}$, $R^{17}$, $R^{18}$, l, l', l'' and W are as defined above, and $R^{36}$ is a lower alkyl, $R^{37}$ is a lower alkanoyl, and $R^{35}$ is hydrogen atom, a lower alkyl or a lower alkanoyl.

The reaction of the compound (1S) and the compound (31) or the compound (9) can be carried out under the same conditions as in the reaction of the compound (7) and the compound (8) or the compound (9) in the above Reaction Scheme-4.

The reaction of the compound (1S) and the compound (32) can be carried out under the same conditions as in the reaction of the compound (2) and the compound (3) in the above Reaction Scheme-1. Besides, the compound (1U) can also be obtained by reacting the compound (1S) with a compound of the formula: $(R^{37})_2O$ ($R^{37}$ is as defined above). The reaction is carried out under the same conditions as in the above reaction of the compound (1p) and a compound of the formula: $(R^{7b})_2O$.

The compound (1) wherein $R^8$ is a phenyl-lower alkoxycarbonyl can be converted into the compound (1) wherein $R^8$ is hydrogen atom in the same manner as in the reaction of converting the compound (1I) into the compound (1J) in the above Reaction Scheme-16.

Other derivatives of the starting compound (2) can be prepared, for example, by the process as shown in the following reaction scheme.

[Reaction Scheme-21]

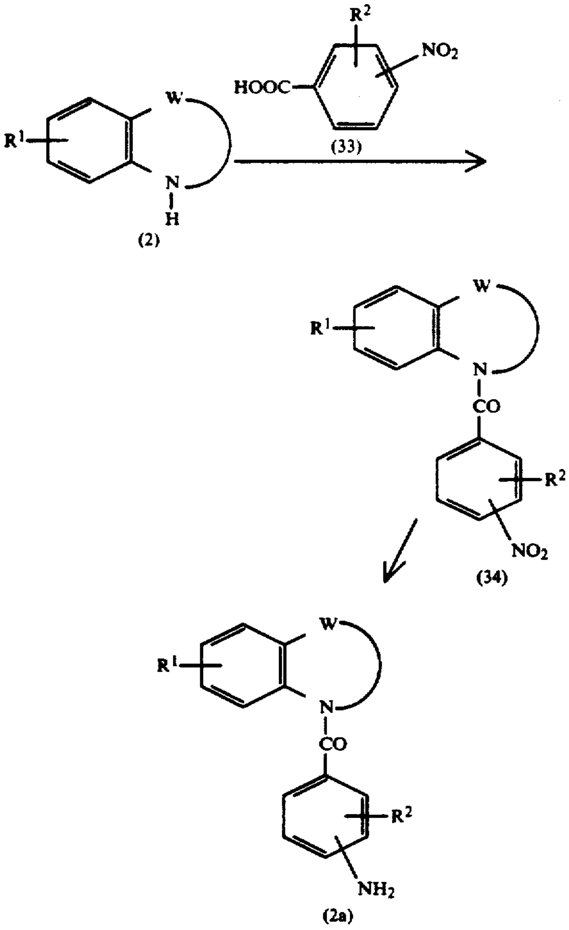

wherein $R^1$, $R^2$, and W are as defined above.

The reaction of the compound (2) and the compound (33) can be carried out under the same conditions as in the reaction of the compound (2) and the compound (3) in the above Reaction Scheme-1.

The reaction of converting the compound (34) into the compound (2a) can be carried out under the same conditions as in the reducing reaction in the above Reaction Scheme-19.

The starting compound (5) can be prepared, for example, by the process of the following reaction scheme.

[Reaction Scheme-22]

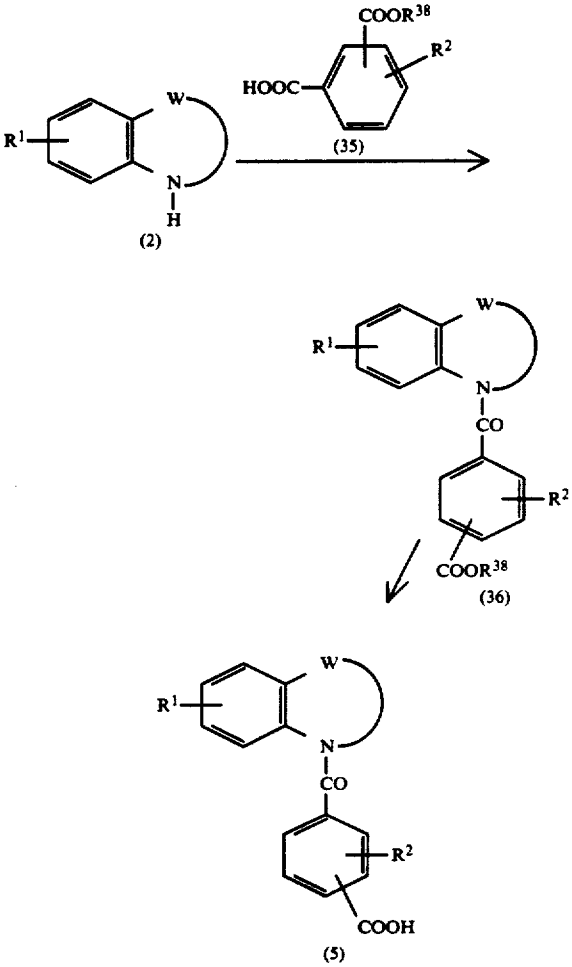

wherein $R^1$, $R^2$, and W are as defined above, and $R^{38}$ is a lower alkyl.

The reaction of the compound (2) and the compound (35) can be carried out under the same conditions as in the reaction of the compound (2) and the compound (3) in the above Reaction Scheme-1.

The reaction of converting the compound (36) into the compound (5) can be carried out under the same conditions as in the hydrolysis reaction in the above Reaction Scheme-7.

[Reaction Scheme-23]

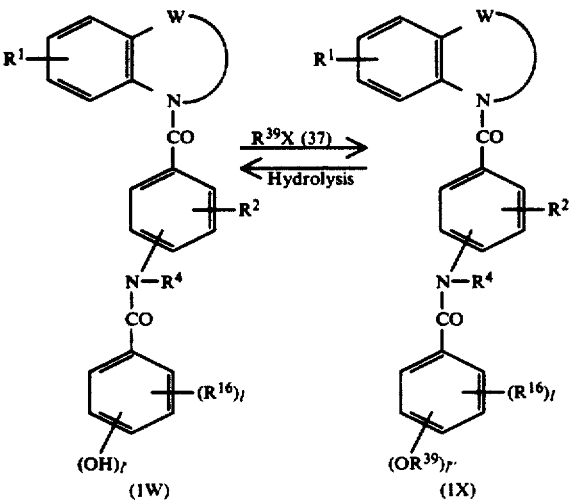

wherein $R^1$, $R^2$, $R^4$, $R^{16}$, l, l', l'', X, and W are as defined above, and $R^{39}$ is a lower alkanoyl.

The reaction of the compound (1W) and the compound (37) can be carried out under the same conditions as in the reaction of the compound (1n) and the compound (18) in the above Reaction Scheme-9.

The hydrolysis reaction of the compound (1X) can be carried out under the same conditions as in the hydrolysis of the compound (1j) in the above Reaction Scheme-7.

[Reaction Scheme-24]

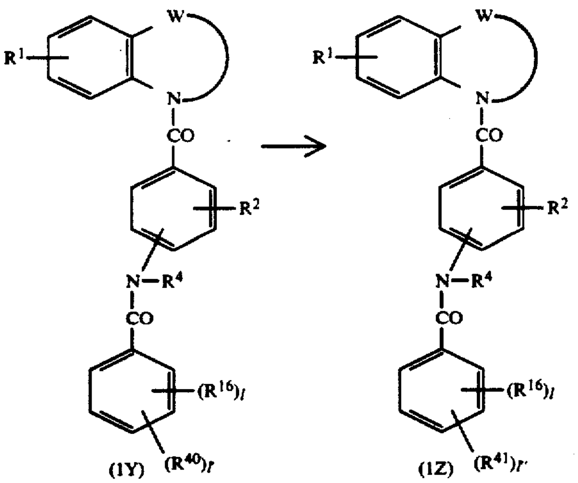

wherein $R^1$, $R^2$, $R^4$, $R^{16}$, l, l', l'', and W are as defined above, $R^{40}$ is a lower alkanoyl, and $R^{41}$ is a hydroxy-substituted lower alkyl.

The reaction of converting the compound (1Y) into the compound (1Z) can be carried out under the same conditions as in the reaction of converting the compound (1A) into the compound (1B) in the above Reaction Scheme-15.

[Reaction Scheme-25]

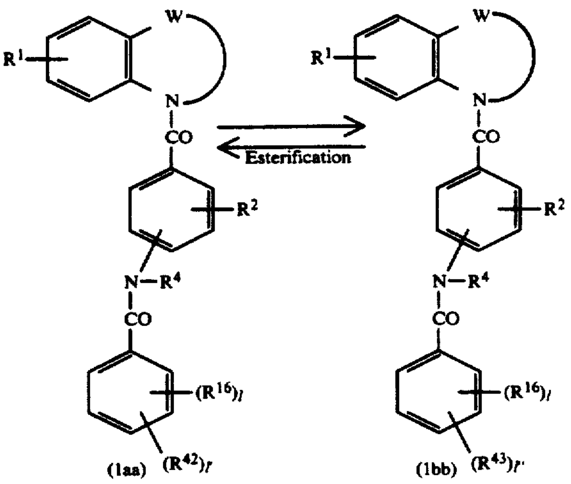

wherein $R^1$, $R^2$, $R^4$, $R^{16}$, l, l', l'', and W are as defined above, $R^{42}$ is a lower alkoxycarbonyl and $R^{43}$ is carboxyl.

The reaction of converting the compound (1aa) into the compound (1bb) can be carried out under the same conditions as in the hydrolysis of the compound (1j) in the above Reaction Scheme-7.

The esterification reaction of the compound (1bb) can be carried out under the same conditions as in the esterification of the compound (1w) in the above Reaction Scheme-13.

[Reaction Scheme-26]

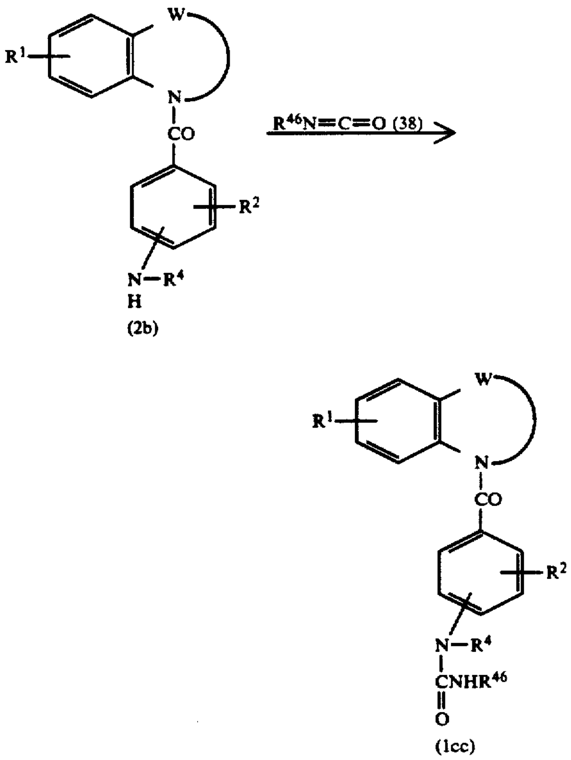

wherein $R^1$, $R^2$, $R^4$, and W are as defined above, and $R^{46}$ is a phenyl having optionally a lower alkyl substituent.

The reaction of the compound (2b) and the compound (38) is usually carried out in an appropriate solvent or without solvent in the presence or absence, preferably in the absence, of a basic compound. The solvent and basic compound are the same as those used in the reaction of the carboxylic acid halide and the amine (2) in the above Reaction Scheme-1.

The compound (38) is usually used in an amount of about 1 to 5 moles, preferably about 1 to 3 moles, to 1 mole of the compound (2b). The reaction is usually carried out at a temperature of from about 0° C. to about 200° C., preferably from room temperature to about 150° C., for about 5 minutes to about 30 hours. In the reaction, a boron compound (e.g. boron trifluoride etherate, etc.) may be added to the reaction system.

[Reaction Scheme-27]

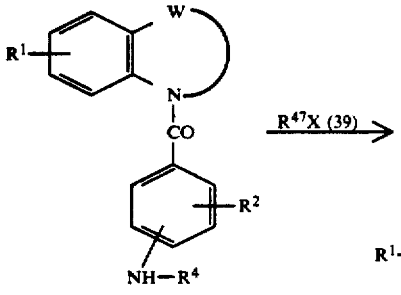

(2b)

-continued

[Reaction Scheme-27]

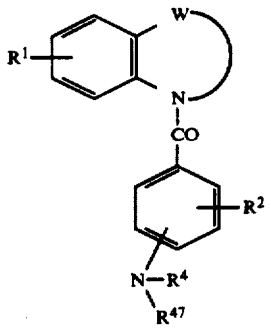

(1dd)

wherein $R^1$, $R^2$, $R^4$, W, and X are as defined above, and $R^{47}$ is a phenylsulfonyl which has optionally a substituent selected from a halogen atom and a lower alkyl on the phenyl ring, or quinolylsulfonyl.

The reaction of the compound (2b) and the compound (39) can be carried out under the same conditions as in the reaction of the compound (7) and the compound (8) in the above Reaction Scheme-4.

[Reaction Scheme-28]

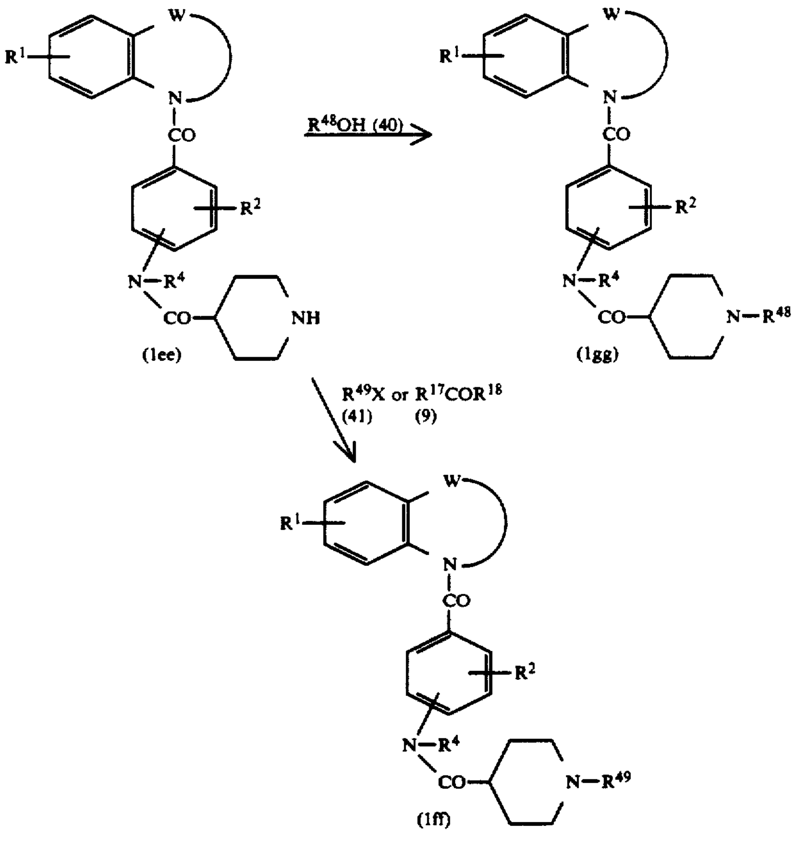

wherein $R^1$, $R^2$, $R^4$, W, $R^{17}$, $R^{18}$, and X are as defined above, $R^{48}$ is a phenyl-lower alkoxycarbonyl, a lower alkanoyl, an amino-lower alkanoyl having optionally a lower alkyl substituent, and $R^{49}$ is a lower alkyl or a carbamoyl-lower alkyl.

The reaction of the compound (1ee) and the compound (40) can be carried out under the same conditions as in the reaction of the compound (2) and the compound (3) in the above Reaction Scheme-1.

The reaction of the compound (1ee) and the compound (41) or the compound (9) can be carried out under the same conditions as in the reaction of the compound (7) and the compound (8) or the compound (9)in the above Reaction Scheme-4, provided that in the reaction product (1ff) produced by the reaction of the compound (1ee) and the compound (9), the group $R^{49}$ is a lower alkyl.

[Reaction Scheme-29]

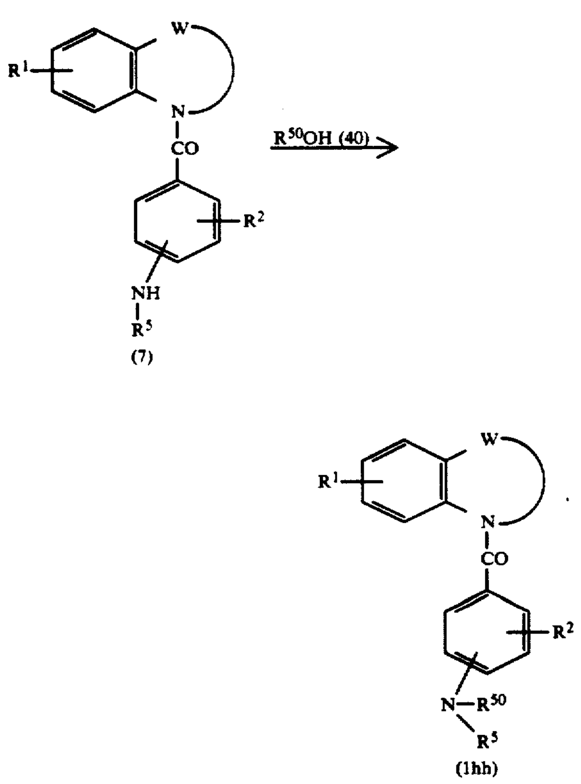

wherein $R^1$, $R^2$, $R^5$, and W are as defined above, and $R^{50}$ is a benzoyl having optionally a halogen substituent on the phenyl ring.

The reaction of the compound (7) and the compound (42) can be carried out under the same conditions as in the reaction of the compound (2) and the compound (3) in the above Reaction Scheme-1.

[Reaction Scheme-30]

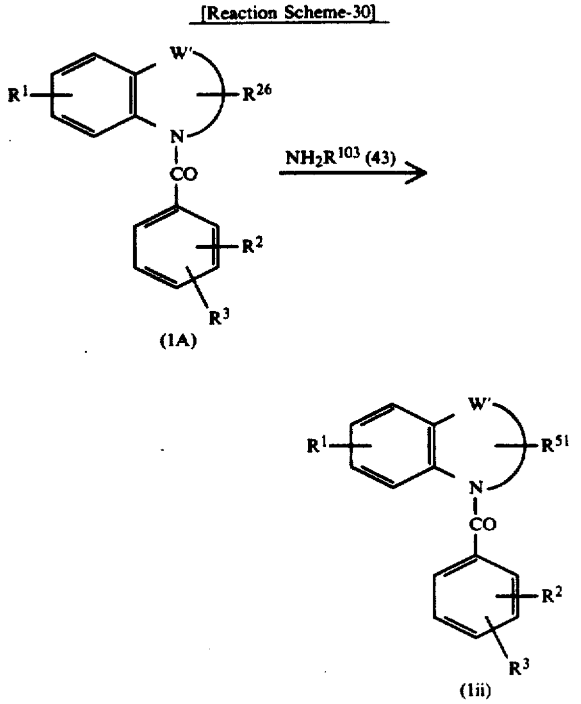

wherein $R^1$, W', $R^{26}$, $R^2$, and $R^3$ are as defined above, $R^{103}$ is hydroxy or sulfoxy, and $R^{51}$ is hydroxyimino or sulfoxy-imino.

The reaction of the compound (1A) and the compound (43) is usually carried out in an appropriate inert solvent in the presence or absence of a basic compound. The basic compound includes, for example, inorganic basic compounds such as sodium hydroxide, potassium hydroxide, sodium carbonate, potassium carbonate, etc., and organic basic compounds such as piperidine, pyridine, triethylamine, 1,5-diazabicyclo[4.3.0]nonene-5 (DBN), 1,8-diazabicyclo-[5.4.0]undecene-7 (DBU), 1,4-diazabicyclo[2.2.2]octane (DABCO), etc. The inert solvent includes, for example, lower alcohols (e.g. methanol, ethanol, isopropanol, etc.), ethers (e.g. dioxane, tetrahydrofuran, diethyl ether, ethylene glycol monomethyl ether, etc.), aromatic hydrocarbons (e.g. benzene, toluene, xylene, etc.), halogenated hydrocarbons (e.g. dichloromethane, dichloroethane, chloroform, carbon tetrachloride, etc.), pyridine, dimethylformamide, dimethylsulfoxide, hexamethylphosphoric triamide, etc., or a mixture of these solvents. The compound (43) is usually used at least in equivalent amount, preferably 1 to 5 moles, to 1 mole of the compound (1A). The reaction is usually carried out at a temperature of from room temperature to about 200° C., preferably from about 50° C. to 150° C., for about 1 to 10 hours.

[Reaction Scheme-31]

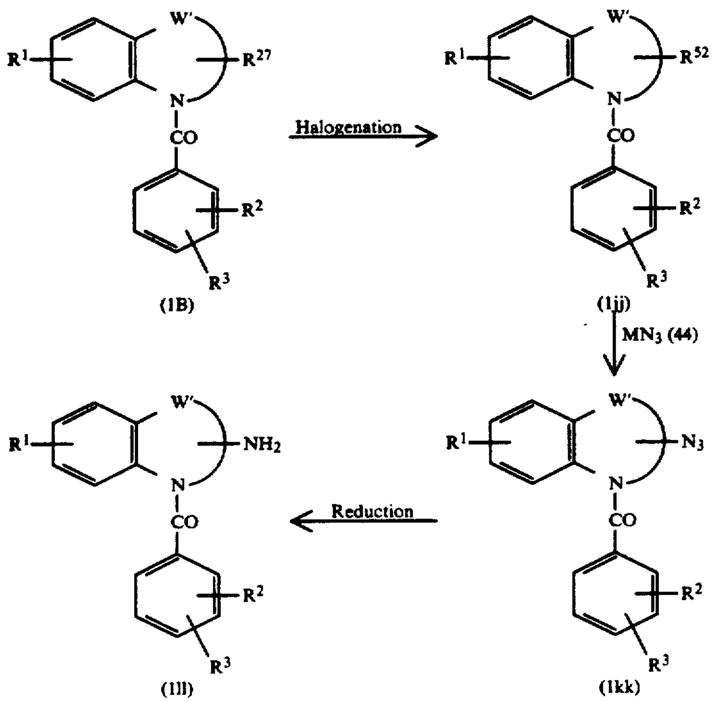

wherein $R^1$, W', $R^{27}$, $R^2$, M, and $R^3$ are as defined above, and $R^{52}$ is a halogen atom.

The halogenation of the compound (1B) is usually carried out in an appropriate solvent or without solvent by reacting the compound (1B) with a halogenating agent.

The halogenating agent includes mineral acids (e.g. hydrochloric acid, hydrobromic acid, etc.), N,N-diethyl-1,2,2-trichlorovinylamide, phosphorus pentachloride, phosphorus pentabromide, phosphorus oxychloride, thionyl chloride, methanesulfonyl chloride, or a combination of a phenyl-lower alkyl halide (e.g. p-toluenesulfonyl chloride, etc.) and a basic compound. The basic compound includes the same compounds as used in the reaction of the compound (1A) and the compound (43) in the above Reaction Scheme-30. The solvent includes, for example, ethers (e.g. dioxane, tetrahydrofuran, etc.), halogenated hydrocarbons (e.g. chloroform, methylene chloride, carbon tetrachloride, etc.), and the like. The amount of the halogenating agent may vary depending on the kinds of the halogenating agents, and in case of a combination of a phenyl-lower alkyl halide (e.g. p-toluenesulfonyl chloride, etc.) and a basic compound; it is used in an amount of at least 1 mole, preferably 1 to 2 moles, to 1 mole of the compound (1B), and in case of other halogenating agents, it is used at least in an equimolar amount, usually in a largely excess amount, to the compound (1B). The reaction is usually carried out at a temperature of from room temperature to about 150° C., preferably from room temperature to about 80° C., for about 1 to 80 hours.

The reaction of the compound (1jj) and the compound (44) can be carried out under the same conditions as in the reaction of the compound (7) and the compound (8) in the above Reaction Scheme-4.

The reducing reaction of the compound (1kk) can be carried out under the same conditions as in the reducing reaction using a reducing catalyst for converting the compound (1A) into the compound (1C) in the above Reaction Scheme-15.

[Reaction Scheme-32A]

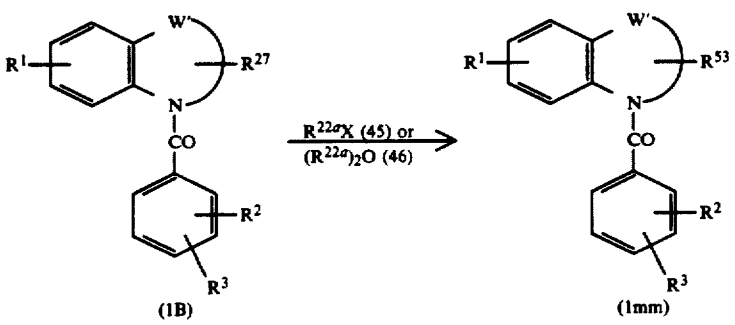

-continued

[Reaction Scheme-32A]

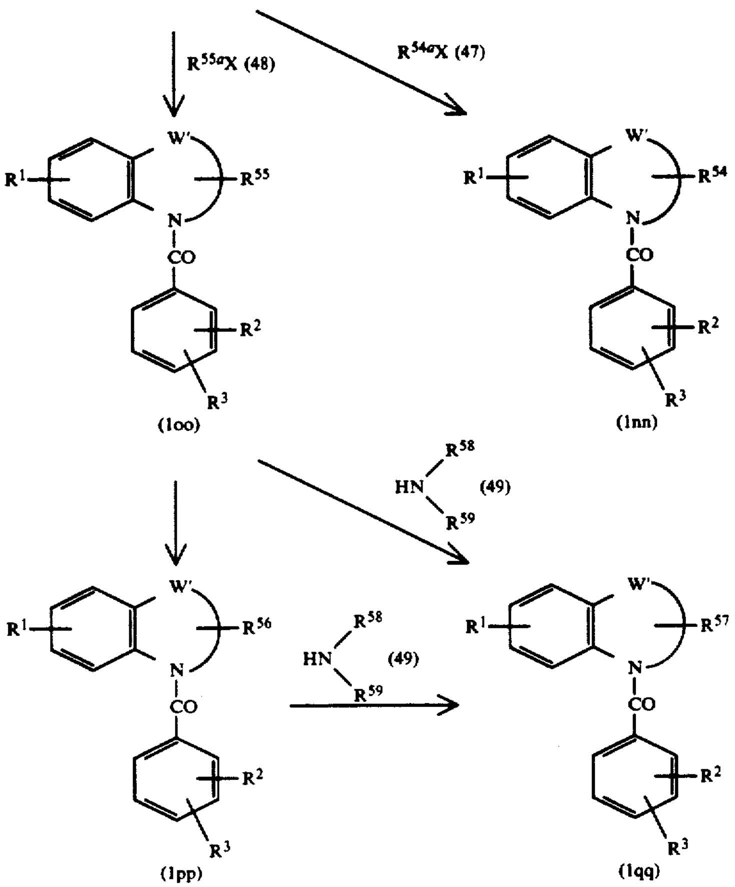

wherein $R^1$, W', $R^2$, $R^3$, $R^{27}$, X, and A are as defined above, $R^{53}$ is a lower alkanoyloxy having optionally a halogen substituent, $R^{54}$ is a lower alkoxy, an amino-lower alkanoyloxy having optionally a lower alkyl substituent, or a group of the formula:

$$-O-A-CON\begin{matrix}R^{82}\\R^{83}\end{matrix}$$

(A, $R^{82}$ and $R^{83}$ are as defined above), $R^{55}$ is a lower alkoxycaronyl-substituted lower alkoxy, $R^{56}$ is a carboxy-substituted lower alkoxy, $R^{57}$ is an aminocarbonyl-lower alkoxy having optionally a lower alkyl substituent, $R^{54a}$ is a lower alkyl, an amino-lower alkanoyl having optionally a lower alkyl substituent, or a group of the formula:

$$-A-CON\begin{matrix}R^{82}\\R^{83}\end{matrix}$$

(A, $R^{82}$ and $R^{83}$ are as defined above), $R^{55a}$ is a lower alkoxy-carbonyl-substituted lower alkyl, $R^{58}$ and $R^{59}$ are the same or different and are each hydrogen atom or a lower alkyl, and $R^{22a}$ is a lower alkanoyl having optionally a halogen substituent.

[Reaction Scheme-32B]

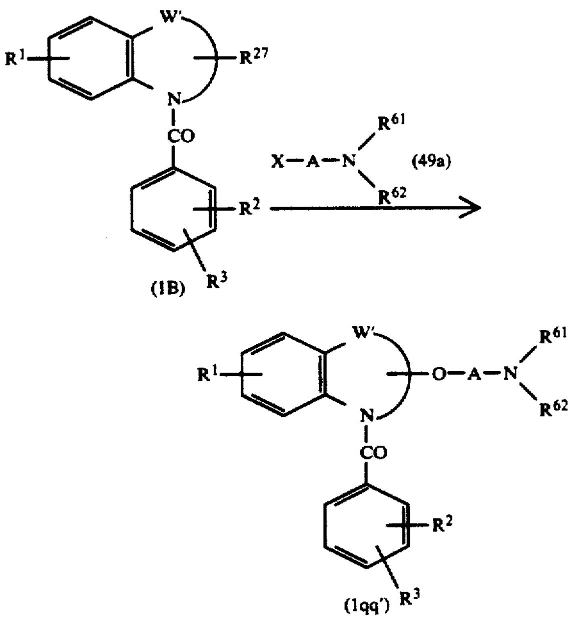

wherein $R^1$, W', $R^2$, $R^3$, X, $R^{27}$, and A are as defined above, and $R^{61}$ and $R^{62}$ are the same or different and are each hydrogen atom, a lower alkyl or a lower alkanoyl.

The reaction of the compound (1B) and the compound (45) or the compound (46) in the Reaction Scheme-32A can be carried out under the same conditions as in the reaction of the compound (1n) and the compound (18) in the above Reaction Scheme-9.

The reaction of the compound (1B) and the compound (47) and the reaction of the compound (1B) and the compound (48) can be carried out under the same conditions as in the reaction of the compound (1n) and the compound (18) in the above Reaction Scheme-9.

The reaction of converting the compound (1oo) into the compound (1pp) can be carried out under the same conditions as in the hydrolysis reaction of the compound (1j) in the above Reaction Scheme-7.

The reaction of the compound (1oo) and the compound (49) and the reaction of the compound (1pp) and the compound (49) can be carried out under the same conditions as in the reaction of the compound (2) and the compound (3) in the above Reaction Scheme-1.

The reaction of the compound (1B) and the compound (49a) in the Reaction Scheme-32B can be carried out under the same conditions as in the reaction of the compound (1n) and the compound (18) in the above Reaction Scheme-9.

[Reaction Scheme-33]

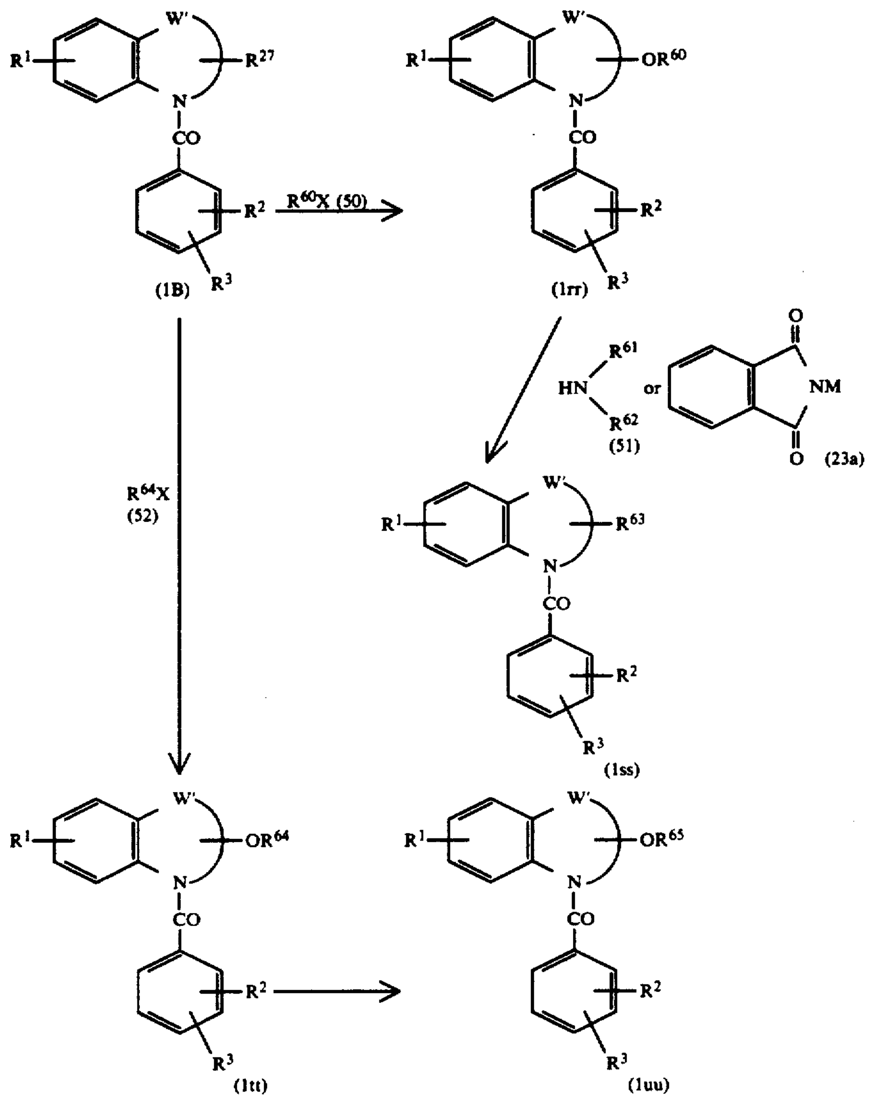

wherein $R^1$, W', $R^2$, $R^3$, $R^{27}$, $R^{61}$, $R^{62}$, M, and X are as defined above, $R^{60}$ is a halogen-substituted lower alkyl, $R^{64}$ is a phthalimido-substituted lower alkyl, $R^{63}$ is an amino-lower alkoxy having optionally a substituent selected from a lower alkyl and a lower alkanoyl, or a phthalimido-substituted lower alkoxy, and $R^{65}$ is an amino-substituted lower alkyl.

The reaction of the compound (1B) and the compound (50) and the reaction of the compound (1B) and the compound (52) can be carried out under the same conditions as in the reaction of the compound (1n) and the compound (18) in the above Reaction Scheme-9.

The reaction of the compound (1rr) and the compound (51) or the compound (23a) can be carried out under the same conditions as in the reaction of the compound (1g) and the compound (14) in the above Reaction Scheme-6.

The reaction of converting the compound (1tt) into the compound (1uu) can be carried out under the same conditions as in the reaction of converting the compound (1j) into the compound (1k) in the above Reaction Scheme-7.

[Reaction Scheme-34]

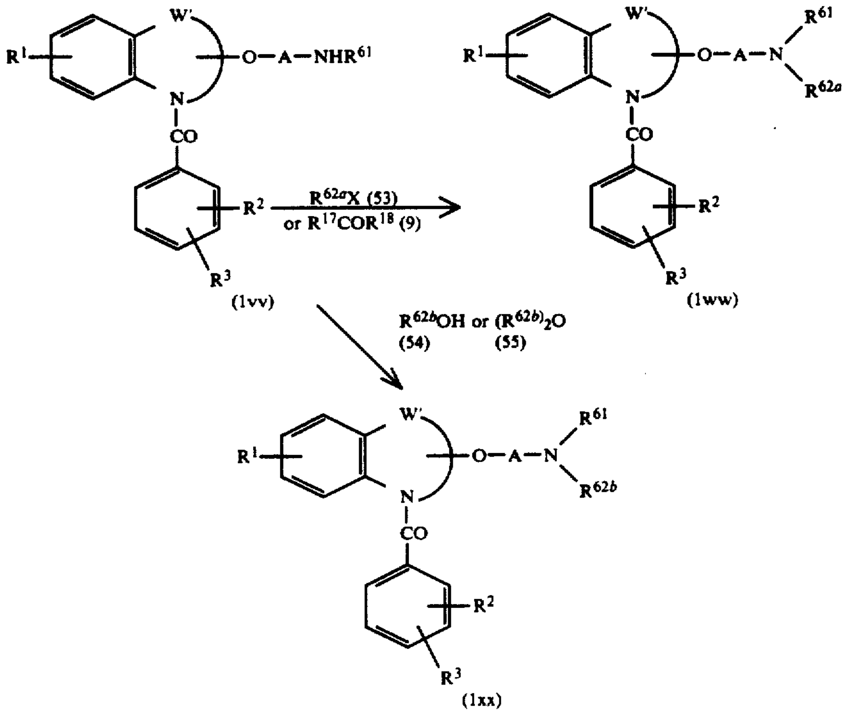

wherein $R^1$, $R^2$, $R^3$, $R^{61}$, W', A, $R^{17}$, $R^{18}$, and X are as defined above, $R^{62a}$ is a lower alkyl, and $R^{62b}$ is a lower alkanoyl.

The reaction of the compound (1vv) and the compound (53) or the compound (9) can be carried out under the same conditions as in the reaction of the compound (7) and the compound (8) or the compound (9) in the above Reaction Scheme-4.

The reaction of the compound (1vv) and the compound (54) can be carried out under the same conditions as in the reaction of the compound (2) and the compound (3) in the above Reaction Scheme-1.

The reaction of the compound (1vv) and the compound (55) can be carried out under the same conditions as in the reaction of the compound (1p) and the compound of the formula: $(R^{7b})_2O$ in the above Reaction Scheme-10.

[Reaction Scheme-35]

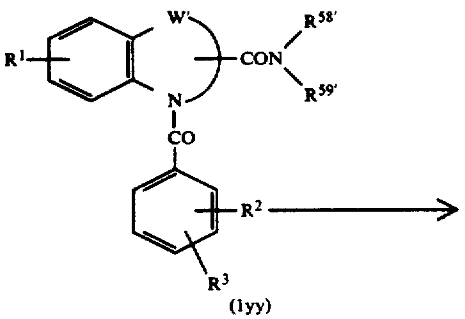

-continued

[Reaction Scheme-35]

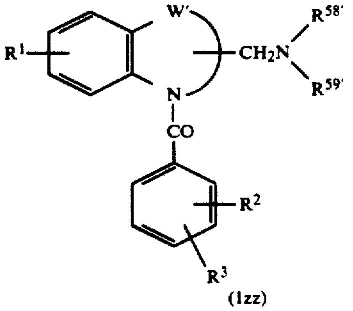

wherein $R^1$, $R^2$, $R^3$, and W' are as defined above, $R^{58'}$ and $R^{59'}$ are the same or different and are each hydrogen atom, a lower alkyl, or a lower alkanoyl.

The reaction of converting the compound (1yy) into the compound (1zz) is usually carried out by reducing the compound (1yy).

The reducting reaction is preferably carried out by using a hydrogenating reducing agent. The hydrogenating reducing agent includes, for example, lithium aluminum hydride, sodium boro hydride, diborane, etc. The reducing agent is usually used in an amount of at least one mole, preferably 1 to 15 moles, to 1 mole of the starting compound. The reducing reaction is usually carried out in an appropriate solvent, such as water, lower alcohols (e.g. methanol, ethanol, isopropanol, etc.), ethers (e.g. tetrahydrofuran, diethyl ether, diisopropyl ether, diglyme, etc.), or a mixture of these soslvents, at a temperature of about −60° C. to about 150° C., preferably about −30° C. to 100° C., for about 10 minutes to about 5 hours. When lithium aluminum hydride or diborane is used as the reducing agent, it is preferable to use an anhydrous solvent such as diethyl ether, tetrahydrofuran, diglyme, etc.

[Reaction Scheme-36]

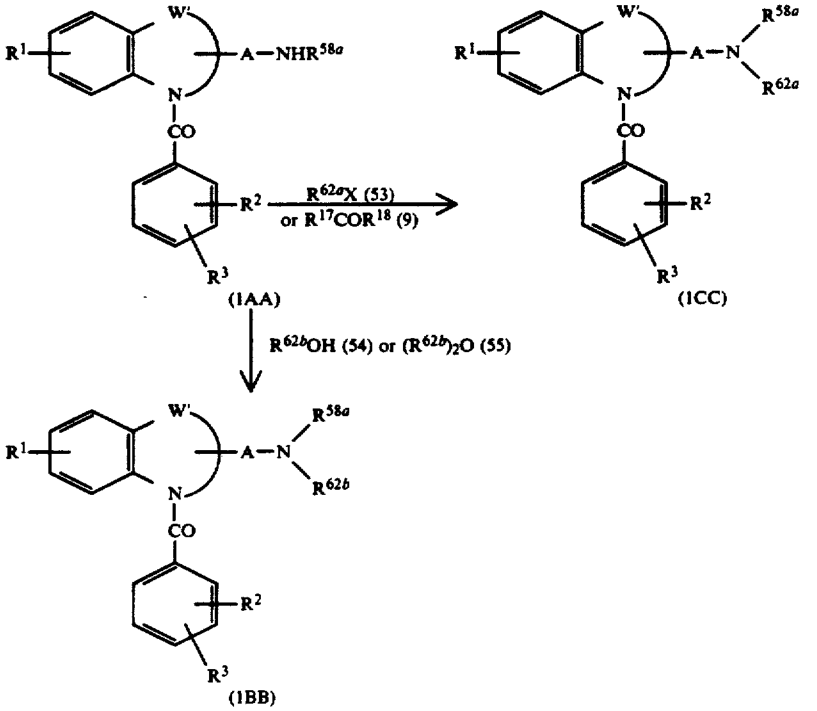

wherein $R^1$, W', $R^2$, $R^3$, $R^{62a}$, $R^{62b}$, X, $R^{17}$, $R^{18}$, and A are as defined above, $R^{58a}$ is hydrogen atom, a lower alkyl or a lower alkanoyl.

The reaction of the compound (1AA) and the compound (53) or the compound (9) can be carried out under the same conditions as in the reaction of the compound (7) and the compound (8) or the compound (9) in the above Reaction Scheme-4.

The reaction of the compound (1AA) and the compound (54) can be carried out under the same conditions as in the reaction of the compound (2) and the compound (3) in the above Reaction Scheme-1.

The reaction of the compound (1AA) and the compound (55) can be carried out under the same conditions as in the reaction of the compound (1p) and the compound of the formula: $(R^7b)_2O$ in the above Reaction Scheme-10.

The compound (1BB) wherein $R^{62b}$ is formyl can also be prepared by reacting the compound (1AA) with a formate of the formula: $HCOOR^{82}$ under the same conditions as in the reaction of the compound (1K) and the compound of the formula: $HCOOR^{82}$ as described hereinbefore.

The compounds of the formula (1) wherein W is sulfur atom or sulfinyl, or $R^{82}$ and $R^{83}$ bind together with the nitrogen atom to which they bond to form thiomorpholino or 1-oxo-thiomorpholino can be converted into the corresponding compounds of the formula (1) wherein W is sulfinyl or sulfonyl, or $R^{82}$ and $R^{83}$ bind together with the nitrogen atom to which they bond to form 1-oxo-thiomorpholino or 1,1-dioxo-thiomorpholino, respectively, by oxidation thereof.

The oxidation reaction is carried out in an appropriate solvent in the presence of an oxidizing agent. The solvent includes, for example, water, organic acids (e.g. formic acid, acetic acid, trifluoroacetic acid, etc.), alcohols (e.g. methanol, ethanol, etc.), halogenated hydrocarbons (e.g. chloroform, dichloromethane, etc.), or a mixture of these solvents. The oxidizing agent includes, for example, peracids (e.g. performic acid, peracetic acid, trifluoro-peracetic acid, perbenzoic acid, m-chloroperbenzoic acid, o-carboxy-perbenzoic acid, etc.), hydrogen peroxide, sodium metaperiodate, dichromic acid, dichromates (e.g. sodium dichromate, potassium dichromate, etc.), permanganic acid, permanganates (e.g. potassium permanganate, sodium permanganate, etc.), lead salts (e.g. lead tetraacetate, etc.), and the like. The oxidizing agent is usually used in an amount of at least 1 mole, preferably 1 to 2 moles, to 1 mole of the starting compound. Besides, in cases of the oxidation of converting the sulfur atom into sulfonyl group, the oxidizing agent is usually used at least 2 moles, preferably 2 to 4 moles, to 1 mole of the starting compound. The above reaction is usually carried out at a temperature of about −10° C. to about 40° C., preferably from about −10° C. to room temperature, for about 1 to 100 hours.

The compound (1) wherein $R^{16}$ or $R^2$ is a lower alkoxy can be converted into the correspond compound (1) wherein $R^{16}$ or $R^2$ is hydroxy by heating the compound in a mixture of an acid (e.g. hydrobromic acid, hydrochloric acid, etc.) and a solvent (e.g. water, methanol, ethanol, isopropyl alcohol, etc.) at 30 to 150° C., preferably at 50 to 120° C.

Besides, the compound (1) wherein $R^{16}$ or $R^2$ is hydroxy can also be prepared by hydrolysis of the above compound (1) wherein $R^{16}$ or $R^2$ is a lower alkoxy. The hydrolysis can be carried out in an appropriate solvent in the presence of an acid. The solvent includes, for example, water, lower alcohols (e.g. methanol, ethanol, isopropyl alcohol, etc.), ethers (e.g. dioxane, tetrahydrofuran, etc.), halogenated hydrocarbons (e.g. dichloromethane, chloroform, carbon tetrachlpride, etc.), polar solvents (e.g. acetonitrile, etc.), or a mixture of these solvents. The acid includes, for example, mineral acids (e.g. hydrochloric acid, hydrobromic acid, etc.), Lewis acids (e.g. boron trifluoride, aluminum chloride, boron tribromide, etc.), iodides (e.g. sodium iodide, potassium iodide, etc.), or a mixture of the above Lewis acid and iodide. The reaction is usually carried out at a temperature of from room temperature to about 150° C., preferably from room temperature to about 100C, for about 0.5 to 30 hours.

[Reaction Scheme-37]

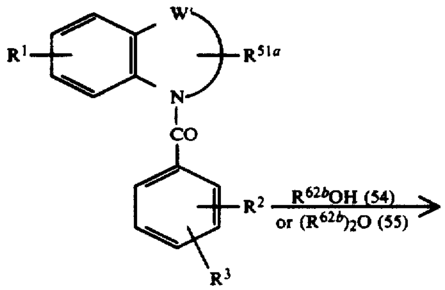

(1ii')

-continued
[Reaction Scheme-37]

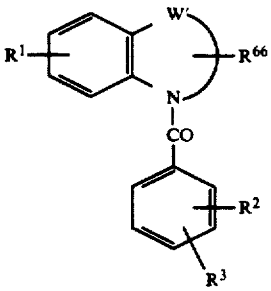

(1DD)

wherein $R^1$, $R^2$, $R^3$, $R^{62b}$, and W' are as defined above, $R^{51a}$ is hydroxyimino, and $R^{66}$ is a lower alkanoyloxyimino.

The reaction of the compound (1ii') and the compound (54) can be carried out under the same conditions as in the reaction of the compound (2) and the compound (3) in the above Reaction Scheme-1.

The reaction of the compound (1ii') and the compound (55) can be carried out under the same conditions as in the reaction of the compound (1p) and the compound of the formula: $(R^{7b})_2O$ in the above Reaction Scheme-10.

[Reaction Scheme-38A]

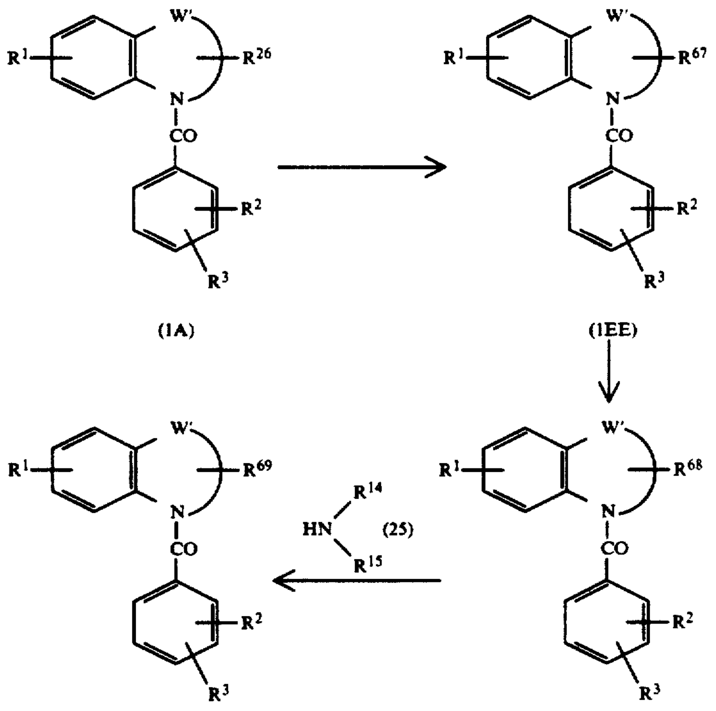

[Reaction Scheme-38B]
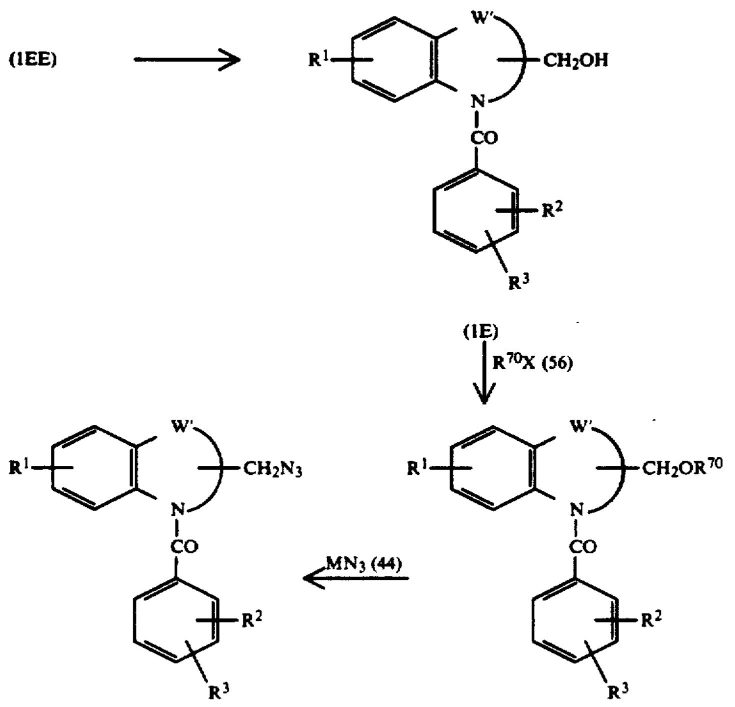
(1JJ) (1HH)
[Reaction Scheme-38C]
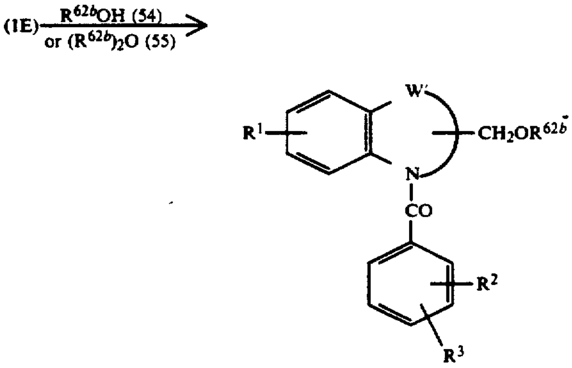
(1II)
[Reaction Scheme-38D]
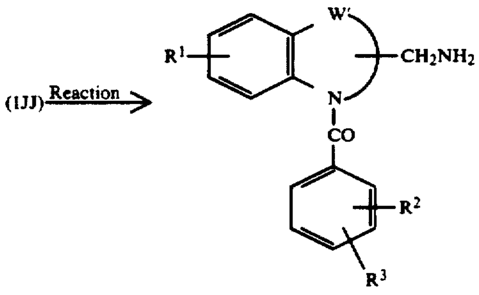
(1KK)
[Reaction Scheme-38E]
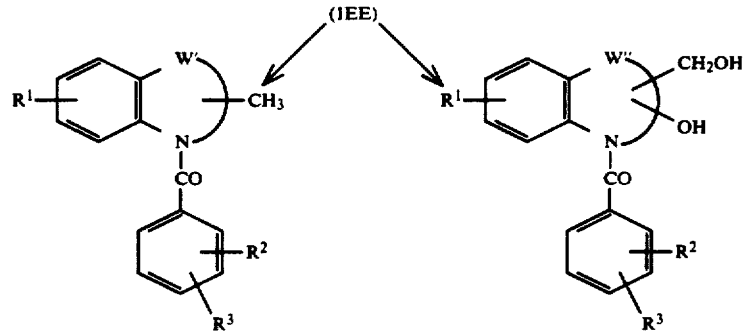
(1LL) (1MM)
wherein $R^1$, $R^2$, $R^3$, W', $R^{26}$, $R^{14}$, $R^{15}$, $R^{62b}$, X and M are as defined above, $R^{67}$ is methylidene, $R^{68}$ is a group of the formula:

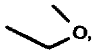

and $R^{69}$ is a group of the formula:

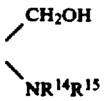

($R^{14}$ and $R^{15}$ are as defined above), or

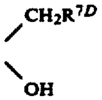

($R^{7D}$ is an amino having optionally a substituent selected from a lower alkyl and a lower alkanoyl, $R^{70}$ is a lower alkylsulfonyl, and W'' is the same as the above W, provided that the number of the substituent in the groups $-(CH_2)_p-$ and $-CH=CH-(CH_2)_q-$ is 0 or 1.

The reaction of converting the compound (1A) into the compound (1EE) is carried out in an appropriate solvent in the presence of a Wittig reagent and a basic compound. The Wittig reagent includes, for example, a phosphoric compound of the formula:

$$[(R^{71})_3P^+-CH_2-R^{72}]X^- \quad (A)$$

wherein $R^{71}$ is phenyl, $R^{72}$ is hydrogen atom or a lower alkyl, and X is a halogen atom. The basic compound includes inorganic bases (e.g. metallic sodium, metallic potassium, sodium hydride, sodium amide, sodium hydroxide, potassium hydroxide, sodium carbonate, potassium carbonate, sodium hydrogen carbonate, etc.), metal alcoholates (e.g. sodium methylate, sodium ethylate, potassium t-butoxide, etc.), alkyl or aryl lithiums or lithium amides (e.g. methyl lithium, n-butyl lithium, phenyl lithium, lithium diisopropylamide, etc.), organic bases (e.g. pyridine, piperidine, quinoline, triethylamine, N,N-dimethylaniline, etc.). The solvent includes any solvent which does not affect on the reaction, for example, ethers (e.g. diethyl ether, dioxane, tetrahydrofuran, monoglyme, diglyme, etc.), aromatic hydrocarbons (e.g. benzene, toluene, xylene, etc.), aliphatic hydrocarbons (e.g. n-hexane, heptane, cyclohexane, etc.), amines (e.g. pyridine, N,N-dimethylaniline, etc.), aprotic polar solvents (e.g. N,N-dimethylformamide, dimethylsulfoxide, hexamethylphosphoric triamide, etc.), alcohols (e.g. methanol, ethanol, isopropanol, etc.), and the like. The reaction is usually carried out at a temperature of about −80° C. to about 150° C., preferably about −80° C. to about 120° C., for about 0.5 to 15 hours.

The reaction of converting the compound (1EE) into the compound (1LL) can be carried out under the same conditions as in the catalytically hydrogenation reaction for converting the compound (1A) into the compound (1C) in the above Reaction Scheme-15.

The reaction of converting the compound (1EE) into the compound (1FF) is carried out under the same conditions as in the reaction of converting the compound (1) wherein W is sulfur atom or sulfinyl into the corresponding compound (1) wherein W is sulfinyl or sulfonyl respectively as described herebefore.

The reaction of the compound (1FF) and the compound (25) can be carried out under the same conditions as in the reaction of the compound (7) and the compound (8) in the above Reaction Scheme-4.

The reaction of converting the compound (1EE) into the compound (1E) can be carried out by firstly subjecting it to hydroboration reaction and then to oxidation.

The hydroboration reaction is carried out in a solvent such as ethers (e.g. diethyl ether, tetrahydrofuran, dioxane, etc.) in the presence of a hydroborating agent at a temperature of from about 0° C. to about 50° C., preferably about 0° C. to room temperature, for about 1 to 10 hours. The hydroborating agent includes boron hydride compounds, for example, $BH_3$.tetrahydrofuran, $BH_3.S(CH_3)_2$, $BH_2Cl$, $(CH_3)_2CHC(CH_3)_2BH_2$, $(CH_3)_2CHCH(CH_3)BH$,

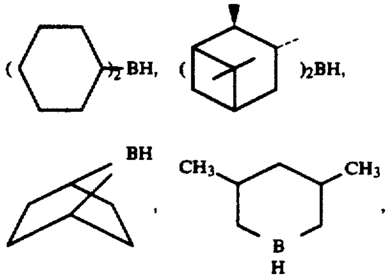

$BHCl_2$,

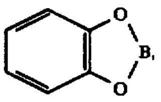

and the like.

The subsequent oxidation is carried out in water in the presence of an oxidizing agent. The oxidizing agent includes, for example, alkaline hydrogen peroxides (e.g. hydrogen peroxide - sodium hydroxide, etc.), and air oxidation is also used. The reaction is usually carried out at a temperature of from room temperature to about 150° C., preferably from room temperature to about 100° C., for 0.5 to 7 hours.

The hydroborating agent and the oxidizing agent are each used in an amount of at least 1 mole, preferably 1 to 2 mole, to 1 mole of the compound (1EE).

The reaction of the compound (1E) and the compound (54) can be carried out under the same conditions as in the reaction of the compound (2) and the compound (3) in the above Reaction Scheme-1.

The reaction of the compound (1E) and the compound (55) can be carried out under the same conditions as in the reaction of the compound (1p) and the compound of the formula: $(R^{7b})_2O$ in the above Reaction Scheme-10.

The reaction of the compound (1E) and the compound (56) can be carried out under the same conditions as in the reaction of the compound (7) and the compound (8) in the above Reaction Scheme-4.

The reaction of the compound (1HH) and the compound (44) can be carried out under the same conditions as in the reaction of the compound (7) and the compound (8) in the above Reaction Scheme-4.

The reducing reaction of the compound (1JJ) can be carried out under the same conditions as in the catalytic hydrogenation reaction for converting the compound (1A) into the compound (1C) in the above Reaction Scheme-15.

The reaction of converting the compound (1EE) into the compound (1MM) can be carried out by reacting with an oxidizing agent in an appropriate solvent in the presence of a co-oxidizing agent.

The solvent used for the reaction with an oxidizing agent includes, for example- pyridine, ethers (e.g. dioxane, tetrahydrofuran, diethyl ether, etc.), aromatic hydrocarbons (e.g. benzene, toluene, xylene, etc.), halogenated hydrocarbons (e.g. dichloromethane, dichloroethane, chloroform, carbon tetrachloride, etc.), esters (e.g. ethyl acetate, etc.), water, alcohols (e.g. methanol, ethanol, isopropanol, t-butanole, etc.), or a mixture of these solvents. The co-oxidizing agent includes, for example, organic amine N-oxides (e.g. pyridine N-oxide, N-ethyldiisopropylamine N-oxide, N-methylmorpholine N-oxide, trimethylamine N-oxide, triethylamine N-oxide, etc.). The oxidizing agent includes, for example, osmium tetraoxide, and the like. The oxidizing agent is usually used in an amount of at least 1 mole, preferably 1 to 5 moles, to 1 mole of the starting compound. The reaction is usually carried out at a temperature of from −20° C. to 150° C., preferably from room temperature to 100° C., for about 1 to 10 hours.

methanesulfonic acid, p-toluenesulfonic acid, etc.), alkanoic acids (e.g. trifluoroacetic acid, etc.), and the like. The compound (59) is used in an amount of at least 1 mole, preferably 1 to 5 moles, to 1 mole of the compound (1A). The reaction is usually carried out at a temperature of from room temperature to about 150° C., preferably from room temperature to about 100° C., for about 1 to 7 hours.

The reaction of the compound (1A) and the compound (58) can be carried out under the same conditions as in the reaction of the compound (2b) and the compound (38) in the above Reaction Scheme-26.

[Reaction Scheme-39]

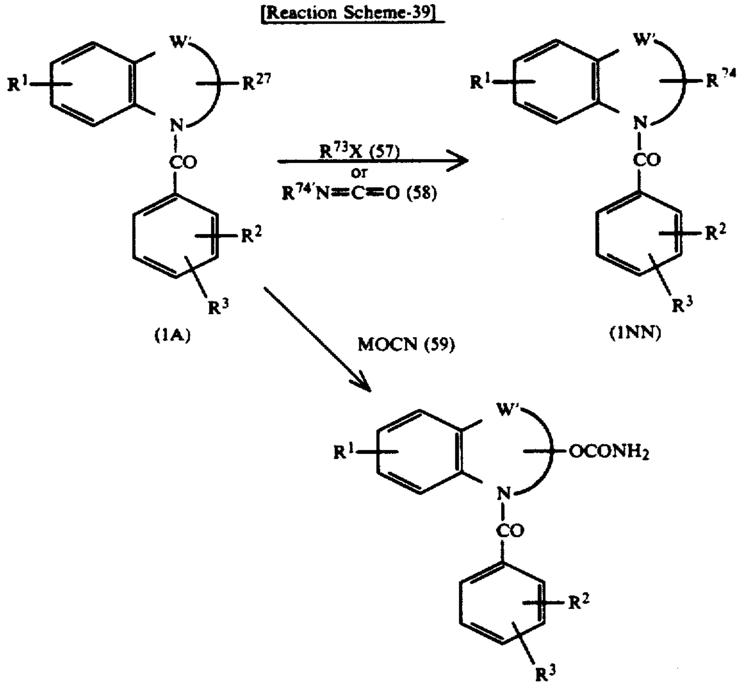

wherein $R^1$, $R^2$, $R^3$, $R^{27}$, W', M, and X are as defined above, $R^{73}$ is an aminocarbonyl having optionally a lower alkyl substituent, $R^{74}$ is an aminocarbonyloxy having optionally a lower alkyl substituent, $R^{74'}$ is a lower alkyl.

The reaction of the compound (1A) and the compound (57) can be carried out under the same conditions as in the reaction of the compound (7) and the compound (8) in the above Reaction Scheme-4.

The reaction of the compound (1A) and the compound (59) is carried out in an appropriate solvent in the presence of an acid. The solvent includes the same solvent as used in the reaction of the compound (7) and the compound (8) in the above Reaction Scheme-4. The acid includes, for example, mineral acids (e.g. hydrochloride acid, sulfuric acid, etc.), sulfonic acids (e.g.

[Reaction Scheme-40]

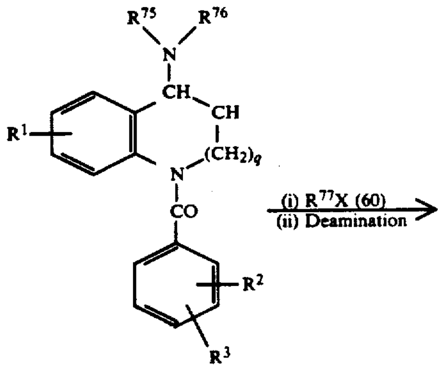

-continued

[Reaction Scheme-40]

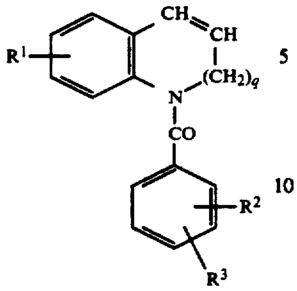

(1PP)

wherein $R^1$, $R^2$, $R^3$, X, and q are as defined above, and $R^{75}$, $R^{76}$ and $R^{77}$ are each a lower alkyl, and the carbon atom in the formula: $-(CH_2)_q-$ may be substituted by oxygen atom, sulfur atom, sulfinyl, sulfonyl, or a group of the formula:

($R^{13}$ is as defined above), and further the group: $-(CH_2)_q-$ may optionally have 1 to 3 substituents selected from a lower alkyl having optionally a hydroxy substituent, a lower alkoxycarbonyl, carboxyl, hydroxy, oxo, a lower alkanoyloxy having optionally a halogen substituent, an amino-lower alkyl having optionally a substituent selected from a lower alkyl and a lower alkanoyl, a lower alkanoyloxy-substituted lower alkyl, a lower alkylsulfonyloxy-lower alkyl, an azido-lower alkyl, a group of the formula:

an aminocarbonyloxy having optionally a lower alkyl substituent, a lower alkoxy, a lower alkoxycarbonyl-substituted lower alkoxy, a carboxy-substituted lower alkoxy, an aminocarbonyl-lower alkoxy having optionally a lower alkyl substituent, an amino-lower alkoxy having optionally a substituent selected from a lower alkyl and a lower alkanoyl, a phthalimido-substituted lower alkoxy, hydroxyimino, a lower alkanoyloxyimino, a lower alkylidene, a halogen atom, azido, sulfoxyimino, a group of the formula:

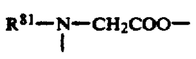

($R^{81}$ is hydrogen atom or a lower alkyl), hydrazino, pyrrolyl, an amino lower alkanoyloxy having optionally a lower alkyl substituent, a group of the formula:

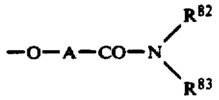

(A is as defined above, and $R^{82}$ and $R^{83}$ are the same or different and are each hydrogen atom, a lower alkyl, a carbamoyl-substituted lower alkyl, a hydroxy-substituted lower alkyl, or a pyridyl-lower alkyl, or $R^{82}$ and $R^{83}$ may bind together with nitrogen atom to which they bond to form a 5- or 6-membered saturated heterocyclic group with or without being intervened with nitrogen, oxygen or sulfur atom wherein the heterocyclic group has optionally a substituent selected from oxo, a lower alkyl, a lower alkanoyl, and carbamoyl), and a group of the formula:

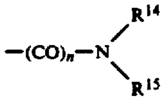

(n is as defined above, and $R^{14}$ and $R^{15}$ are the same or different and are each hydrogen atom, a lower alkyl, a lower alkenyl, a lower alkanoyl, a cycloalkyl, an oxiranyl-substituted lower alkyl, a lower alkyl having 1 to 2 substituents selected from a lower alkoxy, hydroxy and an amino having optionally a lower alkyl substituent, a phenyl-lower alkyl, a pyridyl-lower alkyl, a lower alkylsulfonyl, benzoyl, a lower alkoxycarbonyl, anilinocarbonyl, an aminocarbonyl having optionally a lower alkyl substituent, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperidinyl having optionally a phenyl-lower alkyl substituent on the piperidinyl ring, a halogen-substituted lower alkanoyl, an imidazolyl-substituted lower alkanoyl, an amino-lower alkanoyl having optionally a substituent selected from a lower alkyl and a lower alkoxycarbonyl, an aminocarbonyl-lower alkyl having optionally a lower alkyl substituent, or a phenyl-lower alkoxycarbonyl, or $R^{14}$ and $R^{15}$ may bind together with the nitrogen atom to which they bond to form a 5- or 6-membered saturated heterocyclic group with or without being intervened with nitrogen or oxygen atom, which heterocyclic group may optionally have a substituent selected from a lower alkyl, a phenyl-lower alkyl and a lower alkanoyl.

The reaction of the compound (100) and the compound (60) is carried out in an appropriate solvent in an autoclave. The solvent includes any solvent as used in the reaction of the compound (7) and the compound (8) in the above Reaction Scheme-4. The reaction is usually carried out at a temperature of from room temperature to about 200° C., preferably from room temperature to about 150° C., for about 1 to 7 hours.

The subsequent deamination reaction is carried out in an appropriate solvent in the presence of a basic compound. The solvent includes the same solvent as used in the above reaction of the compound (100) and the compound (60). The basic compound includes any basic compound as used in the reaction of converting the compound (1A) into the compound (1EE) in the above Reaction Scheme-38. The reaction is usually carried out at a temperature of from room temperature to about 150° C., preferably from room temperature to about 100° C., for about 1 to 10 hours.

[Reaction Scheme-41]

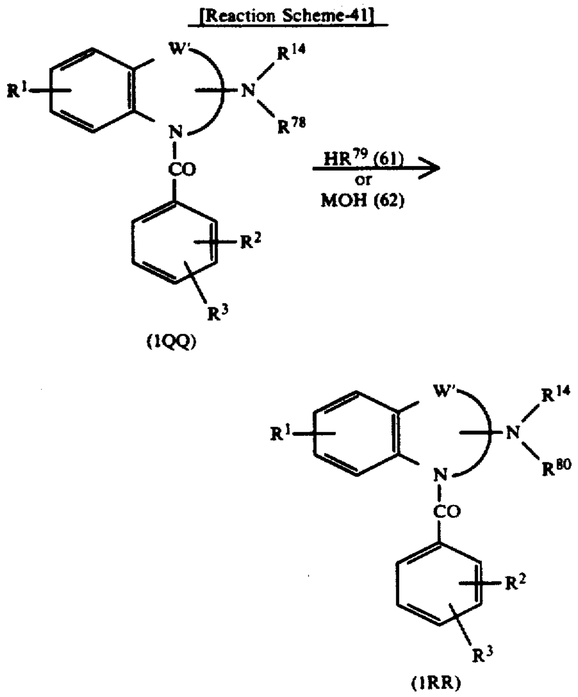

wherein $R^1$, $R^2$, $R^3$, $R^{14}$, M, and W' are as defined above, $R^{78}$ is an oxiranyl-substituted lower alkyl, $R^{79}$ is a lower alkoxy, or an amino having optionally a lower alkyl substituent, and $R^{80}$ is a lower alkyl having 2 substituents selected from hydroxy, a lower alkoxy, and an amino having optionally a lower alkyl substituent.

The reaction of the compound (1QQ) and the compound (61) can be carried out under the same conditions as in the reaction of the compound (7) and the compound (8) in the above Reaction Scheme-4.

The reaction of the compound (1QQ) and the compound (62) can be carried out by firstly reacting them in trifluoroacetic acid at a temperature of about 0° C. to about 100° C., preferably about 0° C. to about 50° C., for about 1 to 7 hours, followed by hydrolysis of the resultant.

The hydrolysis is carried out in an appropriate solvent or without solvent in the presence of an acid or basic compound. The solvent includes, for example, water, lower alcohols (e.g. methanol, ethanol, isopropanol, etc.), ketones (e.g. acetone, methyl ethyl ketone, etc.), ethers (e.g. dioxane, tetrahydrofuran, ethylene glycol dimethyl ether, etc.), fatty acids (e.g. acetic acid, formic acid, etc.), or a mixture of these solvents. The acid includes, for example, mineral acids (e.g. hydrochloric acid, sulfuric acid, hydrobromic acid, etc.), organic acids (e.g. formic acid, acetic acid, aromatic sulfonic acid, etc.), and the like. The basic compound includes, for example, metal carbonates (e.g. sodium carbonate, potassium carbonate, etc.), metal hydroxides (e.g. sodium hydroxide, potassium hydroxide, calcium hydroxide, etc.). The reaction is usually carried out at a temperature of from room temperature to about 200° C., preferably from room temperature to about 150° C., for about 0.5 to 25 hours.

[Reaction Scheme-42]

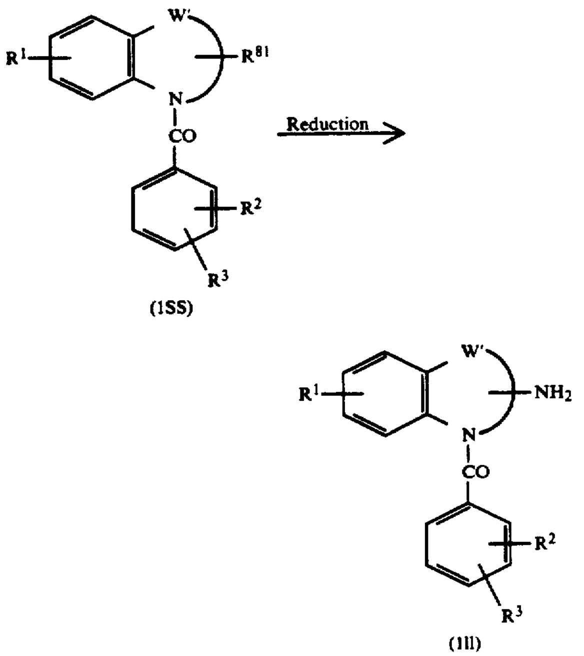

wherein $R^1$, $R^2$, $R^3$, and W are as defined above, and $R^{81}$ is hydroxyimino or a lower alkanoyloxyimino.

The reaction of converting the compound (1SS) into the compound (1II) is carried out by catalytically hydrogenating the compound (1SS) in an appropriate solvent in the presence of a catalyst. The solvent includes, for example, water, acetic acid, alcohols (e.g. methanol, ethanol, isopropanol, etc.), hydrocarbons (e.g. hexane, cyclohexane, etc.), ethers (e.g. diethylene glycol dimethyl ether, dioxane, tetrahydrofuran, diethyl ether, etc.), esters (e.g. ethyl acetate, methyl acetate, etc.), aprotic polar solvents (e.g. dimethylformamide, etc.), or a mixture of these solvents. The catalyst includes, for example, palladium, palladium black, palladium-carbon, platinum, platinum oxide, copper chromate, Raney nickel, and the like. The catalyst is usually used in an amount of 0.02 to 1 part by weight to 1 part by weight of the compound (1SS). The reaction is usually carried out at a temperature of from about −20° C. to about 100° C., peferably about 0° C. to about 70° C., under a hydrogen atmospheric pressure of 1 to 10 atm. for about 0.5 to 20 hours.

Alternatively, the reducing reaction can also be carried out by using a hydrogenating reducing agent. The hydrogenating reducing agent includes, for example, lithium aluminum hydride, sodium boro hydride, diborane, etc. The reducing agent is usually used in an amount of at least one mole, preferably 1 to 10 moles, to 1 mole of the compound (1SS). The reaction is usually carried out in an appropriate solvent, such as water, lower alcohols (e.g. methanol, ethanol, isopropanol, etc.), ethers (e.g. tetrahydrofuran, diethyl ether, diglyme, etc.), acetic acid, and the like, at a temperature of about 0° C. to about 200° C., preferably about 0° C. to 170° C., for about 10 minutes to about 10 hours. When lithium aluminum hydride or diborane is used as the reducing agent, it is preferable to use an anhydrous solvent such as diethyl ether, tetrahydrofuran, diglyme, etc.

[Reaction Scheme-43]

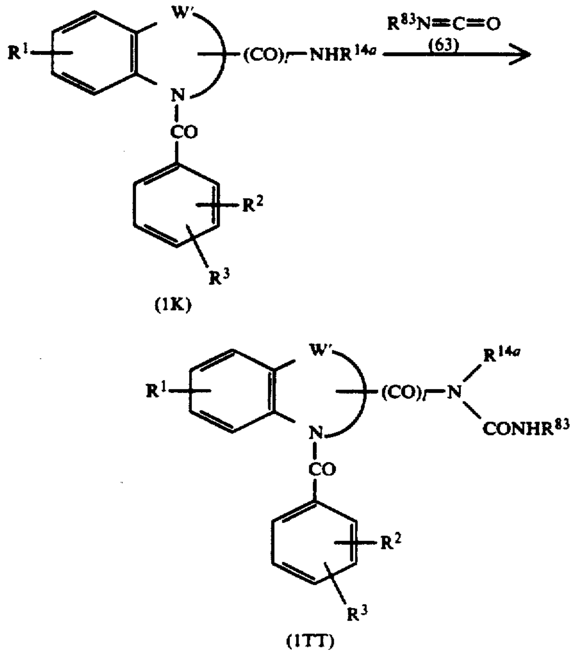

wherein $R^1$, $R^2$, $R^3$, W', l, $R^{14a}$ are as defined above, and $R^{83}$ is phenyl or a lower alkyl.

The reaction of the compound (1K) and the compound (63) can be carried out under the same conditions as in the reaction of the compound (2b) and the compound (38) in the above Reaction Scheme-26.

[Reaction Scheme-44]

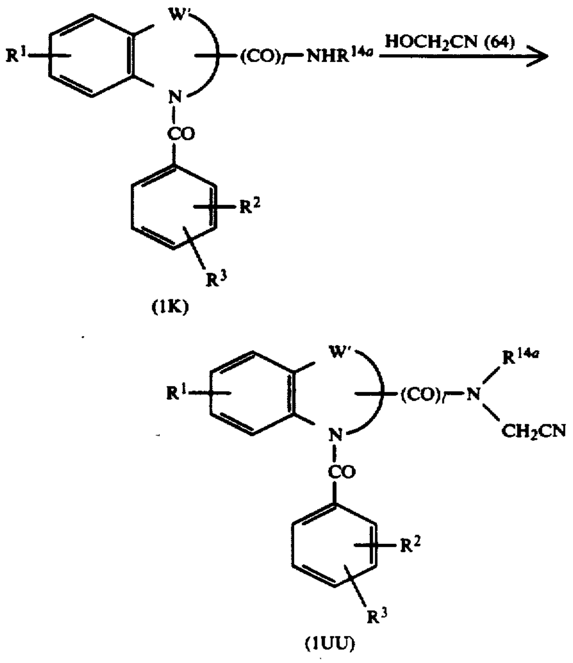

wherein $R^1$, $R^2$, $R^3$, W', l, $R^{14a}$ are as defined above.

The reaction of the compound (1K) and the glyconitrile (64) can be carried out in an appropriate solvent. The solvent includes the same solvent as used in the reaction of the compound (7) and the compound (8) in the above Reaction Scheme-4. The reaction is usually carried out at a temperature of from about 0° C. to about 150° C., preferably about 0° C. to about 100° C., for about 1 to 10 hours. The glyconitrile (64) is used in an amount of at least 1 mole, preferably 1 to 2 moles, to 1 mole of the compound (1K).

[Reaction Scheme-45]

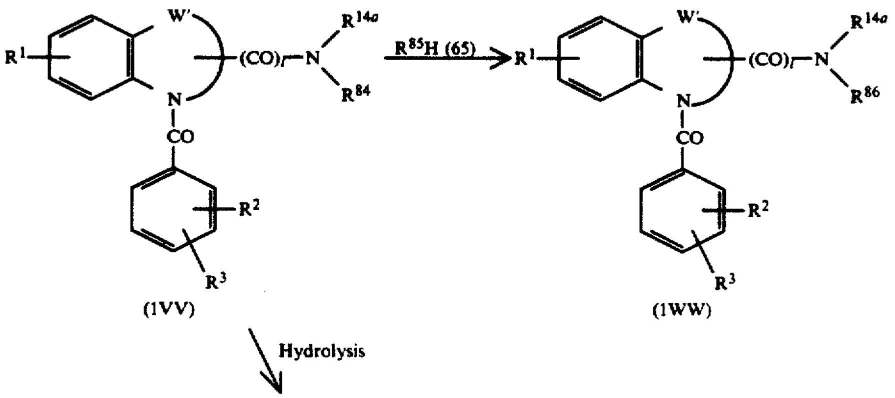

-continued

[Reaction Scheme-45]

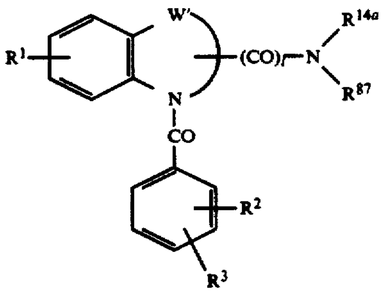

(1XX)

wherein $R^1$, $R^2$, $R^3$, W', l, $R^{14a}$ are as defined above, $R^{84}$ is a lower alkoxycarbonyl-substituted lower alkyl, $R^{85}$ is an amino having optionally a lower alkyl substituent, $R^{86}$ is an aminocarbonyl-lower alkyl having optionally a lower alkyl substituent, and $R^{87}$ is a carboxy-substituted lower alkyl.

The reaction of the compound (1VV) and the compound (65) can be carried out under the same conditions as in the reaction of the compound (2) and the compound (3) in the above Reaction Scheme-1.

The hydrolysis reaction of the compound (1VV) can be carried out under the same conditions as in the hydrolysis reaction of the compound (1QQ) and the compound (62) in the above Reaction Scheme-41.

preferably about 0° C. to about 150° C., for about 0.5 to 15 hours.

The hydrolysis reaction of the compound (1YY) can be carried out under the same conditions as in the hydrolysis reaction of the compound (1QQ) and the compound (62) in the above Reaction Scheme-41, wherein a pyridinium salt (e.g. pyridinium p-toluenesulfonate, etc.) may be used as the acid.

[Reaction Scheme-46]

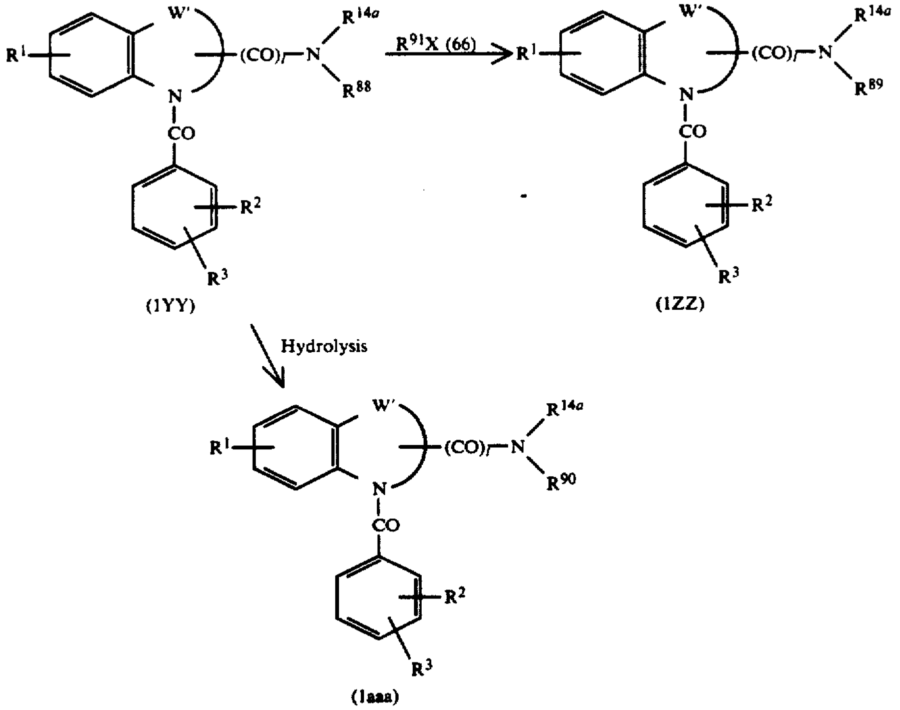

(1aaa)

wherein $R^1$, $R^2$, $R^3$, W', l, X, and $R^{14a}$ are as defined above, $R^{88}$ is a tetrahydropyranyloxy-substituted lower alkyl, $R^{89}$ is a lower alkanoyloxy-substituted lower alkyl, $R^{90}$ is a hydroxy-substituted lower alkyl, and $R^{91}$ is a lower alkanoyl.

The reaction of the compound (1YY) and the compound (66) can be carried out in a solvent such as acetic acid at a temperature of about 0° C. to about 200° C.,

[Reaction Scheme-47]

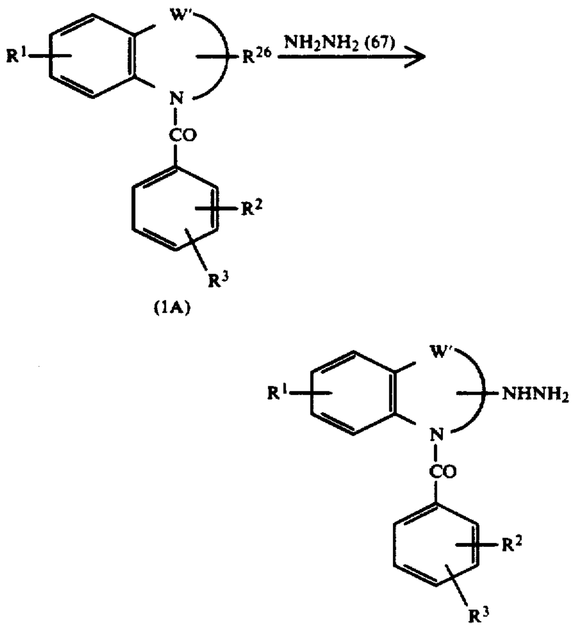

(1A) (1bbb)

wherein $R^1$, $R^2$, $R^3$, W', and $R^{26}$ are as defined above.

The reaction of converting the compound (1A) into the compound (1bbb) can be carried out under the same conditions as in the reaction of converting the compound (1A) into the compound (1C) in the above Reaction Scheme-15.

[Reaction Scheme-48]

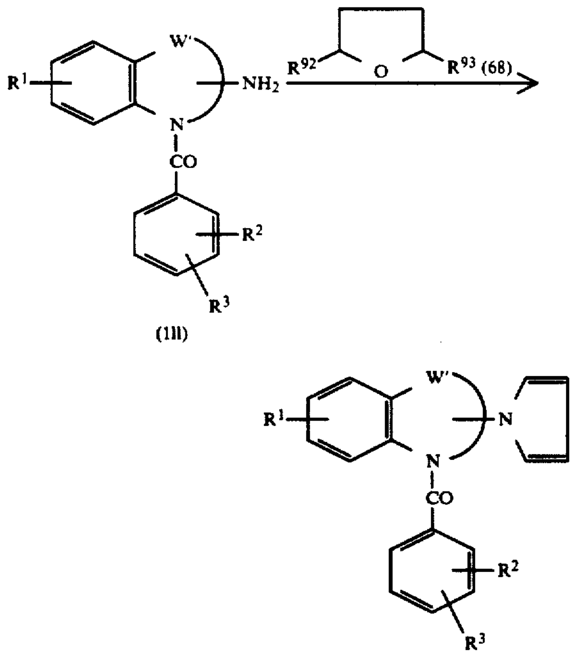

(1ll) (1ccc)

wherein $R^1$, $R^2$, $R^3$ and W' are as defined above, $R^{92}$ and $R^{93}$ are each a lower alkoxy.

The reaction of the compound (1ll) and the compound (68) is carried out in an appropriate solvent in the presence of an acid. The solvent includes, for example, water, alcohols (e.g. methanol, ethanol, isopropanol, etc.), ketones (e.g. acetone, methyl ethyl ketone, etc.), ethers (e.g. dioxane, tetrahydrofuran, ethylene glycol dimethyl ether, etc.), fatty acids (e.g. acetic acid, formic acid, etc.), or a mixture of these solvents. The acid includes, for example, mineral acids (e.g. hydrochloric acid, sulfuric acid, hydrobromic acid, etc.), organic acids (e.g. formic acid, acetic acid, aromatic sulfonic acids, etc.). The reaction is usually carried out at a temperature of from room temperature to about 200° C., preferably from room temperature to about 150° C., for about 0.5 to 5 hours. The compound (68) is usually used in an amount of at least 1 mole, preferably 1 to 2 moles, to 1 mole of the compound (1ll).

[Reaction Scheme-49]

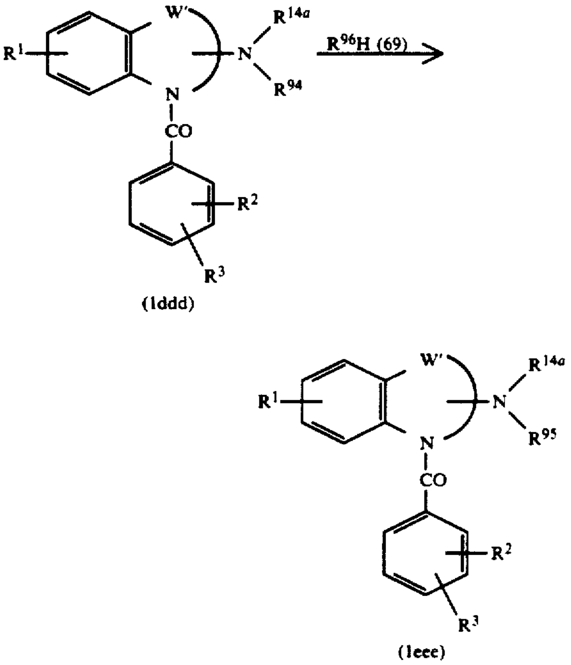

(1ddd) (1eee)

wherein $R^1$, $R^2$, $R^3$, W', and $R^{14a}$ are as defined above, $R^{94}$ is a halogen-substituted lower alkanoyl, $R^{95}$ is an imidazolyl-substituted lower alkanoyl or an amino-lower alkanoyl having optionally a substituent selected from a lower alkyl and a lower alkoxycarbonyl, and $R^{96}$ is imidazolyl, or an amino having optionally a substituent selected from a lower alkyl and a lower alkoxycarbonyl.

The reaction of the compound (1ddd) and the compound (69) can be carried out under the same conditions as in the reaction of the compound (7) and the compound (8) in the above Reaction Scheme-4.

[Reaction Scheme-50]

-continued

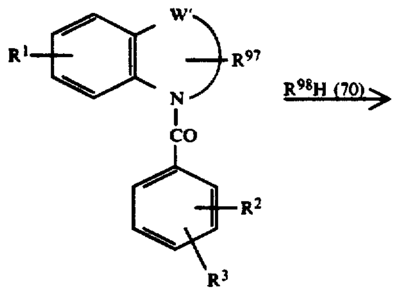

(1fff)

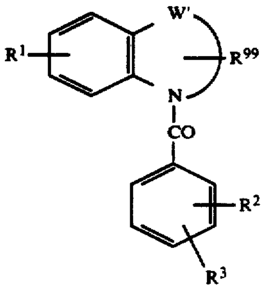

(1ggg)

wherein $R^1$, $R^2$, $R^3$, and W' are as defined above, $R^{97}$ is a lower alkanoyloxy having a halogen-substituent, $R^{98}$ is an amino having optionally a lower alkyl substituent, and $R^{99}$ is an amino-lower alkanoyloxy having optionally a lower alkyl substituent.

The reaction of the compound (1fff) and the compound (70) can be carried out under the same conditions as in the reaction of the compound (7) and the compound (8) in the above Reaction Scheme-4.

[Reaction Scheme-51]

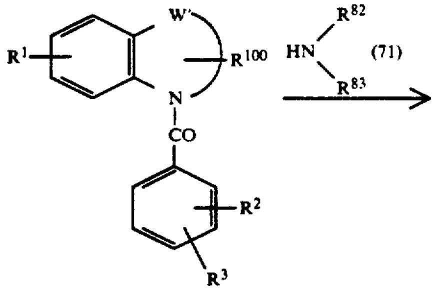

(1hhh)

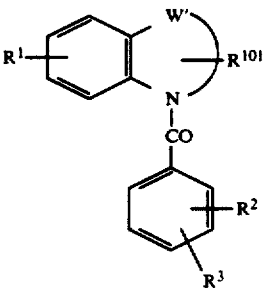

(1iii)

wherein $R^1$, $R^2$, $R^3$, W', $R^{82}$, and $R^{83}$ are as defined above, $R^{100}$ is a carboxy-substituted lower alkoxy, and $R^{101}$ is a group of the formula:

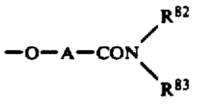

(A, $R^{82}$ and $R^{83}$ are as defined above).

The reaction of the compound (1hhh) and the compound (71) can be carried out under the same conditions as in the reaction of the compound (2) and the compound (3) in the above Reaction Scheme-1.

[Reaction Scheme-52]

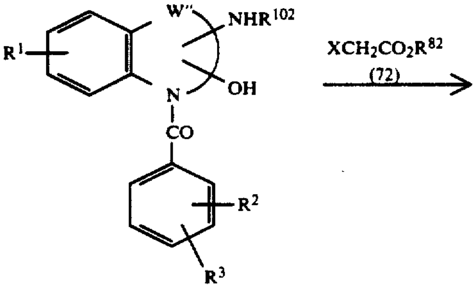

(1jjj)

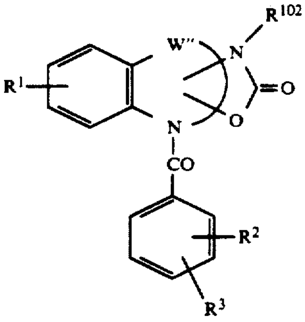

(lkkk)

wherein $R^1$, $R^2$, $R^3$, W'', X, and $R^{82}$ are as defined above, and $R^{102}$ is hydrogen atom or a lower alkyl, provided that in the compound (1jjj), the groups of the formulae: —NH—$R^{102}$ and —OH are substituted at the positions adjacent each other.

The reaction of the compound (1jjj) and the compound (72) can be carried out under the same conditions as in the reaction of the compound (7) and the compound (8) in the above Reaction Scheme-4.

[Reaction Scheme-53]

-continued

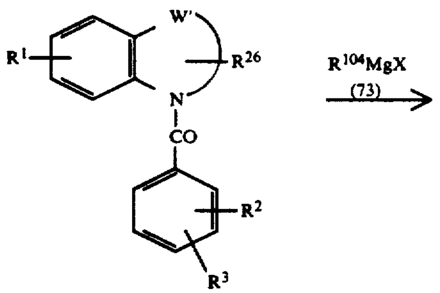

(1A)

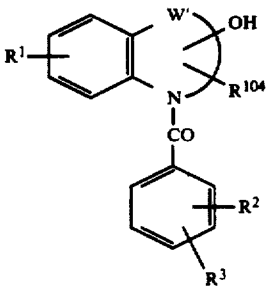

(1lll)

wherein $R^1$, $R^2$, $R^3$, W', $R^{26}$ and X are as defined above, and $R^{104}$ is a lower alkyl.

The reaction of the compound (1A) and the compound (73) can be carried out in an appropriate solvent. The solvent includes, for example, ethers (diethyl ether, dioxane, tetrahydrofuran, etc.), aromatic hydrocarbons (e.g. benzene, toluene, xylene, etc.), saturated hydrocarbons (e.g. pentane, hexane, heptane, cyclohexane, etc.), or a mixture of these solvents. The reaction is usually carried out at a temperature of from about −70° C. to about 50° C., preferably from about −30° C. to room temperature, for about 1 to 6 hours. The compound (73) is used in an amount of at least 1 mole, preferably 1 to 5 moles, to 1 mole of the compound (1A).

[Reaction Scheme-54]

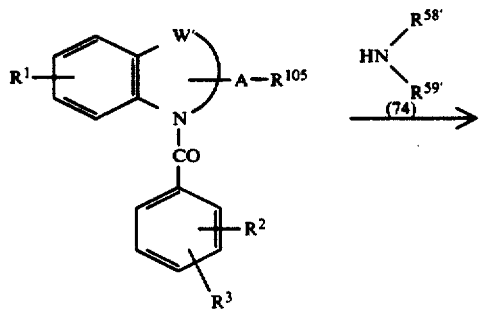

(1mmm)

-continued

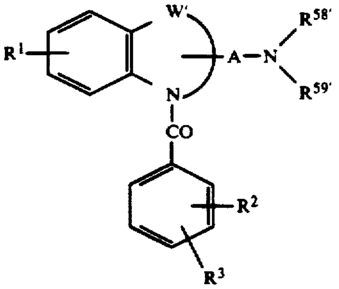

(1nnn)

wherein $R^1$, $R^2$, $R^3$, W', $R^{58'}$, $R^{59'}$, and A are as defined above, and $R^{105}$ is a lower alkylsulfonyloxy.

The reaction of the compound (1 mmm) and the compound (74) can be carried out under the same conditions as in the reaction of the compound (7) and the compound (8) in the above Reaction Scheme-4.

Among the active compounds (1) of this invention, the compounds having an acidic group can easily be converted into salts by treating with a pharmaceutically acceptable basic compound. The basic compound includes, for example, metal hydroxides such as sodium hydroxide, potassium hydroxide, lithium hydroxide, calcium hydroxide, etc., alkali metal carbonates or hydrogen carbonates such as sodium carbonate, sodium hydrogen carbonate, etc., alkali metal alcoholates such as sodium methylate, potassium ethylate, etc. Besides, among the active compounds (1) of this invention, the compounds having a basic group can easily be converted into acid addition salts thereof by treating with a pharmaceutically acceptable acid. The acid includes, for example, inorganic acids such as sulfuric acid, nitric acid, hydrochloric acid, hydrobromic acid, etc., and organic acids such as acetic acid, p-toluene-sulfonic acid, ethanesulfonic acid, oxalic acid, maleic acid, fumaric acid, citric acid, succinic acid, benzoic acid, etc. These salts are useful as an active ingredient as like as the compounds (1) in the free form.

In addition, the compounds (1) of this invention include stereoisomers and optical isomers, and these isomers are also useful as the active ingredient in this invention.

The compounds of this invention thus obtained can easily be isolated and purified by conventional isolation methods. The isolation methods are, for example, distillation method, recrystallization method, column chromatography, ion exchange chromatography, gel chromatography, affinity chromtography, preparative thin layer chromatography, extraction with a solvent, and the like.

The compounds and their salts of this invention are useful as a vasopressin antagonist and are used in the form of a conventional pharmaceutical preparation. The preparation is prepared by using conventional dilutents or carriers such as fillers, thickening agents, binders, wetting agents, disintegrators, surfactants, lubricants, and the like. The pharmaceutical preparations may be selected from various forms in accordance with the desired utilities, and the representative forms are tablets, pills, powders, solutions, suspensions, emulsions, granules, capsules, suppositories, injections (solutions, suspensions, etc.), and the like. In order to form in tablets, there are used carriers such as vehicles (e.g. lactose, white sugar, sodium chloride, glucose, urea, starches, calcium carbonate, kaolin, crystalline cellulose, silicic acid, etc.), binders (e.g. water, ethanol, propanol, simple syrup, glucose solution, starch solution, gelatin solution, carboxy-methyl cellulose, shellac, methyl cellulose, potassium phosphate, polyvinylpyrrolidone, etc.), disintegrators (e.g. dry starch, sodium arginate, agar powder, laminaran powder, sodium hydrogen carbonate, calcium carbonate, polyoxyethylene sorbitan fatty acid esters, sodium laurylsulfate, stearic monoglyceride, starches, lactose, etc.), disintegration inhibitors (e.g. white sugar, stearin, cacao butter, hydrogenated oils, etc.), absorption promoters (e.g. quaternary ammonium base, sodium laurylsulfate, etc.), wetting agents (e.g. glycerin, starches, etc.), adsorbents (e.g. starches, lactose, kaolin, bentonite, colloidal silicates, etc.), lubricants (e.g. purified talc, stearates, boric acid powder, polyethylene glycol, etc.), and the like. Moreover, the tablets may also be in the form of a conventional coated tablet, such as sugar-coated tablets, gelatin-coated tablets, enteric coated tablets, film-coating tablets, or double or multiple layer tablets. In the preparation of pills, the carriers include vehicles (e.g. glucose, lactose, starches, cacao butter, hydrogenated vegetable oils, kaolin, talc, etc.), binders (e.g. gum arabic powder, tragacanth powder, gelatin, ethanol, etc.), disintegrators (e.g. laminaran, agar, etc.), and the like. In the preparation of suppositories, the carriers include, for example, polyethylene glycol, cacao butter, higher alcohols, higher alcohol esters, gelatin, semi-synthetic glycerides, and the like. Capsules can be prepared by charging a mixture of the compound of this invention with the above carriers into hard gelatin capsules or soft capsules in a usual manner. In the preparation of injections, the solutions, emulsions or suspendions are sterilized and are preferably made isotonic with the blood. In the preparation of these solutions, emulsions and suspensions, there are used conventional diluents, such as water, ethyl alcohol, macrogol (propylene glycol), ethoxylated isostearyl alcohol, polyoxylated isostearyl alcohol, polyoxyethylene sorbitan fatty acid esters, and the like. In this case, the pharmaceutical preparations may also be incorporated with sodium chloride, glucose, or glycerin in an amount sufficient to make them isotonic, and may also be incorporated with conventional solubilizers, buffers, anesthetizing agents. Besides, the pharmaceutical preparations may optionally be incorporated with coloring agents, preservatives, perfumes, flavors, sweeting agents, and other medicaments, if required.

The amount of the active compound of this invention (active ingredient) to be incorporated into the anti-vasopressin preparations is not specified but may be selected from a broad range, but usually, it is preferably in the range of 1 to 70% by weight, more preferably 5 to 50 % by weight.

The anti-vasopressin preparation of this invention may be administered in any method, and suitable method for administration may be determined in accordance with various forms of preparation, ages, sexes and other conditions of the patients, the degree of severity of diseases, and the like. For instance, tablets, pills, solutions, suspensions, emulsions, granules and capsules are administered orally. The injections are intravenously administered alone or together with a conventional auxiliary liquid (e.g. glucose, amino acid solutions), and further are optionally administered alone in intramuscular, intracutaneous, subcutaneous, or intraperitoneal route, if required. Suppositories are administered in intrarectal route.

The dosage of the anti-vasopressin agent of this invention may be selected in accordance with the usage, ages, sexes and other conditions of the patients, the degree of severity of the diseases, and the like, but is usually in the range of about 0.6 to 50 mg of the active compound of this invention per 1 kg of body weight of the patient per day. The active compound is preferably contained in an amount of 10 to 1000 mg per the dosage unit.

BEST MODE FOR CARRYING OUT THE INVENTION

Figure 1:
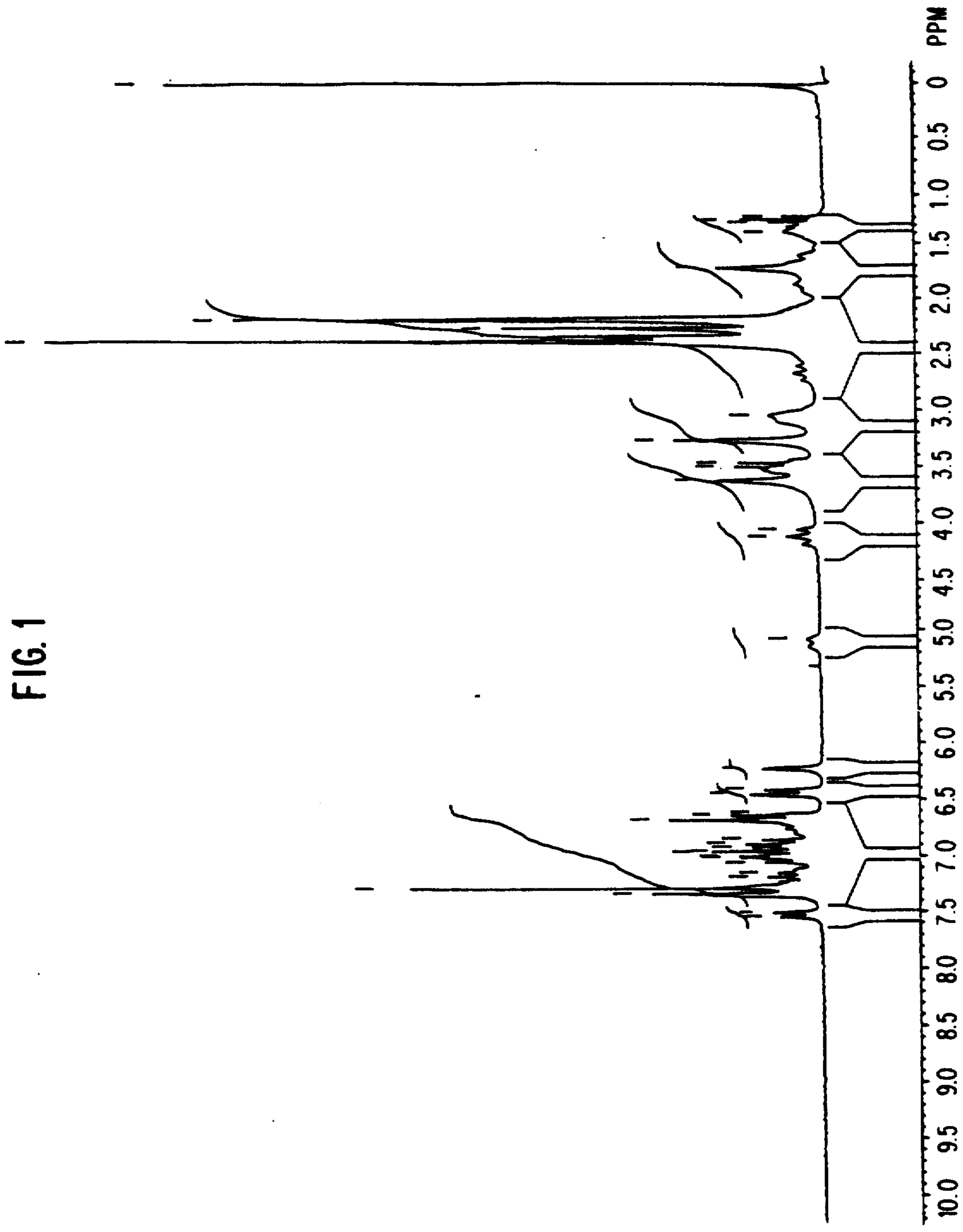
FIG. 1 to FIG. 4 show a chart of NMR ($CDCl^3$) of the compounds in Examples 978 and 979.

The present invention is illustrated by the following Preparations of anti-vasopressin agent, Reference Examples of processes for preparing the starting compounds to be used for preparing the active compounds, Examples of processes for preparing the active compounds, and Experiments of the activities of the active compounds of this invention.

PREPARATION 1

Film coated tablets are prepared from the following components.

| Components | Amount |
|---|---|
| 4-Methylamino-1-[4-(3,5-dichlorobenzoyl-amino)benzoyl]-1,2,3,4-tetrahydroquinoline | 150 g |
| Avicel (tradename of microcrystalline cellulose, manufactured by Asahi Chemical Industry Co., Ltd., Japan) | 40 g |
| Corn starch | 30 g |
| Magnesium stearate | 2 g |
| Hydroxypropyl methylcellulose | 10 g |
| Polyethylene glycol-6000 | 3 g |
| Castor oil | 40 g |
| Ethanol | 40 g |

The active component of this invention, Avicel, corn starch and magnesium stearate are mixed and kneaded and the mixture is tabletted using a conventional pounder (R 10 mm) for sugar coating. The tablets thus obtained are coated with a film coating agent consisting of hydroxypropyl methylcellulose, polyethylene glycol-6000, castor oil and ethanol to give film coated tablets.

PREPARATION 2

Tablets are prepared from the following components.

| Components | Amount |
|---|---|
| 1-[4-(N-Butylanilinoacetylamino)benzoyl]-2,3,4,5-tetrahydroy-1H-benzazepine | 150 g |
| Citric acid | 1.0 g |
| Lactose | 33.5 g |
| Dicalcium phosphate | 70.0 g |
| Pullonic F-68 | 30.0 g |
| Sodium laurylsulfate | 15.0 g |
| Polyvinylpyrrolidone | 15.0 g |
| Polyethylene glycol (Carbowax 1500) | 4.5 g |
| Polyethylene glycol (Carbowax 6000) | 45.0 g |
| Corn starch | 30.0 g |
| Dry sodium stearate | 3.0 g |
| Dry magnesium stearate | 3.0 g |

-continued

| Components | Amount |
|---|---|
| Ethanol | q.s. |

The active compound of this invention, citric acid, lactose, dicalcium phosphate, Pullonic F-68 and sodium laurylstearate are mixed. The mixture is screened with No. 60 screen and is granulated with an alcohol solution containing polyvinylpyrrolidone, carbowax 1500 and 6000. If required, an alcohol is added thereto so that the powder mixture is made a paste-like mass. Corn starch is added to the mixture and the mixture is continuously mixed to form uniform particles. The resulting particles are passed through No. 10 screen and entered into a tray and then dried in an oven at 100° C. for 12 to 14 hours. The dried particles are screened with No. 16 screen and thereto are added dry sodium laurylsulfate and dry magnesium stearate, and the mixture is tabletted to form the desired shape.

The core tablets thus prepared are vanished and dusted with talc in order to guard from wetting. Undercoating is applied to the core tablets. In order to administer the tablets orally, the core tablets are vanished several times. In order to give round shape and smooth surface to the tablets, further undercoating and coating with lubricant are applied thereto. The tablets are further coated with a coloring coating material until the desired colored tablets are obtained. After drying, the coated tablets are polished to obtain the desired tablets having uniform gloss.

PREPARATION 3

An injection preparation is prepared from the following components.

| Components | Amount |
|---|---|
| 4-Methyl-1-[4-(2,3-dimethylbenzoylamino)benzoyl]-2,3,4,5-tetrahydro-1H-1,4-benzodiazepine | 5 g |
| Polyethylene glycol (molecular weight: 4000) | 0.3 g |
| Sodium chloride | 0.9 g |
| Polyoxyethylene sorbitan monooleate | 0.4 g |
| Sodium metabisulfite | 0.1 g |
| Methyl-paraben | 0.18 g |
| Propyl-paraben | 0.02 g |
| Distilled water for injection | 10.0 ml |

The above parabens, sodium metabisulfite and sodium chloride are dissolved in distilled water of half volume of the above with stirring at 80° C. The solution thus obtained is cooled to 40° C., and the active compound of this invention and further polyethylene glycol and polyoxyethylene sorbitan monooleate are dissolved in the above solution. To the solution is added distilled water for injection to adjust to the desired volume, and the solution is sterilized by filtering with an appropriate filter paper to give an injection preparation.

REFERENCE EXAMPLE 1

To a solution of 1,2,3,4-tetrahydroquinoline (28.7 g) in acetone (400 ml) and water (200 ml) is added potassium carbonate (38.8 g), and thereto is added p-nitrobenzoyl chloride (40 g) under ice-cooling and the mixture is stirred at room temperature overnight. To the reaction mixture is added a suitable amount of water. The precipitated crystal is collected by filtration and dried to give 1-(4-nitrobenzoyl)-1,2,3,4-tetrahydroquinoline (40.8 g) as white powder, m.p. 86°-88° C.

REFERENCE EXAMPLE 2

To a solution of 10% Pd-C (5 g) in ethanol (500 ml) is added 1-(4-nitrobenzoyl)-1,2,3,4-tetrahydroquinoline (53.4 g) and the mixture is subjected to catalytic reduction at ordinary temperature under atmospheric pressure of hydrogen. After the reduction, 10% Pd-C is removed by filtration, and the filtrate is concentrated under reduced pressure to give 1-(4-aminobenzoyl)-1,2,3,4-tetrahydroquinoline (46.7 g) as yellow powder, m.p. 185°-188° C.

REFERENCE EXAMPLE 3

Using the suitable starting materials, the following compounds are obtained in the same manner as in Reference Example 1.

1-(3-Nitrobenzoyl)-1,2,3,4-tetrahydroquinoline, white powder, m.p. 134°-136° C.

1-(2-Nitrobenzoyl)-1,2,3,4-tetrahydroquinoline, yellow powder, m.p. 152°-154° C.

3-Methyl-1-(4-nitrobenzoyl)-1,2,3,4-tetrahydroquinoline, yellow powder, m.p. 109°-110° C.

4-Methyl-1-(4-nitrobenzoyl)-1,2,3,4-tetrahydroquinoline, yellow powder, m.p. 134°-136° C.

2-Methyl-1-(4-nitrobenzoyl)-1,2,3,4-tetrahydroquinoline, yellow powder, m.p. 143°-145° C.

1-(4-Nitrobenzoyl)-2,3,4,5-tetrahydro-1H-benzazepine, yellow powder, m.p. 143°-145° C.

1-(3-Methyl-4-nitrobenzoyl)-2,3,4,5-tetrahydro-1H-benzazepine, white powder, m.p. 100°-102° C.

1-(3-Methoxy-4-nitrobenzoyl)-2,3,4,5-tetrahydro-1H-benzazepine, yellow powder, m.p. 146°-148° C.

1-(4-Nitrobenzoyl)-1,2,3,4,5,6-hexahydrobenzazocine, white powder, m.p. 83°-85° C.

1-(4-Nitrobenzoyl)-3,4-dihydro-2H-1,4-benzoxazine, yellow powder, m.p. 167°-169° C.

1-(4-Nitrobenzoyl)-1,2,3,5-tetrahydro-4,1-benzoxazepine, yellow powder, m.p. 196°-198° C.

1-(4-Nitrobenzoyl)-4-methyl-1,2,3,4-tetrahydroquinoxaline, brown powder $^1$H-NMR ($CDCl_3$) δ: 3.03 (3H, s), 3.54 (2H, t, J=5.7 Hz), 4.06 (2H, t, J=5.7 Hz, 6.2-6.5 (2H, m), 6.70 (1H, d, J=8.2 Hz), 6.9-7.1 (1H, m), 7.54 (2H, d, J=8.8 Hz), 8.13 (2H, d, J=8.8 Hz).

1-(4-Nitrobenzoyl)-5-methyl-2,3,4,5-tetrahydro-1H-1,5-benzodiazepine, yellow oil $^1$H-NMR ($CDCl_3$) δ: 1.7-2.0 (1H, m), 2.0-2.3 (1H, m), 2.8-3.0 (1H, m), 2.98 (3H, s), 3.0-3.2 (1H, m), 3.4-3.6 (1H, m), 4.6-4.8 (1H, m), 6.5-6.7 (2H, m), 6.94 (1H, d, J=8.1 Hz), 7.1-7.2 (1H, m), 7.33 (2H, d, J=8.9 Hz), 7.97 (2H, d, J=8.9 Hz).

1-(4-Nitrobenzoyl)-4-methyl-2,3,4,5-tetrahydro-1H-1,4-benzodiazepine, brown oil $^1$H-NMR ($CDCl_3$) δ: 2.44 (3H, s), 3.0-3.3 (3H, m), 3.77 (1H, d, J=13.7 Hz), 4.06 (1H, d, J=13.6 Hz), 4.9-5.1 (1H, m), 6.59 (1H, d, J=7.7 Hz), 6.97 (1H, t, J=7.6 Hz), 7.15 (1H, t, J=7.4 Hz), 7.2-7.5 (3H, m), 8.03 (2H, d, J=8.8 Hz).

1-(3-Methoxy-4-nitrobenzoyl)-4-methyl-2,3,4,5-tetrahydro-1H-1,4-benzodiazepine, yellow powder, m.p. 146°-148° C.

1-(4-Nitrobenzoyl)-4-n-propyl-2,3,4,5-tetrahydro-1H-1,4-benzodiazepine, yellow powder, m.p. 131°-133° C.

1-(4-Nitrobenzoyl)-5-chloro-1,2,3,4-tetrahydroquinoline, white powder, m.p. 134°-136° C.

1 (4-Nitrobenzoyl)-6-methoxy-1,2,3,4-tetrahydroquinoline, yellow powder, m.p. 149°-151° C.

1-(4-Nitrobenzoyl)-6-methyl-1,2,3,4-tetrahydroquinoline, yellow powder, m.p. 109°-110° C.

1-(4-Nitrobenzoyl)-7-methoxy-1,2,3,4-tetrahydroquinoline, yellow powder, m.p. 139°-141° C.

1-(4-Nitrobenzoyl)-3-(4-methyl-1-piperazinyl)-1,2,3,4-tetrahydroquinoline, yellow amorphous $^1$H-NMR ($CDCl_3$) : 2.29 (3H, s), 2.35-3.20 (11H, m), 3.86-4.15 (2H, m), 6.48-6.63 (1H, m), 6.89 (1H, t, J=7.4 Hz), 7.05 (1H, t, J=7.4 Hz), 7.22 (1H, d, J=7.4 Hz), 7.52 (2H, d, J=8.8 Hz), 8.11 (2H, d, J=8.8 Hz).

1-(4-Nitrobenzoyl)-3-(1-pyrrolidinyl)-1,2,3,4-tetrahydroquinoline, yellow amorphous $^1$H-NMR ($CDCl_3$) δ: 1.70-1.95 (4H, m), 2.52-3.30 (7H, m), 3.80-4.22 (2H, m), 6.52 (1H, brs), 6.88 (1H, t, J=7.6 Hz), 6.96-7.11 (1H, m), 7.20 (2H, d, J=7.6 Hz), 7.54 (2H, d, J=8.8 Hz), 8.12 (2H, d, J=8.8 Hz).

1-(4-Nitrobenzoyl)-4-oxo-1,2,3,4-tetrahydroquinoline, yellow powder, m.p. 189°-190° C.

1-(4-Nitrobenzoyl)-3-hydroxymethyl-1,2,3,4-tetrahydroquinoline, yellow powder, m.p. 97°-100° C.

1-(4-Nitrobenzoyl)-3-ethoxycarbonyl-1,2,3,4-tetrahydroquinoline, pale yellow powder, m.p. 162°-163° C.

1-(4-Nitrobenzoyl)-4-dimethylamino-1,2,3,4-tetrahydroquinoline, light brown oil $^1$H-NMR ($CDCl_3$) δ: 1.80-2.02 (1H, m), 2.20-2.50 (7H, m), 3.47 (1H, t, J=4.9 Hz), 3.70-3.88 (1H, m), 4.06-4.25 (1H, m), 6.46 (1H, d, J=7.5 Hz), 6.89 (1H, t, J=7.5 Hz), 7.05 (1H, t, J=7.5 Hz), 7.34 (1H, d, J=7.5 Hz), 7.50 (2H, d, J=7.0 Hz), 8.10 (2H, d, J=7.0 Hz).

REFERENCE EXAMPLE 4

Using the suitable starting materials, the following compounds are obtained in the same manner as in Reference Example 2.

1-(3-Aminobenzoyl)-1,2,3,4-tetrahydroquinoline, white powder, m.p. 128°-130° C.

1-(2-Aminobenzoyl)-1,2,3,4-tetrahydroquinoline, yellow powder $^1$H-NMR ($CDCl_3$) δ: 2.01 (2H, quint, J=6.6 Hz), 2.81 (2H, t, J=6.6 Hz), 3.86 (2H, t, J=6.4 Hz), 4.6-4.8 (2H, m), 6.43 (1H, t, J=7 Hz), 6.66 (1H, d, J=8 Hz), 6.79 (1H, dd, J=1.4 Hz, J=7.6 Hz), 6.8-7.2 (5H, m).

3-Methyl-1-(4-aminobenzoyl)-1,2,3,4-tetrahydroquinoline, yellow powder, m.p. 197°-200° C.

4-Methyl-1-(4-aminobenzoyl)-1,2,3,4-tetrahydroquinoline, yellow powder, m.p. 197°-199° C.

2-Methyl-1-(4-aminobenzoyl)-1,2,3,4-tetrahydroquinoline, yellow powder, m.p. 204°-206° C.

1-(4-Aminobenzoyl)-2,3,4,5-tetrahydro-1H-benzazepine, yellow powder, m.p. 172°-174° C.

1-(3-Methyl-4-aminobenzoyl)-2,3,4,5-tetrahydro-1H-benzazepine, white powder, m.p. 156°-158° C.

1-(3-Methoxy-4-aminobenzoyl)-2,3,4,5-tetrahydro-1H-benzazepine, white powder, m.p. 165°-167° C.

1-(4-Aminobenzoyl)-1,2,3,4,5,6-hexahydrobenzazocine, white powder, m.p. 177°-179° C.

1-(4-Aminobenzoyl)-3,4-dihydro-2H-1,4-benzoxazine, white powder, m.p. 192°-194° C.

1-(4-Aminobenzoyl)-1,2,3,5-tetrahydro-4,1-benzoxazepine, yellow powder, m.p. 196°-198° C.

1-(4-Aminobenzoyl)-4-methyl-1,2,3,4-tetrahydroquinoxaline, yellow powder, m.p. 210°-212° C.

1-(4-Aminobenzoyl)-5-methyl-2,3,4,5-tetrahydro-1H-1,5-benzodiazepine, white powder, m.p. 159°-161° C.

1-(4-Aminobenzoyl)-4-methyl-2,3,4,5-tetrahydro-1H-1,4-benzodiazepine, brown powder, m.p. 169°-171° C.

1-(3-Methoxy-4-aminobenzoyl)-4-methyl-2,3,4,5-tetrahydro-1H-1,4-benzodiazepine, yellow oil $^1$H-NMR ($CDCl_3$) δ: 2.41 (3H, s), 2.9-3.2 (3H, m), 3.61 (3H, s), 3.6-4.2 (4H, m), 4.8-5.2 (1H, m), 6.38 (1H, d, J=8.1 Hz), 6.6-6.8 (3H, m), 6.9-7.2 (2H, m), 7.2-7.4 (1H, m).

1-(4-Aminobenzoyl)-4-n-propyl-2,3,4,5-tetrahydro-1H-1,4-benzazepine, brown powder, m.p. 151°-153° C.

1-(4-Aminobenzoyl)-5-chloro-1,2,3,4-tetrahydroquinoline, white powder, m.p. 174°-175° C.

1-(4-Aminobenzoyl)-6-methoxy-1,2,3,4-tetrahydroquinoline, pale yellow powder, m.p. 159°-160° C.

1-(4-Aminobenzoyl)-6-methyl-1,2,3,4-tetrahydroquinoline, white powder, m.p. 145°-146° C.

1-(4-Aminobenzoyl)-7-methoxy-1,2,3,4-tetrahydroquinoline, pale yellow powder, m.p. 150°-152° C.

1-(4-Aminobenzoyl)-3-(4-methyl-1-piperazinyl)-1,2,3,4-tetrahydroquinoline, light beige powder, m.p. 157°-159° C.

1-(4-Aminobenzoyl)-3-(1-pyrrolidinyl)-1,2,3,4-tetrahydroquinoline, pale yellow powder, m.p. 173°-174.5° C.

1-(4-Aminobenzoyl)-2,3-dihydro-4(1H)-quinolinone, pale yellow powder, m.p. 178°-180° C.

1-(4-Aminobenzoyl)-3-hydroxymethyl-1,2,3,4-tetrahydroquinoline, white powder, m.p. 179°-181° C.

1-(4-Aminobenzoyl)-3-ethoxycarbonyl-1,2,3,4-tetrahydroquinoline, pale yellow amorphous $^1$H-NMR ($CDCl_3$) δ: 1.21 (3H, t, J=7.1 Hz), 3.00-3.24 (3H, m), 3.70-4.30 (6H, m), 6.48 (2H, d, J=8.5 Hz), 6.69 (1H, d, J=7.9 Hz), 6.77-7.30 (5H, m).

1-(4-Aminobenzoyl)-4-dimethylamino-1,2,3,4-tetrahydroquinoline, brown oil $^1$H-NMR ($CDCl_3$) δ: 1.83-2.05 (1H, m), 2.13-2.30 (1H, m), 2.34 (6H, m), 3.55-3.83 (2H, m), 3.89 (1H, brs), 3.97-4.18 (1H, m), 6.47 (2H, d, J=7.0 Hz), 6.68 (1H, d, J=7.9 Hz), 6.85-7.05 (2H, m), 7.20 (2H, d, J=7.0 Hz), 7.37 (1H, d, J=7.4 Hz).

REFERENCE EXAMPLE 5

To terephthalic acid monomethyl ester (15 g) is added thionyl chloride (100 ml) and the mixture is refluxed for 2 hours. The thionyl chloride is distilled off under reduced pressure to give terephthalic acid chloride monomethyl ester. Separately, to a solution of 1,2,3,4-tetrahydroquinoline (14.4 g) in dichloromethane (200 ml) is added triethylamine (16.9 g) and further thereto is added slowly terephthalic acid chloride monomethyl ester obtained above under ice-cooling. Then, the mixture is stirred at room temperature for 1 hour. After completion of the reaction, water is added to the reaction mixture. The mixture is extracted with dichloromethane and dried over magnesium sulfate. The solvent is distilled off under reduced pressure and the resulting residue is purified by silica gel column chromatography (eluent; dichloromethane) to give 1-(4-methoxycarbonylbenzoyl)-1,2,3,4-tetrahydroquinoline (22.7 g) as white powder, m.p. 72°-74° C.

REFERENCE EXAMPLE 6

To a solution of 1-(4-methoxycarbonylbenzoyl)-1,2,3,4-tetrahydroquinoline (22.7 g) in methanol (300 ml) is added 5% aqueous sodium hydroxide solution (150 ml) and the mixture is refluxed for 2 hours. Methanol is distilled off under reduced pressure and the resulting residue is acidified with diluted hydrochloric acid, extracted with diethyl ether, and dried over magnesium sulfate. The solvent is distilled off under reduced pressure and the resulting crystal is collected by filtration to give 1-(4-carboxybenzoyl)-1,2,3,4-tetrahydroquinoline (13.2 g) as white powder, m.p. 181°-183° C.

REFERENCE EXAMPLE 7

Using the suitable starting materials, the following compounds are obtained in the same manner as in Reference Example 1.

5-Dimethylamino-1-(4-nitrobenzoyl)-2,3,4,5-tetrahydro-1H-benzazepine, pale yellow powder, m.p. 139°-142° C.

5-Dimethylamino-1-(3-methoxy-4-nitrobenzoyl)-2,3,4,5-tetrahydro-1H-benzazepine, white powder, m.p. 139°-141° C.

4-(N-Methyl-N-ethylamino)-1-(4-nitrobenzoyl)-1,2,3,4-tetrahydroquinoline, pale yellow oil $^1$H-NMR ($CDCl_3$) δ: 1.11 (3H, t, J=7.1 Hz), 1.90-2.25 (2H, m), 2.30 (3H, s), 2.57 (2H, q, J=7.1 Hz), 3.55-3.85 (2H, m), 4.00-4.21 (1H, m), 6.35-6.60 (1H, m), 6.80-6.98 (1H, t, J=7.9 Hz), 7.00-7.15 (1H, m), 7.33-7.60 (3H, m), 8.10 (2H, d, J=8.8 Hz).

4-Dimethylamino-1-(3-methoxy-4-nitrobenzoyl)-1,2,3,4-tetrahydroquinoline, brown oil $^1$H-NMR ($CDCl_3$) δ: 1.80-2.05 (1H, m), 2.33 (6H, s), 2.30-2.50 (1H, m), 3.40-3.52 (1H, m), 3.78 (3H, s), 3.70-3.88 (1H, m), 4.04-4.24 (1H, m), 6.52 (1H, d, J=8.2 Hz), 6.85-7.13 (4H, m), 7.28-7.38 (1H, m), 7.71 (1H, d, J=8.2 Hz)

1-(4-Nitrobenzoyl)-4-ethyl-2,3,4,5-tetrahydro-1H-1,4-benzodiazepine, yellow oil $^1$H-NMR ($CDCl_3$) δ: 1.16 (3H, t, J=7.1 Hz), 2.5-2.7 (2H, m), 3.0-3.3 (3H, m), 3.98 (2H, q, J=14 Hz), 4.8-5.0 (1H, m), 6.59 (1H, d, J=7.7 Hz), 6.96 (1H, t, J=7.7 Hz), 7.14 (1H, t, J=7.4 Hz), 7.2-7.4 (3H, m), 8.02 (2H, d, J=8.8 Hz).

1-(4-Nitrobenzoyl)-4-isopropyl-2,3,4,5-tetrahydro-1H-1,4-benzodiazepine, yellow powder, m.p. 222°-223° C.

1-(4-Nitrobenzoyl)-4-cyclohexyl-2,3,4,5-tetrahydro-1H-1,4-benzodiazepine, brown oil $^1$H-NMR ($CDCl_3$) δ: 1.0-1.5 (5H, m), 1.5-2.1 (5H, m), 2.4-2.7 (1H, m), 2.9-3.3 (3H, m), 3.94 (2H, s), 4.9-5.1 (1H, m), 6.57 (1H, d, J=7.7 Hz), 6.8-7.0 (1H, m), 7.0-7.2 (1H, m), 7.2-7.4 (3H, m), 8.01 (2H, d, J=8.8 Hz).

1-(4-Nitrobenzoyl)-5-methyl-1,2,3,4,5,6-hexahydro-1,5-benzodiazocine, yellow oil $^1$H-NMR ($CDCl_3$) δ: 1.5-2.1 (2H, m), 2.40 (3H, s), 2.3-2.6 (1H, m), 2.8-3.2 (2H, m), 3.50 (1H, d, J=13.4 Hz), 3.84 (1H, d, J=13.4 Hz), 4.8-5.0 (1H, m), 7.0-7.3 (4H, m), 7.41 (2H, d, J=8.9 Hz), 8.00 (2H, d, J=8.9 Hz).

1-(4-Nitrobenzoyl)-1,2,3,4-tetrahydro-5,1-benzoxazepine, white powder, m.p. 144.5°-145.5° C.

1-(2-Nitrobenzoyl)-4-methyl-2,3,4,5-tetrahydro-1H-1,4-benzodiazepine, yellow powder, m.p. 177°-180° C.

1-(3 Nitrobenzoyl)-4-methyl-2,3,4,5-tetrahydro-1H-1,4-benzodiazepine, yellow powder, m.p. 145°-146° C.

6-Fluoro-1-(4-nitrobenzoyl)-1,2,3,4-tetrahydroquinoline, yellow needles, m.p. 145°-146° C.

REFERENCE EXAMPLE 8

Using the suitable starting materials, the following compounds are obtained in the same manner as in Reference Example 2.

5-Dimethylamino-1-(4-aminobenzoyl)-2,3,4,5-tetrahydro-1H-benzazepine, white powder, m.p. 120°-122° C.

5-Dimethylamino-1-(3-methoxy-4-amino)-2,3,4,5-tetrahydro-1H-benzazepine, white powder, m.p. 121°-123° C.

4-(N-Methy-N-ethylamino)-1-(4-aminobenzoyl)-1,2,3,4-tetrahydroquinoline, orange amorphous $^1$H-NMR ($CDCl_3$) δ: 1.11 (3H, t, J=7.1 Hz), 1.90-2.20 (2H, m), 2.28 (3H, s), 2.26 (2H, q, J=7.1 Hz), 3.60-4.25 (5H, m), 6.48 (2H, d, J=8.5 Hz), 6.69 (1H, d, J=7.9 Hz), 6.80-7.05 (2H, m), 7.24 (2H, d, J=8.5 Hz), 7.46 (1H, d, J=6.2 Hz).

4-Dimethylamino-1-(3-methoxy-4-aminobenzoyl)-1,2,3,4-tetrahydroquinoline, pale yellow amorphous $^1$H-NMR ($CDCl_3$) δ: 1.83-2.04 (1H, m), 2.15-2.32 (1H, m), 2.33 (6H, s), 3.50-3.82 (2H, m), 3.64 (3H, s), 3.95-4.18 (3H, m), 6.50 (1H, d, J=7.9 Hz), 6.65 (1H, dd, J=7.9 Hz, 1.1 Hz), 6.78-7.03 (4H, m), 7.34 (1H, dd, J=7.5 Hz, 1.5 Hz)

1-(4-Aminobenzoyl)-4-ethyl-2,3,4,5-tetrahydro-1H-1,4-benzodiazepine, white powder, m.p. 186°-188° C.

1-(4-Aminobenzoyl)-4-isopropyl-2,3,4,5-tetrahydro-1H-1,4-benzodiazepine, white powder, m.p. 191°-192° C.

1-(4-Aminobenzoyl)-4-cyclohexyl-2,3,4,5-tetrahydro-1H-1,4-benzodiazepine, white powder, m.p. 149.5°-150.5° C.

1-(4-Aminobenzoyl)-5-methyl-1,2,3,4,5,6-hexahydro-1,5-benzodiazocine, yellow powder, m.p. 143°-145° C.

1-(4-Aminobenzoyl)-1,2,3,4-tetrahydro-5,1-benzoxazepine, yellow powder, m.p. 163.5°-164.5° C.

1-(2-Aminobenzoyl)-4-methyl-2,3,4,5-tetrahydro-1H-1,4-benzodiazepine, yellow powder, m.p. 144°-146° C.

1-(3-Aminobenzoyl)-4-methyl-2,3,4,5-tetrahydro-1H-1,4-benzodiazepine, white powder, mp. 153°-155° C.

6-Fluoro-1-(4-aminobenzoyl)-1,2,3,4-tetrahydroquinoline, white powder, m.p. 160.5°-161.5° C.

REFERENCE EXAMPLE 9

Using the suitable starting materials, the following compounds are obtained in the same manner as in Reference Example 1.

1-(2-Chloro-4-nitrobenzoyl)-4-methyl-2,3,4,5-tetrahydro-1H-1,4-benzodiazepine $^1$H-NMR ($CDCl_3$) δ: 2.40 (3H, s), 2.96-3.33 (3H, m), 3.60-3.79 (1H, m), 3.96-4.23 (1H, m), 4.70-4.91 (1H, m), 6.80-7.43 (5H, m), 7.80-7.99 (1H, m), 8.08-8.21 (1H, m).

1-(3-Methyl-4-nitrobenzoyl)-4-methyl-2,3,4,5-tetrahydro-1H-1,4-benzodiazepine $^1$H-NMR ($CDCl_3$) δ: 2.43 (3H, s), 2.48 (3H, s), 2.92-3.28 (3H, m), 3.91 (2H, AB-q, J=13.9 Hz, 45.5 Hz), 4.77-5.01 (1H, m), 6.54-6.70 (1H, m), 6.88-7.37 (5H, m), 7.62-7.78 (1H, m).

5-Dimethylamino-1-(2-chloro-4-nitrobenzoyl)-2,3,4,5-tetrahydro-1H-benzazepine $^1$H-NMR ($CDCl_3$) δ: 1.23-2.57 (10H, m), 2.68-5.15 (3H, m), 6.79-7.45 (4H, m), 7.49-8.39 (3H, m)

5-Oxo-1-(4-nitrobenzoyl)-2,3,4,5-tetrahydro-1H-benzazepine, white powder (ethyl acetate/n-hexane), m.p. 147°-148° C.

5-Hydroxy-1-(4-nitrobenzoyl)-2,3,4,5-tetrahydro-1H-benzazepine, white powder (ethyl acetate/n-hexane), m.p. 148°-150° C.

5-Methoxy-1-(4-nitrobenzoyl)-2,3,4,5-tetrahydro-1H-benzazepine, colorless amorphous $^1$H-NMR ($CDCl_3$) δ: 1.47-2.48 (4H, m), 2.70-3.10 (1H, m), 3.26-3.64 (3H, m), 4.29-5.12 (2H, m), 6.60 (1H, d, J=7.7 Hz), 6.88-7.67 (5H, m), 7.92-8.12 (2H, m).

5-Ethoxycarbonylmethoxy-1-(4-nitrobenzoyl)-2,3,4,5-tetrahydro-1H-benzazepine, white powder, m.p.

107°-108° C. (recrystallized from ethyl acetate/n-hexane)

5-(4-Bromobutoxy)- 1-(4-nitrobenzoyl)-2,3,4,5-tetrahydro-1H-benzazepine, colorless oil $^1$H-NMR ($CDCl_3$) δ: 1.49-2.55 (8H, m), 2.72-3.07 (1H, m), 3.24-3.77 (4H, m), 4.40-5.15 (2H, m), 6.53-6.66 (1H, m), 6.91-7.06 (1H, m), 7.07-7.80 (4H, m), 7.94-8.13 (2H, m).

5-(4-Dimethylaminobutoxy)-1-(4-nitrobenzoyl)-2,3,4,5-tetrahydro-1H-benzazepine, colorless oil $^1$H-NMR ($CDCl_3$) δ: 1.51-1.88 (6H, m), 2.23-2.61 (4H, m), 2.27 (3H, s), 2.35 (3H, s), 2.74-3.14 (1H, m), 3.55-3.77 (2H, m), 4.48-5.11 (2H, m), 6.54-6.66 (1H, m), 6.91-7.04 (1H, m), 7.06-7.80 (4H, m), 7.93-8.11 (2H, m).

5-[4-(Phthalimid-1-yl)propoxy-1-(4-nitrobenzoyl)-2,3,4,5-tetrahydro-1H-benzazepine, colorless amorphous $^1$H-NMR ($CDCl_3$) δ: 1.48-2.56 (6H, m), 2.71-3.05 (1H, m), 3.40-4.05 (4H, m), 4.47-5.11 (2H, m), 6.50-6.64 (1H, m), 6.84-7.03 (1H, m), 7.03-7.20 (1H, m), 7.20-7.57 (2H, m), 7.57-7.93 (5H, m), 7.97-8.20 (2H, m).

5-Chloro-1-(4-nitrobenzoyl)-2,3,4,5-tetrahydro-1H-benzazepine, light brown powder $^1$H-NMR ($CDCl_3$) δ: 1.75-3.3 (4H, m), 4.6-6.25 (3H, m), 6.45-6.7 (1H, m), 6.8-7.5 (4H, m), 7.55-7.7 (1H, m), 7.9-8.1 (2H, m).

5-Oxo-1-(2-chloro-4-nitorobenzoyl)-2,3,4,5-tetrahydro-1H-benzazepine, pale yellow amorphous $^1$H-NMR ($CDCl_3$) δ: 1.95-2.45 (2H, m), 2.94 (1H, t, J=6 Hz), 3.05-5.3 (2H, m), 6.96-7.1 (1H, m), 7.12-7.5 (3H, m), 7.75-7.85 (1H, m), 7.95-8.1 (1H, m), 8.14 (1H, s).

4-Dimethylaminomethyl-1-(4-nitrobenzoyl)-1,2,3,4-tetrahydroquinoline, white powder, m.p. 117°-119° C.

3-Dimethylamino-1-(4-nitrobenzoyl)-2,3,4,5-tetrahydro-1H-benzazepine, yellow oil $^1$H-NMR ($CDCl_3$) δ: 1.5-1.7 (1H, m), 2.1-2.4 (1H, m), 2.42 (6H, s), 2.6-2.7 (1H, m), 2.8-3.0 (3H, m), 5.1-5.3 (1H, m), 6.62 (1H, d, J=7.8 Hz), 6.95 (1H, t, J=7.7 Hz), 7.14 (1H, t, J=7.5 Hz), 7.2-7.4 (3H, m), 8.00 (2H, d, J=8.9 Hz).

3-Dimethylamino-1-(3-methoxy-4-nitrobenzoyl-2,3,4,5-tetrahydro-1H-benzazepine, yellow oil $^1$H-NMR ($CDCl_3$) δ: 1.5-1.7 (1H, m), 2.0-2.3 (1H, m), 2.41 (6H, s), 2.5-2.8 (1H, m), 2.8-3.0 (3H, m), 3.75 (3H, s), 5.1-5.3 (1H, m), 6.6-6.8 (2H, m), 6.9-7.3 (4H, m), 7.59 (1H, d, J=8.3 Hz).

4-(4-Nitrobenzoyl)-3,4-dihydro-2H-1,4-benzothiazine, yellow powder, m.p. 180°-182° C.

5-(4-Nitrobenzoyl)-2,3,4,5-tetrahydro-1,5-benzothiazepine, yellow powder, m.p. 162°-163° C.

REFERENCE EXAMPLE 10

Using the suitable starting materials, the following compounds are obtained in the same manner as in Reference Example 2.

1-(2-Chloro-4-aminobenzoyl)-4-methyl-2,3,4,5-tetrahydro-1H-1,4-benzodiazepine, white powder (recrystallized from methanol/diethyl ether), m.p. 194.5°-195.5° C.

1-(3-Methyl-4-aminobenzoyl)-4-methyl-2,3,4,5-tetrahydro-1H-1,4-benzodiazepine $^1$H-NMR ($CDCl_3$) δ: 2.01 (3H, s), 2.41 (3H, s), 2.82-3.21 (3H, m), 3.50-4.21 (4H, m), 4.78-5.14 (1H, m), 6.24-6.40 (1H, m), 6.59-6.82 (2H, m), 6.90-7.18 (3H, m), 7.19-7.34 (1H, m).

5-Dimethylamino-1-(2-chloro-4-aminobenzoyl)-2,3,4,5-tetrahydro-1H-benzazepine, white powder (recrystallized from dichloromethane/diethyl ether), m.p. 162°-164° C.

5-Dimethylamino-1-(2-methoxy-4-aminobenzoyl)-2,3,4,5-tetrahydro-1H-benzazepine (recrystallized from methanol/diethyl ether)

$^1$H-NMR ($CDCl_3$) δ: 1.23-2.80 (11H, m), 2.90-3.38 (1H, m), 3.50-5.19 (6H, m), 5.87-6.41 (2H, m), 6.65-7.56 (5H, m).

5-Methoxy-1-(4-aminobenzoyl)-2,3,4,5-tetrahydro-1H-benzazepine, white powder (recrystallized from ethyl acetate/n-hexane), m.p. 154°-155° C.

5-Ethoxycarbonylmethoxy-1-(4-aminobenzoyl)-2,3,4,5-tetrahydro-1H-benzazepine, white powder (recrystallized from ethyl acetate/n-hexane), m.p. 231°-232° C.

5-(4-Dimethylaminobutoxy)-1-(4-aminobenzoyl)-2,3,4,5-tetrahydro-1H-benzazepine, colorless oil $^1$H-NMR ($CDCl_3$) δ: 1.47-1.83 (6H, m), 1.83-2.54 (4H, m), 2.29 (6H, s), 2.61-3.00 (1H, m), 3.36-3.76 (2H, m), 4.35-5.20 (2H, m), 6.27-6.48 (2H, m), 6.57-6.76 (1H, m), 6.90-7.61 (5H, m).

5-[4-(Phthalimid-1-yl)propoxy]-1-(4-aminobenzoyl)-2,3,4,5-tetrahydro-1H-benzazepine, colorless amorphous $^1$H-NMR ($CDCl_3$) δ: 1.30-2.47 (6H, m), 2.57-3.01 (1H, m), 3.30-4.06 (4H, m), 4.34-5.20 (2H, m), 6.30-6.53 (2H, m), 6.57-6.78 (1H, m), 6.87-7.57 (5H, m), 7.62-7.76 (2H, m), 7.76-7.97 (2H, m).

5-Chloro-1-(4-aminobenzoyl)-2,3,4,5-tetrahydro-1H-benzazepine, pale yellow amorphous $^1$H-NMR ($CDCl_3$) δ: 1.35-4.3 (7H, m), 4.55-6.7 (2H, m), 6.3-6.55 (2H, m), 6.6-6.8 (1H, m), 6.85-7.45 (5H, m).

5-Oxo-1-(4-aminobenzoyl)-2,3,4,5-tetrahydro-1H-benzazepine, pale yellow amorphous $^1$H-NMR ($CDCl_3$) δ: 1.95-2.35 (2H, m), 2.89 (2H, t, J=6.3 Hz), 3.0-5.3 (4H, m), 6.35-6.47 (2H, m), 6.72-6.83 (1H, m), 7.0-7.15 (2H, m), 7.18-7.32 (2H, m), 7.81-7.93 (1H, m).

5-Oxo 1-(2-chloro-4-aminobenzoyl)-2,3,4,5-tetrahydro-1H-benzazepine, white powder $^1$H-NMR ($CDCl_3$) δ: 1.85-2.3 (2H, m), 2.87 (2H, t, J=6.2 Hz), 3.1-4.75 (4H, m), 6.15-7.5 (6H, m), 7.65-7.9 (1H, m).

4-Dimethylaminomethyl-1-(4-aminobenzoyl)-1,2,3,4-tetrahydroquinoline, white powder, m.p. 123°-125° C.

3-Dimethylamino-1-(4-aminobenzoyl)-2,3,4,5-tetrahydro-1H-benzazepine, white powder, m.p. 175°-177° C.

3-Dimethylamino-1-(3-methoxy-4-aminobenzoyl)-2,3,4,5-tetrahydro 1H-benzazepine, yellow oil $^1$H-NMR ($CDCl_3$) δ: 1.5-1.7 (1H, m), 2.1-2.3 (1H, m), 2.3-2.6 (1H, m), 2.40 (6H, s), 2.7-3.0 (3H, m), 3.60 (3H, s), 3.8-4.0 (2H, br), 5.2-5.4 (1H, m), 6.37 (1H, d, J=8.2 Hz), 6.5-6.8 (3H, m), 6.9-7.4 (3H, m).

4-(4-Aminobenzoyl)-3,4-dihydro-2H-1,4-benzothiazine, yellow powder, m.p. 207°-210° C.

5-(4-Aminobenzoyl)-2,3,4,5-tetrahydro-1,5-benzothiazepine, yellow powder, m.p. 193°-195° C.

REFERENCE EXAMPLE 11

Using the suitable starting materials, the following compounds are obtained in the same manner as in Reference Example 1.

5-Carbamoyloxy-1-(4-nitrobenzoyl)-2,3,4,5-tetrahydro-1H-benzazepine, white powder, m.p. 243°-244° C. (recrystallized from ethyl acetate/diisopropyl ether)

5-Methylaminocarbonyloxy-1-(4-nitrobenzoyl)-2,3,4,5-tetrahydro-1H-benzazepine, white powder, m.p.

207°-208° C. (recrystallized from ethyl acetate/n-hexane)

5-Dimethylaminocarbonyloxy-1-(4-nitrobenzoyl)-2,3,4,5-tetrahydro-1H-benzazepine, white powder, m.p. 155°-156° C. (recrystallized from ethyl acetate/diisopropyl ether/n-hexane)

5-Methylidenyl-1-(4-nitrobenzoyl)-2,3,4,5-tetrahydro-1H-benzazepine, colorless prisms, m.p. 133.5°-134° C. (recrystallized from ethyl acetate/diisopropyl ether)

5-Oxo-6-methyl-1-(2-chloro-4-nitrobenzoyl)-2,3,4,5-tetrahydro-1H-benzazepine, colorless prisms, m.p. 90°-92° C. (recrystallized from ethanol)

1-(4-Nitrobenzoyl)-1,2,3,5-tetrahydro-4,1-benzothiazepine, yellow powder, m.p. 185°-187° C. (recrystallized from dichloromethane/diethyl ether)

5-Dimethylamino-1-(2-dimethylamino-4-nitrobenzoyl)-2,3,4,5-tetrahydro-1H-benzazepine, yellow powder, m.p. 123°-125° C. (recrystallized from diethyl ether/dichloromethane)

5-Oxo-1-(4-nitrobenzoyl)-2,3,4,5-tetrahydro-1H-1,4-benzodiazepine, white powder, m.p. 201.5°-202.5° C. (recrystallized from diethyl ether/dichloromethane)

5-Oxo-4-methyl-1-(4-nitrobenzoyl)-2,3,4,5-tetrahydro-1H-1,4-benzodiazepine, white powder, m.p. 136°-138° C. (recrystallized from diethyl ether/dichloromethane)

5-Dimethylamino-1-(3-methyl-4-nitrobenzoyl)-2,3,4,5-tetrahydro-1H-benzazepine, yellow oil $^1$H-NMR ($CDCl_3$) δ: 1.16-3.18 (11H, m), 2.18 (3H, s), 3.40-5.15 (2H, m), 6.50-7.68 (6H, m), 7.70-7.84 (1H, m).

5-Dimethylamino-1-(2-methyl-4-nitrobenzoyl)-2,3,4,5-tetrahydro-1H-benzazepine, colorless amorphous $^1$H-NMR ($CDCl_3$) δ: 1.19-2.86 (11H, m), 2.20 (3H, s), 2.94-3.24 (1H, m), 3.36-5.18 (1H, m), 6.49-8.20 (7H, m).

5-Dimethylamino-1-(2-fluoro-4-nitrobenzoyl)-2,3,4,5-tetrahydro-1H-benzazepine, yellow oil $^1$H-NMR ($CDCl_3$) δ: 1.21-2.66 (10H, m), 2.66-5.11 (3H, m), 6.63-8.25 (7H, m).

5-Dimethylamino-1-(3-fluoro-4-nitrobenzoyl)-2,3,4,5-tetrahydro-1H-benzazepine, white powder, m.p. 152°-152.5° C. (recrystallized from chloroform/diethyl ether)

REFERENCE EXAMPLE 12

Using the suitable starting materials, the following compounds are obtained in the same manner as in Reference Example 2.

5-Carbamoyloxy-1-(4-aminobenzoyl)-2,3,4,5-tetrahydro-1H-benzazepine, white powder, m.p. 215°-216° C. (recrystallized from ethyl acetate/n-hexane)

5-Methylaminocarbonyloxy-1-(4-aminobenzoyl)-2,3,4,5-tetrahydro-1H-benzazepine, white powder, m.p. 192°-195° C. (recrystallized from ethyl acetate/n-hexane)

5-Dimethylaminocarbonyloxy-1-(4-aminobenzoyl)-2,3,4,5-tetrahydro-1H-benzazepine, white powder, m.p. 228°-230° C. (recrystallized from ethyl acetate/diisopropyl ether)

5-Methyl-1-(4-aminobenzoyl)-2,3,4,5-tetrahydro-1H-benzazepine, white powder, m.p. 155°-156° C. (recrystallized from ethyl acetate/n-hexane)

5-Oxo-6-methyl-1-(2-chloro-4-aminobenzoyl)-2,3,4,5-tetrahydro-1H-benzazepine, white powder, m.p. 193°-195° C. (recrystallized from ethanol)

1-(4-Aminobenzoyl)-1,2,3,5-tetrahydro-4,1-benzothiazepine, white powder, m.p. 179°-180° C. (recrystallized from dichloromethane/diethyl ether)

5-Dimethylamino-1-(2-dimethylamino-4-aminobenzoyl)-2,3,4,5-tetrahydro-1H-benzazepine, white powder, m.p. 163°-165° C. (recrystallized from diethyl ether/dichloromethane)

5-Oxo-1-(4-aminobenzoyl)-2,3,4,5-tetrahydro-1H-benzazepine, yellow powder, m.p. 195°-197° C. (recrystallized from diethyl ether/dichloromethane)

5-Oxo-4-methyl-1-(4-aminobenzoyl)-2,3,4,5-tetrahydro-1H-1,4-benzazepine, yellow powder, m.p. 190°-192° C. (recrystallized from diethyl ether/dichloromethane)

5-Dimethylamino-1-(2-ethoxy-4-aminobenzoyl)-2,3,4,5-tetrahydro-1H-benzazepine, white powder, m.p. 111°-114° C. (recrystallized from diethyl ether)

5-Dimethylamino-1-(3-methyl-4-aminobenzoyl)-2,3,4,5-tetrahydro-1H-benzazepine, yellow oil $^1$H-NMR ($CDCl_3$) δ: 0.66-2.56 (14H, m), 2.93-5.22 (4H, m), 6.23-7.80 (7H, m).

5-Dimethylamino-1-(2-methyl-4-aminobenzoyl)-2,3,4,5-tetrahydro-1H-benzazepine, white powder, m.p. 154°-156° C. (recrystallized from methanol/diethyl ether)

5-Dimethylamino-1-(2-fluoro-4-aminobenzoyl)-2,3,4,5-tetrahydro-1H-benzazepine, white powder, m.p. 161°-163° C. (recrystallized from dichloromethane/diethyl ether)

5-Dimethylamino-1-(3-fluoro-4-aminobenzoyl)-2,3,4,5 tetrahydro-1H-benzazepine, white powder, m.p. 156°-157° C. (recrystallized from methanol/diethyl ether)

5-Oxo-1-(2-methoxy-4-aminobenzoyl)-2,3,4,5-tetrahydro-1H-benzazepine, colorless prisms, m.p. 160°-160.5° C. (recrystallized from methanol/diethyl ether)

EXAMPLE 1

To a solution of 1,2,3,4-tetrahydroquinoline (28.7 g) in acetone (400 ml) and water (200 ml) is added potassium carbonate (38.8 g) and further thereto is added 4-benzoylaminobenzoyl chloride (56 g) under ice-cooling. The mixture is stirred at room temperature overnight. Water is added to the reaction mixture, and the mixture is extracted with dichloromethane. The extract is dried over magnesium sulfate, and the solvent is distilled off under reduced pressure. The resulting residue is purified by silica gel column chromatography and recrystallized from methanol to give 1-[4-(benzoylamino)benzoyl]-1,2,3,4-tetrahydroquinoline (57 g) as white powder, m.p. 202.5°-203.5° C.

Using the suitable starting materials, the compounds as shown in the following Table 1 are obtained in the same manner as in Example 1.

TABLE 1

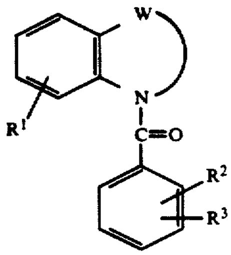

Example 2
Structure

-continued

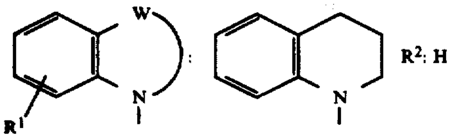

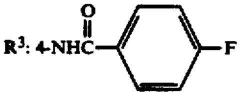

Crystalline form: Light yellow powder
Recrystallization solvent: Methanol
Melting Point: 198.5–199.5° C.
Form: Free
Example 3
Structure

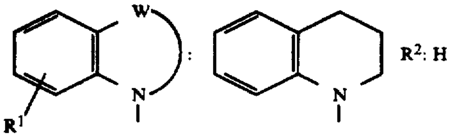

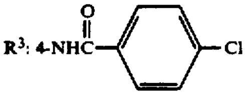

Crystalline form: White powder
Recrystallization solvent: Methanol
Melting Point: 200.5–201.5° C.
Form: Free
Example 4
Structure

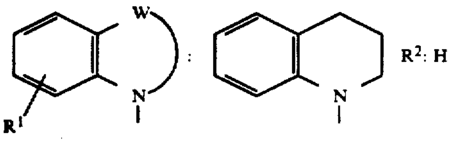

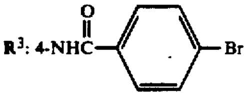

Crystalline form: Yellow powder
Recrystallization solvent: Methanol
Melting Point: 206–207° C.
Form: Free
Example 5
Structure

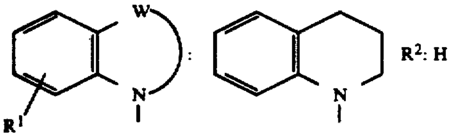

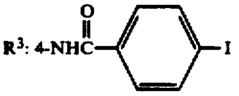

Crystalline form: Yellow powder
Recrystallization solvent: Methanol
Melting Point: 216–217° C.
Form: Free
Example 6
Structure -continued

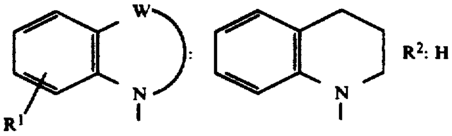

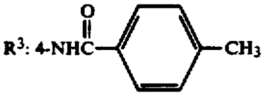

Crystalline form: White powder
Recrystallization solvent: Methanol
Melting Point: 202–203° C.
Form: Free
Example 7
Structure

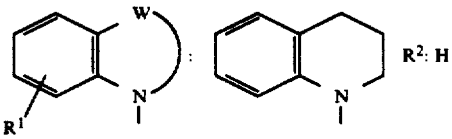

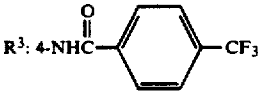

Crystalline form: White powder
Recrystallization solvent: Methanol
Melting Point: 212–213° C.
Form: Free
Example 8
Structure

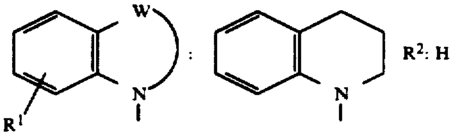

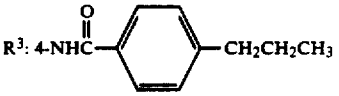

Crystalline form: White powder
Recrystallization solvent: Methanol
Melting Point: 167.5–168.5° C.
Form: Free
Example 9
Structure

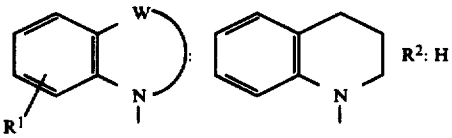

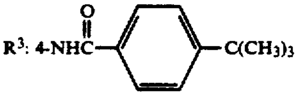

Crystalline form: White powder
Recrystallization solvent: Methanol
Melting Point: 205–206° C.
Form: Free
Example 10

-continued

Structure

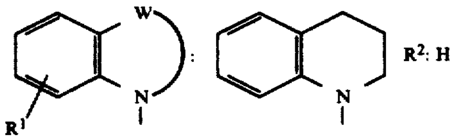

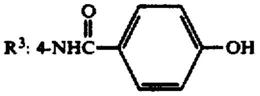

Crystalline form: White powder
Recrystallization solvent: Methanol
Melting Point: >300° C.
NMR analysis: 1)
Form: Free
Example 11
Structure

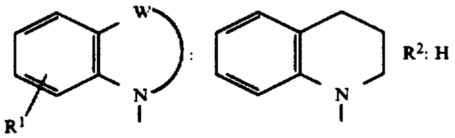

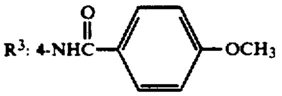

Crystalline form: Yellow powder
Recrystallization solvent: Methanol
Melting Point: 176–177° C.
Form: Free
Example 12
Structure

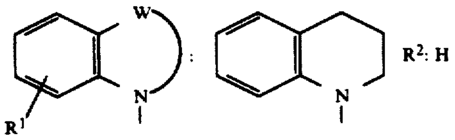

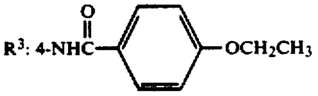

Crystalline form: White powder
Recrystallization solvent: Methanol
Melting Point: 219–220° C.
Form: Free
Example 13
Structure

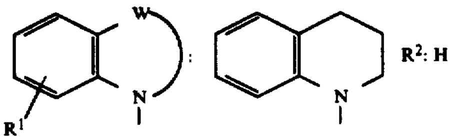

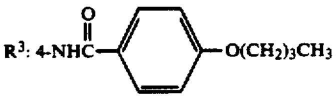

Crystalline form: White powder
Recrystallization solvent: Methanol
Melting Point: 193–194° C.

-continued

Form: Free
Example 14
Structure

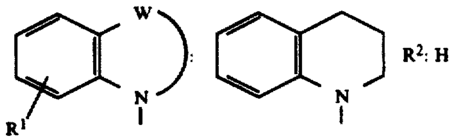

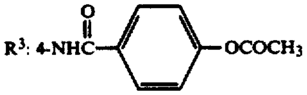

Crystalline form: White powder
Recrystallization solvent: Methanol
Melting Point: 232–233° C.
Form: Free
Example 15
Structure

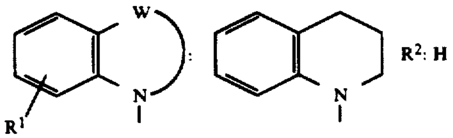

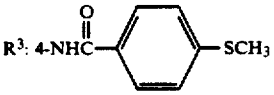

Crystalline form: White powder
Recrystallization solvent: Methanol
Melting Point: 209–210° C.
Form: Free
Example 16
Structure

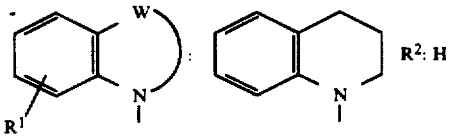

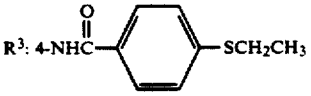

Crystalline form: White powder
Recrystallization solvent: Methanol
Melting Point: 184.5–185.5° C.
Form: Free
Example 17
Structure

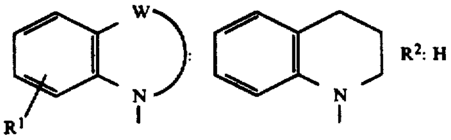

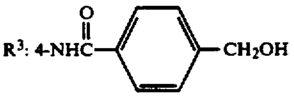

Crystalline form: White powder
Recrystallization solvent: Methanol

-continued

Melting Point: 224.5-225.5° C.
Form: Free
Example 18
Structure

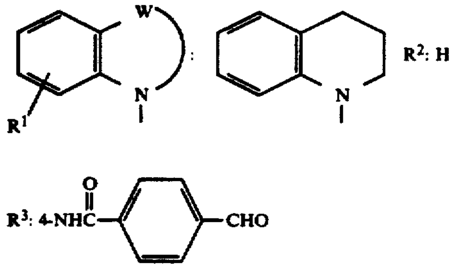

Crystalline form: White powder
Recrystallization solvent: Methanol
Melting Point: 220.5-221.5° C.
Form: Free
Example 19
Structure

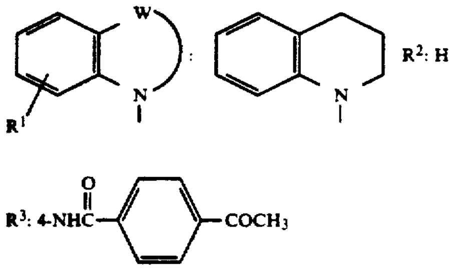

Crystalline form: Yellow powder
Recrystallization solvent: Methanol
Melting Point: 231-232° C.
Form: Free
Example 20
Structure

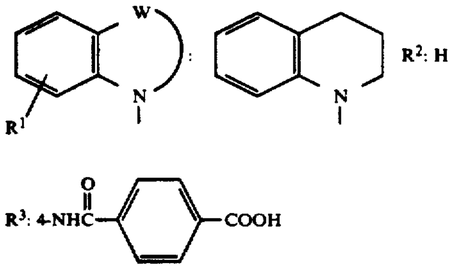

Crystalline form: White powder
Recrystallization solvent: Methanol
Melting Point: >300° C.
NMR analysis: 2)
Form: Free
Example 21
Structure

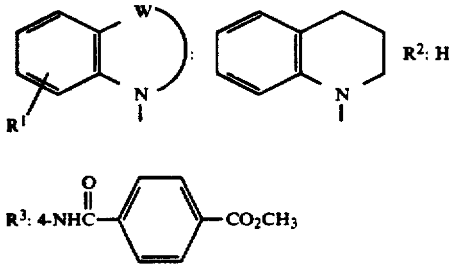

-continued

Crystalline form: White powder
Recrystallization solvent: Methanol
Melting Point: 208-209° C.
Form: Free
Example 22
Structure

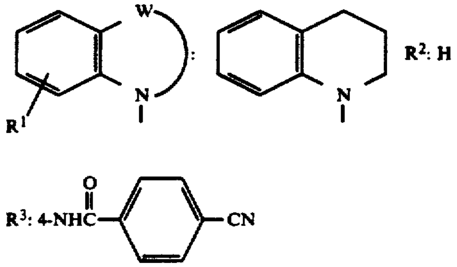

Crystalline form: White powder
Recrystallization solvent: Methanol
Melting Point: 234.5-235.5° C.
Form: Free
Example 23
Structure

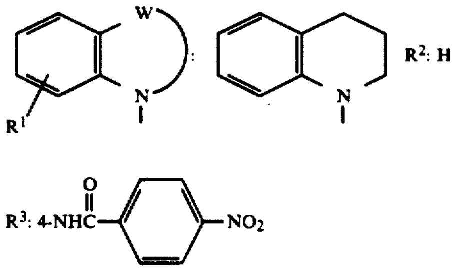

Crystalline form: Yellow powder
Recrystallization solvent: Methanol
Melting Point: 263.5-264.5° C.
Form: Free
Example 24
Structure

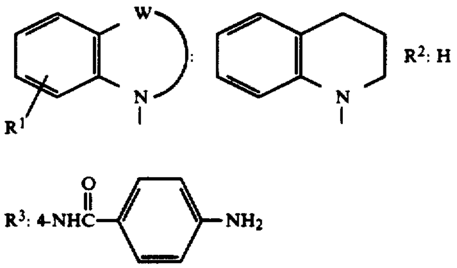

Crystalline form: White powder
Recrystallization solvent: Methanol
Melting Point: 237-238° C.
Form: Free
Example 25
Structure

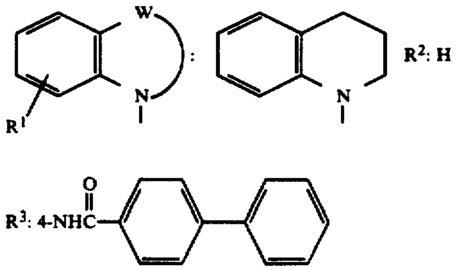

-continued

Crystalline form: White powder
Recrystallization solventi: Methanol
Melting Point: 234–235° C.
Form: Free
Example 26
Structure

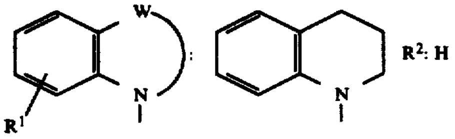

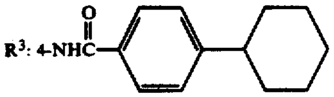

Crystalline form: White powder
Recrystallization solvent: Methanol
Melting Point: 236.5–237.5° C.
Form: Free
Example 27
Structure

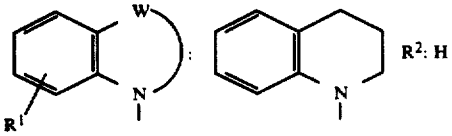

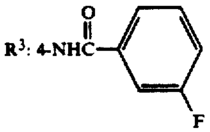

Crystalline form: White powder
Recrystallization solvent: Methanol
Melting Point: 206.5–207.5° C.
Form: Free
Example 28
Structure

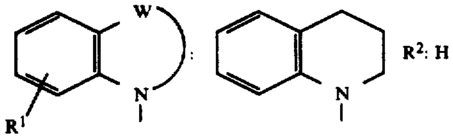

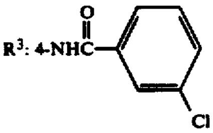

Crystalline form: White powder
Recrystallization solvent: Methanol
Melting Point: 210–211° C.
Form: Free
Example 29
Structure

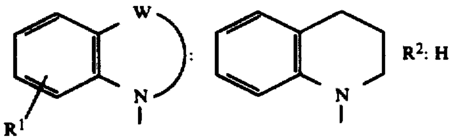

-continued

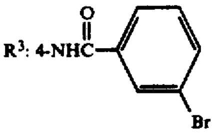

Crystalline form: White powder
Recrystallization solvent: Methanol
Melting Point: 210.5–211.5° C.
Form: Free
Example 30
Structure

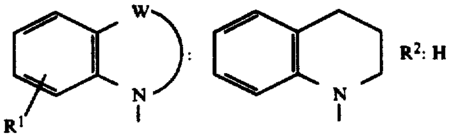

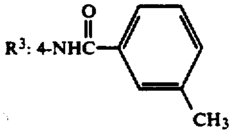

Crystalline form: White powder
Recrystallization solvent: Methanol
Melting Point: 178–179 °C.
Form: Free
Example 31
Structure

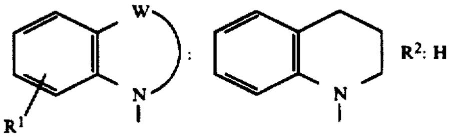

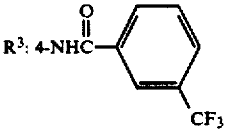

Crystalline form: White powder
Recrystallization solvent: Methanol
Melting Point: 192–193° C.
Form: Free
Example 32
Structure

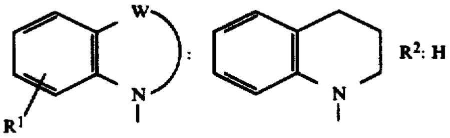

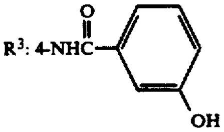

Crystalline form: White powder
Recrystallization solvent: Methanol
Melting Point: 217–218° C.
Form: Free
Example 33
Structure -continued

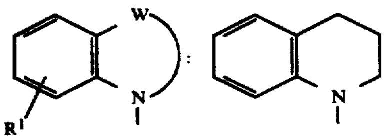
R²: H

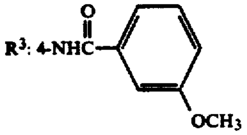

Crystalline form: White powder
Recrystallization solvent: Methanol
Melting Point: 143-144° C.
Form: Free
Example 34
Structure

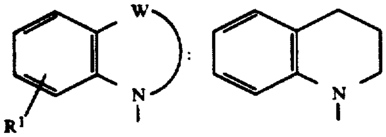
R²: H

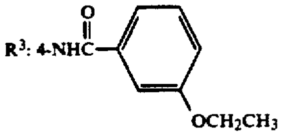

Crystalline form: White powder
Recrystallization solvent: Methanol
Melting Point: 170.5-171.5° C.
Form: Free
Example 35
Structure

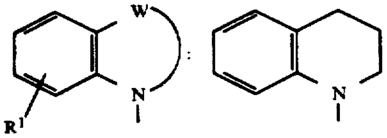
R²: H

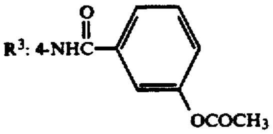

Crystalline form: White powder
Recrystallization solvent: Methanol
Melting Point: 169.5-170.5° C.
Form: Free
Example 36
Structure

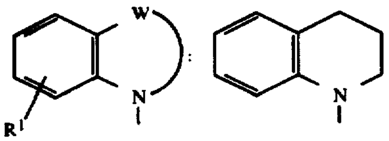
R²: H

-continued

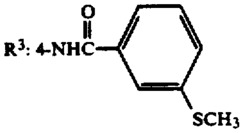

Crystalline form: White powder
Recrystallization solvent: Methanol
Melting Point: 174.5-175.5° C.
Form: Free
Example 37
Structure

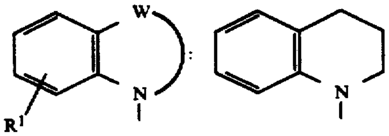
R²: H

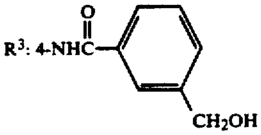

Crystalline form: White powder
Recrystallization solvent: Methanol
Melting Point: 148.5-149.5° C.
Form: Free
Example 38
Structure

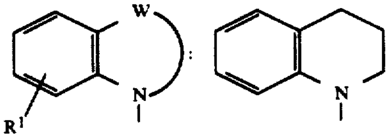
R²: H

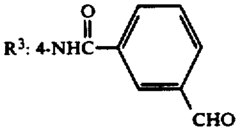

Crystalline form: White powder
Recrystallization solvent: Methanol
Melting Point: 165-166° C.
Form: Free
Example 39
Structure

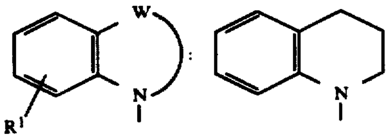
R²: H

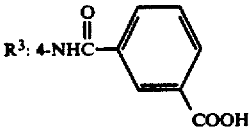

Crystalline form: White powder
Recrystallization solvent: Methanol
Melting Point: 243-244° C.
Form: Free
Example 40
Structure -continued

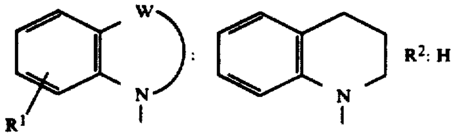

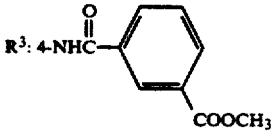

Crystalline form: White powder
Recrystallization solvent: Methanol
Melting Point: 199-200° C.
Form: Free
Example 41
Structure

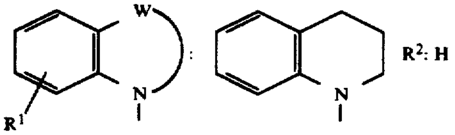

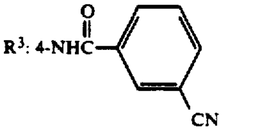

Crystalline form: White powder
Recrystallization solvent: Methanol
Melting Point: 232.5-233.5° C.
Form: Free
Example 42
Structure

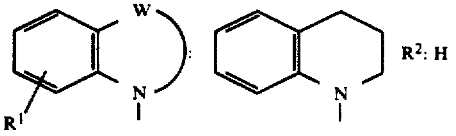

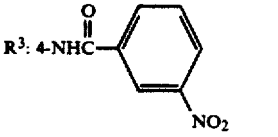

Crystalline form: White powder
Recrystallization solvent: Methanol
Melting Point: 178.5-179.5° C.
Form: Free
Example 43
Structure

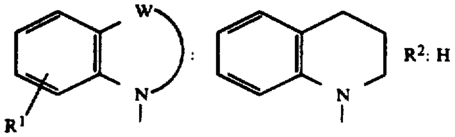

-continued

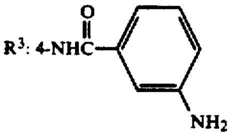

Crystalline form: White powder
Recrystallization solvent: Methanol
Melting Point: 205.5-206.5° C.
Form: Free
Example 44
Structure

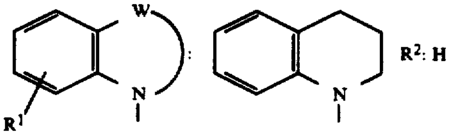

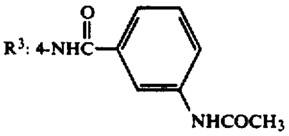

Crystalline form: White powder
Recrystallization solvent: Methanol
Melting Point: 234-235° C.
Form: Free
Example 45
Structure

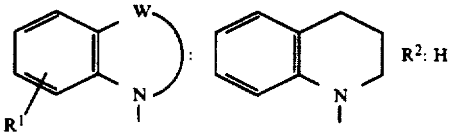

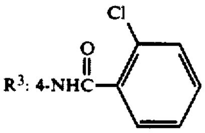

Crystalline form: White powder
Recrystallization solvent: Methanol
Melting Point: 225-226° C.
Form: Free
Example 46
Structure

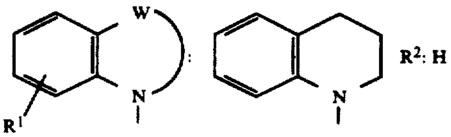

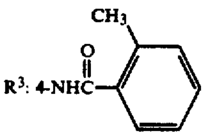

Crystalline form: White powder
Recrystallization solvent: Methanol
Melting Point: 224-225° C.
Form: Free
Example 47
Structure -continued

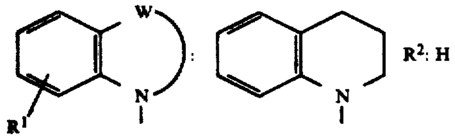

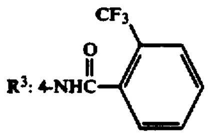

Crystalline form: White powder
Recrystallization solvent: Methanol
Melting Point: 236–237° C.
Form: Free
Example 48
Structure

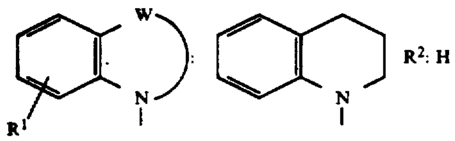

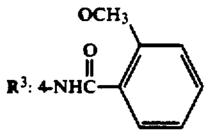

Crystalline form: Yellow powder
Recrystallization solvent: Methanol
Melting Point: 175.5–176.5° C.
Form; Free
Example 49
Structure

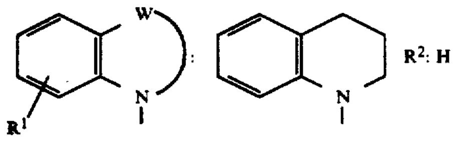

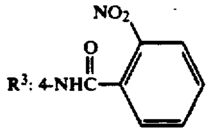

Crystalline form: White powder
Recrystallization solvent: Methanol
Melting Point: 231–232° C.
Form: Free
Example 50
Structure

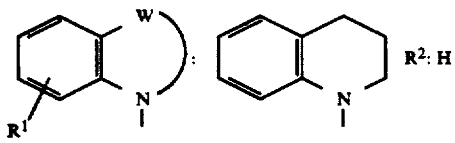

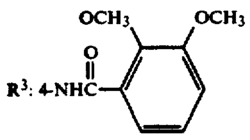

Crystalline form: Yellow powder

-continued

Recrystallization solvent: Methanol
Melting Point: 204–205° C.
Form: Free
Example 51
Structure

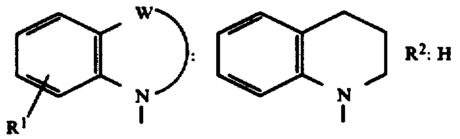

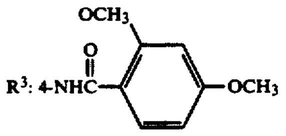

Crystalline form: White powder
Recrystallization solvent: Methanol
Melting Point: 190–191° C.
Form: Free
Example 52
Structure

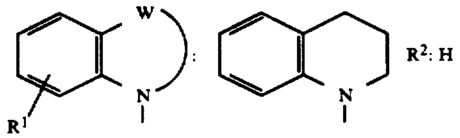

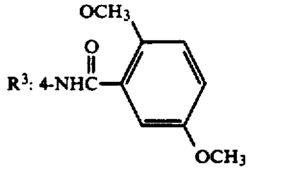

Crystalline form: White powder
Recrystallization solvent: Methanol
Melting Point: 156–157° C.
Form: Free
Example 53
Structure

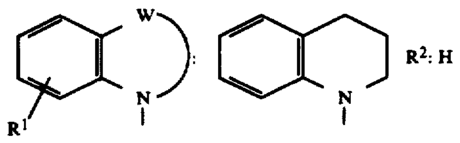

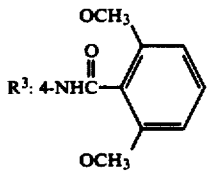

Crystalline form: White powder
Recrystallization solvent: Methanol
Melting Point: 200–201° C.
Form: Free
Example 54
Structure -continued

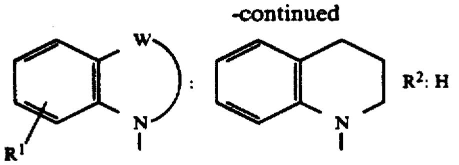

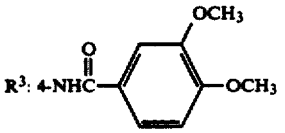

Crystalline form: White powder
Recrystallization solvent: Methanol
Melting Point: 206–207° C.
Form: Free
Example 55
Structure

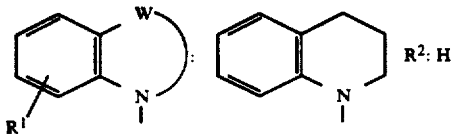

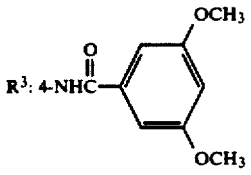

Crystalline form: Colorless amorphous
NMR analysis: 3)
Form: Free
Example 56
Structure

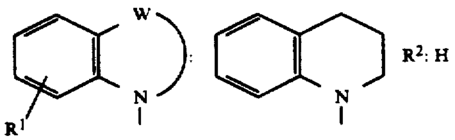

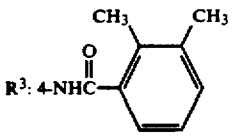

Crystalline form: White powder
Recrystallization solvent: Methanol
Melting Point: 215.5–216.5° C.
Form: Free
Example 57
Structure

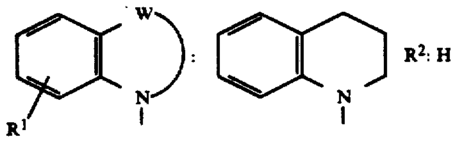

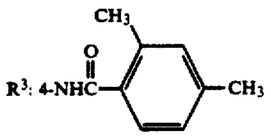

-continued

Crystalline form: White powder
Recrystallization solvent: Methanol
Melting Point: 189–190° C.
Form: Free
Example 58
Structure

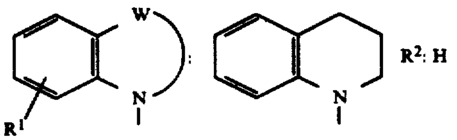

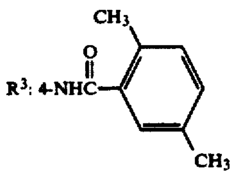

Crystalline form: White powder
Recrystallization solvent: Methanol
Melting Point: 203.5–204.5° C.
Form: Free
Example 59
Structure

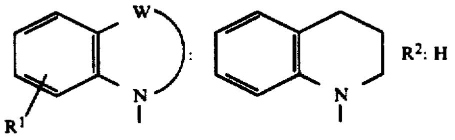

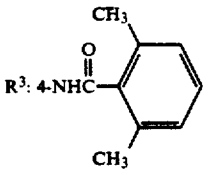

Crystalline form: Yellow powder
Recrystallization solvent: Methanol
Melting Point: 254.5–255.5° C.
Form: Free
Example 60
Structure

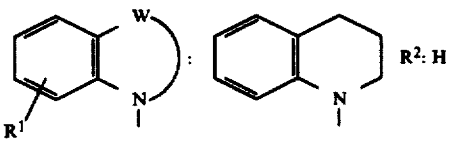

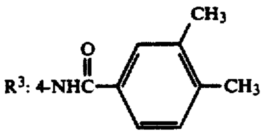

Crystalline form: Brown powder
Recrystallization solvent: Methanol
Melting Point: 182.5–183.5° C.
Form: Free
Example 61
Structure -continued

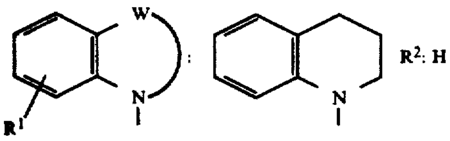

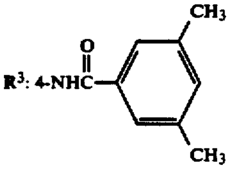

Crystalline form: Colorless amorphous
NMR analysis: 4)
Form: Free
Example 62
Structure

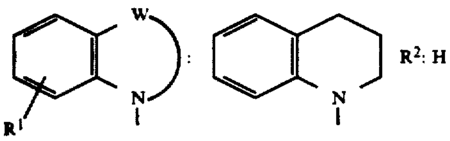

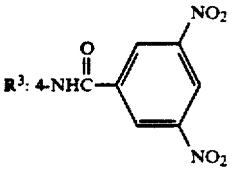

Crystalline form: White powder
Recrystallization solvent: Methanol
Melting Point: 263-264° C.
Form: Free
Example 63
Structure

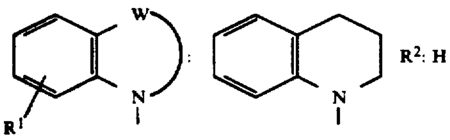

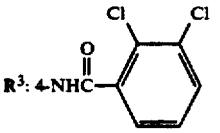

Crystalline form: White powder
Recrystallization solvent: Dichloromethane/ethanol
Melting Point: 217-218° C.
Form: Free
Example 64
Structure

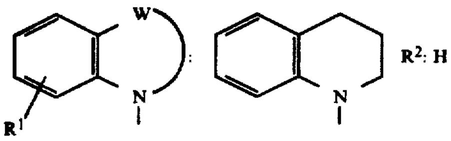

-continued

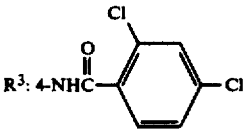

Crystalline form: White powder
Recrystallization solvent: Dichloromethane/ethanol
Melting Point: 183-184° C.
Form: Free
Example 65
Structure

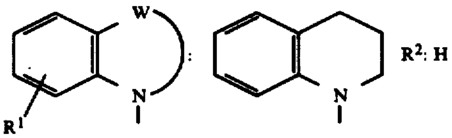

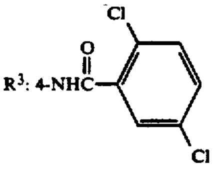

Crystalline form: Yellow powder
Recrystallization solvent: Dichloromethane/ethanol
Melting Point: 207.5-208.5° C.
Form: Free
Example 66
Structure

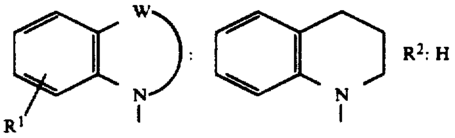

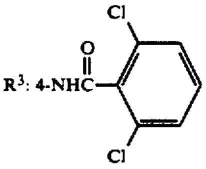

Crystalline form: Yellow powder
Recrystallization solvent: Dichloromethane/ethanol
Melting Point: 251-252° C.
Form: Free
Example 67
Structure

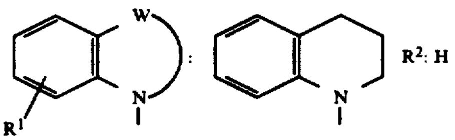

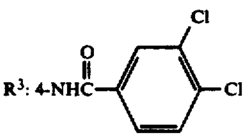

Crystalline form: White powder
Recrystallization solvent: Dichloromethane/ethanol
Melting Point: 208.5-209.5° C.
Form: Free
Example 68

-continued

Structure

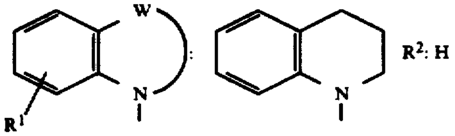

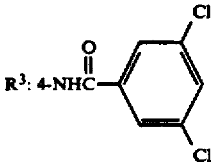

Crystalline form: White powder
Recrystallization solvent: Dichloromethane/ethanol
Melting Point: 231-232° C.
Form: Free
Example 69
Structure

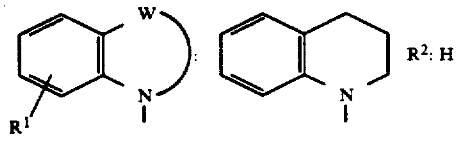

$R^3$: 4-NH$\overset{O}{\overset{\|}{C}}$CH$_3$

Crystalline form: Colorless amorphous
NMR analysis: 5)
Form: Free
Example 70
Structure

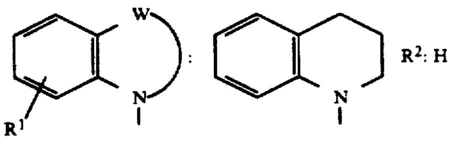

$R^3$: 4-NH$\overset{O}{\overset{\|}{C}}$(CH$_2$)$_2$CH$_3$

Crystalline form: White powder
Recrystallization solvent: Methanol
Melting Point: 134-135° C.
Form: Free
Example 71
Structure

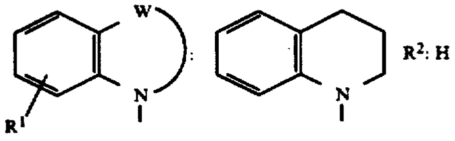

$R^3$: 4-NH$\overset{O}{\overset{\|}{C}}$(CH$_2$)$_4$CH$_3$

Crystalline form: Yellow powder
Recrystallization solvent: Methanol
Melting Point: 115-116° C.
Form: Free
Example 72
Structure -continued

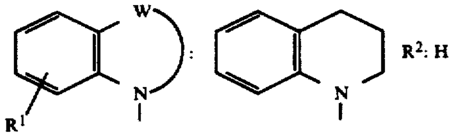

$R^3$: 4-NH$\overset{O}{\overset{\|}{C}}$CH$_2$C(CH$_3$)$_3$

Crystalline form: White powder
Recrystallization solvent: Methanol
Melting Point: 178.5-179.5° C.
Form: Free
Example 73
Structure

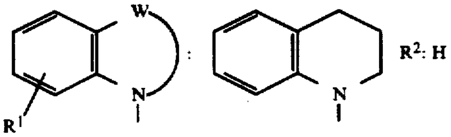

$R^3$: 4-NH$\overset{O}{\overset{\|}{C}}$CH(CH$_3$)$_2$

Crystalline form: White powder
Recrystallization solvent: Methanol
Melting Point: 182.5-183.5° C.
Form: Free
.Example 74
Structure

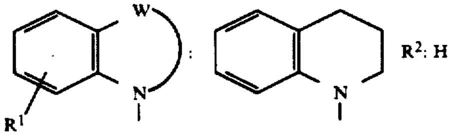

$R^3$: 4-NH$\overset{O}{\overset{\|}{C}}$C(CH$_3$)$_3$

Crystalline form: White powder
Recrystallization solvent: Methanol
Melting Point: 164-165° C.
Form: Free
Example 75
Structure

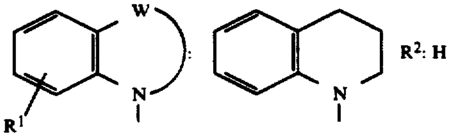

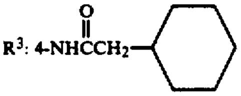

Crystalline form: Colorless amorphous
NMR analysis: 6)
Form: Free
Example 76
Structure -continued

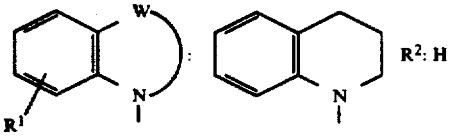

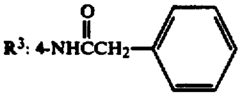

Crystalline form: Yellow amorphous
NMR analysis: 7)
Form: Free
Example 77
Structure

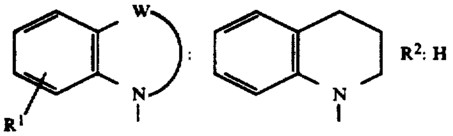

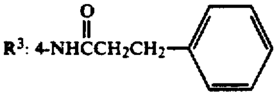

Crystalline form: White powder
Recrystallization solvent: Methanol
Melting Point: 155-156° C.
Form: Free
Example 78
Structure

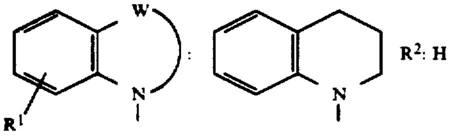

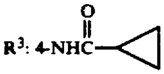

Crystalline form: White powder
Recrystallization solvent: Methanol
Melting Point: 182.5-183.5° C.
Form: Free
Example 79
Structure

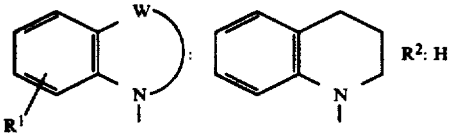

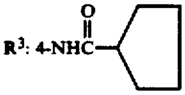

Crystalline form: White powder
Recrystallization solvent: Methanol
Melting Point: 164.5-165.5° C.
Form: Free
Example 80
Structure -continued

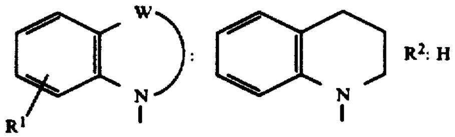

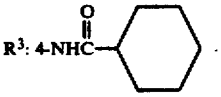

Crystalline form: White powder
Recrystallization solvent: Methanol
Melting Point: 165-167° C.
Form: Free
Example 81
Structure

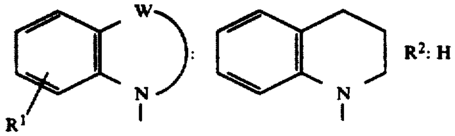

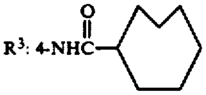

Crystalline form: White powder
Recrystallization solvent: Methanol
Melting Point: 124-125° C.
Form: Free
Example 82
Structure

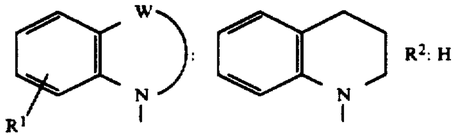

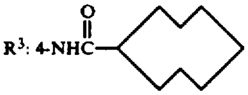

Crystalline form: White powder
Recrystallization solvent: Methanol
Melting Point: 140.5-141.5° C.
Form: Free
Example 83
Structure

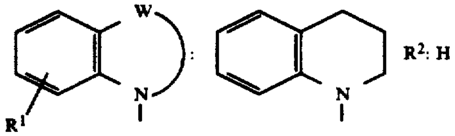

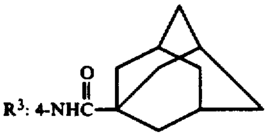

Crystalline form: Colorless amorphous
NMR analysis: 8)
Form: Free
Example 84

-continued

Structure

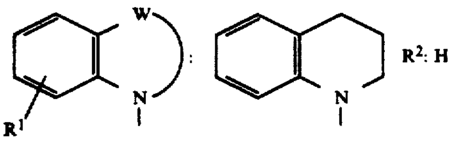

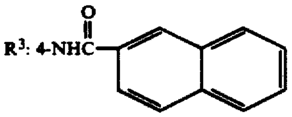

Crystalline form: White powder
Recrystallization solvent: Methanol
Melting Point: 211-212° C.
Form: Free
Example 85
Structure

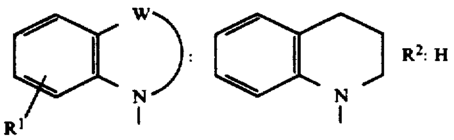

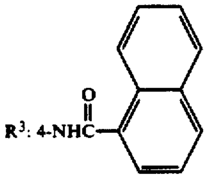

Crystalline form: White powder
Recrystallization solvent: Methanol
Melting Point: 178-179° C.
Form: Free
Example 86
Structure

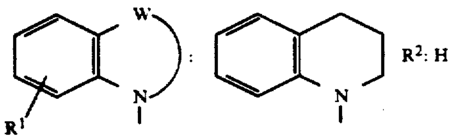

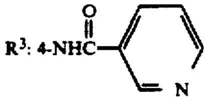

Crystalline form: White powder
Recrystallization solvent: Methanol
Melting Point: 212.5-213.5° C.
Form: Free
Example 87
Structure

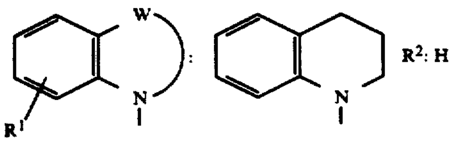

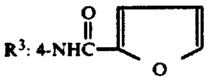

-continued

Crystalline form: White powder
Recrystallization solvent: Methanol
Melting Point: 193-194° C.
Form: Free
Example 88
Structure

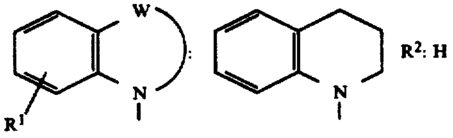

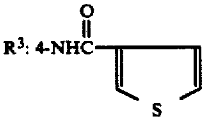

Crystalline form: White powder
Recrystallization solvent: Methanol
Melting Point: 203-204° C.
Form: Free
Example 89
Structure

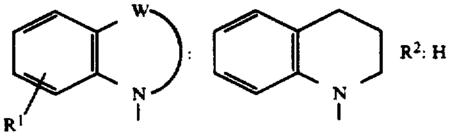

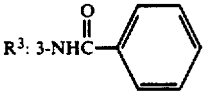

Crystalline form: Colorless amorphous
NMR Analysis: 9)
Form: Free
Example 90
Structure

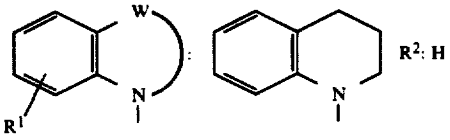

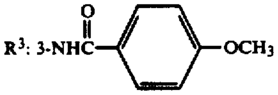

Crystalline form: Colorless amorphous
NMR analysis: 10)
Form: Free
Example 91
Structure

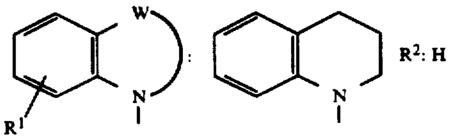

-continued

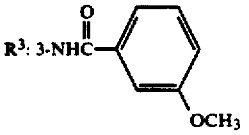

Crystalline form: Colorless amorphous
NMR Analysis: 11)
Form: Free
Example 92
Structure

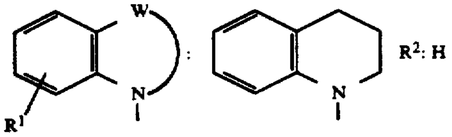

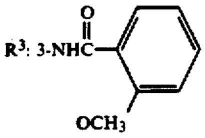

Crystalline form: White powder
Recrystallization solvent: Methanol
Melting Point: 156.5-157.5° C.
Form: Free
Example 93
Structure

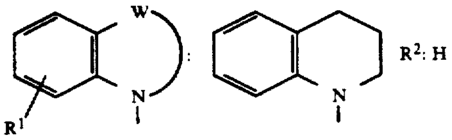

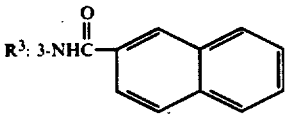

Crystalline form: Colorless amorphous
NMR analysis: 12)
Form: Free
Example 94
Structure

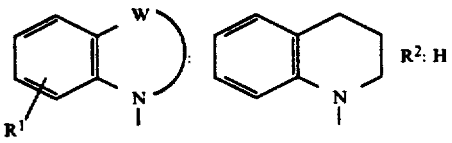

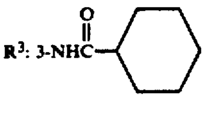

Crystalline form: White powder
Recrystallization solvent: Methanol
Melting Point: 203.5-204.5° C.
Form: Free
Example 95
Structure -continued

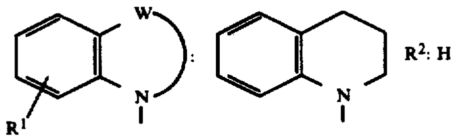

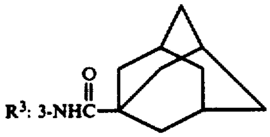

Crystalline form: Colorless amorphous
NMR analysis: 13)
Form: Free
Example 96
Structure

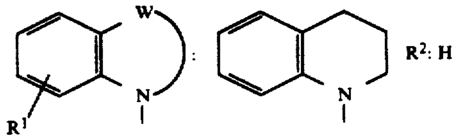

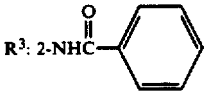

Crystalline form: Yellow powder
Recrystallization solvent: Methanol
Melting Point: 126-127° C.
Form: Free
Example 97
Structure

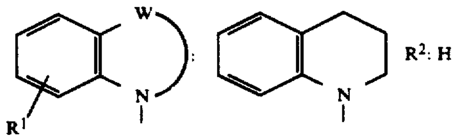

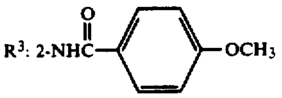

Crystalline form: White powder
Recrystallization solvent: Methanol
Melting Point: 158.5-159.5° C.
Form: Free
Example 98
Structure

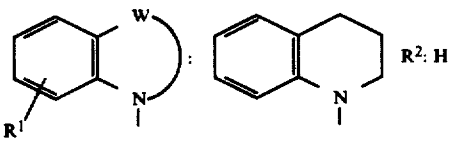

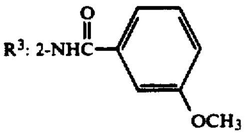

Crystalline form: White powder
Recrystallization solvent: Methanol
Melting Point: 129-130° C.

-continued

Form: Free

Example 99

Structure

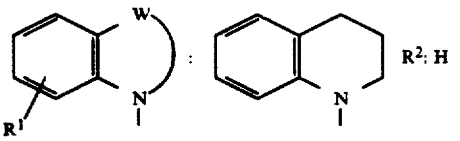

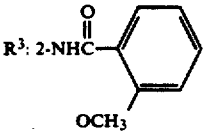

Crystalline form: White powder
Recrystallization solvent: Methanol
Melting Point: 131.5–132.5° C.
Form: Free Example 100

Structure

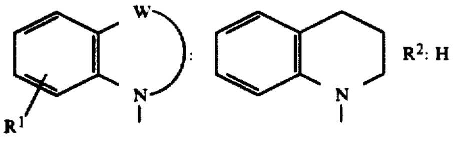

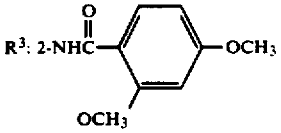

Crystalline form: White powder
Recrystallization solvent: Methanol
Melting Point: 140–141° C.
Form: Free Example 101

Structure

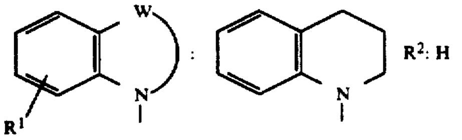

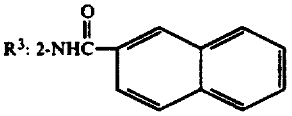

Crystalline form: White powder
Recrystallization solvent: Methanol
Melting Point: 138.5–139.5° C.
Form: Free Example 102

Structure

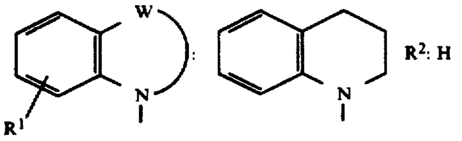

-continued

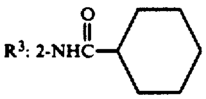

Crystalline form: White powder
Recrystallization solvent: Methanol
Melting Point: 128–129° C.
Form: Free Example 103

Structure

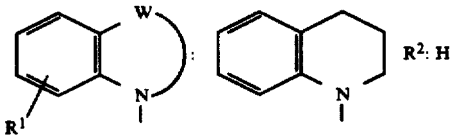

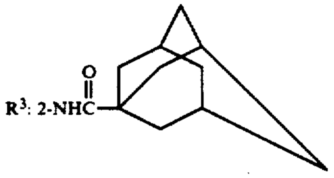

Crystalline form: White powder
Recrystallization solvent: Methanol
Melting Point: 160–161° C.
Form: Free Example 104

Structure

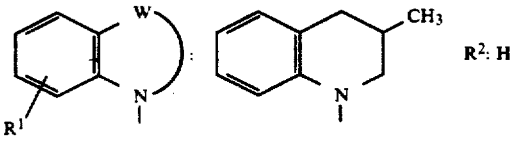

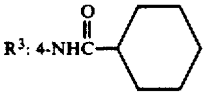

Crystalline form: White powder
Recrystallization solvent: Methanol
Melting Point: 175–176° C.
Form: Free Example 105

Structure

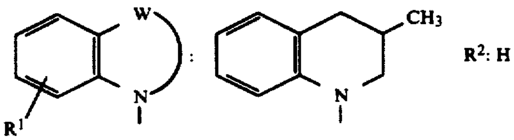

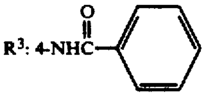

Crystalline form: White powder
Recrystallization solvent: Methanol
Melting Point: 197–198° C.
Form: Free Example 106

Structure

-continued

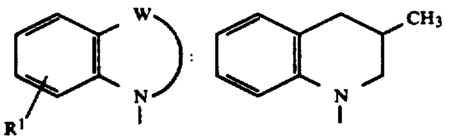

$R^2$: H

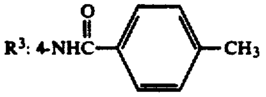

Crystalline form: White powder
Recrystallization solvent: Methanol
Melting Point: 204–205° C.
Form: Free
Example 107
Structure

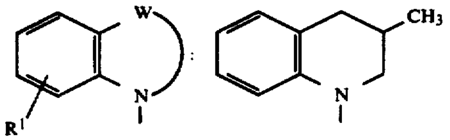

$R^2$: H

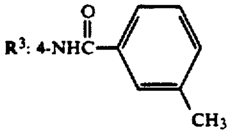

Crystalline form: White powder
Recrystallization solvent: Methanol
Melting Point: 174–175° C.
Form: Free
Example 108
Structure

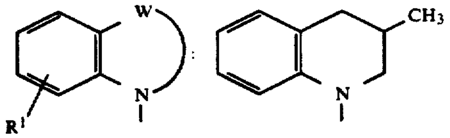

$R^2$: H

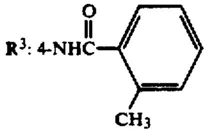

Crystalline form: Yellow powder
Recrystallization solvent: Methanol
Melting Point: 202–203° C.
Form: Free
Example 109
Structure

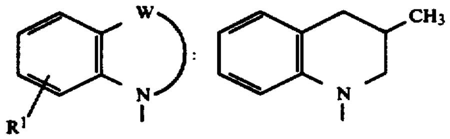

$R^2$: H

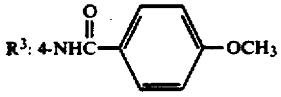

Crystalline form: White powder
Recrystallization solvent: Methanol

-continued

Melting Point: 203–204° C.
Form: Free
Example 110
Structure

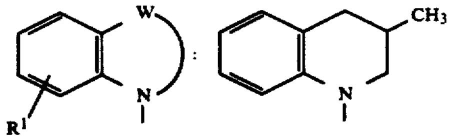

$R^2$: H

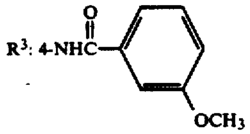

Crystalline form: White powder
Recrystallization solvent: Methanol
Melting Point: 170.5–171.5° C.
Form: Free
Example 111
Structure

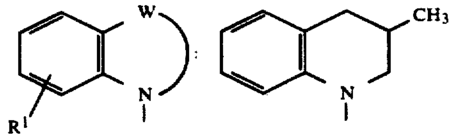

$R^2$: H

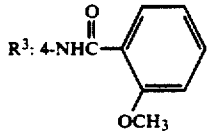

Crystalline form: White powder
Recrystallization solvent: Methanol
Melting Point: 149–150° C.
Form: Free
Example 112
Structure

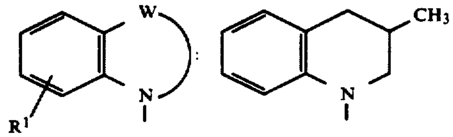

$R^2$: H

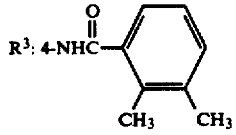

Crystalline form: White powder
Recrystallization solvent: Methanol
Melting Point: 185–186° C.
Form: Free
Example 113
Structure

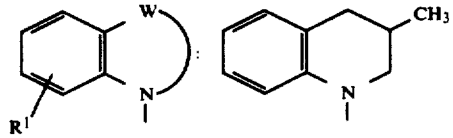

$R^2$: H

-continued

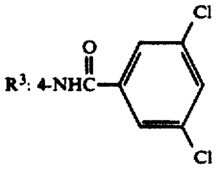

Crystalline form: White powder
Recrystallization solvent: Dichloromethane/ethanol
Melting Point: 225-226° C.
Form: Free
Example 114
Structure

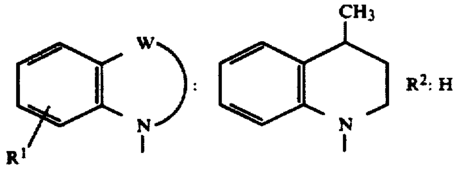

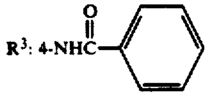

Crystalline form: White powder
Recrystallization solvent: Methanol
Melting Point: 234-235° C.
Form: Free
Example 115
Structure

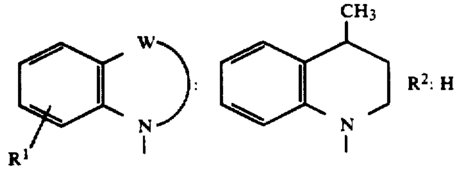

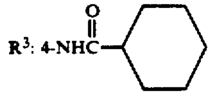

Crystalline form: White powder
Recrystallization solvent: Methanol
Melting Point: 149.5-150.5° C.
Form: Free
Example 116
Structure

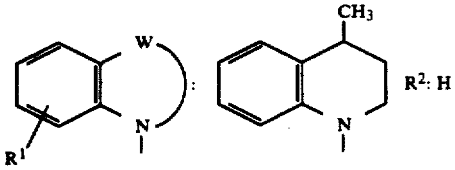

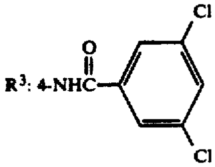

Crystalline form: White powder
Recrystallization solvent: Dichloromethane/ethanol
Melting Point: 197-198° C.
Form: Free -continued Example 117
Structure

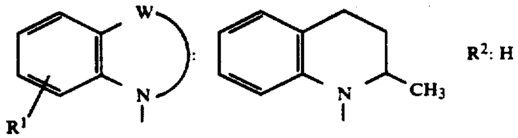

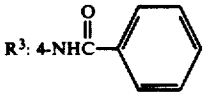

Crystalline form: White powder
Recrystallization solvent: Methanol
Melting Point: 204-205° C.
Form: Free
Example 118
Structure

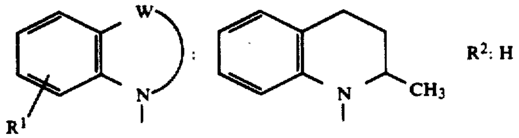

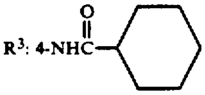

Crystalline form: White powder
Recrystallization solvent: Methanol
Melting Point: 224.5-225.5° C.
Form: Free
Example 119
Structure

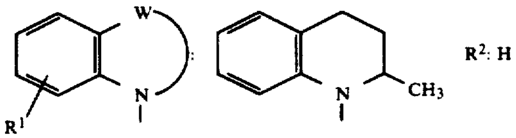

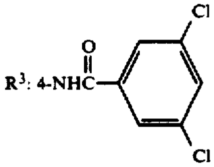

Crystalline form: White powder
Recrystallization solvent: Dichloromethane/ethanol
Melting Point: 189.5-190.5° C.
Form: Free
Example 120
Structure

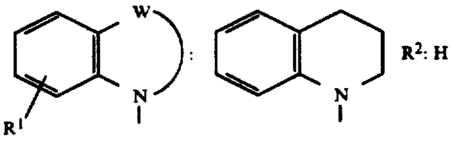

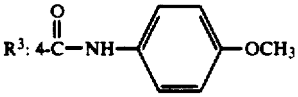

-continued

Crystalline form: White powder
Recrystallization solvent: Methanol
Melting Point: 221.5-222.5° C.
Form: Free
Example 121
Structure

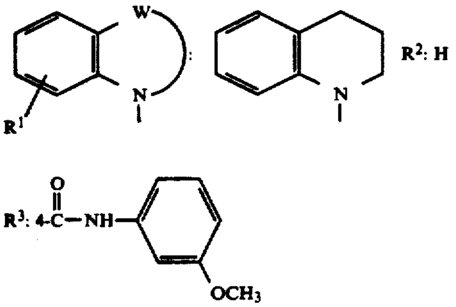

Crystalline form: Colorless needles
Recrystallization solvent: Methanol
Melting Point: 154-155° C.
Form: Free
Example 122
Structure

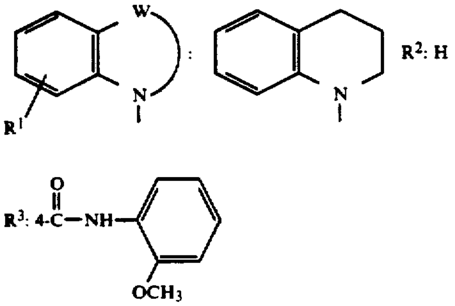

Crystalline form: White powder
Recrystallization solvent: Methanol
Melting Point: 165-166° C.
Form: Free
Example 23
Structure

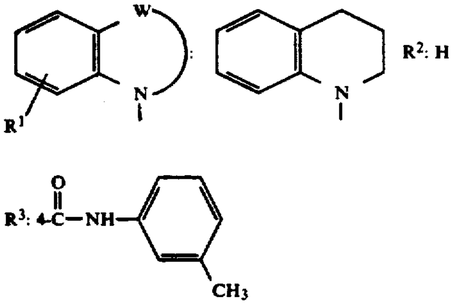

Crystalline form: Colorless needles
Recrystallization solvent: Methanol
Melting Point: 141-142° C.
Form: Free
Example 124
Structure

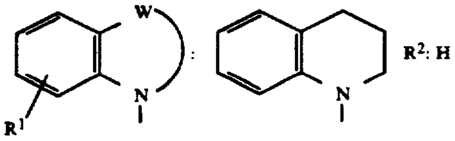

-continued

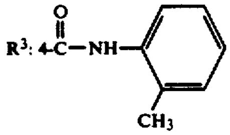

Crystalline form: White powder
Recrystallization solvent: Methanol
Melting Point: 165.5-166.5° C.
Form: Free
Example 125
Structure

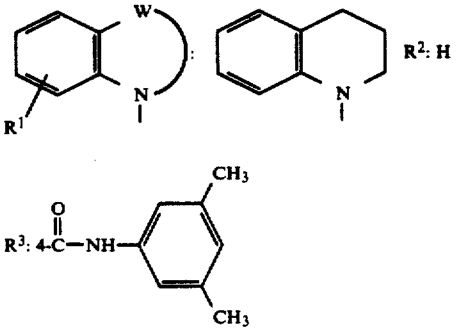

Crystalline form: Colorless needles
Recrystallization solvent: Methanol
Melting Point: 164-165° C.
Form: Free
Example 126
Structure

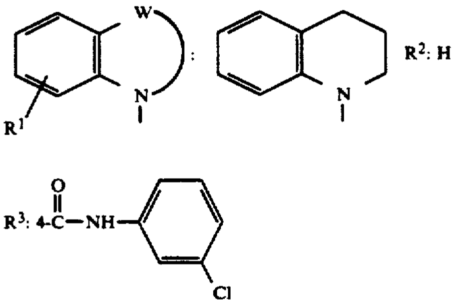

Crystalline form: White powder
Recrystallization solvent: Methanol
Melting Point: 203.5-204.5° C.
Form: Free
Example 127
Structure

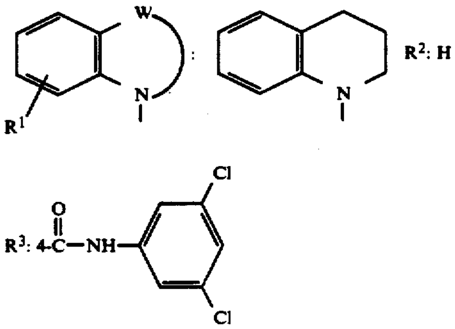

Crystalline form: White powder
Recrystallization solvent: Dichloromethane/ethanol
Melting Point: 236.5-237.5° C.

-continued

Form: Free
Example 128
Structure

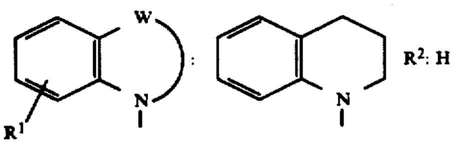

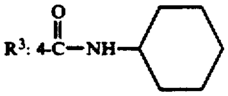

Crystalline form: White powder
Recrystallization solvent: Methanol
Melting Point: 206.5–207.5° C.
Form: Free
Example 129
Structure

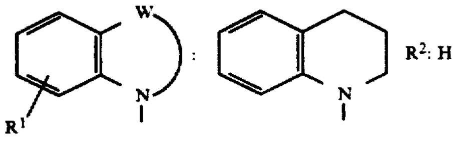

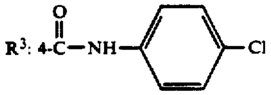

Crystalline form: White powder
Recrystallization solvent: Methanol
Melting Point: 271–272° C.
Form: Free
Example 130
Structure

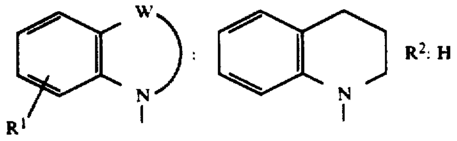

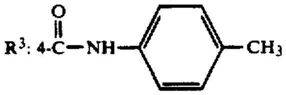

Crystalline form: White powder
Recrystallization solvent: Methanol
Melting Point: 246–247° C.
Form: Free
Example 131
Structure

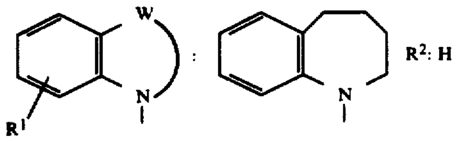

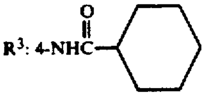

Crystalline form: White powder
Recrystallization solvent: Ethanol/diethyl ether

-continued

Melting Point: 210–211° C.
Form: Free
Example 132
Structure

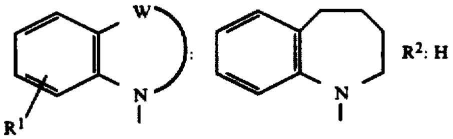

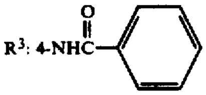

Crystalline form: White powder
Recrystallization solvent: Ethanol/diethyl ether
Melting Point: 230.5–231.5° C.
Form: Free
Example 133
Structure

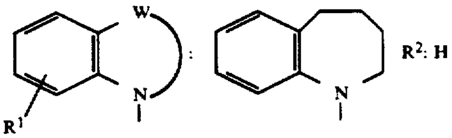

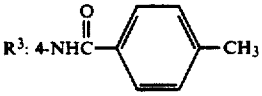

Crystalline form: White powder
Recrystallization solvent: Ethanol/diethyl ether
Melting Point: 203–204° C.
Form: Free
Example 134
Structure

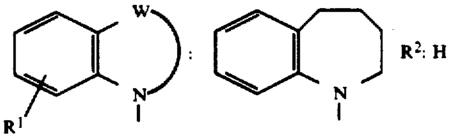

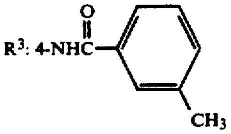

Crystalline form: White powder
Recrystallization solvent: Ethanol/diethyl ether
Melting Point: 170–171° C.
Form: Free
Example 135
Structure

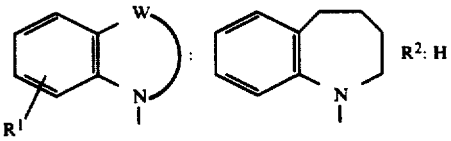

-continued

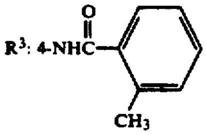

Crystalline form: White powder
Recrystallization solvent: Ethanol/diethyl ether
Melting Point: 225.5–226.5° C.
Form: Free
Example 136
Structure

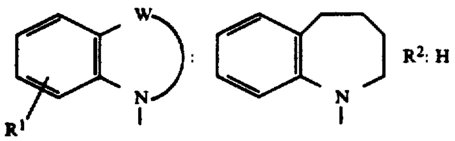

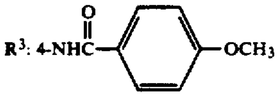

Crystalline form: White powder
Recrystallization solvent: Ethanol/diethyl ether
Melting Point: 210.5–211.5° C.
Form: Free
Example 137
Structure

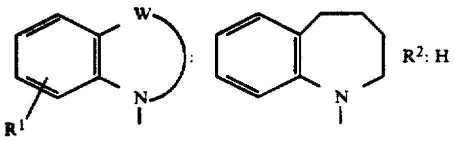

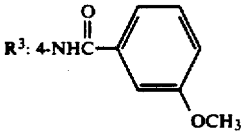

Crystalline form: White powder
Recrystallization solvent: Ethanol/diethyl ether
Melting Point: 183–184° C.
Form: Free
Example 138
Structure

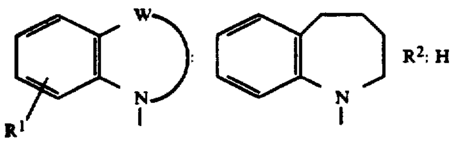

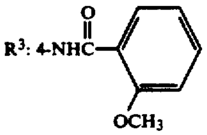

Crystalline form: White powder
Recrystallization solvent: Ethanol/diethyl ether
Melting Point: 191.5–192.5° C.
Form: Free
Example 139
Structure -continued

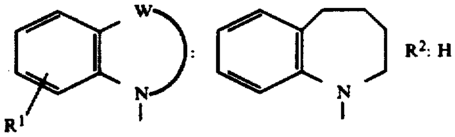

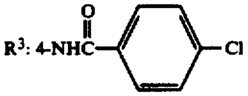

Crystalline form: White powder
Recrystallization solvent: Ethanol/diethyl ether
Melting Point: 203.5–204.5° C.
Form: Free
Example 140
Structure

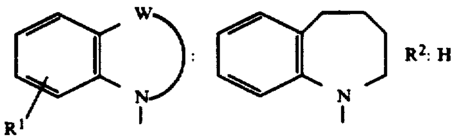

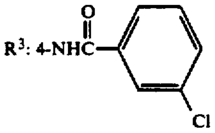

Crystalline form: White powder
Recrystallization solvent: Ethanol/diethyl ether
Melting Point: 215.5–216.5° C.
Form: Free
Example 141
Structure

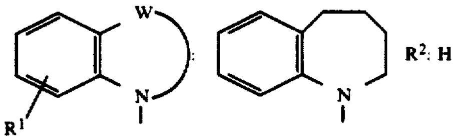

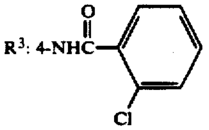

Crystalline form: White powder
Recrystallization solvent: Ethanol/diethyl ether
Melting Point: 211.5–212.5° C.
Form: Free
Example 142
Structure

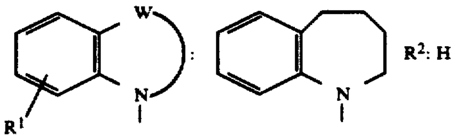

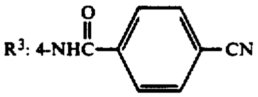

Crystalline form: White powder
Recrystallization solvent: Ethanol/diethyl ether

-continued

Melting Point: 280.5-281.5° C.
Form: Free
Example 143
Structure

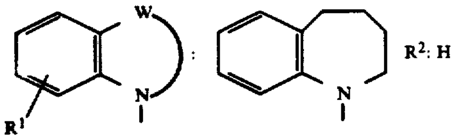

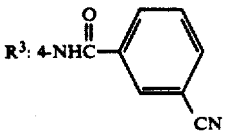

Crystalline form: White powder
Recrystallization solvent: Ethanol/diethyl ether
Melting Point: 235.5-236.5° C.
Form: Free
Example 144
Structure

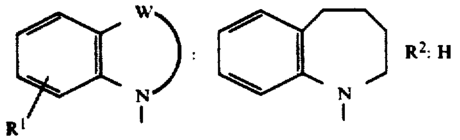

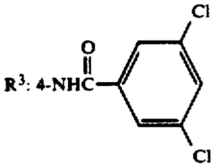

Crystalline form: White powder
Recrystallization solvent: Ethanol/dichloromethane
Melting Point: 249.5-250.5° C.
Form: Free
Example 145
Structure

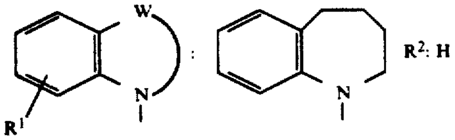

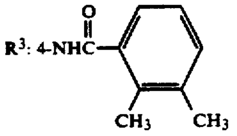

Crystalline form: White powder
Recrystallization solvent: Ethanol/diethyl ether
Melting Point: 217-218° C.
Form: Free
Example 146
Structure

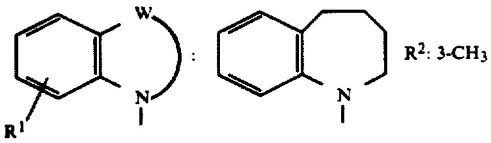

-continued

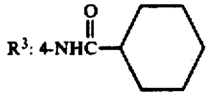

Crystalline form: White powder
Recrystallization solvent: Ethanol/diethyl ether
Melting Point: 201.5-203° C.
Form: Free
Example 147
Structure

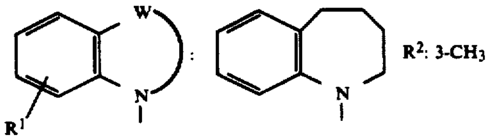

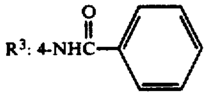

Crystalline form: White powder
Recrystallization solvent: Ethanol/diethyl ether
Melting Point: 221-222° C.
Form: Free
Example 148
Structure

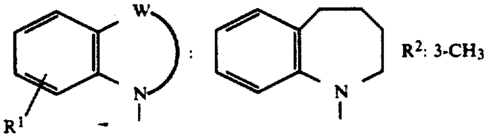

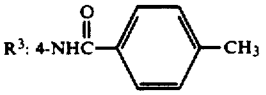

Crystalline form: White powder
Recrystallization solvent: Ethanol/diethyl ether
Melting Point: 193-194° C.
Form: Free
Example 149
Structure

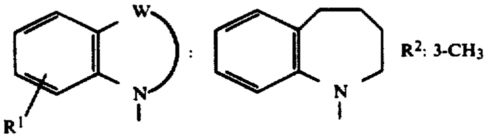

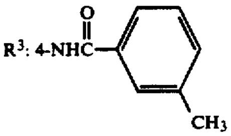

Crystalline form: White powder
Recrystallization solvent: Ethanol/diethyl ether
Melting Point: 176-177° C.
Form: Free
Example 150
Structure -continued

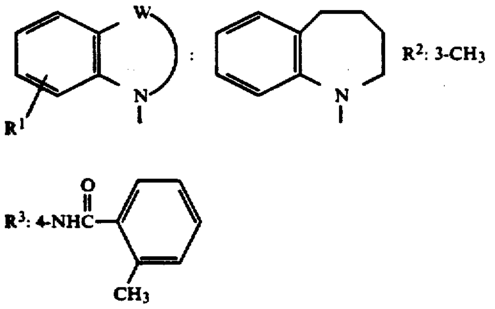

Crystalline form: White powder
Recrystallization solvent: Ethanol/diethyl ether
Melting Point: 188–189.5° C.
Form: Free
Example 151
Structure

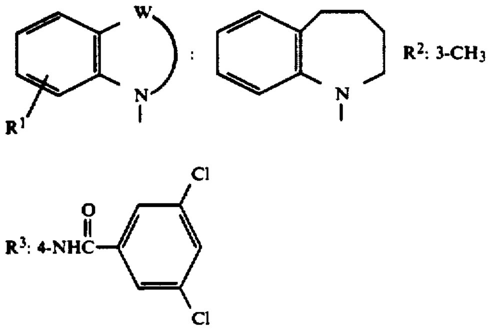

Crystalline form: White powder
Recrystallization solvent: Ethanol/diethyl ether
Melting Point: 227–228° C.
Form: Free
Example 152
Structure

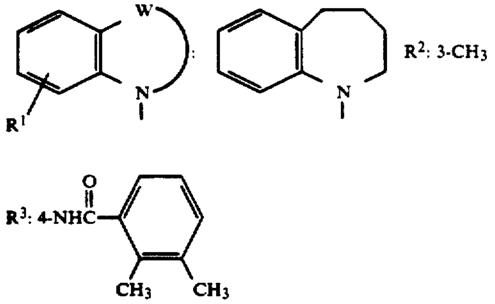

Crystalline form: White powder
Recrystallization solvent: Ethanol/diethyl ether
Melting Point: 186–187° C.
Form: Free
Example 153
Structure

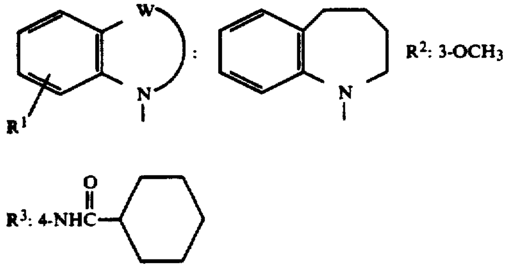

-continued

Crystalline form: White powder
Recrystallization solvent: Ethanol/diethyl ether
Melting Point: 135–136° C.
Form: Free
Example 154
Structure

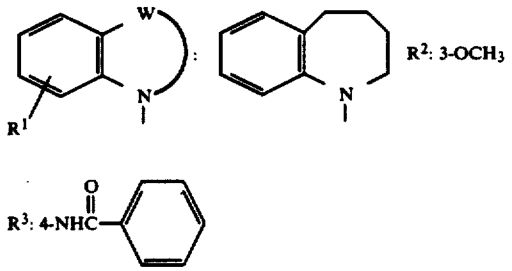

Crystalline form: White powder
Recrystallization solvent: Ethanol/diethyl ether
Melting Point: 173–174° C.
Form: Free
Example 155
Structure

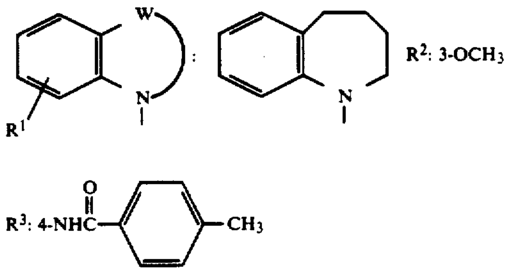

Crystalline form: White powder
Recrystallization solvent: Ethanol/diethyl ether
Melting Point: 174.5–175.5° C.
Form: Free
Example 156
Structure

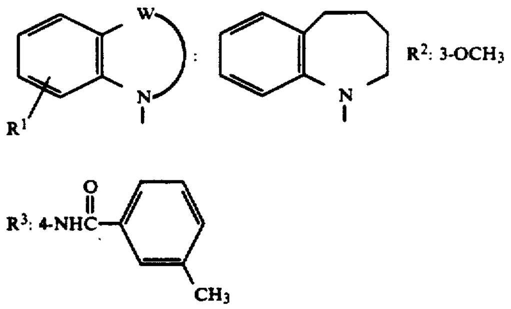

Crystalline form: White powder
Recrystallization solvent: Ethanol/diethyl ether
Melting Point: 156–157° C.
Form: Free
Example 157
Structure

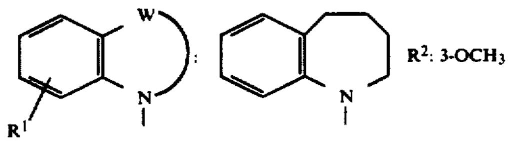

-continued

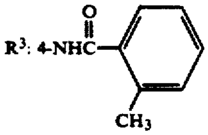

Crystalline form: White powder
Recrystallization solvent: Ethanol/diethyl ether
Melting Point: 153-154° C.
Form: Free
Example 158
Structure

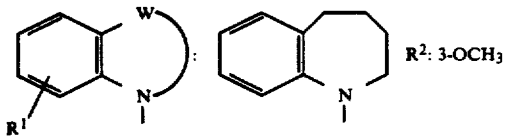

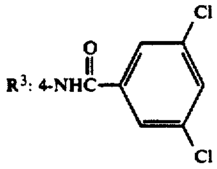

Crystalline form: White powder
Recrystallization solvent: Ethanol/diethyl ether
Melting Point: 169-170° C.
Form: Free
Example 159
Structure

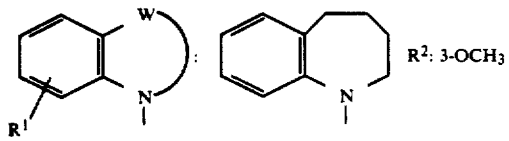

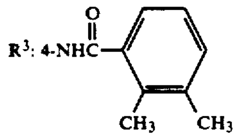

Crystalline form: White powder
Recrystallization solvent: Ethanol/diethyl ether
Melting Point: 185-186° C.
Form: Free
Example 160
Structure

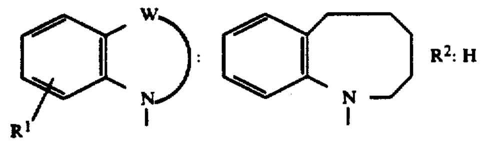

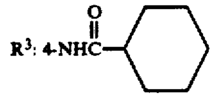

Crystalline form: White powder
Recrystallization solvent: Ethanol/diethyl ether
Melting Point: 213-214° C.
Form: Free
Example 161
Structure -continued

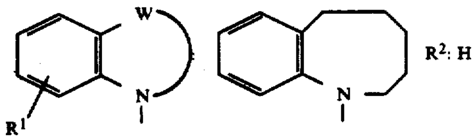

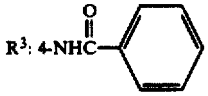

Crystalline form: White powder
Recrystallization solvent: Ethanol/diethyl ether
Melting Point: 240-241° C.
Form: Free
Example 162
Structure

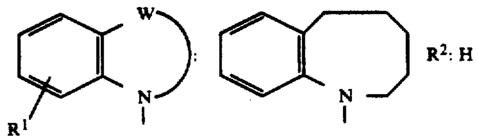

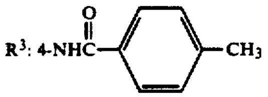

Crystalline form: White powder
Recrystallization solvent: Ethanol/diethyl ether
Melting Point: 225-226° C.
Form: Free
Example 163
Structure

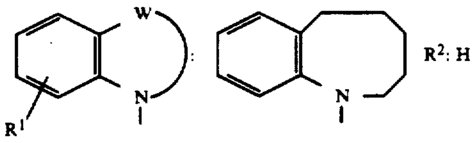

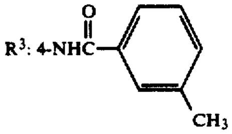

Crystalline form: White powder
Recrystallization solvent: Ethanol/diethyl ether
Melting Point: 209.5-210.5° C.
Form: Free
Example 164
Structure

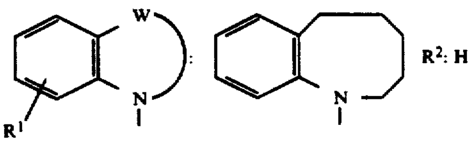

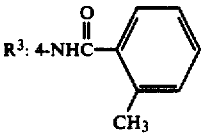

Crystalline form: White powder
Recrystallization solvent: Ethanol/diethyl ether

-continued

Melting Point: 198-199° C.
Form: Free
Example 165
Structure

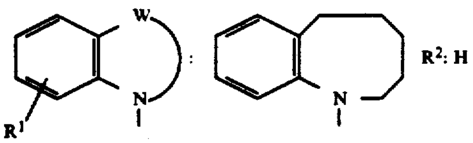

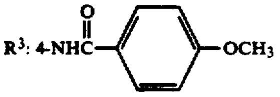

Crystalline form: White powder
Recrystallization solvent: Ethanol/diethyl ether
Melting Point: 214.5-215.5° C.
Form: Free
Example 166
Structure

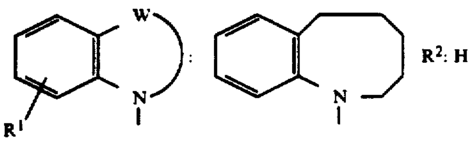

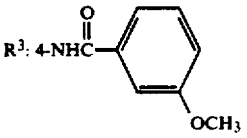

Crystalline form: White powder
Recrystallization solvent: Ethanol/diethyl ether
Melting Point: 196.5-197.5° C.
Form: Free
Example 167
Structure

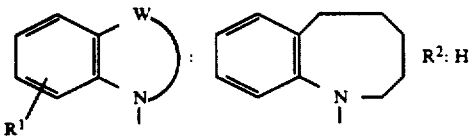

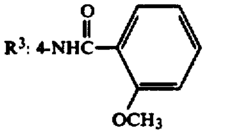

Crystalline form: White powder
Recrystallization solvent: Ethanol/diethyl ether
Melting Point: 194-195° C.
Form: Free
Example 168
Structure

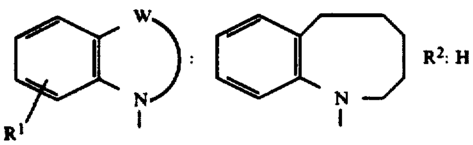

-continued

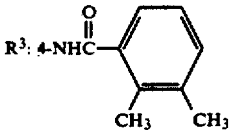

Crystalline form: White powder
Recrystallization solvent: Ethanol/diethyl ether
Melting Point: 191-192° C.
Form: Free
Example 169
Structure

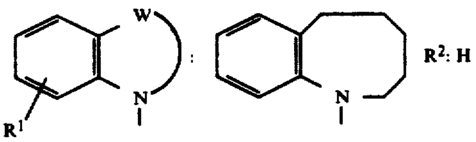

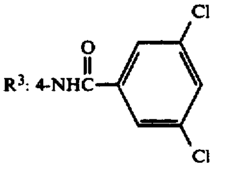

Crystalline form: White powder
Recrystallization solvent: Dichloromethane/ethanol
Melting Point: 227-228° C.
Form: Free
Example 170
Structure

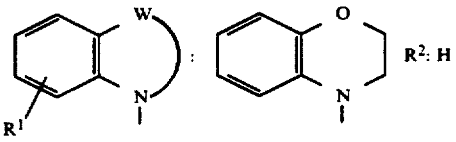

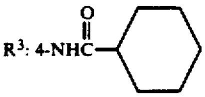

Crystalline form: White powder
Recrystallization solvent: Dichloromethane/diethyl ether
Melting Point: 182-183° C.
Form: Free
Example 171
Structure

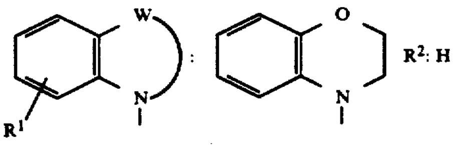

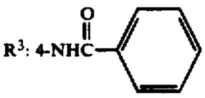

Crystalline form: White powder
Recrystallization solvent: Dichloromethane/diethyl ether
Melting Point: 222-223° C.
Form: Free
Example 172
Structure -continued

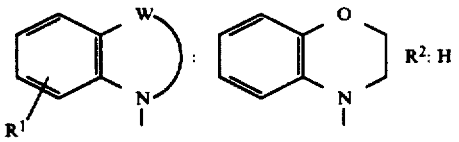

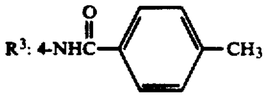

Crystalline form: White powder
Recrystallization solvent: Dichloromethane/diethyl ether
Melting Point: 204–205° C.
Form: Free
Example 173
Structure

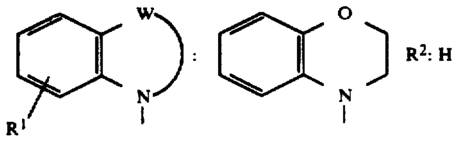

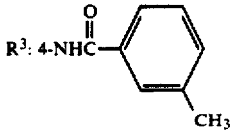

Crystalline form: White powder
Recrystallization solvent: Dichloromethane/diethyl ether
Melting Point: 194–195° C.
Form: Free
Example 174
Structure

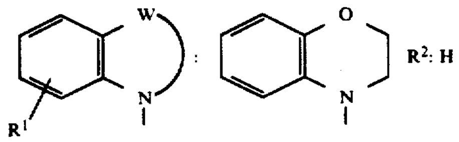

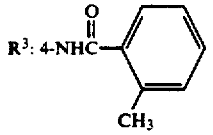

Crystalline form: White powder
Recrystallization solvent: Dichloromethane/diethyl ether
Melting Point: 213–214° C.
Form: Free
Example 175
Structure

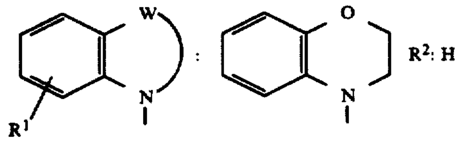

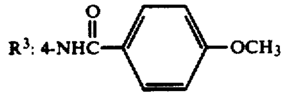

Crystalline form: White powder
Recrystallization solvent: Dichloromethane/diethyl ether -continued Melting Point: 201–202° C.
Form: Free
Example 176
Structure

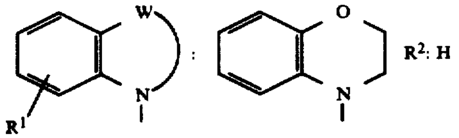

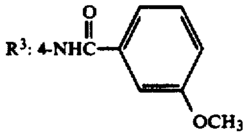

Crystalline form: Colorless needles
Recrystallization solvent: Dichloromethane/diethyl ether
Melting Point: 173–174° C.
Form: Free
Example 177
Structure

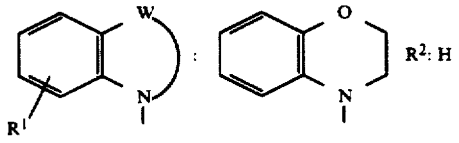

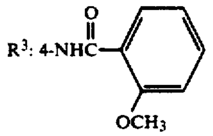

Crystalline form: White powder
Recrystallization solvent: Dichloromethane/diethyl ether
Melting Point: 150.5–151.5° C.
Form: Free
Example 178
Structure

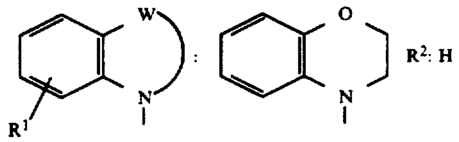

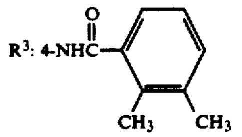

Crystalline form: White powder
Recrystallization solvent: Dichloromethane/diethyl ether
Melting Point: 207.5–208.5° C.
Form: Free
Example 179
Structure

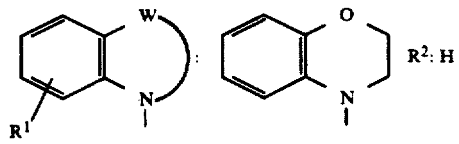

-continued

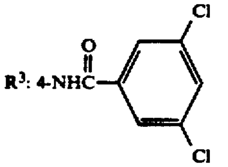

Crystalline form: White powder
Recrystallization solvent: Dichloromethane/diethyl ether
Melting Point: 256.5-257.5° C.
Form: Free
Example 180
Structure

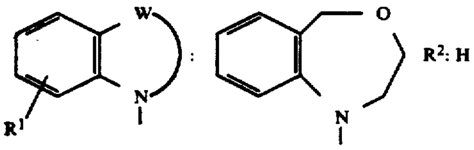

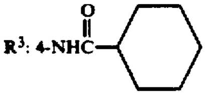

Crystalline form: White powder
Recrystallization solvent: Ethanol/diethyl ether
Melting Point: 199.5-200.5° C.
Form: Free
Example 181
Structure

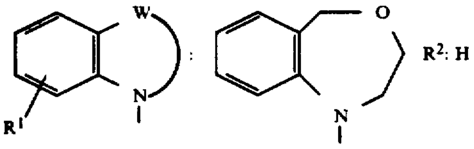

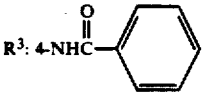

Crystalline form: White powder
Recrystallization solvent: Ethanol/diethyl ether
Melting Point: 211-212° C.
Form: Free
Example 182
Structure

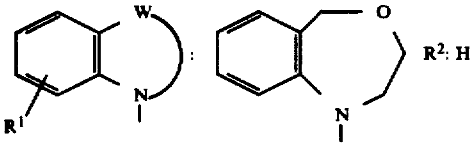

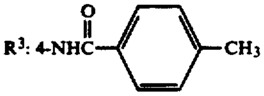

Crystalline form: White powder
Recrystallization solvent: Ethanol/diethyl ether
Melting Point: 189.5-190.5° C.
Form: Free
Example 183
Structure -continued

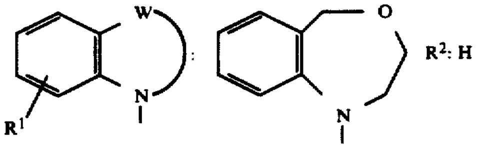

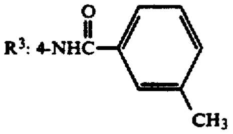

Crystalline form: White powder
Recrystallization solvent: Ethanol/diethyl ether
Melting Point: 176.5-177.5° C.
Form: Free
Example 184
Structure

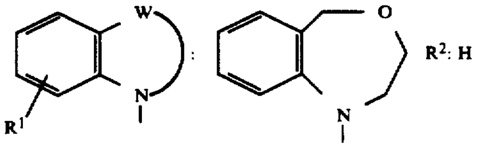

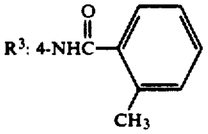

Crystalline form: Yellow powder
Recrystallization solvent: Ethanol/diethyl ether
Melting Point: 202-203° C.
Form: Free
Example 185
Structure

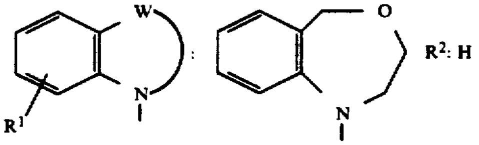

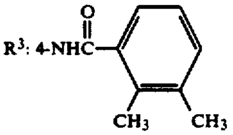

Crystalline form: White powder
Recrystallization solvent: Ethanol/diethyl ether
Melting Point: 219-220° C.
Form: Free
Example 186
Structure

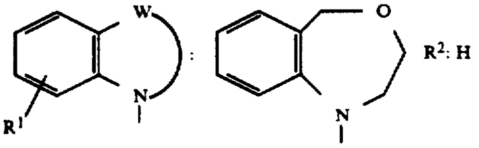

-continued

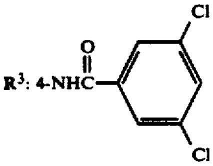

Crystalline form: White powder
Recrystallization solvent: Ethanol/diethyl ether
Melting Point: 272-273° C.
Form: Free
Example 187
Structure

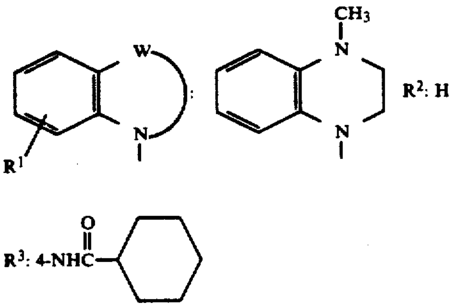

Crystalline form: Yellow powder
Recrystallization solvent: Ethanol/diethyl ether
Melting Point: 146-147° C.
Form: Free
Example 188
Structure

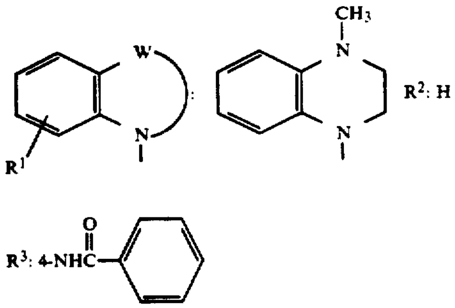

Crystalline form: Yellow powder
Recrystallization solvent: Ethanol/diethyl ether
Melting Point: 229.5-230.5° C.
Form: Free
Example 189
Structure

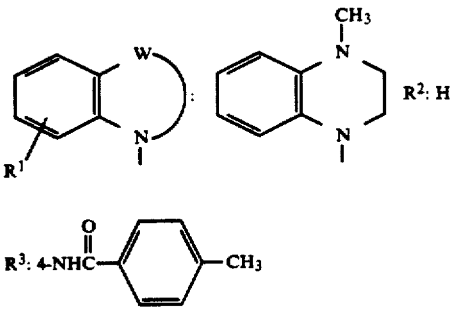

Crystalline form: Yellow powder
Recrystallization solvent: Ethanol/diethyl ether
Melting Point: 119.5-120.5° C.
Form: Free
Example 190
Structure -continued

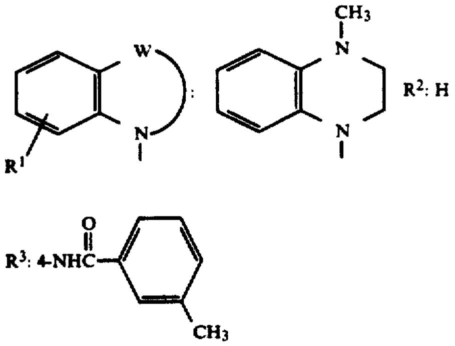

Crystalline form: Yellow powder
Recrystallization solvent: Ethanol/diethyl ether
Melting Point: 189-190° C.
Form: Free
Example 191
Structure

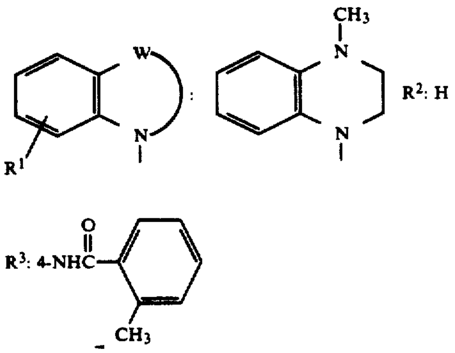

Crystalline form: Yellow powder
Recrystallization solvent: Ethanol/diethyl ether
Melting Point: 207-208° C.
Form: Free
Example 192
Structure

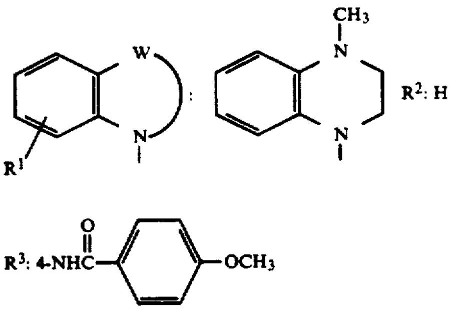

Crystalline form: Yellow powder
Recrystallization solvent: Ethanol/diethyl ether
Melting Point: 196.5-197.5° C.
Form: Free
Example 193
Structure

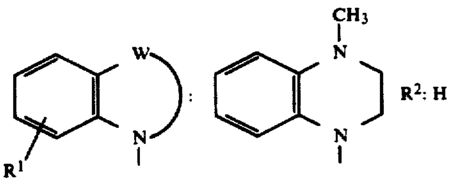

-continued

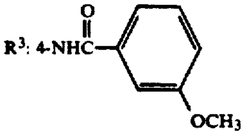

Crystalline form: Yellow powder
Recrystallization solvent: Ethanol/diethyl ether
Melting Point: 182–183° C.
Form: Free
Example 194
Structure

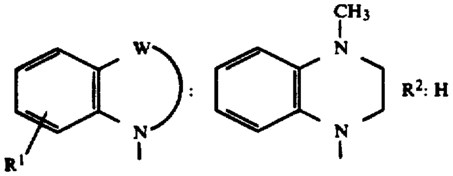

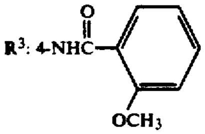

Crystalline form: Yellow powder
Recrystallization solvent: Ethanol/diethyl ether
Melting Point: 172–173° C.
Form: Free
Example 195
Structure

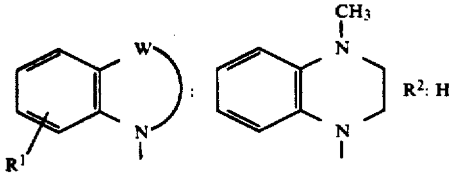

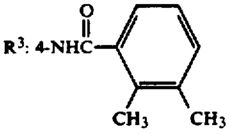

Crystalline form: Yellow powder
Recrystallization solvent: Ethanol/diethyl ether
Melting Point: 197.5–198.5° C.
Form: Free
Example 196
Structure

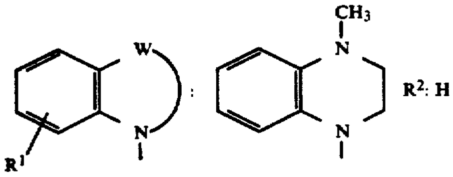

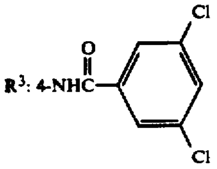

-continued

Crystalline form: Yellow powder
Recrystallization solvent: Ethanol/diethyl ether
Melting Point: 227–228° C.
Form: Free
Example 197
Structure

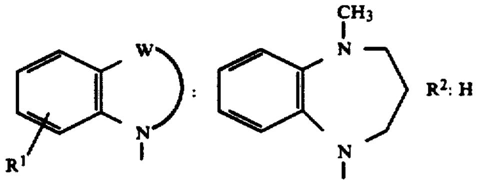

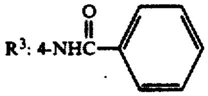

Crystalline form: White powder
Recrystallization solvent: Ethanol/diethyl ether
Melting Point: 216.5–217.5° C.
Form: Free
Example 198
Structure

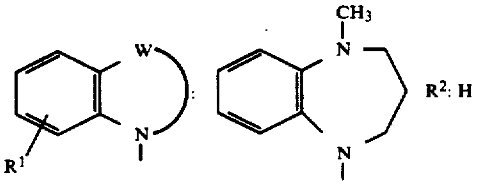

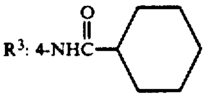

Crystalline form: White powder
Recrystallization solvent: Ethanol/diethyl ether
Melting Point: 207–208° C.
Form: Free
Example 199
Structure

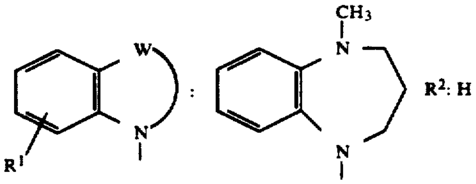

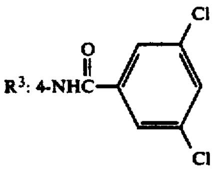

Crystalline form: White powder
Recrystallization solvent: Ethanol/diethyl ether
Melting Point: 236–237° C.
Form: Free
Example 200
Structure -continued

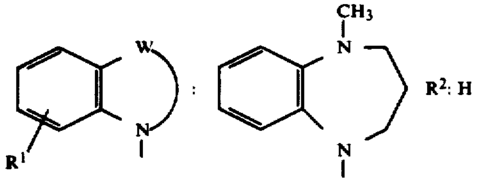

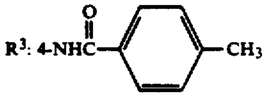

Crystalline form: White powder
Recrystallization solvent: Ethanol/diethyl ether
Melting Point: 199.5-200.5° C.
Form: Free Example 201
Structure

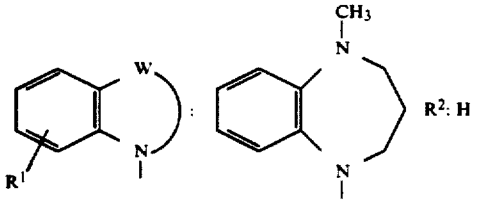

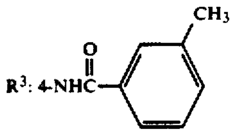

Crystalline form: White powder
Recrystallization solvent: Ethanol/diethyl ether
Melting Point: 171.5-172.5° C.
Form: Free
Example 202
Structure

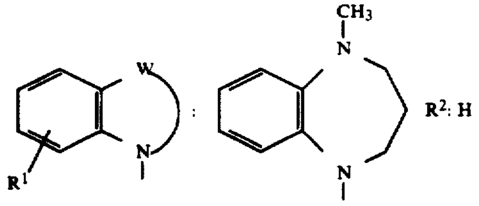

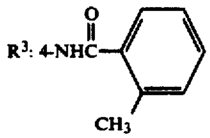

Crystalline form: White powder
Recrystallization solvent: Ethanol/diethyl ether
Melting Point: 222.5-223.5° C.
Form: Free
Example 203
Structure -continued

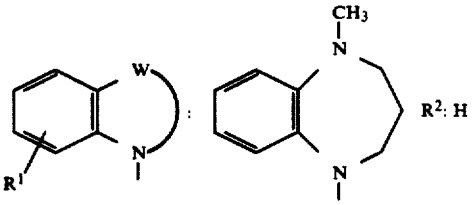

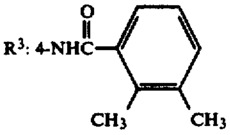

Crystalline form: White powder
Recrystallization solvent: Ethanol/diethyl ether
Melting Point: 209.5-210.5° C.
Form: Free
Example 204
Structure

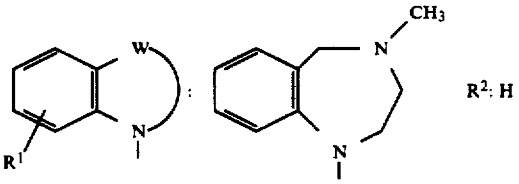

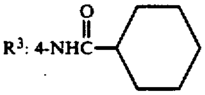

Crystalline form: White powder
Recrystallization solvent: Ethanol/water
NMR analysis: 14)
Form: Hydrochloride
Example 205
Structure

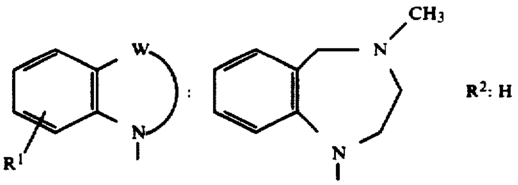

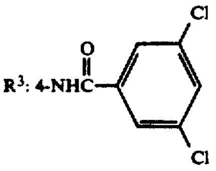

Crystalline form: White powder
Recrystallization solvent: Ethanol/water
NMR analysis: 15)
Form: Hydrochloride
Example 206
Structure -continued

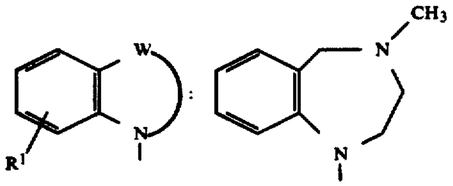

$R^2$: H

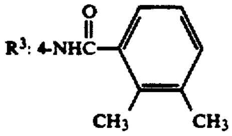

Crystalline form: White powder

Recrystallization solvent: Ethanol/water

NMR analysis: 16)

Form: Hydrochloride

Example 207

Structure

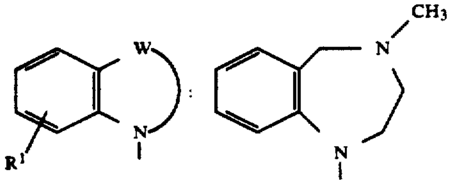

$R^2$: H

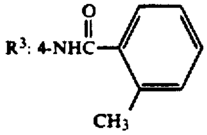

Crystalline form: White powder

Recrystallization solvent: Ethanol/water

NMR analysis: 17)

Form: Hydrochloride

Example 208

Structure

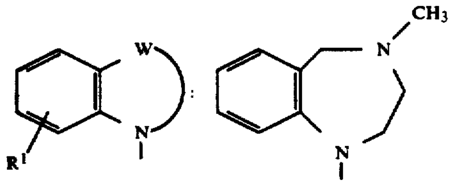

$R^2$: H

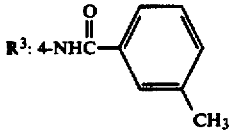

Crystalline form: White powder

Recrystallization solvent: Ethanol/water

NMR analysis: 18)

Form: Hydrochloride

Example 209

Structure

-continued

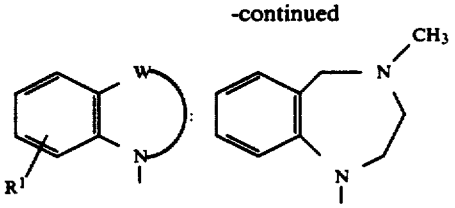

$R^2$: H

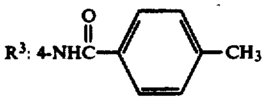

Crystalline form: Yellow powder

Recrystallization solvent: Ethanol/water

NMR analysis: 19)

Form: Hydrochloride

Example 210

Structure

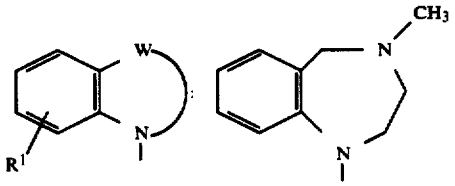

$R^2$: H

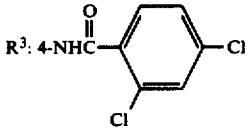

Crystalline form: White powder

Recrystallization solvent: Ethanol/water

NMR analysis: 20)

Form: Hydrochloride

Example 211

Structure

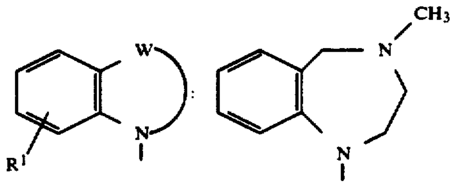

$R^2$: H

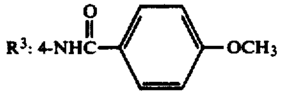

Crystalline form: White powder

Recrystallization solvent: Ethanol/diethyl ether

Melting Point: 159.5-160.5° C.

Form: Free

Example 212

Structure

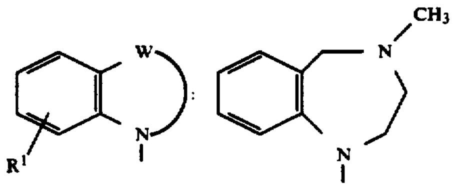

$R^2$: H

-continued

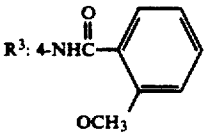

Crystalline form: White powder
Recrystallization solvent: Ethanol/diethyl ether
Melting Point: 189.5–190.5° C.
Form: Free
Example 213
Structure

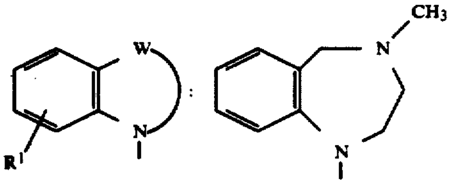

$R^2$: H

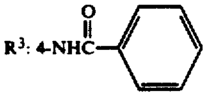

Crystalline form: White powder
Recrystallization solvent: Ethanol/diethyl ether
Melting Point: 170.5–171.5° C.
Form: Free
Example 214
Structure

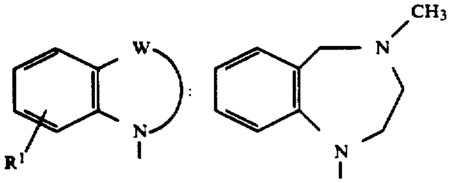

$R^2$: H

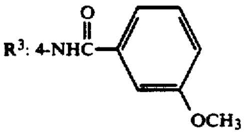

Crystalline form: White powder
Recrystallization solvent: Ethanol/diethyl ether
Melting Point: 165–166° C.
Form: Free
Example 215
Structure

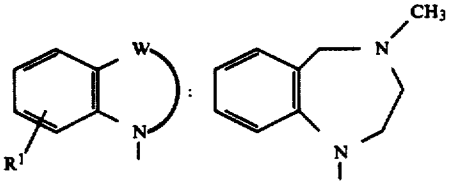

$R^2$: H

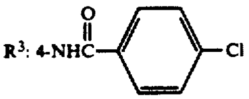

Crystalline form: White powder
Recrystallization solvent: Ethanol/diethyl ether

-continued

Melting Point: 173.5–174.5° C.
Form: Free
Example 216
Structure

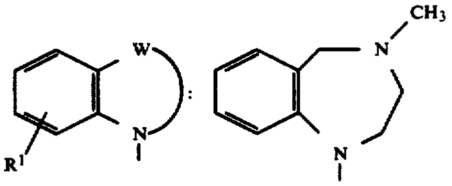

$R^2$: H

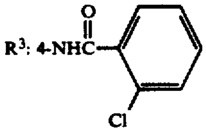

Crystalline form: White powder
Recrystallization solvent: Ethanol/diethyl ether
Melting Point: 182–183° C.
Form: Free
Example 217
Structure

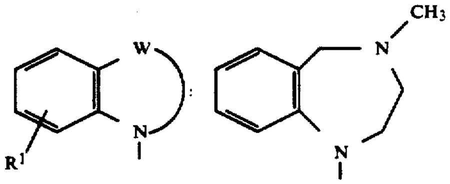

$R^2$: H

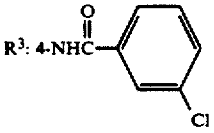

Crystalline form: White powder
Recrystallization solvent: Ethanol/diethyl ether
Melting Point: 225.5–226.5° C.
Form: Free
Example 219
Structure

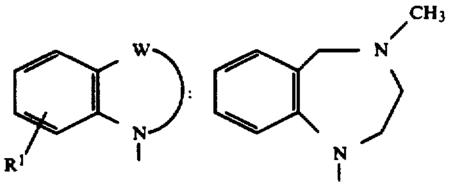

$R^2$: 3-$OCH_3$

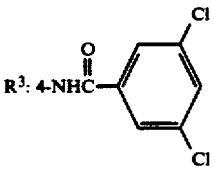

Crystalline form: White powder
Recrystallization solvent: Ethanol/water
NMR analysis: 21)
Form: Hydrochloride
Example 220
Structure -continued

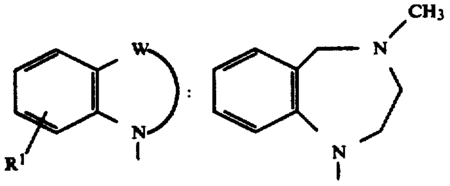

$R^2$: 3-$OCH_3$

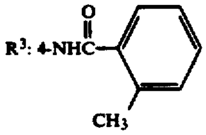

Crystalline form: White powder
Recrystallization solvent: Ethanol/diethyl ether
Melting Point: 147.5–148.5° C.
Form: Free
Example 221
Structure

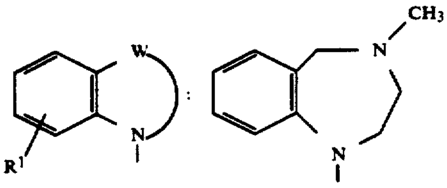

$R^2$: 3-$OCH_3$

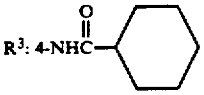

Crystalline form: White powder
Recrystallization solvent: Ethanol/diethyl ether
Melting Point: 136–137° C.
Form: Free
Example 222
Structure

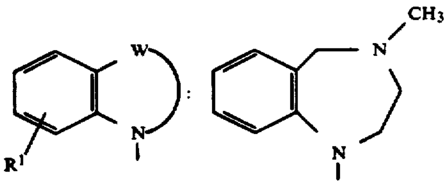

$R^2$: 3-$OCH_3$

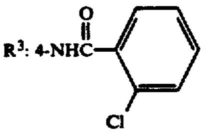

Crystalline form: White powder
Recrystallization solvent: Ethanol/diethyl ether
Melting Point: 191.5–192.5° C.
Form: Free
Example 223
Structure -continued

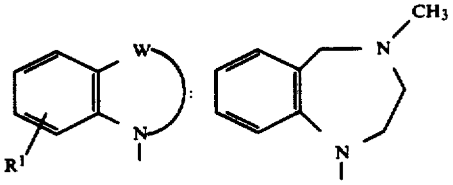

$R^2$: 3-$OCH_3$

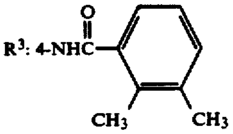

Crystalline form: White powder
Recrystallization solvent: Ethanol/diethyl ether
Melting Point: 145–146° C.
Form: Free
Example 224
Structure

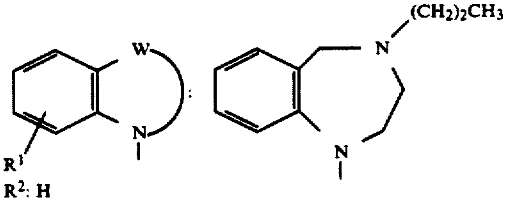

$R^2$: H

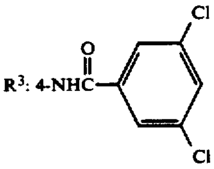

Crystalline form: White powder
Recrystallization solvent: Ethanol/water
NMR analysis: 22)
Form: Hydrochloride
Example 225
Structure

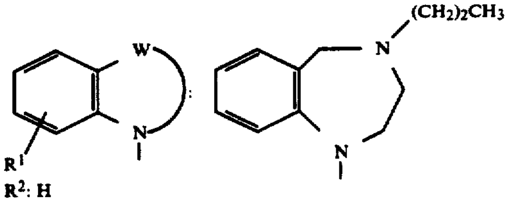

$R^2$: H

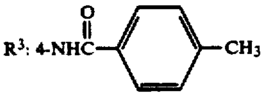

Crystalline form: White powder
Recrystallization solvent: Ethanol/water
NMR analysis: 23)
Form: Hydrochloride
Example 226
Structure -continued

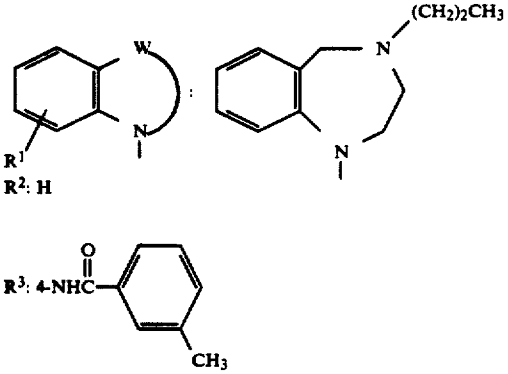

Crystalline form: White powder
Recrystallization solvent: Ethanol/water
NMR analysis: 24)
Form: Hydrochloride
Example 227
Structure

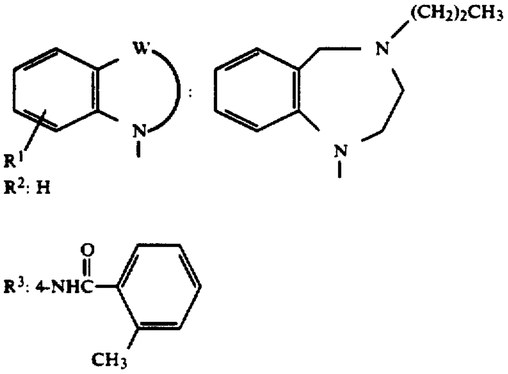

Crystalline form: White powder
Recrystallization solvent: Ethanol/water
NMR analysis: 25)
Form: Hydrochloride
Example 228
Structure

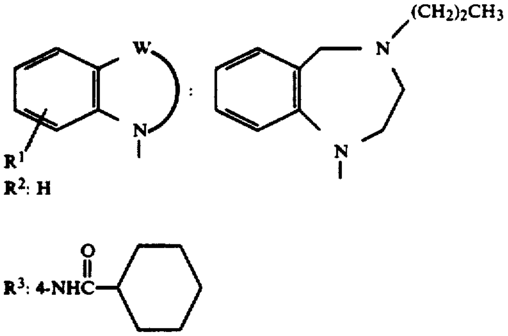

Crystalline form: White powder
Recrystallization solvent: Ethanol/water
NMR analysis: 26)
Form: Hydrochloride
Example 229
Structure -continued

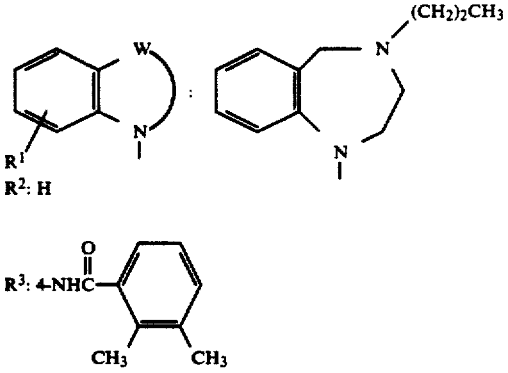

Crystalline form: White powder
Recrystallization solvent: Ethanol/water
NMR analysis: 27)
Form: Hydrochloride
Example 230
Structure

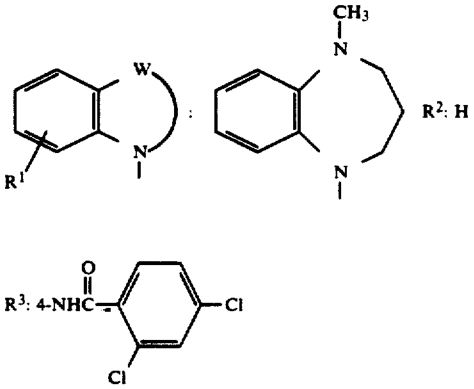

Crystalline form: White powder
Recrystallization solvent: Ethanol/diethyl ether
Melting Point: 206-207° C.
Form: Free
Example 231
Structure

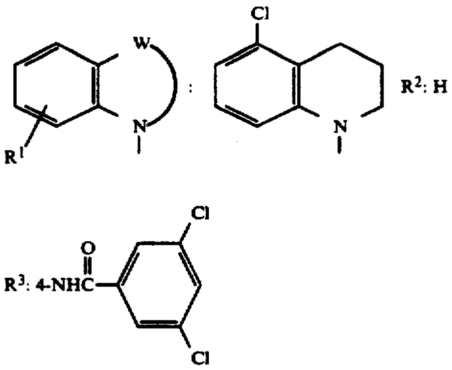

Crystalline form: White powder
Recrystallization solvent: Chloroform/methanol
Melting Point: 211-213° C.
Form: Free
Example 232
Structure -continued

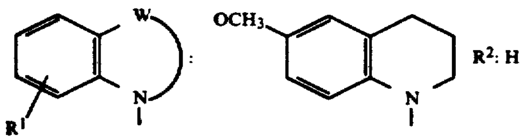

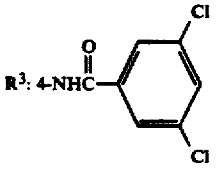

Crystalline form: White powder
Recrystallization solvent: Chloroform/methanol
Melting Point: 228.5–229.5° C.
Form: Free
Example 233
Structure

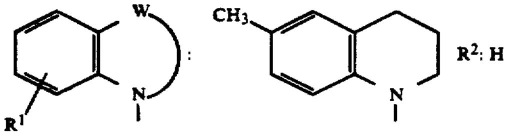

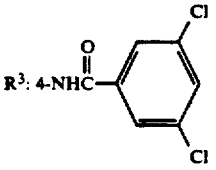

Crystalline form: White powder
Recrystallization solvent: Chloroform/methanol
Melting Point: 237–238° C.
Form: Free
Example 234
Structure

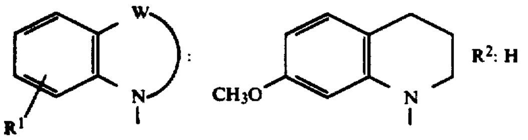

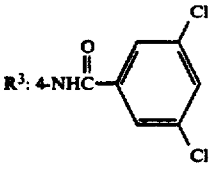

Crystalline form: White powder
Recrystallization solvent: Chloroform/methanol
Melting Point: 226–228° C.
Form: Free
Example 235
Structure

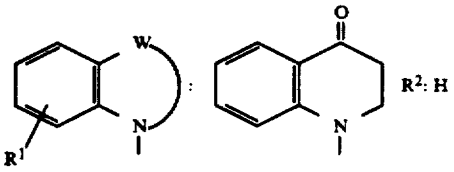

-continued

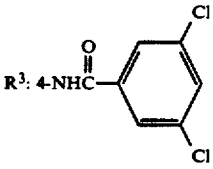

Crystalline form: White powder
Recrystallization solvent: Chloroform/methanol
Melting Point: 220–222° C.
Form: Free
Example 236
Structure

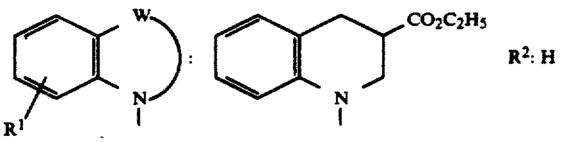

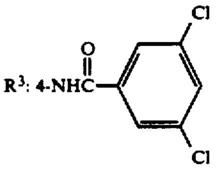

Crystalline form: Colorless amorphous
NMR analysis: 28)
Form: Free
Example 237
Structure

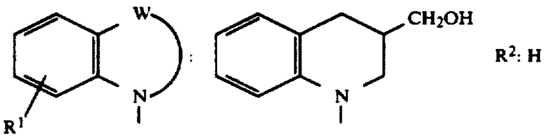

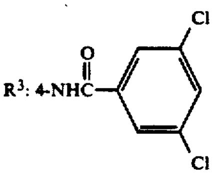

Crystalline form: White powder
Recrystallization solvent: Ethanol
Melting Point: 162–165° C.
Form: Free
Example 238
Structure

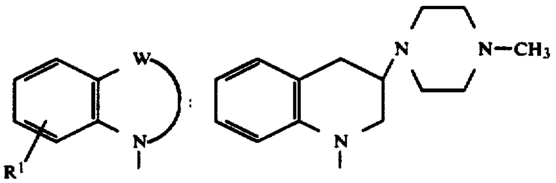

$R^2$: H

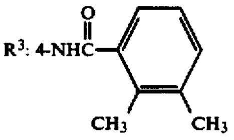

-continued

Crystalline form: Light brown amorphous
NMR analysis: 29)
Form: Free
Example 239
Structure

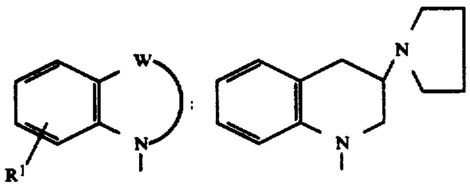

$R^2$: H

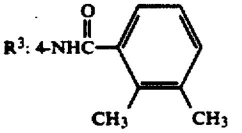

Crystalline form: Light brown amorphous
NMR analysis: 30)
Form: Free
Example 240
Structure

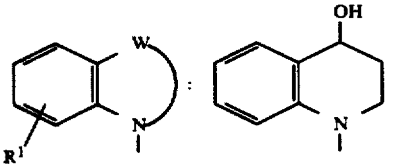

$R^2$: H

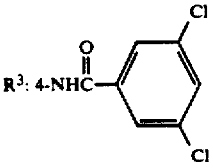

Crystalline form: White powder
Recrystallization solvent: Ethanol
Melting Point: 215-217° C.
Form: Free
Example 241
Structure

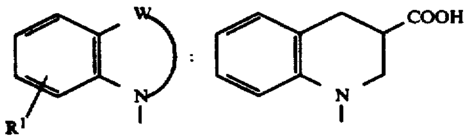

$R^2$: H

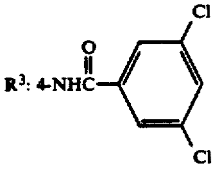

Crystalline form: White powder
Recrystallization solvent: Ethanol
Melting Point: 221-223° C.
Form: Free
Example 242
Structure -continued

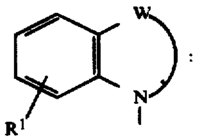

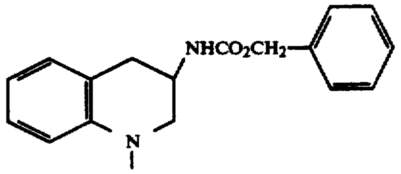

$R^2$: H

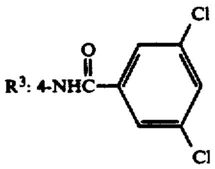

Crystalline form: Colorless amorphous
NMR analysis: 31)
Form: Free
Example 243
Structure

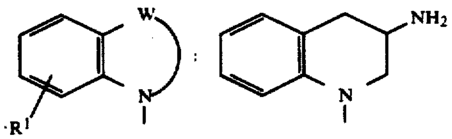

$R^2$: H

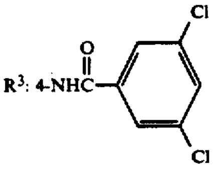

Crystalline form: White powder
Recrystallization solvent: Ethanol
Melting Point: 207-210° C.
Form: Free
Example 244
Structure

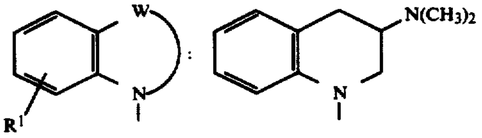

$R^2$: H

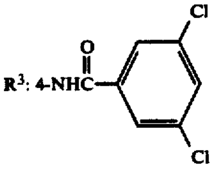

Crystalline form: Colorless amorphous
NMR analysis: 32)
Form: Free
Example 245
Structure -continued

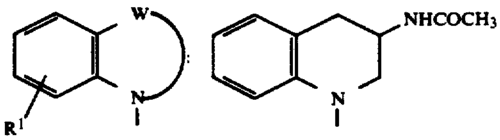

$R^2$: H

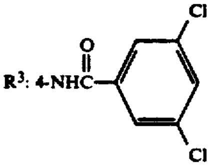

Crystalline form: Colorless amorphous
NMR analysis: 33)
Form: Free
Example 246
Structure

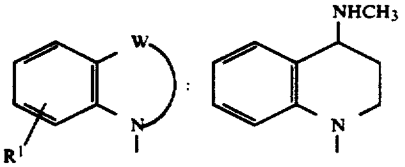

$R^2$: H

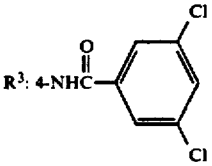

Crystalline form: Colorless amorphous
NMR analysis: 34)
Form: Free
Example 247
Structure

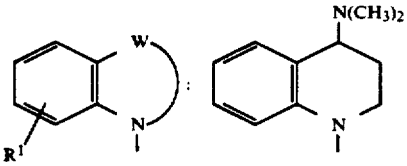

$R^2$: H

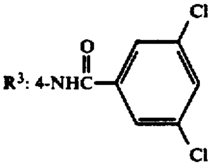

Crystalline form: Colorless amorphous
NMR analysis: 35)
Form: Free
Example 248
Structure

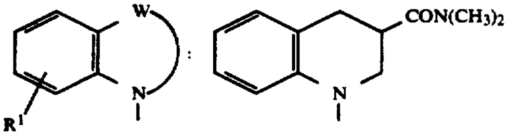

$R^2$: H

-continued

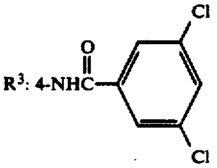

Crystalline form: Light yellow powder
Recrystallization solvent: Ethanol
Melting Point: 186–187° C.
Form: Free
Example 249
Structure

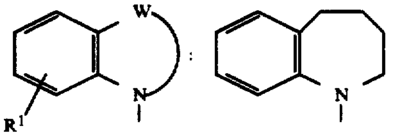

$R^2$: H

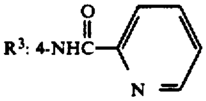

Crystalline form: Colorless needles
Recrystallization solvent: Ethanol
Melting Point: 190–191° C.
Form: Free
Example 250
Structure

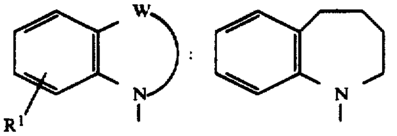

$R^2$: H

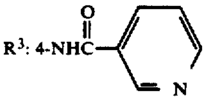

Crystalline form: Light yellow scales
Recrystallization solvent: Ethanol/water
Melting Point: 230–231° C.
Form: Free
Example 251
Structure

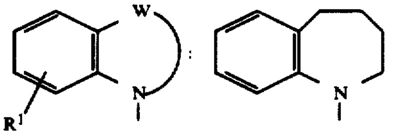

$R^2$: H

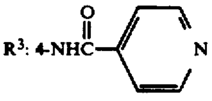

Crystalline form: Light yellow needles
Recrystallization solvent: Ethanol
Melting Point: 227–228° C.
Form: Free
Example 252
Structure -continued

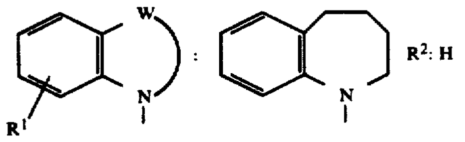

$R^3$: 4-NH$\overset{\text{O}}{\overset{\|}{\text{C}}}$CH$_2$CH$_2$COOH

Crystalline form: Colorless needles
Recrystallization solvent: Ethyl acetate
Melting Point: 192° C.
Form: Free
Example 253
Structure

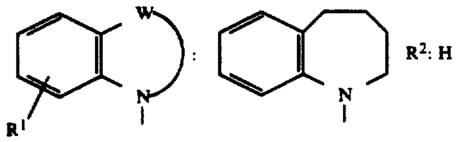

$R^3$: 4-NH$\overset{\text{O}}{\overset{\|}{\text{C}}}$CH$_2$CH$_2$CH$_2$COOH

Crystalline form: White powder
Recrystallization solvent: Ethyl acetate
Melting Point: 186.5-189° C.
Form: Free
Example 254
Structure

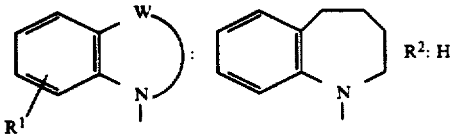

$R^3$: 4-NH$\overset{\text{O}}{\overset{\|}{\text{C}}}$(CH$_2$)$_2$$\overset{\text{O}}{\overset{\|}{\text{C}}}$N(C$_2$H$_5$)$_2$ Crystalline form: Light yellow scales
Recrystallization solvent: n-Hexane/ethyl acetate
Melting Point: 165-167° C.
Form: Free
Example 255
Structure

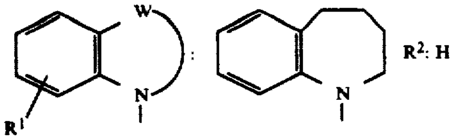

$R^3$: 4-NH$\overset{\text{O}}{\overset{\|}{\text{C}}}$(CH$_2$)$_2$$\overset{\text{O}}{\overset{\|}{\text{C}}}$NH(CH$_2$)$_3$CH$_3$ Crystalline form: White powder
Recrystallization solvent: Ethyl acetate
Melting Point: 169-170° C.
Form: Free
Example 256
Structure

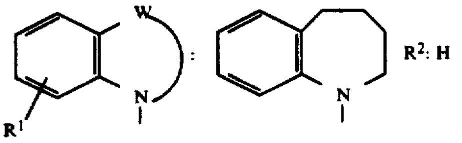

-continued

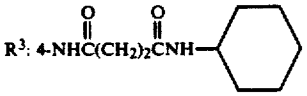

Crystalline form: Colorless scales
Recrystallization solvent: n-Hexane/ethyl acetate
Melting Point: 174-177° C.
Form: Free
Example 257
Structure

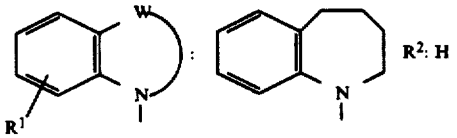

$R^3$: 4-NH$\overset{\text{O}}{\overset{\|}{\text{C}}}$(CH$_2$)$_2$$\overset{\text{O}}{\overset{\|}{\text{C}}}$NH(CH$_2$)$_2$N(CH$_3$)$_2$ Crystalline form: White powder
Recrystallization solvent: Ethyl acetate
Melting Point: 114-118° C.
Form: Free
Example 258
Structure

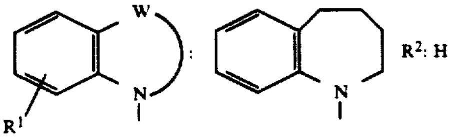

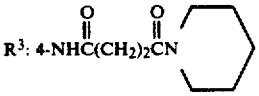

Crystalline form: White powder
Recrystallization solvent: Ethyl acetate
Melting Point: 170-172° C.
Form: Free
Example 259
Structure

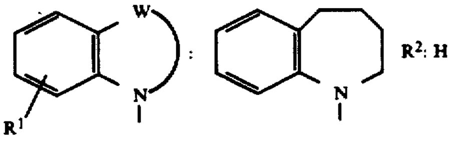

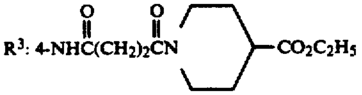

Crystalline form: White powder
Recrystallization solvent: n-Hexane/ethyl acetate
Melting Point: 179-181° C.
Form: Free
Example 260
Structure -continued

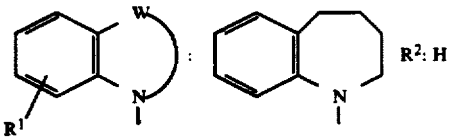

$R^3$: $4\text{-}NH\overset{O}{\overset{\|}{C}}(CH_2)_2\overset{O}{\overset{\|}{C}}NH_2$ Crystalline form: White powder
Recrystallization solvent: Ethyl acetate
Melting Point: 118–121° C.
Form: Free Example 261

Structure

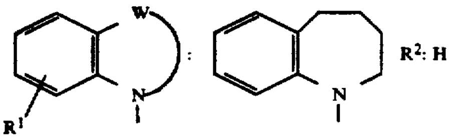

$R^3$: $4\text{-}NH\overset{O}{\overset{\|}{C}}(CH_2)_3\overset{O}{\overset{\|}{C}}N(C_2H_5)_2$ Crystalline form: White powder
Recrystallization solvent: Ethyl acetate
Melting Point: 144–148° C.
Form: Free Example 262

Structure

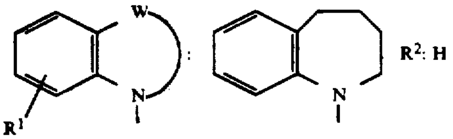

$R^3$: $4\text{-}NH\overset{O}{\overset{\|}{C}}(CH_2)_3\overset{O}{\overset{\|}{C}}NH(CH_2)_3CH_3$ Crystalline form: Colorless scales
Recrystallization solvent: Ethyl acetate
Melting Point: 156–157° C.
Form: Free Example 263

Structure

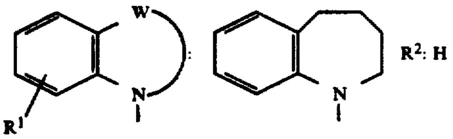

$R^3$: $4\text{-}NH\overset{O}{\overset{\|}{C}}(CH_2)_3\overset{O}{\overset{\|}{C}}NH$—

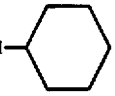

Crystalline form: White powder
Recrystallization solvent: Ethyl acetate
Melting Point: 204–206° C.
Form: Free Example 264

Structure

-continued

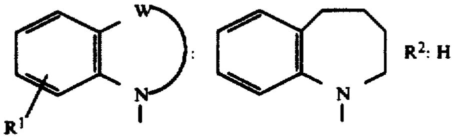

$R^3$: $4\text{-}NH\overset{O}{\overset{\|}{C}}CH_2Cl$

Crystalline form: Light yellow powder
Recrystallization solvent: n-Hexane/ethyl acetate
Melting Point: 165–167° C.
Form: Free Example 265

Structure

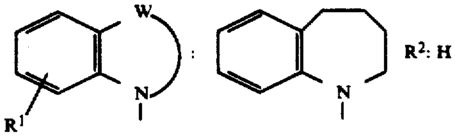

$R^3$: $4\text{-}NH\overset{O}{\overset{\|}{C}}CH_2CH_2Cl$

Crystalline form: Light yellow amorphous
NMR analysis: 36)
Form: Free

Example 266

Structure

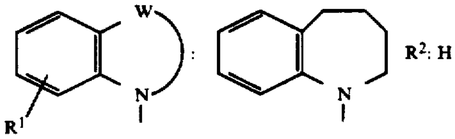

$R^3$: $4\text{-}NH\overset{O}{\overset{\|}{C}}(CH_2)_3Cl$

Crystalline form: White powder
Recrystallization solvent: n-Hexane/ethyl acetate
Melting Point: 122–124° C.
Form: Free Example 267

Structure

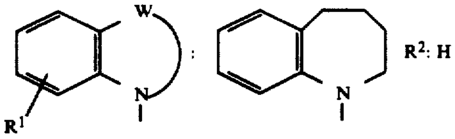

$R^3$: $4\text{-}NH\overset{O}{\overset{\|}{C}}CH_2CO_2C_2H_5$

Crystalline form: Light yellow powder
Recrystallization solvent: n-Hexane/ethyl acetate
Melting Point: 116–117° C.
Form: Free Example 268

Structure

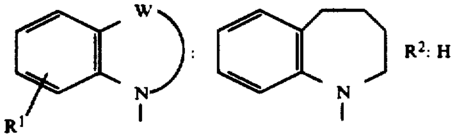

-continued $R^3$: $4\text{-}NH\overset{\overset{O}{\|}}{C}(CH_2)_2CO_2C_2H_5$

Crystalline form: White powder
Recrystallization solvent: n-Hexane/ethyl acetate
Melting Point: 121–123° C.
Form: Free
Example 269
Structure

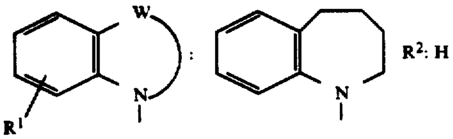

$R^3$: $4\text{-}NH\overset{\overset{O}{\|}}{C}-\overset{\overset{Br}{|}}{C}H-C_2H_5$ Crystalline form: Colorless needles
Recrystallization solvent: Ethyl acetate
Melting Point: 186–187° C.
Form: Free
Example 270
Structure

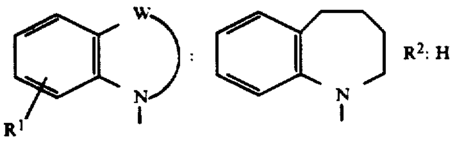

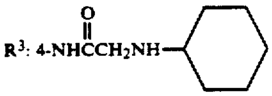

Crystalline form: White powder
Recrystallization solvent: n-Hexane/ethyl acetate
Melting Point: 139–142° C.
Form: Free
Example 271
Structure

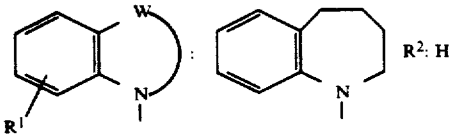

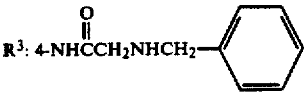

Crystalline form: Light yellow amorphous
NMR analysis: 37)
Form: Free
Example 272
Structure

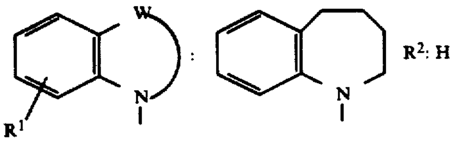

$R^3$: $4\text{-}NH\overset{\overset{O}{\|}}{C}CH_2NHCH(CH_3)_2$

-continued

Crystalline form: White powder
Recrystallization solvent: Ethyl acetate
Melting Point: 149.5–152.5° C.
Form: Free
Example 273
Structure

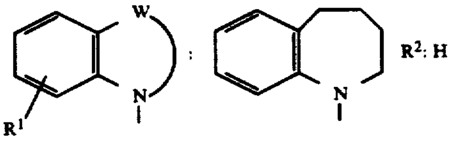

$R^3$: $4\text{-}NH\overset{\overset{O}{\|}}{C}CH_2NHC(CH_3)_3$

Crystalline form: Colorless needles
Recrystallization solvent: Ethanol
Melting Point: 150–152.5° C.
Form: Free
Example 274
Structure

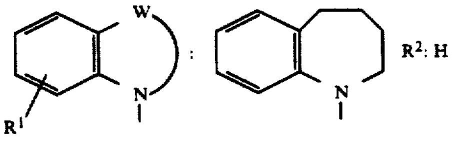

$R^3$: $4\text{-}NH\overset{\overset{O}{\|}}{C}CH_2NH(CH_2)_2OH$

Crystalline form: White powder
Recrystallization solvent: Ethyl acetate
Melting Point: 150° C.
Form: Free
Example 275
Structure

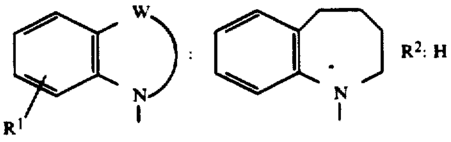

$R^3$: $4\text{-}NH\overset{\overset{O}{\|}}{C}CH_2N(C_2H_5)_2$

Crystalline form: Colorless needles
Recrystallization solvent: n-Hexane/ethyl acetate
Melting Point: 101–104° C.
Form: Free
Example 276
Structure

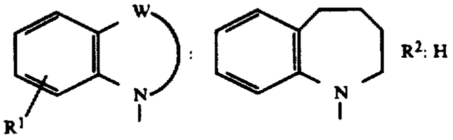

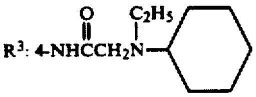

Crystalline form: White powder
Recrystallization solvent: n-Hexane/ethyl acetate
Melting Point: 120–122° C.
Form: Free
Example 277

Structure

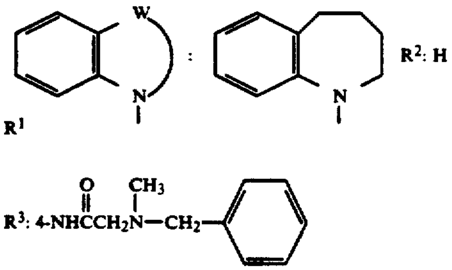

Crystalline form: Light yellow amorphous
NMR analysis: 38)
Form: Free

Example 278

Structure

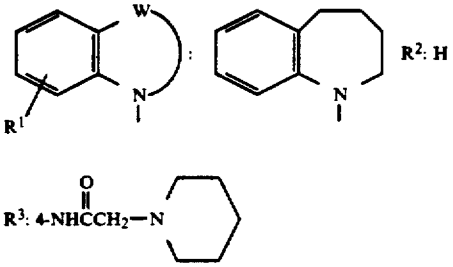

Crystalline form: Colorless needles
Recrystallization solvent: Ethanol
Melting Point: 183–186° C.
Form: Free Example 279

Structure

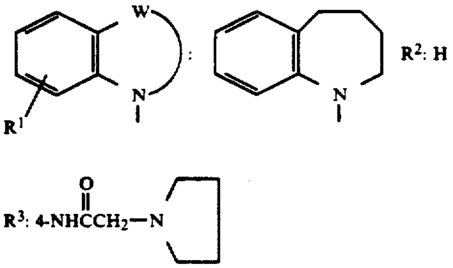

Crystalline form: Light brown powder
Recrystallization solvent: n-Hexane/ethyl acetate
Melting Point: 139–142° C.
Form: Free Example 280

Structure

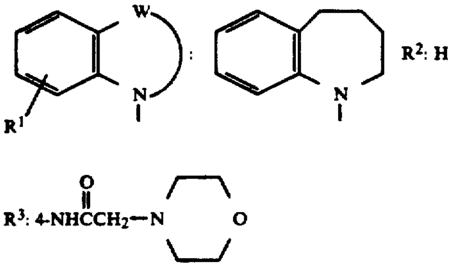

Crystalline form: Light yellow powder
Recrystallization solvent: Ethanol
Melting Point: 162–165° C.
Form: Free Example 281

Structure

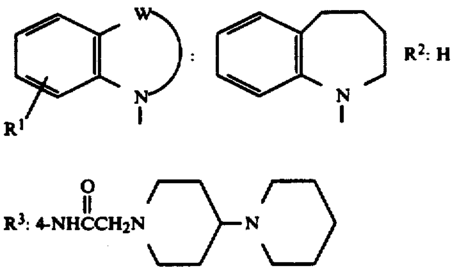

Crystalline form: Light yellow scales
Recrystallization solvent: Ethyl acetate
Melting Point: 224–227° C.
Form: Free Example 282

Structure

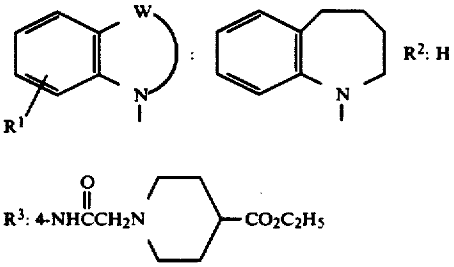

Crystalline form: Light yellow amorphous
NMR analysis: 39)
Form: Free

Example 283

Structure

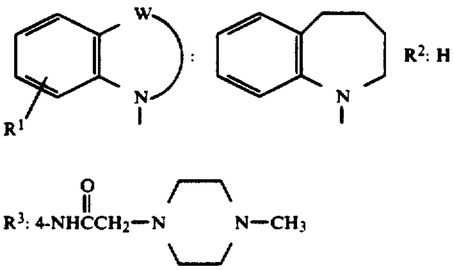

Crystalline form: Light yellow powder
Recrystallization solvent: Ethanol/water
Melting Point: 162–164° C.
Form: Free Example 284

Structure

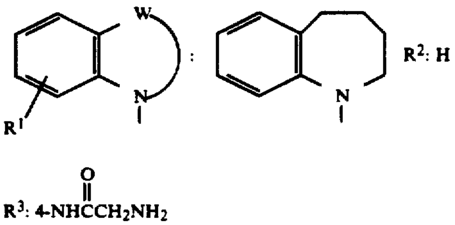

Crystalline form: Light yellow powder
Recrystallization solvent: Ethanol
Melting Point: 238–241° C. (decomposed)
Form: Hydrochloride Example 285

Structure

-continued

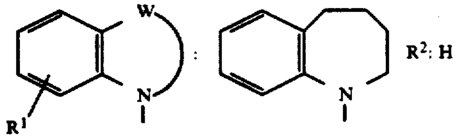

Crystalline form: Light yellow amorphous
NMR analysis: 40)
Form: Free
Example 286
Structure

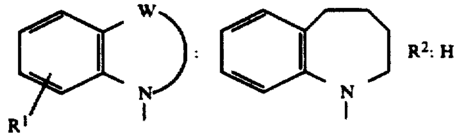

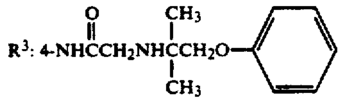

Crystalline form: Colorless amorphous
NMR analysis: 41)
Form: Free
Example 287
Structure

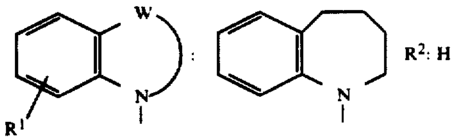

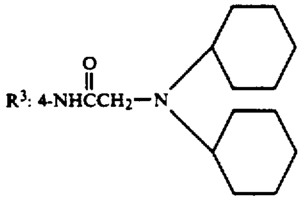

Crystalline form: Colorless needles
Recrystallization solvent: n-Hexane/ethyl acetate
Melting Point: 168–169° C.
Form: Free
Example 288
Structure

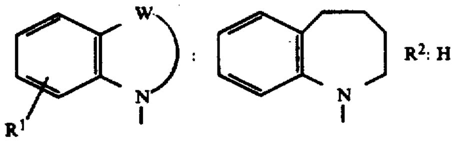

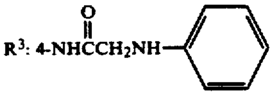

Crystalline form: Light brown powder
Recrystallization solvent: Ethanol
Melting Point: 189–191° C.
Form: Free -continued Example 289
Structure

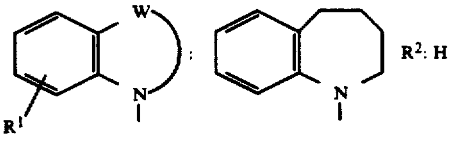

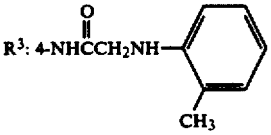

Crystalline form: White powder
Recrystallization solvent: n-Hexane/ethyl acetate
Melting Point: 200–202° C.
Form: Free
Example 290
Structure

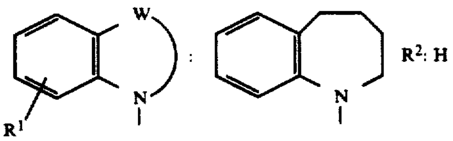

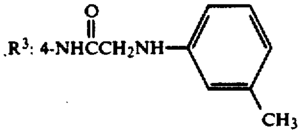

Crystalline form: Colorless scales
Recrystallization solvent: n-Hexane/ethyl acetate
Melting Point: 143–146° C.
Form: Free
Example 291
Structure

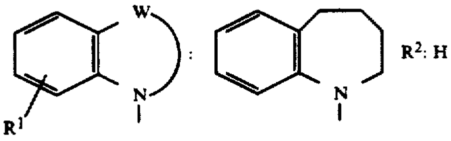

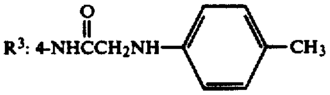

Crystalline form: White powder
Recrystallization solvent: n-Hexane/ethyl acetate
Melting Point: 117–117.5° C.
Form: Free
Example 292
Structure

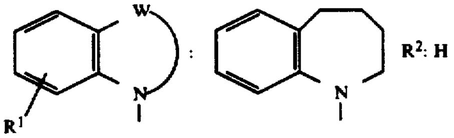

-continued

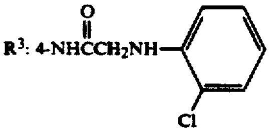

Crystalline form: Light brown powder
Recrystallization solvent: Diethyl ether/ethyl acetate
Melting Point: 225-226° C.
Form: Free
Example 293
Structure

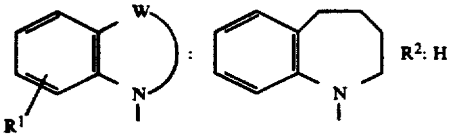

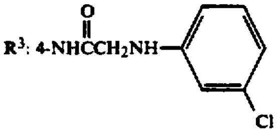

Crystalline form: White powder
Recrystallization solvent: n-Hexane/ethanol
Melting Point: 175-176.5° C.
Form: Free
Example 294
Structure

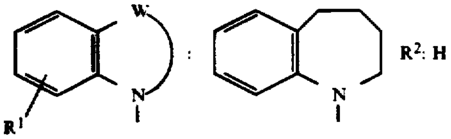

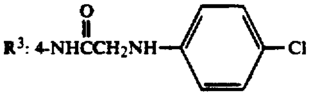

Crystalline form: White powder
Recrystallization solvent: Ethyl acetate
Melting Point: 234-236° C.
Form: Free
Example 295
Structure

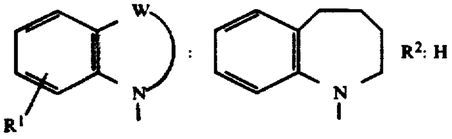

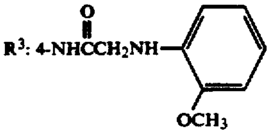

Crystalline form: Colorless scales
Recrystallization solvent: Ethyl acetate
Melting Point: 172-174° C.
Form: Free
Example 296
Structure -continued

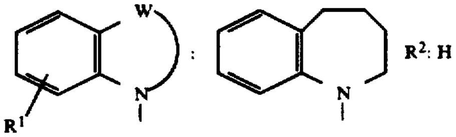

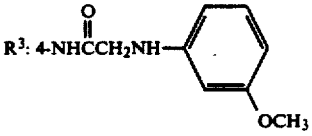

Crystalline form: White powder
Recrystallization solvent: Ethyl acetate
Melting Point: 154-155° C.
Form: Free
Example 297
Structure

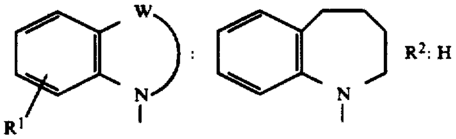

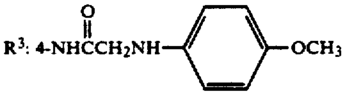

Crystalline form: Light yellow needles
Recrystallization solvent: n-Hexane/ethyl acetate
Melting Point: 181.5-183.5° C.
Form: Free
Example 298
Structure

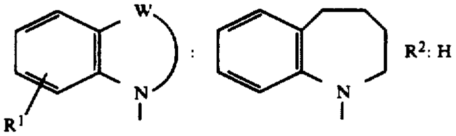

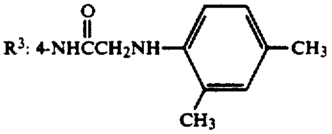

Crystalline form: White powder
Recrystallization solvent: n-Hexane/ethyl acetate
Melting Point: 173-175° C.
Form: Free
Example 299
Structure

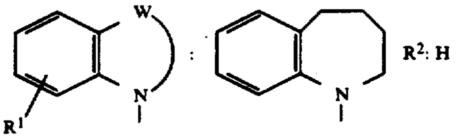

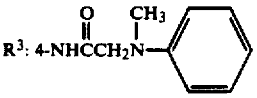

Crystalline form: White powder
Recrystallization solvent: n-Hexane/ethyl acetate -continued Melting Point: 137-138° C.
Form: Free Example 300
Structure

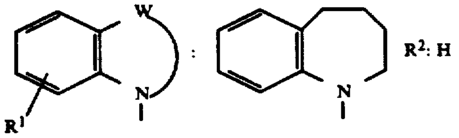

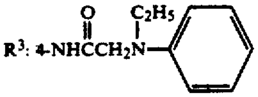

Crystalline form: Light yellow amorphous
NMR analysis: 42)
Form: Free
Example 301
Structure

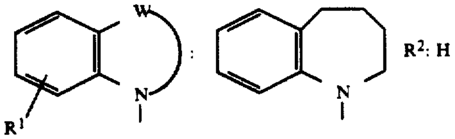

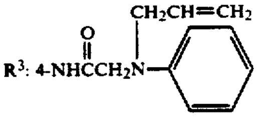

Crystalline form: Colorless needles
Recrystallization solvent: Diethyl ether/ethyl acetate
Melting Point: 129-130° C.
Form: Free
Example 302
Structure

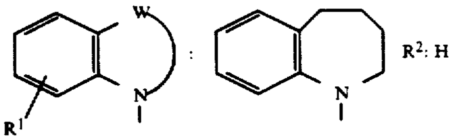

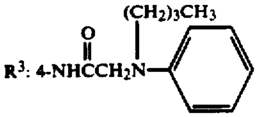

Crystalline form: Colorless needles
Recrybtallization solvent: n-Hexane/ethyl acetate
Melting Point: 181-183° C.
Form: Free
Example 303
Structure

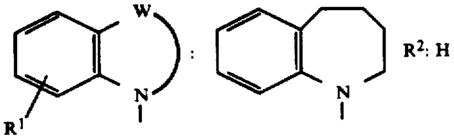

-continued

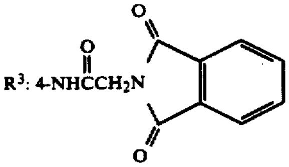

Crystalline form: White powder
Recrystallization solvent: Ethyl acetate
Melting Point: 248-249° C.
Form: Free
Example 304
Structure

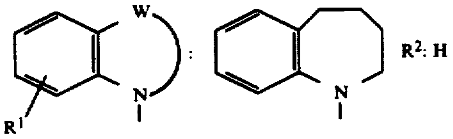

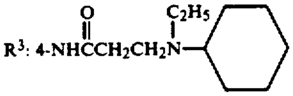

Crystalline form: Light yellow amorphous
NMR analysis: 43)
Form: Free
Example 305
Structure

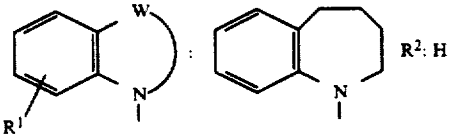

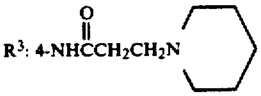

Crystalline form: Light yellow needles
Recrystallization solvent: Ethanol
Melting Point: 94-96° C.
Form: Free
Example 306
Structure

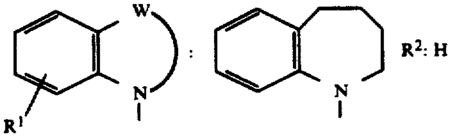

Crystalline form: Light brown powder
Recrystallization solvent: Ethyl acetate
Melting Point: 159-161° C.
Form: Free
Example 307
Structure -continued

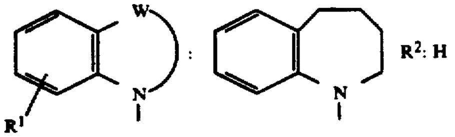

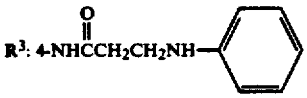

Crystalline form: White powder
Recrystallization solvent: Ethyl acetate
Melting Point: 180–183° C.
Form: Free
Example 308
Structure

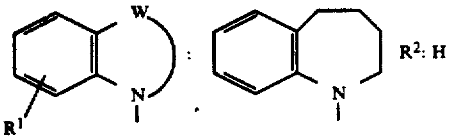

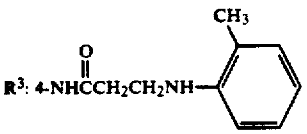

Crystalline form: Light brown powder
Recrystallization solvent: Ethanol
Melting Point: 177–180° C.
Form: Free
Example 309
Structure

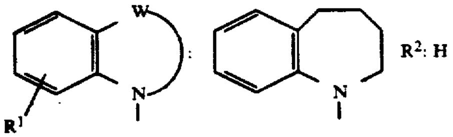

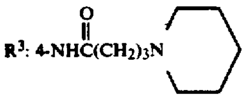

Crystalline form: White powder
Recrystallization solvent: Ethyl acetate
Melting Point: 91–93° C.
Form: Free
Example 310
Structure

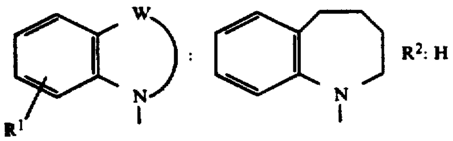

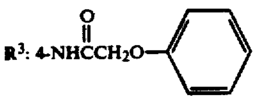

Crystalline form: Light brown scales
Recrystallization solvent: Ethanol
Melting Point: 155–156.5° C.
Form: Free -continued Example 311
Structure

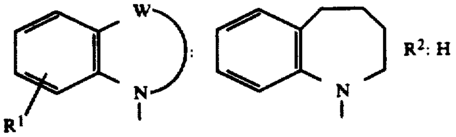

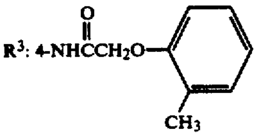

Crystalline form: Colorless scales
Recrystallization solvent: Ethyl acetate
Melting Point: 172.5–175° C.
Form: Free
Example 312
Structure

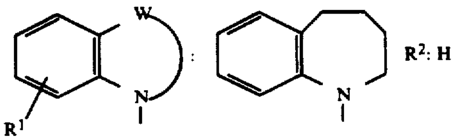

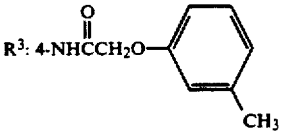

Crystalline form: White powder
Recrystallization solvent: Ethanol
Melting Point: 148–150.5° C.
Form: Free
Example 313
Structure

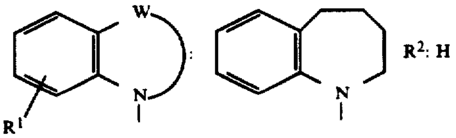

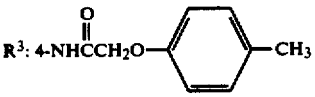

Crystalline form: White powder
Recrystallization solvent: Ethyl acetate
Melting Point: 172–173° C.
Form: Free
Example 314
Structure

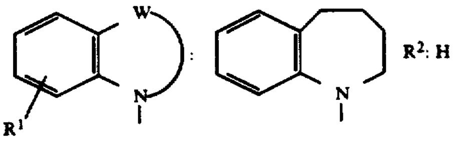

-continued

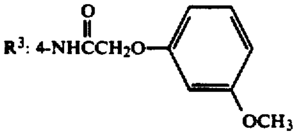

Crystalline form: Colorless scales
Recrystallization solvent: n-Hexane/ethyl acetate
Melting Point: 133–135° C.
Form: Free
Example 315
Structure

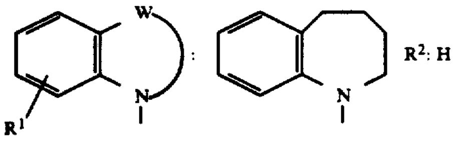

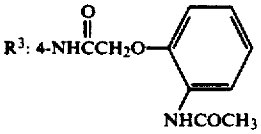

Crystalline form: White powder
Recrystallization solvent: Ethyl acetate
Melting Point: 217–219° C.
Form: Free
Example 316
Structure

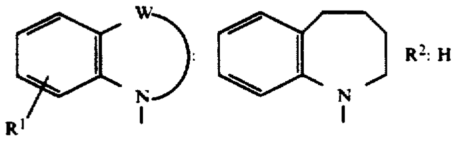

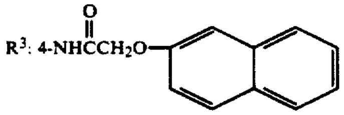

Crystalline form: Colorless needles
RecryStallization solvent: Ethyl acetate
Melting Point: 226–227.5° C.
Form: Free
Example 317
Structure

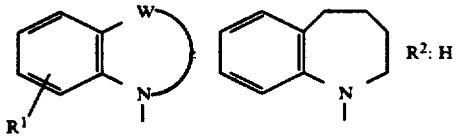

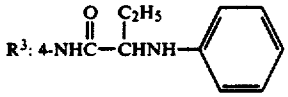

Crystalline form: Colorless amorphous
NMR analysis: 44)
Form: Free
Example 318
Structure -continued

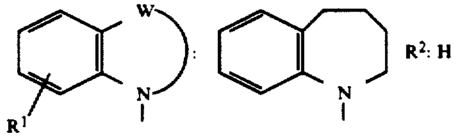

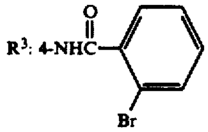

Crystalline form: White powder
Recrystallization solvent: Dichloromethane
Melting Point: 234–235° C.
Form: Free
Example 319
Structure

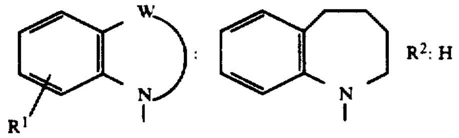

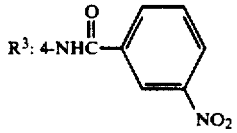

Crystalline form: Colorless prisms
Recrystallization solvent: Methanol
Melting Point: 218–218.5° C.
Form: Free
Example 320
Structure

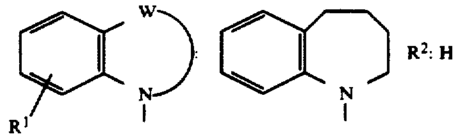

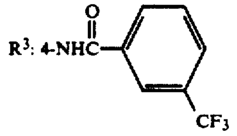

Crystalline form: Colorless prisms
Recrygtallization solvent: Ethanol
Melting Point: 202.5–206° C.
Form: Free
Example 321
Structure

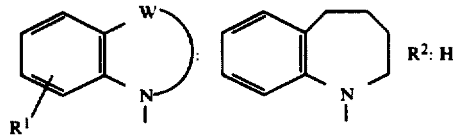

-continued

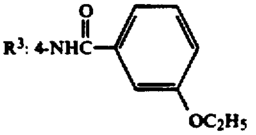

Crystalline form: White powder
Recrystallization solvent: Ethanol
Melting Point: 174–176° C.
Form: Free
Example 322
Structure

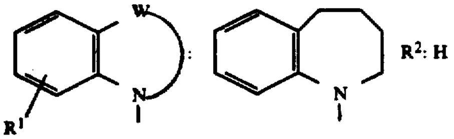

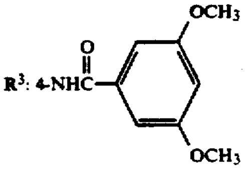

Crystalline form: Colorless prisms
Recrystallization solvent: Ethanol
Melting Point: 216–218° C.
Form: Free
Example 323
Structure

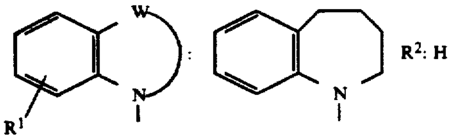

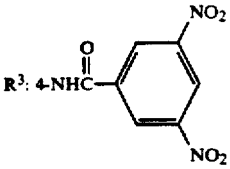

Crystalline form: White powder
Melting Point: >300° C.
NMR analysis: 45)
Form: Free
Example 324
Structure

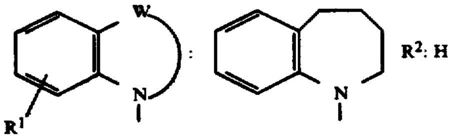

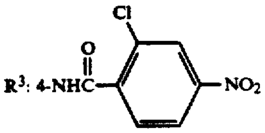

Crystalline form: Colorless prisms
Recrystallization solvent: Ethanol
Melting Point: 250.5–251° C.
Form: Free -continued Example 325
Structure

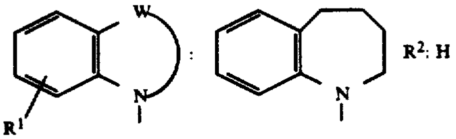

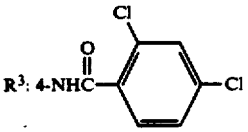

Crystalline form: Colorless prisms
Recrystallization solvent: Ethanol
Melting Point: 223–225° C.
Form: Free
Example 326
Structure

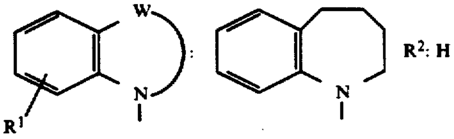

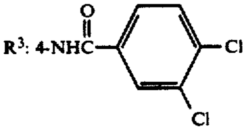

Crystalline form: Colorless prisms
Recrystallization solvent: Methanol
Melting Point: 213–214° C.
Form: Free
Example 327
Structure

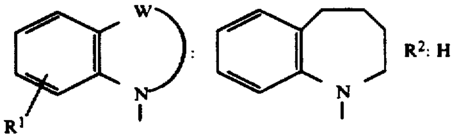

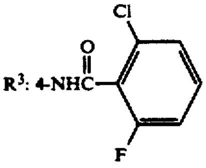

Crystalline form: Colorless prisms
Recrystallization solvent: Ethanol
Melting Point: 246–247° C.
Form: Free
Example 328
Structure

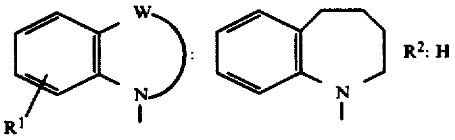

-continued

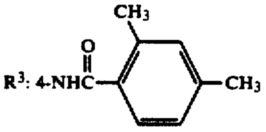

Crystalline form: Colorless prisms
Recrystallization solvent: Methanol
Melting Point: 248–251° C.
Form: Free Example 329

Structure

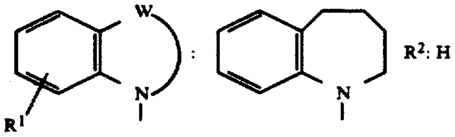

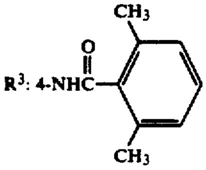

Crystalline form: Colorless prisms
Recrystallization solvent: Ethanol
Melting Point: 268.5–270.5° C.
Form: Free Example 330

Structure

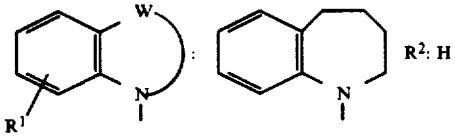

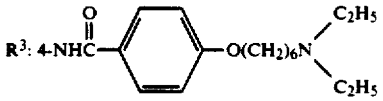

Crystalline form: White powder
Recrystallization solvent: Methanol/diethyl ether
Melting Point: 174–176° C.
Form: Hydrochloride Example 331

Structure

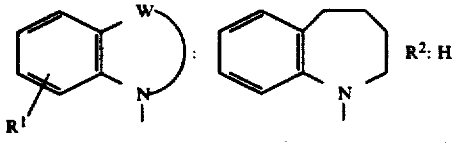

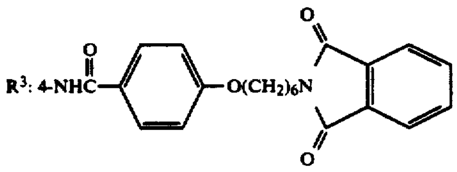

Crystalline form: White powder
Recrystallization solvent: Ethanol
Melting Point: 130–134° C.
Form: Free Example 332

Structure

-continued

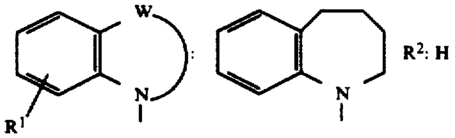

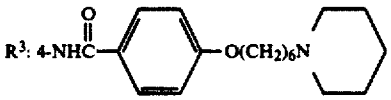

Crystalline form: White powder
Recrygtallization solvent: Methanol/diethyl ether
Melting Point: 214–217° C.
Form: Hydrochloride Example 333

Structure

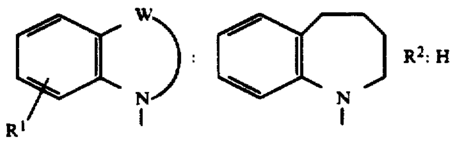

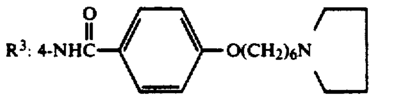

Crystalline form: White powder
Recrystallization solvent: Methanol/diethyl ether
Melting Point: 218–220° C.
Form: Hydrochloride Example 334

Structure

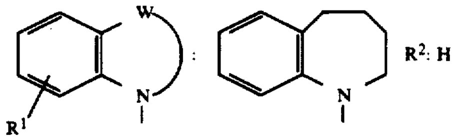

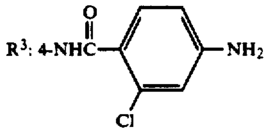

Crystalline form: White powder
Recrystallization solvent: Ethyl acetate
Melting Point: 222–225° C.
Form: Free Example 335

Structure

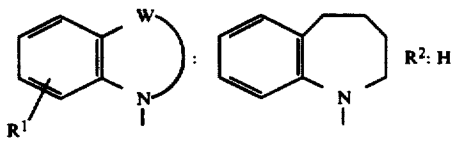

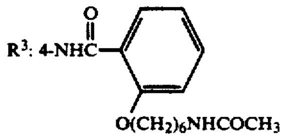

Crystalline form: Colorless needles

-continued

Recrystallization solvent: Methanol/diethyl ether
Melting Point: 171-172° C.
Form: Free
Example 336
Structure

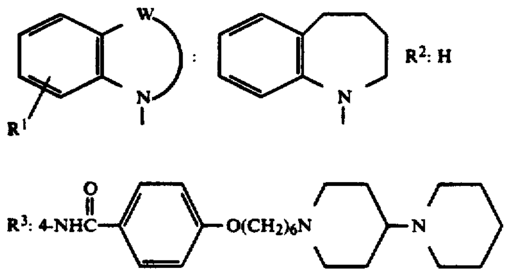

Crystalline form: White powder
Recryttallization solvent: Methanol/diethyl ether
Melting Point: 235.5-236° C.
Form: Dihydrochloride
Example 337
Structure

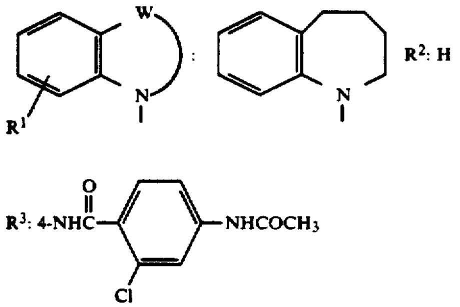

Crystalline form: White powder
Recrystallization solvent: Methanol/diethyl ether
Melting Point: 241-243° C.
Form: Free
Example 338
Structure

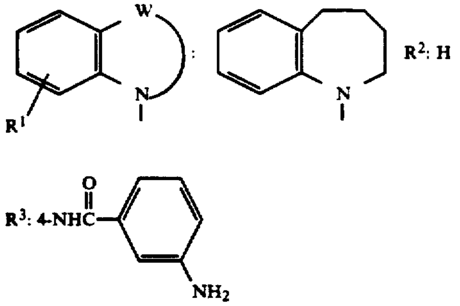

Crystalline form: White powder
Recrystallization solvent: Methanol/diethyl ether
Melting Point: 187-191° C.
Form: Free
Example 339
Structure

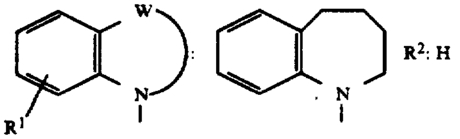

-continued

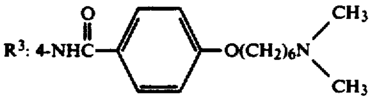

Crystalline form: White powder
Recrystallization solvent: Methanol/diethyl ether
Melting Point: 240-244° C.
Form: Hydrochloride
Example 340
Structure

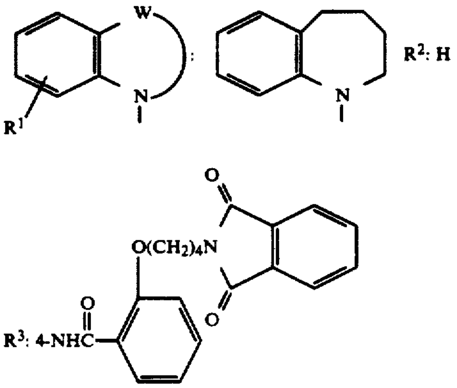

Crystalline form: Colorless prisms
Recrystallization solvent: methanol/diethyl ether
Melting Point: 181-182° C.
Form: Free
Example 341
Structure

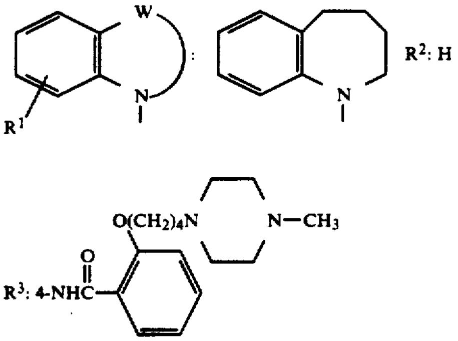

Crystalline form: Colorless prisms
Recrystallization solvent: Methanol/diethyl ether
Melting Point: 188-190° C.
Form: Dihydrochloride
Example 342
Structure

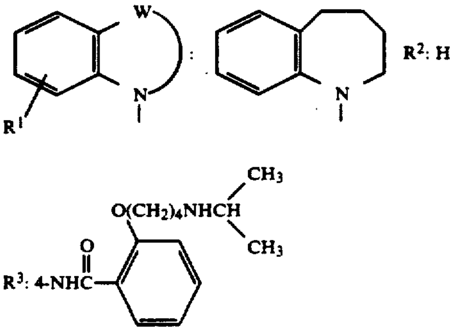

Crystalline form; White powder

-continued

Recrystallization solvent: Isopropyl alcohol
Melting Point: 218–218.5° C.
Form: Hydrochloride
Example 343
Structure

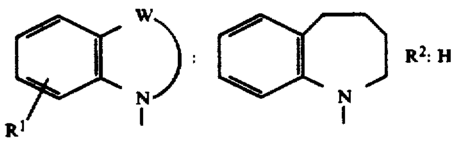

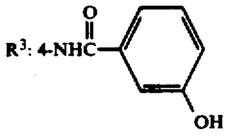

Crystalline form: White powder
Recrystallization solvent: Methanol/diethyl ether
Melting Point: 243–245.5° C.
Form: Free
Example 344
Structure

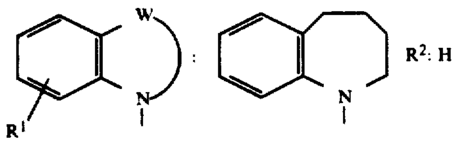

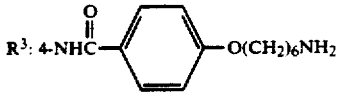

Crystalline form: White powder
Recrygtallization solvent: Methanol/diethyl ether
Melting Point: 130–133° C.
Form: Free
Example 345
Structure

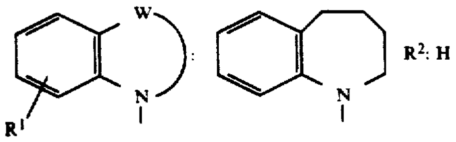

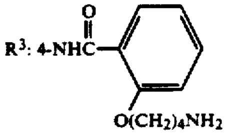

Crystalline form: White powder
Recrystallization solvent: Methanol/diethyl ether
Melting Point: 155–158° C.
Form: Free
Example 346
Structure

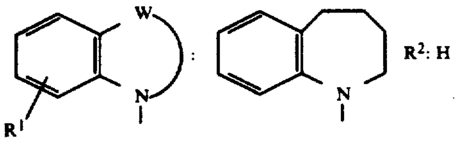

-continued

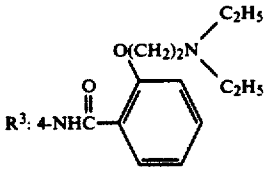

Crystalline form: White powder
Recrygtallization solvent: Methanol/diethyl ether
Melting Point: 208–210° C.
Form: Hydrochloride
Example 347
Structure

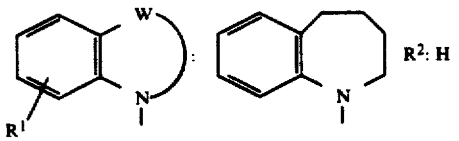

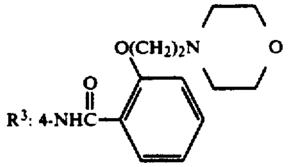

Crystalline form: Colorless prisms
Recrystallization solvent: Methanol/diethyl ether
Melting Point: 154–155° C.
Form: Hydrochloride
Example 348
Structure

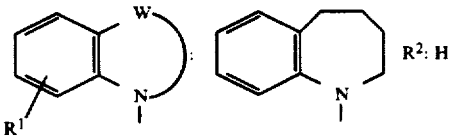

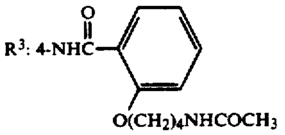

Crystalline form: White powder
Recrystallization solvent: Methanol/diethyl ether
Melting Point: 142–143° C.
Form: Free
Example 349
Structure

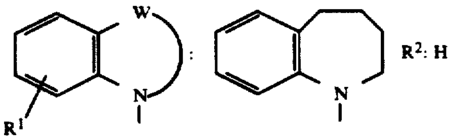

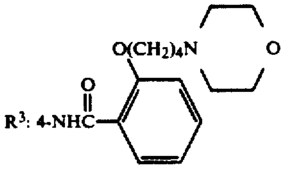

Crystalline form: White powder
Recrystallization solvent: Methanol/diethyl ether -continued Melting Point: 120–125° C.
Form: Hydrochloride
Example 350
Structure

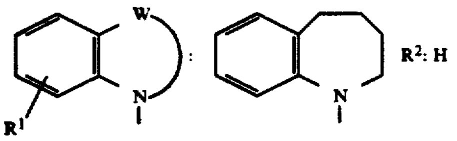

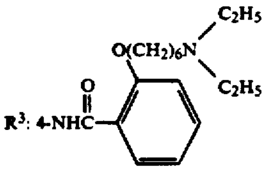

Crystalline form: White powder
Recrystallization solvent: Methanol/diethyl ether
Melting Point: 91–95° C.
Form: Hydrochloride
Example 351
Structure

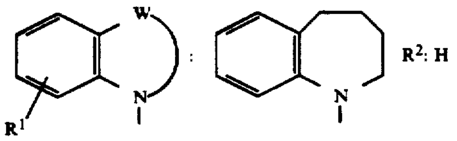

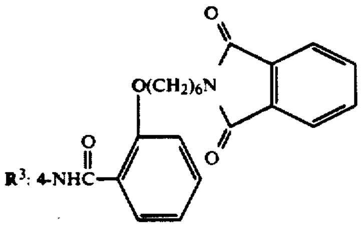

Crystalline form: White powder
Recrystallization solvent: Methanol/diethyl ether
Melting Point: 145–146.5° C.
Form: Free
Example 352
Structure

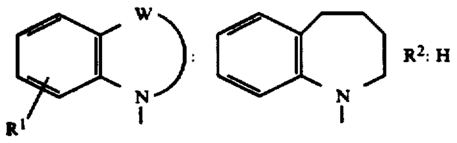

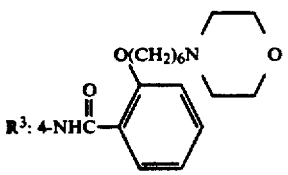

Crystalline form: White powder
Recrystallization solvent: Methanol/diethyl ether
Melting Point: 105–105.5° C.
Form: Free
Example 353
Structure -continued

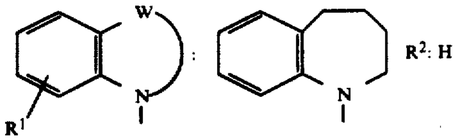

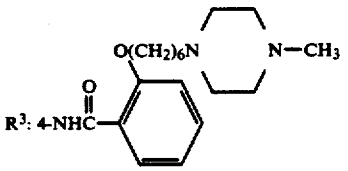

Crystalline form: White powder
Recrystallization solvent: Methanol/diethyl ether
Melting Point: 151–155° C.
Form: Dihydrochloride
Example 354
Structure

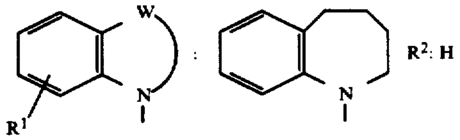

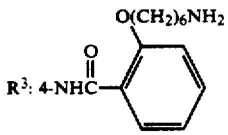

Crystalline form: White powder
Recrystallization solvent: Methanol/diethyl ether
Melting Point: 135.5–137.5° C.
Form: Free
Example 355
Structure

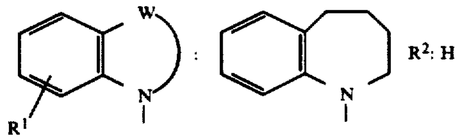

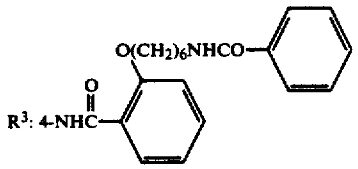

Crystalline form: White powder
Recrystallization solvent: Ethanol
Melting Point: 178–178.5° C.
Form: Free
Example 356
Structure

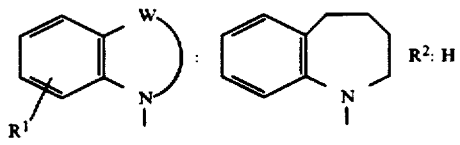

-continued

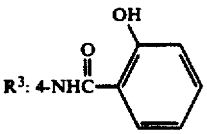

Crystalline form: White powder
Recrystallization solvent: Dichloromethane
Melting Point: 266.5–268° C.
Form: Free
Example 357
Structure

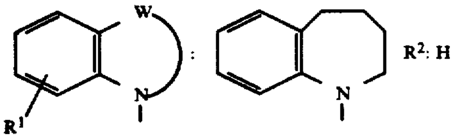

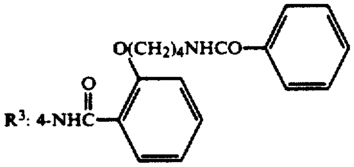

Crystalline form: White powder
Recrystallization solvent: Methanol/diethyl ether
Melting Point: 123–124° C.
Form: Free
Example 358
Structure

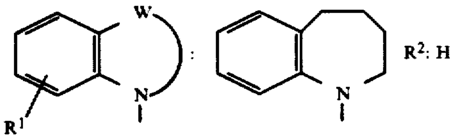

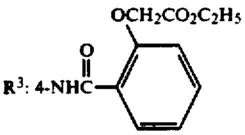

Crystalline form: White powder
Recrystallization solvent: Ethyl acetate
Melting Point: 212–213.5° C.
Form: Free
Example 359
Structure

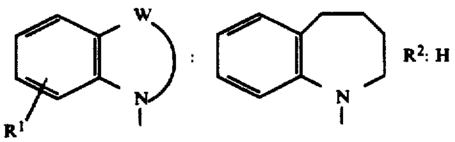

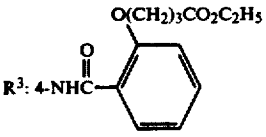

Crystalline form: Colorless scales
Recrystallization solvent: Ethyl acetate
Melting Point: 160.5–162° C.
Form: Free
Example 360
Structure -continued

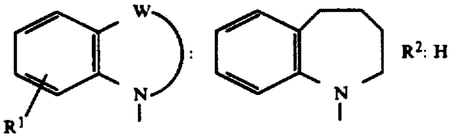

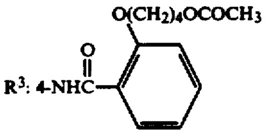

Crystalline form: Colorless needles
Recrystallization solvent: Ethanol
Melting Point: 103–105° C.
Form: Free
Example 361
Structure

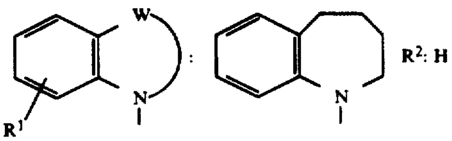

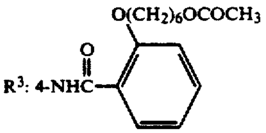

Crystalline form: White powder
Recrystallization solvent: Ethanol
Melting Point: 145–146° C.
Form: Free
Example 362
Structure

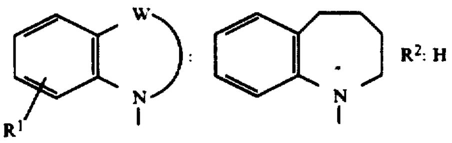

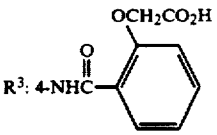

Crystalline form: White powder
Recrystallization solvent: Methanol/diethyl ether
Melting Point: 247–250° C.
Form: Free
Example 363
Structure

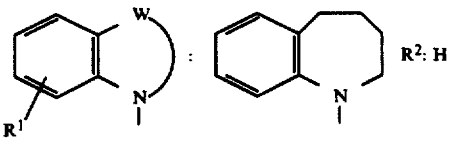

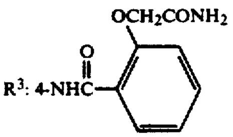

-continued

Crystalline form: White powder
Recrystallization solvent: Methanol/diethyl ether
Melting Point: 198–199° C.
Form: Free
Example 364
Structure

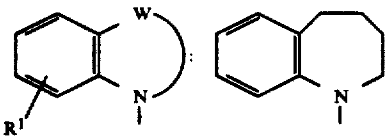

$R^2$: H

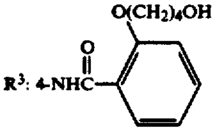

Crystalline form: White powder
Recrystallization solvent: Methanol/diethyl ether
Melting Point: 181.5–182.5° C.
Form: Free
Example 365
Structure

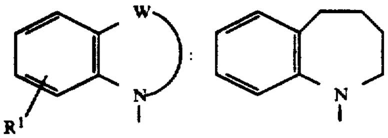

$R^2$: H

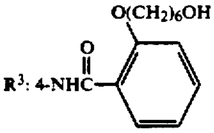

Crystalline form: White powder
Recrystallization solvent: Methanol/diethyl ether
Melting Point: 170–170.5° C.
Form: Free
Example 366
Structure

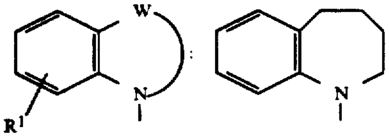

$R^2$: H

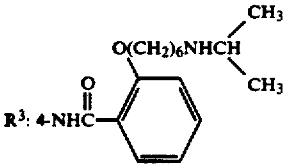

Crystalline form: White powder
Recrystallization solvent: Methanol/diethyl ether
Melting Point: 156–158° C.
Form: Hydrochloride
Example 367
Structure

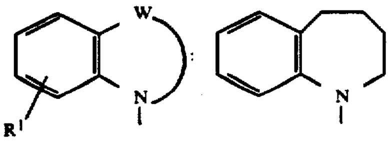

$R^2$: H

-continued

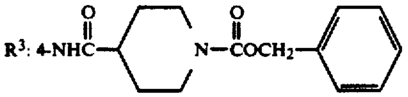

Crystalline form: White powder
Recrystallization solvent: Diethyl ether
Melting Point: 168.5–170.5° C.
Form: Free
Example 368
Structure

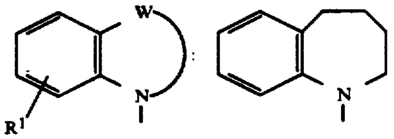

$R^2$: H

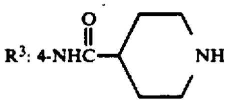

Crystalline form: White powder
Recrygtallization solvent: Methanol/diethyl ether
Melting Point: 177–181.5° C.
Form: Hydrochloride
Example 369
Structure

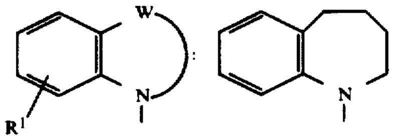

$R^2$: H

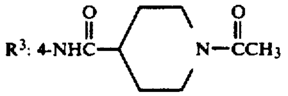

Crystalline form: White powder
Recrystallization solvent: Methanol/diethyl ether
Melting Point: 211–213° C.
Form: Free
Example 370
Structure

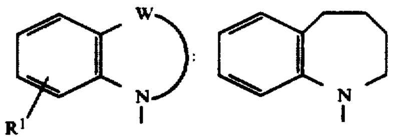

$R^2$: H

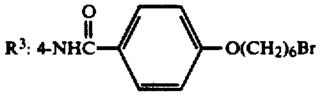

Crystalline form: White powder
NMR analysis: 46)
Form: Free
Example 371
Structure

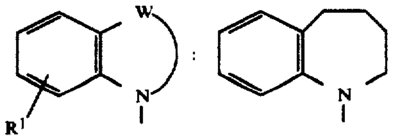

$R^2$: H

-continued

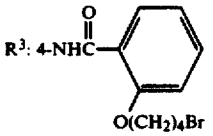

Crystalline form: White powder
Recrystallization solvent: Methanol/ethyl acetate
Melting Point: 166–167° C.
Form: Free
Example 372
Structure

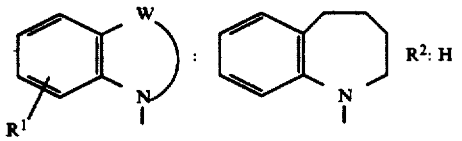

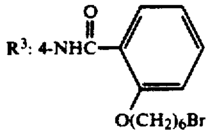

Crystalline form: White powder
Recrystallization solvent: Methanol/diethyl ether
Melting Point: 127–131° C.
Form: Free
Example 373
Structure

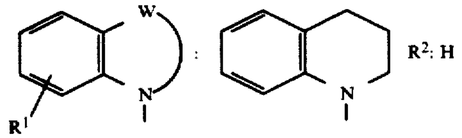

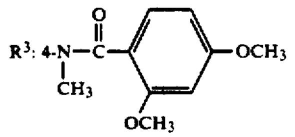

Crystalline form: White powder
Recrystallization solvent: Methanol
Melting Point: 170–171° C.
Form: Free
Example 374
Structure

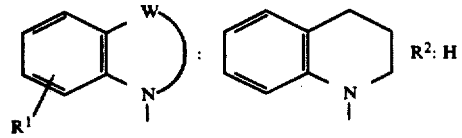

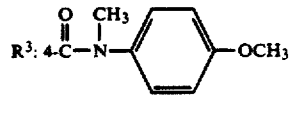

Crystalline form: White powder
Recrystallization solvent: Methanol
Melting Point: 125–126° C.
Form: Free
Example 375
Structure -continued

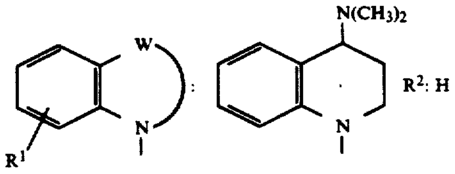

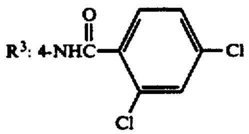

Crystalline form: Light yellow amorphous
NMR analysis: 47)
Form: Hydrochloride
Example 376
Structure

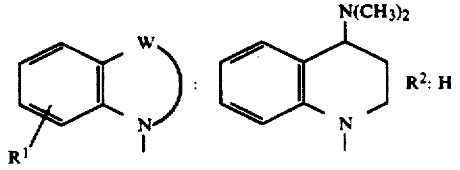

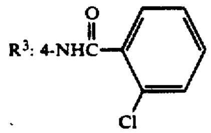

Crystalline form: Colorless amorphous
NMR analysis: 48)
Form: Hydrochloride

---

1) $^{1}$H-NMR ($CDCl_3$) δ : 1.92 (1H, t, J=6.2 Hz), 1.98 (1H, t, J=6.4 Hz), 2.8 (2H, t, J=6.4 Hz), 3.76 (2H, t, J=6.2 Hz), 6.75 (1H, d, J=7.6 Hz), 6.86 (2H, d, J=8.6 Hz), 6.8–7.1 (2H, m), 7.20 (1H, d, J=7 Hz), 7.30 (2H, d, J=8.6 Hz), 7.72 (2H, d, J=8.6 Hz), 7.84 (2H, d, J=8.6 Hz), 10.13 (1H, s)

2) $^{1}$H-NMR ($DMSO-d_6$) δ : 2.05 (2H, quint, J=6.4 Hz), 2.91 (2H, t, J=6.4 Hz), 3.86 (2H, t, J=6.4 Hz), 6.85 (1H, d, J=7.6 Hz), 6.9–7.2 (2H, m), 7.30 (1H, d, J=7.2 Hz), 7.44 (2H, d, J=8.5 Hz), 7.85 (2H, d, J=8.5 Hz), 8.1–8.2 (4H, m), 10.65 (1H, s), 13.2–13.4 (1H, br)

3) $^{1}$H-NMR ($CDCl_3$) δ : 1.9–2.1 (2H, m), 2.84 (2H, t, J=6.5 Hz), 3.82 (6H, s), 3.90 (2H, t, J=6.6 Hz), 6.5–7.2 (7H, m), 7.35 (2H, d, J=8.7 Hz), 7.55 (2H, d, J=8.7 Hz), 8.05 (1H, s)

4) $^{1}$H-NMR ($CDCl_3$) δ : 1.9–2.1 (2H, m), 2.37 (6H, s), 2.84 (2H, t, J=6.6 Hz), 3.90 (2H, t, J=6.6 Hz), 6.71 (1H, d, J=7.9 Hz), 6.8–7.2 (4H, m), 7.35 (2H, d, J=8.6 Hz), 7.44 (2H, s), 7.56 (2H, d, J=8.6 Hz), 8.00 (1H, s)

5) $^{1}$H-NMR ($CDCl_3$) δ : 1.9–2.2 (2H, m), 2.12 (3H, s), 2.84 (2H, t, J=6.6 Hz), 3.89 (2H, t, J=6.5 Hz), 6.71 (1H, d, J=7.8 Hz), 6.87 (1H, t, J=7 Hz), 6.99 (1H, t, J=7.3 Hz), 7.15 (1H, d, J=6.5 Hz), 7.28 (2H, d, J=8.6 Hz), 7.41 (2H, d, J=8.6 Hz), 8.03 (1H, s)

6) $^{1}$H-NMR ($CDCl_3$) δ : 0.8–1.3 (6H, m), 1.6–2.3 (9H, m), 2.83 (2H, t, J=6.6 Hz), 3.B9 (2H, t, J=6.5 Hz), 6.72 (1H, d, J=7.9 Hz), 6.8–7.1 (2H, m), 7.15 (1H, d, J=7.4 Hz), 7.28 (2H, d, J=8.3 Hz), 7.44 (2H, d, J=8.4 Hz), 7.9–8.1 (1H, m)

7) $^{1}$H-NMR ($CDCl_3$) δ : 2.02 (2H, quint, J=6.5 Hz), 2.81 (2H, t, J=6.6 Hz), 3.69 (2H, s), 3.87 (2H, t, J=6.6 Hz), 6.66 (1H, d, J=8.2 Hz), 6.8–7.0 (2H, m), 7.13 (1H, d, J=7.3 Hz), 7.2–7.4 (9H, m), 7.59 (1H, s)

8) $^{1}$H-NMR ($CDCl_3$) δ : 1.7–2.1 (17H, m), 2.83 (2H, t, J=6.7 Hz), 3.90 (2H, t, J=6.6 Hz), 6.68 (1H, d, J=8.1 Hz), 6.8–7.1 (2H, m), 7.14 (1H, d, J=7 Hz),

-continued 7.32 (2H, d, J=8.7 Hz), 7.39 (1H, s), 7.46 (2H, d, J=8.7 Hz)

9) $^1$H-NMR ($CDCl_3$) δ : 1.99 (2H, quint, J=6.5 Hz), 2.82 (2H, t, J=6.6 Hz), 3.82 (2H, t, J=6.5 Hz), 6.8-7.1 (4H, m), 7.1-7.3 (2H, m), 7.4-7.6 (3H, m), 7.67 (1H, s), 7.8-8.0 (3H, m), 8.42 (1H, s)

10) $^1$H-NMR ($CDCl_3$) δ : 2.00 (2H, quint, J=6.5 Hz), 2.83 (2H, t, J=6.6 Hz), 3.85 (2H, t, J=6.6 Hz), 3.86 (3H, s), 6.8-7.1 (6H, m), 7.1-7.3 (2H, m), 7.64 (1H, s), 7.8-8.0 (3H, m), 8.22 (1H, s)

11) $^1$H-NMR ($CDCl_3$) δ : 1.98 (2H, quint, J=6.5 Hz), 2.82 (2H, t, J=6.5 Hz), 3.81 (2H, t, J=6.5 Hz), 3.84 (3H, s), 6.8-7.5 (10H, m), 7.68 (1H, s), 7.95 (1H, d, J=8.2 Hz), 8.52 (1H, s)

12) $^1$H-NMR ($CDCl_3$) δ : 1.7-1.9 (2H, m), 2.70 (2H, t, J=6.6 Hz), 3.70 (2H, t, J=6.4 Hz), 6.8-7.3 (6H, m), 7.4-7.7 (2H, m), 7.8-7.9 (5H, m), 8.04 (1H, d, J=8 Hz), 8.33 (1H, s), 8.90 (1H, s)

13) $^1$H-NMR ($CDCl_3$) δ : 1.7-2.1 (17H, m), 2.84 (2H, t, J=6.5 Hz), 3.89 (2H, t, J=6.4 Hz), 6.8-7.2 (6H, m), 7.42 (1H, s), 7.56 (1H, s), 7.81 (1H, d, J=8.1 Hz)

14) $^1$H-NMR (DMSO-$d_6$) δ : 1.0-1.5 (5H, m), 1.5-2.0 (5H, m), 2.2-3.8 (8H, m), 4.2-5.2 (3H, m), 6.77 (1H, d, J=7.2 Hz), 7.1-7.4 (4H, m), 7.47 (2H, d, J=8.6 Hz), 7.58 (1H, d, J=6.2 Hz), 10.06 (1H, s), 10.9-12.1 (1H, br)

15) $^1$H-NMR (DMSO-$d_6$) δ : 2.5-3.8 (6H, m), 4.2-5.2 (3H, m), 6.81 (1H, d, J=6.8 Hz), 7.1-7.3 (4H, m), 7.5-7.7 (3H, m), 7.8-8.0 (1H, m), 7.97 (2H, d, J=1.8 Hz), 10.66 (1H, s), 11.1-12.3 (1H, br)

16) $^1$H-NMR (DMSO-$d_6$) δ : 2.20 (3H, s), 2.27 (3H, s), 2.5-3.8 (6H, m), 4.3-5.3 (3H, m), 6.82 (1H, d, J=7.2 Hz), 7.1-7.4 (7H, m), 7.5-7.8 (3H, m), 10.43 (1H, s), 11.0-12.2 (1H, br)

17) $^1$H-NMR (DMSO-$d_6$) δ : 2.34 (3H, s), 2.5-3.7 (6H, m), 4.3-5.2 (3H, m), 6.82 (1H, d, J=6.8 Hz), 7.2-7.7 (11H, m), 10.41 (1H, s), 10.8-12.3 (1H, br)

18) $^1$H-NMR (DMSO-$d_6$) δ : 2.38 (3H, s), 2.5-3.8 (6H, m), 4.3-5.3 (3H, m), 6.81 (1H, d, J=7.0 Hz), 7.1-7.5 (6H, m), 7.5-7.8 (5H, m), 10.35 (1H, s), 10.9-12.2 (1H, br)

19) $^1$H-NMR (DMSO-$d_6$) δ : 2.37 (3H, s), 2.5-3.7 (6H, m), 4.3-5.2 (3H, m), 6.81 (1H, d, J=7.2 Hz), 7.2-7.4 (6H, m), 7.5-7.7 (3H, m), 7.84 (2H, d, J=8.0 Hz), 10.31 (1H, s), 10.9-12.2 (1H, br)

20) $^1$H-NMR (DMSO-$d_6$) δ : 2.5-3.8 (6H, m), 4.3-5.2 (3H, m), 6.82 (1H, d, J=7.4 Hz), 7.2-7.3 (4H, m), 7.5-7.8 (5H, m), 7.75 (1H, d, J=1.8 Hz), 10.70 (1H, s), 10.8-12.2 (1H, br)

21) $^1$H-NMR (DMSO-$d_6$) δ : 2.5-3.8 (9H, m), 4.3-4.7 (1H, m), 4.7-5.1 (2H, m), 6.8-7.1 (3H, m), 7.1-7.4 (2H, m), 7.5-7.7 (2H, m), 7.8-8.0 (3H, m), 9.79 (1H, s), 10.8-12.2 (1H, br)

22) $^1$H-NMR (DMSO-$d_6$) δ : 0.8-1.2 (3H, m), 1.7-2.2 (2H, m), 2.5-3.8 (5H, m), 4.3-5.2 (3H, m), 6.80 (1H, d, J=7.2 Hz), 7.1-7.3 (4H, m), 7.6-7.7 (3H, m), 7.85 (1H, s), 7.96 (2H, d, J=1.8 Hz), 10.62 (1H, s), 10.8-12.0 (1H, br)

23) $^1$H-NMR (DMSO-$d_6$) δ : 0.8-1.1 (3H, m), 1.7-2.1 (2H, m), 2.37 (3H, s), 2.7-3.8 (5H, m), 4.4-5.2 (3H, m), 6.81 (1H, d, J=7.6 Hz), 7.2-7.4 (6H, m), 7.6-7.7 (3H, m), 7.84 (2H, d, J=8.2 Hz), 10.29 (1H, s), 10.5-11.8 (1H, br)

24) $^1$H-NMR (DMSO-$d_6$) δ : 0.8-1.2 (3H, m), 1.7-2.1 (2H, m), 2.38 (3H, s), 2.6-3.8 (5H, m), 4.3-5.2 (3H, m), 6.81 (1H, d, J=7.0 Hz), 7.2-7.5 (6H, m), 7.6-7.8 (5H, m), 10.33 (1H, s), 10.5-11.7 (1H, br)

25) $^1$H-NMR (DMSO-$d_6$) δ : 0.8-1.2 (3H, m), 1.7-2.1 (2H, m), 2.6-3.8 (5H, m), 3.8-5.2 (3H, m), 6.82 (1H, d, J=7.2 Hz), 7.1-7.5 (8H, m), 7.5-7.7 (3H, m), 10.42 (1H, s), 10.7-12.0 (1H, br)

26) $^1$H-NMR (DMSO-$d_6$) δ : 0.8-2.0 (15H, m), 2.2-2.5 (1H, m), 2.6-3.7 (5H, m), 4.3-5.2 (3H, m), 6.76 (1H, d, J=7.0 Hz), 7.1-7.4 (4H, m), 7.46 (2H, d, J=8.6 Hz), 7.61 (1H, d, J=6.4 Hz), 10.03 (1H, s), 10.5-11.8 (1H, br)

27) $^1$H-NMR (DMSO-$d_6$) δ : 0.81-1.1 (3H, m), 1.7-2.0 (2H, m), 2.20 (3H, s), 2.29 (3H, s), 2.6-3.7 (5H, m), 4.3-5.2 (3H, m), 6.82 (1H, d, J=7.0 Hz), 7.2-7.4 (7H, m), 7.5-7.7 (3H, m), 10.41 (1H, s), 10.6-12.0 (1H, br)

28) $^1$H-NMR ($CDCl_3$) δ : 1.21 (3H, t, J=7.1 Hz), 3.00-3.25 (3H, m), 4.00-4.30 (4H, m), 6.63 (1H, d, J=7.8 Hz), 6.86 (1H, t, J=7.3 Hz), 7.00 (1H, t, J=6.3 Hz), 7.10-7.31 (3H, m), 7.40-7.57 (3H, m), 7.77 (2H, d, J=1.9 Hz), 8.76 (1H, brs)

29) $^1$H-NMR ($CDCl_3$) δ : 2.29 (3H, s), 2.32 (3H, s), 2.34 (3H, s), 2.50-3.15 (11H, m), 3.79 (1H, dd, J=13.2 Hz, 7.3 Hz), 4.05 (1H, dd, J=13.2 Hz, 5.7 Hz), 6.62 (1H, d, J=7.7 Hz), 6.82-7.48 (8H, m), 7.53 (2H, d, J=8.4 Hz), 8.05 (1H, brs)

30) $^1$H-NMR ($CDCl_3$) δ : 1.65-2.01 (4H, m), 2.31 (3H, s), 2.35 (3H, s), 2.55-3.02 (6H, m), 3.09 (1H, dd, J=15 Hz, 5 Hz), 3.70 (1H, dd, J=12.5 Hz, 8.0 Hz), 4.22 (1H, dd, J=12.5 Hz, 5 Hz), 6.67 (1H, d, J=7.8 Hz), 6.80-7.32 (7H, m), 7.37 (2H, d, J=8.6 Hz), 7.53 (1H, d, J=8.3 Hz), 7.66 (1H, brs)

31) $^1$H-NMR ($CDCl_3$) δ : 2.80 (1H, dd, J=16.1 Hz, 5.3 Hz), 3.16 (1H, dd, J=15.8 Hz, 5.3 Hz), 3.75-4.50 (3H, m), 4.87-5.10 (3H, m), 6.80-7.60 (14H, m), 7.74 (2H, d, J=1.9 Hz), 8.47 (1H, brs)

32) $^1$H-NMR ($CDCl_3$) δ : 2.35 (6H, s), 2.72-3.10 (3H, m), 3.65-3.78 (1H, m), 4.06-4.18 (1H, m), 6.60-7.62 (9H, m), 7.74 (2H, d, J=1.8 Hz), 8.52 (1H, brs)

33) $^1$H-NMR ($CDCl_3$) δ : 1.87 (3H, s), 2.68 (1H, dd, J=5.6 Hz, 16 Hz), 3.14 (1H, dd, J=5.6 Hz, 16 Hz), 3.70-3.95 (2H, m), 4.32-4.50 (1H, m), 6.29 (1H, d, J=7.6 Hz), 6.90-7.80 (11H, m), 9.16 (1H, brs)

34) $^1$H-NMR ($CDCl_3$) δ : 1.62 (1H, brs), 1.90-2.25 (2H, m), 2.55 (3H, s), 3.78 (1H, t, J=5.1 Hz), 3.95 (2H, t, J=6.7 Hz), 6.69 (1H, t, J=7.9 Hz), 6.90-7.13 (2H, m), 7.23-7.40 (3H, m), 7.42-7.56 (3H, m), 7.77 (2H, d, J=1.9 Hz), 8.53 (1H, brs)

35) $^1$H-NMR ($CDCl_3$) δ : 1.80-2.02 (1H, m), 2.20-2.35 (1H, m), 2.31 (6H, s), 3.52 (1H, t, J=5.4 Hz), 3.68-3.83 (1H, m), 3.95-4.15 (1H, m), 6.59 (1H, d, J=7.8 Hz), 6.81-7.10 (2H, m), 7.16-7.50 (6H, m), 7.80 (2H, d, J=1.8 Hz), 9.13 (1H, brs)

36) $^1$H-NMR ($CDCl_3$) δ : 1.35-1.60 (1H, m), 1.65-2.20 (3H, m), 2.65-3.20 (5H, m), 3.81 (2H, d, J=6.5 Hz), 4.90-5.10 (1H, m), 6.60 (1H, d, J=8.0 Hz), 6.90 (1H, t, J=8.0 Hz), 7.00-7.50 (6H, m)

37) $^1$H-NMR ($CDCl_3$) δ : 1.30-2.25 (4H, m), 2.55-3.20 (3H, m), 3.35 (2H, s), 3.80 (2H, s), 4.90-5.10 (1H, m), 6.62 (1H, d, J=8.0 Hz), 6.85-7.45 (12H, m), 9.27 (1H, brs)

38) $^1$H-NMR ($CDCl_3$) δ : 1.35-2.25 (4H, m), 2.33 (3H, s), 2.60-3.20 (3H, m), 3.12 (2H, s), 3.61 (2H, s), 5.00 (1H, brs), 6.50-7.60 (13H, m), 9.14 (1H, brs)

39) $^1$H-NMR ($CDCl_3$) δ : 1.27 (3H, t, J=7.1 Hz), 1.25-2.50 (12H, m), 2.70-3.10 (4H, m), 3.05 (2H, s), 4.15 (2H, q, J=7.0 Hz), 4.90-5.10 (1H, m), 6.63 (1H, d, J=7.5 Hz), 6.91 (1H, t, J=7.5 Hz), 7.00-7.50 (6H, m), 9.14 (1H, brs)

40) $^1$H-NMR ($CDCl_3$) δ : 1.30-1.65 (1H, m), 1.80-2.25 (5H, m), 2.70-3.20 (3H, m), 4.01 (2H, d, J=5.0 Hz), 4.90-5.10 (1H, m), 6.61 (1H, d, J=7.7 Hz), 6.89 (1H, t, J=7.0 Hz), 7.00-7.45 (6H, m), 9.05 (1H, brs)

41) $^1$H-NMR ($CDCl_3$) δ : 1.18 (6H, s), 1.30-2.20 (4H, m), 2.60-3.20 (3H, m), 3.30 (2H, s), 3.73 (2H, s), 4.90-5.10 (1H, m), 6.61 (1H, d, J=7.3 Hz), 6.70-7.45 (12H, m), 9.50 (1H, brs)

42) $^1$H-NMR ($CDCl_3$) δ : 1.19 (3H, t, J=7.0 Hz), 1.30-1.70 (1H, m), 1.75-2.20 (3H, m), 2.65-3.15 (3H, m), 3.46 (2H, q, J=7.0 Hz), 3.88 (2H, s), 4.90-5.10 (1H, m), 6.55-7.45 (13H, m), 8.36 (1H, brs)

43) $^1$H-NMR ($CDCl_3$) δ : 1.08 (3H, t, J=7.2 Hz), 1.05-2.25 (14H, m), 2.25-3.25 (10H, m), 4.90-5.10 (1H, m), 6.64 (1H, d, J=7.6 Hz), 6.90 (1H, t, J=7.2 Hz), 6.94-7.50 (6H, m), 11.50 (1H, brs)

44) $^1$H-NMR ($CDCl_3$) δ : 1.06 (3H, t, J=7.5 Hz), 1.30-2.20 (6H, m), 2.60-3.20 (3H, m), 3.65 (1H, m), 3.95 (1H, brs), 4.90-5.10 (1H, m), 6.50-6.75 (3H, m), 6.75-7.05 (2H, m), 7.05-7.55 (8H, m), 8.67 (1H, brs)

45) $^1$H-NMR (DMSO-$d_6$) δ : 1.28-1.57 (1H, m), 1.69-2.20 (3H, m), 2.59-3.15 (3H, m), 4.74-4.98 (1H, m), 6.62-6.80 (1H, m), 6.86-7.37 (5H, m), 7.50-7.70 (2H, m), 8.95-9.02 (1H, m), 9.03-9.15 (2H, m), 0.85 (1H, s)

46) $^1$H-NMR ($CDCl_3$) δ : 1.40-1.66 (5H, m), 1.72-2.20 (7H, m), 2.63-3.18 (3H, m), 3.42 (2H, t, J=6.7 Hz), 4.00 (2H, t, J=6.3 Hz), 4.91-5.13 (1H, m), 6.58-6.72 (1H, m), 6.82-7.00 (3H, m), 7.02-7.30 (4H, m), 7.36-7.51 (2H, m), 7.70-7.88 (2H, m), 7.91 (1H, s)

-continued

47) $^1$H-NMR (DMSO-$d_6$) δ : 2.05–2.95 (8H, m), 3.43–3.70 (1H, m), 4.08–4.30 (1H, m), 4.72–5.00 (1H, m), 6.70–8.08 (11H, m), 10.8 (1H, s), 11.1 (1H, brs)

48) $^1$H-NMR (DMSO-$d_6$) δ : 2.10–3.00 (8H, m), 3.47–3.70 (1H, m), 4.07–4.33 (1H, m), 4.75–4.98 (1H, m), 6.78–6.91 (1H, m), 7.05–7.22 (2H, m), 7.30–7.97 (9H, m), 10.75 (1H, s), 10.94 (1H, brs)

EXAMPLE 377

To a solution of 1-[4-(4-formylbenzoylamino)benzoyl]-1,2,3,4-tetrahydroquinoline (0.3 g) in methanol (10 ml) is added gradually sodium borohydride (59 mg) under ice-cooling and the mixture is stirred at room temperature for 2 hours. Water is added to the mixture and the solvent is distilled off under reduced pressure. The resulting residue is extracted with dichloromethane, washed with water, and dried over magnesium sulfate. The solvent is distilled off under reduced pressure and the resulting residue is purified by silica gel column chromatography (eluent; dichloromethane:methanol=50:1), and recrystallized from methanol to give 1-[4-(4-hydroxymethylbenzoylamino)benzoyl]-1,2,3,4-tetrahydroquinoline (165 mg) as white powder, m.p. 224.5°-225.5° C.

Using the suitable starting materials, the compound of the above Example 37 is obtained in the same manner as in Example 377.

EXAMPLE 378

To a solution of 1-[4-(4-methoxycarbonylbenzoylamino)benzoyl]-1,2,3,4-tetrahydroquinoline (0.5 g) in methanol (20 ml) is added 5% aqueous sodium hydroxide solution (10 ml) and the mixture is stirred at room temperature overnight. Methanol is distilled off under reduced pressure and the resulting residue is acidified with diluted aqueous hydrochloric acid solution. The precipitated crystal is collected by filtration to give 1-[4-(4-carboxybenzoylamino)benzoyl]-1,2,3,4-tetrahydroquinoline (0.4 g) as white powder, m.p. >300° C.

$^1$H-NMR (DMSO-$d_6$) δ: 2.05 (2H, quint, J=6.4 Hz), 2.91 (2H, t, J=6.4 Hz), 3.86 (2H, t, J=6.4 Hz), 6.85 (1H, d, J=7.6 Hz), 6.9-7.2 (2H, m), 7.30 (1H, d, J=7.2 Hz), 7.44 (2H, d, J=8.5 Hz), 7.85 (2H, d, J=8.5 Hz), 8.1-8.2 (4H, m), 10.65 (1H, s), 13.2-13.4 (1H, br).

Using the suitable starting materials, the compounds of the above Examples 39, 241, 252, 253 and 362 are obtained in the same manner as in Example 378.

EXAMPLE 379

To a solution of 1-[4-(3-acetyloxybenzoylamino)benzoyl]-1,2,3,4-tetrahydroquinoline (1.5 g) in methanol (20 ml) is added 5% aqueous sodium hydroxide solution (10 ml) and the mixture is stirred at room temperature overnight. Methanol is distilled off under reduced pressure and the resulting residue is acidified with diluted aqueous hydrochloric acid solution. The precipitated crystal is collected by filtration and recrystallized from methanol to give 1-[4-(3-hydroxybenzoylamino)benzoyl]-1,2,3,4-tetrahydroquinoline (1.22 g) as white powder, m.p. 217°-218° C.

Using the suitable starting materials, the compounds of the above Examples 10, 343, 356, 364 and 365 are obtained in the same manner as in Example 379.

EXAMPLE 380

To a solution of 1-[4-(3-hydroxybenzoylamino)benzoyl]-1,2,3,4-tetrahydroquinoline (0.4 g) in acetone (5 ml) are added potassium carbonate (0.22 g) and ethyl iodide (0.34 g), and the mixture is refluxed for 5 hours. Then, acetone is distilled off under reduced pressure and water is added to the residue. The precipitated crystal is collected by filtration, and recrystallized from methanol to give 1-[4-(3-ethoxybenzoylamino)benzoyl]-1,2,3,4-tetrahydroquinoline (0.36 g) as white powder, m.p. 170.5°-171.5° C.

Using the suitable starting materials, the compounds of the above Examples 11, 12, 13, 14, 33, 35, 48, 50–55, 90–92, 9–100, 109–111, 120–122, 136–138, 165–167, 175–177, 192–194, 211, 212, 214, 321, 322, 330–333, 335, 336, 339–342, 344–355, 357–366 and 370–374 are obtained in the same manner as in Example 380.

EXAMPLE 381

Ethanol (50 ml) is added to 10% Pd-C (0.1 g) and thereto is added.1-[4-(3-nitrobenzoylamino)benzoyl]-1,2,3,4-tetrahydroquinoline (0.73 g). The mixture is subjected to catalytic reduction at ordinary temperature under atmospheric pressure of hydrogen. After completion of the reduction, 10% Pd-C is removed by filtration and the filtrate is concentrated under reduced pressure. The residue is extracted with dichloromethane and the extract is dried over magnesium sulfate. The solvent is distilled off under reduced pressure and recrystallized from methanol to give 1-[4-(3-aminobenzoylamino)-benooyl]-1,2,3,4-tetrahydroquinoline (0.54 g) as white powder, m.p. 205.5°-206.5° C.

Using the suitable.<starting materials, the compounds of the above Examples 24, 334 and 338 are obtained in the same manner as in Example 381.

EXAMPLE 382

To a solution of 1-(4-aminobenzoyl)-1,2,3,4-tetrahydroquinoline (0.5 g) in dichloromethane (20 ml) is added triethylamine (0.3 g), and thereto is added benzoyl chloride (0.28 g) under ice-cooling. The mixture is stirred at room temperature for 1 hour. To the reaction mixture is added water and extracted with dichloromethane. The extract is dried over magnesium sulfate and the solvent is distilled off under reduced pressure. The resulting residue is purified by silica gel column chromatography (eluent; dichloromethane:methanol=50:1) and recrystallized from methanol to give 1-[4-(benzoylamino)benzoyl]-1,2,3,4-tetrahydroquinoline (245 mg) as white powder, m.p. 202.5°-203.5° C.

Using the suitable starting materials, the compounds of the above Examples 2–119, 131–373, 375 and 376 are obtained in the same manner as in Example 382.

EXAMPLE 383

Thionyl chloride (10 ml) is added to 1-(4-carboxybenzoyl)-1,2,3,4-tetrahydroquinoline (0.5 g) and the mixture is refluxed for 1 hour. Thionyl chloride is distilled off under reduced pressure to give 4-[1-(1,2,3,4-tetrahydroquinolyl)carbonyl]benzoyl chloride. Separately, to a solution of m-anisidine (0.27 g) in dichloromethane (20 ml) is added triethylamine (0.34 g), and thereto is added gradually the above obtained 4-[1-(1,2,3,4-tetrahydroquinolyl)carbonyl]benzoyl chloride under ice-cooling and the mixture is stirred at room temperature for 1 hour. Water is added to the reaction mixture and the mixture is extracted with dichloromethane. The extract is dried over magnesium sulfate. The solvent is distilled off under reduced pressure and the resulting residue is purified by silica gel column chromatography (eluent; dichloromethane:methanol =50:1), and recrystallized from methanol to give 1-[4-(3-methoxyanilinocarbonyl)benzoyl]-1,2,3,4-tetrahydroquinoline (203 mg) as colorless needles, m.p. 154°-155° C.

Using the suitable starting materials, the compounds of the above Examples 120, 122-130 and 374 are obtained in the same manner as in Example 383.

EXAMPLE 384

To 4-oxo-1-[4-(3,5-dichlorobenzoylamino)benzoyl]-1,2,3,4-tetrahydroquinoline (0.7 g) are added tetrahyrdofuran (10 ml) and methanol (10 ml). To the mixture is added sodium borohydride (0.1 g) in portions and the mixture is stirred at room temperature for 1 hour. Water is added to the reaction mixture and the mixture is extracted with dichloromethane. The solvent is concentrated and the resulting residue is purified by silica gel column chromatography (eluent; dichloromethane→dichloromethane:methanol=20:1), and recrystallized from ethanol to give 4-hydroxy-1-[4-(3,5-dichlorobenzoylamino)benzoyl]-1,2,3,4-tetrahydroquinoline (0.4 g) as white powder, m.p. 215°-217° C.

EXAMPLE 385

To 3-ethoxycarbonyl-1-[4-(3,5-dichlorobenzoylamino)benzoyl]-1,2,3,4-tetrahydroquinoline (0.6 g) are added an aqueous solution of sodium hydroxide (0.1 g) in water (1 ml) and ethanol (5 ml). The mixture is stirred at room temperature for 15 minutes, and acidified with diluted hydrochloric acid, extracted with dichloromethane. The solvent is distilled off and the resulting residue is purified by silica gel column chromatography (eluent; dichloromethane→dichloromethane:methanol=50:1), and recrystallized from ethanol to give 3-carboxy-1-[4-(3,5-dichlorobenzoylamino)benzoyl]-1,2,3,4-tetrahydroquinoline (0.4 g) as white powder, m.p. 221°-223° C.

EXAMPLE 386

To 3-carboxy-1-[4-(3,5-dichlorobenzoylamino)-benzoyl]-1,2,3,4-tetrahydroquinoline (3.7 g) are added tetrahydrofuran (50 ml) and thionyl chloride (5 ml). The mixture is reacted at 60° C. for.1 hour. The reaction mixture is concentrated and to the residue is added acetone (20 ml). To the mixture is added dropwise a solution of sodium azide (1.0 g) in water (5 ml) under ice-cooling. The reaction mixture is stirred at the same temperature for 30 minutes and extracted with dichloromethane, dried over magnesium sulfate. The solvent is concentrated and to the resulting residue are added anhydrous toluene (30 ml) and benzyl alcohol (1.7 g). The mixture is refluxed for 1 hour. The reaction mixture is concentrated and the resulting residue is purified by silica gel column chromatography (eluent; dichloromethane→dichloromethane: methanol=50:1) to give 3-benzyloxycarbonylamino-1-[4-(3,5-dichlorobenzoylamino)benzoyl)-1,2,3,4-tetrahydroquinoline (3.7 g) as colorless amorphous.

$^1$H-NMR ($CDCl_3$) δ: 2.80 (1H, dd, J=16.1 Hz, 5.3 Hz), 3.16 (1H, dd, J=15.8 Hz, 5.3 Hz), 3.75-4.50 (3H, m), 4.87-5.10 (3H, m), 6.80-7.60 (14H, m), 7.74 (2H, d, J=1.9 Hz), 8.47 (1H, brs)

EXAMPLE 387

To 3-benzyloxycarbonylamino-1-[4-(3,5-dichlorobenzoylamino)benzoyl]-1,2,3,4-tetrahydroquinoline (3.3 g) are added acetic acid (40 ml) and 10% Pd-C (0.4 g) and the reaction mixture is subjected to catalytic reduction at ordinary temperature under atmospheric pressure of hydrogen. One hour thereafter, the catalyst is removed by filtration and the filtrate is concentrated. The resulting residue is purified by silica eel column chromatography (eluent; dichloromethane:methanol=20:1), and recrystallized from ethanol to give 3-amino-1-[4-(3,5-dichlorobenzoylamino)benzoyl]-1,2,3,4-tetrahydroquinoline (1.6 g) as white powder, m.p. 207°-210° C.

EXAMPLE 388

To 3-amino-1-[4-(3,5-dichlorobenzoylamino)benzoyl]-1,2,3,4-tetrahydroquinoline (0.5 g) are added methanol (10 ml), 37% formaline (0.8 ml) and sodium cyanoborohydride (0.16 g). To the mixture is added acetic acid (0.5 ml) under ice-cooling and the mixture is stirred at room temperature for 1 hour. Water is added to the reaction mixture and the mixture is basified with potassium carbonate and extracted with dichloromethane. The solvent is concentrated and the resulting residue is purified by silica gel column chromatography (eluent; dichloromethane→dichloromethane:methanol=20:1) to give 3-dimethylamino-1-[4-(3,5-dichlorobenzoylamino)benzoyl]-1,2,3,4-tetrahydroquinoline (0.3 g) as colorless amorphous.

$^1$H-NMR ($CDCl_3$)δ: 2.35 (6H, s), 2.72-3.10 (3H, m), 3.65-3.78 (1H, m), 4.06-4.18 (1H, m), 6.60-7.62 (9H, m), 7.74 (2H, d, J=1.8 Hz), 8.52 (1H, brs).

Using the suitable starting materials, the compounds of the above Examples 246, 247, 375 and 376 are obtained in the same manner as in Example 388.

EXAMPLE 389

To 3-amino-1-[4-(3,5-dichlorobenzoylamino)benzoyl]-1,2,3,4-tetrahydroquinoline (0.44 g) are added dichloromethane (5 ml) and acetic anhydride (0.12 g) and the mixture is stirred for 1 hour. The reaction mixture is concentrated and the resulting residue i$ purified by silica gel column chromatography (eluent; dichloromethane →dichloromethane:methanol=50 : 1) to give 3-acetylamino-1-[4-(3,5-dichlorobenzoylamino)benzoyl]-1,2,3,4-tetrahydroquinoline (0.3 g) as colorless amorphous.

$^1$H-NMR ($CDCl_3$)δ: 1.87 (3H, s), 2.68 (1H, dd, J=5.6 Hz, 16 Hz), 3.14 (1H, dd, J=5.6 Hz, 16 Hz), 3.70-3.95 (2H, m), 4.32-4.50 (1H, m), 6.29 (1H, d, J=7.6 Hz), 6.90-7.80 (11H, m), 9.16 (1H, brs).

Using the suitable starting materials, the compound of the above Example 242 is obtained in the same manner as in Example 389.

EXAMPLE 390

To 4-oxo-1-[4-(3,5-dichlorobenzoylamino)benzoyl]-1,2,3,4-tetrahydroquinoline (0.5 g) are added 40% solution of methylamine in methanol (5 ml), molecular sieves 4A (1 g) and dimethylformamide (6 ml), and the mixture is refluxed for 4 hours. After cooling, the reaction mixture is filtered and to the filtrate is added sodium borohydride (80 mg), and the mixture is stirred at room temperature for 1 hour. The reaction mixture is concentrated and water is added to the resulting residue, and extracted with ethyl acetate. The solvent is concentrated and the resulting residue is purified by silica gel column chromatography (eluent; dichloromethane:methanol=20:1) to give 4-methylamino-1-[4-(3,5-dichlorobenzoylamino)benzoyl]-1,2,3,4-tetrahydroquinoline (0.2 g) as colorless amorphous.

$^1$H-NMR ($CDCl_3$)δ: 1.62 (1H, brs), 1.90–2.25 (2H, m), 2.55 (3H, s), 3.78 (1H, t, J=5.1 Hz), 3.95 (2H, t, J=6.7 Hz), 6.99 (1H, d, J=7.9 Hz), 6.9–7.13 (2H, m).

Using the suitable starting materials, the compounds of the above Examples 238, 239, 244, 247, 375 and 376 are obtained in the same manner as in Example 390.

EXAMPLE 391

To 3-carboxy-1-[4-(3,5-dichlorobenzoylamino)-benzoyl]-1,2,3,4-tetrahyrroquinoline (0.7 g) are added dimethylformamide (7 ml), diethyl cyanophosphate (0.3 ml) and dimethylamine hydrochloride (0.15 g). Further thereto is added triethylamine (0.8 ml) and the mixture is stirred at room temperature for 1 hour. Water is added to the reaction mixture and extracted with ethyl acetate. The solvent is concentrated and to the resulting residue is added diethyl ether. The precipitated crystal is collected by filtration to give 3-dimethylamido-1-[4-(3,5-dichlorobenzoylamino)benzoyl]-1,2,3,4-tetrahydroquinoline (0.5 g) as light yellow powder, m.p. 186°–187° C.

EXAMPLE 392

To a solution of 1-(4-aminobenzoyl)-2,3,4,5-tetrahydro-1H-benzazepine (3.0 g) in dichloromethane (50 ml) is added succinic anhydride (1.4 g) and the mixture is stirred at room temperature for 4.5 hours. The reaction mixture is evaporated under reduced pressure in order to remove the solvent therefrom, and the resulting crystal is recrystallized from ethyl acetate to give 1-[4-(3-carboxypropionylamino)benzoyl]-2,3,4,5-tetrahydro-1H-benzazepine (3.61 g) as colorless needles, m.p. 192° C.

Using the suitable starting materials, the compound of the above Example 253 is obtained in the same manner as in Example 392.

EXAMPLE 393

1-[4-(3-Carboxypropionylamino)benzoyl]-2,3,4,5-tetrahydro-1H-benzazepine (0.5 g) is dissolved in dimethylformamide (1 ml) and thereto is added dropwise diethyl cyanophosphate (0.25 g) under ice-cooling. The mixture is stirred at room temperature for 30 minutes and then cooled again with ice. Thereto are added dropwise a solution of diethylamine (0.11 g) in dimethylformamide (1 ml) and triethylamine (0.34 g). The mixture is stirred at room temperature for 16 hours. The solvent is distilled off under reduced pressure and water is added to the resulting residue. The mixture is extracted with dichloromethane. The organic layer is washed successively with diluted hydrochloric acid, water, saturated sodium hydrogen carbonate solution, water and saturated saline solution, and dried over magnesium sulfate. The solvent is distilled off under reduced pressure and the resulting residue is purified by silica gel column chromatography (eluent; ethyl acetate), and recrystallized from n-hexane/ethyl acetate to give 1-[4-(3-diethylaminocarbonylpropionylamino)benzoyl]-2,3,4,5-tetrahydro-1H-benzazepine (0.42 g) as colorless scales, m.p. 165°–167° C.

Using the suitable starting materials, the compounds of the above Examples 255–263 are obtained in the same manner as in Example 393.

EXAMPLE 394

To a solution of 1-[4-(2-chloroacetylamino)benzoyl]-2,3,4,5-tetrahydro-1H-benzazepine (2.06 g) in dimethylformamide (5 ml) are added sodium iodide (0.90 g), potassium carbonate (1.1 g) and cyclohexylamine (0.89 g), and the mixture is stirred at room temperature for 2 hours. Dimethylformamide is distilled off under reduced pressure and water is added to the resulting residue. The mixture is extracted with dichloromethane. The organic layer is washed successively with water and saturated saline solution, and dried over magnesium sulfate. The solvent is distilled off under reduced pressure and the resulting residue is purified by silica gel column chromatography (eluent; ethyl acetate), and recrystallized from n-hexane/ethyl acetate to give 1-[4-(2-cyclohexylaminoacetylamino)benzoyl]-2,3,4,5-tetrahydro-1H-benzazepine (2.03 g) as white powder, m.p. 139°–142° C.

Using the suitable starting materials, the compounds of the above Examples 271–309 and 317 are obtained in the same manner as in Example 394.

EXAMPLE 395 o-Cresol (0.36 g) is dissolved in dimethylsulfoxide (4 ml) containing sodium hydroxide powder (0.18 g) and thereto is added 1-[4-(2-chloroacetylamino)benzoyl]-2,3,4,5-tetrahydro-1H-benzazepine (1.03 g). The mixture is stirred at 90° C. for 7.5 hours. The reaction mixture is poured into ice water (300 ml) and the precipitated crystal is collected by filtration, washed with water, and purified by silica gel column chromatography (eluent; n-hexane:ethyl acetate=2 :1), and recrystallized from ethyl acetate to give 1-{4-[2-(2-methylphenoxy)acetylamino]benzoyl}-2,3,4,5-tetrahydro-1H-benzazepine (546 mg) as colorless scales, m.p. 172.5°–175° C.

Using the suitable starting materials, the compounds of the above Examples 310 and 312–316 are obtained in the same manner as in Example 395.

EXAMPLE 396

A mixture of 1-{4-[2-(6-bromohexyloxy)benzoylamino]benzoyl}- 2,3,4,5-tetrahydro-1H-benzazepine (2.00 g), sodium acetate (0.36 g), sodium iodide (0.55 g) and acetic acid (20 ml) is refluxed for 1 day. The solvent is distilled off and the resulting residue is extracted with ethyl acetate. The organic layer is washed successively with 2N aqueous sodium hydroxide solution and saturated saline solution, and dried over magnesium sulfate. The solvent is concentrated and the resulting residue is purified by silica gel column chromatography (eluent; chloroform:methanol=500:1), and recrystallized from ethanol to give 1-{4-[2-(6-acetyloxyhexyloxy)benzoylamino]benzoyl}-2,3,4,5-tetrahydro-1H-benzazepine (1.07 g) as white powder, m.p. 145°–146° C.

Using the suitable starting materials, the compound of the above Example 360 is obtained in the same manner as in Example 396.

EXAMPLE 397

A mixture of 1-{4-[2-(6-bromohexyloxy)benzoylamino]benzoyl}-2,3,4,5-tetrahydro-1H-benzazepine (0.70 g), diethylamine (0.16 ml), triethylamine (0.21 ml) and acetonitrile (20 ml) is refluxed overnight. The solvent is distilled off and the resulting residue is dissolved in chloroform, washed successively with water and saturated saline solution, and dried over magnesium sulfate. The solvent is distilled off and the resulting residue is purified by silica gel column chromatography (eluent; chloroform:methanol=200:1→50:1) and converted into the hydrochloride thereof in methanol. The product is recrystallized from methanol/diethyl ether to give 1-{4-[2-(6-diethylaminohexyloxy)benzoylamino]benzoyl}-2,3,4,5-tetrahydro-1H-benzazepine hydrochloride (0.42 g) as white powder, m.p. 91°-95° C.

Using the suitable starting materials, the compounds of the above Examples 330, 332, 333, 335, 336, 339, 341, 342, 344-349, 352-355, 357 and 366 are obtained in the same manner as in Example 397.

EXAMPLE 398

A mixture of 1-{4-[2-(6-bromohexyloxy)benzoylamino]benzoyl}-2,3,4,5-tetrahydro-1H-benzazepine (4.00 g), potassium phthalimide (2.02 g) and dimethylformamide (100 ml) is stirred at 100° C. for 5 hours. The reaction mixture is filtered and the filtrate is distilled off. The resulting residue is extracted with ethyl acetate and the organic layer is washed successively with water and saturated saline solution, and dried over magnesium sulfate. The solvent is distilled off and the resulting residue is purified by silica gel column chromatography (eluent; dichloromethane), and recrystallized from methanol/diethyl ether to give 1-{4-[2-(6-phthalimidohexyloxy)benzoylamino]benzoyl}-2,3,4,5-tetrahydro-1H-benzazepine (4.06 g) as white powder, m.p. 145°-146.5° C.

Using the suitable starting materials, the compounds of the above Examples 331, 340, 364 and 365 are obtained in the same manner as in Example 398.

EXAMPLE 399

A mixture of 1-{4-[2-[6-phthalimidohexyloxy)-benzoylamino]benzoyl}-2,3,4,5-tetrahydro-1H-benzazepine (3.75 g), hydrazine hydrate (0.44 ml) and ethanol (30 ml) is refluxed for 3.5 hours. The precipitated crystal is collected by filtration, dried and purified by silica gel column chromatography (eluent; chloroform:methanol:aqueous ammonia=100:10:1), and recrystallized from methanol/diethyl ether to give 1-{4-[2-(6-aminohexyloxy)-benzoylamino]benzoyl}-2,3,4,5 tetrahydro-1H-benzazepine (2.52 g) as white powder, m.p. 135.5°-137.5° C.

Using the suitable starting materials, the compounds of the above Examples 284, 344 and 345 are obtained in the same manner as in Example 399.

EXAMPLE 400

A mixture of 1-{4-[2-(6-aminohexyloxy)benzoylamino]benzoyl}-2,3,4,5-tetrahydro-1H-benzazepine (0.70 g), acetic anhydride (20 ml) and two drops of conc. sulfuric acid is stirred at room temperature for 3 hours. To the reaction mixture is added aqueous 2N aqueous sodium hydroxide solution under ice-cooling and the mixture is extracted with chloroform. The organic layer is washed successively with water and saturated saline solution, and dried over magnesium sulfate. The solvent is distilled off and the resulting residue is purified by silica gel column chromatography (eluent; chloroform:methanol=200:1), and recrystallized from methanol/diethyl ether to give 1-{4-[2-(6-acetylaminohexyloxy)benzoylamino]benzoyl}-2,3,4,5-tetrahydro-1H-benzazepine (0.60 g) as colorless needles, m.p. 171°-172° C.

EXAMPLE 401

A mixture of 1-{4-[2-(6-aminohexyloxy)benzoylamino]benzoyl}-2,3,4,5-tetrahydro-1H-benzazepine (0.70 g), benzoyl chloride (0.20 ml), triethylamine and dichloromethane (20 ml) is stirred at room temperature for 1 hour. The reaction mixture is washed successively with water and saturated saline solution, and dried over magnesium sulfate. The solvent is concentrated and the resulting residue is recrystallized from ethanol to give 1-{4-[2-(6-benzoylaminohexyloxy)benzoylamino]benzoyl}-2,3,4,5-tetrahydro-1H-benzazepine (0.71 g) as white powder, m.p. 178°-178.5° C.

Using the suitable starting materials, the compounds of the above Examples 348 and 357 are obtained in the same manner as in Examples 400 and 401.

EXAMPLE 402

A mixture of 1-[4-(2-ethoxycarbonylmethoxybenzoylamino)benzoyl]2,3,4,5-tetrahydro-1H-benzazepine (1.00 g), aqueous ammonia (100 ml), ammonium chloride (0.3 g) and methanol (150 ml) is heated at 100° C. for 4 hours in a sealed tube. The solvent is distilled off and the resulting residue is extracted with chloroform, washed successively with water and saturated saline solution, and dried over magnesium sulfate. The solvent is concentrated and the resulting residue is purified by silica gel column chromatography (eluent; chloroform:methanol=50:1), and recrystallized from methanol/diethyl ether to give 1-[4-(2-carbamoylmethoxybenzoylamino)benzoyl]-2,3,4,5-tetrahydro-1H-benzazepine (0.43 g) as white powder, m.p. 198°-199° C.

EXAMPLE 403

A mixture of 1-[4-(2-chloro-4-aminobenzoylamino)-benzoyl]-2,3,4,5-tetrahydro-1H-benzazepine (0.55 g), acetic anhydride (15 ml), acetic acid (5 ml) and a drop of sulfuric acid is stirred at room temperature for 1 hour. To the reaction mixture is added aqueous 2N aqueous sodium hydroxide solution and the mixture is extracted with chloroform. The extract is washed with saturated saline solution and dried over magnesium sulfate. The solvent is concentrated and the resulting residue is recrystallized from methanol/diethyl ether to give 1-[4-(2-chloro-4-acetylaminobenzoylamino)benzoyl]-2,3,4,5-tetrahydro-1H-benzazepine (0.28 g) as white powder, m.p. 214°-243° C.

Using the suitable starting materials, the compound of the above Example 44 is obtained in the same manner as in Example 403.

EXAMPLE 404

A mixture of 1-[4-(1-benzyloxycarbonyl-4-piperidinylcarbonylamino)benzoyl]-2,3,4,5-tetrahydro-1H-benzazepine (8.00 g), 10% Pd-C (0.8 g) and ethanol (250 ml) is subjected to catalytic hydrogenation at 50° C. under 4 atm. of hydrogen pressure for 6 hours. The catalyst is removed by filtration and the filtrate is evaporated under reduced pressure. The resulting residue is extracted with ethyl acetate and washed successively with water and saturated saline solution, and dried over magnesium sulfate. The solvent is distilled off and the resulting residue is purified by silica gel column chromatography (eluent; chloroform:methanol:ammonium hydroxide=50:10:1) to give 1-{4-[4-(4-piperidinyl)benzoylamino]benzoyl}-2,3,4,5-tetrahydro-1H-benzazepine (4.80 g), and a part (0.5 g) thereof is converted into the hydrochloride thereof in methanol. The hydrochloride is recrystallized from methanol/diethyl ether to give 1-{4-[4-(4-piperidinyl)benzoylamino]benzoyl}-2,3,4,5-tetrahydro-1H-benzazepine hydrochloride (0.42 g) as white powder, m.p. 177°-181.5° C.

EXAMPLE 405

Using the suitable starting materials, the following compound is obtained in the same manner as in the above Examples 1, 382 and 388.

1-[4-(4-Dimethylaminobenzoylamino)benzoyl]-1,2,3,4-tetrahydroquinoline, colorless amorphous $^1$H-NMR (DMSO-$d_6$)δ: 1.90-2.00 (2H, m), 2.82 (2H, t, J=6.5 Hz), 2.98 (6H, s), 3.77 (2H, t, J=6.5 Hz), 6.70-7.30 (6H, m), 7.32 (2H, d, J=8.6 Hz), 7.73 (2H, d, J=8.6 Hz), 8.00-8.20 (1H, m), 8.39 (1H, d, J=2.2 Hz), 10.37 (1H, s).

Using the suitable starting materials, the following compounds are obtained in the same manner as in Example 1.

TABLE 2

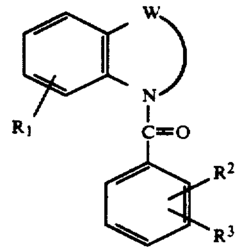

Example 406
Structure

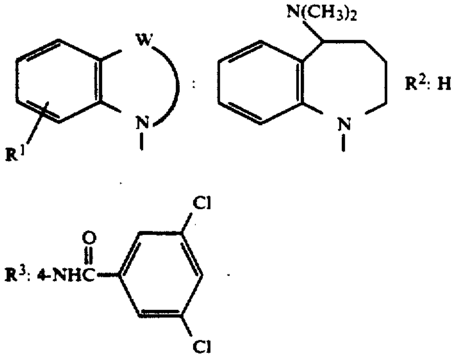

Crystalline form: White powder
Recrystallization solvent: Ethanol
Melting Point: 216-218° C.
Form: Free
Example 407
Structure

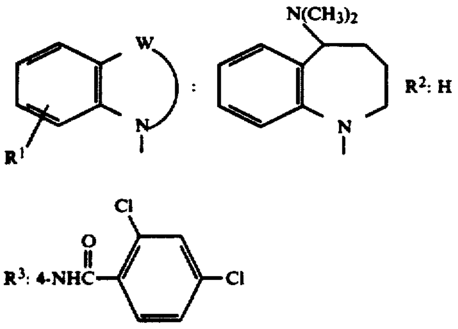

Crystalline form: White powder

TABLE 2-continued

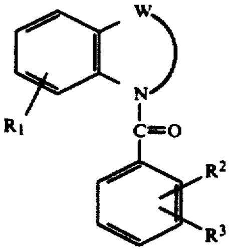

Recrystallization solvent: Ethanol
Melting Point: 181-183° C.
Form: Free
Example 408
Structure

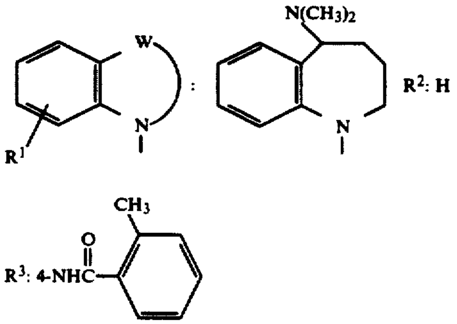

Crystalline form: White powder
Recrystallization solvent: Ethanol
Melting Point: 207-208° C.
Form: Free
Example 409
Structure

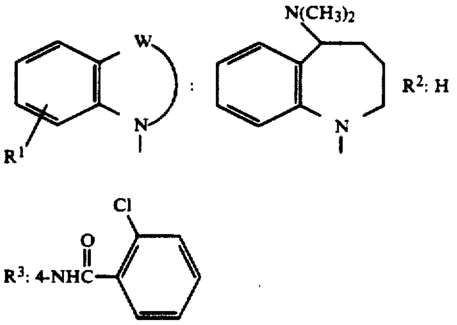

Crystalline form: White powder
Recrystallization solvent: Ethanol
Melting Point: 213-214° C.
Form: Free
Example 410
Structure

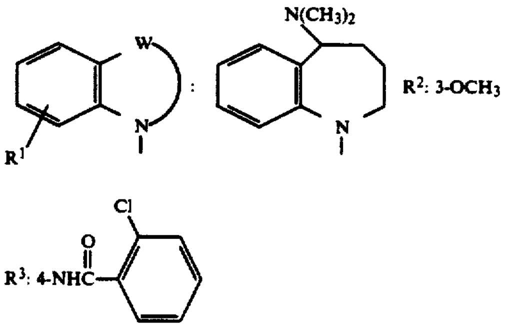

TABLE 2-continued

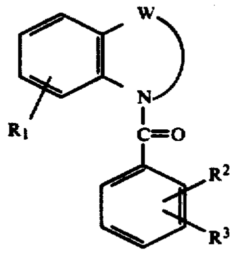

Crystalline form: White powder
Recrystallization solvent: Ethanol
Melting Point: 136–138° C.
Form: Free
Example 411
Structure

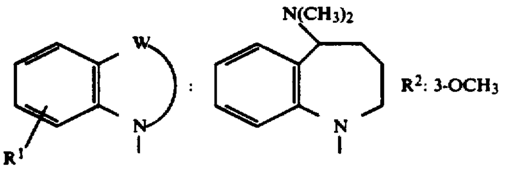

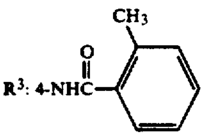

Crystalline form: White powder
Recrystallization solvent: Ethanol
Melting Point: 130–132° C.
Form: Free
Example 412
Structure

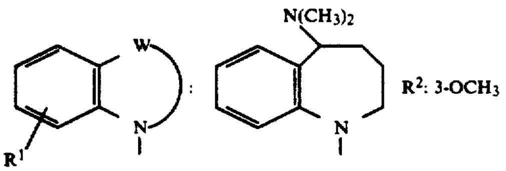

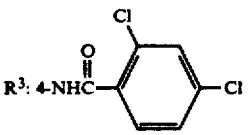

Crystalline form: White powder
Recrystallization solvent: Ethanol
Melting Point: 143–145° C.
Form: Free
Example 413
Structure

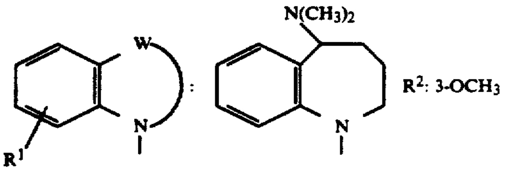

TABLE 2-continued

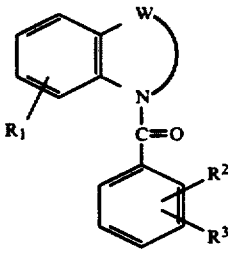

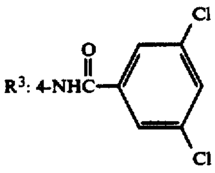

Crystalline form: White powder
Recrystallization solvent: Ethanol
Melting Point: 171–173° C.
Form: Free
Example 414
Structure

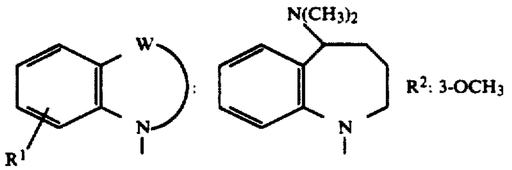

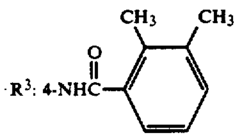

Crystalline form: White powder
Recrystallization solvent: Ethanol
Melting Point: 162–164° C.
Form: Free
Example 415
Structure

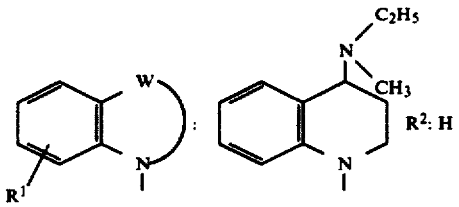

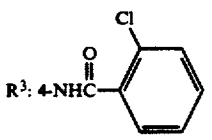

Crystalline form: Colorless amorphous
NMR analysis: 49)
Form: Free
Example 416
Structure TABLE 2-continued

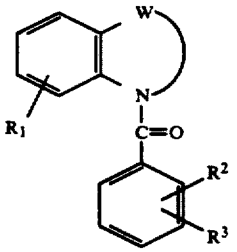

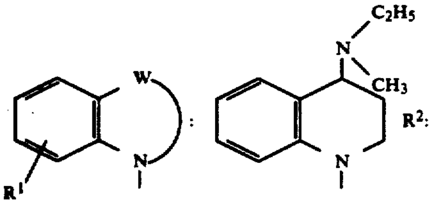

R²: H

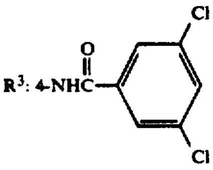

Crystalline form: Colorless amorphous
NMR analysis: 50)
Form: Free

Example 417

Structure

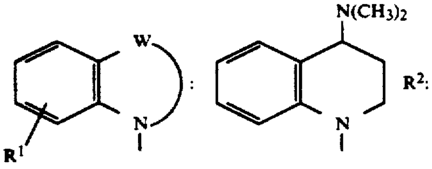

R²: 3-OCH₃

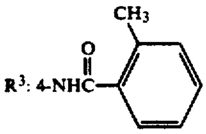

Crystalline form: Colorless amorphous
NMR analysis: 51)
Form: Free

Example 418

Structure

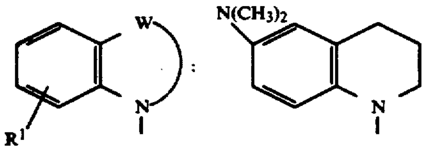

R²: H

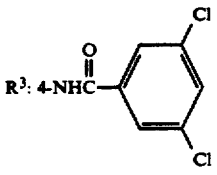

Crystalline form: Colorless needles
Recrystallization solvent: Ethyl acetate/n-hexane
Melting Point: 228.5-230° C.
Form: Free TABLE 2-continued

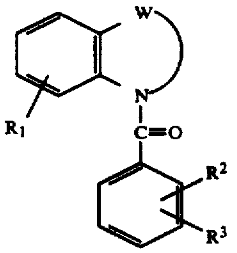

Example 419

Structure

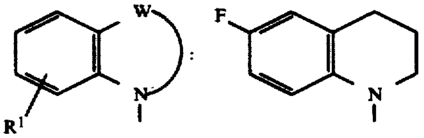

R²: H

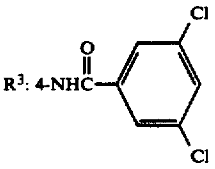

Crystalline form: White powder
Recrystallization solvent: Ethyl acetate/n-hexane
Melting Point: 205.5-206.5° C.
Form: Free Example 420

Structure

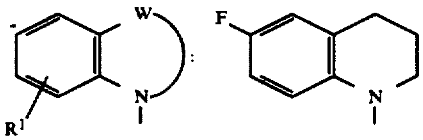

R²: H

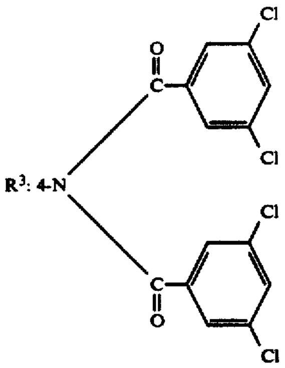

Crystalline form: White powder
Recrystallization solvent: Ethyl acetate/n-hexane
Melting Point: 210-212° C.
Form: Free Example 421

Structure

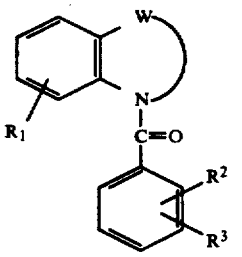

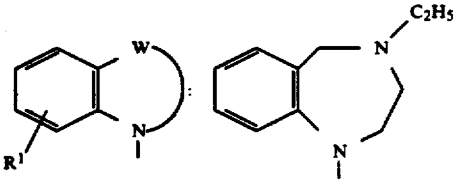

R²: H

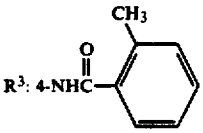

Crystalline form: White powder
Recrystallization solvent: Ethanol
Melting Point: 166–167° C.
Form: Free
Example 422
Structure

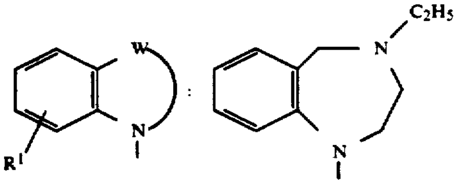

R²: H

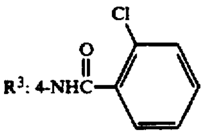

Crystalline form: White powder
Recrystallization solvent: Ethanol
Melting Point: 191.5–192.5° C.
Form: Free
Example 423
Structure

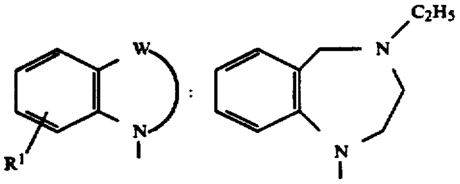

R²: H

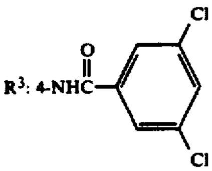

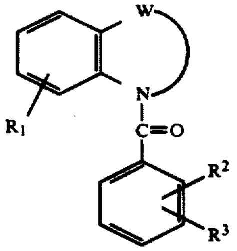

Crystalline form: White powder
Recrystallization solvent: Ethanol
Melting Point: 209–210° C.
Form: Free
Example 424
Structure

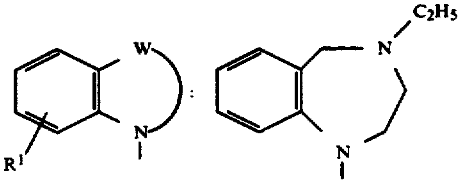

R²: H

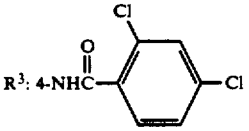

Crystalline form: Colorless amorphous
NMR analysis: 52)
Form: Free
Example 425
Structure

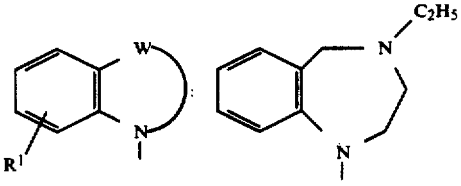

R²: H

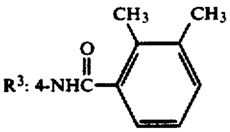

Crystalline form: White powder
Recrystallization solvent: Ethanol
Melting Point: 148–149° C.
Form: Free
Example 426
Structure

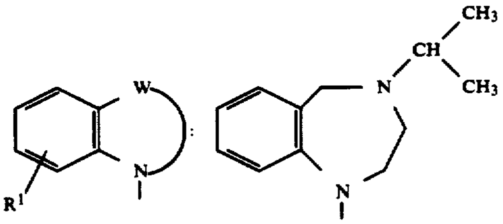

R²: H

TABLE 2-continued

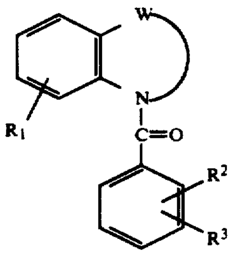

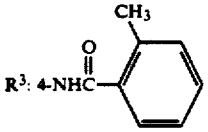

Crystalline form: White powder
Recrystallization solvent: Ethanol
Melting Point: 157-158° C.
Form: Free
Example 427
Structure

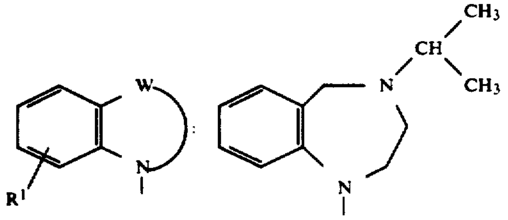

$R^2$: H

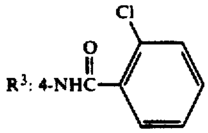

Crystalline form: White powder
Recrystallization solvent: Ethanol
Melting Point: 194.5-195.5° C.
Form: Free
Example 428
Structure

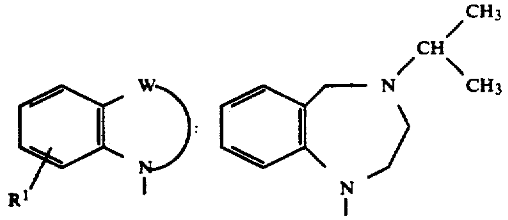

$R^2$: H

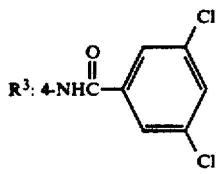

Crystalline form: White powder
Recrystallization solvent: Ethanol
Melting Point: 179.5-180.5° C.
Form: Free
Example 429
Structure TABLE 2-continued

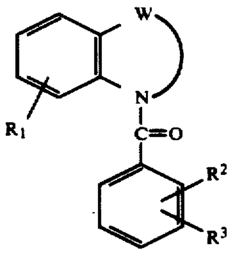

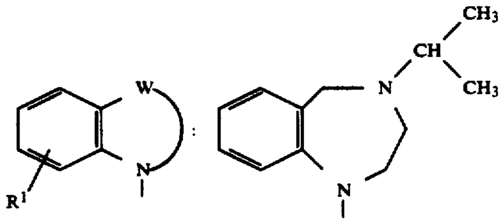

$R^2$: H

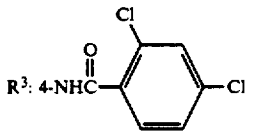

Crystalline form: White powder
Recrystallization solvent: Ethanol
Melting Point: 190-191° C.
Form: Free
Example 430
Structure

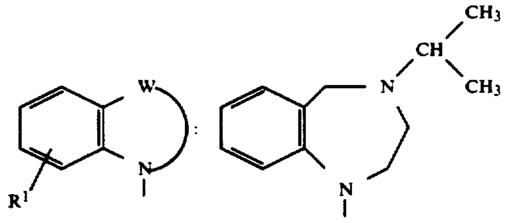

$R^2$: H

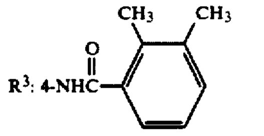

Crystalline form: White powder
Recrystallization solvent: Ethanol
Melting Point: 159-160° C.
Form: Free
Example 431
Structure

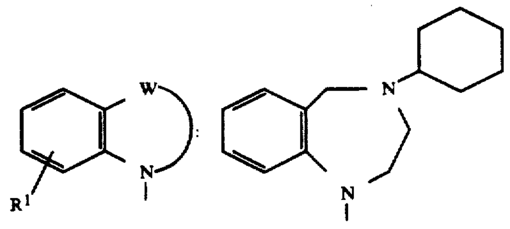

$R^2$: H

TABLE 2-continued

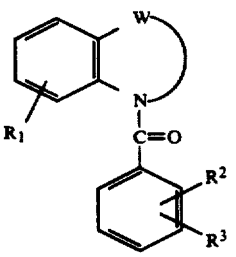

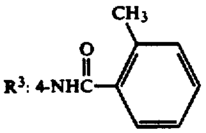

Crystalline form: Colorless amorphous
NMR analysis: 53)
Form: Hydrochloride
Example 432
Structure

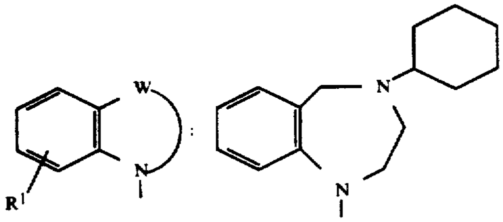

$R^2$: H

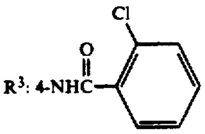

Crystalline form: White powder
Recrystallization solvent: Ethanol
Melting Point: 155-156° C.
Form: Free
Example 433
Structure

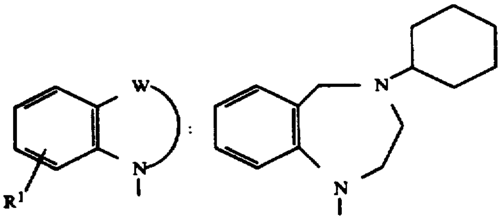

$R^2$: H

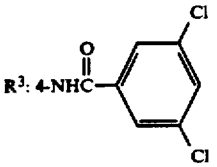

Crystalline form: Colorless amorphous
NMR analysis: 54)
Form: Free
Example 434
Structure TABLE 2-continued

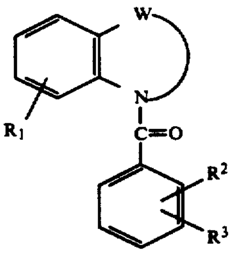

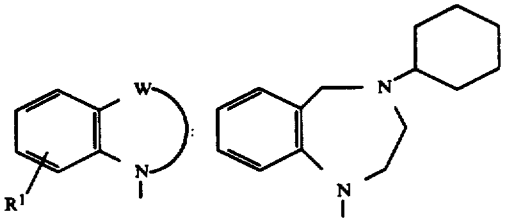

$R^2$: H

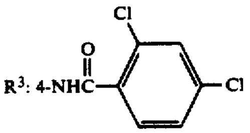

Crystalline form: Colorless amorphous
NMR analysis: 55)
Form: Free
Example 435
Structure

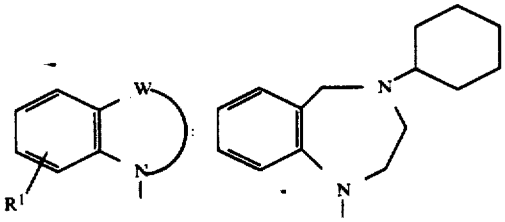

$R^2$: H

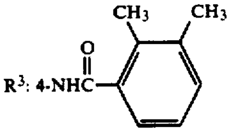

Crystalline form: White powder
Recrystallization solvent: Ethanol
Melting Point: 175-177° C.
Form: Free
Example 436
Structure

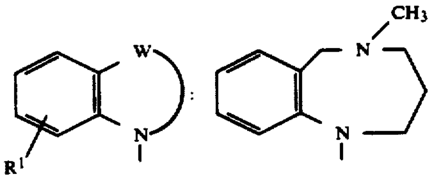

$R^2$: H

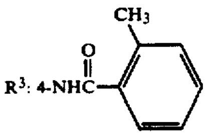

TABLE 2-continued

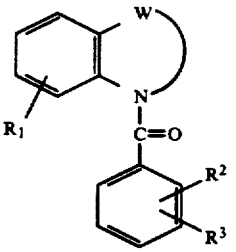

Crystalline form: Colorless amorphous
NMR analysis: 56)
Form: Free
Example 437
Structure

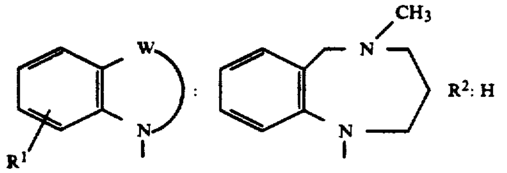

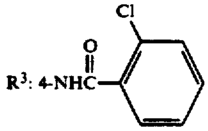

Crystalline form: Colorless amorphous
NMR analysis: 57)
Form: Free
Example 438
Structure

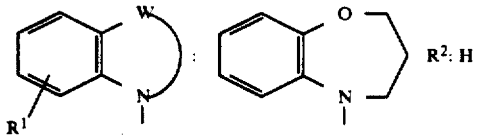

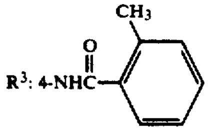

Crystalline form: White powder
Recrystallization solvent: Dichloromethane/diethyl ether
Melting Point: 219-220° C.
Form: Free
Example 439
Structure

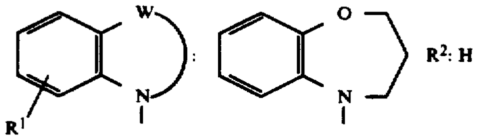

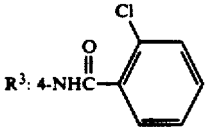

Crystalline form: White powder
Recrystallization solvent: Dichloromethane/diethyl ether
Melting Point: 215-218° C.

TABLE 2-continued

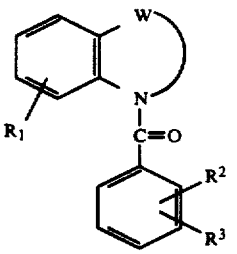

Form: Free
Example 440
Structure

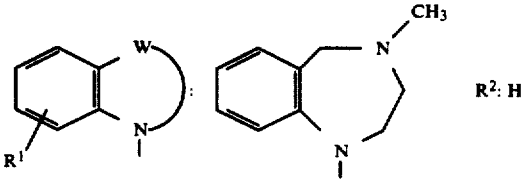

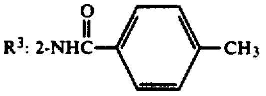

Crystalline form: White powder
Recrystallization solvent: Ethanol
Melting Point: 128.5-129.5° C.
Form: Free
Example 441
Structure

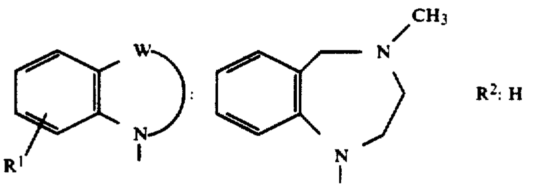

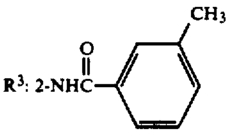

Crystalline form: Colorless amorphous
NMR analysis: 58)
Form: Free
Example 442
Structure

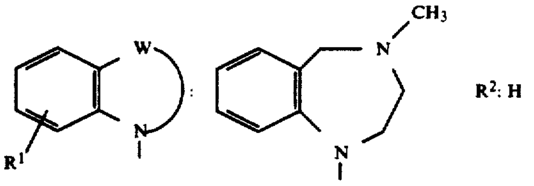

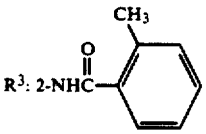

TABLE 2-continued

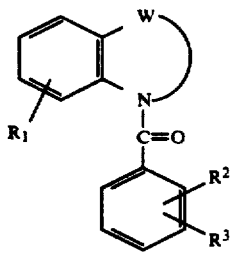

Crystalline form: White powder
Recrystallization solvent: Ethanol
Melting Point: 153–154° C.
Form: Free
Example 443
Structure

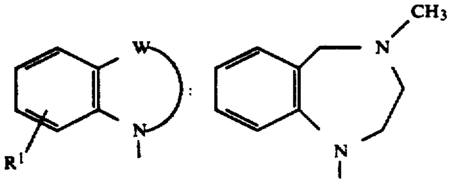

R²: H

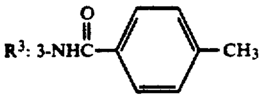

Crystalline form: White powder
Recrystallization solvent: Ethanol
Melting Point: 150–153° C.
Form: Free
Example 444
Structure

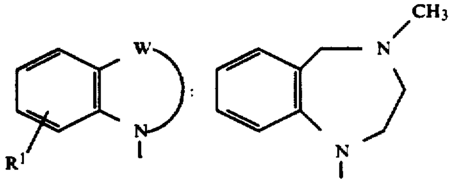

R²: H

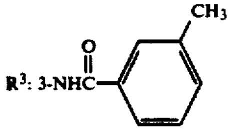

Crystalline form: White powder
Recrystallization solvent: Ethanol
Melting Point: 139–141° C.
Form: Free
Example 445
Structure

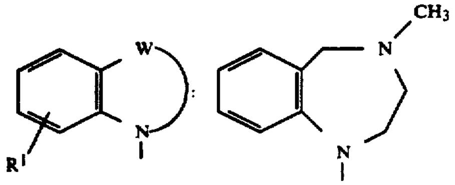

R²: H

TABLE 2-continued

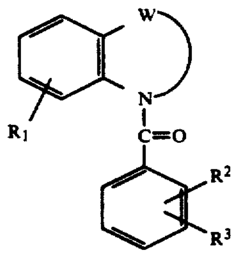

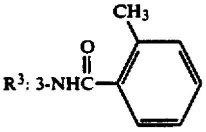

Crystalline form: Colorless amorphous
NMR analysis: 59)
Form: Free
Example 446
Structure

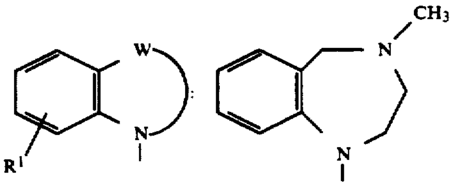

R²: H

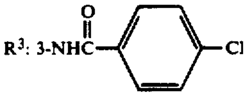

Crystalline form: Colorless amorphous
NMR analysis: 60)
Form: Free
Example 447
Structure

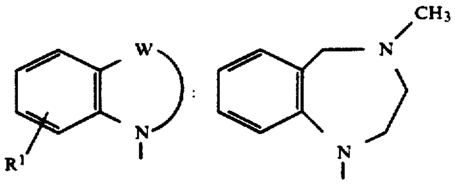

R²: H

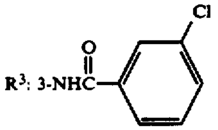

Crystalline form: Colorless amorphous
NMR analysis: 61)
Form: Free
Example 448
Structure

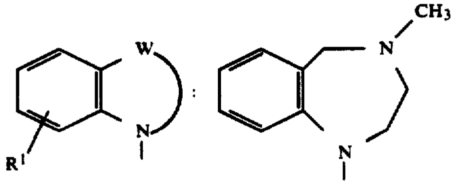

R²: H

TABLE 2-continued

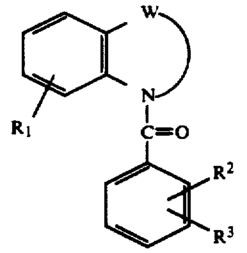

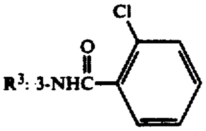

Crystalline form: Colorless amorphous
NMR analysis: 62)
Form: Free
Example 449
Structure

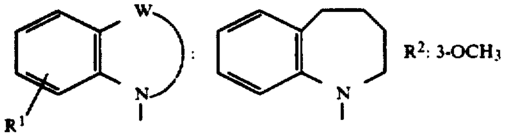

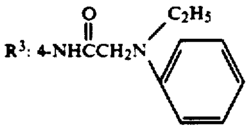

Crystalline form: Colorless amorphous
NMR analysis: 63)
Form: Free
Example 450
Structure

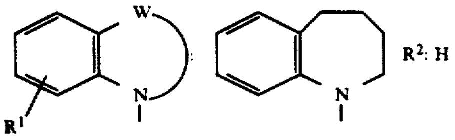

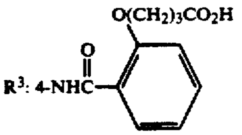

Crystalline form: White powder
Recrystallization solvent: Methanol/diethyl ether
Melting Point: 172.5-173.5° C.
Form: Free
Example 451
Structure

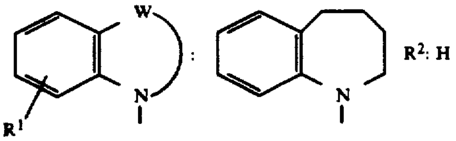

TABLE 2-continued

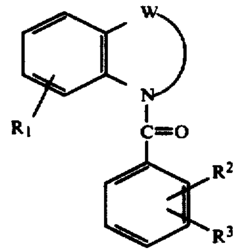

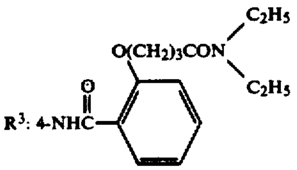

Crystalline form: Colorless prisms
Recrystallization solvent: Methanol/diethyl ether
Melting Point: 122.5-123° C.
Form: Free
Example 452
Structure

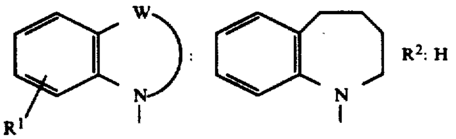

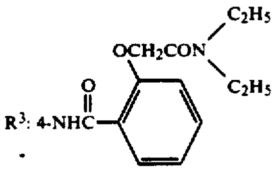

Crystalline form: White powder
Recrystallization solvent: Methanol/diethyl ether
Melting Point: 198-199.5° C.
Form: Free
Example 453
Structure

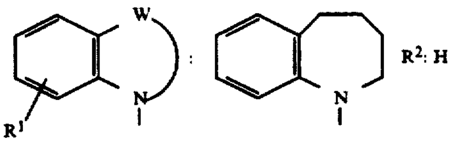

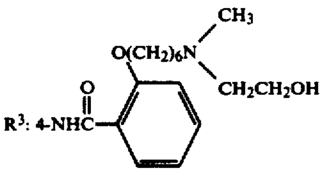

Crystalline form: White powder
Recrystallization solvent: Methanol/diethyl ether
Melting Point: 118-119.5° C.
Form: Hydrochloride
Example 454
Structure TABLE 2-continued

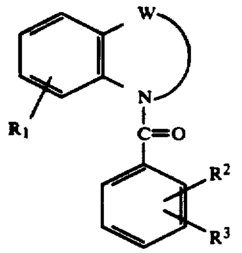

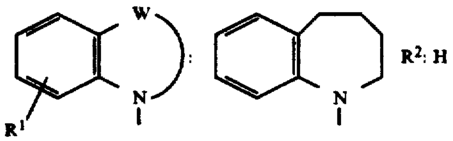

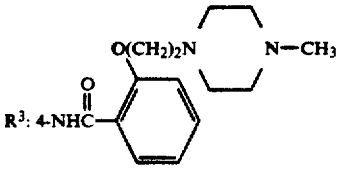

Crystalline form: White powder
Recrystallization solvent: Ethanol
Melting Point: 163-165° C.
Form: Dihydrochloride
Example 455
Structure

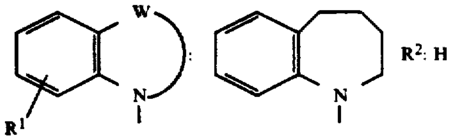

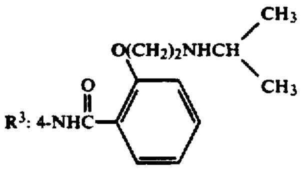

Crystalline form: White powder
Recrystallization solvent: Methanol/diethyl ether
Melting Point: 246-248° C.
Form: Hydrochloride
Example 456
Structure

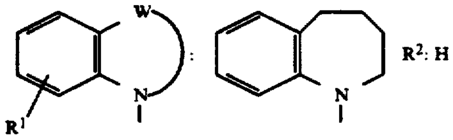

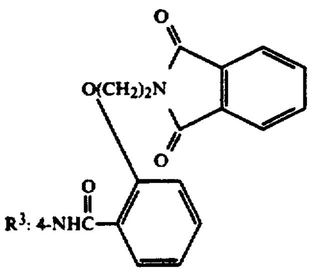

TABLE 2-continued

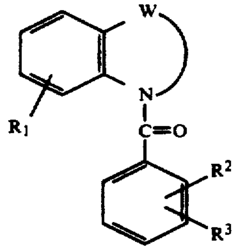

Crystalline form: White powder
Recrystallization solvent: Chloroform/ethanol
Melting Point: 204-205° C.
Form: Free
Example 457
Structure

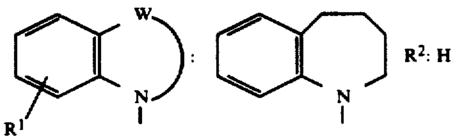

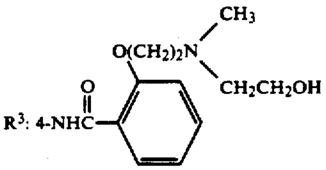

Crystalline form: Colorless prisms
Recrystallization solvent: Methanol/diethyl ether
Melting Point: 127-128° C.
Form: Hydrochloride
Example 458
Structure

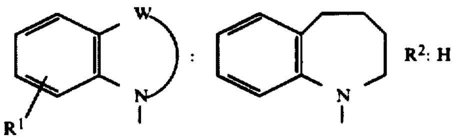

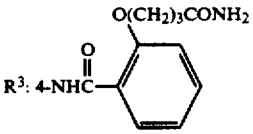

Crystalline form: White powder
Recrystallization solvent: Methanol/diethyl ether
Melting Point: 220-221° C.
Form: Free
Example 459
Structure

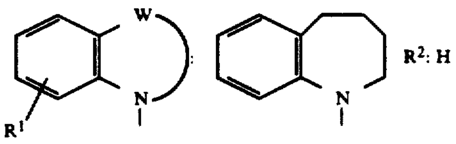

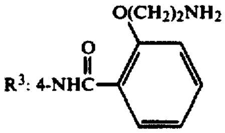

TABLE 2-continued

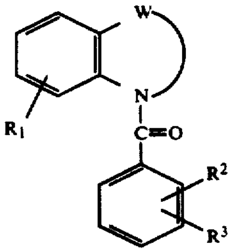

Crystalline form: Colorless needles
Recrystallization solvent: Ethanol
Melting Point: 190–192° C.
Form: Free
Example 460
Structure

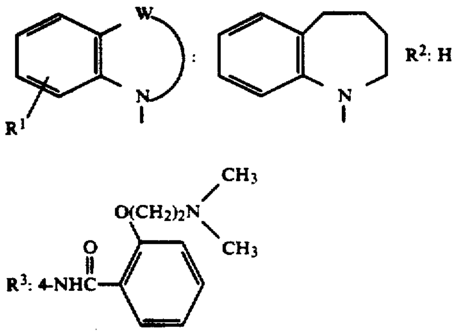

Crystalline form: White powder
Recrystallization solvent: Methanol/diethyl ether
Melting Point: 189–191° C.
Form: Hydrochloride
Example 461
Structure

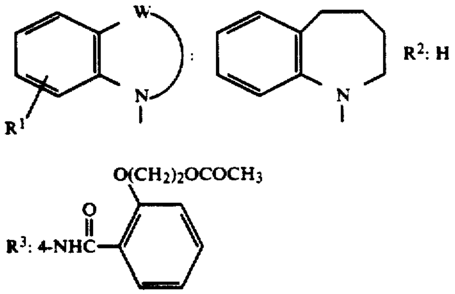

Crystalline form: Colorless needles
Recrystallization solvent: Ethanol
Melting Point: 173–174° C.
Form: Free
Example 462
Structure

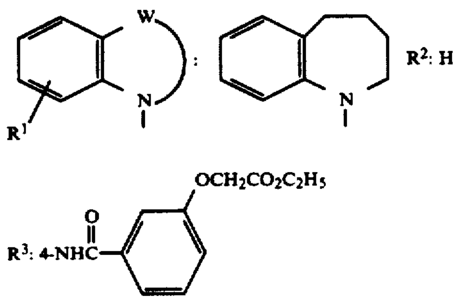

Crystalline form: White powder

TABLE 2-continued

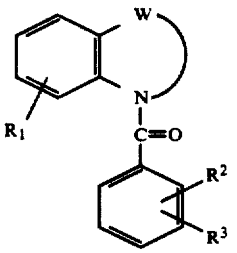

Recrystallization solvent: Dichloromethane/ethanol
Melting Point: 129–130° C.
Form: Free
Example 463
Structure

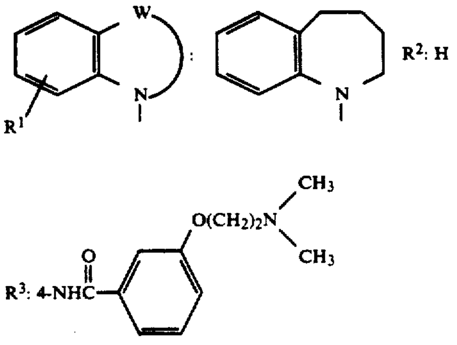

Crystalline form: White powder
Recrystallization solvent: Methanol/diethyl ether
Melting Point: 130–133° C.
Form: Hydrochloride
Example 464
Structure

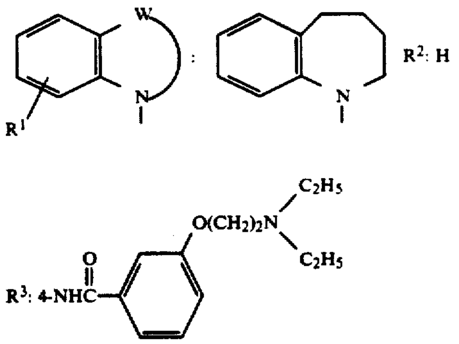

Crystalline form: Light yellow powder
Recrystallization solvent: Methanol/diethyl ether
Melting Point: 170.5–172° C.
Form: Hydrochloride
Example 465
Structure

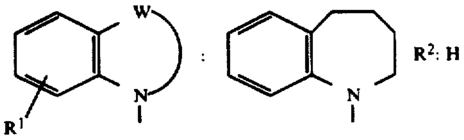

TABLE 2-continued

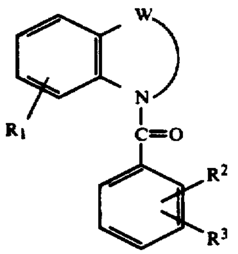

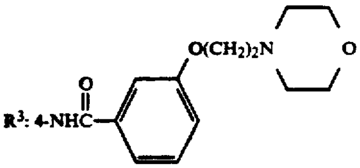

Crystalline form: White powder
Recrystallization solvent: Methanol/diethyl ether
Melting Point: 126-131° C.
Form: Hydrochloride
Example 466
Structure

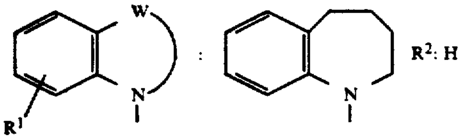

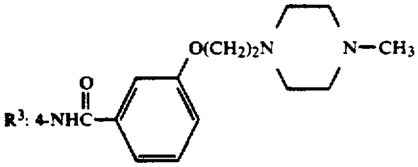

Crystalline form: White powder
Recrystallization solvent: Ethanol
Melting Point: 182-185° C.
Form: Dihydrochloride
Example 467
Structure

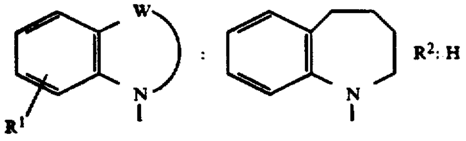

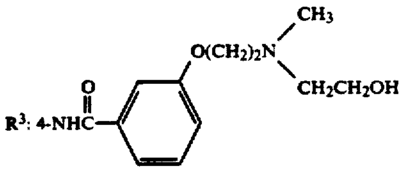

Crystalline form: White powder
Recrystallization solvent: Methanol/diethyl ether
Melting Point: 116-121° C.
Form: Hydrochloride
Example 468
Structure TABLE 2-continued

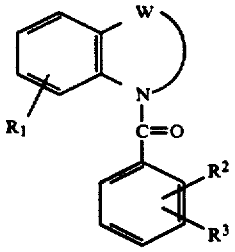

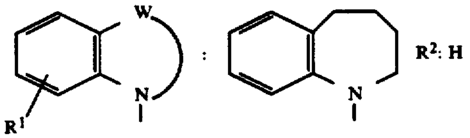

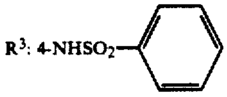

Crystalline form: Colorless prisms
Recrystallization solvent: Methanol/diethyl ether
Melting Point: 178-182.5° C.
Form: Free
Example 469
Structure

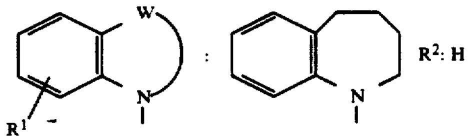

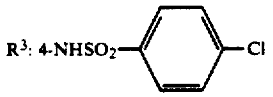

Crystalline form: Colorless particles
Recrystallization solvent: Methanol/diethyl ether
Melting Point: 185-187° C.
Form: Free
Example 470
Structure

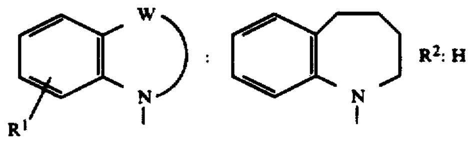

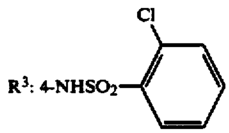

Crystalline form: White powder
Recrystallization solvent: Methanol/diethyl ether
Melting Point: 215-217° C.
Form: Free
Example 471
Structure TABLE 2-continued

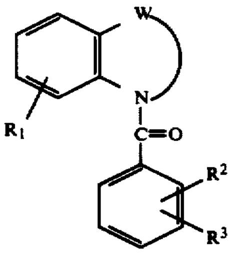

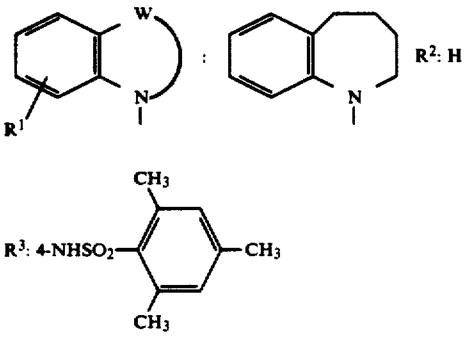

Crystalline form: White powder
Recrystallization solvent: Methanol/diethyl ether
Melting Point: 176–178° C.
Form: Free
Example 472
Structure

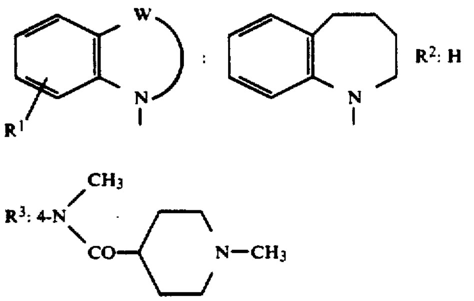

Crystalline form: Light yellow powder
Recrystallization solvent: Methanol/n-hexane
Melting Point: 194.5–197° C.
Form: Free
Example 473
Structure

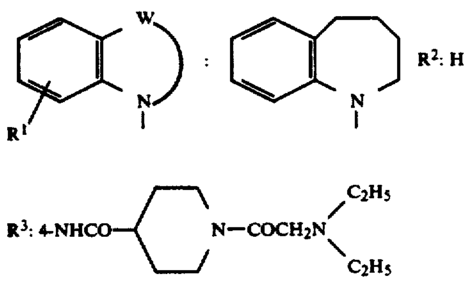

Crystalline form: White powder
Recrystallization solvent: Methanol/diethyl ether
Melting Point: 161.5–165.5° C.
Form: Hydrochloride
Example 474
Structure TABLE 2-continued

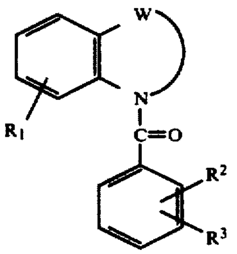

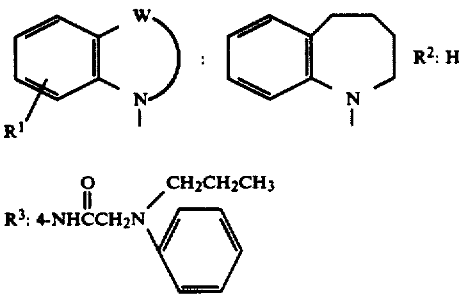

Crystalline form: White powder
Recrystallization solvent: Ethyl acetate
Melting Point: 152–153° C.
Form: Free
Example 475
Structure

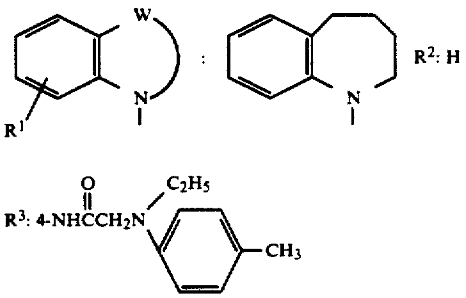

Crystalline form: Colorless needles
Recrystallization solvent: n-Hexane/ethyl acetate
Melting Point: 147–148° C.
Form: Free
Example 476
Structure

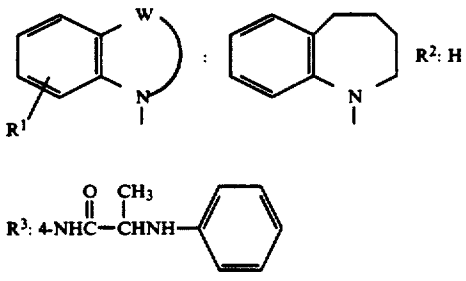

Crystalline form: Light yellow powder
Recrystallization solvent: Ethyl acetate
Melting Point: 215–217° C.
Form: Free
Example 477
Structure TABLE 2-continued

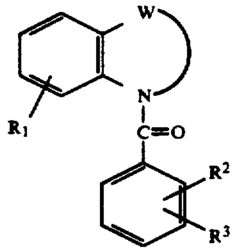

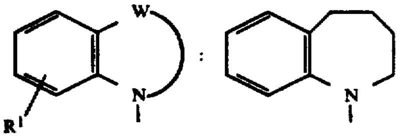

R²: H

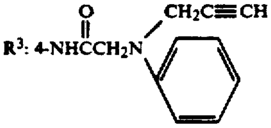

Crystalline form: Colorless amorphous
NMR analysis: 64)
Form: Free
Example 478
Structure

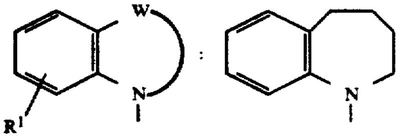

R²: H

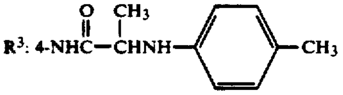

Crystalline form: White powder
Recrystallization solvent: Ethyl acetate
Melting Point: 180–181° C.
Form: Free
Example 479
Structure

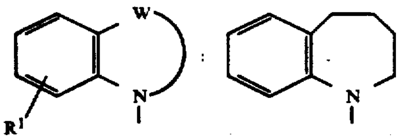

R²: H

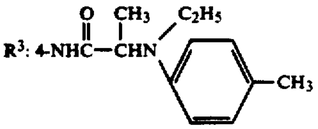

Crystalline form: Colorless amorphous
NMR analysis: 65)
Form: Free
Example 480
Structure TABLE 2-continued

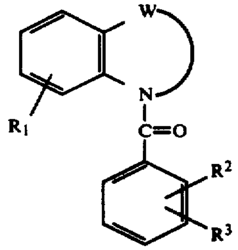

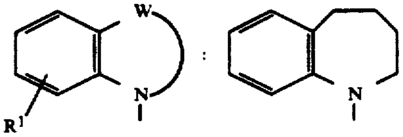

R²: H

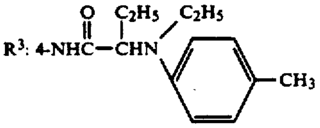

Crystalline form: Colorless amorphous
NMR analysis: 66)
Form: Free
Example 481
Structure

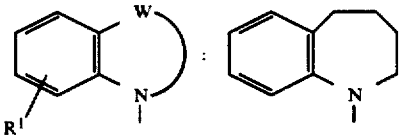

R²: H

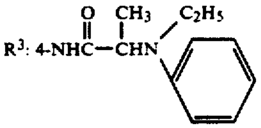

Crystalline form: Colorless amorphous
NMR analysis: 67)
Form: Free
Example 482
Structure

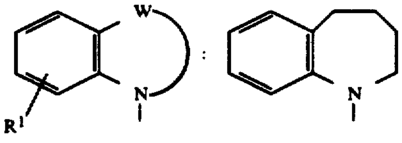

R²: H

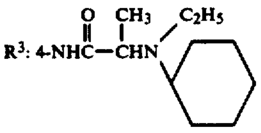

Crystalline form: Colorless scales
Recrystallization solvent: n-Hexane/ethyl acetate
Melting Point: 165–167° C.
Form: Free
Example 483
Structure TABLE 2-continued

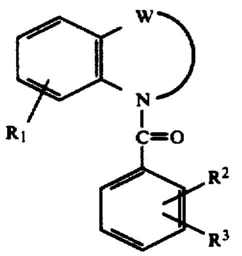

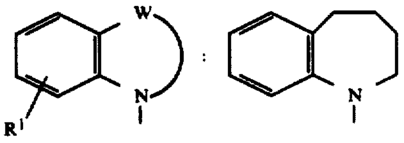
R²: H

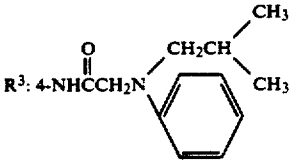

Crystalline form: Colorless amorphous
NMR analysis: 68)
Form: Free
Example 484
Structure

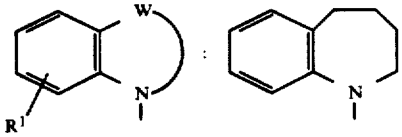
R²: H

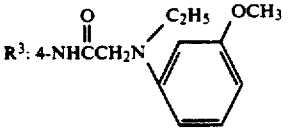

Crystalline form: Colorless amorphous
NMR analysis: 69)
Form: Free
Example 485
Structure

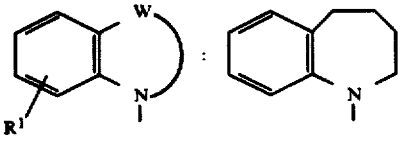
R²: H

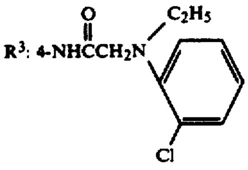

Crystalline form: Colorless amorphous
NMR analysis: 70)
Form: Free
Example 486
Structure TABLE 2-continued

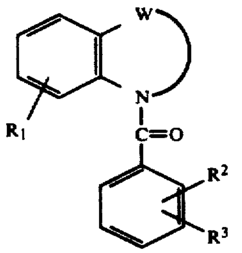

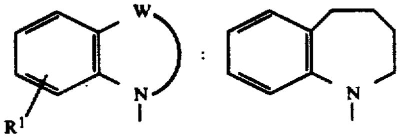
R²: H

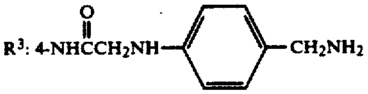

Crystalline form: Colorless amorphous
NMR analysis: 71)
Form: Free
Example 487
Structure

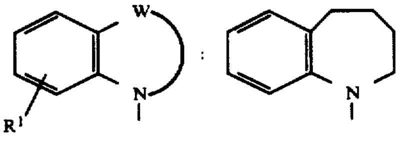
R²: H

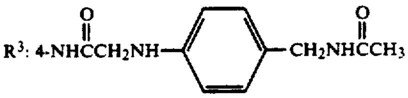

Crystalline form: Colorless amorphous
NMR analysis: 72)
Form: Free
Example 488
Structure

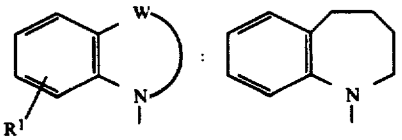
R²: H

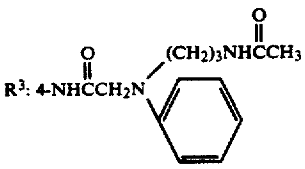

Crystalline form: Colorless amorphous
NMR analysis: 73)
Form: Free
Example 489
Structure

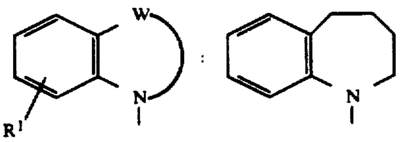
R²: H

TABLE 2-continued

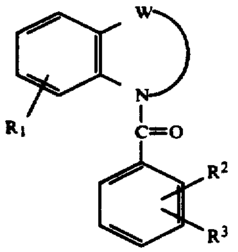

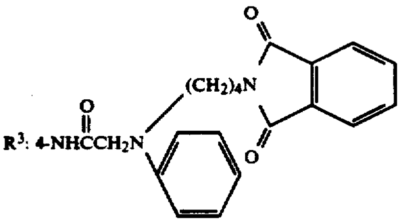

Crystalline form: Light yellow amorphous
NMR analysis: 74)
Form: Free
Example 490
Structure

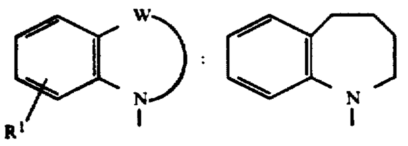

$R^2$: H

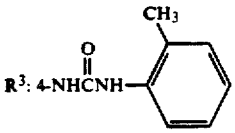

Crystalline form: White powder
Recrystallization solvent: Ethyl acetate
Melting Point: 182–182.5° C.
Form: Free
Example 491
Structure

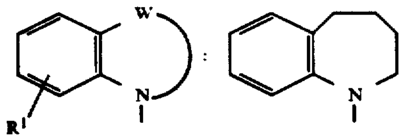

$R^2$: H

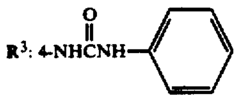

Crystalline form: White powder
Recrystallization solvent: Ethyl acetate
Melting Point: 244–245° C.
Form: Free
Example 492
Structure

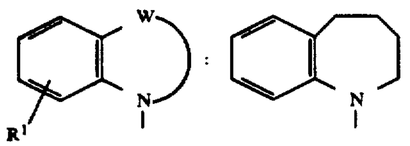

$R^2$: H

TABLE 2-continued

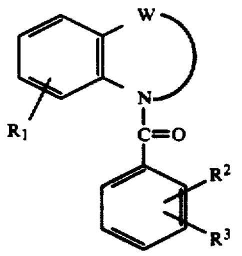

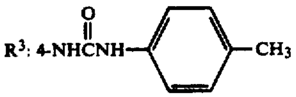

Crystalline form: White powder
Recrystallization solvent: Ethyl acetate
Melting Point: 220–221.5° C.
Form: Free
Example 493
Structure

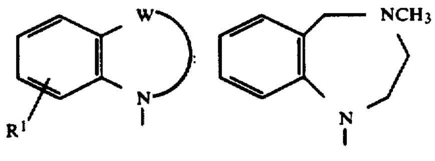

$R^2$: H

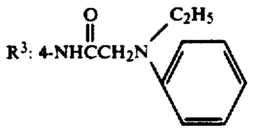

Crystalline form: Light yellow amorphous
NMR analysis: 75)
Form: Free
Example 494
Structure

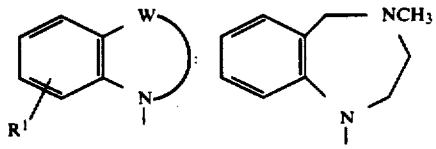

$R^2$: 3-$OCH_3$

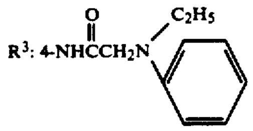

Crystalline form: Light yellow amorphous
NMR analysis: 76)
Form: Free
Example 495
Structure

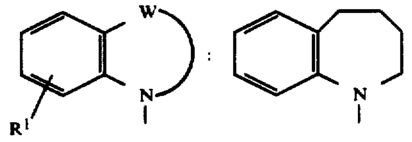

$R^2$: H

TABLE 2-continued

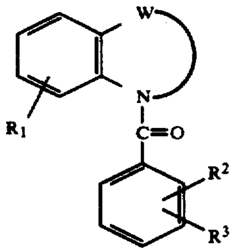

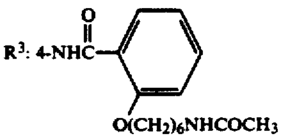

Crystalline form: Colorless needles
Recrystallization solvent: Methanol/diethyl ether
Melting Point: 171-172° C.
Form: Free
Example 496
Structure

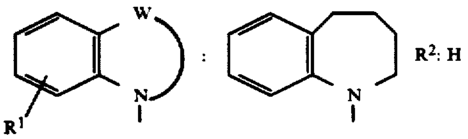

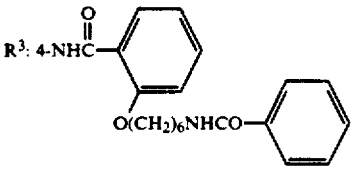

Crystalline form: White powder
Recrystallization solvent: Ethanol
Melting Point: 178-178.5° C.
Form: Free
Example 497
Structure

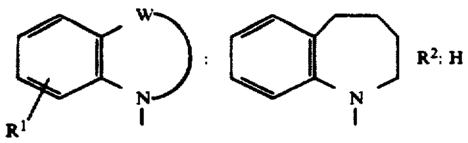

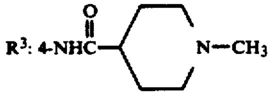

Example 498
Structure

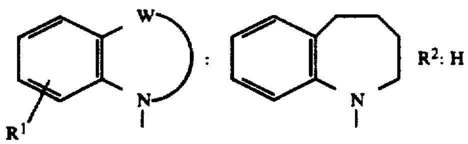

TABLE 2-continued

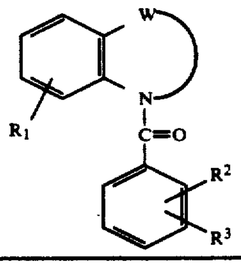

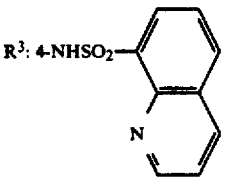

Example 499
Structure

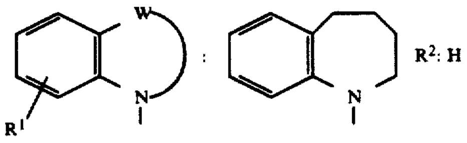

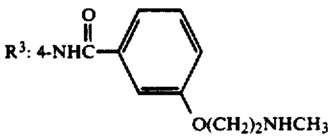

Example 500
Structure

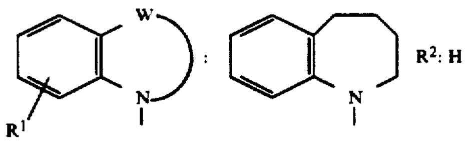

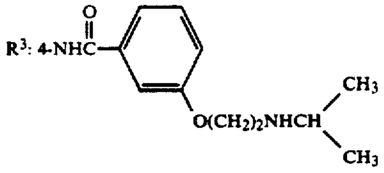

Example 501
Structure

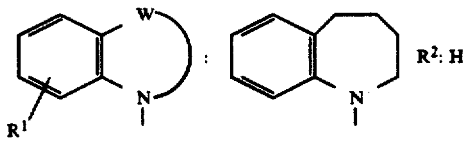

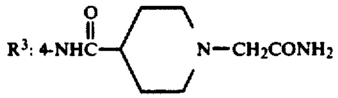

Example 502
Structure

TABLE 2-continued

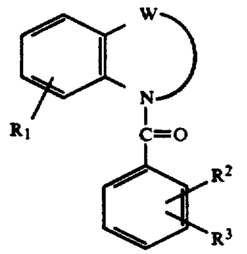

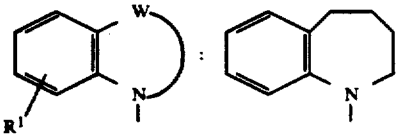

$R^2$: H

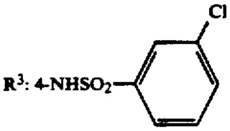

Example 503

Structure

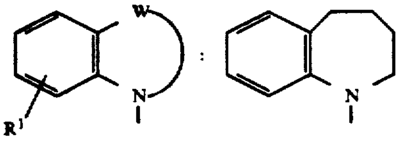

$R^2$: H

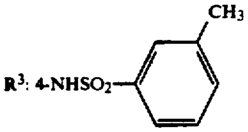

Example 504

Structure

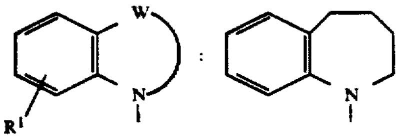

$R^2$: H $R^3$: 4-NH$\overset{O}{\overset{\|}{C}}$CH$_2$COOH

Crystalline form: Light yellow scales
Recrystallization solvent: Ethanol/water
Melting Point: 129–131° C.
Form: Free Example 505

Structure

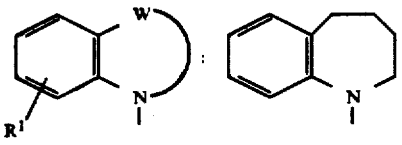

$R^2$: H

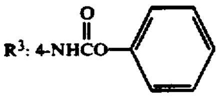

TABLE 2-continued

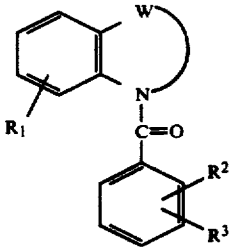

Crystalline form: White powder
Recrystallization solvent: Ethyl acetate
Melting Point: 199–201° C.
Form: Free Example 506

Structure

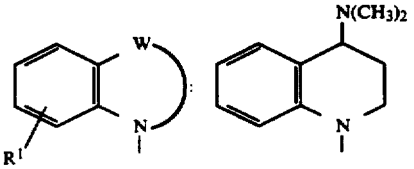

$R^2$: H

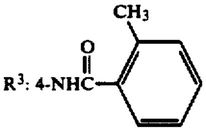

Crystalline form: Colorless amorphous
NMR analysis: 77)
Form: Free

Example 507

Structure

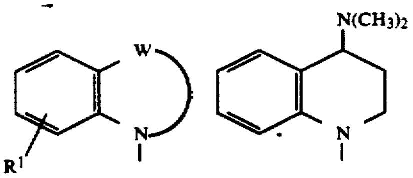

$R^2$: H

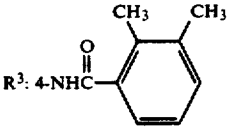

Crystalline form: White powder
Recrystallization solvent: n-Hexane/ethyl acetate
Melting Point: 187.5–189° C.
Form: Free Example 508

Structure

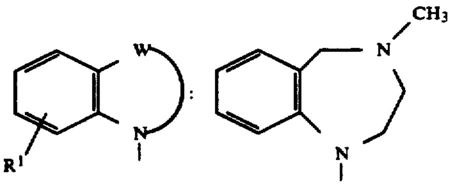

$R^2$: 2-Cl

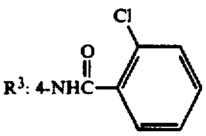

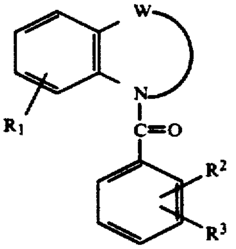

Crystalline form: White powder
Recrystallization solvent: Methanol/diethyl ether
Melting Point: 161-164° C.
Form: Free
Example 509
Structure

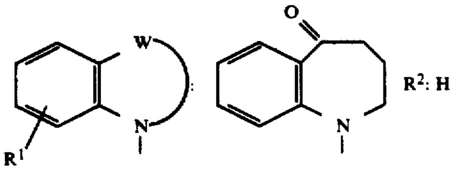

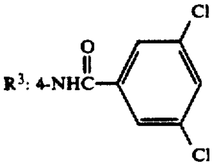

Crystalline form: Colorless prisms
Recrystallization solvent: Ethanol
Melting Point: 242-243° C.
Form: Free
Example 510
Structure

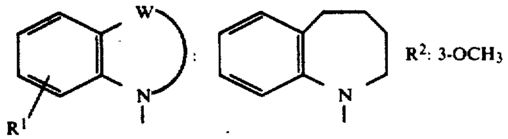

R3: 4-NHCOCH$_2$Cl
Crystalline form: White powder
Recrystallization solvent: Dichloroethane/diethyl ether
Melting Point: 186-188° C.
Form: Free
Example 511
Structure

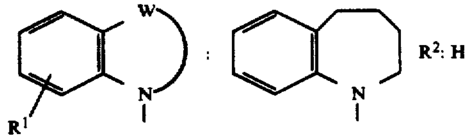

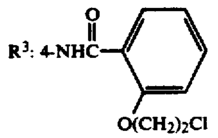

Crystalline form: Colorless amorphous
NMR analysis: 78)
Form: Free
Example 512

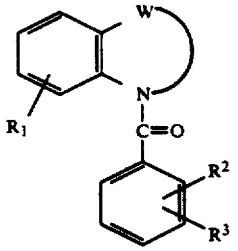

Structure

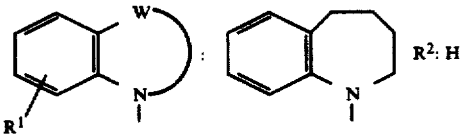

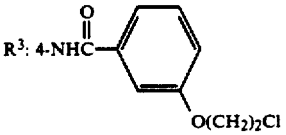

Crystalline form: Colorless amorphous
NMR analysis: 79)
Form: Free

49) $^1$H-NMR(CDCl$_3$) δ ; 1.11 (3H, t, J=7.1 Hz), 1.90-2.25 (2H, m), 2.29 (3H, s), 2.55 (2H, q, J=7.1 Hz), 3.62-3.90 (2H, m), 4.00-4.20 (1H, m), 6.63 (1H, d, J=7.9 Hz), 6.85-7.10 (2H, m), 7.25-7.80 (9H, m), 8.25 (1H, brs)

50) $^1$H-NMR(CDCl$_3$) δ ; 1.10 (3H, t, J=7.1 Hz), 1.90-2.20 (2H, m), 2.28 (3H, s), 3.60-3.90 (2H, m), 3.95-4.20 (1H, m), 6.62 (1H, d, J=7.9 Hz), 6.80-7.10 (2H, m), 7.20 (2H, d, J=8.6 Hz), 7.31-7.55 (4H, m), 7.80 (2H, d, J=1.9 Hz), 9.05 (1H, brs)

51) $^1$H-NMR(CDCl$_3$) δ ; 1.80-2.05 (1H, m), 2.15-2.50 (1H, m), 2.34 (6H, s), 2.51 (3H, s), 3.48-3.62 (1H, m), 3.72 (3H, s), 3.70-3.85 (1H, m), 4.00-4.22 (1H, m), 6.64 (1H, d, J=7.8 Hz), 6.84-7.58 (9H, m), 8.16 (1H, brs), 8.40 (1H, d, J=8.7 Hz)

52) $^1$H-NMR(CDCl$_3$) δ ; 1.16 (3H, t, J=7.1 Hz), 2.40-2.70 (2H, m), 2.90-3.30 (3H, m), 3.80-4.20 (2H, m), 4.80-5.00 (1H, m), 6.60-6.80 (1H, m), 7.00-7.70 (10H, m), 8.24 (1H, s)

53) $^1$H-NMR(DMSO-d$_6$) δ ; 1.0-2.5 (10H, m), 2.34 (3H, s), 3.30-3.80 (4H, m), 4.50-5.30 (3H, m), 6.70-7.00 (1H, m), 7.10-7.80 (11H, m), 10.43 (1H, s), 10.5-12.0 (1H, br)

54) $^1$H-NMR(CDCl$_3$) δ ; 1.10-2.10 (10H, m), 2.40-2.70 (1H, m), 2.80-3.20 (3H, m), 3.92 (2H, s), 4.90-5.20 (1H, m), 6.50-6.70 (1H, m), 6.80-7.60 (8H, m), 7.75 (2H, s), 8.73 (1H, s)

55) $^1$H-NMR(CDCl$_3$) δ ; 1.10-2.20 (10H, m), 2.40-2.70 (1H, m), 2.90-3.30 (3H, m), 3.93 (2H, s), 4.90-5.20 (1H, m), 6.62 (1H, d, J=7.6 Hz), 6.90-7.70 (10H, m), 8.29 (1H, s)

56) $^1$H-NMR(CDCl$_3$) δ ; 1.50-2.10 (2H, m), 2.38 (6H, s), 2.30-2.70 (1H, m), 2.70-3.00 (2H, m), 3.45 (1H, d, J=13 Hz), 3.81 (1H, d, J=14 Hz), 4.70-5.00 (1H, m), 7.0-7.50 (12H, m), 8.23 (1H, s)

57) $^1$H-NMR(CDCl$_3$) δ ; 1.50-2.10 (2H, m), 2.42 (3H, s), 2.40-2.70 (1H, m), 2.80-3.00 (2H, m), 3.52 (1H, d, J=13 Hz), 3.85 (1H, d, J=13 Hz), 4.70-5.00 (1H, m), 7.00-7.70 (12H, m), 8.54 (1H, s)

58) $^1$H-NMR(CDCl$_3$) δ ; 2.43 (3H, s), 2.47 (3H, s), 3.00-3.30 (3H, m), 3.76 (1H, d, J=14 Hz), 4.06 (1H, d, J=14 Hz), 4.90-5.20 (1H, m), 6.50-6.80 (3H, m), 6.90-7.50 (6H, m), 7.70-8.00 (2H, m), 8.48 (1H, d, J=8 Hz), 10.58 (1H, s)

59) $^1$H-NMR(CDCl$_3$) δ ; 2.41 (3H, s), 2.44 (3H, s), 2.90-3.20 (3H, m), 3.74 (1H, d, J=13 Hz), 4.07 (1H, d, J=14 Hz), 4.80-5.00 (1H, m), 6.67 (1H, d, J=7 Hz), 6.76 (1H, d, J=7 Hz), 7.00-7.50 (8H, m), 7.55 (1H,

TABLE 2-continued

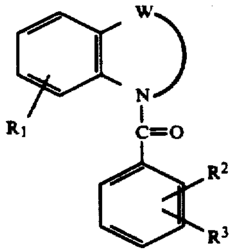

s), 7.70-7.90 (2H, m)

60) $^1$H-NMR(CDCl3) δ ; 2.41 (3H, s), 2.80-3.20 (3H, m), 3.73 (1H, d, J=13 Hz), 4.03 (1H, d, J=14 Hz), 6.66 (2H, d, J=7.6 Hz), 6.90-8.00 (10H, m), 8.57 (1H, s)

61) $^1$H-NMR(CDCl3) δ ; 2.40 (3H, s), 2.90-3.20 (3H, m), 3.73 (1H, d, J=13 Hz), 4.07 (1H, d, J=13 Hz), 4.70-5.00 (1H, m), 6.60-6.80 (2H, m), 6.90-8.00 (10H, m), 8.54 (1H, s)

62) $^1$H-NMR(CDCl3) δ ; 2.41 (3H, s), 2.90-3.20 (3H, m), 3.75 (1H, d, J=14 Hz), 4.08 (1H, d, J=14 Hz), 4.80-5.00 (1H, m), 6.67 (1H, d, J=7.6 Hz), 6.82 (1H, d, J=7.6 Hz), 6.90-7.90 (10H, m), 8.08 (1H, s)

63) $^1$H-NMR(CDCl3) δ ; 1.23 (3H, t, J=7 Hz), 1.40-1.70 (1H, m), 1.90-2.20 (3H, m), 2.70-3.30 (3H, m), 3.40-3.60 (5H, m), 3.91 (2H, s), 5.00-5.20 (1H, m), 6.60-7.40 (11H, m), 8.12 (1H, d, J=8 Hz), 8.99 (1H, s)

64) $^1$H-NMR(CDCl3) δ ; 1.35-1.70 (1H, m), 1.80-2.20 (3H, m), 2.25-2.35 (1H, m), 2.65-3.20 (3H, m), 4.01 (2H, s), 4.05-4.17 (2H, m), 4.90-5.10 (1H, m), 6.61 (1H, d, J=7.5 Hz), 6.75-7.50 (12H, m), 8.44 (1H, brs)

65) $^1$H-NMR(CDCl3) δ ; 1.13 (3H, t, J=7.0 Hz), 1.30-1.65 (4H, m), 1.80-2.20 (3H, m), 2.28 (3H, s), 2.65-3.40 (5H, m), 4.90-5.10 (1H, m), 6.63 (1H, d, J=7.8 Hz), 6.75-7.00 (3H, m), 7.00-7.45 (8H, m), 8.85 (1H, brs)

66) $^1$H-NMR(CDCl3) δ ; 0.88 (3H, t, J=7.4 Hz), 1.16 (3H, t, J=7.0 Hz), 1.35-2.20 (6H, m), 2.27 (3H, s), 2.60-3.20 (3H, m), 3.20-3.45 (2H, m), 3.85-4.10 (1H, m), 4.90-5.10 (1H, m), 6.63 (1H, d, J=7.4 Hz), 6.77 (2H, d, J=8.5 Hz), 6.92 (1H, t, J=8.0 Hz), 7.00-7.45 (8H, m), 8.85 (1H, brs)

67) $^1$H-NMR(CDCl3) δ ; 1.17 (3H, t, J=7.0 Hz), 1.35-1.65 (4H, m), 2.60-3.45 (5H, m), 4.20 (2H, q, J=7.0 Hz), 4.90-5.10 (1H, m), 6.63 (1H, d, J=7.6 Hz), 6.80-7.45 (12H, m), 8.66 (1H, brs)

68) $^1$H-NMR(CDCl3) δ ; 0.96 (6H, d, J=6.6 Hz), 1.35-1.65 (1H, m), 1.80-2.25 (4H, m), 2.65-3.15 (3H, m), 3.19 (2H, d, J=7.3 Hz), 3.99 (2H, s), 4.90-5.10 (1H, m), 6.60 (1H, d, J=7.8 Hz), 6.75-7.05 (4H, m), 7.05-7.40 (8H, m), 8.15 (1H, brs)

69) $^1$H-NMR(CDCl3) δ ; 1.19 (3H, t, J=7.0 Hz), 1.35-1.65 (1H, m), 1.80-2.25 (3H, m), 2.70-3.20 (3H, m), 3.44 (2H, q, J=7.0 Hz), 3.77 (3H, s), 3.87 (2H, s), 4.90-5.10 (1H, m), 6.25-6.50 (3H, m), 6.67 (1H, d, J=7.5 Hz), 6.85-7.45 (8H, m), 8.29 (1H, brs)

70) $^1$H-NMR(CDCl3) δ ; 1.05 (3H, t, J=7.1 Hz), 1.35-1.65 (1H, m), 1.85-2.25 (3H, m), 2.65-3.30 (5H, m), 3.74 (2H, s), 4.95-5.15 (1H, m), 6.63 (1H, d, J=7.5 Hz), 6.80-7.55 (11H, m), 9.51 (1H, brs)

71) $^1$H-NMR(CDCl3) δ ; 1.30-1.65 (1H, m), 1.80-2.30 (3H, m), 2.65-3.15 (3H, m), 3.75 (2H, s), 3.74 (2H, s), 4.95-5.10 (1H, m), 6.45-6.70 (3H, m), 6.88 (1H, t, J=6.8 Hz), 7.00-7.45 (8H, m), 8.74 (1H, brs)

72) $^1$H-NMR(CDCl3) δ ; 1.30-1.70 (1H, m), 1.75-2.25 (6H, m), 2.65-3.15 (3H, m), 3.78 (2H, d, J=5.4 Hz), 4.28 (2H, d, J=5.5 Hz), 4.53 (1H, brs), 4.90-5.10 (1H, m), 5.89 (1H, brs), 6.50-6.70 (3H, m), 6.89 (1H, t, J=7.5 Hz), 7.00-7.40 (8H, m), 8.61 (1H, brs)

73) $^1$H-NMR(CDCl3) δ ; 1.35-1.65 (1H, m), 1.70-2.20 (8H, m), 2.65-3.20 (3H, m), 3.25-3.55 (4H, m), 3.88 (2H, s), 4.90-5.10 (1H, m), 5.79 (1H, brs), 6.55-7.40 (13H, m), 8.37 (1H, brs)

74) $^1$H-NMR(CDCl3) δ ; 1.35-2.00 (8H, m), 2.65-3.20 (3H, m), 3.30-3.35 (2H, m), 3.60-3.85 (2H, m), 3.90 (2H, s), 4.95-5.15 (1H, m), 6.55-7.00 (5H, m), 7.00-7.40 (8H, m), 7.65-7.90 (4H, m), 8.22 (1H, brs)

75) $^1$H-NMR(CDCl3) δ ; 1.16 (3H, t, J=7.0 Hz), 2.39 (3H, s), 2.80-3.20 (3H, m), 3.44 (2H, q, J=7.0 Hz),

TABLE 2-continued

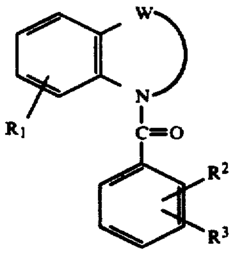

3.65-4.20 (4H, m), 4.80-5.05 (1H, m), 6.50-7.45 (13H, m), 8.50 (1H, brs)

76) $^1$H-NMR(CDCl3) δ ; 1.23 (3H, t, J=7.0 Hz), 2.41 (3H, s), 2.75-3.20 (3H, m), 3.40-3.60 (5H, m), 3.65-3.90 (1H, m), 3.92 (2H, s), 3.90-4.20 (1H, m), 4.85-5.10 (1H, m), 6.65-7.45 (11H, m), 8.13 (1H, d, J=8.4 Hz), 9.01 (1H, brs)

77) $^1$H-NMR(CDCl3) δ ; 1.80-1.95 (1H, m), 2.20-2.70 (10H, m), 3.50-3.60 (1H, m), 3.63-3.80 (1H, m), 4.00-4.15 (1H, m), 6.60 (1H, d, J=7.6 Hz), 6.92 (1H, t, J=7.6 Hz), 7.02 (1H, t, J=6.3 Hz), 7.20-7.65 (9H, m), 7.87 (1H, brs)

78) $^1$H-NMR(CDCl3) δ ; 1.40-1.62 (1H, m), 1.84-2.22 (3H, m), 2.65-3.19 (3H, m), 3.97 (2H, t, J=4.9 Hz), 4.43 (2H, t, J=4.9 Hz), 4.95-5.18 (1H, m), 6.60-6.77 (1H, m), 6.85-7.02 (2H, m), 7.02-7.30 (5H, m), 7.40-7.68 (3H, m), 8.20-8.32 (1H, m), 9.62-9.81 (1H, m)

79) $^1$H-NMR(CDCl3) δ ; 1.38-1.65 (1H, m), 1.84-2.21 (3H, m), 2.64-3.15 (3H, m), 3.81 (2H, t, J=5.7 Hz), 4.25 (2H, t, J=5.7 Hz), 4.90-5.13 (1H, m), 6.58-6.71 (1H, m), 6.82-7.00 (1H, m), 7.00-7.52 (10H, m), 8.11 (1H, brs)

EXAMPLE 513

To a solution of 1-(4-aminobenzoyl)-2,3,4,5-tetrahydro-1H-benzazepine (1.06 g) in dichloromethane (80 ml) is added o-methylphenyl isocyanate (0.66 g) under ice-cooling. The mixture is stirred at room temperature for 4 hours. After completion of the reaction, the solvent is concentrated under reduced pressure and the resulting residue is purified by silica gel column chromatography (eluent; n-hexane : ethyl acetate 1 : 1), and recrystallized from ethyl acetate to give 1-[4-(2-methylanilinocarbonylamino)benzoyl]-2,3,4,5-tetrahydro-1H-benzazepine (0.97 g) as white powder, m.p. 182°-182.5° C. Using the suitable starting materials, the compounds of the above Examples 491-492 are obtained in the same manner as in Example 513.

EXAMPLE 514

A mixture of 1-(4-aminobenzoyl)-2,3,4,5-tetrahydro-1H-benzazepine (0.50 g), phenylsulfonyl chloride (0.29 ml), triethylamine (0.32 ml) and dichloromethane (30 ml) is stirred at room temperature overnight. The reaction mixture is washed successively with water and saturated saline solution, and dried over magnesium sulfate. The solvent is distilled off and the resulting residue is purified by silica gel column chromatography (eluent; chloroform), and recrystallized from methanol/diethyl ether to give 1-(4-phenylsulfonylaminobenzoyl)-2,3,4,5-tetrahydro-1H-benzazepine (0.27 g) as colorless prisms, m.p. 178°-182.5° C.

Using the suitable starting materials, the compounds of the above Examples 469-471, 498, 502 and 503 are obtained in the same manner as in Example 514.

EXAMPLE 515

To a solution of 1-[4-(4-piperidinylcarbonylamino)-benzoyl]-2,3,4,5-tetrahydro-1H-benzazepine (0.70 g) in dimethylformamide (20 ml) is added 60 % sodium hydride dispersion in mineral oil (82 mg) and the mixture is stirred at room temperature for 30 minutes. Thereto is added methyl iodide (0.14 ml) and the mixture is stirred ar room temperature overnight. The solvent is distilled off and the resulting residue is extracted with chloroform, and washed successively with water and saturated saline solution, and dried over magnesium sulfate. The solvent is distilled off and the resulting residue is purified by silica gel column chromatography (eluent; chloroform : methanol =10 : 1), and recrystallized from methanol/n-hexane to give 1-{4-[N-(1-methyl-4-piperidinylcarbonyl)-N-methylamino]benzoyl}-2,3,4,5-tetrahydro-1H-benzazepine (0.03 g) as light yellow powder, m.p. 194.5°-197° C.

Using the suitable starting materials, the compounds of the above Examples 497 and 501 are obtained in the same manner as in Example 515.

EXAMPLE 516

6-Fluoro-1-(4-aminobenzoyl)-1,2,3,4-tetrahydroquinoline (0.15 g) is dissolved in dichloromethane (10 ml) and thereto is added triethylamine (0.31 ml). To the mixture is added dropwise a solution of 3,5-dichlorobenzoyl chloride (0.14 g) in dichloromethane (2.0 ml) under ice-cooling, and the mixture is stirred for 30 minutes under ice-cooling, and further, at room temperature for 1 hour. To the mixture are added triethylamine (0.31 ml) and 3,5-dichlorobenzoyl chloride (0.14 ml). The mixture is stirred at room temperature for 4 hours. The reaction mixture is washed with water, and dried over magnesium sulfate. The solvent is distilled off and the resulting residue is purified by silica gel column chromatography (eluent; ethyl acetate : n-hexane =1 : 5 1 : 4), and recrystallized from ethyl acetate/n-hexane to give 6-fluoro-1-[4-(3,5-dichlorobenzoylamino)benzoyl]-1,2,3,4-tetrahydroquinoline (0.12 g) and 6-fluoro-1-{4-[bis-(3,5-dichlorobenzoyl)amino]-benzoyl{-1,2,3,4-tetrahydroquinoline.

The former: White powder, m.p. 205.5°-206.5° C.

The latter: White powder, m.p. 210.5°-212° C.

EXAMPLE 517

Using the suitable starting materials, the compounds of the above Examples 450 and 504 are obtained in the same manner as in Example 378.

EXAMPLE 518

Using the suitable starting materials, the compounds of the above Examples 450 - 467, 495, 496, 499, 500, 511 and 512 are obtained in the same manner as in Example 380.

EXAMPLE 519

Using the suitable starting materials, the compounds of the above Examples 449, 474 - 489, 493 and 494 are obtained in the same manner as in Example 394.

EXAMPLE 520

Using the suitable starting materials, the compounds of the above Examples 453, 455, 457, 459, 460, 463 - 467, 495, 496 and 499 are obtained in the same manner as in Example 397.

EXAMPLE 521

Using the suitable starting materials, the compound of the above Example 461 is obtained in the same manner as in Example 396.

EXAMPLE 522

Using the suitable starting materials, the compound of the above Example 456 is obtained in the same manner as in Example 398.

EXAMPLE 523

Using the suitable starting materials, the compound of the above Example 459 is obtained in the same manner as in Example 399.

EXAMPLE 524

Using the suitable starting materials, the compounds of the above Examples 495 and 496 are obtained in the same manner as in Examples 400 and 401.

EXAMPLE 525

Using the suitable starting materials, the compound of the above Example 458 is obtained in the same manner as in Example 402.

Using the suitable starting materials, the compounds of the following Table 3 are obtained in the same manner as in Examples 1 and 382.

TABLE 3

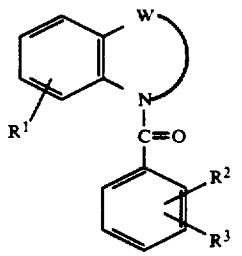

Example 527
Structure

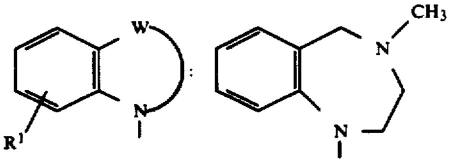

$R^2$: 2-Cl

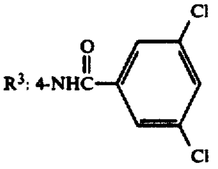

Crystalline form: White powder
Recrystallization solvent: Methanol/diethyl ether
Melting Point: 225-226° C.
Form: Free
Example 528
Structure TABLE 3-continued

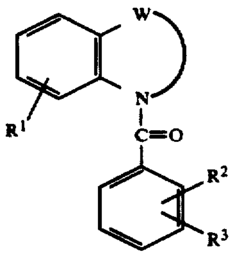

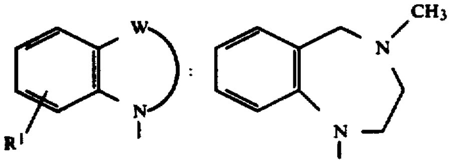

$R^2$: 2-Cl

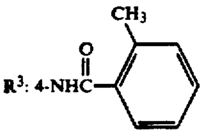

Crystalline form: White powder
Recrystallization solvent: Methanol/diethyl ether
Melting Point: 142.5-145° C.
Form: Free
Example 529
Structure

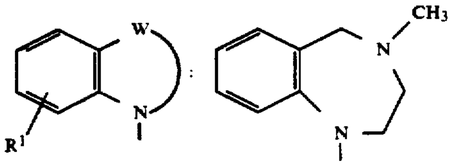

$R^2$: 2-Cl

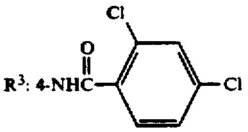

Crystalline form: White powder
Recrystallization solvent: Methanol/diethyl ether
Melting Point: 213-215° C.
Form: Free
Example 530
Structure

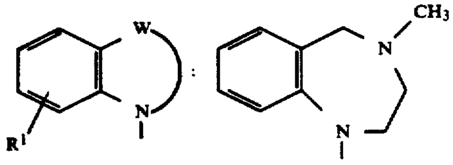

$R^2$: 3-$CH_3$

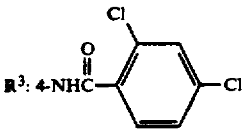

Crystalline form: White powder
Recrystallization solvent: Methanol/diethyl ether TABLE 3-continued

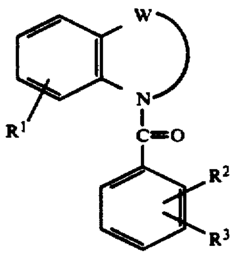

Melting Point: 167-167.5° C.
Form: Free
Example 531
Structure

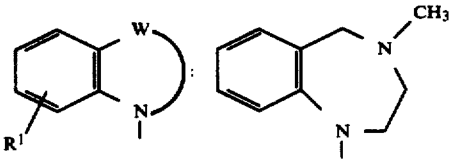

$R^2$: 3-$CH_3$

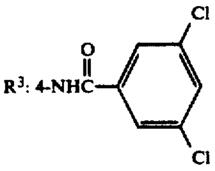

Crystalline form: Colorless scales
Recrystallization solvent: Methanol/diethyl ether
Melting Point: 217-221° C.
Form: Free
Example 532
Structure

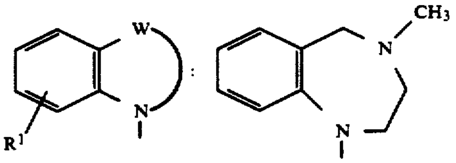

$R^2$: 3-$CH_3$

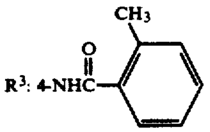

Crystalline form: White powder
Recrystallization solvent: Methanol/diethyl ether
Melting Point: 182-184° C.
Form: Free
Example 533
Structure

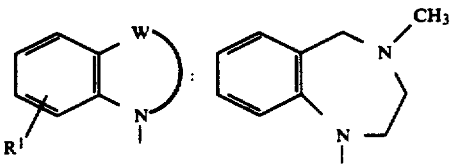

$R^2$: 3-$CH_3$

TABLE 3-continued

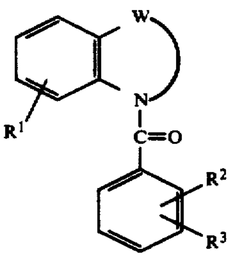

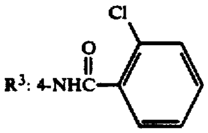

Crystalline form: White powder
Recrystallization solvent: Methanol/diethyl ether
Melting Point: 209–210° C.
Form: Free
Example 534
Structure

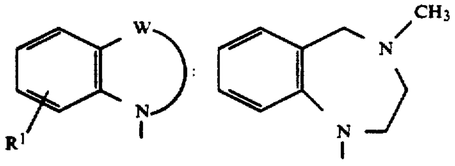

$R^2$: 3-$OCH_3$

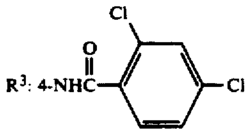

Crystalline form: White powder
Recrystallization solvent: Methanol/diethyl ether
Melting Point: 148–149° C.
Form: Free
Example 535
Structure

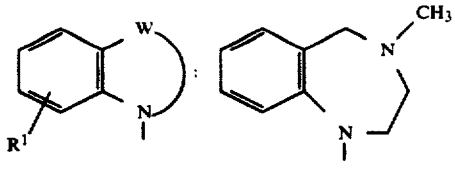

$R^2$: H

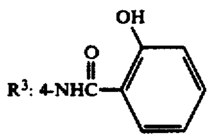

Crystalline form: White powder
Recrystallization solvent: Methanol/diethyl ether
Melting Point: 202–203° C.
Form: Free
Example 536
Structure TABLE 3-continued

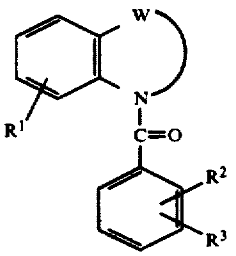

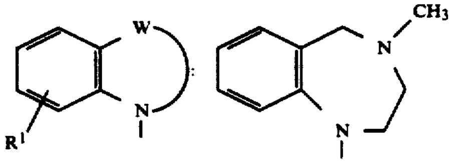

$R^2$: 3-$CH_3$

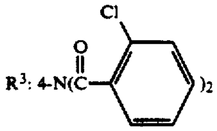

Crystalline form: White powder
Recrystallization solvent: Methanol/diethyl ether
Melting Point: 218–219° C.
Form: Free
Example 537
Structure

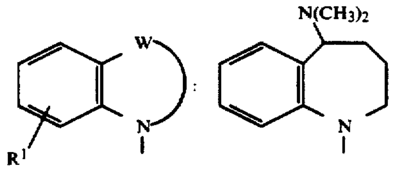

$R^2$: 2-Cl

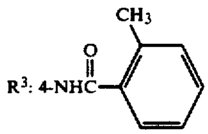

Crystalline form: White powder
Recrystallization solvent: Methanol/n-hexane
Melting Point: 159–160° C.
Form: Free
Example 538
Structure

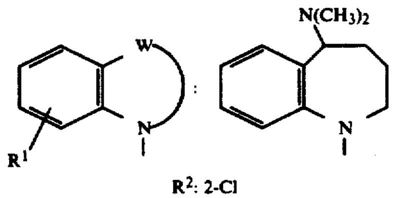

$R^2$: 2-Cl

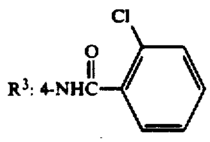

Crystalline form: White powder
Recrystallization solvent: Methanol/n-hexane

TABLE 3-continued

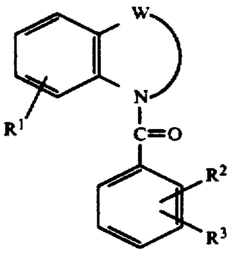

Melting Point: 201-202° C.
Form: Free

Example 539

Structure

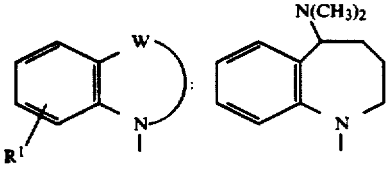

$R^2$: 2-Cl

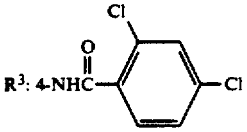

Crystalline form: White powder
Recrystallization solvent: Methanol/n-hexane
Melting Point: 205-207° C.
Form: Free Example 540

Structure

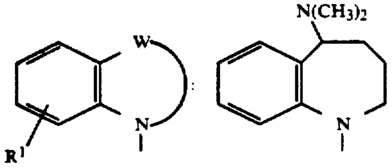

$R^2$: 3-OH

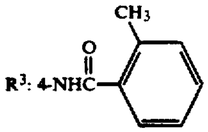

Crystalline form: White powder
Recrystallization solvent: Methanol/diethyl ether
Melting Point: 201.5-202.5° C.
Form: Free Example 541

Structure

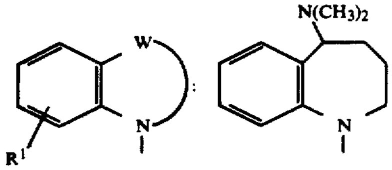

$R^2$: 2-$OCH_3$

TABLE 3-continued

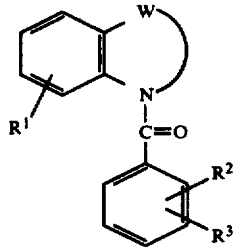

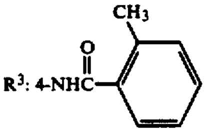

Crystalline form: White powder
Recrystallization solvent: Methanol/diethyl ether
Melting Point: 226-228° C.
Form: Free Example 542

Structure

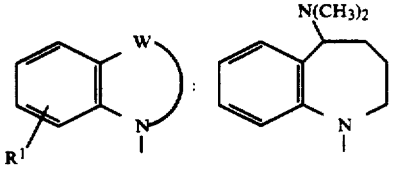

$R^2$: 2-$OCH_3$

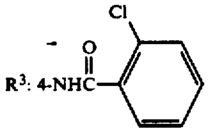

Crystalline form: White powder
Recrystallization solvent: Methanol/diethyl ether
Melting Point: 218-221° C.
Form: Free Example 543

Structure

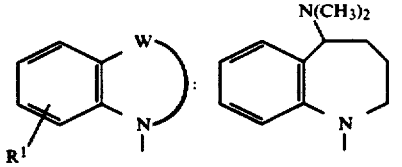

$R^2$: 2-$OCH_3$

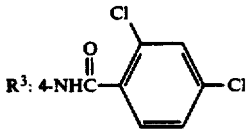

Crystalline form: White powder
Recrystallization solvent: Methanol/diethyl ether
Melting Point: 156-157° C.
Form: Free Example 544

Structure

TABLE 3-continued

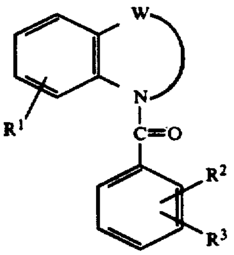

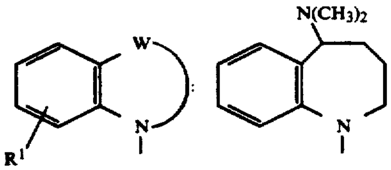

$R^2$: 2-$OCH_3$

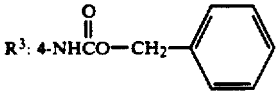

Crystalline form: White powder
NMR analysis: 80)
Form: Free
Example 545
Structure

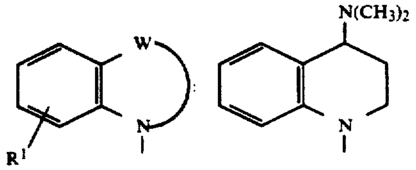

$R^2$: 3-$OCH_3$

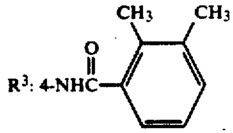

Crystalline form: Colorless amorphous
NMR analysis: 81)
Form: Free
Example 546
Structure

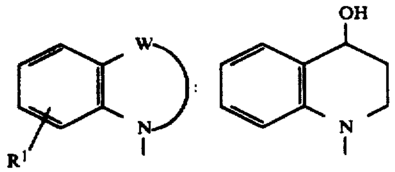

$R^2$: H

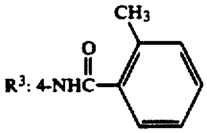

Crystalline form: Colorless amorphous
NMR analysis: 82)
Form: Free
Example 547
Structure TABLE 3-continued

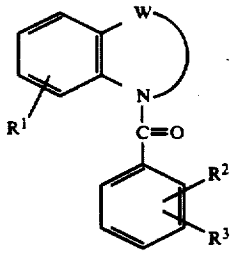

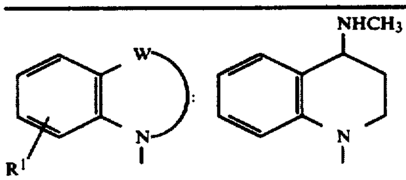

$R^2$: H

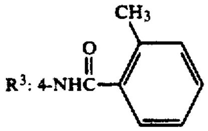

Crystalline form: Light yellow amorphous
NMR analysis: 83)
Form: Free
Example 548
Structure

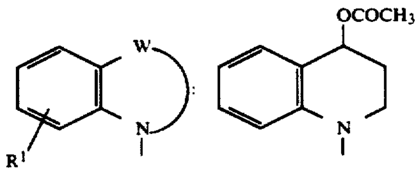

$R^2$: H

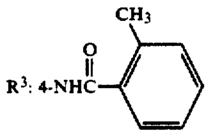

Crystalline form: Colorless amorphous
NMR analysis: 84)
Form: Free
Example 549
Structure

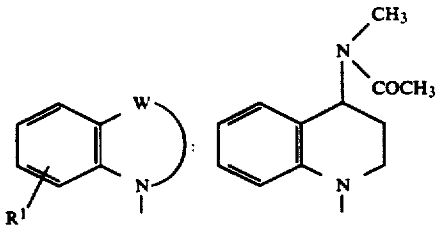

$R^2$: H

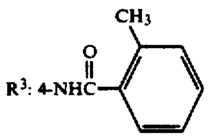

Crystalline form: Colorless amorphous
NMR analysis: 85)

TABLE 3-continued

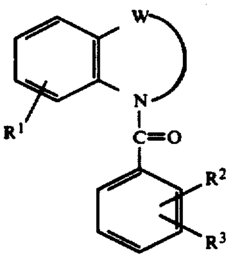

Form: Free
Example 550
Structure

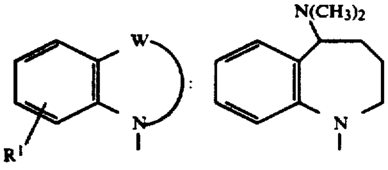

R$^2$: 3-OCH$_2$CH$_3$

R$^3$: 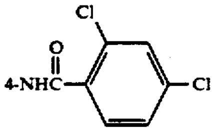

Crystalline form: White powder
Recrystallization solvent: n-Hexane/ethyl acetate
Melting Point: 135–136° C.
Form: Free
Example 551
Structure

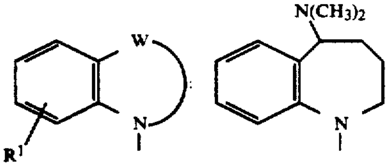

R$^2$: 3-OCH$_2$CH$_3$

R$^3$: 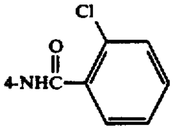

Crystalline form: Colorless prisms
Recrystallization solvent: n-Hexane/ethyl acetate
Melting Point: 122–123° C.
Form: Free
Example 552
Structure

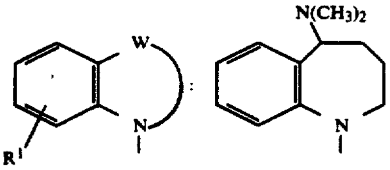

R$^2$: 3-OCH$_2$CH$_3$

TABLE 3-continued

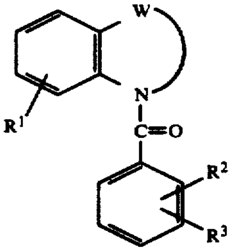

R$^3$: 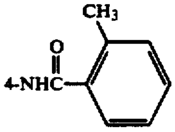

Crystalline form: Colorless prisms
Recrystallization solvent: n-Hexane/ethyl acetate
Melting Point: 118–119° C.
Form: Free
Example 553
Structure

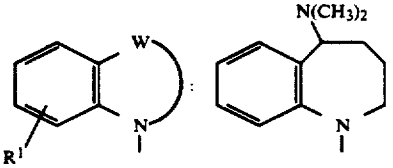

R$^2$: 3-OCH$_2$— 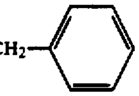

R$^3$: 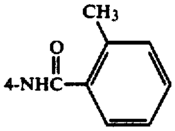

Crystalline form: Colorless prisms
Recrystallization solvent: n-Hexane/ethyl acetate
Melting Point: 145–147° C.
Form: Free
Example 554
Structure

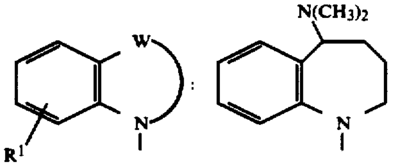

R$^2$: 3-OCH$_2$— 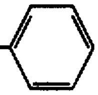

R$^3$: 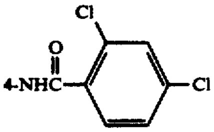

Crystalline form: Light yellow needles
Recrystallization solvent: n-Hexane/ethyl acetate
Melting Point: 169.5–170.5° C.
Form: Free
Example 555
Structure TABLE 3-continued

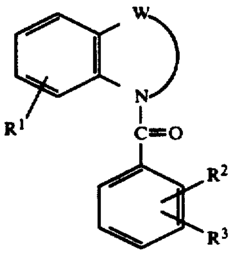

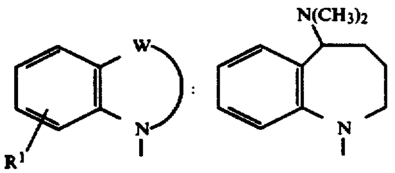

R²: 3-OH

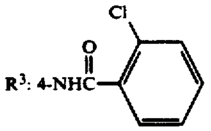

Crystalline form: Colorless prisms
Recrystallization solvent: n-Hexane/ethyl acetate
Melting Point: 194–195° C.
Form: Free
Example 556
Structure

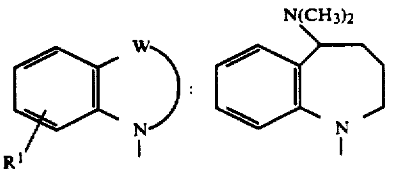

R²: 3-OH

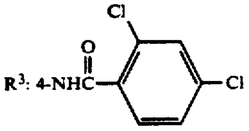

Crystalline form: Colorless needles
Recrystallization solvent.: n-Hexane/ethyl acetate
Melting Point: 202–204° C.
Form: Free
Example 557
Structure

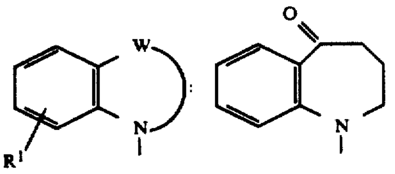

R²: H

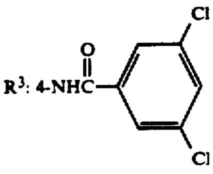

Crystalline form: Colorless prisms
Recrystallization solvent: Ethanol

TABLE 3-continued

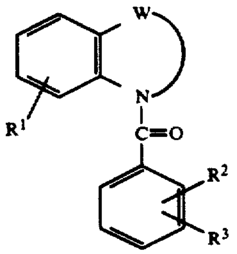

Melting Point: 242–243° C.
Form: Free
Example 558
Structure

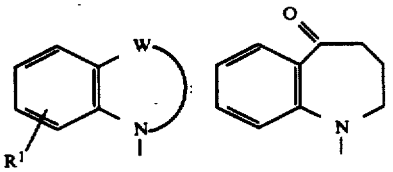

R²: H

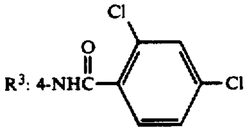

Crystalline form: Light yellow powder
NMR analysis: 86)
Form: Free
Example 559
Structure

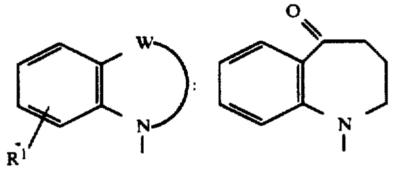

R²: H

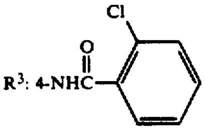

Crystalline form: Light yellow powder
NMR analysis: 87)
Form: Free
Example 560
Structure

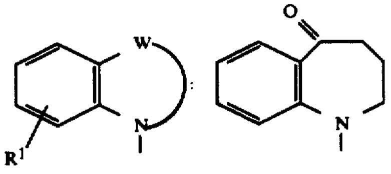

R²: H

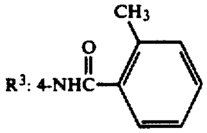

Crystalline form: Colorless needles
Recrystallization solvent: Ethanol
Melting Point: 237–238° C.

TABLE 3-continued

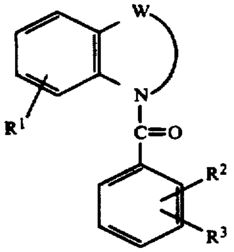

Form: Free
Example 561
Structure

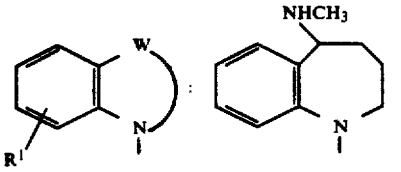

R$^2$: H

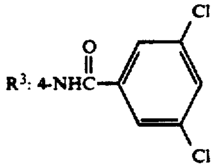

Crystalline form: Colorless prisms
Recrystallization solvent: Dioxane
Melting Point: 258-259° C.
Form: Free
Example 562
Structure

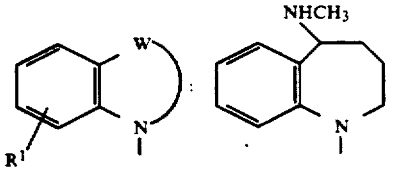

R$^2$: H

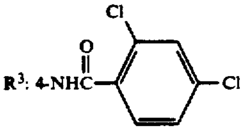

Crystalline form: Colorless prisms
Recrystallization solvent: Ethanol
Melting Point: 182.5-183.5° C.
Form: Free
Example 563
Structure

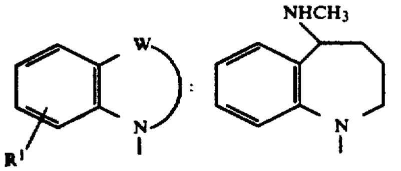

R$^2$: H

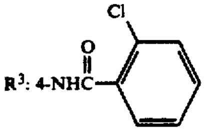

Crystalline form: Colorless prisms

TABLE 3-continued

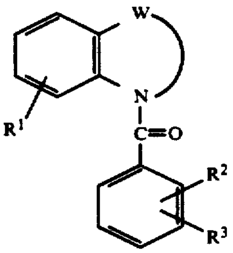

Recrystallization solvent: Ethanol
Melting Point: 209-211° C.
Form: Free
Example 564
Structure

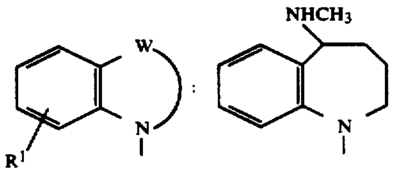

R$^2$: H

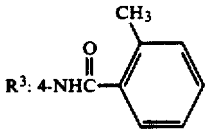

Crystalline form: Colorless prisms
Recrystallization solvent: Dioxane
Melting Point: 210-211° C.
Form: Free
Example 565
Structure

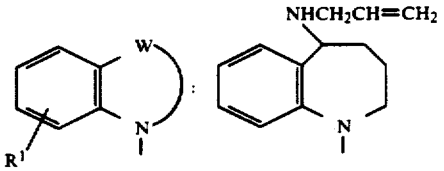

R$^2$: H

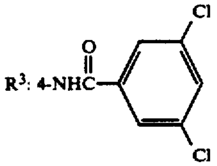

Crystalline form: Colorless needles
Recrystallization solvent: Ethyl acetate/n-hexane
Melting Point: 176-178° C.
Form: Free
Example 566
Structure

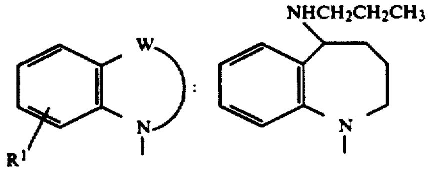

R$^2$: H

TABLE 3-continued

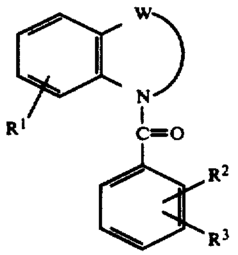

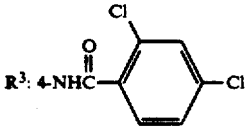

Crystalline form: Light yellow amorphous
NMR analysis: 88)
Form: Free
Example 567
Structure

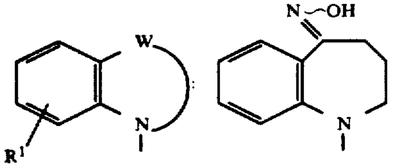

R$^2$: H

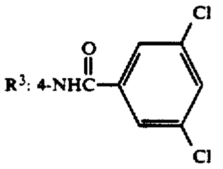

Crystalline form: White powder
Recrystallization solvent: Dioxane/water
Melting Point: 272-273° C.
Form: Free
Example 568
Structure

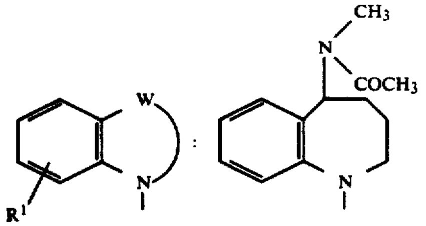

R$^2$: H

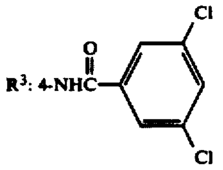

Crystalline form: Colorless prisms
Recrystallization solvent: Dioxane
Melting Point: 253-254° C.
Form: Free
Example 569
Structure TABLE 3-continued

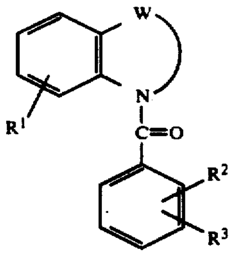

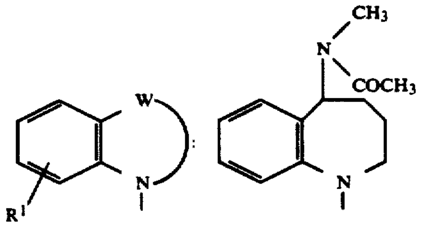

R$^2$: H

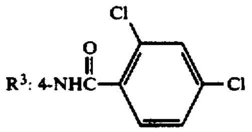

Crystalline form: Colorless prisms
Recrystallization solvent: Ethanol
Melting Point: 248.5-249.5° C.
Form: Free
Example 570
Structure

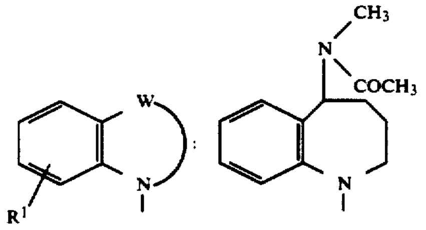

R$^2$: H

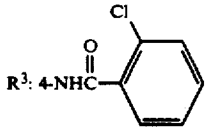

Crystalline form: Colorless needles
Recrystallization solvent: Ethanol
Melting Point: 266.5-267.5° C.
Form: Free
Example 571
Structure

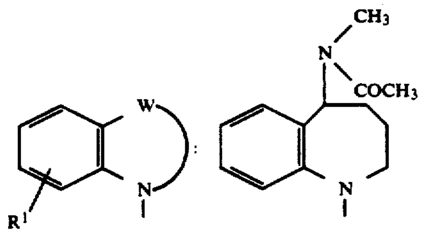

R$^2$: H

TABLE 3-continued

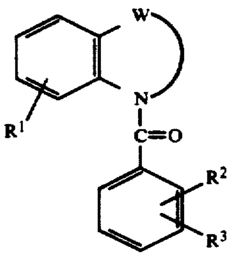

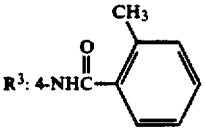

Crystalline form: Colorless needles
Recrystallization solvent: Ethanol
Melting Point: 252–253° C.
Form: Free
Example 572
Structure

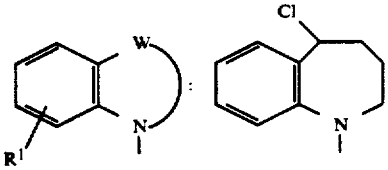

$R^2$: H

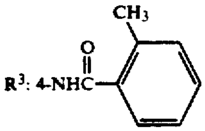

Crystalline form: Light yellow powder
NMR analysis: 89)
Form: Free
Example 573
Structure

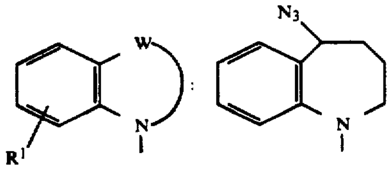

$R^2$: H

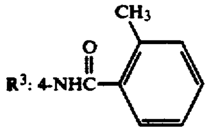

Crystalline form: Light brown powder
NMR analysis: 90)
Form: Free
Example 574
Structure

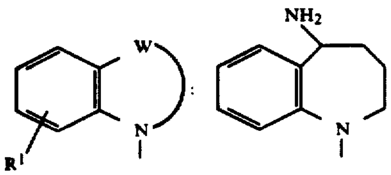

$R^2$: H

TABLE 3-continued

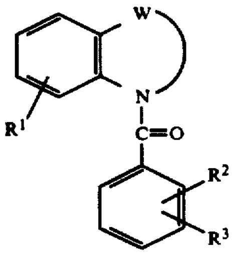

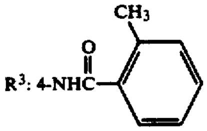

Crystalline form: White powder
Recrystallization solvent: Diethyl ether
Melting Point: 298.5–199.5° C.
Form: Free
Example 575
Structure

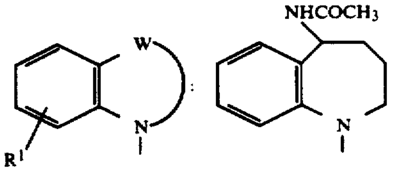

$R^2$: H

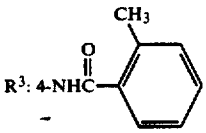

Crystalline form: Colorless needles
Recrystallization solvent: Ethanol
Melting Point: 297–299° C.
Form: Free
Example 576
Structure

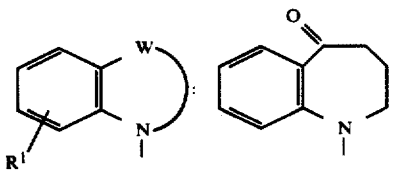

$R^2$: 2-Cl

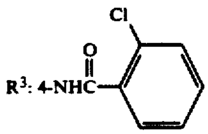

Crystalline form: Colorless amorphous
NMR analysis: 91)
Form: Free
Example 577
Structure

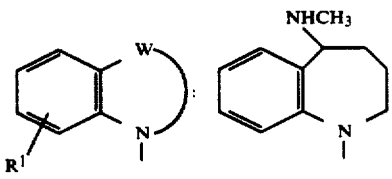

$R^2$: 2-Cl

TABLE 3-continued

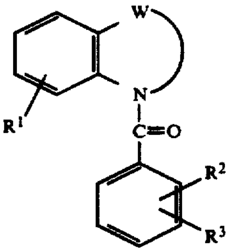

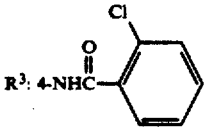

Crystalline form: White powder
Recrystallization solvent: Ethanol/petroleum ether
Melting Point: 202-203° C.
Form: Free
Example 578
Structure

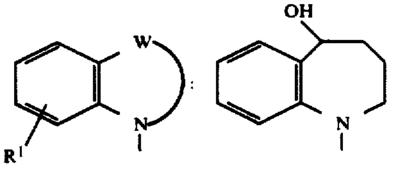

$R^2$: H

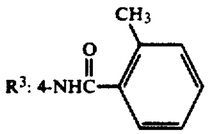

Crystalline form: Colorless amorphous
NMR analysis: 92)
Form: Free
Example 579
Structure

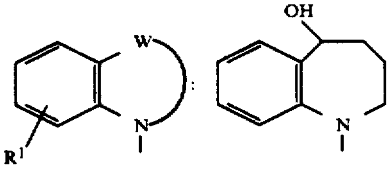

$R^2$: H

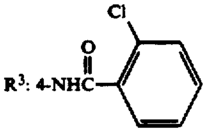

Crystalline form: White powder
Recrystallization solvent: Ethyl acetate/n-hexane
Melting Point: 232-233° C.
Form: Free
Example 580
Structure

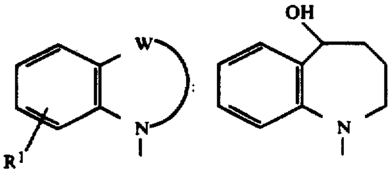

$R^2$: H

TABLE 3-continued

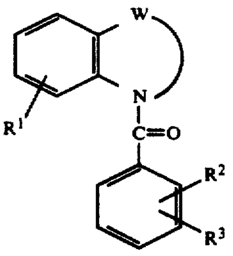

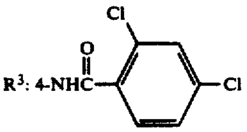

Crystalline form: Colorless amorphous
NMR analysis: 93)
Form: Free
Example 581
Structure

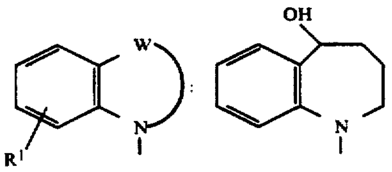

$R^2$: H

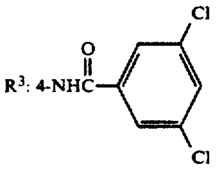

Crystalline form: White powder
Recrystallization solvent: Ethyl acetate/n-hexane
Melting Point: 256.5-257° C.
Form: Free
Example 582
Structure

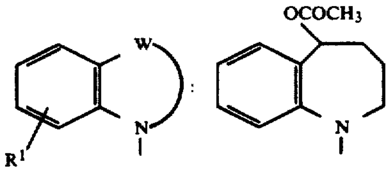

$R^2$: H

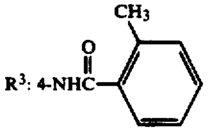

Crystalline form: White powder
Recrystallization solvent: Ethyl acetate/n-hexane
Melting Point: 193-194° C.
Form: Free
Example 583
Structure TABLE 3-continued

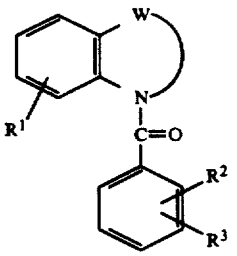

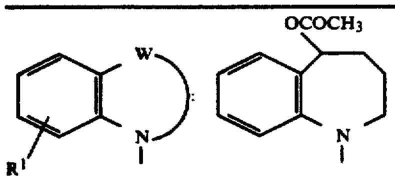

R²: H

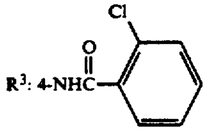

Crystalline form: White powder
Recrystallization solvent: Ethyl acetate/n-hexane
Melting Point: 227-230° C.
Form: Free
Example 584
Structure

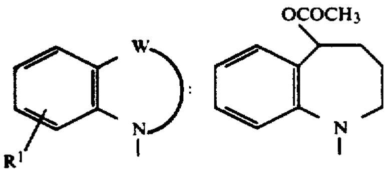

R²: H

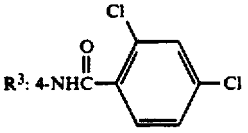

Crystalline form: White powder
Recrystallization solvent: Ethyl acetate/n-hexane
Melting Point: 199.5-202° C.
Form: Free
Example 585
Structure

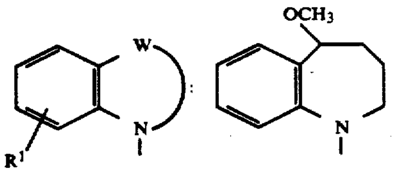

R²: H

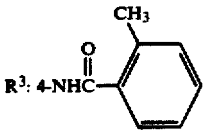

Crystalline form: White powder
Recrystallization solvent: Ethyl acetate/n-hexane
Melting Point: 219-220° C.
Form: Free
Example 586
Structure TABLE 3-continued

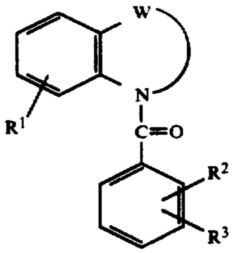

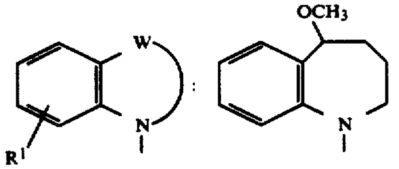

R²: H

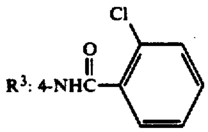

Crystalline form: White powder
Recrystallization solvent.: Ethyl acetate/n-hexane
Melting Point: 190-191.5° C.
Form: Free
Example 587
Structure

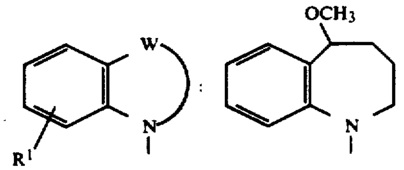

R²: H

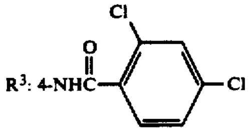

Crystalline form: White powder
Recrystallization solvent: Ethyl acetate/n-hexane
Melting Point: 184-185° C.
Form: Free
Example 588
Structure

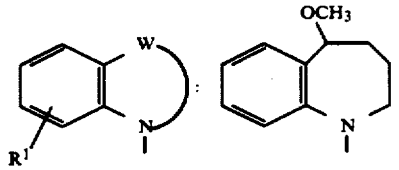

R²: H

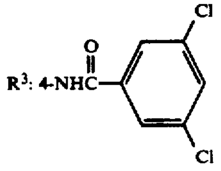

TABLE 3-continued

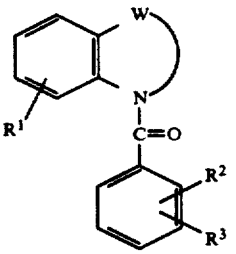

Crystalline form: White powder
Recrystallization solvent: Ethyl acetate/n-hexane
Melting Point: 223–224° C.
Form: Free
Example 589
Structure

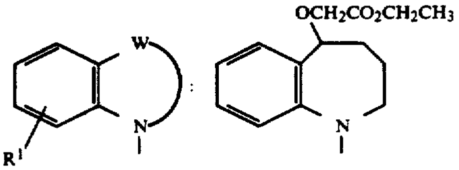

R²: H

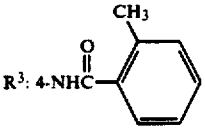

Crystalline form: White powder
Recrystallization solvent: Ethyl acetate/n-hexane
Melting Point: 178–181° C.
Form: Free
Example 590
Structure

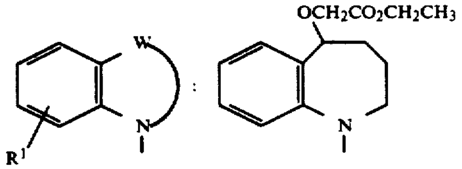

R²: H

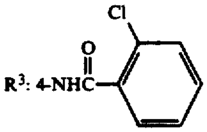

Crystalline form: Colorless needles
Recrystallization solvent.: Ethyl acetate/n-hexane
Melting Point: 168–168.5° C.
Form: Free
Example 591
Structure

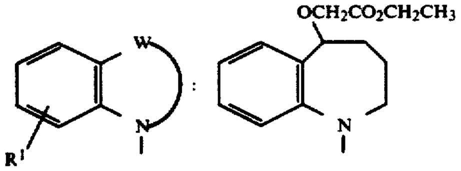

R²: H

TABLE 3-continued

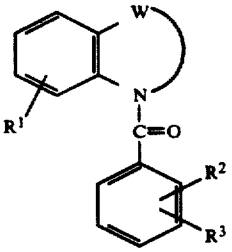

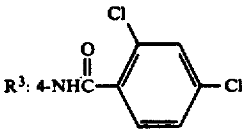

Crystalline form: Colorless amorphous
NMR analysis: 94)
Form: Free
Example 592
Structure

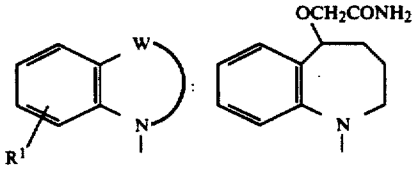

R²: H

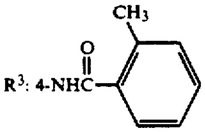

Crystalline form: Colorless amorphous
NMR analysis: 95)
Form: Free
Example 593
Structure

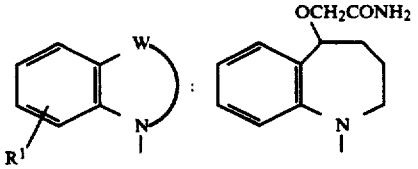

R²: H

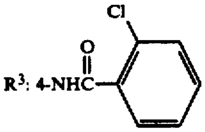

Crystalline form: White powder
Recrystallization solvent: Ethyl acetate/n-hexane
Melting Point: 196–197° C.
Form: Free
Example 594
Structure TABLE 3-continued

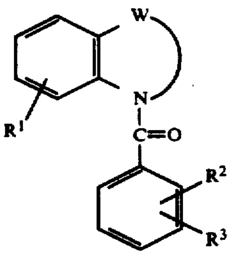

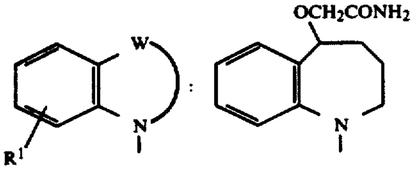

$R^2$: H

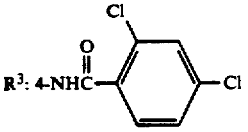

Crystalline form: Colorless amorphous
NMR analysis: 96)
Form: Free

Example 595

Structure

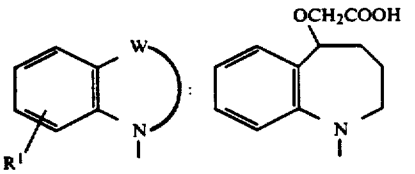

$R^2$: H

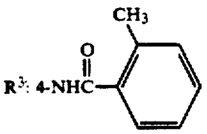

Crystalline form: White powder
Recrystallization solvent: Ethanol/water
Melting Point: 188–189° C.
Form: Free Example 596

Structure

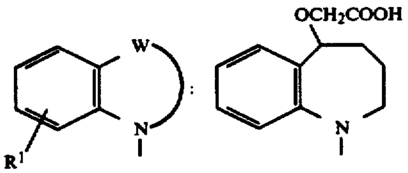

$R^2$: H

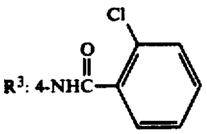

Crystalline form: Colorless amorphous
NMR analysis: 97)
Form: Free

Example 597

TABLE 3-continued

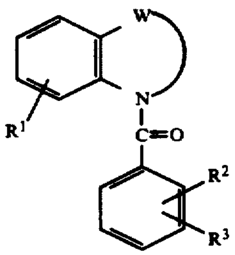

Structure

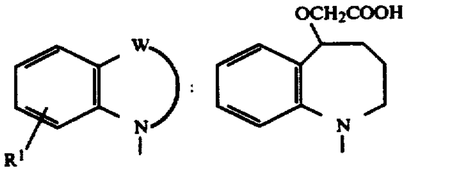

$R^2$: H

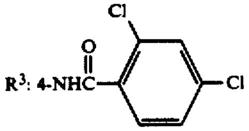

Crystalline form: Colorless amorphous
NMR analysis: 98)
Form: Free

Example 598

Structure

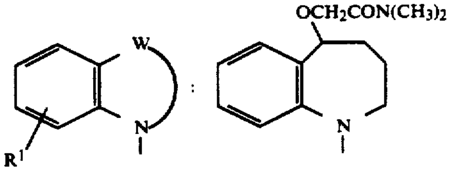

$R^2$: H

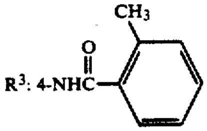

Crystalline form: Colorless prisms
Recrystallization solvent: Ethyl acetate/n-hexane
Melting Point: 203–204° C.
Form: Free Example 599

Structure

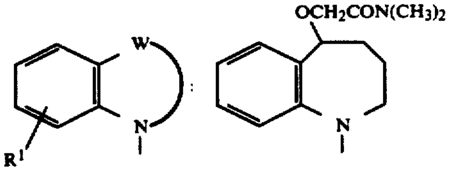

$R^2$: H

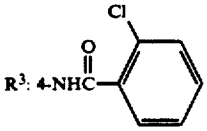

Crystalline form: White powder
Recrystallization solvent: Ethyl acetate/n-hexane TABLE 3-continued

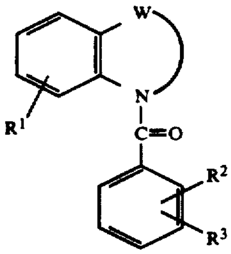

Melting Point: 196-197° C.
Form: Free
Example 600
Structure

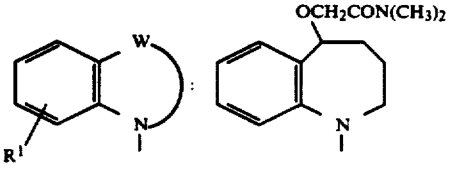

$R^2$: H

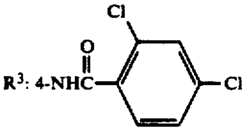

Crystalline form: Colorless amorphous
NMR analysis: 99)
Form: Free
Example 601
Structure

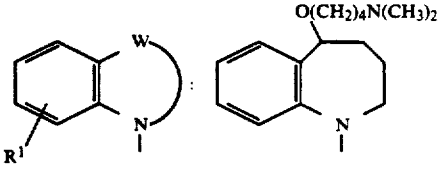

$R^2$: H

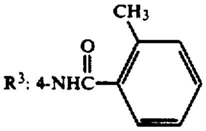

Crystalline form: Colorless amorphous
NMR analysis: 100)
Form: Free
Example 602
Structure

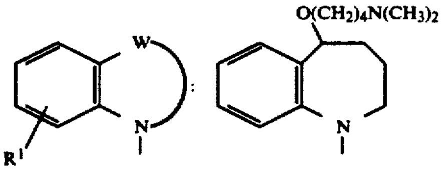

$R^2$: H

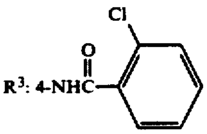

TABLE 3-continued

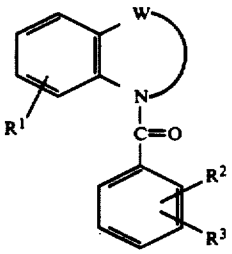

Crystalline form: Colorless amorphous
NMR analysis: 101)
Form: Free
Example 603
Structure

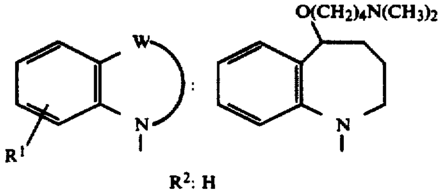

$R^2$: H

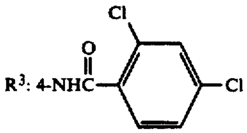

Crystalline form: Colorless amorphous
NMR analysis: 102)
Form: Free
Example 604
Structure

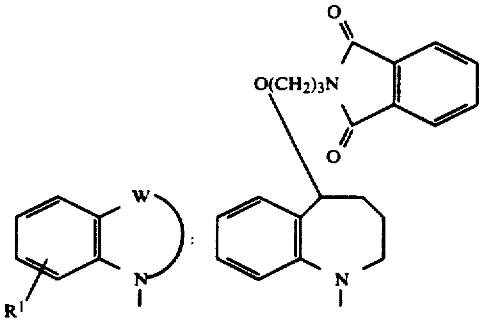

$R^2$: H

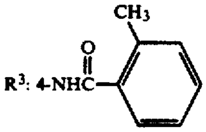

Crystalline form: Colorless amorphous
NMR analysis: 103)
Form: Free
Example 605
Structure

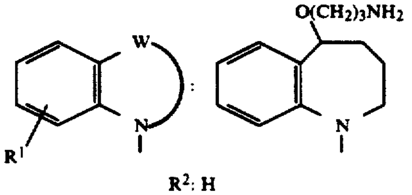

$R^2$: H

TABLE 3-continued

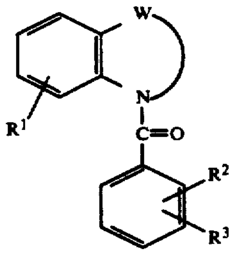

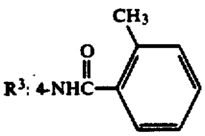

Crystalline form: Colorless amorphous
NMR analysis: 104)
Form: Free
Example 606
Structure

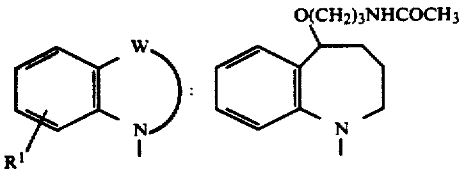

$R^2$: H

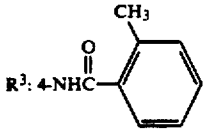

Crystalline form: Colorless amorphous
NMR analysis: 105)
Form: Free
Example 607
Structure

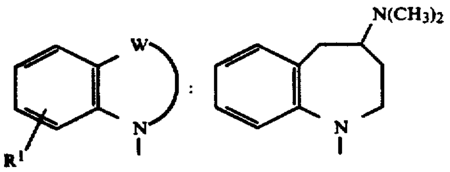

$R^2$: H

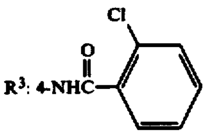

Crystalline form: Colorless needles
Recrystallization solvent: Ethanol
Melting Point: 169-171° C.
Form: Free
Example 608
Structure TABLE 3-continued

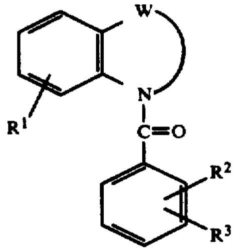

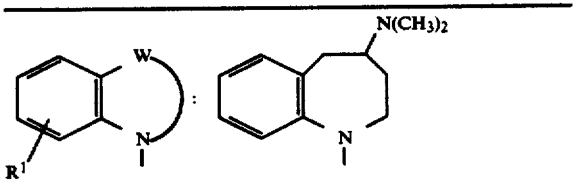

$R^2$: H

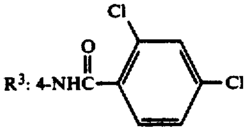

Crystalline form: Colorless needles
Recrystallization solvent; Ethanol/diethyl ether
Melting Point: 178-181° C.
Form: Free
Example 609
Structure

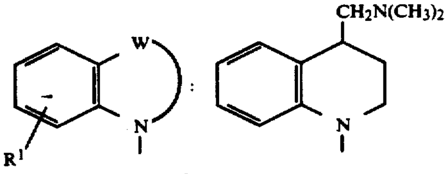

$R^2$: H

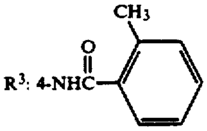

Crystalline form: White powder
Recrystallization solvent: Ethanol
Melting Point: 187-188° C.
Form: Free
Example 610
Structure

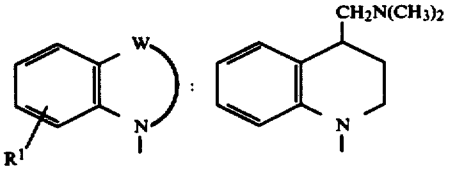

$R^2$: H

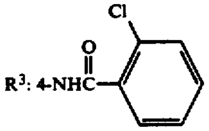

Crystalline form: White powder
Recrystallization solvent: Ethanol
Melting Point: 181-183° C.

TABLE 3-continued

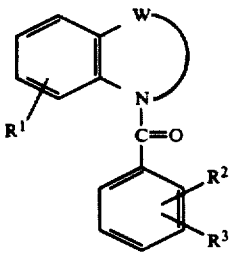

Form: Free

Example 611

Structure

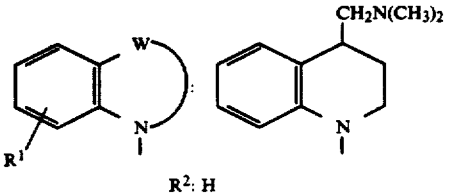

$R^2$: H

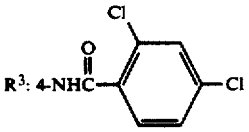

Crystalline form: White powder
Recrystallization solvent: Ethanol
Melting Point: 124–127° C.
Form: Free Example 612

Structure

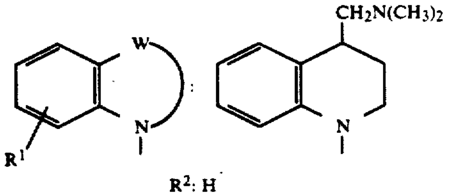

$R^2$: H

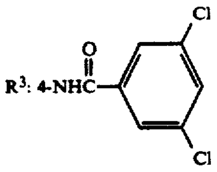

Crystalline form: White powder
Recrystallization solvent: Ethanol
melting Point: 179–181° C.
Form: Free Example 613

Structure

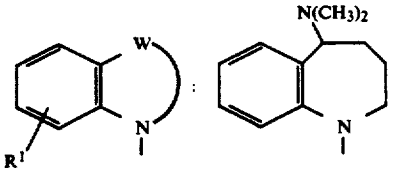

$R^2$: H

TABLE 3-continued

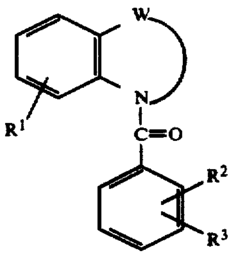

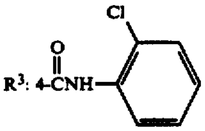

Crystalline form: White powder
Recrystallization solvent: Ethanol
Melting Point: 148–150° C.
Form: Free Example 614

Structure

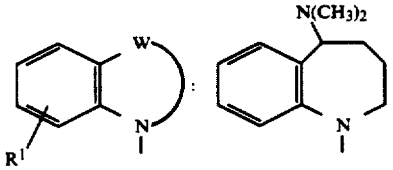

$R^2$: H

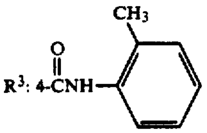

Crystalline form: Colorless amorphous
NMR analysis: 106)
Form: Free

Example 615

Structure

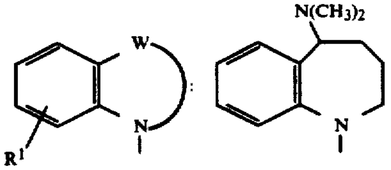

$R^2$: Cl

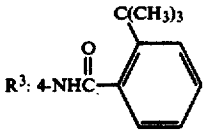

Crystalline form: White powder
Recrystallization solvent: Ethanol
Melting Point: 219–220° C.
Form: Free Example 616

Structure

TABLE 3-continued

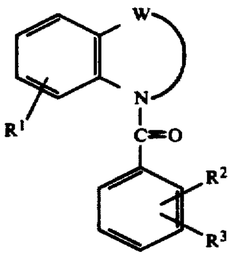

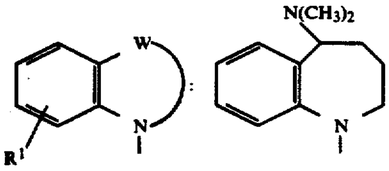

$R^2$: H

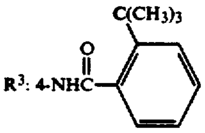

Crystalline form: White powder
Recrystallization solvent: Ethanol
Melting Point: 226–228° C.
Form: Free
Example 617
Structure

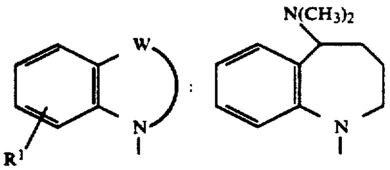

$R^2$: 3-$OCH_3$

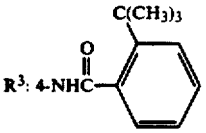

Crystalline form: Colorless amorphous
NMR analysis: 107)
Form: Free
Example 618
Structure

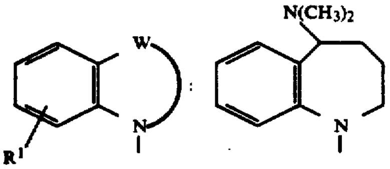

$R^2$: 3-$OCH_3$

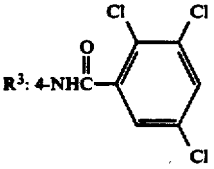

Crystalline form: Colorless amorphous
NMR analysis: 108)
Form: Free
Example 619
Structure TABLE 3-continued

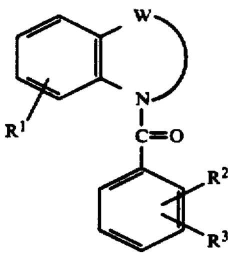

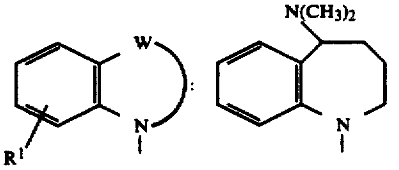

$R^2$: 3-$OCH_3$

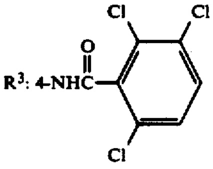

Crystalline form: Colorless amorphous
NMR analysis: 109)
Form: Free
Example 620
Structure

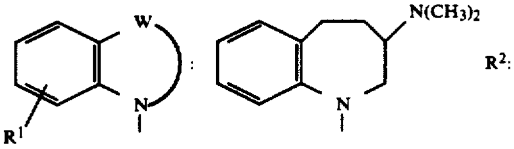

$R^2$: H

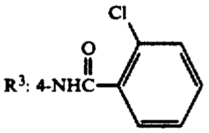

Crystalline form: Colorless amorphous
NMR analysis: 110)
Form: Free
Example 621
Structure

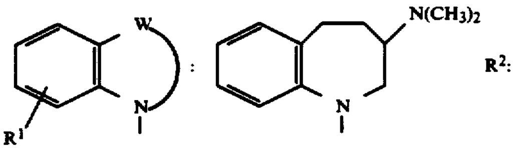

$R^2$: H

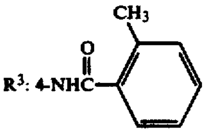

Crystalline form: Colorless amorphous
NMR analysis: 111)
Form: Free
Example 622
Structure TABLE 3-continued

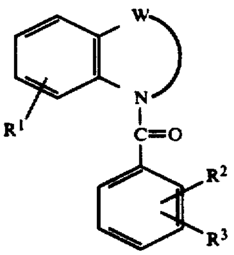

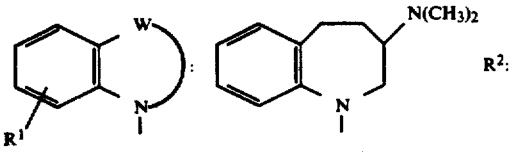

R²: H

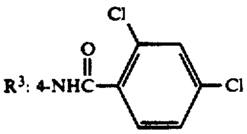

Crystalline form: Colorless amorphous
NMR analysis: 112)
Form: Free
Example 623
Structure

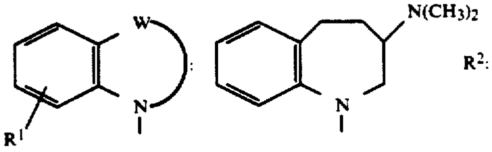

R²: 3-OCH₃

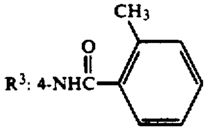

Crystalline form: Colorless amorphous
NMR analysis: 113)
Form: Free
Example 624
Structure

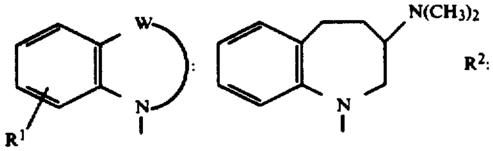

R²: 3-OCH₃

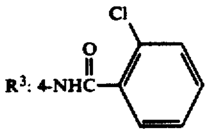

Crystalline form: Colorless amorphous
NMR analysis: 114)
Form: Free
Example 625
Structure TABLE 3-continued

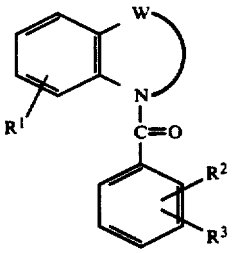

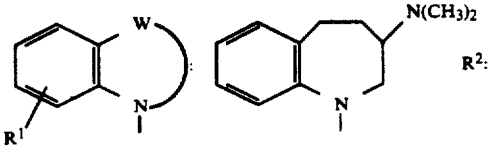

R²: 3-OCH₃

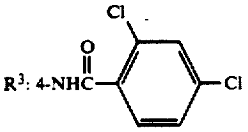

Crystalline form: Colorless amorphous
NMR analysis: 115)
Form: Free
Example 626
Structure

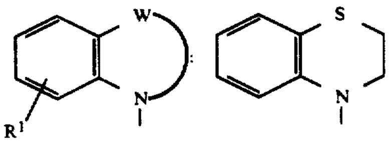

R²: H

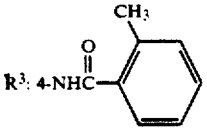

Crystalline form: White powder
Recrystallization solvent: Diethyl ether/dichloromethane
Melting Point: 183-184° C.
Form: Free
Example 627
Structure

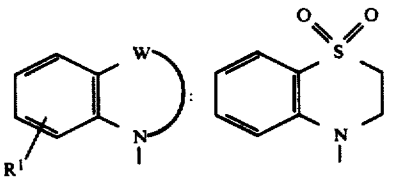

R²: H

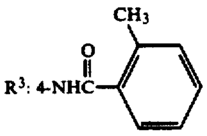

Crystalline form: White powder
Recrystallization solvent: Diethyl ether/dichloromethane
Melting Point: 219-220° C.
Form: Free
Example 628
Structure TABLE 3-continued

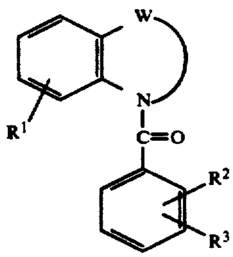

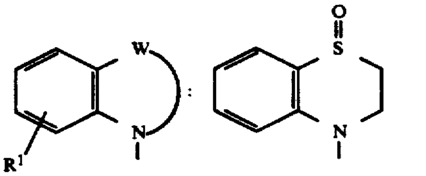

R²: H

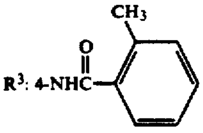

Crystalline form: White powder
Recrystallization solvent: Diethyl ether/dichloromethane
Melting Point: 240–241° C.
Form: Free
Example 629
Structure

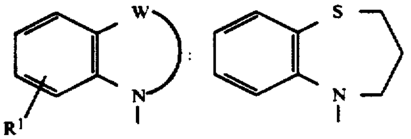

R²: H

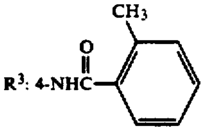

Crystalline form: White powder
Recrystallization solvent: Diethyl ether/dichloromethane
Melting Point: 205–206° C.
Form: Free
Example 630
Structure

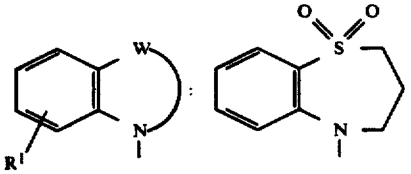

R²: H

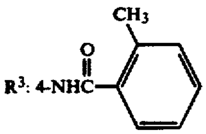

Crystalline form: White powder
Recrystallization solvent: Diethyl ether/dichloromethane
Melting Point: 238–239° C.
Form: Free
Example 631
Structure TABLE 3-continued

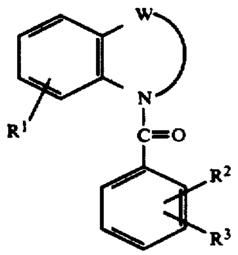

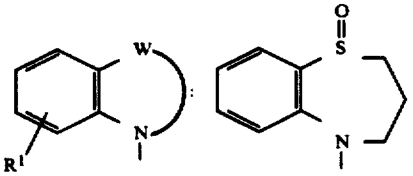

R²: H

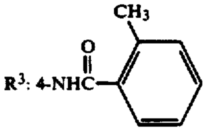

Crystalline form: White powder
Recrystallization solvent: Diethyl ether/dichloromethane
Melting Point: 233–234° C.
Form: Free
Example 632
Structure

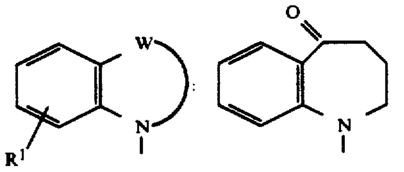

R²: 2-Cl

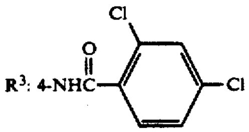

Crystalline form: Colorless amorphous
NMR analysis: 116)
Form: Free
Example 633
Structure

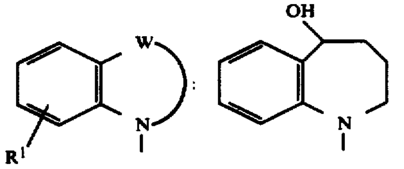

R²: 2-Cl

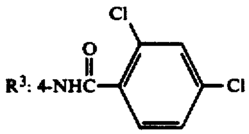

Crystalline form: White powder
Recrystallization solvent: Diethyl ether/dichloromethane
Melting Point: 259.5–260.5° C.
Form: Free 80) $^{1}H$-NMR($CDCl_3$)δ; 1.24–5.26(18H, m), 6.39–7.59 (13H, m)

TABLE 3-continued

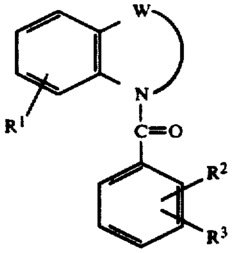

81) $^1$H-NMR(CDCl$_3$)δ; 1.70-2.10(m, 2H), 2.15-2.60(m, 12H), 3.56(t, J=5.8Hz, 1H), 3.65-3.95(m, 4H) 4.05-4.25(m, 1H), 6.64(d, J=7.7Hz, 1H), 6.85-7.50(m, 9H), 8.11(brs, 1H), 8.42(d, J=8.8Hz, 1H)

82) $^1$H-NMR(CDCl$_3$)δ; 2.00-2.90(m, 3H), 2.49(s, 3H), 3.70-3.90(m, 1H), 4.00-4.20(m, 1H), 4.80-5.00(m, 1H), 6.89(d, J=6.-3Hz, 1H), 6.95-7.65(m, 11H), 7.70(brs, $^1$H)

83) $^1$H-NMR(CDCl$_3$)δ; 1.95-2.90(m, 2H), 2.48(s, 3H), 2.55(s, 3H), 3.77(t, J=5.1Hz, 1H), 3.92(t, J=6.7Hz, 2H), 6.72(d, J=8.0Hz, 1H), 6.90-7.15 (m, 2H), 7.15-7.70(m, 9H), 7.81(brs, 1H)

84) $^1$H-NMR(CDCl$_3$)δ; 2.11(s, 3H), 2.20-2.40(m, 2H), 2.50(s, 3H), 3.80-4.10(m, 1H), 4.12-4.25(m, 1H), 6.03(t, J=4.3Hz, 1H), 6.80-7.65(m, 12H), 7.80 (brs, 1H)

85) $^1$H-NMR(CDCl$_3$)δ; 1.80-2.40(m, 5H), 2.45(s, 3H), 2.81(s, 3H), 3.55-3.82(m, 1H), 4.15-4.40(m, 1H), 5.90-6.10(m, 1H), 6.80-7.80(m, 12H), 8.67(brs, 1H)

86) $^1$H-NMR(CDCl$_3$)δ; 1.95-2.35(2H, m), 2.75-3.0(2H, m), 3.0-5.4(2H, m), 6.55-7.95(11H, m), 8.09(1H, s)

87) $^1$H-NMR(DMSO-d$_6$)δ; 1.85-2.2(2H, m), 2.7-2.95(2H, m), 3.5-5.0(2H, m), 6.8-7.8(12H, m), 10.60(1H, s)

88) $^1$H-NMR(CDCl$_3$)δ; 0.8-1.1(3H, m), 1.2-2.35(6H, m), 2.35-5.25(6H, m), 6.63(1H, d, J=7.7Hz), 6.8-7.6(9H, m), 7.67(1H, d, J=8.2Hz), 7.9-8.15(1H, m)

89) $^1$H-NMR(CDCl$_3$)δ; 1.7-2.9(7H, m), 4.5-6.5(3H, m), 6.55-6.75(1H, m), 6.85-7.6(12H, m)

90) $^1$H-NMR(CDCl$_3$)δ; 1.65-3.1(7H, m), 4.7-6.6(3H, m), 6.6-6.8(1H, m), 6.85-7.65(12H, m)

91) $^1$H-NMR(CDCl$_3$)δ; 1.8-2.4(2H, m), 2.86(2H, t, J=6 Hz), 3.1-5.15(2H, m), 6.85-7.5(8H, m), 7.5-7.85 (3H, m), 8.19(1H, s)

92) $^1$H-NMR(CDCl$_3$)δ; 1.46-2.28(4H, m), 2.37(3H, s), 2.58-2.90(1H, m), 4.57-5.10(2H, m), 6.59(1H, d, J=7.6Hz), 6.91-7.52(11H, m), 7.62(1H, d, J=7.6 Hz), 8.10-8.40(1H, m)

93) $^1$H-NMR(CDCl$_3$)δ; 1.45-1.91(2H, m), 1.91-2.65(2H, m), 2.65-2.90(1H, m), 4.63-5.22(2H, m), 6.63(1H, d, J=7.4Hz), 7.34-8.03(1$^1$H, m), 10.16-10.44(1H, m)

94) $^1$H-NMR(CDCl$_3$)δ; 1.08-1.47(3H, m), 1.50-1.97(2H, m), 1.97-2.48(2H, m), 2.65-3.02(1H, m), 4.00-4.43 (4H, m), 4.52-5.15(2H, m), 6.50-6.79(1H, m), 6.90-7.70(10H, m), 8.26-8.60(1H, m)

95) $^1$H-NMR(CDCl$_3$)δ; 1.56-2.67(4H, m), 2.46(3H, s), 2.67-3.03(1H, m), 3.82-4.32(2H, m), 4.45-5.15 (2H, m), 5.43-5.83(1H, m), 6.20-6.45(1H, m), 6.50-6.86(2H, m), 6.86-7.70(10H, m), 7.76-8.10 (1H, m)

96) $^1$H-NMR(CDCl$_3$)δ; 1.52-1.90(2H, m), 1.90-2.54(2H, m), 2.67-3.05(1H, m), 3.74-4.32(2H, m), 4.38-5.17 (2H, m), 5.52-5.98(1H, brs), 6.20-6.48(1H, brs), 6.55-6.84(1H, m), 6.89-7.55(9H, m), 7.55-7.77 (1H, m), 8.15-8.86(1H, brs)

97) $^1$H-NMR(DMSO-d$_6$)δ; 1.26-2.49(4H, m), 2.57-2.93 (1H, m), 4.07-4.43(2H, m), 4.44-4.98(2H, m), 6.62-6.87(1H, m), 6.92-7.80(11H, m), 10.57(1H, s), 12.74(1H, s)

98) $^1$H-NMR(CDCl$_3$)δ; 1.52-1.89(2H, m), 1.89-2.56(2H, m), 2.65-3.02(1H, m), 3.90-4.40(2H, m), 4.40-5.07 (2H, m), 6.58-6.78(1H, m), 6.90-7.70(10H, m), 8.57-8.81(1H, brs)

99) $^1$H-NMR(CDCl$_3$)δ; 1.49-1.89(2H, m), 1.89-2.60(2H, m), 2.63-3.23(7H, m), 4.04-4.49(2H, m), 4.52-5.21 (2H, m), 6.52-6.80(1H, m), 6.89-7.84(10H, m), 8.08-8.52(1H, m)

100) $^1$H-NMR(CDCl$_3$)δ; 1.41-1.86(6H, m), 1.86-2.53(4H, m), 2.25(3H, s), 2.29(3H, s), 2.43(3H, s), 2.60-2.97 (1H, m), 3.36-3.77(2H, m), 4.40-5.10(2H, m), 6.54-6.72(1H, m), 6.88-7.67(11H, m), 8.27-8.58 (1H, m)

TABLE 3-continued

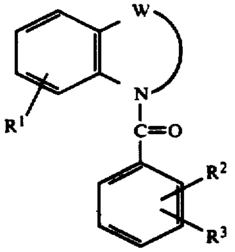

101) $^1$H-NMR(CDCl$_3$)δ; 1.44-1.85(6H, m), 1.85-2.61(4H, m), 2.32(3H, s), 2.35(3H, s), 2.61-3.00(1H, m), 3.33-3.76(2H, m), 4.40-5.20(2H, m), 6.57-6.75 (1H, m), 6.90-7.70(11H, m), 8.50-8.93(1H, m)

102) $^1$H-NMR(CDCl$_3$)δ; 1.49-2.04(6H, m), 2.10-3.02(5H, m), 2.47(6H, s), 3.40-3.88(2H, m), 4.30-5.17(2H, m), 6.59-6.78(1H, m), 6.93-7.76(10H, m), 8.75-9.40 (1H, m)

103) $^1$H-NMR(CDCl$_3$)δ; 1.47-2.47(6H, m), 2.44(3H, s), 2.62-3.03(1H, m), 3.47-4.03(4H, m), 4.48-5.17 (2H, m), 6.51-6.74(1H, m), 6.87-7.62(11H, m), 7.62-7.77(2H, m), 7.77-8.03(3H, m)

104) $^1$H-NMR(CDCl$_3$)δ1.42-2.32(6H, m), 2.44(3H, s), 2.57-2.97(1H, m), 3.12-3.83(4H, m), 4.39-5.13 (2H, m), 6.50-6.71(1H, m), 6.90-7.73(12H, m)

105) $^1$H-NMR(CDCl$_3$)67 ; 1.50-2.63(9H, m), 2.47(3H, s), 2.66-3.07(1H, m), 3.10-3.88(4H, m), 4.40-5.17 (2H, m), 5.87-6.23(1H, brs), 6.60-6.79(1H, m), 6.94-7.60(11H, m), 7.67(1H, s)

106) $^1$H-NMR(CDCl$_3$)δ; 1.20-2.53(13H, m), 2.63-2.82, 3.00-3.13, 3.50-3.67, 4.05-4.23(total 3H, m), 6.55-8.00 (13H, m)

107) $^1$H-NMR(CDCl$_3$)δ; 1.41(9H, s), 1.20-2.55(10H, m), 3.42-4.20(5.8H, m), 5.00-5.20(0.2H, m), 6.60-7.67 (10H, m), 7.99(1H, brs), 8.26(1H, d, J=8.4Hz)

108) $^1$H-NMR(CDCl$_3$)δ; 1.2-3.0(10H, m), 3.0-5.2(6H, m), 6.5-7.7(8H, m), 8.22(1H, d, J=8.4Hz), 8.36 (1H, s)

109) $^1$H-NMR(CDCl$_3$)δ; 1.2-3.0(10H, m), 3.0-5.2(6H, m), 6.3-7.7(10H, m)

110) $^1$H-NMR(CDCl$_3$)δ; 1.5-1.7(1H, m), 2.2-2.7(2H, m), 2.40(6H, s), 2.7-3.0(3H, m), 5.1-5.3(1H, m), 6.67(1H, d, J=7.7Hz), 6.9-7.5(10H, m), 7.69(1H, d, J=6Hz), 8.06(1H, s)

111) $^1$H-NMR(CDCl$_3$)δ; 1.4-1.7(1H, m), 2.1-2.7(2H, m), 2.40(6H, s), 2.44(3H, s), 2.7-3.0(3H, m), 5.1-5.3 (1H, m), 6.68(1H, d, J=7.8Hz), 6.9-7.5(11H, m), 7.66(1H, s)

112) $^1$H-NMR(CDCl$_3$)δ; 1.5-1.8(1H, m), 2.1-2.7(2H, m), 2.38(6H, s), 2.7-3.0(3H, m), 5.1-5.3(1H, m), 6.66(1H, d, J=7.7Hz), 6.9-7.0(9H, m), 7.57(1H, d, J=8.3Hz), 8.42(1H, s)

113) $^1$H-NMR(CDCl$_3$)δ; 1.5-1.8(1H, m), 2.1-2.7(2H, m), 2.41(6H, s), 2.48(3H, s), 2.7-3.0(3H, m), 3.68 (3H, s), 5.2-5.4(1H, m), 6.6-6.8(2H, m), 6.9-7.5 (8H, m), 8.09(1H, s), 8.26(1H, d, J=8.1Hz)

114) $^1$H-NMR(CDCl$_3$)δ; 1.5-1.7(1H, m), 2.1-2.3(1H, m), 2.41(6H, s), 2.4-2.6(1H, m), 2.8-3.0(3H, m), 3.71(3H, s), 5.2-5.4(1H, m), 6.6-6.8(2H, m), 6.9-7.5(7H, m), 7.7-7.8(1H, m), 8.27(1H, d, J=8.4Hz), 8.57(1H, s)

115) $^1$H-NMR(CDCl$_3$)δ; 1.5-1.7(1H, m), 2.1-2.7(2H, m), 2.41(6H, s), 2.7-3.0(3H, m), 3.71(3H, s), 5.2-5.4 (1H, m), 6.6-7.6(8H, m), 7.70(1H, d, J=8.3 Hz), 8.24(1H, d, J=8.5Hz), 8.59(1H, s)

116) $^1$H-NMR(CDCl$_3$)δ; 1.8-2.3(3H, m), 2.7-2.9(2H, m), 3.5-3.7(1H, m), 6.8-8.0(10H, m), 8.7-9.1(1H, br)

EXAMPLE 634

To a mixture of 5-oxo-1-[4-(3,5-dichlorobenzoylamino)benzoyl]-2,3,4,5-tetrahydro-1H-benzazepine (4 g) and pyridine (50 ml) is added hydroxylamine hydrochloride (1.84 g) and the mixture is refluxed for 2.5 hours. The reaction solution is concentrated and water is added to the resulting residue. The precipitated crystal is collected by filtration, and recrystallized from dioxane/water to give 5-hydroxyimino-1-[4-(3,5-dichlorobenzoylamino)benzoyl]-2,3,4,5-tetrahydro-1H-benzazepine (2 g) as white powder, m.p. 272°-273° C.

EXAMPLE 635

5-Chloro-1-[4-(2-methylbenzoylamino)benzoyl]-2,3,4,5-tetrahydro-1H-benzazepine (0.8 g) is dissolved in dimethylformamide and thereto is added sodium azide (0.18 g) at room temperature. The mixture is stirred at room temperature overnight, and further reacted with heating at 50° C for 5 hours. Water is added to the reaction mixture and the precipitated crystal is collected by filtration to give 5-azido-1-[4-(2-methylbenzoylamino)benzoyl]-2,3,4,5-tetrahydro-1H-benzazepine (0.68 g) as light brown powder $^1$H-NMR($CDCl_3$) δ; 1.65-3.1 (8H, m), 4.7-6.6 (3H, m), 6.6-6.8 (1H, m), 6.85-7.65 (12H, m).

EXAMPLE 636

5-Azido-1-[4-(2-methylbenzoylamino)benzoyl]-2,3,4,5-tetrahydro-1H-benzazepine (0.63 g) is dissolved in ethanol and thereto is added 10 % Pd-C (0.1 g). The mixture is subjected to catalytic hydrogenation at room temperature under 1 atm. of hydrogen. Pd-C is removed by filtration and the filtrate is evaporated. The resulting residue is purified by silica gel column chromatography (eluent; dichloromethane : methanol =50 : 1), and recrystallized from diethyl ether to give 5-amino-1-[4-(2-methylbenzoylamino)benzoyl]-2,3,4,5-tetrahydro-1H-benzazepine (0.34 g) as white powder, m.p. 198.5°-199.5° C.

EXAMPLE 637

To 5-hydroxy-1-[4-(2-methylbenzoylamino)benzoyl]-2,3,4,5-tetrahydro-1H-benzazepine (0.58 g) are added acetic anhydride (8.0 ml) and pyridine (2.0 ml). The mixture is stirred at room temperature for 1 hour. Water is added to the reaction mixture and the precipitated crystal is collected by filtration, and recrystallized from ethyl acetate/n-hexane to give 5-acetyloxy-1-[4-(2-methylbenzoylamino)benzoyl]-2,3,4,5-tetrahydro-1H-benzazepine (0.56 g) as white powder, m.p. 193°-194° C.

EXAMPLE 638

5-Ethoxycarbonylmethoxy-1-[4-(2-methylbenzoylamino)benzoyl]-2,3,4,5-tetrahydro-1H-benzazepine (1.00 g) is dissolved in methanol (35 ml) and thereto are added aqueous ammonia (20 ml) and ammonium chloride (0.50 g). The mixture is heated at 100° C. for 3.5 hours in a sealed tube. After cooling, the reaction solution is concentrated under reduced pressure and acidified with hydrochloric acid, and extracted with dichloromethane. The extract is dried over magnesium sulfate and the solvent is distilled off. The resulting residue is purified by silica gel column chromatography (eluent; dichloromethane : methanol =15 : 1) to give 5-carbamoylmethoxy-1-[4-(2-methylbenzoylamino)benzoyl]-2,3,4,5-tetrahydro-1H-benzazepine (0.68 g) as colorless amorphous.

$^1$H-NMR($CDCl_3$) δ; 1.56-2.67 (4H, m), 2.46 (3H, s), 2.67-3.03 (1H, m), 3.82-4.32 (2H, m), 4.45-5.15 (2H, m), 5.43-5.83 (1H, m), 6.20-6.45 (1H, m), 6.50-6.86 (2H, m), 6.86-7.70 (10H, m), 7.76-8.10 (1H, m).

Using the suitable starting materials, the compounds of the above Examples 593 and 594 are obtained in the same manner as in Example 638.

EXAMPLE 639

5-Ethoxycarbonylmethoxy-1-[4-(2,4-dichlorobenzoylamino)benzoyl]-2,3,4,5-tetrahydro-1H-benzazepine (0.94 g) is dissolved in ethanol (100 ml) and thereto is added 5N aqueous sodium hydroxide solution (0.50 ml). The mixture is stirred at room temperature for 2 hours. The reaction solution is concentrated under reduced pressure and to the resulting residue is added diluted hydrochloric acid and then extracted with dichloromethane. The extract is dried over magnesium sulfate and the solvent is distilled off. The resulting residue is washed with n-hexane and collected by filtration to give 5-carboxymethoxy-1-[4-(2,4-dichloro-benzoylamino)benzoyl]-2,3,4,5-tetrahydro-1H-benzazepine (0.79 g) as colorless amorphous.

$^1$H-NMR($CDCl_3$) δ; 1.52-1.89 (2H, m), 1.89-2.56 (2H, m), 2.65-3.02 (1H, m), 3.90-4.40 (2H, m), 4.40-5.07 (2H, m), 6.58-6.78 (1H, m), 6.90-7.70 (10H, m), 8.57-8.81 (1H, brs).

Using the suitable starting materials, the compounds of the above Examples 595 and 596 are obtained in the same manner as in Example 639.

EXAMPLE 640

5-Carboxymethoxy-1-[4-(2-methylbenzoylamino)-benzoyl]-2,3,4,5-tetrahydro-1H-benzazepine (0.55 g) is dissolved in dimethylformamide (20 ml) and thereto are added dimethylamine hydrochloride (0.20 g) and diethyl chlorophosphate (0.33 g). To the mixture is added triethylamine (1.0 ml) under ice-cooling, and the mixture is stirred under ice-cooling for 30 minutes, and at room temperature for more 2 hours. Water is added to the reaction solution and the precipitated crystal is collected by filtration and recrystallized from ethyl acetate/n-hexane to give 5-dimethylaminocarbonylmethoxy-1-[4-(2-methylbenzoylamino)benzoyl]-2,3,4,5-tetrahydro-1H-benzazepine (0.50 g) as colorless prisms, m.p. 203°-204° C.

Using the suitable starting materials, the compounds of the above Example 599 and 600 are obtained in the same manner as in Example 640.

EXAMPLE 641

5-[3-(Phthalimid-1-yl)propoxy]-1-[4-(2-methylbenzoylamino)benzoyl]-2,3,4,5-tetrahydro-1H-benzazepine (1.26 g) is dissolved in ethanol (100 ml) and thereto is added hydrazine hydrate (1.0 ml). The mixture is refluxed with stirring for 1 hour. The reaction solution is evaporated under reduced pressure and to the resulting residue is added dichloromethane. The insoluble materials are removed by filtration. The filtrate is purified by silica gel column chromatography (eluent; dichloromethane: methanol : aqueous ammonia=70 : 10 : 1) to give 5-(3-aminopropoxy)-1-[4-(2-methylbenzoylamino)-benzoyl]-2,3,4,5-tetrahydro-1H-benzazepine (0.70 g) as colorless amorphous.

$^1$H-NMR($CDCl_3$) δ; 1.42-2.32(6H, m), 2.44 (3H, s), 2.57-2.97 (1H, m), 3.12-3.83 (4H, m), 4.39-5.13 (2H, m), 6.50-6.71 (1H, m), 6.90-7.73 (12H, m).

EXAMPLE 642

A solution of 5-dimethylamino-1-[3-methoxy-4-(2-methylbenzoylamino)benzoyl]-2,3,4,5-tetrahydro-1H-benzazepine (0.50 g) in dichloromethane (30 ml) is added dropwise to a solution of 1M boron tribromide in dichloromethane (5.46 ml) at −45° C. After completion of the dropping, the mixture is stirred for 1 day while the temperature of the reaction mixture is gradually raised to room temperature. To the reaction solution is added water and the mixture is neutralized with sodium hydrogen carbonate, and extracted with dichloromethane. The extract is washed with saturated saline solution and dried over magnesium sulfate. The solvent is distilled off and the resulting residue is purified by silica gel column chromatography (eluent; chloroform:methanol=500:1), and recrystallized from methanol/diethyl ether to give 5-dimethylamino-1-[3-hydroxy-4-(2-methylbenzoylamino)benzoyl]-2,3,4,5-tetrahydro-1H-benzazepine (0.33 g) as white powder, m.p. 201.5°-202.5° C.

Using the suitable starting materials, the compounds of the above Examples 10, 32, 343, 356, 535, 555 and 556 are obtained in the same manner as in Example 642.

EXAMPLE 643

To a solution of 4-[4-(2-methylbenzoylamino)benzoyl]-3,4-dihydro-2H-1,4-benzazepine (0.5 g) in dichloromethane (10 ml) is added m-chloroperbenzoic acid (0.58 g) under ice-cooling, and the mixture is stirred at room temperature for 6 hours. The above reaction solution is poured into an aqueous solution of sodium carbonate (0.6 g) in water (10 ml) and the mixture is extracted with dichloromethane. The extract is washed with water, and dried over magnesium sulfate. The solvent is distilled off under reduced pressure and the resulting residue is purified by silica gel column chromatography (eluent; dichloromethane: methanol=100 : 1), and recrystallized from diethyl ether/dichloromethane to give 4-[4-(2-methylbenzoylamino)benzoyl]-3,4-dihydro-2H-1,4-benzothiazine-1,1-dioxide (0.49 g) as white powder, m.p. 219°-220° C.

Using the suitable starting materials, the compound of the above Example 630 is-obtained in the same manner as in Example 643.

EXAMPLE 644

To a suspension of 4-[4-(2-methylbenzoylamino)benzoyl]-3,4-dihydro-2H-1,4-benzothiazine (0.5 g) in methanol (15 ml) is added an aqueous solution of sodium metaperiodate (0.28 g) in water (2.5 ml) and the mixture is stirred at room temperature for 72 hours. Water is added to the reaction solution and extracted with dichloromethane. The extract is dried over magnesium sulfate and the solvent is distilled off under reduced pressure. The resulting residue is purified by silica gel column chromatography (eluent; dichloromethane : methanol =100 : 1), and recrystallized from dichloromethane/diethyl ether to give 4-[4 (2-methylbenzoylamino)benzoyl]-3,4-dihydro-2H-1,4-benzothiazin-1-oxide (0.34 g) as white powder, m.p. 240°-241° C.

Using the suitable starting materials, the compound of the above Example 631 is obtained in the same manner as in Example 644.

EXAMPLE 645

5-Hydroxy-1-[4-(2-methylbenzoylamino)benzoyl]-2,3,4,5-tetrahydro-1H-benzazepine (3.57 g) is dissolved in dichloromethane (30 ml) and pyridine (1.1 ml), and thereto is added dropwise methanesulfonyl chloride (0.9 ml) in small portions at 0° C. Then, the mixture is stirred at room temperature for 3 days. The solvent is distilled off and the resulting residue is poured into ice-water. The precipitated crystal is collected by filtration, washed with water, and dried to give 5-chloro-1-[4-(2-methylbenzoylamino)benzoyl]-2,3,4,5-tetrahydro-1H-benzazepine (3.10 g) as light yellow powder.

$^1$H-NMR($CDCl_3$) δ; 1.7-2.9 (8H, m), 4.5-6.5 (3H, m), 6.55-6.75 (1H, m), 6.85-7.6 (12H, m).

EXAMPLE 646

5-Hydroxy-1-[4-(2-methylbenzoylamino)benzoyl]-2,3,4,5-tetrahydro-1H-benzazepine (2.69 g) is dissolved in dimethylformamide (30 ml) and thereto are added 60% sodium hydride dispersion in mineral oil (0.44 g) and ethyl bromoacetate (1.00 ml) under ice-cooling, and the mixture is stirred at room temperature for 4 hours. The reaction solution is poured into an aqueous ammonium chloride solution under ice-cooling, and extracted with ethyl acetate. The extract is dried over magnesium sulfate and the solvent is distilled off. The resulting residue is purified by silica gel column chromatography (eluent; ethyl acetate : n-hexane=1 : 2), and recrystallized from ethyl acetate/n-hexane to give 5-ethoxycarbonylmethoxy-1-[4-(2-methylbenzoylamino)benzoyl-2,3,4,5-tetrahydro-1H-benzazepine (2.10 g) as white powder, m.p. 178°-181° C.

Using the suitable starting materials, the compounds of the above Examples 585-588 and 590-606 are obtained in the same manner as in Example 646.

EXAMPLE 647

Using the suitable starting materials, the compounds of the above Examples 546 and 578-581 are obtained in the same manner as in Example 384.

EXAMPLE 648

Using the suitable starting materials, the compounds of the above Examples 537-545, 547, 549-556, 561-564, 566, 568-571, 577, 601-603 and 607-625 are obtained in the same manner as in Example 388.

EXAMPLE 649

Using the suitable starting materials, the compounds of the above Examples 549, 568-571, 575 and 606 are obtained in the same manner as in Example 389.

EXAMPLE 650

Using the suitable starting materials, the compounds of the above Examples 537-545, 547, 549-556, 561-566, 568-571, 575, 577, 607, 608 and 613-625 are obtained in the same manner as in Example 390.

EXAMPLE 651

Using the suitable starting materials, the compounds of the above Examples 601-603, 605 and 606 are obtained in the same manner as in Example 397.

EXAMPLE 652

Using the suitable starting materials, the compound of the above Example 604 is obtained in the same manner as in Example 398.

EXAMPLE 653

Using the suitable starting materials, the following compound is obtained in the same manner as in Examples 1, 382, 388 and 390.

5-Methylamino-1-[2-chloro-4-(2-methylbenzoylamino)benzoyl]-2,3,4,5-tetrahydro-1H-benzazepine, white powder, m.p. 184.5°-185.5° C. (recrystallized from ethanol)

Using the suitable starting materials, the compounds of the following Table 4 are obtained in the same manner as in Examples 1 and 382.

TABLE 4

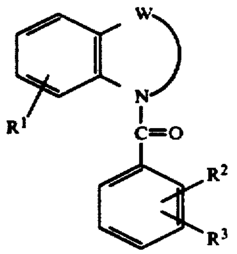

Example 654
Structure

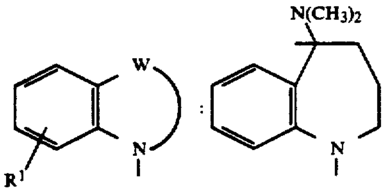

$R^2$: 2-OH

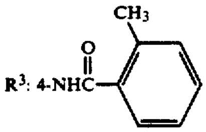

Crystalline form: White powder
Recrystallization solvent: Methanol/n-hexane
Melting Point: 193.5-196° C.
Form: Free
Example 655
Structure

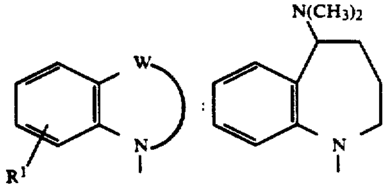

$R^2$: 2-OH

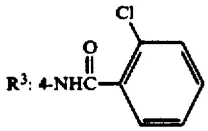

Crystalline form: White powder
Recrystallization solvent: Methanol/n-hexane
Melting Point: 195-198° C.
Form: Free
Example 656
Structure

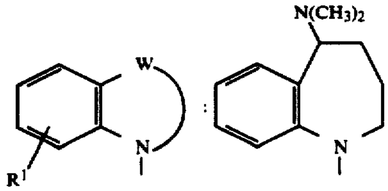

$R^2$: 2-$OC_2H_5$

TABLE 4-continued

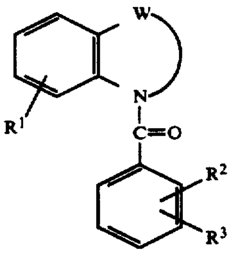

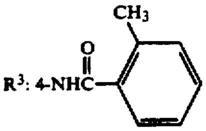

Crystalline form: White powder
Recrystallization solvent: Methanol
Melting Point: 230.5-231.5° C.
Form: Free
Example 657
Structure

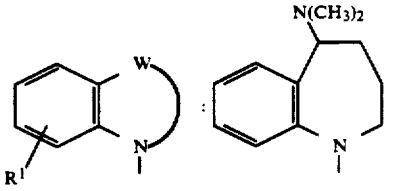

$R^2$: 2-$OC_2H_5$

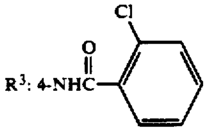

Crystalline form: White powder
Recrystallization solvent: Methanol/diethyl ether
Melting Point: 223-224.5° C.
Form: Free
Example 658
Structure

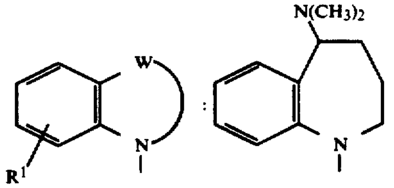

$R^2$: 2-$OC_2H_5$

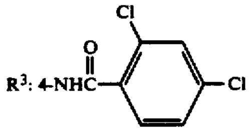

Crystalline form: White powder
Recrystallization solvent: Methanol/diethyl ether
Melting Point: 173-174° C.
Form: Free
Example 659
Structure TABLE 4-continued

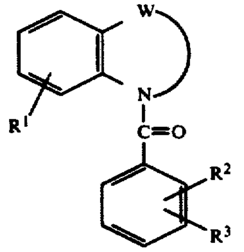

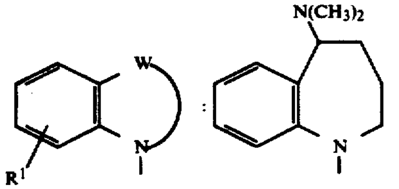

$R^2$: 2-CH3

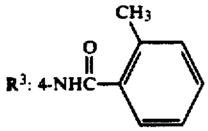

Crystalline form: White powder
Recrystallization solvent: Methanol/diethyl ether
Melting Point: 174–175° C.
Form: Free
Example 660
Structure

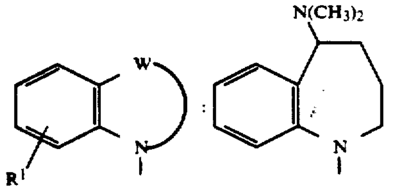

$R^2$: 2-CH3

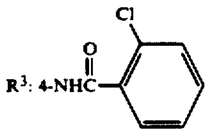

Crystalline form: White powder
Recrystallization solvent: Methanol/diethyl ether
Melting Point: 198–200° C.
Form: Free
Example 661
Structure

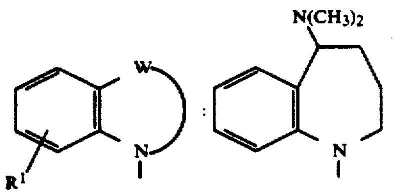

$R^2$: 2-CH3

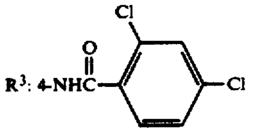

Crystalline form: White powder
Recrystallization solvent: Methanol/n-hexane

TABLE 4-continued

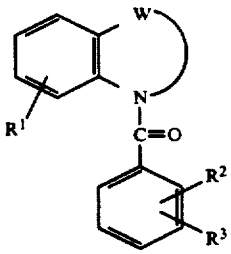

Melting Point: 149–150.5° C.
Form: Free
Example 662
Structure

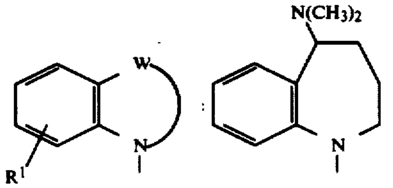

$R^2$: 2-CH3

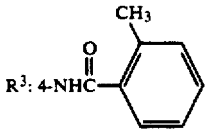

Crystalline form: White powder
Recrystallization solvent: Methanol/diethyl ether
Melting Point: 183–185° C.
Form: Free
Example 663
Structure

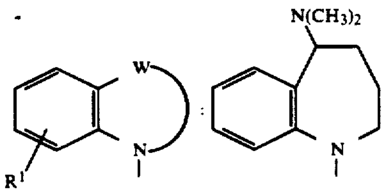

$R^2$: 2-CH3

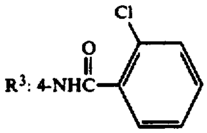

Crystalline form: White powder
Recrystallization solvent: Methanol/diethyl ether
Melting Point: 203–207° C.
Form: Free
Example 664
Structure

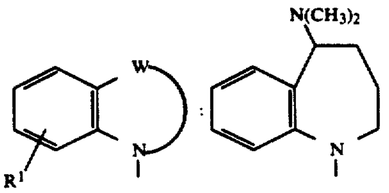

$R^2$: 2-CH3

TABLE 4-continued

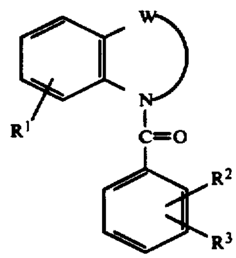

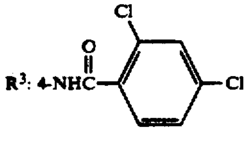

Crystalline form: White powder
Recrystallization solvent: Methanol/diethyl ether
Melting Point: 221-222° C.
Form: Free
Example 665
Structure

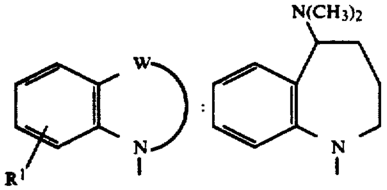

R2: 2-F

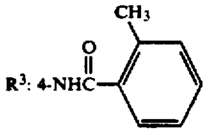

Crystalline form: White powder
Recrystallization solvent: Methanol/diethyl ether
Melting Point: 189-191° C.
Form: Free
Example 666
Structure

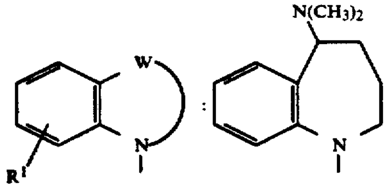

R2: 2-F

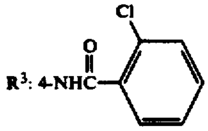

Crystalline form: White powder
Recrystallization solvent: Methanol/diethyl ether
Melting Point: 215.5-217° C.
Form: Free
Example 667
Structure TABLE 4-continued

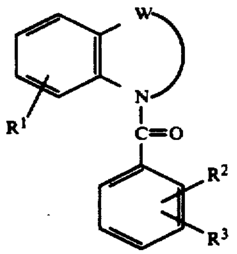

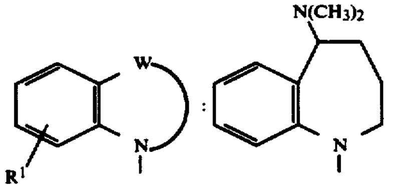

R2: 2-F

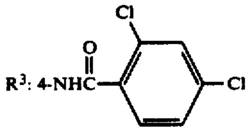

Crystalline form: White powder
Recrystallization solvent: Methanol/n-hexane
Melting Point: 192-194° C.
Form: Free
Example 668
Structure

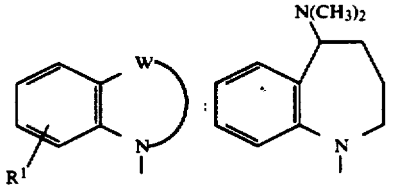

R2: 3-F

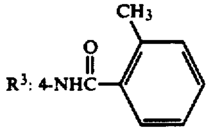

Crystalline form: White powder
Recrystallization solvent: Methanol/diethyl ether
Melting Point: 195-196° C.
Form: Free
Example 669
Structure

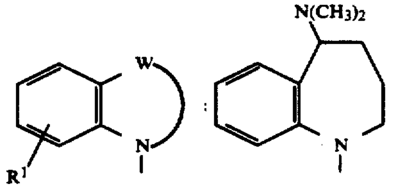

R2: 3-F

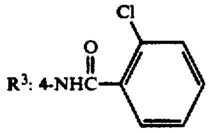

Crystalline form: White powder
Recrystallization solvent: Methanol/diethyl ether TABLE 4-continued

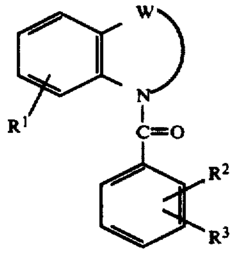

Melting Point: 202-204.5° C.
Form: Free
Example 670
Structure

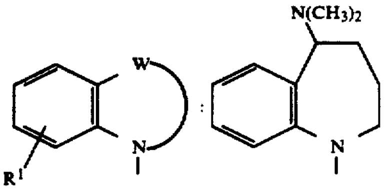

$R^2$: H

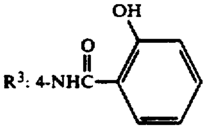

Crystalline form: White powder
Recrystallization solvent: Methanol/diethyl ether
Melting Point: 183-187° C.
Form: Free
Example 671
Structure

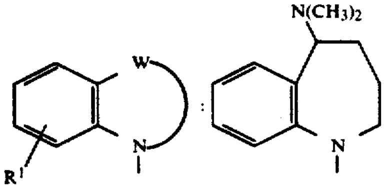

$R^2$: H

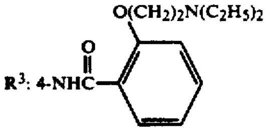

Crystalline form: White powder
Recrystallization solvent: methanol/diethyl ether
Melting Point: 120-122° C.
Form: Free
Example 672
Structure

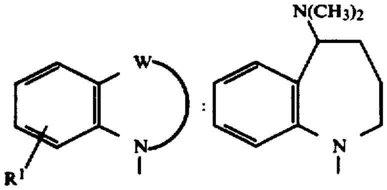

$R^2$: H

TABLE 4-continued

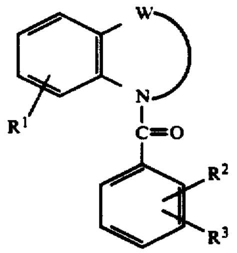

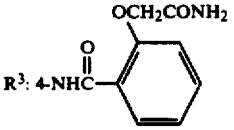

Crystalline form: White powder
Recrystallization solvent: Chloroform/diethyl ether
Melting Point: 208-210° C.
Form: Free
Example 673
Structure

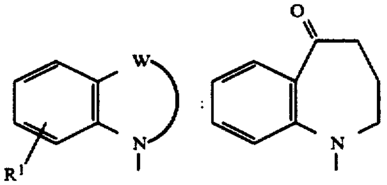

$R^2$: 2-$OCH_3$

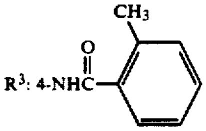

Crystalline form: White powder
Recrystallization solvent: Methanol/diethyl ether
Melting Point: 182-183° C.
Form: Free
Example 674
Structure

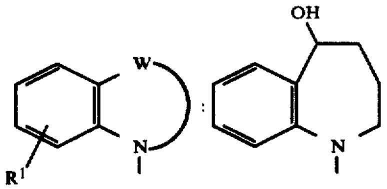

$R^2$: 2-$OCH_3$

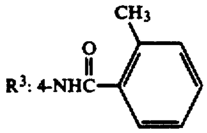

Crystalline form: White powder
Recrystallization solvent: Methanol/diethyl ether
Melting Point: 257-259° C.
Form: Free
Example 675
Structure TABLE 4-continued

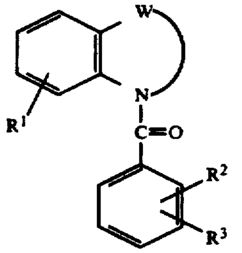

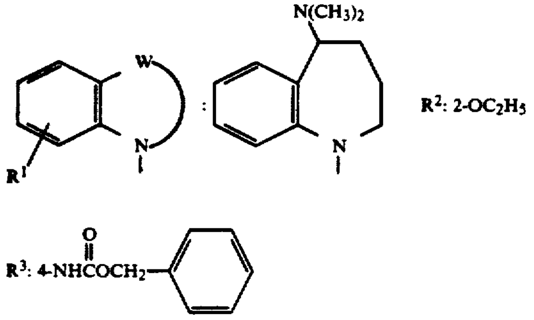

Crystalline form: White powder
Recrystallization solvent: Dichloromethane/diethyl ether
Melting Point: 134–135° C.
Form: Free
Example 676
Structure

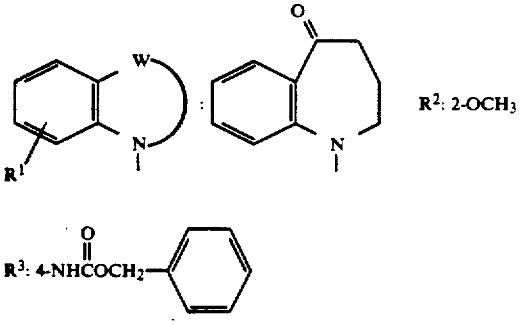

Crystalline form: White powder
Recrystallization solvent: Methanol/diethyl ether
Melting Point: 167–169° C.
Form: Free
Example 677
Structure

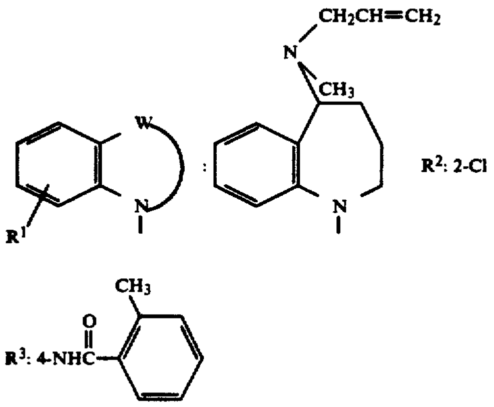

Crystalline form: Light brown prisms

TABLE 4-continued

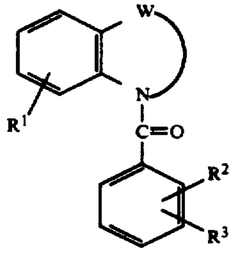

Recrystallization solvent: Ethyl acetate/n-hexane
Melting Point: 170–172° C.
Form: Free
Example 678
Structure

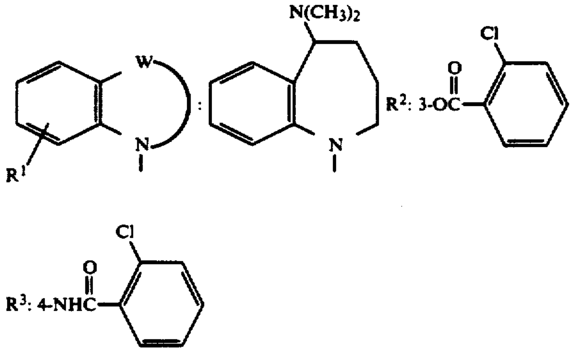

Crystalline form: White powder
Recrystallization solvent: Ethyl acetate/n-hexane
Melting Point: 181.5–182.5° C.
Form: Free
Example 679
Structure

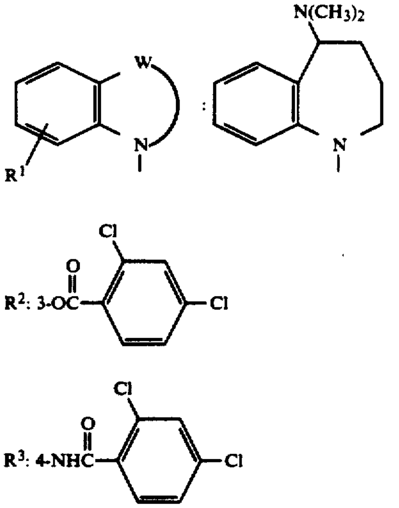

Crystalline form: White powder
Recrystallization solvent: Ethyl acetate/n-hexane
Melting Point: 176.5–177° C.
Form: Free
Example 680
Structure TABLE 4-continued

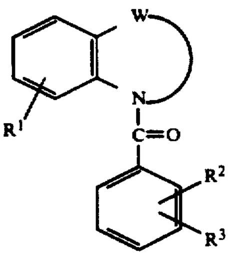

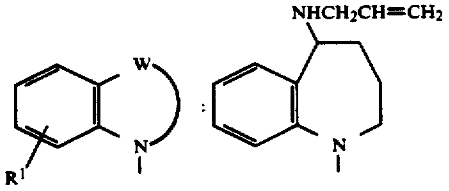

$R^2$: 2-Cl

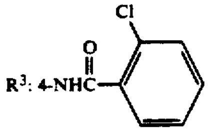

Crystalline form: Yellow amorphous
NMR analysis: 117)
Form: Free
Example 681
Structure

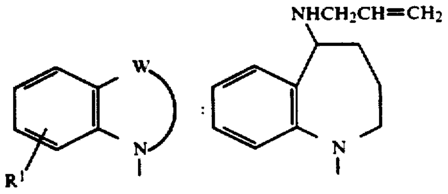

$R^2$: 2-Cl

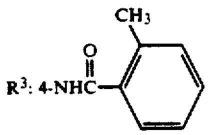

Crystalline form: Yellow amorphous
NMR analysis: 118)
Form: Free
Example 682
Structure

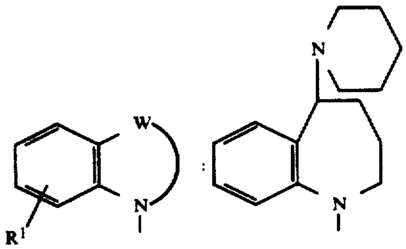

$R^2$: H

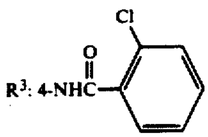

TABLE 4-continued

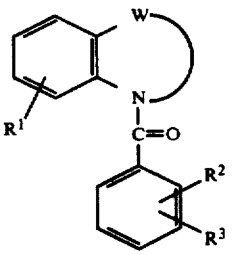

Crystalline form: White powder
Recrystallization solvent: Ethanol
Melting Point: 236–239° C.
Form: Free
Example 683
Structure

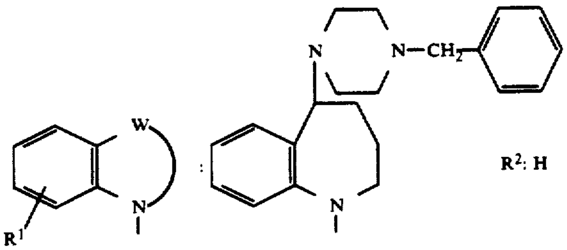

$R^2$: H

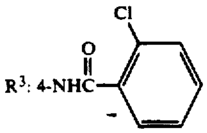

Crystalline form: White powder
Recrystallization solvent: Ethyl acetate/n-hexane
Melting Point: 153–154° C.
Form: Free
Example 684
Structure

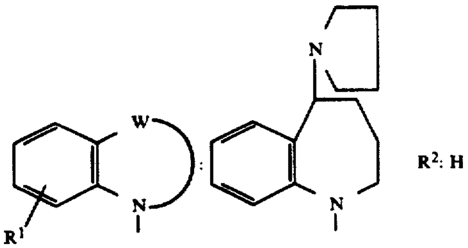

$R^2$: H

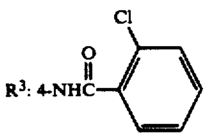

Crystalline form: White powder
Recrystallization solvent: Ethyl acetate
Melting Point: 128–130° C.
Form: Free
Example 685
Structure TABLE 4-continued

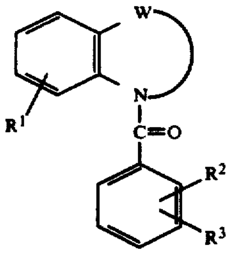

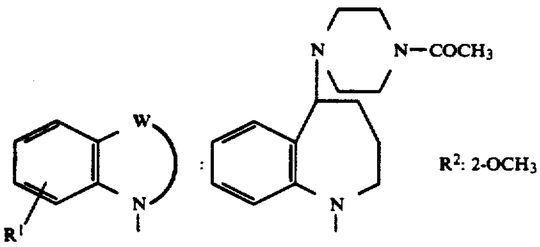

R²: 2-OCH₃

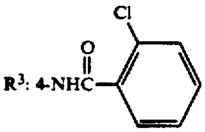

Crystalline form: White powder
Recrystallization solvent: Ethanol/diethyl ether
Melting Point: 231-234° C.
Form: Free
Example 686
Structure

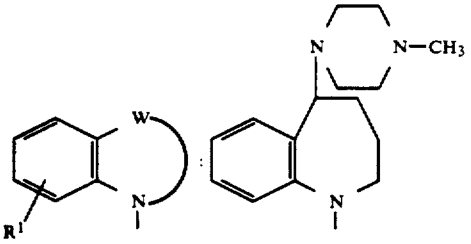

R²: H

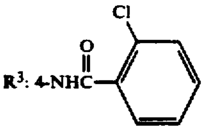

Crystalline form: White powder
Recrystallization solvent: Ethyl acetate
Melting Point: 246-248° C.
Form: Free
Example 687
Structure

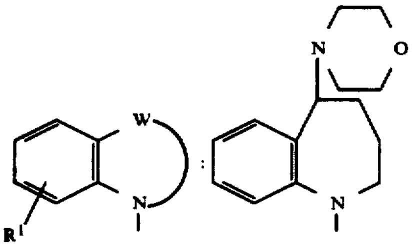

R²: H

TABLE 4-continued

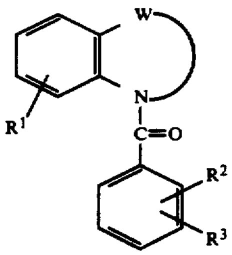

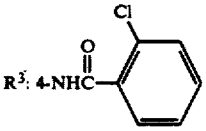

Crystalline form: White powder
Recrystallization solvent: Ethanol/water
Melting Point: 248-248.5° C.
Form: Free
Example 688
Structure

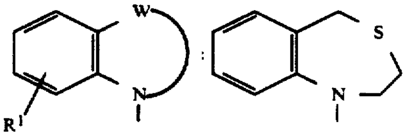

R²: H

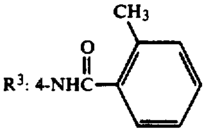

Crystalline form: White powder
Recrystallization solvent: Dichloromethane/diethyl ether
Melting Point: 204-205° C.
Form: Free
Example 689
Structure

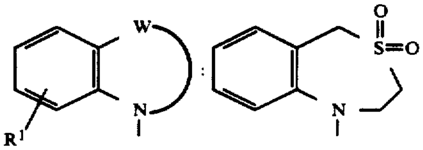

R²: H

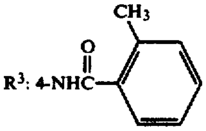

Crystalline form: White powder
Recrystallization solvent: Dichloromethane/diethyl ether
Melting Point: >300° C.
NMR analysis: 119)
Form: Free
Example 690
Structure

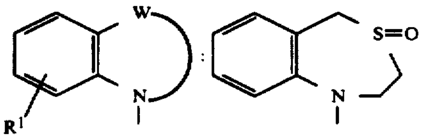

R²: H

TABLE 4-continued

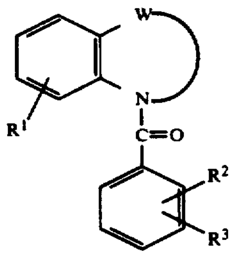

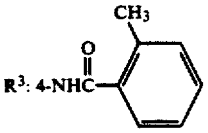

Crystalline form: White powder
Recrystallization solvent: Dichloromethane/diethyl ether
Melting Point: 292-294° C.
Form: Free
Example 691
Structure

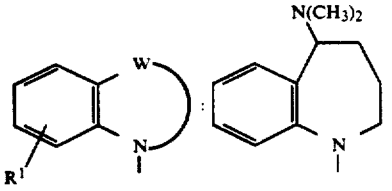

$R^2$: 2-N$(CH_3)_2$

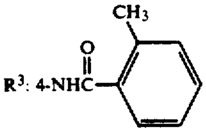

Crystalline form: Colorless amorphous
NMR analysis: 120)
Form: Free
Example 692
Structure

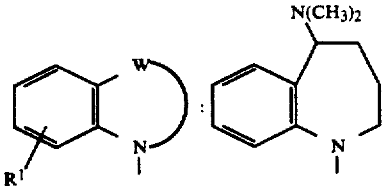

$R^2$: 2-N$(CH_3)_2$

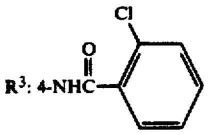

Crystalline form: Colorless amorphous
NMR analysis: 121)
Form: Free
Example 693
Structure TABLE 4-continued

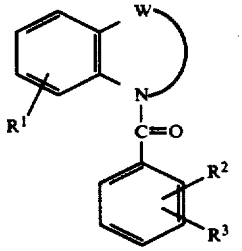

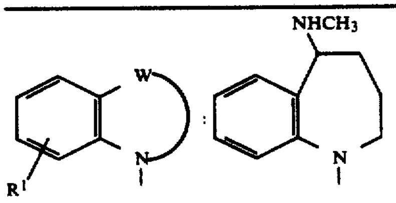

$R^2$: 2-Cl

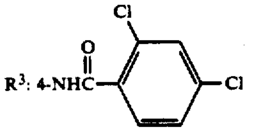

Crystalline form: Colorless amorphous
NMR analysis: 122)
Form: Free
Example 694
Structure

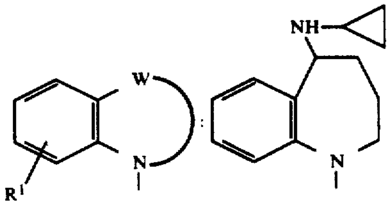

$R^2$: 2-OH

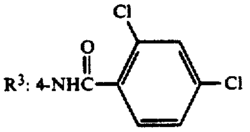

Crystalline form: Colorless amorphous
NMR analysis: 123)
Form: Free
Example 695
Structure

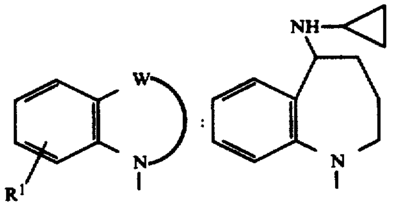

$R^2$: 2-OH

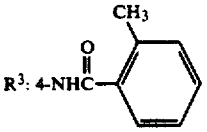

Crystalline form: White powder
Recrystallization solvent: Ethanol

TABLE 4-continued

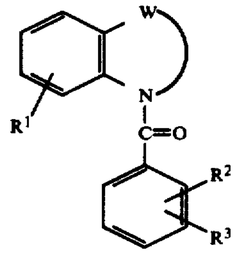

Melting Point: 198.5–199° C.
Form: Free
Example 696
Structure

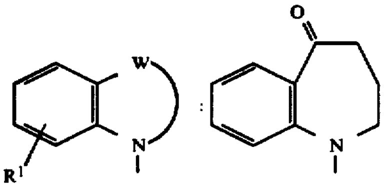

$R^2$: 2-Cl $R^3$: 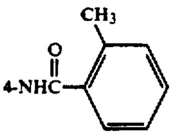

Crystalline form: White powder
Recrystallization solvent: Diethyl ether/dichloromethane
Melting Point: 168–170° C.
Form: Free
Example 697
Structure

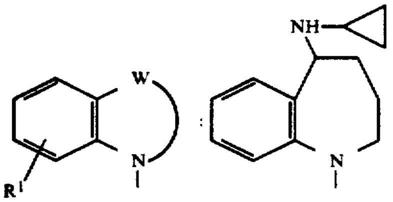

$R^2$: 2-OH $R^3$: 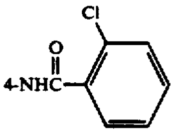

Crystalline form: White powder
Recrystallization solvent: Diethyl ether/dichloromethane
Melting Point: 175–176° C.
Form: Free
Example 698
Structure

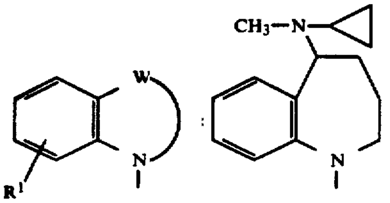

$R^2$: 2-Cl

TABLE 4-continued

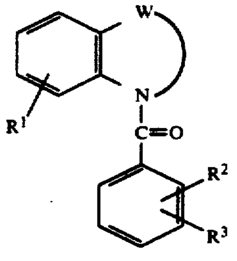

$R^3$: 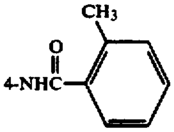

Crystalline form: White powder
Recrystallization solvent: Diethyl ether/dichloromethane
Melting Point: 177–178° C.
Form: Free
Example 699
Structure

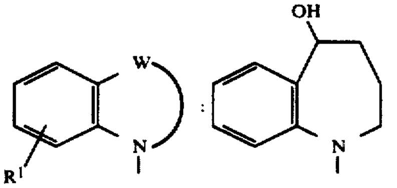

$R^2$: 2-Cl $R^3$: 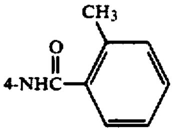

Crystalline form: White powder
Recrystallization solvent: Diethyl ether/dichloromethane
Melting Point: 222–223.5° C.
Form: Free
Example 700
Structure

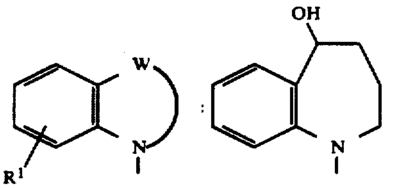

$R^2$: 2-Cl $R^3$: 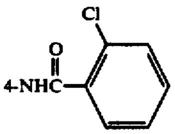

Crystalline form: White powder
Recrystallization solvent: Diethyl ether/dichloromethane
Melting Point: 243–244° C.
Form: Free
Example 701
Structure TABLE 4-continued

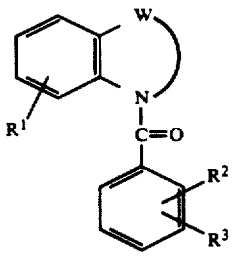

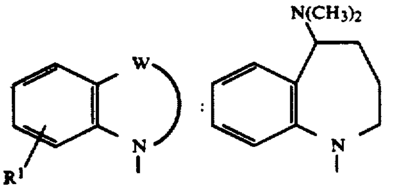

$R^2$: H

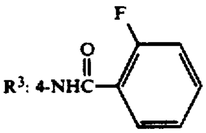

Crystalline form: White powder
Recrystallization solvent: Diethyl ether/dichloromethane
Melting Point: 180–181° C.
Form: Free
Example 702
Structure

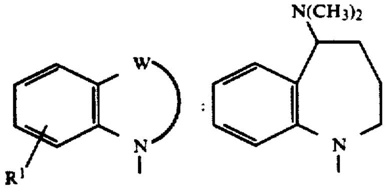

$R^2$: H

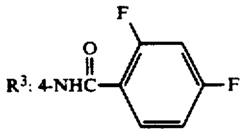

Crystalline form: Colorless amorphous
NMR analysis: 124)
Form: Free
Example 703
Structure

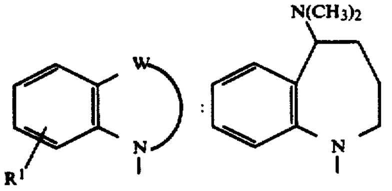

$R^2$: H

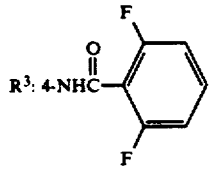

Crystalline form: White powder

TABLE 4-continued

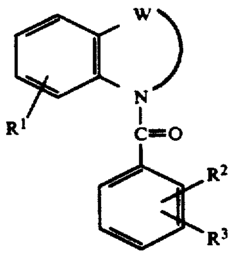

Recrystallization solvent: Diethyl ether/dichloromethane
Melting Point: 231–233° C.
Form: Free
Example 704
Structure

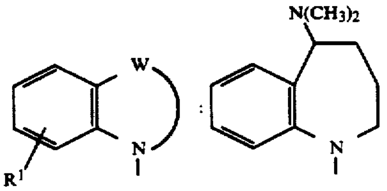

$R^2$: H

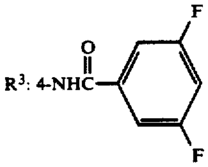

Crystalline form: White powder
Recrystallization solvent: Diethyl ether/dichloromethane
Melting Point: 196–198° C.
Form: Free
Example 705
Structure

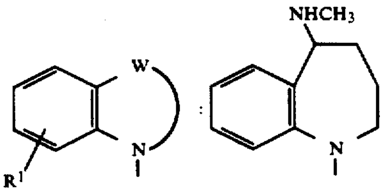

$R^2$: 2-Cl

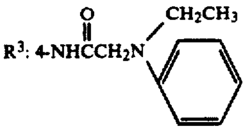

Crystalline form: Colorless amorphous
NMR analysis: 125)
Form: Free
Example 706
Structure

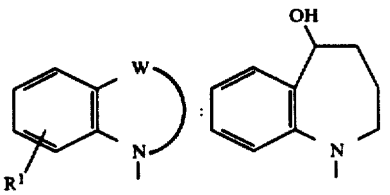

$R^2$: 2-Cl

TABLE 4-continued

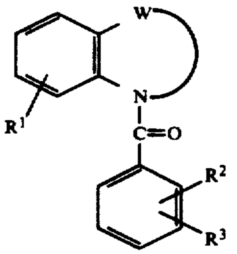

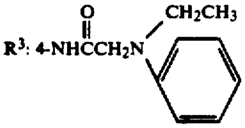

Crystalline form: Yellow amorphous
NMR analysis: 126)
Form: Free
Example 707
Structure

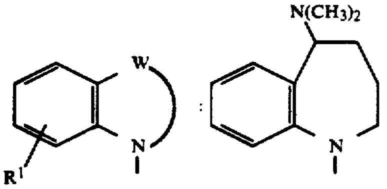

R²: H

Crystalline form: Yellow powder
Recrystallization solvent: Diethyl ether/dichloromethane
Melting Point: 146–147° C.
Form: Free
Example 708
Structure

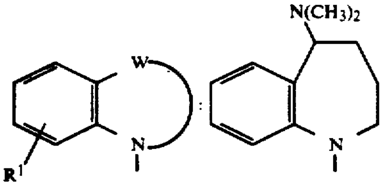

R²: H

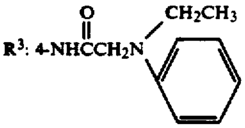

Crystalline form: Colorless amorphous
NMR analysis: 127)
Form: Free
Example 709
Structure

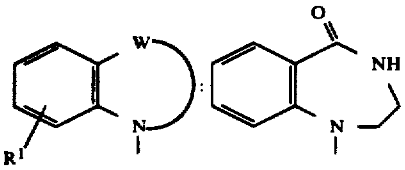

R²: H

TABLE 4-continued

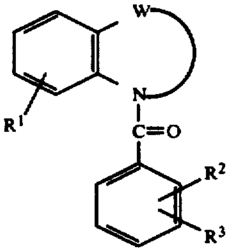

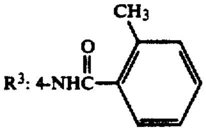

Crystalline form: White powder
Recrystallization solvent: Diethyl ether/dichloromethane
Melting Point: 220–221° C.
Form: Free
Example 710
Structure

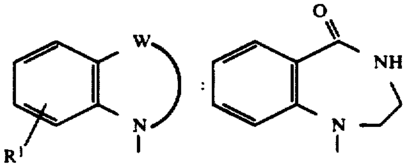

R²: H

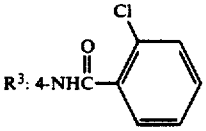

Crystalline form: White powder
Recrystallization solvent: Diethyl ether/dichloromethane
Melting Point: 170–172° C.
Form: Free
Example 711
Structure

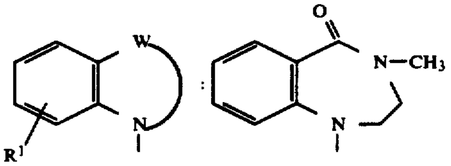

R²: H

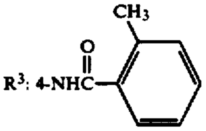

Crystalline form: Colorless amorphous
NMR analysis: 128)
Form: Free
Example 712
Structure TABLE 4-continued

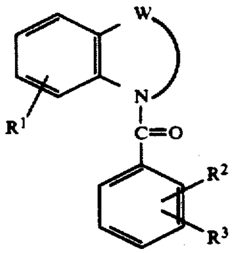

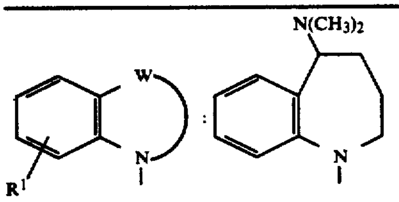

$R^2$: H

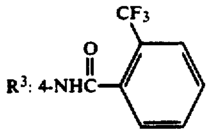

Crystalline form: White powder
Recrystallization solvent: Ethanol
Melting Point: 224–225° C.
Form: Free
Example 713
Structure

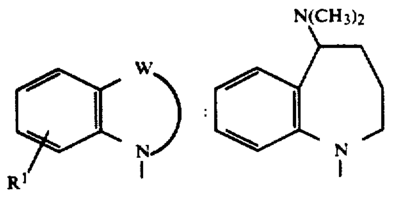

$R^2$: 3-OCH$_3$

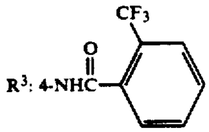

Crystalline form: White powder
Recrystallization solvent: Ethanol
Melting Point: 193–196° C.
Form: Free
Example 714
Structure

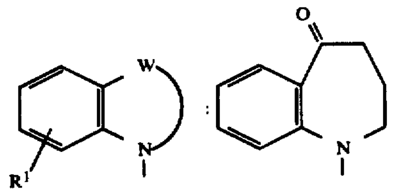

$R^2$: 2-Cl

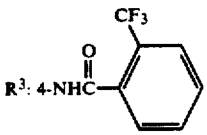

Crystalline form: White powder
Recrystallization solvent: Ethanol

TABLE 4-continued

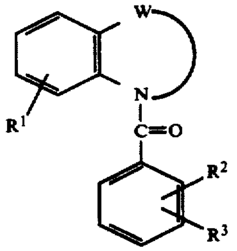

Melting Point: 212–214° C.
Form: Free
Example 715
Structure

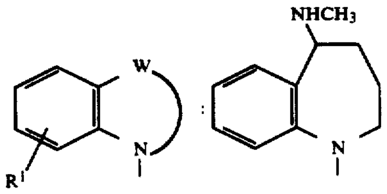

$R^2$: 2-Cl

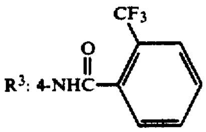

Crystalline form: White powder
Recrystallization solvent: Ethanol
Melting Point: 211–213° C.
Form: Free
Example 716
Structure

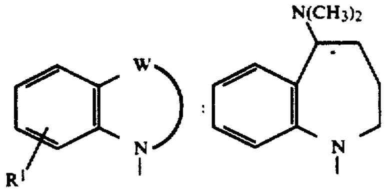

$R^2$: 2-Cl

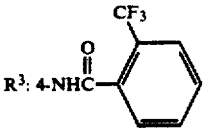

Crystalline form: White powder
Recrystallization solvent: Ethanol
Melting Point: 213–215° C.
Form: Free
Example 717
Structure

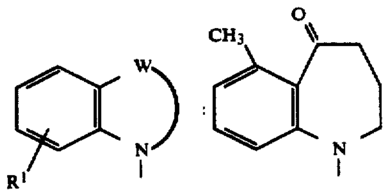

$R^2$: 2-Cl

TABLE 4-continued

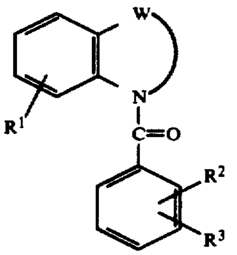

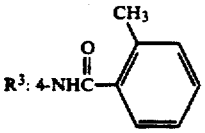

Crystalline form: White powder
Recrystallization solvent: Ethanol
Melting Point: 199-201° C.
Form: Free
Example 718
Structure

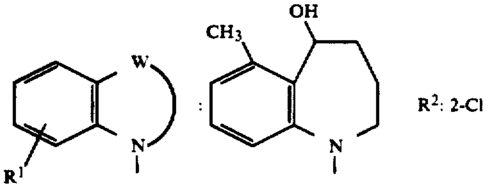

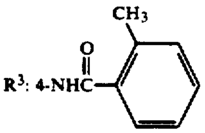

Crystalline form: White powder
Recrystallization solvent: Ethanol
Melting Point: 238-240° C.
Form: Free
Example 719
Structure

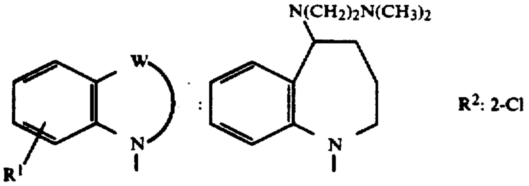

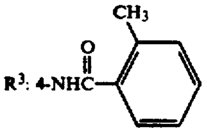

Crystalline form: White powder
Recrystallization solvent: Ethanol
Melting Point: 188-189° C.
Form: Free
Example 720
Structure TABLE 4-continued

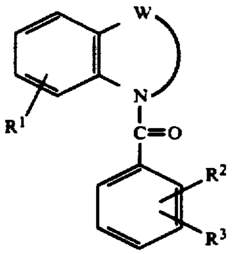

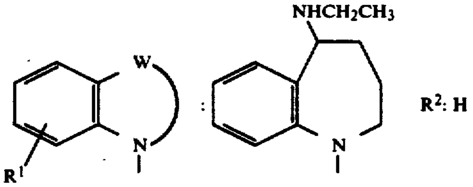

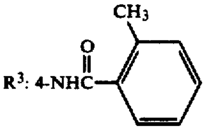

Crystalline form: Colorless prisms
Recrystallization solvent: Dioxane/water
Melting Point: 135.5-137° C.
Form: Free
Example 721
Structure

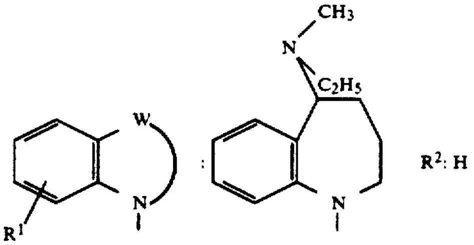

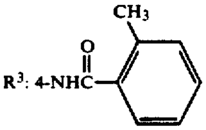

Crystalline form: White powder
Recrystallization solvent: Isopropyl alcohol/petroleum ether
Melting Point: 192-193° C.
Form: Free
Example 722
Structure

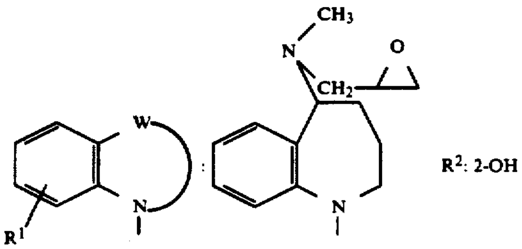

TABLE 4-continued

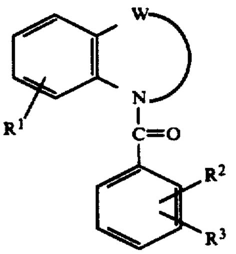

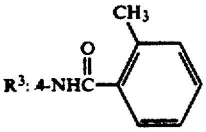

Crystalline form: Colorless needles
Recrystallization solvent.: Ethyl acetate
Melting Point: 239–240° C.
Form: Free
Example 723
Structure

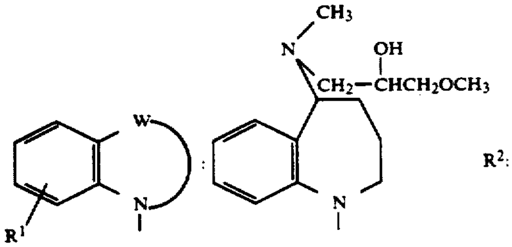

R²: H

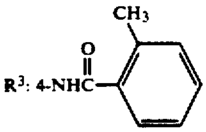

Crystalline form: Colorless amorphous
NMR analysis: 129)
Form: Free
Example 724
Structure

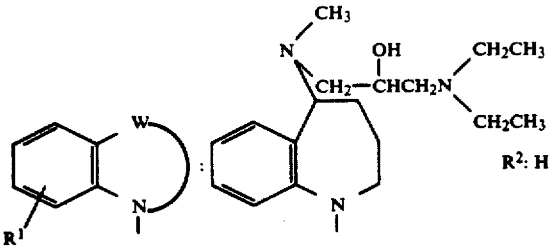

R²: H

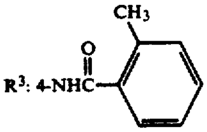

Crystalline form: Colorless amorphous
NMR analysis: 130)
Form: Free
Example 725
Structure TABLE 4-continued

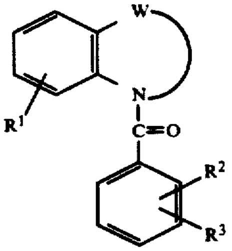

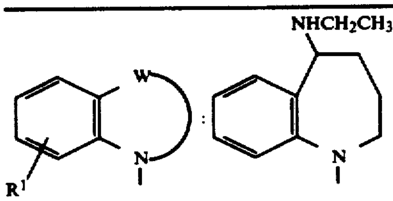

R²: H

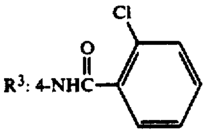

Crystalline form: Colorless needles
Recrystallization solvent: Ethanol/petroleum ether
Melting Point: 193–194° C.
Form: Free
Example 726
Structure

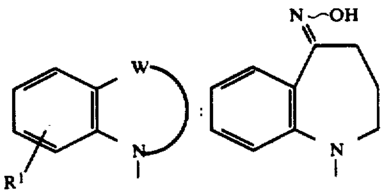

R²: H

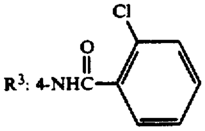

Crystalline form: Light yellow prisms
Recrystallization solvent: Ethanol
Melting Point: 245.5–247° C.
Form: Free
Example 727
Structure

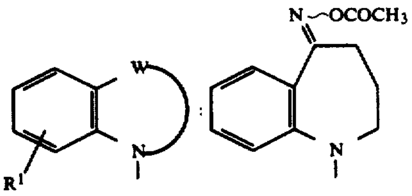

R²: H

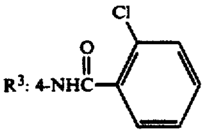

Crystalline form: Colorless prisms
Recrystallization solvent: Ethanol/petroleum ether TABLE 4-continued

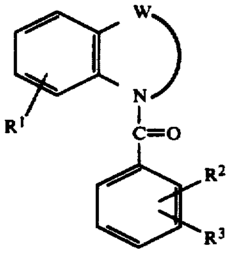

Melting Point: 142–144° C.
Form: Free
Example 728
Structure

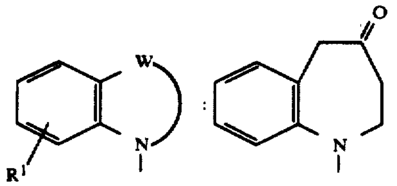

$R^2$: H

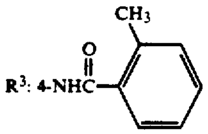

Crystalline form: Light yellow prisms
Recrystallization solvent: Ethanol
Melting Point: 214–217° C.
Form: Free
Example 729
Structure

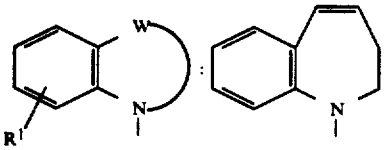

$R^2$: H

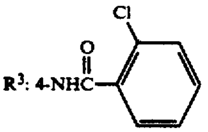

Crystalline form: Colorless needles
Recrystallization solvent: Ethanol
Melting Point: 205–207° C.
Form: Free
Example 730
Structure

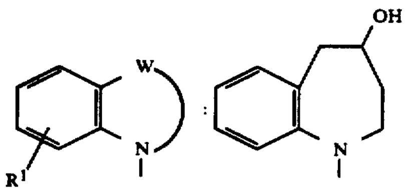

$R^2$: H

TABLE 4-continued

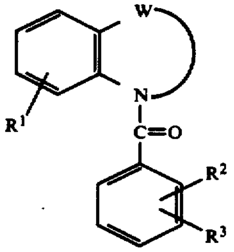

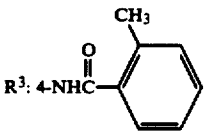

Crystalline form: Colorless needles
Recrystallization solvent: Ethanol/diethyl ether
Melting Point: 201–203° C.
Form: Free
Example 731
Structure

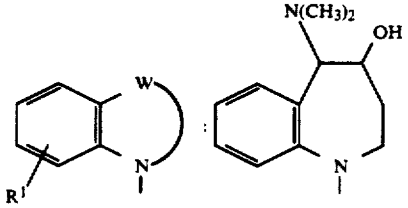

$R^2$: H

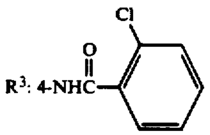

Crystalline form: Colorless needles
Recrystallization solvent: Ethanol/diethyl ether
Melting Point: 180–182° C.
Form: Free
Example 732
Structure

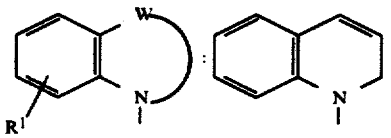

$R^2$: H

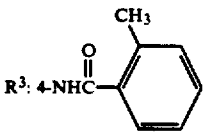

Crystalline form: Light yellow scales
Recrystallization solvent: Ethanol/diethyl ether
Melting Point: 178–180° C.
Form: Free
Example 733
Structure TABLE 4-continued

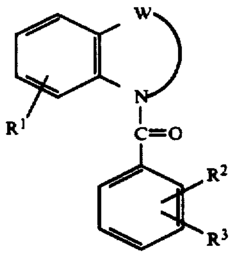

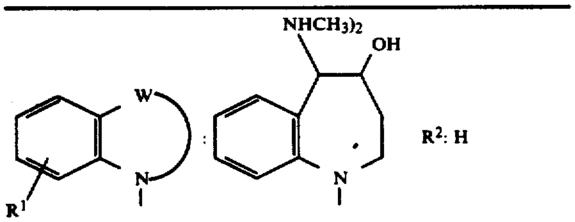

$R^2$: H $R^3$: 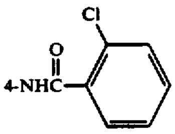

Crystalline form: Colorless needles
Recrystallization solvent: Methanol/diethyl ether
Melting Point: 208-213° C.
Form: Free
Example 734
Structure

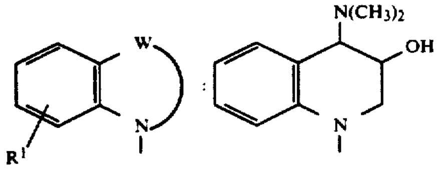

$R^2$: H $R^3$: 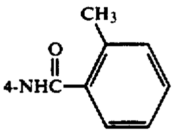

Crystalline form: White powder
Recrystallization solvent: Ethanol/diethyl ether
Melting Point: 175-177° C.
Form: Free
Example 735
Structure

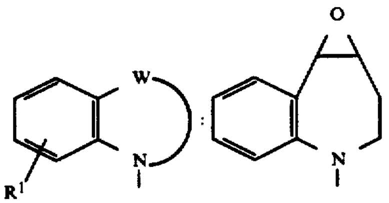

$R^2$: H $R^3$: 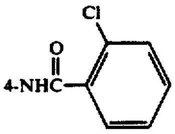

Crystalline form: White powder

TABLE 4-continued

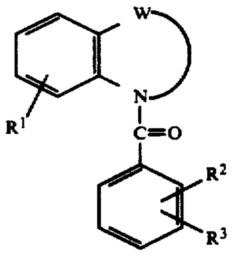

NMR analysis: 131)
Form: Free
Example 736
Structure

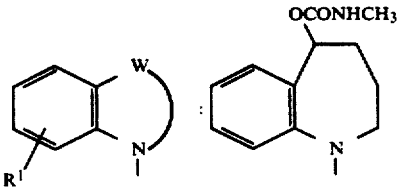

$R^2$: H $R^3$: 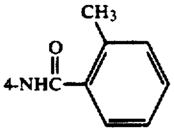

Crystalline form: White powder
Recrystallization solvent: Ethyl acetate/n-hexane
Melting Point: 277-279° C.
Form: Free
Example 737
Structure

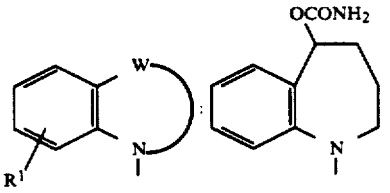

$R^2$: H $R^3$: 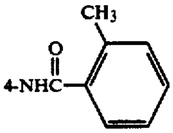

Crystalline form: Colorless amorphous
NMR analysis: 132)
Form: Free
Example 738
Structure

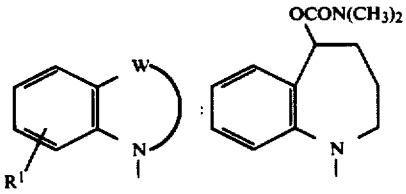

$R^2$: H

TABLE 4-continued

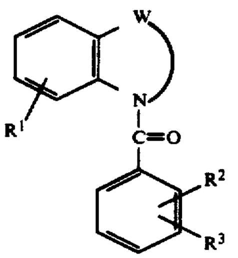

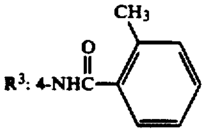

Crystalline form: Colorless amorphous
NMR analysis: 133)
Form: Free
Example 739
Structure

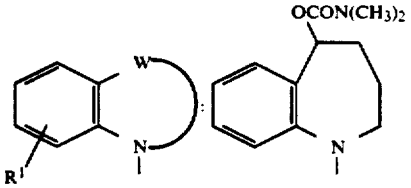

$R^2$: H

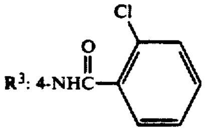

Crystalline form: Colorless amorphous
NMR analysis: 134)
Form: Free
Example 740
Structure

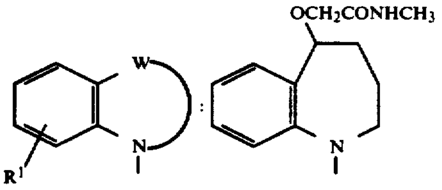

$R^2$: H

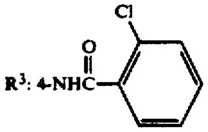

Crystalline form: Colorless amorphous
NMR analysis: 135)
Form: Free
Example 741
Structure TABLE 4-continued

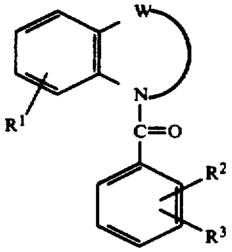

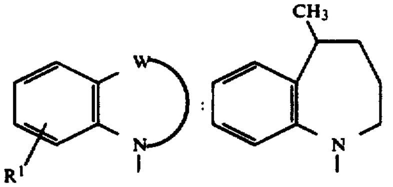

$R^2$: H

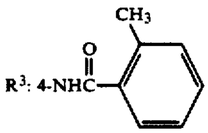

Crystalline form: White powder
Recrystallization solvent: Ethyl acetate/n-hexane
Melting Point: 213-214° C.
Form: Free
Example 742
Structure

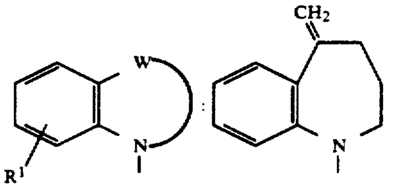

$R^2$: H

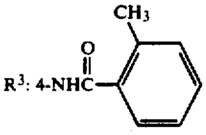

Crystalline form: White powder
Recrystallization solvent: Ethyl acetate/n-hexane
Melting Point: 216-217° C.
Form: Free
Example 743
Structure

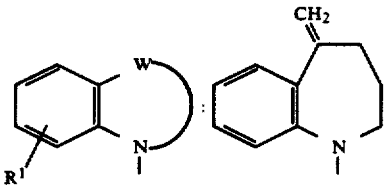

$R^2$: H

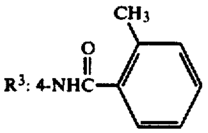

Crystalline form: White powder
Recrystallization solvent: Ethyl acetate/n-hexane TABLE 4-continued

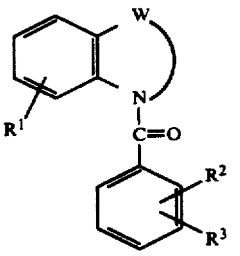

Melting Point: 165-167° C.
Form: Free
Example 744
Structure

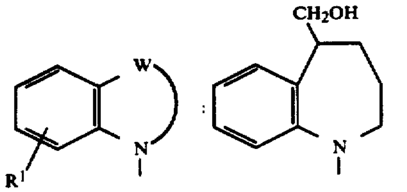

$R^2$: H

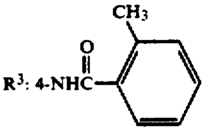

Crystalline form: White powder
Recrystallization solvent: Ethyl acetate/n-hexane
Melting Point: 202-206° C.
Form: Free
Example 745
Structure

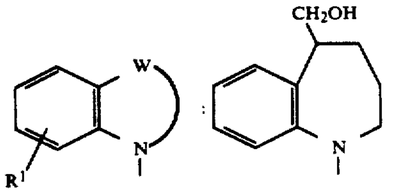

$R^2$: H

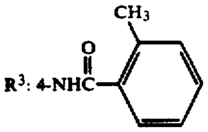

Crystalline form: White powder
Recrystallization solvent: Ethyl acetate/n-hexane
Melting Point: 220-221.5° C.
Form: Free
Example 746
Structure

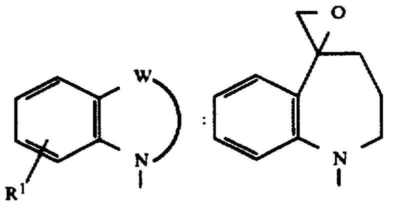

$R^2$: H

TABLE 4-continued

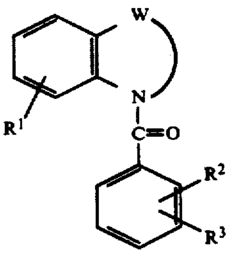

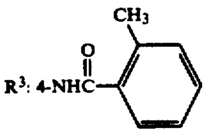

Crystalline form: Colorless needles
Recrystallization solvent: Ethyl acetate/n-hexane
Melting Point: 186-186.5° C.
Form: Free
Example 747
Structure

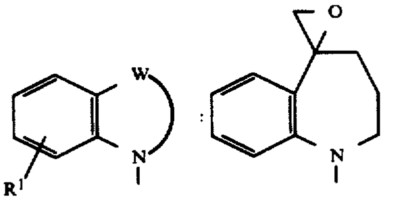

$R^2$: 2-Cl

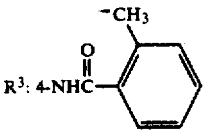

Crystalline form: Colorless amorphous
NMR analysis: 136)
Form: Free
Example 748
Structure

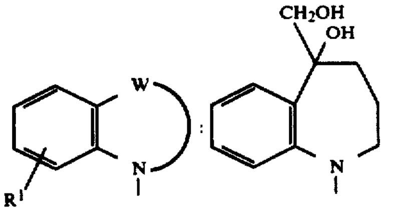

$R^2$: H

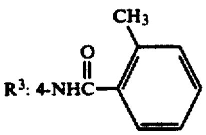

Crystalline form: White powder
Recrystallization solvent: Ethyl acetate/n-hexane
Melting Point: 136-140° C.
Form: Free
Example 749
Structure TABLE 4-continued

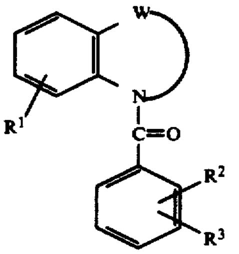

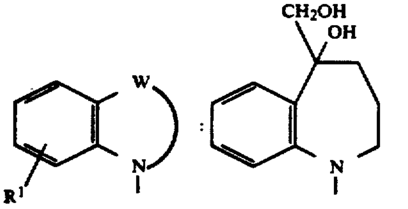

R[2]: 2-Cl

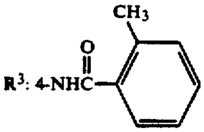

Crystalline form: White powder
Recrystallization solvent: Ethyl acetate/n-hexane
Melting Point: 151-153° C.
Form: Free
Example 750
Structure

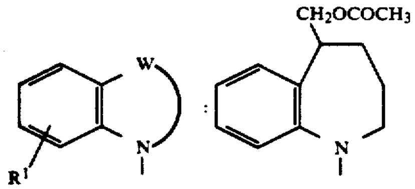

$R^2$: H

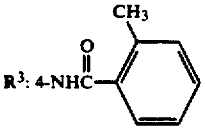

Crystalline form: Colorless needles
Recrystallization solvent: Ethyl acetate/n-hexane
Melting Point: 155-156° C.
Form: Free
Example 751
Structure

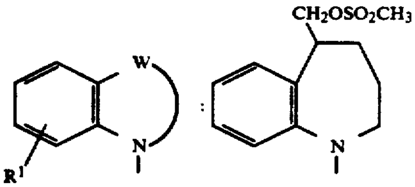

$R^2$: H

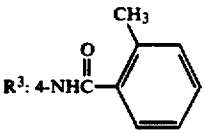

Crystalline form: White powder

TABLE 4-continued

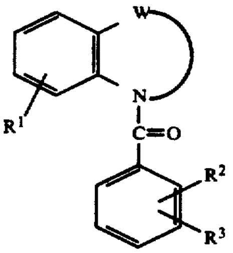

Recrystallization solvent: Ethyl acetate/n-hexane
Melting Point: 189-190° C.
Form: Free
Example 752
Structure

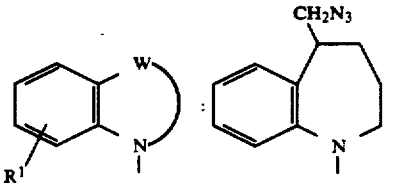

$R^2$: H

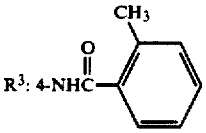

Crystalline form: White powder
Recrystallization solvent: Ethyl acetate/n-hexane
Melting Point: 188-190° C.
Form: Free
Example 753
Structure

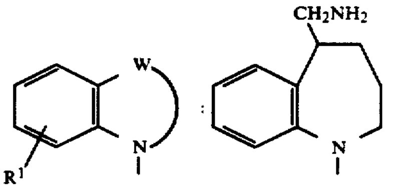

$R^2$: H

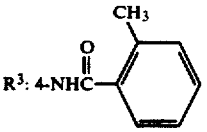

Crystalline form: Colorless needles
Recrystallization solvent: Ethanol
Melting Point: 233-235° C.
Form: Free
Example 754
Structure

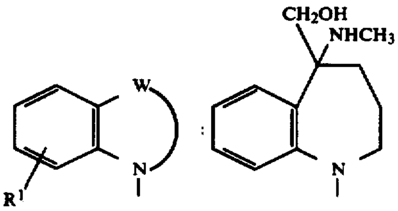

$R^2$: H

TABLE 4-continued

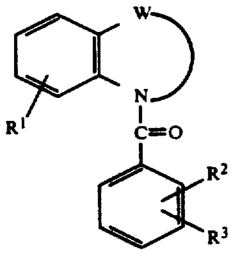

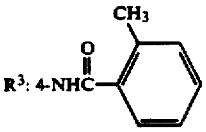

Crystalline form: Colorless amorphous
NMR analysis: 137)
Form: Free
Example 755
Structure

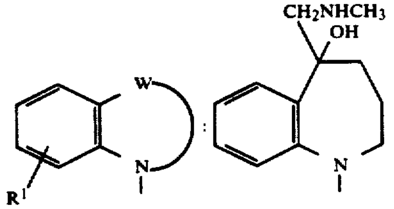

$R^2$: H

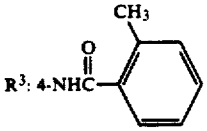

Crystalline form: White powder
Recrystallization solvent: Ethyl acetate/n-hexane
Melting Point: 176–179° C.
Form: Free
Example 756
Structure

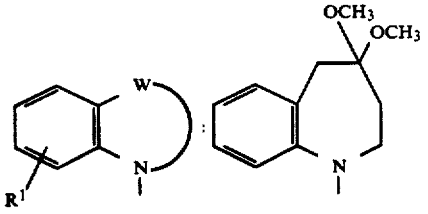

$R^2$: H

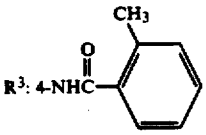

Crystalline form: Colorless needles
Recrystallization solvent: Methanol/diethyl ether
Melting Point: 183–185° C.
Form: Free 117) $^1$H-NMR($CDCl_3$)δ; 1.3–2.3(4H, m), 3.1–3.4(3H, m), 3.8–4.6(2H, m), 5.0–5.3(2H, m) 5.8–6.1(1H, m), 6.8–8.5(11H, m)
118) $^1$H-NMR($CDCl_3$)δ; 1.6–2.2(4H, m), 2.46, 2.53(3H, each s), 3.1–3.5(3H, m), 3.8–4.6(2H, m), 5.0–5.3 (2H, m), 5.8–6.1(1H, m), 6.8–8.0(11H, m)
119) $^1$H-NMR(DMSO-$d_6$)δ; 2.33(3H, s), 3.36(2H, m), TABLE 4-continued

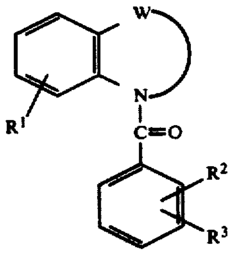

3.89(1H, m), 4.41 (1H, m), 5.07(1H, m), 5.40(1H, d, J=14.8Hz), 6.85(1H, d, J=7.2Hz), 7.15–7.65 (11H, m), 10.35(1H, s)
120) $^1$H-NMR($CDCl_3$)δ; 1.25–5.05(22H, m), 6.65–7.65 (11H, m), 7.75–8.25(1H, m)
121) $^1$H-NMR($CDCl_3$)δ; 1.15–5.05(19H, m), 6.75–7.85 (11H, m), 7.85–8.25(1H, m)
122) $^1$H-NMR($CDCl_3$)δ; 1.25–2.85(8H, m), 2.95–4.95 (2H, m), 6.75–7.85(10H, m), 9.25–9.75(1H, m)
123) $^1$H-NMR($CDCl_3$)δ; 0.20–0.70(4H, m), 0.95–2.35)6H, m), 2.65–5.00(2H, m), 6.75–7.90(10H, m), 8.65–9.25(1H, m)
124) $^1$H-NMR($CDCl_3$)δ; 1.20–3.15(11H, m), 3.45–3.70 (1H, m), 4.05–5.20(1H, m), 6.60–7.65(10H, m), 8.15–8.45(2H, m)
125) $^1$H-NMR($CDCl_3$)δ; 1.19(3H, t, J=7Hz), 1.25–3.25 (8H, m), 3.46(2H, q, J=7Hz), 3.40–4.10(3H, m), 4.45–5.10(1H, m), 6.65–7.75(12H, m), 8.30–8.60 (1H, m)
126) $^1$H-NMR($CDCl_3$)δ; 1.10–1.30(3H, m), 1.50–2.35(4H, m), 2.65–3.05(2H, m), 3.35–3.60(2H, m), 3.80–4.05 (2H, m), 4.65–5.15(2H, m), 6.55–7.85(12H, m), 8.25–8.65(1H, m)
127) $^1$H-NMR($CDCl_3$)δ; 1.20(3H, t, J=7Hz), 1.10–3.15 (11H, m), 3.45–3.65(3H, m), 3.88(2H, s), 3.95–5.15(1H, m), 6.55–7.65(13H, m), 8.37(1H, s)
128) $^1$H-NMR($CDCl_3$)δ; 2.45(3H, s), 3.40(3H, s), 4.01 (2H, m), 4.38(2H, m), 7.20–7.77(13H, m)
129) $^1$H-NMR($CDCl_3$)δ; 1.35–4.55(22H, m), 6.3–7.8(13H, m)
130) $^1$H-NMR($CDCl_3$)δ; 1.10(6H, t, J=7Hz), 1.35–5.1 (23H, m), 6.55–7.8(13H, m)
131) $^1$H-NMR($CDCl_3$)δ; 1.94–3.21(3H, m), 3.30–4.82(3H, m), 6.57(1H, d, J=7.5Hz), 6.86–8.10(11H, m), 8.72(1H, brs)
132) $^1$H-NMR(DMSO-$d_6$)δ; 1.57–1.85(2H, m), 1.85–2.28 (2H, m), 2.33(3H, s), 2.64–2.86(1H, m), 4.53–5.07 (1H, m), 5.79–5.94(1H, m), 6.47–7.68(2H, br), 6.64–6.77(1H, m), 6.96–7.62(12H, m)
133) $^1$H-NMR($CDCl_3$)δ; 1.61–1.97(2H, m), 2.00–2.54(2H, m), 2.47(3H, s), 2.60–3.23(7H, m), 4.76–5.22(1H, m), 5.94–6.19(1H, m), 6.61–6.74(1H, m), 6.91–7.62 (12H, m)
134) $^1$H-NMR($CDCl_3$)δ; 1.68–1.97(2H, m), 2.03–2.53(2H, m), 2.61–3.24(7H, m), 4.76–5.22(1H, m), 5.97–6.17 (1H, m), 6.59–6.74(1H, m), 6.92–7.13(1H. m), 7.13–7.58(9H, m), 7.66–7.85(1H, m), 7.85–8.00 (1H, m)
135) $^1$H-NMR($CDCl_3$)δ; 1.57–1.93(2H, m), 1.93–2.54(2H, m), 2.54–2.72(1H, m); 2.79–3.09(3H, m), 3.90–4.32 (2H, m), 4.49–5.18(2H, m), 6.31–6.93(2H, m), 6.96–7.63(10H, m), 7.63–7.89(1H, m), 7.89–8.16 (1H, m)
136) $^1$H-NMR($CDCl_3$)δ; 1.44–1.95(2H, m), 1.95–2.28(2H, m), 2.40–2.67(3H, m), 2.73–3.38(3H, m), 3.40–3.97 (1H, m), 4.50–5.20(1H, m), 6.67–8.11(11H, m)
137) $^1$H-NMR($CDCl_3$)δ; 1.50–2.10(3H, m), 2.10–2.28(1H, m), 2.36(3H, s), 2.48(3H, s), 2.68–2.97(1H, m), 3.26–3.47(1H, m), 4.16(1H. d, J=13.8Hz), 4.25 (1H, d, J=13.8Hz), 5.95(1H, brs), 6.60–6.76(1H, m), 6.97–7.52(8H, m), 7.52–7.73(2H, m), 7.73–7.97 (2H, m)

EXAMPLE 757

A mixture of 5-dimethylamino-1-[4-(2-chlorobenzoylamino)benzoyl]-2,3,4,5-tetrahydro-1H-benzazepine (10 g), methyl iodide (1.7 ml) and chloroform (10 ml) is heated with stirring at 100° C. for 3 hours in an autoclave. After completion of the reaction, the solvent is distilled off under reduced pressure and the resulting residue is dissolved in methanol. The mixture is treated with IRA-400 (trade mark; Organo Co., Ltd., $OH^-$ type). Methanol is distilled off and the resulting residue is suspended in t-butyl alcohol (90 ml), and thereto is added potassium t-butoxide (2.3 g). The mixture is refluxed for 5 hours. The solvent is distilled off under reduced pressure, and the resulting residue is dissolved in dichloromethane. The mixture is washed successively with water and saturated saline solution and dried over magnesium sulfate. The solvent is distilled off and to the resulting residue is added dichloromethane/diethyl ether. The precipitated crude crystal is recrystallized from ethanol to give 1-[4-(2-chlorobenzoylamino)benzoyl]-2,3-dihydro-1H-benzazepine (5.15 g) as colorless needles, m.p. 205°-207° C.

EXAMPLE 758

1-[4-(2-Chlorobenzoylamino)benzoyl]-2,3-dihydro-1H-benzazepine (4.7 g) is dissolved in dichloromethane (50 ml) and thereto is added 80 % m-chloroperbenzoic acid (3 g). The mixture is stirred at room temperature overnight. The dichloromethane layer is washed successively with saturated aqueous sodium hydrogen carbonate solution and saturated saline solution, and the solvent is distilled off under reduced pressure. The resulting residue is purified by silica gel column chromatography (eluent; dichloromethane : methanol = 50:1) to give 4,5-epoxy-1-[4-(2-chlorobenzoylamino)benzoyl]-2,3,4,5-tetrahydro-1H-benzazepine (4.26 g) as white powder.

$^1$H-NMR($CDCl_3$) δ; 1.94–3.21 (3H, m), 3.30–4.82 (3H, m), 6.57 (1H, d, J=7.5 Hz), 6.86–8.10 (11H, m), 8.72 (1H, brs).

EXAMPLE 759

A mixture of 4,5-epoxy-1-[4-(2-chlorobenzoylamino)-benzoyl]-2,3,4,5-tetrahydro-1H-benzazepine (0.5 g), dimethylamine hydrochloride (2.6 g), triethylamine (4.5 g) and methanol (15 ml) is refluxed for 19 hours. After completion of the reaction, the solvent is distilled off and the resulting residue is dissolved in dichloromethane. The mixture is washed successively with water and saturated saline solution. The solvent is distilled off and the resulting residue is purified by silica gel column chromatography (eluent; dichloromethane : methanol = 50: 1), and recrystallized from ethanol/diethyl ether to give trans-5-dimethylamino-4-hydroxy-1-[4-(2-chlorobenzoylamino)benzoyl]-2,3,4,5-tetrahydro-1H-benzazepine (0.38 g) as colorless needles, m.p. 180°-182° C.

Using the suitable starting materials, the compounds of the above Examples 733 and 734 are obtained in the same manner as in Example 759.

EXAMPLE 760

Methyltriphenylphosphonium bromide (4.30 g) is suspended in tetrahydrofuran (100 ml) and thereto is added potassium t-butoxide (1.58 g) under ice-cooling. The mixture is stirred at 5° C. for 1 hour and thereto is added 5-oxo-1-[4-(2-methylbenzoylamino)benzoyl]-2,3,4,5-tetrahydro-1H-benzazepine (1.60 g) and the mixture is stirred at room temperature for 1 hour. The reaction solution is poured into ice-water (200 ml) and extracted with ethyl acetate. The extract is washed with saturated saline solution and dried over magnesium sulfate. The solvent is distilled off and the resulting residue is purified by silica gel column chromatography (eluent; ethyl acetate : n-hexane = 1 : 2), and recrystallized from ethyl acetate/n-hexane to give 5-methylidene-1-[4-(2-methylbenzoylamino)benzoyl]-2,3,4 5-tetrahydro-1H-benzazepine (1.34 g) as white powder, m.p. 216°-217° C.

Using the suitable starting materials, the compound of the above Example 743 is obtained in the same manner as in Example 760.

EXAMPLE 761

5-Methylidene-1-[4-(2-methylbenzoylamino)benzoyl]-2,3,4,5-tetrahydro-1H-benzazepine (2.84 g) is suspended in tetrahydrofuran (50 ml) and thereto is added 1 M solution of boran-tetrahydrofuran complex in tetrahydrofuran (43 ml). The mixture is stirred at room temperature for 6 hours. After completion of the reaction, the reaction solution is cooled with ice, and thereto is added water (70 ml). After termination of the evolution of hydrogen gas, to the reaction solution are added 25% aqueous sodium hydroxide solution (7.0 ml), and subsequently 31% aqueous hydrogen peroxide solution (4.7 ml), and the mixture is heated with stirring at 50° C. for 1 hour. After cooling, to the reaction solution is added saturated saline solution and the tetrahydrofuran layer is collected, washed with saturated saline solution and dried over magnesium sulfate. The solvent is distilled off and the resulting residue is recrystallized from ethyl acetate/n-hexane to give 5-hydroxymethyl-1-[4-(2-methylbenzoylamino)benzoyl]-2,3,4,5-tetrahydro-1H-benzazepine (1.96 g) as white powder, m.p. 202°-206° C.

Using the suitable-starting materials, the compound of the above Example 745 is obtained in the same manner as in Example 761.

EXAMPLE 762

5-Methylidene-1-[2-chloro-4-(2-methylbenzoylamino)benzoyl]-2,3,4,5-tetrahydro-1H-benzazepine (0.81 g) is dissolved in dichloromethane (30 ml) and thereto is added m-chloroperbenzoic acid (0.57 g). The mixture is stirred at room temperature for 15 hours. After completion of the reaction, the reaction solution is washed successively with aqueous sodium hydrogensulfite solution, aqueous sodium hydrogen carbonate solution and saturated saline solution, and dried over magnesium sulfate. The solvent is distilled off and the resulting residue is purified with silica gel column chromatography (eluent; ethyl acetate : n-hexane = 2:3) to give 5,5-epoxy-1-[2-chloro-4-(2-methylbenzoylamino)benzoyl]-2,3,4,5-tetrahydro-1H-benzazepine (0.70 g) as colorless amorphous.

$^1$H-NMR($CDCl_3$) δ; 1.44–1.95 (2H, m), 1.95–2.28 (2H, m), 2.40–2.67 (3H, m), 2.73–3.38 (3H, m), 3.40–3.97 (1H, m), 4.50–5.20 (1H, m), 6.67–8.11 (11H, m)

Using the suitable starting materials, the compound of the above Example 746 is obtained in the same manner as in Example 762.

EXAMPLE 763

To 5-methylidene-1-[4-(2-methylbenzoylamino)benzoyl]-2,3,4,5-tetrahydro = 1H-benzazepine (0.60 g) are added successively t-butyl alcohol (6.0 ml), water (1.2 ml), pyridine (0.3 ml), osmium tetroxide (1.2 mg) and trimethylamine N-oxide dihydrate (0.22 g) and the mixture is refluxed with stirring for 2.5 hours. After cooling, to the reaction solution is added 20% aqueous sodium hydrogen-sulfite solution (10 ml), and the mixture is stirred at room temperature for 1.5 hour. The reaction solution is extracted with a mixture of ethyl acetate/tetrahydrofuran (1:1). The extract is washed successively with diluted hydrochloric acid and saturated saline solution, and dried over magnesium sulfate. The solvent is distilled off and the resulting residue is recrystallized from ethyl acetate/n-hexane to give 5-hydroxymethyl-5-hydroxy-1-[4-(2-methylbenzoylamino)benzoyl]-2,3,4,5-tetrahydro-1H-benzazepine (0.55 g) as white powder, m.p. 136°-140° C.

Using the suitable starting materials, the compound of the above Example 749 is obtained in the same manner as in Example 763.

EXAMPLE 764

To 5-hydroxymethyl-1-[4-(2-methylbenzoylamino)-benzoyl]-2,3,4,5-tetrahydro-1H-benzazepine (0.40 g) are added acetic anhydride (4.0 ml) and pyridine (0.5 ml), and the mixture is stirred at room temperature for 5 hours. After completion of the reaction, the reaction solution is poured into ice-water and extracted with ethyl acetate. The extract is washed successively with diluted hydrochloric acid and saturated saline solution, and dried over magnesium sulfate. The solvent is distilled off and the resulting residue is recrystallized from ethyl acetate/n-hexane to give 5-acetyloxymethyl-1-[4-(2-methylbenzoylamino)benzoyl]-2,3,4,5-tetrahydro-1H-benzazepine (0.43 g) as colorless needles, m.p. 155°-156° C.

EXAMPLE 765

5-Hydroxymethyl-1-[4-(2-methylbenzoylamino)benzoyl]-2,3,4,5-tetrahydro-1H-benzazepine (0.70 g) is dissolved in a mixture (30 ml) of dichloromethane/acetonitrile (1:1) and thereto are added methanesulfonyl chloride (0.8 ml) and pyridine (1.0 ml), and the mixture is refluxed with stirring for 2 hours. After cooling, the reaction solution is evaporated under reduced pressure and to the resulting residue is added water and then extracted with ethyl acetate. The extract is washed successively with diluted hydrochloric acid and saturated saline solution, and dried over magnesium sulfate. The solvent is distilled off and the resulting residue is recrystallized from ethyl acetate/n-hexane to give 5-methanesulfonyloxymethyl-1-[4-(2-methylbenzoylamino)benzoyl]-2,3,4,5-tetrahydro-1H-benzazepine (0.72 g) as white powder, m.p. 189°-190° C.

EXAMPLE 766

5-Methanesulfonyloxymethyl-1-[4-(2-methylbenzoylamino)benzoyl]-2,3,4,5-tetrahydro-1H-benzazepine (0.49 g) is dissolved in a mixture (25 ml) of acetonitrile/dimethylformamide (4:1) and thereto is added sodium azide (0.11 g). The mixture is refluxed with stirring for 3.5 hours. After cooling, the reaction solution is poured into ice-water (40 ml), extracted with ethyl acetate, washed with saturated saline solution, and dried over magnesium sulfate. The solvent is distilled off and the resulting residue is purified by silica gel column chromatography (eluent; ethyl acetate : n-hexane = 1 : 2), and recrystallized from ethyl acetate/n-hexane to give 5-azidomethyl-1-[4-(2-methylbenzoylamino)benzoly]-2,3,4,5-tetrahydro-1H-benzazepine (0.29 g) as white powder, m.p. 188°-189° C.

EXAMPLE 767

5-Azidomethyl-1-[4-(2-methylbenzoylamino)benzoyl]-2,3,4,5-tetrahydro-1H-benzazepine (0.27 g) is suspended in ethanol (50 ml) and the mixture is subjected to catalytic hydrogenation at room temperature under 3 $kg/cm^2$ for 6 hours by using 10% Pd-C (27 mg). The catalyst is removed by filtration with celite and the filtrate is distilled off and the resulting residue is recrystallized from ethanol to give 5-aminomethyl-1-[4-(2-methylbenzoylamino)benzoyl]-2,3,4,5-tetrahydro-1H-benzazepine (0.12 g) as colorless needles, m.p. 233°-235° C.

EXAMPLE 768

To 5,5-epoxy-1-[4-(2-methylbenzoylamino)benzoyl]-2,3,4,5-tetrahydro-1H-benzazepine (0.30 g) is added 30% solution of methylamine in methanol (30 ml), and the mixture is refluxed for 14 hours. After completion of the reaction, the reaction solution is evaporated under reduced pressure and the resulting residue is purified by silica gel column chromatography (eluent; ethyl acetate : n-hexane = 1:1→dichloromethane:methanol:aqueous ammonia = 60:10:1) to give 5-hydroxymethyl-5-methylamino-1-[4-(2-methylbenzoylamino]benzoyl]-2,3,4,5-tetrahydro-1H-benzazepine (A; 35.3 mg) and 5-methylaminomethyl-5-hydroxy-1-[4-(2-methylbenzoylamino)benzoyl]-2,3,4,5-tetrahydro-1H-benzazepine (B; 109 mg).

(A); Colorless amorphous $^1$H-NMR($CDCl_3$) δ; 1.50-2.10 (3H, m), 2.10-2.28 (1H, m), 2.36 (3H, s), 2.48 (3H, s), 2.68-2.97 (1H, m), 3.26-3.47 (1H, m), 4.16 (1H, d, J = 13.8 Hz), 4.25 (1H, d, J = 13.8 Hz), 5.95 (1H, brs), 6.60-6.76 (1H, m), 6.97-7.52 (8H, m), 7.52- 7.73 (2H, m), 7.73-7.97 (2H, m).

(B); White powder (recrystallized from ethyl acetate/n-hexane)

m.p. 176°-179° C.

EXAMPLE 769

5-Methylamino-1-[4-(2-methylbenzoylamino)benzoyl]-2,3,4,5-tetrahydro-1H-benzazepine (1 g) is dissolved in dimethylformamide (10 ml) and thereto are added potassium carbonate (0.5 g) and ethyl iodide (0.45 g). The mixture is stirred at room temperature-overnight. After completion of the reaction, the reaction solution is poured into ice-water and the precipitated crystal is collected by filtration, and purified by silica gel column chromatography (eluent; dichloromethane : methanol = 90:1), and recrystallized from diisopropyl alcohol/petroleum ether to give 5-(N-methyl-N-ethylamino)-1-[4-(2-methylbenzoylamino)benzoyl]-2,3,4,5-tetrahydro-1H-benzazepine (50 mg) as white powder, m. p. 192°-193° C.

Using the suitable starting materials, the compounds of the above Examples 244, 246-248, 330, 339, 342, 346, 350, 366, 375, 376, 406-418, 453, 455, 457, 460, 464, 467, 506, 507, 537-545, 547, 549-556, 561-566, 568-571, 577, 601-603, 607-625, 654-672, 675, 677-681, 691-695, 697, 698, 701-705, 707, 708, 712, 713, 715, 716, 719, 720 and 722-725 are obtained in the same manner as in Example 769.

EXAMPLE 770

To a suspension of 5-methylamino-1-[4-(2-methylbenzoylamino)benzoyl]-2,3,4,5-tetrahydro-1H-benzazepine (3 g) in methanol (30 ml) are added potassium carbonate (1.5 g) and epichlorohydrine (5.7 ml), and the mixture is refluxed for 3 hours. The solvent is distilled off and to the resulting residue is added water and extracted three times with dichloromethane. The extract is washed with saturated saline solution and dried over magnesium sulfate. The resulting residue is purified by silica gel column chromatography (eluent; dichloromethane : methanol =80:1) to give 5-(N-methyl-N-oxiranylmethylamino)-1-[4-(2-methylbenzoylamino)benzoyl]-2,3,4,5-tetrahydro-1H-benzazepine (C; 1.92 g) and 5-[N-methyl-N-(2-hydroxy-3-methoxypropyl)amino]-1-[4-(2-methylbenzoylamino)benzoyl]-2,3,4,5-tetrahydro-1H-benzazepine (D; 0.38 g).

(C); Colorless needles (recrystallization from ethyl acetate)

m.p. 239°-240° C.

(D); Colorless amorphous $^1$H-NMR(CDCl$_3$) δ; 1.35-4.55 (22H, m), 6.3-7.8 (13H, m).

EXAMPLE 771

5-[N-Methyl-N-oxiranylmethylamino)-1-[4-(2-methylbenzoylamino)benzoyl]-2,3,4,5-tetrahydro-1H-benzazepine (0.5 g) is dissolved in methanol (10 ml) and thereto is added diethylamine (0.13 ml). The mixture is refluxed for 3 hours. After completion of the reaction, the solvent is distilled off and the resulting residue is purified by silica gel column chromatography (eluent; dichloromethane:methanol =30:1-dichloromethane:-methanol:aqueous ammonia =9:1:0.1) to give 5-[N-methyl-N-(2-hydroxy-3-diethylaminopropyl)amino]-1-[4-(2-methylbenzoylamino)benzoyl]-2,3,4,5-tetrahydro-1H-benzazepine (0.38 g) as colorless amorphous.

$^1$H-NMR(CDCl$_3$) δ; 1.10 (6H, t, J=7 Hz), 1.35-5.1 (23H, m), 6.55-7.8 (13H, m).

EXAMPLE 772

A solution of 5-hydroxyimino-1-[4-(2-chlorobenzoylamino)benzoyl]-2,3,4,5-tetrahydro-1H-benzazepine (1.06 g) in acetic anhydride (10 ml) and pyridine (10 ml) is stirred at room temperature overnight. After completion of the reaction, the reaction solution is concentrated. To the resulting residue is added water and the mixture is extracted with dichloromethane. The extract is washed with saturated saline solution and dried over magnesium sulfate. The solvent is distilled off and the resulting residue is purified by silica gel column chromatography (eluent; dichloromethane : methanol =80:1), and recrystallized from ethanol/petroleum ether to give 5-acetyloxyimino-1-[4-(2-chlorobenzoylamino)benzoyl]-2,3,4,5-tetrahydro-1H-benzazepine (0.75 g) as colorless prisms, m.p. 142°-144° C.

EXAMPLE 773

Using the suitable starting materials, the compounds of the above Examples 671 and 672 are obtained in the same manner as in Example 380.

EXAMPLE 774

Using the suitable starting materials, the compounds of the above Examples 674, 699, 700, 706, 718 and 730 are obtained in the same manner as in Example 384.

EXAMPLE 775

Using the suitable starting materials, the compounds of the above Examples 654-672, 675, 677-687, 691-695, 697, 698, 701-705, 707, 708, 712, 713, 715, 716 and 719-725 are obtained in the same manner as in Example 390

EXAMPLE 776

Using the suitable starting materials, the compounds of the above Examples 654-672, 675, 677-679, 691-693, 698, 701-705, 707, 708, 712, 713, 715, 716 and 719-725 are obtained in the same manner as in Example 388.

EXAMPLE 777

Using the suitable starting materials, the compounds of the above Examples 705, 706 and 708 are obtained in the same manner as in Example 394.

EXAMPLE 778

Using the suitable starting materials, the compound of the above Example 671 is obtained in the same manner as in Example 397.

EXAMPLE 779

Using the suitable starting materials, the compound of the above Example 672 is obtained in the same manner as in Example 402.

EXAMPLE 780

Using the suitable starting materials, the compound of the above Example 726 is obtained in the same manner as in Example 634.

EXAMPLE 781

Using the suitable starting materials, the compound of the above Example 740 is obtained in the same manner as in Examples 638 and 640.

EXAMPLE 782

Using the suitable starting materials, the compound of the above Example 689 is obtained in the same manner as in Example 643.

EXAMPLE 783

Using the suitable starting materials, the compound of the above Example 690 is obtained in the same manner as in Example 644.

EXAMPLE 784

Using the suitable starting materials, the following compound is obtained in the same manner as in Examples 1, 382, 388 and 390.

5-Dimethylamino-1-[4-(2-methylbenzoylamino)benzoyl]-2,3,4,5-tetrahydro-1H-benzazepine hydrochloride, colorless needles (recrystallized from ethanol/water), m.p. 233°-237° C.

REFERENCE EXAMPLE 13

Using the suitable starting materials, the following compounds are obtained in the same manner as in Reference Example 1.

5-(2-Chloroacetyloxy)-1-(4-nitrobenzoyl)-2,3,4,5-tetrahydro-1H-benzazepine, white powder, m.p. 156°-159° C. (recrystallized from ethyl acetate/n-hexane)

5-(2-Dimethylaminoacetyloxy)-1-(4-nitrobenzoyl)-2,3,4,5-tetrahydro-1H-benzazepine, white powder, m.p. 108°-109° C. (recrystallized from ethyl acetate/n-hexane)

5-Oxo-7-chloro 1-(4-nitrobenzoyl)-2,3,4,5-tetrahydro-1H-benzazepine, white powder, m.p. 157.5°-159.5° C. (recrystallized from diethyl ether/dichloromethane)

5-Oxo-8-chloro-1-(4-nitrobenzoyl)-2,3,4,5-tetrahydro-1H-benzazepine, white powder, m.p. 151.5°-153.5° C. (recrystallized from diethyl ether/dichloromethane)

REFERENCE EXAMPLE 14

Using the suitable starting materials, the following compounds are obtained in the same manner as in Reference Example 2.

5-(2-Dimethylaminoacetyloxy)-1-(4-aminobenzoyl)-2,3,4,5-tetrahydro-1H-benzazepine, colorless amorphous $^1$H-NMR ($CDCl_3$) δ; 1.63-1.98 (2H, m), 1.98-2.25 (1H, m), 2.27 (3H, s), 2.43 (3H, s), 2.65-3.23 (2H, m), 3.38 (2H, s), 3.67 (2H, brs), 4.77-5.28 (1H, m), 6.04-6.31 (1H, m), 6.31-6.56 (2H, m), 6.58-6.86 (1H, m), 6.86-7.46 (5H, m)

5-Oxo-7-chloro-1-(4-aminobenzoyl)-2,3,4,5-tetrahydro-1H-benzazepine, white powder, m.p. 193°-193.5° C. (recrystallized from diethyl ether/dichloromethane)

5-Oxo-8-chloro-1-(4-aminobenzoyl)-2,3,4,5-tetrahydro-1H-benzazepine, white powder, m.p. 171°-174° C. (recrystallized from diethyl ether/dichloromethane)

REFERENCE EXAMPLE 15

Using the suitable starting materials, the following compounds are obtained in the same manner as in Reference Example 1.

5-Dimethylaminocarbonylmethoxy-1-(4-nitrobenzoyl)-2,3,4,5-tetrahydro-1H-benzazepine, white powder, m.p. 129°-131° C. (recrystallized from ethyl acetate/n-hexane)

6-Oxo 1-(4-nitrobenzoyl)-1,2,3,4,5,6-hexahydrobenzazocine, yellow needles $^1$H-NMR ($CDCl_3$) δ; 1.65-2.3 (4H, m), 2.5-5.2 (4H, m), 6.7-6.9 (1H, m), 7.27-7.5 (4H, m), 7.90-8.15 (3H, m)

6-Chloro-5-oxo-1-(4-nitrobenzoyl)-2,3,4,5-tetrahydro-1H benzazepine, white powder, m.p. 198°-202° C. (recrystallized from dichloromethane/diethyl ether)

REFERENCE EXAMPLE 16

Using the suitable starting materials, the following compounds are obtained in the same manner as in Reference Example 2.

5-Dimethylaminocarbonylmethoxy-1-(4-aminobenzoyl)-2,3,4,5-tetrahydro-1H-benzazepine, colorless amorphous $^1$H-NMR ($CDCl_3$) δ; 1.52-2.10 (3H, m), 2.10-3.20 (2H, m), 2.97 (3H, s), 3.05 (3H, s), 4.03-4.48 (2H, m), 4.50-5.35 (2H, m), 6.26-6.57 (2H, m), 6.57-6.88 (1H, m), 6.88-7.76 (5H,m).

6-Oxo-1-(4-aminobenzoyl)-1,2,3,4,5,6-hexahydrobenzazocine, light yellow amorphous $^1$H-NMR ($CDCl_3$) δ; 1.7-2.2 (4H, m), 2.5-5.2 (6H, m), 6.42 (2H, d, J=8.7 Hz), 6.75-6.9 (1H, m), 7.05-7.4 (4H, m), 7.95-8.1 (1H, m).

6-Chloro-5-oxo-1-(4-aminobenzoyl)-2,3,4,5-tetrahydro-1H-benzazepine, white powder, m.p. 166°-169° C. (recrystallized from dichloromethane/diethyl ether)

9-Chloro-5-oxo-1-(4-aminobenzoyl)-2,3,4,5-tetrahydro-1H-benzazepine, yellow powder, m.p. 192.5°-195° C. (recrystallized from dichloromethane/diethyl ether)

REFERENCE EXAMPLE 17

5-Dimethylamino-1-(2-methyl-4-nitrobenzoyl)-2,3,4,5-tetrahydro-1H-benzazepine (86.0 g) is dissolved in ethanol (800 ml), and thereto is added platinum oxide (10 g). The mixture is subjected to hydrogenation at ordinary temperature under atmospheric pressure of hydrogen for 4 hours. The catalyst is removed by filtration, and the solvent is distilled off. The resulting residue is purified by silica gel column chromatography (eluent; dichloromethane:methanol =200:1→100:11), and further purified by silica gel thin layer chromatography (developer; chloroform:methanol =10:1), and recrystallized from methanol/diethyl ether to give 5-dimethylamino-1-(2-methyl-4-aminobenzoyl)-2,3,4,5-tetrahydro-1H-benzazepine (G) (Rf: 0.52, 27.4 g) and 5-dimethylamino-1-(2-methyl-4-amino-benzoyl)-2,3,4,5-tetrahydro-1H-benzazepine (H) (Rf: 0.48, 12.3 g).

(G): White powder

M.p. 154°-156° C.

$[\alpha]_D^{22}=0°$ (c=1.0, chlorform)

$^1$H-NMR ($CDCl_3$) δ; 1.10-1.50 (1H, m), 1.50-2.00 (1H, m), 2.00-2.35 (11H, m), 2.90-5.18 (5H, m), 6.00-6.76 (3H, m), 6.81-7.64 (4H, m)

(H): White powder

M.p. 169.5°-170° C.

$[\alpha]_D^{22}=0°$ (c=1.5, chloroform)

$^1$H-NMR ($CDCl_3$) δ; 1.11-2.90 (13H, m), 2.91-5.23 (5H, m), 6.15-6.53 (1H, m), 6.57-7.62 (6H, m).

Using the suitable starting materials, the compounds of the following Table 5 are obtained in the same manner as in above Examples 1 and 382.

TABLE 5

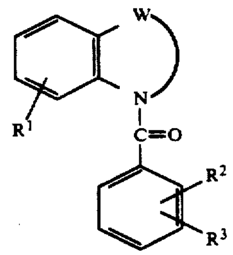

Example 785

Structure

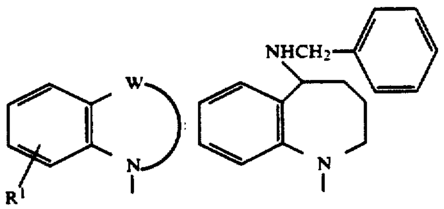

$R^2$: H

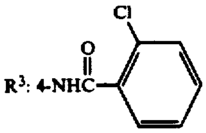

Crystalline form: Colorless needles

Recrystallization solvent: Ethanol

Melting Point: 174-175° C.

Form: Free

Example 786

Structure

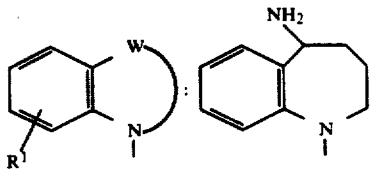

$R^2$: H

-continued

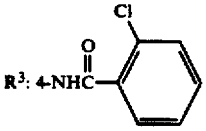

Crystalline form: Colorless prisms
Recrystallization solvent: Ethanol/diethyl ether
Melting Point: 176-178° C.
Form: Free
Example 787
Structure

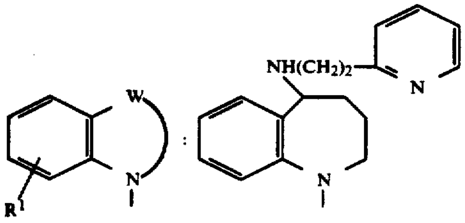

$R^2$: H

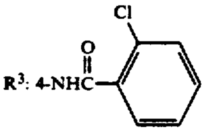

Crystalline form: Colorless prisms
Recrystallization solvent: Ethyl acetate/petroleum ether
Melting Point: 154.5-155° C.
Form: Free
Example 788
Structure

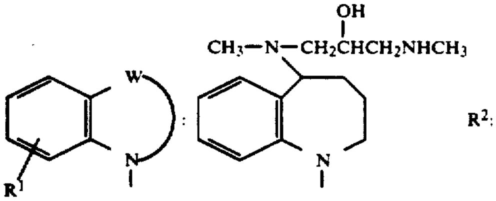

$R^2$: H

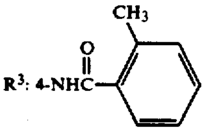

Crystalline form: Colorless amorphous
NMR analysis: 138)
Form: Free
Example 789
Structure

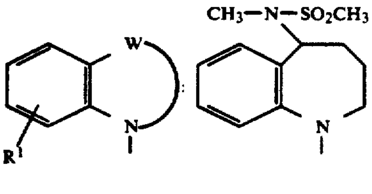

$R^2$: H

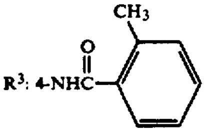

-continued

Crystalline form: Colorless scales
Recrystallization solvent: Ethanol
Melting Point: 197-198° C.
Form: Free
Example 790
Structure

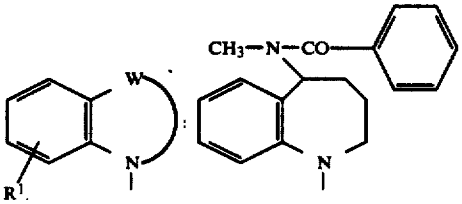

$R^2$: H

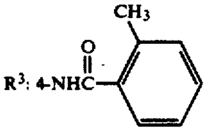

Crystalline form: Colorless needles
Recrystallization solvent: Ethanol
Melting Point: 248-249° C.
Form: Free
Example 791
Structure

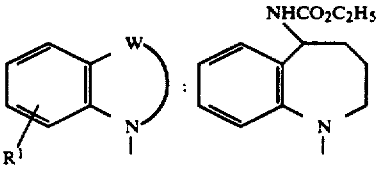

$R^2$: H

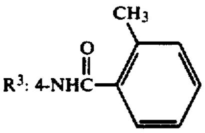

Crystalline form: Colorless needles
Recrystallization solvent: Ethanol/n-hexane
Melting Point: 162-163° C.
Form: Free
Example 792
Structure

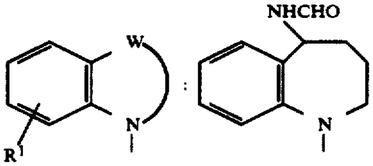

$R^2$: H

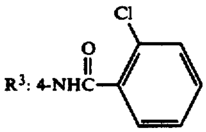

Crystalline form: Colorless prisms
Recrystallization solvent: Ethanol/petroleum ether
Melting Point: 235-236.5° C.
Form: Free
Example 793
Structure -continued

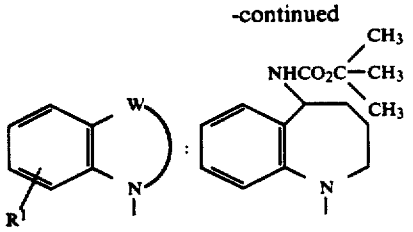

R²: H

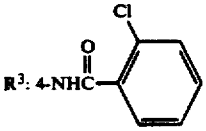

Crystalline form: Colorless amorphous
NMR analysis: 139)
Form: Free
Example 794
Structure

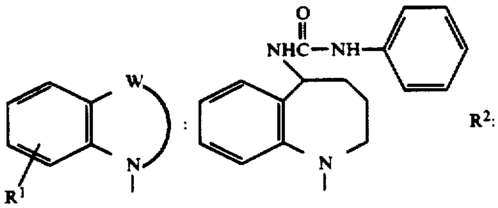

R²: H

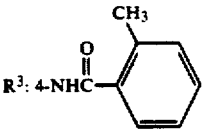

Crystalline form: Colorless prisms
Recrystallization solvent: Dioxane
Melting Point: 269–271° C.
Form: Free
Example 795
Structure

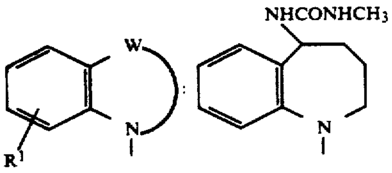

R²: H

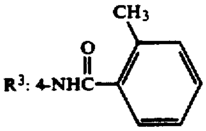

Crystalline form: Colorless prisms
Recrystallization solvent: Dimethylformamide
Melting Point: 286–287° C.
Form: Free
Example 796
Structure

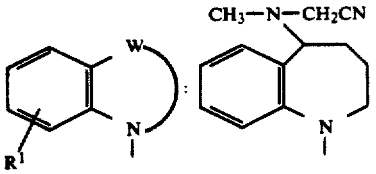

R²: H

-continued

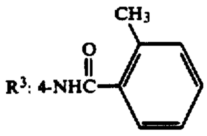

Crystalline form: Colorless needles
Recrystallization solvent: Acetonitrile
Melting Point: 227–228° C.
Form: Free
Example 797
Structure

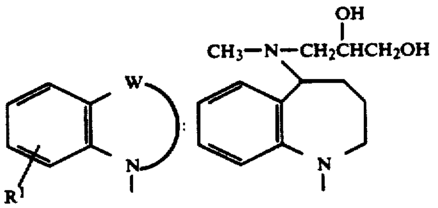

R²: H

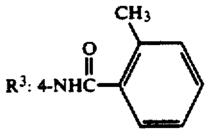

Crystalline form: Colorless amorphous
NMR analysis: 140)
Form: Free
Example 798
Structure

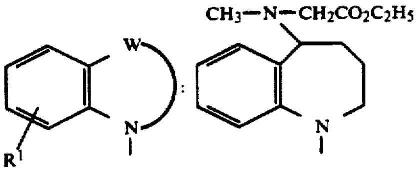

R²: H

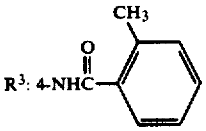

Crystalline form: Colorless prisms
Recrystallization solvent: Ethyl acetate/petroleum ether
Melting Point: 167–168° C.
Form: Free
Example 799
Structure

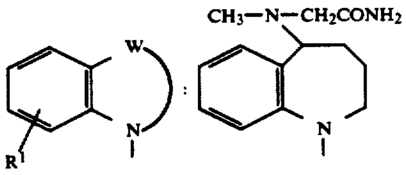

R²: H

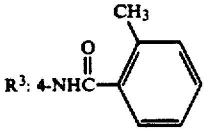

Crystalline form: Colorless amorphous
NMR analysis: 141)
Example 800
Structure

-continued

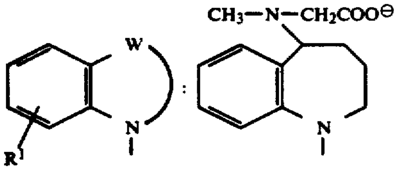

$R^2$: H

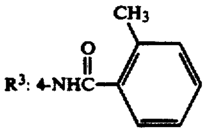

Crystalline form: Colorless needles
Recrystallization solvent: Diethyl ether
Melting Point: 164–171° C.
Form: K⊕
Example 801
Structure

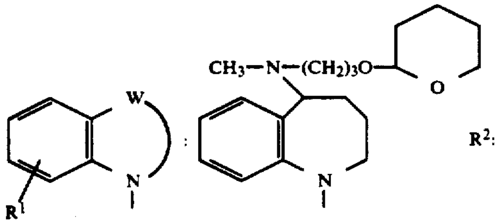

$R^2$: H

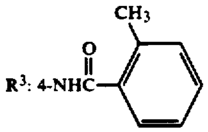

Crystalline form: Colorless amorphous
NMR analysis: 142)
Form: Free
Example 802
Structure

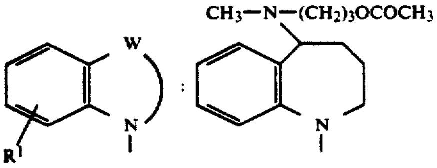

$R^2$: H

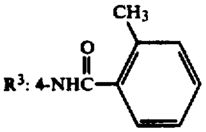

Crystalline form: Colorless amorphous
NMR analysis: 143)
Form: Free
Example 803
Structure

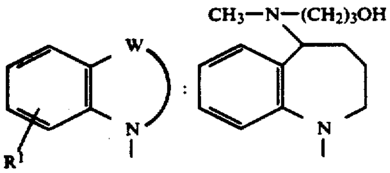

$R^2$: H

-continued

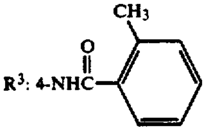

Crystalline form: Colorless amorphous
NMR analysis: 144)
Form: Free
Example 804
Structure

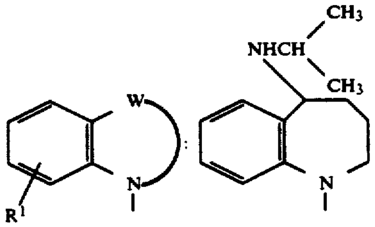

$R^2$: H

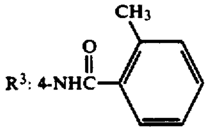

Crystalline form: Colorless amorphous
NMR analysis: 145)
Form: Free
Example 805
Structure

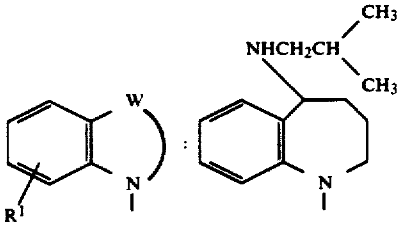

$R^2$: H

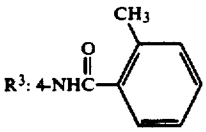

Crystalline form: Colorless needles
Recrystallization solvent: Ethanol
Melting Point: 207–208° C.
Form: Free
Example 806
Structure

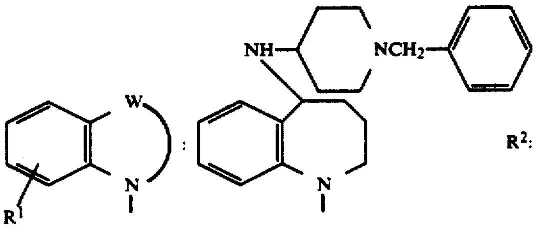

$R^2$: H

-continued

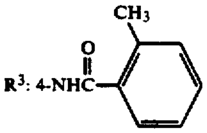

Crystalline form: White powder
Recrystallization solvent: Dichloromethane/diethyl ether
Melting Point: 187-189° C.
Form: Free
Example 807
Structure

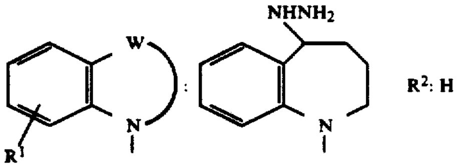

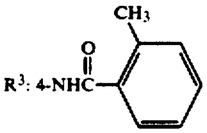

Crystalline form: Colorless prisms
Recrystallization solvent: Ethanol/petroleum ether
Melting Point: 217-218° C.
Form: Free
Example 808
Structure

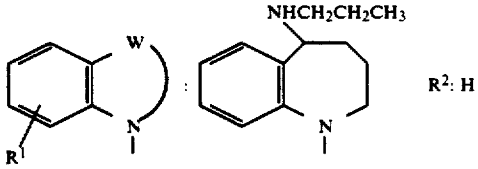

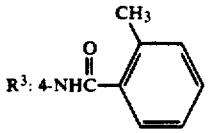

Crystalline form: Colorless needles
Recrystallization solvent: Ethyl acetate
Melting Point: 170-171° C.
Form: Free
Example 809
Structure

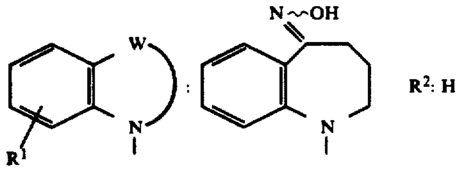

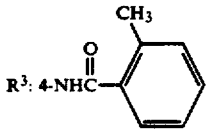

Crystalline form: Colorless prisms
Recrystallization solvent: Ethanol
Melting Point: 239.5-241° C.
Form: Free
Example 810

-continued

Structure

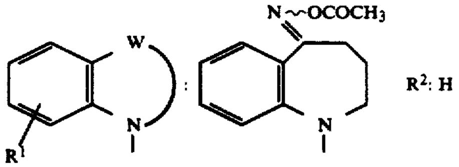

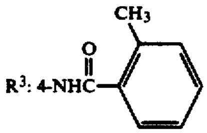

Crystalline form: Colorless needles
Recrystallization solvent: Ethanol
Melting Point: 190-191° C.
Form: Free
Example 811
Structure

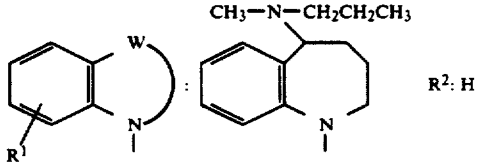

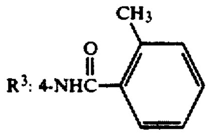

Crystalline form: Colorless prisms
Recrystallization solvent: Diethyl ether
Melting Point: 163-163.5° C.
Form: Free
Example 812
Structure

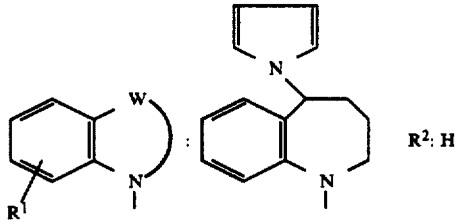

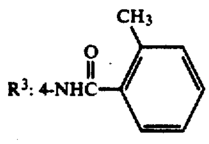

Crystalline form: Colorless prisms
Recrystallization solvent: Ethyl acetate/n-hexane
Melting Point: 208-210° C.
Form: Free
Example 813
Structure -continued

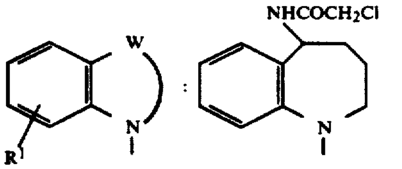

R²: H

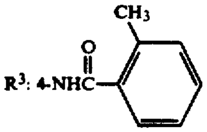

Crystalline form: White powder
NMR analysis: 146)
Form: Free
Example 814
Structure

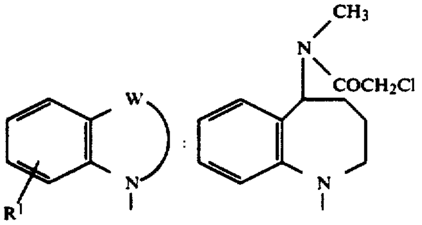

R²: H

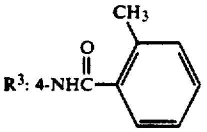

Crystalline form: Colorless amorphous
NMR analysis: 147)
Form: Free
Example 815
Structure

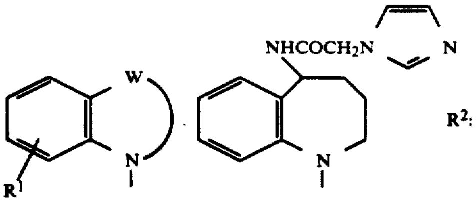

R²: H

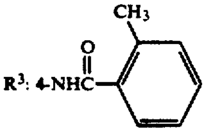

Crystalline form: Colorless needles
Recrystallization solvent: Ethanol/n-hexane
Melting Point: 250–252° C.
Form: Free
Example 816
Structure -continued

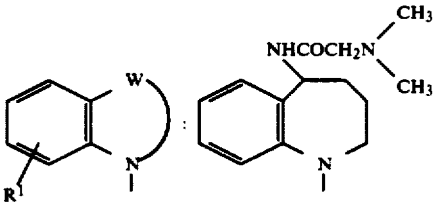

R²: H

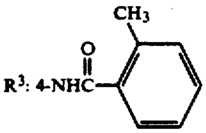

Crystalline form: Colorless prisms
Recrystallization solvent: Ethyl acetate
Melting Point: 214–216° C.
Form: Free
Example 817
Structure

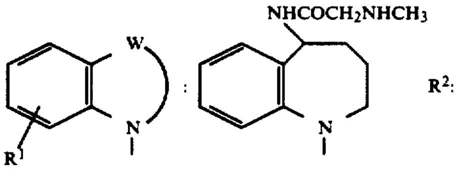

R²: H

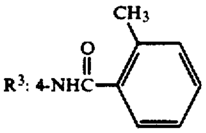

Crystalline form: Colorless prisms
Recrystallization solvent: Ethanol/n-hexane
Melting Point: 243–245° C.
Form: Free
Example 818
Structure

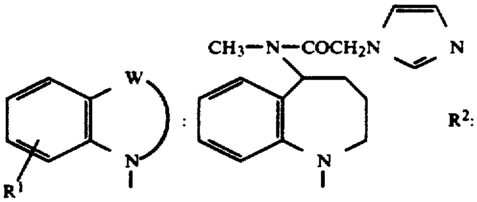

R²: H

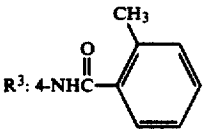

Crystalline form: Colorless prisms
Recrystallization solvent: Diethyl ether
Melting Point: 159–162° C.
Form: Free
Example 819
Structure -continued

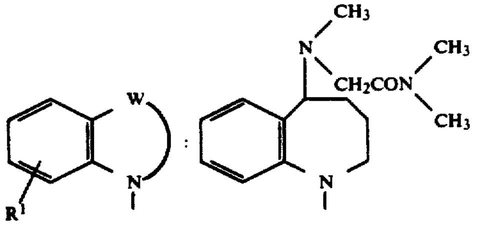

$R^2$: H $R^3$: 4-NHC— 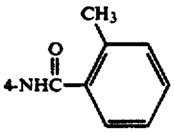

Crystalline form: Colorless amorphous
NMR analysis: 148)
Form: Free
Example 820
Structure

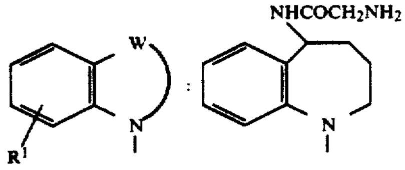

$R^2$: H $R^3$: 4-NHC— 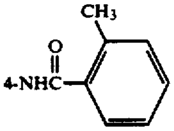

Crystalline form: Colorless prisms
Recrystallization solvent: Ethyl acetate
Melting Point: 287-289° C.
Form: Free
Example 821
Structure

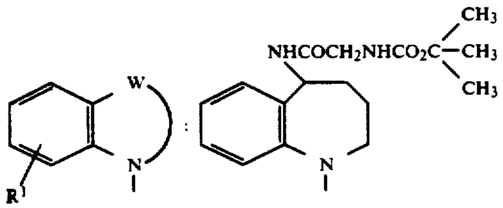

$R^2$: H $R^3$: 4-NHC— 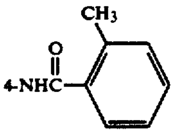

Crystalline form: Colorless prisms
Recrystallization solvent: Diethyl ether
Melting Point: 170-171° C.
Form: Free
Example 822
Structure

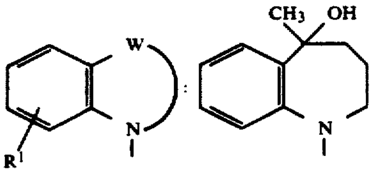

$R^2$: H

-continued $R^3$: 4-NHC— 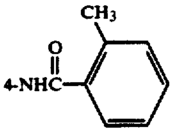

Crystalline form: White powder
Recrystallization solvent: Ethyl acetate/n-hexane
Melting Point: 204-205° C.
Form: Free
Example 823
Structure

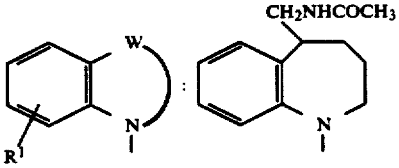

$R^2$: H $R^3$: 4-NHC— 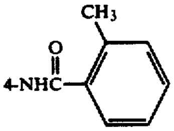

Crystalline form: White powder
Recrystallization solvent: Ethyl acetate/n-hexane
Melting Point: 273-273.5° C.
Form: Free
Example 824
Structure

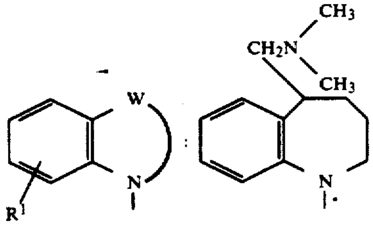

$R^2$: H $R^3$: 4-NHC— 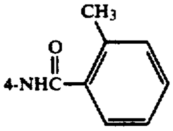

Crystalline form: Colorless amorphous
NMR analysis: 149)
Form: Free
Example 825
Structure

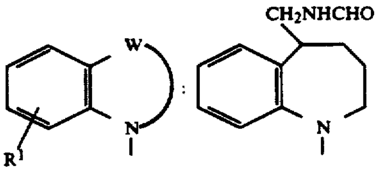

$R^2$: H $R^3$: 4-NHC— 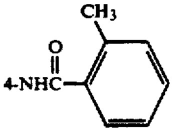

Crystalline form: White powder
Recrystallization solvent: Ethyl acatete/n-hexane -continued Melting Point: 240–241° C.
Form: Free
Example 826
Structure

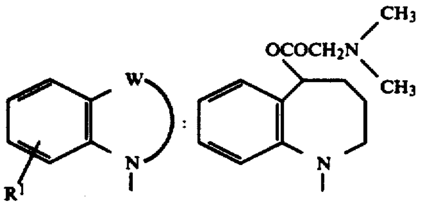

R²: H

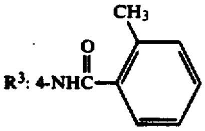

Crystalline form: White powder
Recrystallization solvent: Acetonitrile/ethanol
Melting Point: 231–232° C.
Form: Free
Example 827
Structure

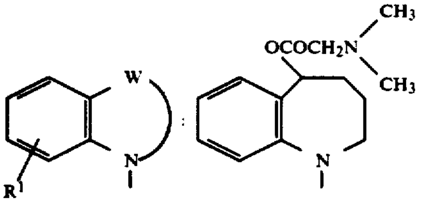

R²: H

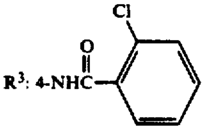

Crystalline form: White powder
Recrystallization solvent: Acetonitrile/ethanol
Melting Point: 222–224° C.
Form: Free
Example 828
Structure

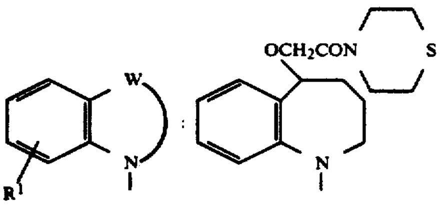

R²: H

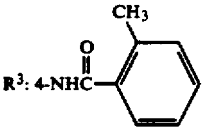

Crystalline form: White powder
Recrystallization solvent: Ethyl acetate/n-hexane
Melting Point: 235–237° C.
Form: Free
Example 829
Structure -continued

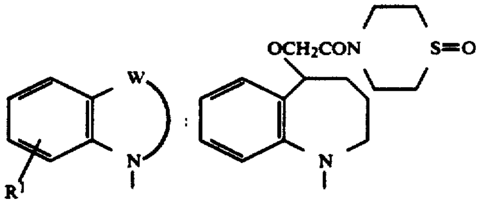

R²: H

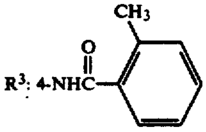

Crystalline form: Colorless amorphous
NMR analysis: 150)
Form: Free
Example 830
Structure

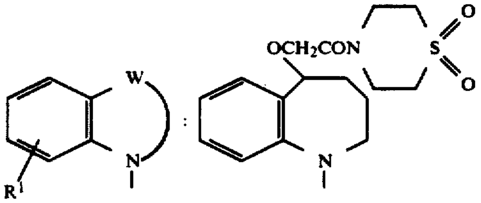

R²: H

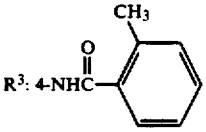

Crystalline form: Colorless amorphous
NMR analysis: 151)
Form: Free
Example 831
Structure

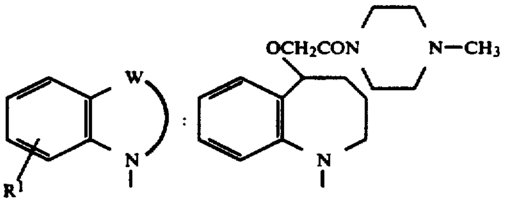

R²: H

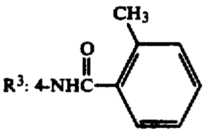

Crystalline form: Colorless amorphous
NMR analysis: 152)
Form: Free
Example 832
Structure -continued

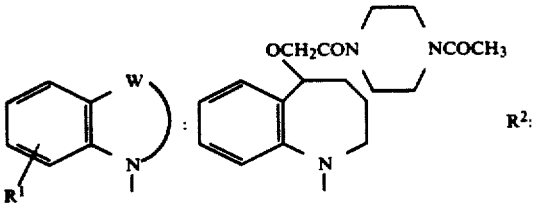

R²: H

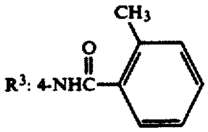

Crystalline form: Colorless amorphous
NMR analysis: 153)
Form: Free
Example 834
Structure

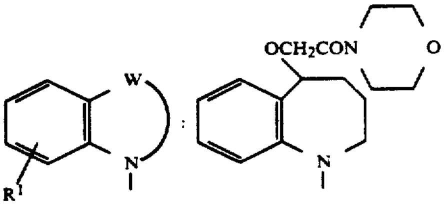

R²: H

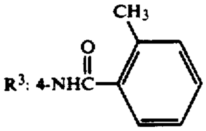

Crystalline form: White powder
Recrystallization solvent: Ethyl acetate/n-hexane
Melting Point: 247-248° C.
Form: Free
Example 835
Structure

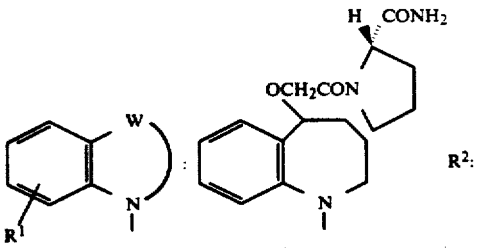

R²: H

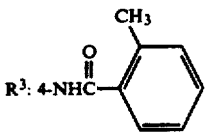

Crystalline form: Colorless amorphous
NMR analysis: 154)
Form: Free
Example 836
Structure -continued

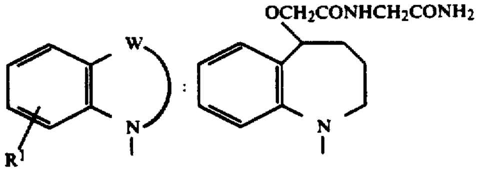

R²: H

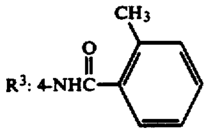

Crystalline form: Colorless amorphous
NMR analysis: 155)
Form: Free
Example 837
Structure

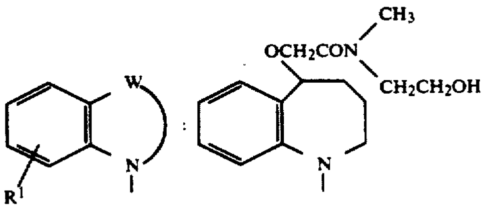

R²: H

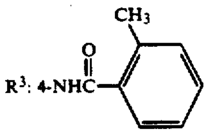

Crystalline form: Colorless amorphous
NMR analysis: 156)
Form: Free
Example 838
Structure

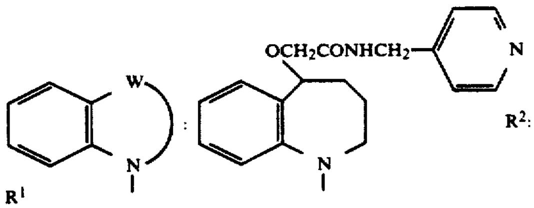

R²: H

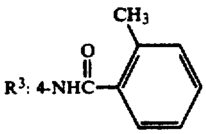

Crystalline form: Colorless amorphous
NMR analysis: 157)
Form: Free
Example 839
Structure

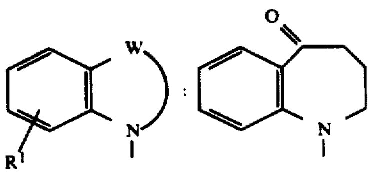

R²: H

-continued

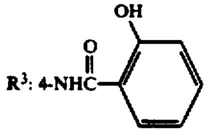

Crystalline form: White powder
Recrystallization solvent: Ethyl acetate/n-hexane
Melting Point: 234–235° C.
Form: Free
Example 840
Structure

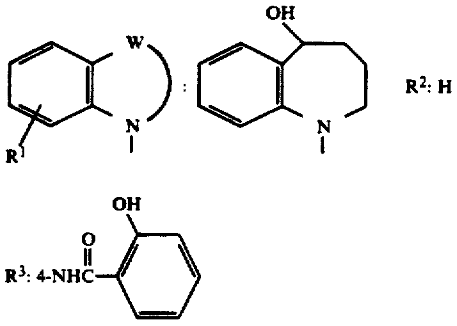

Crystalline form: White powder
Recrystallization solvent: Ethyl acetate/n-hexane
Melting Point: 234–235° C.
Form: Free
Example 841
Structure

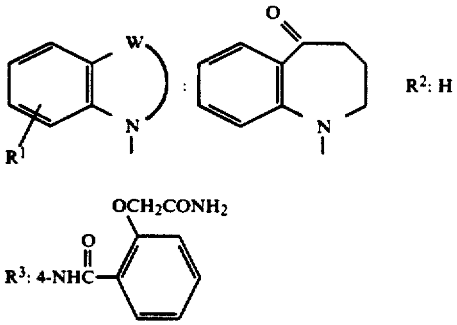

Crystalline form: White powder
Recrystallization solvent: Ethyl acetate/n-hexane
Melting Point: 226–228° C.
Form: Free
Example 842
Structure

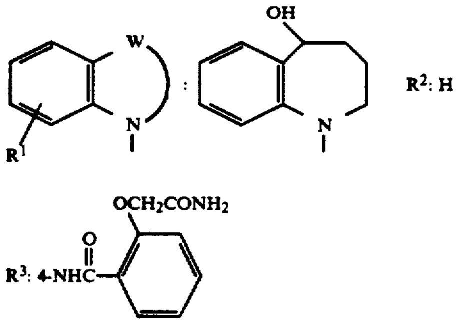

Crystalline form: White powder
Recrystallization solvent: Ethyl acetate/n-hexane
Melting Point: 230–231° C.
Form: Free
Example 843

-continued

Structure

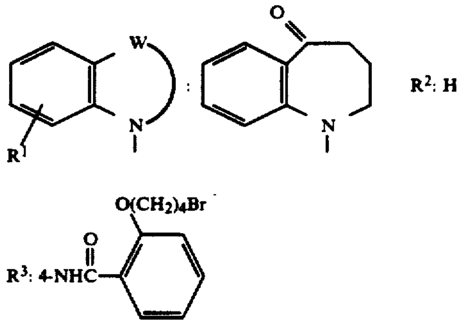

Crystalline form: White powder
Recrystallization solvent: Ethyl acetate/n-hexane
Melting Point: 186–188° C.
Form: Free
Example 844
Structure

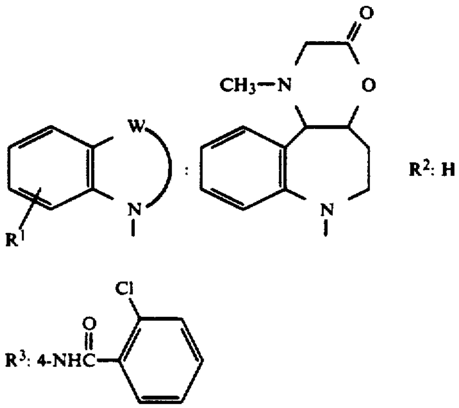

Crystalline form: Colorless prisms
Recrystallization solvent: Chloroform/methanol
Melting Point: 286–290° C.
Form: Free Example 845
Structure

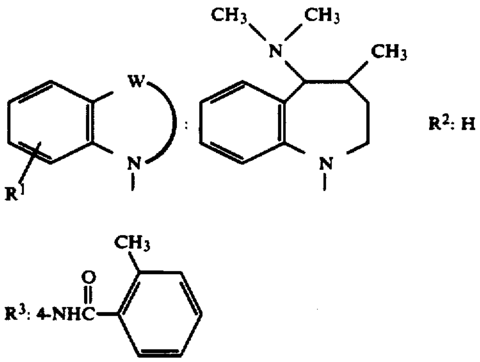

Crystalline form: Colorless needles
Recrystallization solvent: Ethanol
Melting Point: 186–188.5° C.
Form: Free
Example 846
Structure -continued

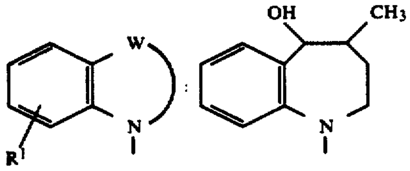

R$^2$: H

R$^3$:

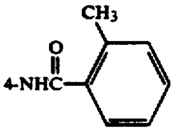

Crystalline form: Colorless prisms
Recrystallization solvent: Ethanol
Melting Point: 220–222° C.
Form: Free
Example 847
Structure

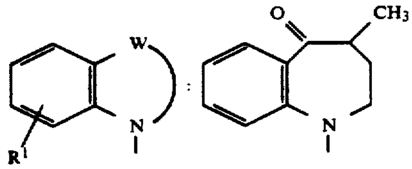

R$^2$: H

R$^3$:

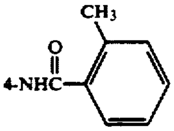

Crystalline form: White powder
NMR analysis: 158)
Form: Free
Example 848
Structure

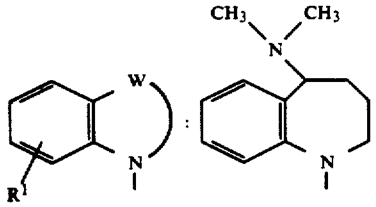

R$^2$: H

R$^3$: 4-NHCOCH$_2$CONH$_2$

Crystalline form: Colorless prisms
Recrystallization solvent: Dichloromethane/diethyl ether
Melting Point: 189–192° C.
Form: Free
Example 849
Structure

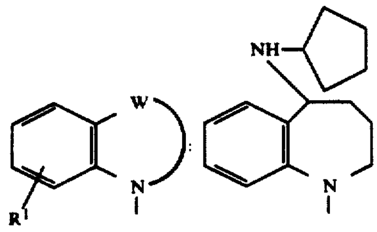

R$^2$: 2-Cl

-continued

R$^3$:

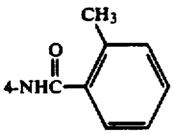

Crystalline form: Colorless amorphous
NMR analysis: 159)
Form: Free
Example 850
Structure

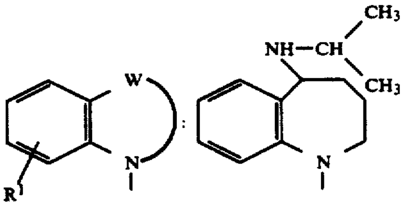

R$^2$: 2-Cl

R$^3$:

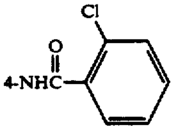

Crystalline form: White powder
Recrystallization solvent: Dichloromethane/diethyl ether
Melting Point: 207–209° C. (decomposed)
Form: Free
Example 851
Structure

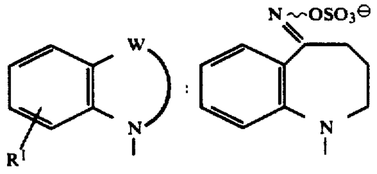

R$^2$: 2-Cl

R$^3$:

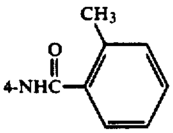

Crystalline form: White powder
NMR analysis: 160)
Form: K$^{\oplus}$
Example 852
Structure

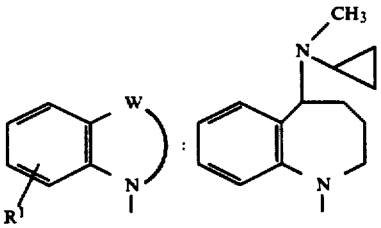

R$^2$: 2-Cl

R$^3$:

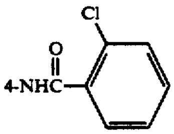

Crystalline form: White powder
Recrystallization solvent: Dichloromethane/diethyl ether -continued Melting Point: 193-194° C.
Form: Free
Example 853
Structure

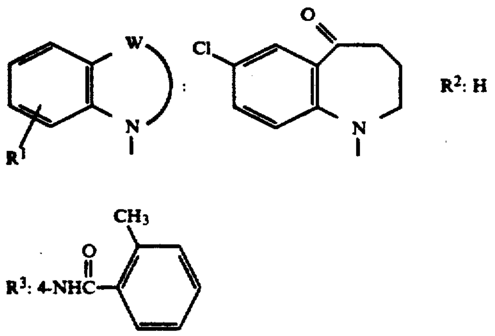

Crystalline form: White powder
Recrystallization solvent: Diethyl ether/dichloromethane
Melting Point: 185.5-186° C.
Form: Free
Example 854
Structure

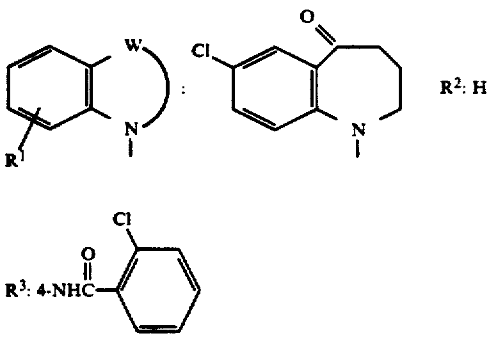

Crystalline form: White powder
Recrystallization solvent: Diethyl ether/dichloromethane
Melting Point: 223.5-226° C. (decomposed)
Form: Free
Example 855
Structure

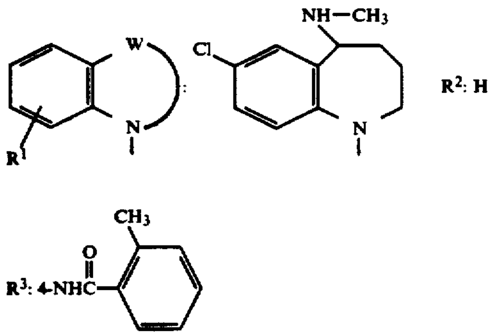

Crystalline form: Colorless amorphous
NMR analysis: 161)
Form: Free
Example 856
Structure -continued

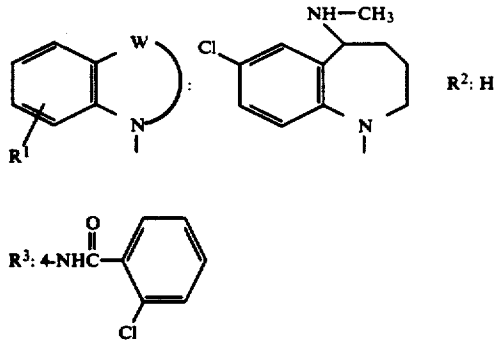

Crystalline form: White powder
Recrystallization solvent: Diethyl ether/dichloromethane
Melting Point: 225.5-227° C.
Form: Free
Example 857
Structure

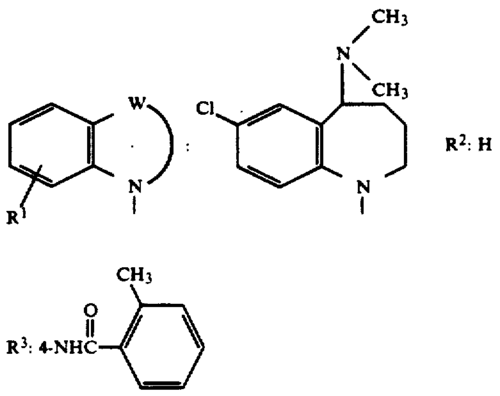

Crystalline form: White powder
Recrystallization solvent: Diethyl ether/dichloromethane
Melting Point: 212-214° C.
Form: Free
Example 858
Structure

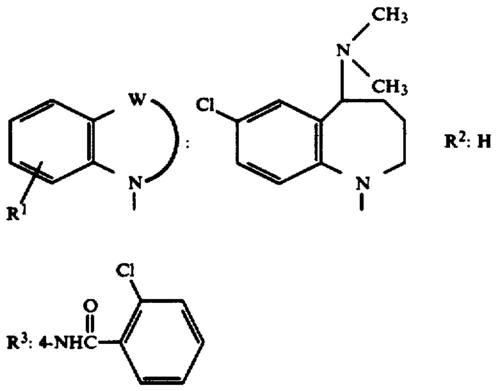

Crystalline form: White powder
Recrystallization solvent: Diethyl ether/dichloromethane
Melting Point: 230.5-233° C.
Form: Free
Example 859
Structure -continued

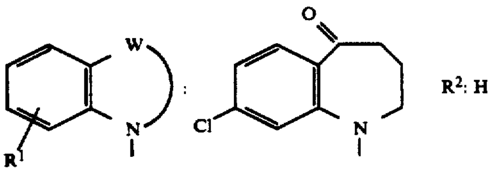

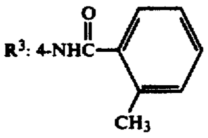

Crystalline form: White powder
Recrystallization solvent: Diethyl ether/dichloromethane
Melting Point: 212.5–215° C. (decomposed)
Form: Free
Example 860
Structure

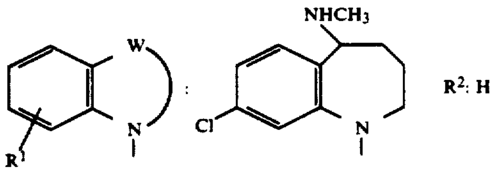

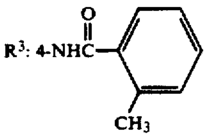

Crystalline form: White powder
Recrystallization solvent: Diethyl ether/dichloromethane
Melting Point: 192–194.5° C.
Form: Free
Example 861
Structure

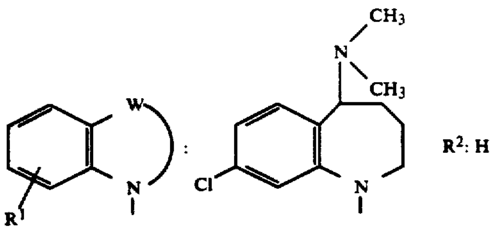

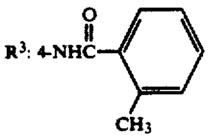

Crystalline form: White powder
Recrystallization solvent: Diethyl ether/dichloromethane
Melting Point: 175–177° C.
Form: Free
Example 862
Structure -continued

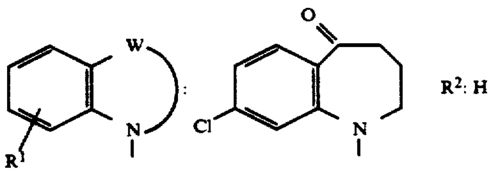

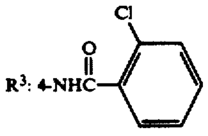

Crystalline form: White powder
Recrystallization solvent: Diethyl ether/dichloromethane
Melting Point: 208.5–209.5° C.
Form: Free
Example 863
Structure

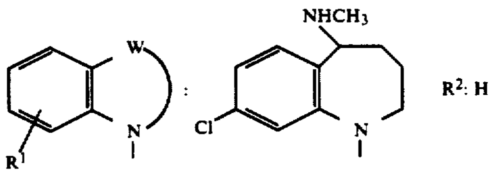

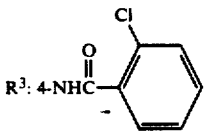

Crystalline form: White powder
Recrystallization solvent: Diethyl ether/dichloromethane
Melting Point: 191–193.5° C.
Form: Free
Example 864
Structure

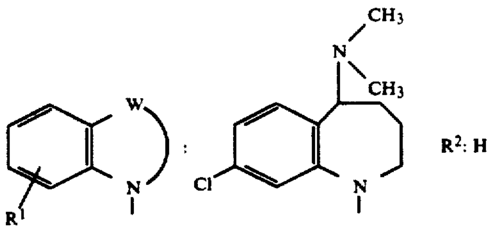

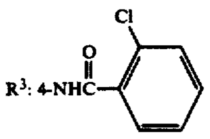

Crystalline form: White powder
Recrystallization solvent: Diethyl ether/dichloromethane
Melting Point: 204–205.5° C.
Form: Free
Example 865
Structure -continued

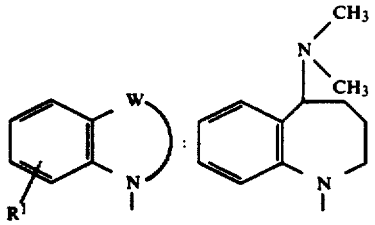

$R^2$: H

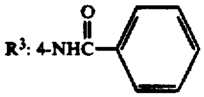

Crystalline form: Light yellow prisms
Recrystallization solvent: Ethanol
Melting Point: 221-223° C.
Form: Free
Example 866
Structure

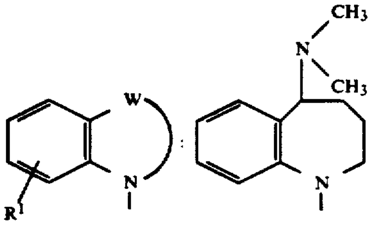

$R^2$: H

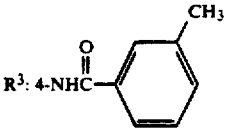

Crystalline form: Colorless prisms
Recrystallization solvent: Ethyl acetate
Melting Point: 171-173° C.
Form: Free
Example 867
Structure

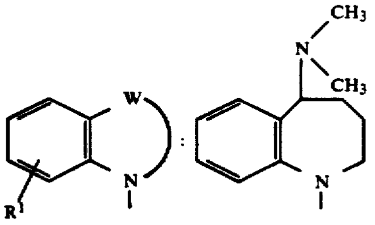

$R^2$: H

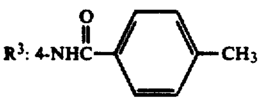

Crystalline form: Colorless prisms
Recrystallization solvent: Ethyl acetate
Melting Point: 185-187° C.
Form: Free
Example 868
Structure -continued

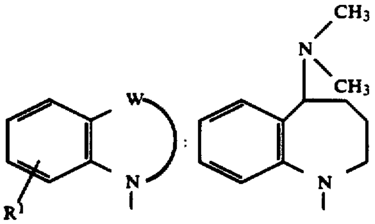

$R^2$: H

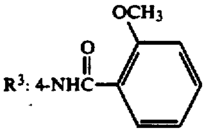

Crystalline form: Colorless prisms
Recrystallization solvent: Ethanol
Melting Point: 190-192° C.
Form: Free
Example 869
Structure

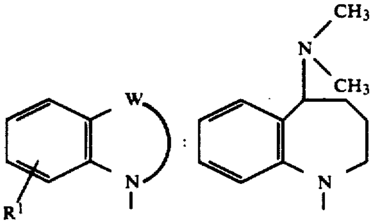

$R^2$: H

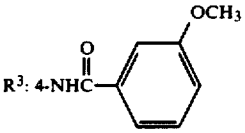

Crystalline form: Colorless prisms
Recrystallization solvent: Ethanol
Melting Point: 175-177° C.
Form: Free
Example 870
Structure

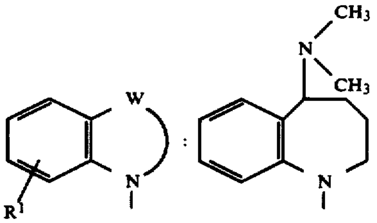

$R^2$: H

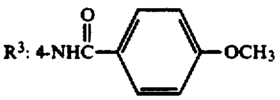

Crystalline form: Colorless powder
Recrystallization solvent: Ethyl acetate/n-hexane
Melting Point: 148-151° C.
Form: Free
Example 871
Structure -continued

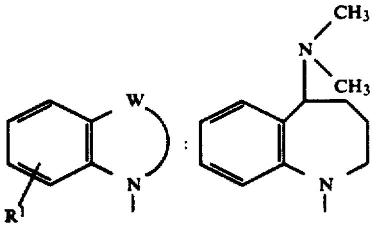

R²: H

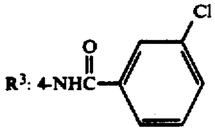

Crystalline form: Colorless prisms
Recrystallization solvent: Ethanol
Melting Point: 200-202° C.
Form: Free
Example 872
Structure

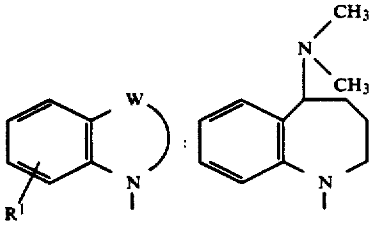

R²: H

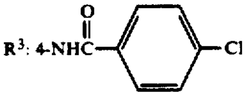

Crystalline form: Colorless prisms
Recrystallization solvent: Ethanol
Melting Point: 200-202° C.
Form: Free
Example 873
Structure

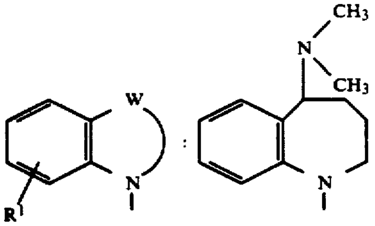

R²: H

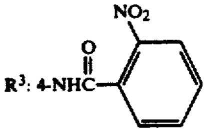

Crystalline form: Light yellow powder
Recrystallization solvent: Acetone
Melting Point: 235-238° C.
Form: Free
Example 874
Structure -continued

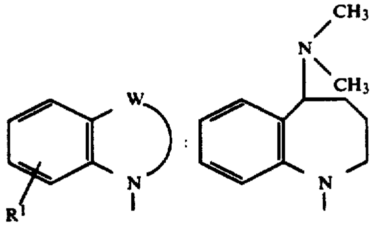

R²: H

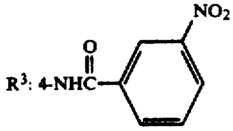

Crystalline form: Light yellow powder
Recrystallization solvent: Acetone
Melting Point: 198-201° C.
Form: Free
Example 875
Structure

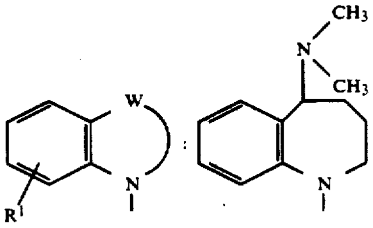

R²: H

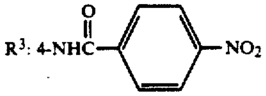

Crystalline form: Light yellow needles
Recrystallization solvent: Chloroform/ethyl acetate
Melting Point: 232-237° C.
Form: Free
Example 876
Structure

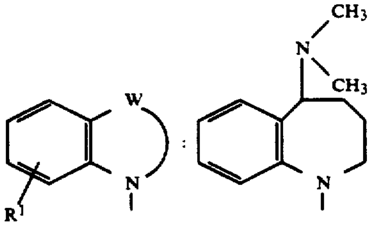

R²: H

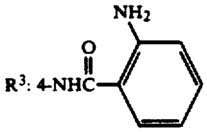

Crystalline form: Colorless prisms
Recrystallization solvent: Chloroform/ethyl acetate
Melting Point: 224-227° C.
Form: Free
Example 877
Structure -continued

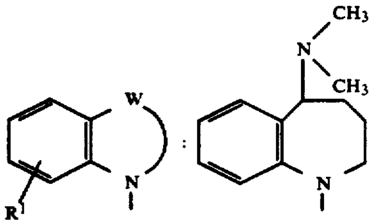

$R^2$: H

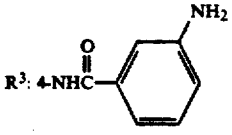

Crystalline form: Colorless prisms
Recrystallization solvent: Ethanol
Melting Point: 211-214° C.
Form: Free
Example 878
Structure

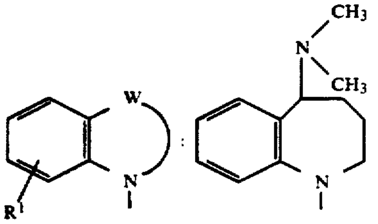

$R^2$: H

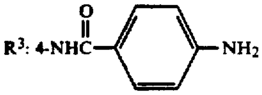

Crystalline form: Colorless powder
Recrystallization solvent: Dichloromethane/n-hexane
Melting Point: 238-243° C.
Form: Free
Example 879
Structure

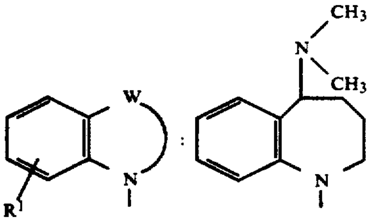

$R^2$: H

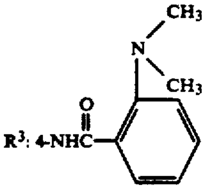

Crystalline form: Colorless amorphous
NMR analysis: 162)
Form: Free
Example 880
Structure -continued

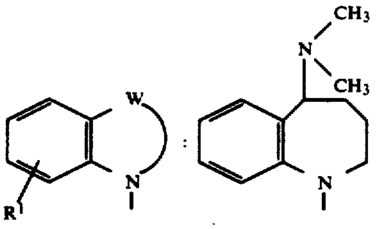

$R^2$: H

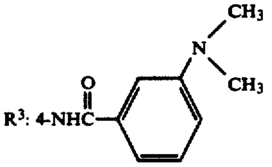

Crystalline form: Colorless amorphous
NMR analysis: 163)
Form: Free
Example 881
Structure

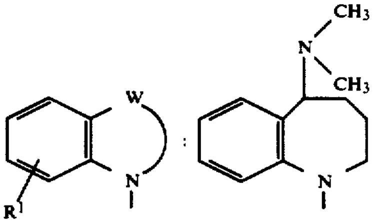

$R^2$: H

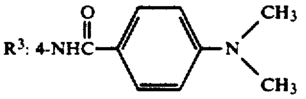

Crystalline form: Colorless prisms
Recrystallization solvent: Dichloromethane/diethyl ether
Melting Point: 198-202° C.
Form: Free
Example 882
Structure

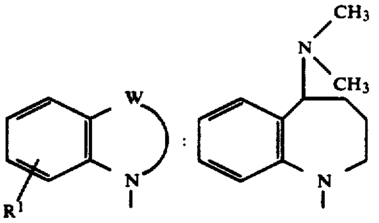

$R^2$: H

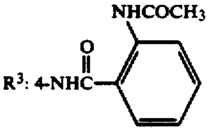

Crystalline form: Colorless prisms
Recrystallization solvent: Chloroform/ethyl acetate
Melting Point: 226-229° C.
Form: Free
Example 883
Structure -continued

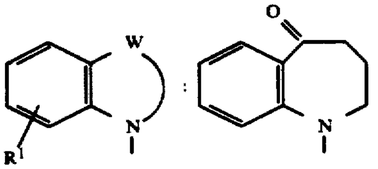

R²: 2-CH₃

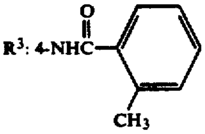

Crystalline form: White powder
Recrystallization solvent: Methanol/diethyl ether
Melting Point: 139–140° C.
Form: Free
Example 884
Structure

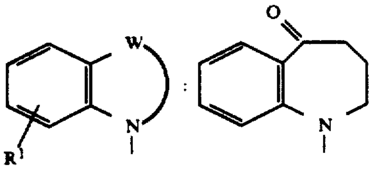

R²: 2-CH₃

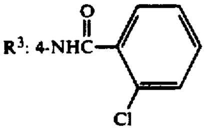

Crystalline form: White powder
Recrystallization solvent: Methanol/diethyl ether
Melting Point: 149–152° C.
Form: Free
Example 885
Structure

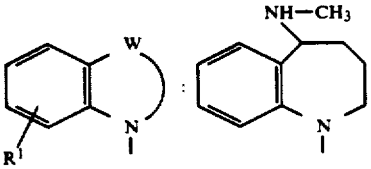

R²: 2-CH₃

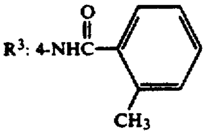

Crystalline form: White powder
Recrystallization solvent: Methanol/diethyl ether
Melting Point: 180.5–182° C.
Form: Free
Example 886
Structure

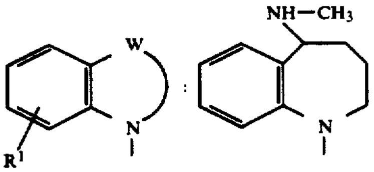

R²: 2-CH₃

-continued

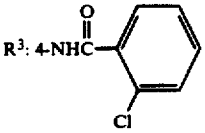

Crystalline form: White powder
Recrystallization solvent: Chloroform/diethyl ether
Melting Point: 211–214° C.
Form: Free
Example 887
Structure

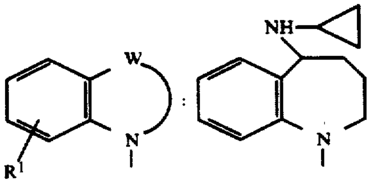

R²: 2-CH₃

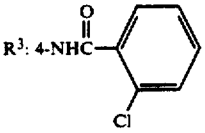

Crystalline form: White powder
Recrystallization solvent: Chloroform/diethyl ether
Melting Point: 171–174.5° C.
Form: Free
Example 888
Structure

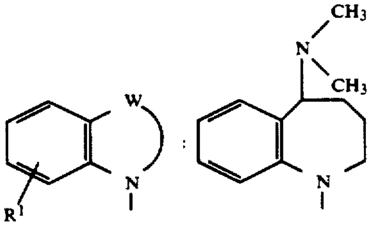

R²: H

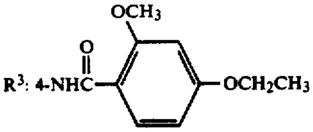

Crystalline form: White powder
Recrystallization solvent: Methanol/diethyl ether
Melting Point: 203–205° C.
Form: Free
Example 889
Structure

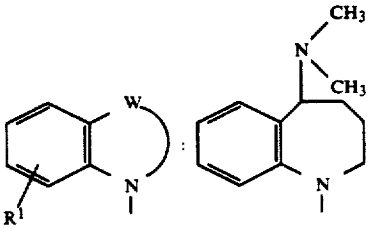

R²: 3-OCH₃

-continued

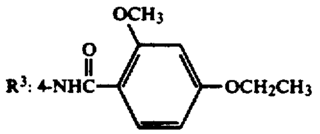

Crystalline form: White powder
Recrystallization solvent: Ethanol
Melting Point: 202-202.5
Form: Free
Example 890
Structure

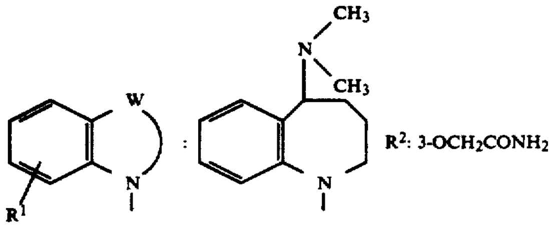

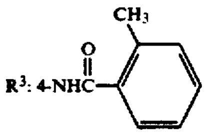

Crystalline form: White powder
Recrystallization solvent: Methanol/diethyl ether
Melting Point: 130-133° C.
Form: Free
Example 891
Structure

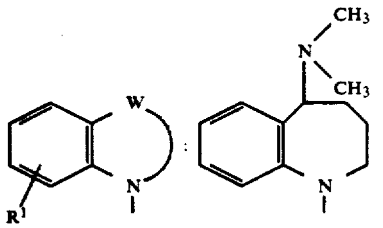

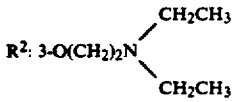

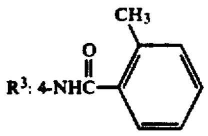

Crystalline form: White powder
Recrystallization solvent: Methanol/n-hexane
Melting Point: 104.5-106° C.
Form: Free
Example 892
Structure

-continued

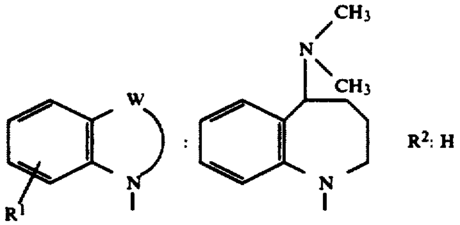

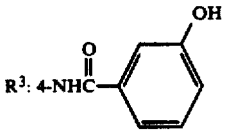

Crystalline form: White powder
Recrystallization solvent: Methanol/diethyl ether
Melting Point: 197-198° C.
Form: Free
Example 893
Structure

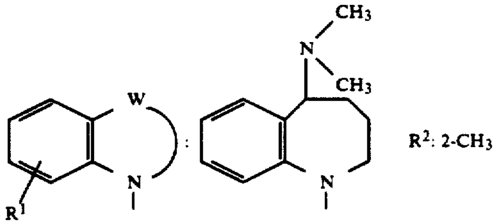

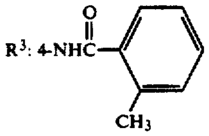

Crystalline form: White powder
Recrystallization solvent: Dichloromethane/ethyl acetate
Melting Point: 191-192° C.
Form: Free
Example 894
Structure

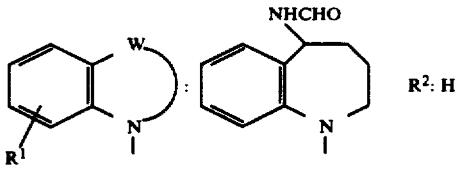

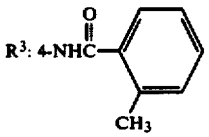

Crystalline form: Colorless columnar
Recrystallization solvent: Ethanol/petroleum ether
Melting Point: 211-213° C.
Form: Free
Example 895
Structure

-continued

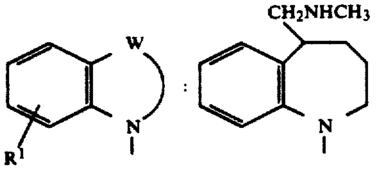

$R^2$: H

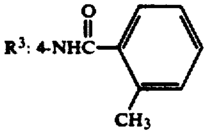

Crystalline form: Colorless amorphous
NMR analysis: 164)
Form: Free
Example 896
Structure

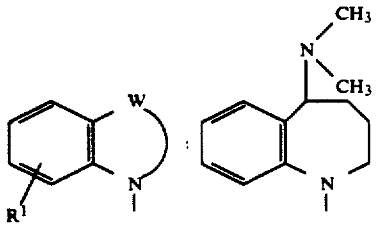

$R^2$: H

Crystalline form: Colorless amorphous
NMR analysis: 165)
Form: Free
Example 897
Structure

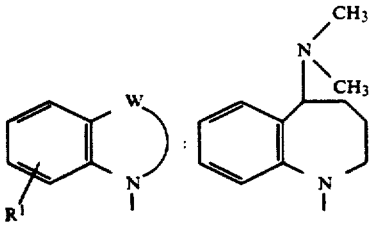

$R^2$: H

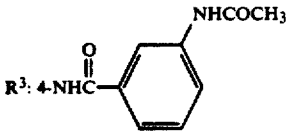

Crystalline form: Colorless amorphous
NMR analysis: 166)
Form: Free
Example 898
Structure

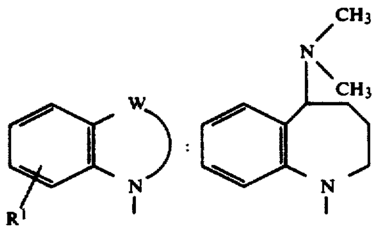

$R^2$: H

-continued

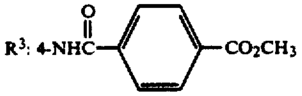

Crystalline form: Colorless prisms
Recrystallization solvent: Ethanol
Melting Point: 224-228° C.
Form: Free 138) $^1$H-NMR(CDCl$_3$)δ; 1.3-2.95(19H, m), 3.05-3.3(1H, m), 3.85-4.1(2H, m), 4.3-4.6(1H, m), 6.64(1H, d, J=7.8Hz), 6.9-7.8(12H, m)

139) $^1$H-NMR(CDCl$_3$)δ; 1.1-2.3(13H, m), 2.65-3.2(1H, m), 4.55-5.6(3H, m), 6.55-6.7(1H, m), 6.9-7.6 (12H, m)

140) $^1$H-NMR(CDCl$_3$)δ; 1.3-4.15(19H, m), 4.3-5.0(1H, m), 6.65(1H, d, J=7.7Hz), 6.9-8.05(12H, m)

141) $^1$H-NMR(CDCl$_3$)δ; 1.4-3.0(9H, m), 3.05-3.6(3H, m), 3.9-4.1(1H, m), 4.35-4.55(1H, m), 4.9-5.65 (1H, m), 6.67(1H, d, J=7.4Hz), 6.85-7.6(12H, m), 7.6-7.85(2H, m)

142) $^1$H-NMR(CDCl$_3$)δ; 1.3-2.85(21H, m), 3.2-4.0(4H, m), 4.3-4.4(1H, m), 4.45-5.2(2H, m), 6.61(1H, d, J=7.6Hz), 6.9-7.65(12H, m)

143) $^1$H-NMR(CDCl$_3$)δ; 1.3-3.45(17H, m), 3.8-5.7(5H, m), 6.5-7.65(13H, m)

144) $^1$H-NMR(CDCl$_3$)δ; 1.25-3.1(14H, m), 3.3-4.0(4H, m), 4.15-4.4(1H, m), 4.45-5.2(1H, m), 6.64(1H, d, J=7.4Hz), 6.9-7.7(12H, m)

145) $^1$H-NMR(CDCl$_3$)δ; 0.9-3.25(16H, m), 3.9-5.9(2H, m), 6.65(1H, d, J=7.4Hz), 6.85-7.5(11H, m), 7.9-8.3(1H, m)

146) $^1$H-NMR(DMSO-d$_6$)δ; 1.3-2.15(4H, m), 2.32(3H, s), 2.8-3.05(1H, m), 4.24(2H, AB-q, J=12.8, 15.4 Hz), 4.35-4.55(1H, m), 4.9-5.25(1H, m), 6.68(1H, d, J=7.6Hz), 6.9-7.45(9H, m), 7.52(2H, d, J=8.6 Hz), 8.9-9.05(1H, m), 10.31(1H, s)

147) $^1$H-NMR(CDCl$_3$)δ; 1.5-2.35(4H, m), 2.45(3H, s), 2.6-2.85(1H, m), 3.32(3H, s), 4.19(2H, AB-q, J=12.2Hz, 15.6Hz), 5.0-5.2(1H, m), 5.82(1H, d, J=10.3Hz), 6.69(1H, d, J=7.8Hz), 6.75-7.95(12H, m)

148) $^1$H-NMR(CDCl$_3$)δ; 1.2-3.3(17H, m), 3.45(2H, AB-q, J=14.7, 22.9Hz), 3.9-4.35(2H, m), 6.60(2H, d, J=7.7Hz), 6.8-8.0(11H, m), 8.39(1H, s)

149) $^1$H-NMR(CDCl$_3$)δ; 1.45-3.40(8H, m), 2.23(3H, s), 2.33(3H, s), 2.46(3H, s), 4.44-5.23(1H, m), 6.54-6.78(1H, m), 6.84-7.94(12H, m)

150) $^1$H-NMR(CDCl$_3$)δ; 1.50-1.92(3H, m), 1.92-2.05 (1H, m), 2.47(3H, s), 2.55-3.06(5H, m), 3.43-5.76 (8H, m), 6.63-6.82(1H, m), 6.97-8.08(12H, m)

151) $^1$H-NMR(CDCl$_3$)δ; 1.43-2.65(4H, m), 2.48(3H, s), 2.69-3.25(5H, m), 3.90-5.40(8H, m), 6.64-6.94 (1H, m), 6.94-7.77(12H, m)

152) $^1$H-NMR(CDCl$_3$)δ; 1.50-1.90(3H, m), 1.90-2.20 (1H, m), 2.20-2.64(4H, m), 2.32(3H, s), 2.47(3H, s), 2.64-3.27(1H, m), 3.36-3.83(4H, m), 3.93-4.52 (2H, m), 4.52-5.27(2H, m), 6.57-6.82(1H, m), 6.93-7.87(12H, m)

153) $^1$H-NMR(CDCl$_3$)δ; 1.52-1.93(2H, m), 1.93-2.23 (4H, m), 2.23-2.57(1H, m), 2.45(3H, s), 2.72-3.02 (1H, m), 3.02-3.77(8H, m), 3.93-4.50(2H, m), 4.50-5.20(2H, m), 6.60-6.80(1H, m), 6.94-7.64 (11H, m), 8.16(1H, brs)

154) $^1$H-NMR(CDCl$_3$)δ; 1.48-2.60(8H, m), 2.46(3H, s), 2.65-3.01(1H, m), 3.20-3.74(2H, m), 3.80-5.14 (4H, m), 5.30-5.84(1H, m), 6.51-8.14(13H, m)

155) $^1$H-NMR(CDCl$_3$)δ; 1.54-1.91(2H, m), 1.91-2.20 (1H, m), 2.22-2.64(1H, m), 2.44(3H, s), 2.70-3.13 (1H, m), 3.60-4.40(4H, m), 4.50-5.20(2H, m), 6.07-8.00(13H, m), 9.93(1H, s)

156) $^1$H-NMR(CDCl$_3$)δ; 1.56-1.92(2H, m), 1.92-2.19(1H, m), 2.19-2.60(1H, m), 2.46(3H, s), 2.66-3.26(4H, m), 3.33-3.95(4H, m). 4.00-5.20(4H, m), 6.58-6.82 (1H, m), 6.93-8.21(12H, m)

157) $^1$H-NMR(CDCl$_3$)δ; 1.57-2.17(3H, m), 2.21-2.68 (1H, m), 2.47(3H, s), 2.73-3.04(1H, m), 3.91-4.42 (4H, m), 4.50-5.17(2H, m), 6.61-6.99(2H, m), 6.99-8.10(14H, m), 8.21-8.71(2H, m)

158) $^1$H-NMR(CDCl$_3$)δ; 1.31(3H, d, J=6.7Hz), 1.53-1.90(1H, m), 2.29-2.58(1H, m), 2.47(3H, s),

-continued

| | |
|---|---|
| | 2.94–3.63(2H, m), 4.57–5.05(1H, m), 6.68–6.82 (1H, m), 7.10–7.59(10H, m), 7.72(1H, s), 7.78–7.96(1H, m) |
| 159) | $^1$H-NMR(CDCl$_3$)δ; 1.20–2.60(17H, m), 2.65–5.10 (3H, m), 6.85–3.85(12H, m) |
| 160) | $^1$H-NMR(DMSO-d$_6$)δ; 1.40–1.75(1H, m), 1.90–2.15 (1H, m), 2.33(3H, s), 2.50–2.80(2H, m), 3.10–3.50 (1H, m), 4.40–4.65(1H, m), 6.85–7.60(10H, m), 7.85(1H, s), 10.44(1H, s) |
| 161) | $^1$H-NMR(CDCl$_3$)δ; 1.30–2.70(11H, m), 3.00–5.20 (3H, m), 6.58(1H, d, J=8Hz), 6.90–7.05(1H, m), 7.10–7.70(10H, m) |
| 162) | $^1$H-NMR(CDCl$_3$)δ; 1.25–2.90(4H, m), 2.44(6H, s), 2.79–3.57(2H, m), 2.79(6H, s), 4.10–5.25(1H, m), 6.60–6.80(1H, m), 6.94–7.60(10H, m), 8.23(1H, d, J=6.2Hz), 12.41(1H, m) |
| 163) | $^1$H-NMR(CDCl$_3$)δ; 1.25–3.00(4H, m), 2.42(6H, s), 2.99(6H, s), 3,40–3.65(2H, m), 4.01–5.15(1H, m), 6.58–7.59(12H, m), 7.94(1H, brs) |
| 164) | $^1$H-NMR(DMSO-d$_6$)δ; 1.40–2.18(4H, m), 2.34(3H, s), 2.47(3H, s), 2.54–3.50(4H, m), 4.30–5.08(1H, m), 6.56–6.82(1H, m), 6.87–7.48(10H, m), 7.48–7.75(2H, m), 10.35(1H, s) |
| 165) | $^1$H-NMR(CDCl$_3$)δ; 1.08–5.20[20H, m, 1.30(3H, t, J=7.2Hz), 3.41(2H, s), 4.22(2H, q, J=7.2Hz)], 6.49–7.73(8H, m), 9.25–9.58(1H, m) |
| 166) | $^1$H-NMR(CDCl$_3$)δ; 1.17–2.80(4H, m), 2.05(3H, s), 2.42(6H, s), 3.02–3.53(2H, m), 4.06–5.15(1H, m), 6.55–7.80(12H, m), 8.53–8.74(2H, m) |

EXAMPLE 899

To a solution of 5-acetyloxyimino-1-[4-(2-chlorobenzoylamino)benzoyl]-2,3,4,5-tetrahydro-1H-benzazepine (0.48 g) in acetic acid (20 ml) is added platinum oxide (0.05 g) and the mixture is subjected to catalytic reduction under hydrogen atmosphere. After completion of the reaction, the catalyst is removed by filtration, and the filtrate is concentrated. The resulting residue is purified by silica gel column chromatography (eluent; dichloromethane :methanol =20:1–10:1), and recrystallized from ethanol/diethyl ether to give 5-amino-1-[4-(2-chlorobenzoylamino)benzoyl]-2,3,4,5-tetrahydro-1H-benzazepine (0.19 g) as colorless prisms, m.p. 176°–178° C.

EXAMPLE 900

To a solution of 5-methylamino-1-[4-(2-methylbenzoylamino)benzoyl]-2,3,4,5-tetrahydro-1H-benzazepine (0.6 g) in dichloromethane (10 ml) is added triethylamine (0.24 ml). Subsequently, thereto is added methanesulfonyl chloride (0.14 ml) under ice-cooling, and then, the mixture is warmed to room temperature and stirred overnight. Water is added to the reaction solution, extracted three times with dichloromethane. The extract is washed with saturated saline solution, and dried over magnesium sulfate. The solvent is distilled off and the resulting residue is purified by silica gel column chromatography (eluent; dichloromethane : methanol =20:1), and recrystallized from ethanol to give 5-(N-methyl-N-methanesulfonylamino)-1-[4-(2-methylbenzoylamino)benzoyl]-2,3,4,5-tetrahydro-1H-benzazepine (0.48 g) as colorless scales, m.p. 197°–198° C.

EXAMPLE 901

To a solution of 5-methylamino-1-[4-(2-methylbenzoylamino)benzoyl]-2,3,4,5-tetrahydro-1H-benzazepine (0.6 g) in dichloromethane is added triethylamine (0.24 ml). Subsequently, thereto is added benzoyl chloride (0.2 ml) under ice-cooling, and the temperature thereof is raised to room temperature, and the mixture is stirred overnight. Water is added to the reaction solution and extracted three times with dichloromethane. The extract is washed with saturated saline solution and dried over magnesium sulfate. The solvent is distilled off and the resulting residue is purified by silica gel column chromatography (eluent; dichloromethane:methahol =20:1), and recrystallized from ethanol to give 5-(N-methyl-N-benzoylamino)-1-[4-(2-methylbenzoylamino)benzoyl]-2,3,4,5-tetrahydro-1H-benzazepine (0.64 g) as colorless needles, m.p. 248°–249° C.

EXAMPLE 902

A mixture of 5-amino-1-[4-(2-methylbenzoylamino)-benzoyl]-2,3,4,5-tetrahydro-1H-benzazepine (0.6 g) and ethyl formate (10 ml) is refluxed for 4 hours. The reaction solution is concentrated and the resulting residue is recrystallized from ethanol/petroleum ether to give 5-formylamino-1-[4-(2-methylbenzoylamino)benzoyl]-2,3,4,5-tetrahydro-1H-benzazepine (0.38 g) as colorless columnar crystal, m.p. 211°–213° C.

Using the suitable starting materials, the compounds of above Examples 825 and 894 are obtained in the same manner as in above Example 902.

EXAMPLE 903

To a solution of 5-amino-1-[4-(2-chlorobenzoylamino)benzoyl]-2,3,4,5-tetrahydro-1H-benzazepine (0.6 g) in dichloromethane (10 ml) is added triethylamine (0.22 ml). Subsequently, thereto is added di-tert-butyl dicarbonate (0.34 g) at room temperature and the mixture is stirred for 2 hours. Then, thereto is added additional di-tert-butyl dicarbonate (0.1 g) and the mixture is stirred for 1 hour. The reaction mixture is concentrated and the resulting residue is purified by silica gel column chromatography (eluent; n-hexane : ethyl aceate =1:1) to give 5-t-butoxycarbonylamino-1-[4-(2-chlorobenzoylamino)benzoyl]-2,3,4,5 tetrahydro-1H-benzazepine (0.66 g) as colorless amorphous.

$^1$H-NMR (CDCl$_3$) δ; 1.1–2.3 (13H, m), 2.65–3.2 (1H, m), 4.55–5.6 (3H, m), 6.55–6.7 (1H, m), 6.9–7.6 (12H, m)

Using the suitable starting materials, the compound of above Example 791 is obtained in the same manner as in above Example 903.

EXAMPLE 904

To a solution of 5-amino-1-[4-(2-methylbenzoylamino)benzoyl]-2,3,4,5-tetrahydro-1H-benzazepine (0.6 g) in dichloromethane (10 ml) is added phenyl isocyanate (0.2 g) under ice-cooling. The mixture is stirred at the same temperature for 30 minutes, and the temperature thereof is raised to room temperature and then the mixture is stirred overnight. The reaction solution is distilled off and the resulting residue is recrystallized from dioxane to give 5-anilinocarbonylamino-1-[4-(2-methylbenzoylamino)benzoyl]-2,3,4,5-tetrahydro-1H-benzazepine (0.65 g) as colorless prisms, m.p. 269°–271° C.

Using the suitable starting materials, the compound of above Example 795 is obtained in the same manner as in above Example 904.

EXAMPLE 905

To a solution of 5-methylamino-1-[4-(2-methylbenzoylamino)benzoyl]-2,3,4,5-tetrahydro-1H-benzazepine (0.6 g) in methanol (10 ml) is added glycolonitrile (50%, 0.19 ml) and the mixture is stirred at room temperature for 20 minutes, and then refluxed for 30 minutes. Thereto is added additional glycolonitrile (0.5 ml) and the mixture is refluxed for 5.5 hours. The reaction solution is concentrated and to the resulting residue is added ethyl acetate. The precipitated crystal is collected by filtration, and recrystallized from acetonitrile to give 5-(N-methyl-N-cyanomethylamino)-1-[4-(2-methylbenzoylamino)benzoyl]-2,3,4,5-tetrahydro-1H-benzazepine (0.32 g) as colorless needles, m.p. 227°-228° C.

EXAMPLE 906

To 5-(N-methyl-N-oxiranylmethylamino)-1-[4-(2-methylbenzoylamino)benzoyl]-2,3,4,5-tetrahydro-1H-benzazepine (0.62 g) is added trifluoroacetic acid (1.22 ml) under ice-cooling and the mixture is stirred for 4 hours. The reaction solution is neutralized with aqueous sodium carbonate solution, and extracted three times with dichloromethane. The extract is washed with saturated saline solution and dried over magnesium sulfate. The solvent is distilled off and the resulting residue is dissolved in methanol (10 ml). Thereto is added 40% aqueous sodium hydroxide solution (10 ml) and water (10 ml), and the mixture is stirred at room temperature overnight. Methanol is distilled off and the resulting residue is purified by silica gel column chromatography (eluent; dichloromethane : methanol =30:1) to give 5-[N-methyl-N-(2,3-dihydroxypropyl)amino)-1-[4-(2-methylbenzoylamino)benzoyl]-2,3,4,5-tetrahydro-1H-benzazepine (0.23 g) as colorless amorphous.

$^1$H-NMR ($CDCl_3$) δ; 1.3-4.15 (19H, m), 4.3-5.0 (1H, m), 6.65 (1H, d, J=7.7 Hz), 6.9-8.05 (12H, m).

EXAMPLE 907

A mixture of 5-methylamino-1-[4-(2-methylbenzoylamino)benzoyl]-2,3,4,5-tetrahydro-1H-benzazepine (1.64 g), acetonitrile (20 ml), potassium carbonate (0.6 g) and ethyl bromoacetate (0.44 ml) is refluxed for 3 hours. The reaction solution is concentrated and water is added to the resulting residue, and the mixture is extracted three times with dichloromethane. The extract is washed with saturated saline solution, and dried over magnesium sulfate. The solvent is distilled off and the resulting residue is purified by silica gel column chromatography (eluent; dichloromethane : methanol =30:1), and recrystallized from ethyl acetate/petroleum ether to give 5-(N-methyl-N-ethoxycarbonylmethylamino)-1-[4-(2-methylbenzoylamino)benzoyl]-2,3,4,5-tetrahydro-1H-benzazepine (0.82 g) as colorless prisms, m.p. 167°-168° C.

Using the suitable starting materials, the compounds of above Examples 785, 787, 799, 800, 802-806, 808, 811, 819, 824, 826, 827, 845, 848, 849, 850, 852, 855-858, 860, 861, 863-882, 885-893 and 895-898 are obtained in the same manner as in above Example 907.

EXAMPLE 908

5-(N-Methyl-N-ethoxycarbonylmethylamino)-1-[4-(2-methylbenzoylamino)benzoyl]-2,3,4,5-tetrahydro-1H-benzazepine (0.6 g) is dissolved in saturated solution of ammonia in methanol (20 ml), and the mixture is heated at 100° C. for 8 hours in a sealed tube. The reaction solution is concentrated and the resulting residue is purified by silica gel column chromatography (eluent; dichloromethane:methanol =30:1) to give 5-(N-methyl-N-carbamoylmethylamino)-1- [4 (2 methylbenzoylamino)benzoyl]-2,3,4,5-tetrahydro-1H-benzazepine (0.4 g) as colorless amorphous.

$^1$H-NMR ($CDCl_3$) δ; 1.4-3.0 (9H, m), 3.05-3.6 (3H, m), 3.9-4.1 (1H, m), 4.35-4.55 (1H, m), 4.9-5.65 (1H, m), 6.67 (1H, d, J=7.4 Hz), 6.85-7.6 (12H, m), 7.6-7.85 (2H, m)

EXAMPLE 909

To a solution of 5-(N-methyl-N-ethoxycarbonylmethylamino)-1-[4-(2-methylbenzoylamino)benzoyl]-2,3,4,5-tetrahydro-1H-benzazepine (0.6 g) in dioxane (10 ml) is added aqueous solution (1 ml) of sodium hydroxide (0.07 g) and the mixture is stirred at room temperature for 2 days. The reaction solution is concentrated and to the resulting residue is added water. The insoluble materials are removed by filtration. The filtrate is neutralized with 10% hydrochloric acid and extracted three times with dichloromethane. The extract is washed with saturated saline solution and dried over magnesium sulfate. The solvent is distilled off and to the resulting residue is added a solution of potassium ethylhexanoate (0.2 g) in dichloromethane (20 ml). The solvent is distilled off, and diethyl ether is added to the resulting residue. The precipitated crystal is collected by filtration, and recrystallized from diethyl ether to give potassium 2-[N-methyl-N-{1-[4-(2-methylbenzoylamino)benzoyl]-2,3,4,5-tetrahydro-1H-benzazepin-5-yl}amino]acetate (0.6 g) as colorless needles, m.p. 164°-171° C.

EXAMPLE 910

To a solution of 5-methylamino-1-[4-(2-methylbenzoylamino)benzoyl] -2,3,4,5-tetrahydro-1H-benzazepine (1.5 g) in dimethyformamide (20 ml) are added potassium carbonate (0.6 g), potassium iodide (0.72 g) and 2-(3-bromopropyloxy)-3,4,5,6-tetrahydro-2H-pyrane (0.97 g) and the mixture is stirred at room temperature overnight. The reaction solution is concentrated and to the resulting residue is added water. The mixture is extracted three times with dichloromethane. The extract is washed with saturated saline solution, and dried over magnesium sulfate. The solvent is distilled off and the resulting residue is purified by silica gel column chromatography (eluent; dichloromethane→dichloromethane:methanol=50:1) to give 5-{N-methyl-N-[3-(3,4,5,6-tetrahydro-2H-pyran-2-yloxy)-propyl]amino}-1-[4-(2 methylbenzoylamino)benzoyl]-2,3,4,5-tetrahydro-1H-benzazepine (1.3 g) as colorless amorphous.

$^1$H-NMR ($CDCl_3$); 1.3-2.85 (21H, m), 3.2-4.0 (4H, m), 4.3-4.4 (1H, m), 4.45-5.2 (2H, m), 6.61 (1H, d, J=7.6 Hz), 6.9-7.65 (12H, m).

EXAMPLE 911

To 5-{N-methyl-N-[3-(3,4,5,6-tetrahydro-2H-pyran-2-yloxy)propyl]amino}-1-[4-(2-methylbenzoylamino)-benzoyl]-2,3,4,5-tetrahydro-1H-benzazepine (0.4 g) is added a mixture of acetyl chloride (0.5 ml) and acetic acid (5 ml) at room temperature, and the mixture is stirred overnight. The reaction solution is concentrated and the resulting residue is purified by silica gel column chromatography (eluent; dichloromethane:methanol=30:1), and further purified again by silica gel column chromatography (eluent; n-hexane:ethyl acetate =1:2) to give 5-[N-methyl-N-(3-acetyloxypropyl-)amino]-1-[4-(2-methylbenzoylamino)benzoyl]-2,3,4,5-tetrahydro-1H-benzazepine (0.06 g) as colorless amorphous.

$^1$H-NMR ($CDCl_3$) δ; 1.3-3.45 (17H, m), 3.8-5.7 (5H, m), 6.5-7.65 (13H, m).

EXAMPLE 912

To a solution of 5{(N-methyl-N-[3-(3,4,5,6-tetrahydro-2H-pyran-2-yloxy)propyl]amino}-1-[4-(2-methylbenzoylamino)benzoyl]-2,3,4,5-tetrahydro-1H-benzazepine (0.55 g) in ethanol (10 ml) is added pyridinium p-toluenesulfonate (0.03 g) and the mixture is heated at 60° C. overnight. After the mixture is refluxed for more 2 hours, water and pyridinium p-toluenesulfonate (0.03 g) are added thereto. The mixture is refluxed for 4 hours. The reaction solution is concentrated and to the resulting residue is added dichloromethane. The mixture is basified with aqueous sodium hydrogen carbonate solution and extracted three times with dichloromethane. The extract is washed with saturated saline solution and dried over magnesium sulfate. The solvent is distilled off and the resulting residue is purified by silica gel column chromatography (eluent; dichloromethane:methanol=30:1) to give 5-[N-methyl-N-(3-hydroxypropyl)amino]-1-[4-(2-methylbenzoylamino)-benzoyl]-2,3,4,5-tetrahydro-1H-benzazepine (0.26 g) as colorless amorphous.

$^1$H-NMR ($CDCl_3$) δ; 1.25–3.1 (14H, m), 3.3–4.0 (4H, m), 4.15–4.4 (1H, m), 4.45–5.2 (1H, m), 6.64 (1H, d, J=7.4 Hz), 6.9–7.7 (12H, m).

EXAMPLE 913

To a solution of 5-amino-1-[4-(2-methylbenzoylamino)benzoyl]-2,3,4,5-tetrahydro-1H-benzazepine (0.6 g) in acetic acid (10 ml) is added dropwise 2,5-dimethoxytetrahydrofuran (0.19 ml), and the mixture is refluxed for 1 hour. The reaction solution is concentrated and the resulting residue is purified by silica gel column chromatography (eluent; dichloromethane:methanol=50:1), and recrystallized from ethyl acetate/n-hexane to give 5-(1-pyrrolyl)-1-[4-(2-methylbenzoylamino)benzoyl]-2,3,4,5-tetrahydro-1H-benzazepine (0.31 g) as colorless prisms, m.p. 208°–210° C.

EXAMPLE 914

To a solution of 5-amino-1-[4-(2-methylbenzoylamino)benzoyl-2,3,4,5-tetrahydro-1-H-benzazepine (2.5 g) in dichloromethane (30 ml) is added triethylamine (0.96 ml) and further thereto is added dropwise chloroacetyl chloride (0.55 ml) under ice-cooling. The mixture is stirred for 5 minutes. The reaction solution is concentrated and to the resulting residue is added water. The precipitated crystal is collected by filtration, washed with water, and dried to give 5-(2-chloroacetylamino)-1-[4-(2-methylbenzoylamino)-benzoyl]-2,3,4,5-tetrahydro-1H-benzazepine (1.4 g) as white powder.

$^1$H-NMR (DMSO-$d_6$) δ; 1.3–2.15 (4H, m), 2.32 (3H, s), 2.8–3.05 (1H, m), 4.24 (2H, AB-q, J=12.8, 15.4 Hz), 4.35–4.55 (1H, m), 4.9–5.25 (1H, m), 6.68 (1H, d, J=7.6 Hz), 6.9–7.45 (9H, m), 7.52 (2H, d, J=8.6 Hz), 8.9–9.05 (1H, m), 10.31 (1H, s).

Using the suitable starting materials, the compound of above Example 814 is obtained in the same manner as in above Example 914.

EXAMPLE 915

A mixed solution of 5-(2-chloroacetylamino)-1-[4-(2-methylbenzoylamino)benzoyl]-2,3,4,5-tetrahydro-1H-benzazepine (0.6 g), imidazole (0.1 g) and potassium carbonate (0.19 g) in acetonitrile (30 ml) is refluxed for 8 hours. The reaction solution is concentrated and the resulting residue is washed with water and separated by decantation. The remainder is purified by silica gel column chromatography (eluent; dichloromethane:methanol=20:1→15:1), and recrystallized from ethanol/n-hexane to give 5-[2-(1-imidazolyl)acetylamino]-1-[4-(2-methylbenzoylamino)-benzoyl]-2,3,4,5-tetrahydro-1H-benzazepine (0.15 g) as colorless needles, m.p. 250–°252° C.

Using the suitable starting materials, the compound of above Example 818 is obtained in the same manner as in above Example 915.

EXAMPLE 916

To a solution of 5-(2-chloroacetylamino)-1-[4-(2-methylbenzoylamino)benzoyl]-2,3,4,5-tetrahydro-1H-benzazepine (0.6 g) in dimethylformamide (20 ml) are added dimethylamine hydrochloride (0.21 g) and potassium carbonate (0.54 g), and the mixture is stirred at room temperature for 2 days. The reaction solution is concentrated and water is added to the resulting residue. The precipitated crystal is collected by filtration, and recrystallized from ethyl acetate to give 5-(2-dimethylaminoacetylamino)-1-[4-(2-methylbenzoylamino)-benzoyl]-2,3,4,5-tetrahydro-1H-benzazepine (0.24 g) as colorless prisms, m.p. 214–°216° C.

Using the suitable starting materials, the compounds of above Examples 816, 817, 820, 821, 826 and 827 are obtained in the same manner as above Example 916.

EXAMPLE 917

A mixture of 5-methylamino-1-[4-(2-methylbenzoylamino)benzoyl]-2,3,4,5-tetrahydro-1H-benzazepine (0.6 g), N,N-dimethyl-2-chloroacetamide (0.19 g) and potassium carbonate (0.22 g) is refluxed for 24 hours. The reaction solution is concentrated and water is added to the resulting residue. The mixture is extracted three times with dichloromethane. The extract is washed with saturated saline solution, and dried over magnesium sulfate. The solvent is distilled off and the resulting residue is purified by silica gel column chromatography (eluent; dichloromethane:methanol=30:1) to give 5-[N-methyl-N-(dimethylaminocarbonylmethyl-)amino]-1-[4-(2-methylbenzoylamino)benzoyl]-2,3,4,5-tetrahydro-1H-benzazepine (0.05 g) as colorless amorphous.

$^1$H-NMR ($CDCl_3$) δ; 1.2–3.3 (17H, m), 3.45 (2H, AB-q, J=14.7, 22.9 Hz), 3.9–4.35 (2H, m), 6.60 (1H, d, J=7.7 Hz), 6.8–8.0 (11H, m), 8.39 (1H, s).

EXAMPLE 918

To a solution of t-butoxycarbonylglycine (0.84 g) in dimethylformamide (20 ml) are added diethyl cyanophosphate (0.73 ml) and 5-amino-1-[4-(2-methylbenzoylamino)benzoyl]-2,3,4,5-tetrahydro-1H-benzazepine (1.74 g), and further thereto is added triethylamine (1.8 ml) under ice-cooling. The mixture is stirred for 30 minutes, and then stirred at room temperature overnight. The reaction solution is concentrated and water is added to the resulting residue. The precipitated crystal is collected by filtration, washed with water, and recrystallized from ethyl acetate to give 5-(2-aminoacetylamino)-1-[4-(2-methylbenzoylamino)benzoyl]-2,3,4,5-tetrahydro-1H-benzazepine (E) (0.16 g). Separately, the filtrate is concentrated and purified by silica gel column chromatography (eluent; dichloromethane:methanol=50:1), and recrystallized from diethyl ether to give 5-[2-(t-butoxycarbonylamino)-acetylamino]-1-[4-(2-methylbenzoylamino)benzoyl]-2,3,4,5-tetrahydro-1H-benzazepine (F) (0.19 g).

(E): Colorless prisms, m.p. 287°-289° C.

(F): Colorless prisms, m.p. 170°-171° C.

EXAMPLE 919

5-Oxo-1-[4-(2-methylbenzoylamino)benzoyl]-2,3,4,5-tetrahydro-1H-benzazepine (0.50 g) is suspended in tetrahydrofuran (20 ml), and thereto is added dropwise a 3.0M solution of methyl magnesium bromide in diethyl ether (1.5 ml) at room temperature. The mixture is stirred at room temperature for 1 hour. The reaction solution is poured into ice-water (20 ml), and extracted with ethyl acetate. The extract is dried over magnesium sulfate, and the solvent is distilled off. The resulting residue is purified by silica gel column chromatography (eluent; ethyl acetate:n-hexane=2:3→1:1), and recrystallized from ethyl acetate/n-hexane to give 5-methyl-5-hydroxy-1-[4-(2-methyl-benzoylamino)benzoyl]-2,3,4,5-tetrahydro-1H-benzazepine (0.23 g) as white powder, m.p. 204-°205° C.

EXAMPLE 920

To a solution of 5-carboxymethoxy-1-[4-(2-methylbenzoylamino)benzoyl]-2,3,4,5-tetrahydro-1H-benzazepine (1.50 g) in dimethylformamide (60 ml) are added successively thiomorpholine (0.66 ml), diethyl cyanophosphate (0.89 g) and triethylamine (1.37 ml) with stirring under ice-cooling. cooling. The mixture is stirred for 30 minutes under ice-cooling, and at room temperature for 20 minutes. Water (60 ml) is added to the reaction solution, and extracted with dichloromethane. The extract is dried over magnesium sulfate, and the solvent is distilled off. The resulting residue is purified by silica gel column chromatography (eluent; ethyl acetate:n-hexane=5:2→3:1), and recrystallized from ethyl acetate/n-hexane to give 5-(thiomorpholinocarbonylmethoxy)-1-[4-(2-methylbenzoylamino)-benzoyl]-2,3,4,5-tetrahydro-1H-benzazepine (1.60 g) as white powder, m.p. 235-°237° C.

Using the suitable starting materials, the compounds of above Examples 829-838 are obtained in the same manner as in above Example 920.

EXAMPLE 921

To a solution of 5-(thiomorpholinocarbonylmethoxy)-1-[4-(2-methylbenzoylamino)benzoyl]-2,3,4,5-tetrahydro-1H-benzazepine (0.40 g) in dichloromethane (40 ml) is added 80% m-chloroperbenzoic acid (175 mg) with stirring at −8° C., and the mixture is stirred at −8° C. for 1 hour. To the reaction solution is added 20% aqueous sodium hydrogensulfite solution (40 ml) and the mixture is stirred at room temperature for 30 minutes. The dichloromethane layer is collected, washed with saturated saline solution and dried over magnesium sulfate. The solvent is distilled off and the resulting residue is purified by silica gel column chromatography (eluent; dichloromethane:methanol=0:1) to give 5-[(1-oxothiomorpholino)carbonylmethoxy]-1-[4-(2-methylbenzoylamino)benzoyl]-2,3,4,5-tetrahydro-1H-benzazepine (0.32 g) as colorless amorphous.

$^1$H-NMR ($CDCl_3$) δ; 1.50-1.92 (3H, m), 1.92-2.05 (1H, m), 2.47 (3H, s), 2.55-3.06 (5H, m), 3.43-5.76 (8H, m), 6.63-6.82 (1H, m), 6.97-8.08 (12H, m).

EXAMPLE 922

To a solution of 5-(thiomorpholinocarbonylmethoxy)-1-[4-(2-methylbenzoylamino)benzoyl]-2,3,4,5-tetrahydro-1H-benzazepine (0.40 g) in dichloromethane (40 ml) is added 80% m-chloroperbenzoic acid (0.35 g), and the mixture is stirred at room temperature for 1 hour. The reaction solution is washed successively with an aqueous sodium hydrogensulfite solution and saturated saline solution, and dried over magnesium sulfate. The solvent is distilled off to give 5-[(1,1-dioxothiomorpholino)carbonylmethoxy]-1-[4-(2-methylbenzoylamino)benzoyl]-2,3,4,5-tetrahydro-1H-benzazepine (0.41 g) as colorless amorphous.

$^1$H-NMR ($CDCl_3$) δ; 1.43-2.65 (4H, m), 2,48 (3H, s), 2.69-3.25 (5H, m), 3.90-5.40 (8H, m), 6.64-6.94 (1H, m), 6 94-7.77 (12H, m).

EXAMPLE 923

To a solution of 5-oxo-1-[4-(2-hydroxybenzoylamino)benzoyl]-2,3,4,5-tetrahydro-1H-benzazepine (400 mg) in acetone (20 ml) are added potassium carbonate (210 mg), potassium iodide (250 mg) and 2-chloroacetamide (120 mg), and the mixture is refluxed for 2 hours. The insoluble materials are removed by filtration, and the filtrate is distilled off. Dichloromethane is added to the resulting residue, and the mixture is washed with saturated saline solution, and dried over magnesium sulfate. The solvent is distilled off and the resulting residue is recrystallized from ethyl acetate/n-hexane to give 5-oxo-1-[4-(2-carbamoylmethoxybenzoylamino)benzoyl]-2,3,4,5-tetrahydro-1H-benzazepine (436 mg) as white powder, m.p. 226°-228° C.

Using the suitable starting materials, the compound of above Example 842 is obtained in the same manner as above Example 923.

Example 924

A mixture of 5-methylamino-4-hydroxy-1-[4-(2-chlorobenzoylamino)benzoyl]-2,3,4,5-tetrahydro-1H-benzazepine (0.13 g), ethyl α-bromoacetate (58 mg), diisopropylethylamine (49 mg) and acetonitrile (5 ml) is refluxed for 10 hours. Acetonitrile is distilled off under reduced pressure, and the resulting residue is dissolved in dichloromethane, washed with water, dried over magnesium sulfate, and distilled off under reduced pressure. The resulting residue is purified by silica gel column chromatography (eluent; dichloromethane:methanol=50:1), and recrystallized from chloroform/methanol to give 7-[4-(2-chlorobenzoylamino)benzoyl]-1-methyl-1,2,3,4a,5,6,7,11b-octahydro-3-oxo[1]benzazepino[4,5-b][1,4]oxazine (80 mg) as colorless prisms, m.p. 286°-290° C.

EXAMPLE 925

To a solution of 5-oxo-1-[2-chloro-4-(2-methyl-benzoylamino)benzoyl]-2,3,4,5-tetrahydro-1H-benzazepine (1 g) in methanol (20 ml) and dichloromethane (20 ml) is added hydroxylamine-O-sulfonic acid (0.28 g) with stirring at room temperature, and the mixture is stirred at the same temperature for 1 hour. Subsequently, to the reaction solution is added with stirring an aqueous solution of patassium carbonate (0.34 g) in water (1 ml) at room temperature, and the mixture is stirred at the same temperature for 2 hours. The precipitated crystal is removed by filtration, and the filtrate is concentrated under reduced pressure. The resulting residue is purified by silica gel column chromatography to give potassium {1-[2-chloro-4-(2 methylbenzoylamino)benzoyl]-2,3,4,5-tetrahydro-1H-benzazepin-5-yl}imino-O-sulfonate (0.4 g) as white powder.

$^1$H-NMR (DMSO-$d_6$) δ; 1.40-1.75 (1H, m), 1.90-2.15 (1H, m), 2.33 (3H, s), 2.50-2.80 (2H, m), 3.10-3.50 (1H, m), 4.40–4.65 (1H, m), 6.85–7.60 (10H, m), 7.85 (1H, s), 10.44 (1H, s).

EXAMPLE 926

Using the suitable starting materials, the compounds of above Examples 841–843, 868–870, 888 and 889 are obtained in the same manner as in above Example 380.

EXAMPLE 927

Using the suitable starting materials, the compounds of above Examples 876–878 are obtained in the same manner as in above Example 381.

EXAMPLE 928

Using the suitable starting materials, the compounds of above Examples 840, 842 and 846 are obtained in the same manner as in above Example 384.

EXAMPLE 929

Using the suitable starting materials, the compounds of above Examples 788–790, 796–804, 805, 808, 811, 814, 818, 819, 824, 826, 827, 837, 845, 848, 850, 852, 855, 856–858, 860, 861, 863–882, 885, 886, 888–893 and 895–898 are obtained in the same manner as in above Example 388.

EXAMPLE 930

Using the suitable starting materials, the compound of above Example 848 is obtained in the same manner as in above Example 393.

EXAMPLE 931

Using the suitable starting materials, the compounds of above Examples 841 and 842 are obtained in the same manner as in above Example 402.

EXAMPLE 932

Using the suitable starting materials, the compounds of above Examples 882 and 897 are obtained in the same manner as in above Example 403.

EXAMPLE 933

Using the suitable starting materials, the compound of above Example 809 is obtained in the same manner as in above Example 634.

EXAMPLE 934

Using the suitable starting materials, the compounds of above Examples 828–838 are obtained in the same manner as in above Example 640.

EXAMPLE 935

Using the suitable starting materials, the compound of above Example 810 is obtained in the same manner as in above Example 772.

EXAMPLE 936

Using the suitable starting materials, the compound of above Example 788 is obtained in the same manner as in above Example 771.

EXAMPLE 937

Using the suitable starting materials, the compounds of above Examples 785, 787, 788–790, 796–805, 806, 807, 808, 811, 814, 818, 819, 845, 848, 849, 850, 852, 855, 856–858, 860, 861, 863–882, 885, 886, 888–893 and 896–898 are obtained in the same manner as in above Example 390.

EXAMPLE 938

To 5-methanesulfonyloxymethyl-1-[4-(2-methylbenzoylamino)benozyl]-2,3,4,5-tetrahydro-1H-benzazepine (0.50 g) is added a 30% solution of methylamine in methanol (50 ml), and the mixture is heated at 100° C. for 3 hours in a sealed tube. After cooling, the reaction solution is evaporated under reduced pressure, and the resulting residue is purified by silica gel column chromatography (eluent; dichloromethane:methanol:aqueous ammonia = 100:10:1) to give 5-methylaminomethyl-1-[4-(2-methylbenzoylamino)benzoyl]-2,3,4,5-tetrahydro-1H-benzazepine (0.07 g).

$^1$H-NMR (DMSO-$d_6$) δ; 1.40–2.18 (4H, m), 2.34 (3H, s), 2.47 (3H, s), 2.54–3.50 (4H, m), 4.30–5.08 (1H, m), 6.56–6.82 (1H, m), 6.87–7.48 (10H, m), 7.48–7.75 (2H, m), 10.35 (1H, s).

Using the suitable starting materials, the compounds of above Examples 823–825 are obtained in the same manner as in above Example 938.

Using the above suitable starting materials, the compounds of the following Table 6 are obtained in the same manner as in Examples 1 and 382.

TABLE 6

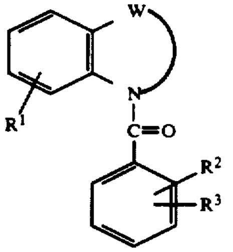

Example 939
Structure

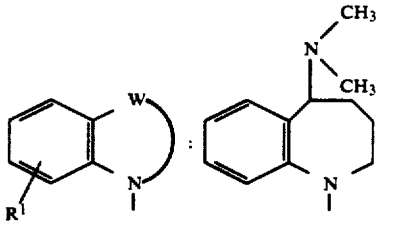

$R^2$:H

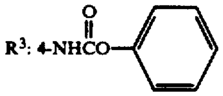

Crystalline form: White powder
Recrystallization solvent: Ethanol
Melting Point: 208–211° C.
Form: Free Example 940
Structure

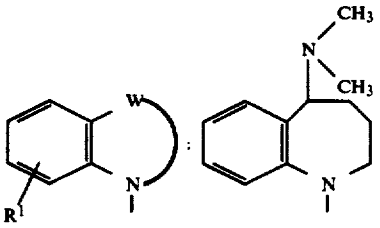

$R^2$:H

TABLE 6-continued

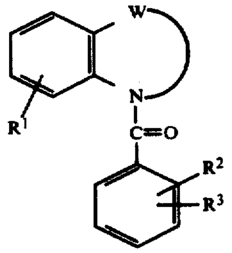

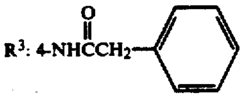

Crystalline form: White powder
Recrystallization solvent: Methanol/diethyl ether
Melting Point: 171.5–172.5° C.
Form: Free
Example 941
Structure

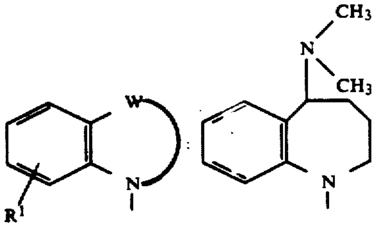

$R^2$:H

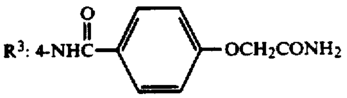

Crystalline form: White powder
Recrystallization solvent.: Methanol/diethyl ether
Melting Point: 151–154° C.
Form: Free
Example 942
Structure

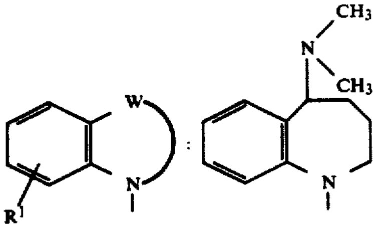

$R^2$:H

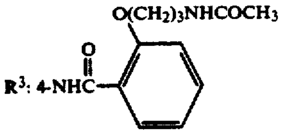

Crystalline form: Colorless amorphous
NMR analysis: 167)
Form: Free
Example 943
Structure TABLE 6-continued

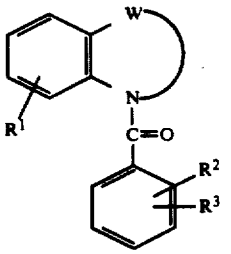

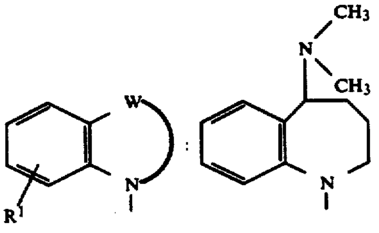

$R^2$:H

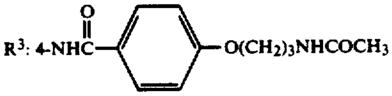

Crystalline form: White powder
Recrystallization solvent: Methanol/diethyl ether
Melting Point: 180–183° C.
Form: Free
Example 944
Structure

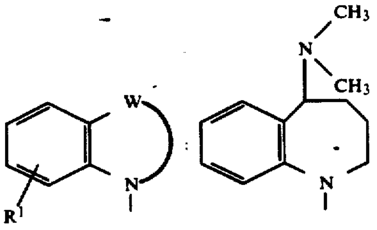

$R^2$:H

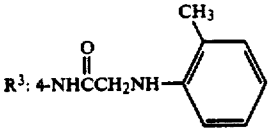

Crystalline form: White powder
Recrystallization solvent: Methanol/diethyl ether
Melting Point: 109–110° C.
Form: Free
Example 945
Structure

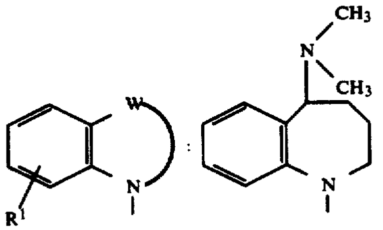

$R^2$:H

TABLE 6-continued

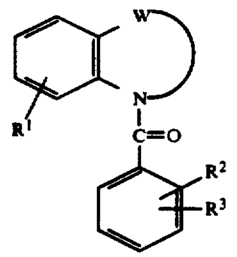

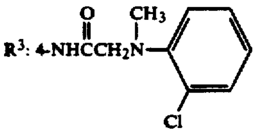

Crystalline form: Colorless oil
NMR analysis: 168)
Form: Free
Example 946
Structure

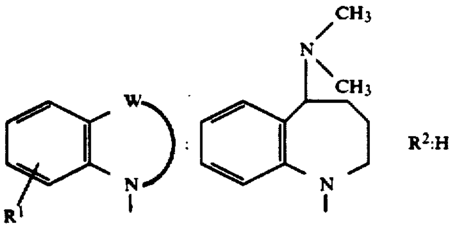

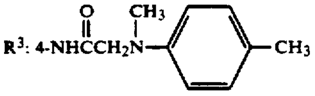

Crystalline form: Colorless oil
NMR analysis: 169)
Form: Free
Example 947
Structure

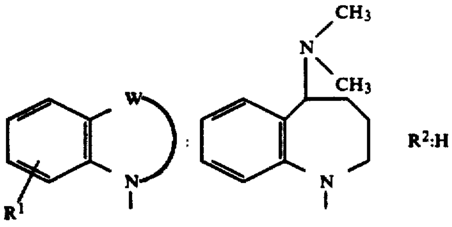

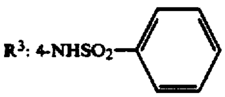

Crystalline form: White powder
Recrystallization solvent: Methanol/diethyl ether
Melting Point: 177-178.5° C.
Form: Free
Example 948
Structure TABLE 6-continued

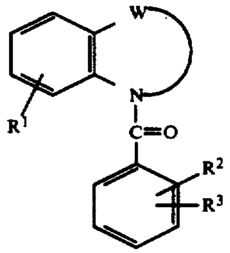

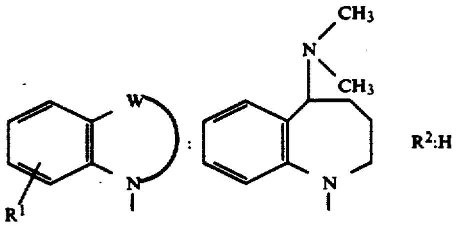

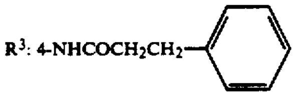

Crystalline form: Colorless amorphous
NMR analysis: 170)
Form: Free
Example 949
Structure

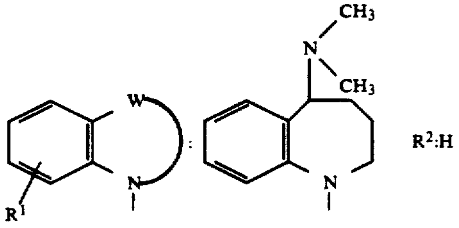

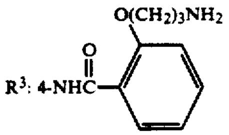

Crystalline form: White powder
Recrystallization solvent: Methanol/diethyl ether
Melting Point: 162-165° C.
Form: Free
Example 950
Structure

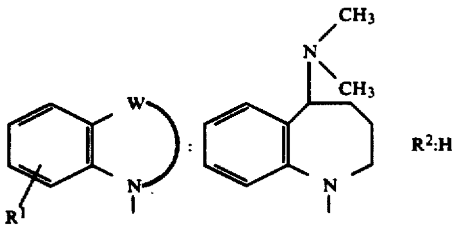

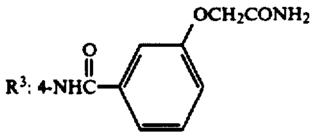

TABLE 6-continued

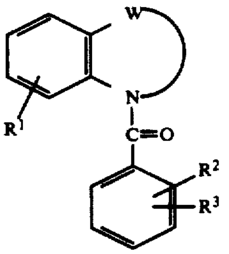

Crystalline form: White powder
Recrystallization solvent: Methanol/diethyl ether
Melting Point: 212-215° C.
Form: Free
Example 951
Structure

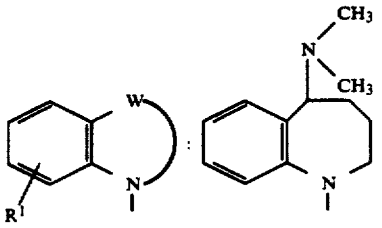

$R^2$:H

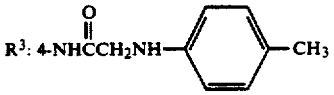

Crystalline form: Colorless oil
NMR analysis: 171)
Form: Free
Example 952
Structure

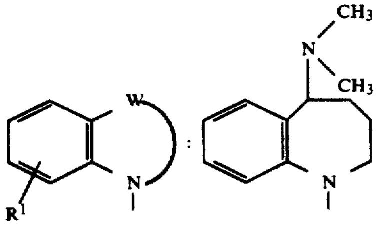

$R^2$:H

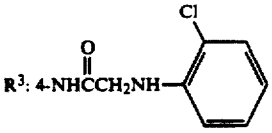

Crystalline form: White powder
Recrystallization solvent: Methanol/diethyl ether
Melting Point: 112-114° C.
Form: Free
Example 953
Structure

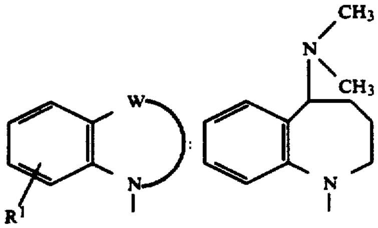

$R^2$:H

TABLE 6-continued

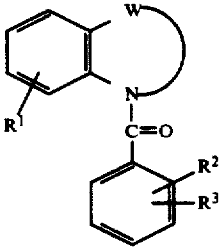

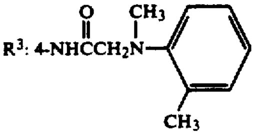

Crystalline form: Colorless oil
NMR analysis: 172)
Form: Free
Example 954
Structure

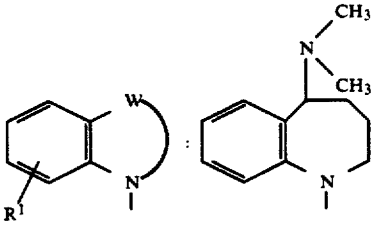

$R^2$:H

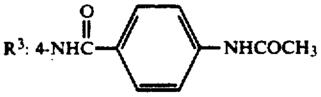

Crystalline form: Colorless amorphous
NMR analysis: 173)
Form: Free
Example 955
Structure

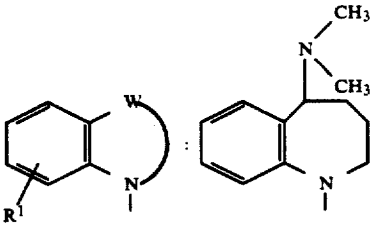

$R^2$:H

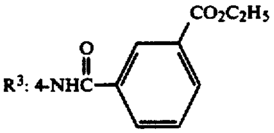

Crystalline form: Light yellow amorphous
NMR analysis: 174)
Form: Free
Example 956
Structure TABLE 6-continued

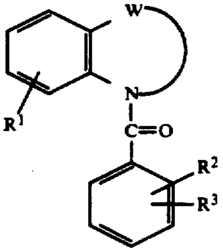

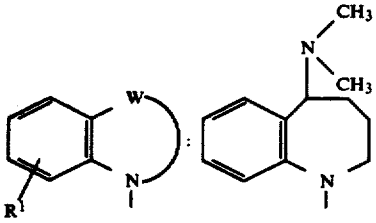

$R^2$:H $R^3$: 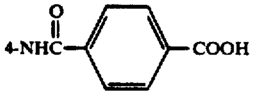

Crystalline form: White powder
Recrystallization solvent: Diethyl ether
Melting Point: 189–193° C.
Form: Free
Example 957
Structure

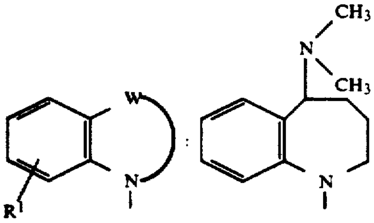

$R^2$:H $R^3$: 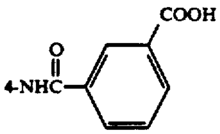

Crystalline form: Colorless amorphous
NMR analysis: 175)
Form: Free
Example 958
Structure

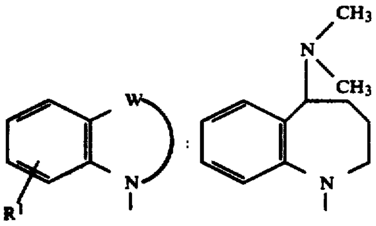

$R^2$:H $R^3$: 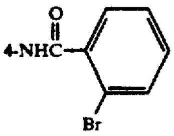

TABLE 6-continued

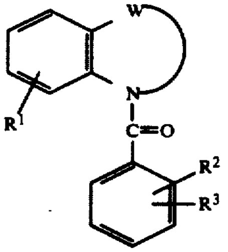

Crystalline form: Colorless prisms
Recrystallization solvent: Ethanol
Melting Point: 234–238° C.
Form: Free
Example 959
Structure

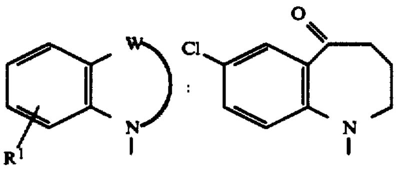

$R^2$:H $R^3$: 

Crystalline form: White powder
Recrystallization solvent: Diethyl ether/dichloromethane
Melting Point: 183–184.5° C.
Form: Free
Example 960
Structure

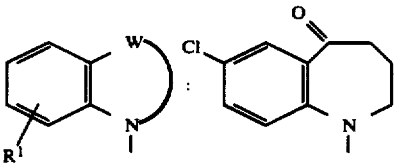

$R^2$:H $R^3$: 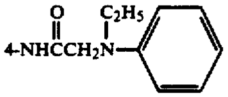

Crystalline form: Brown oil
NMR analysis: 176)
Form: Free
Example 961
Structure

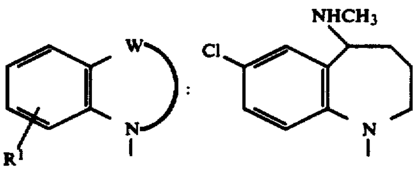

$R^2$:H $R^3$: 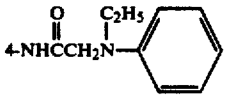

Crystalline form: Colorless amorphous
NMR analysis: 177)
Form: Free
Example 962
Structure TABLE 6-continued

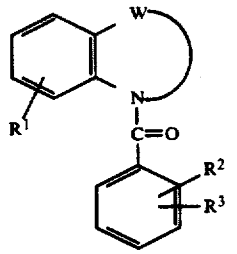

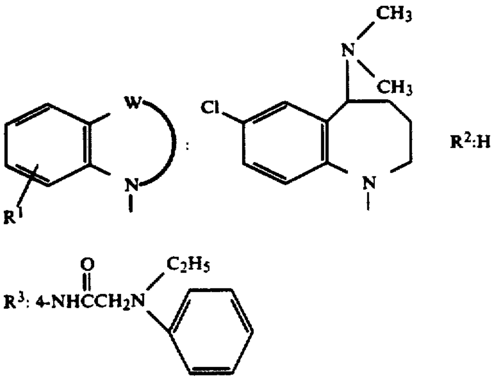

Crystalline form: Colorless amorphous
NMR analysis: 178)
Form: Free
Example 963
Structure

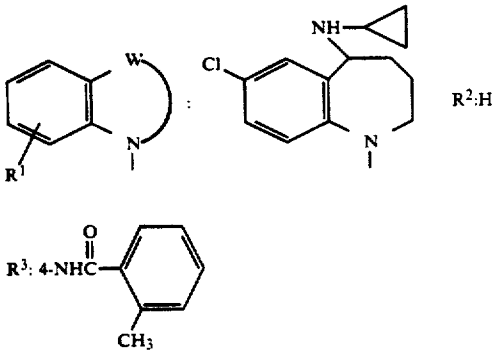

Crystalline form: White powder
Recrystallization solvent: Dichloromethane/diethyl ether
Melting Point: 202.5-204.5° C.
Form: Free
Example 964
Structure

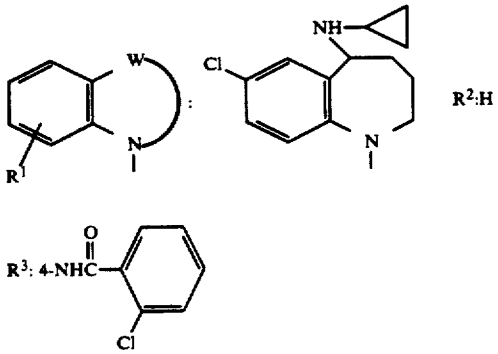

TABLE 6-continued

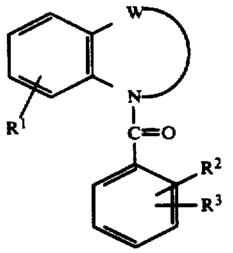

Crystalline form: White powder
Recrystallization solvent: Dichloromethane/diethyl ether
Melting Point: 199.5-201° C.
Form: Free
Example 965
Structure

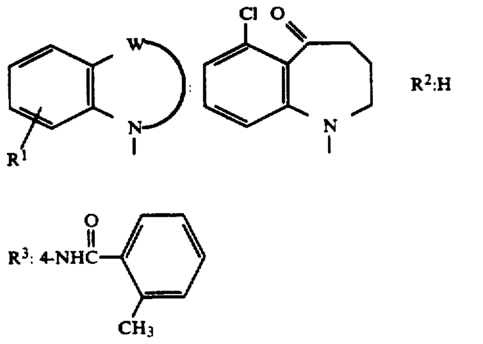

Crystalline form: White powder
Recrystallization solvent: Dichloromethane/diethyl ether
Melting Point: 196.5-197° C.
Form: Free
Example 966
Structure

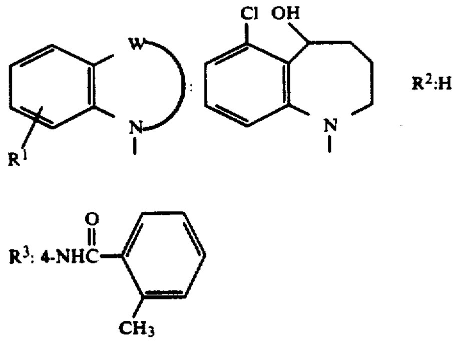

Crystalline form: White powder
Recrystallization solvent: Dichloromethane/diethyl ether
Melting Point: 204-205° C.
Form: Free
Example 967
Structure

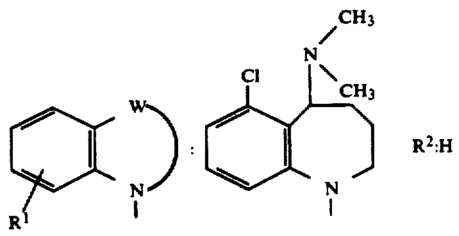

TABLE 6-continued

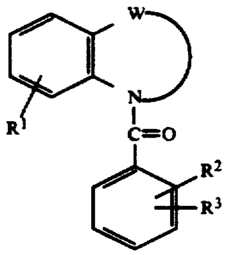

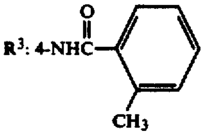

Crystalline form: White powder
Recrystallization solvent: Dichloromethane/diethyl ether
Melting Point: 175–177° C.
Form: Free
Example 968
Structure

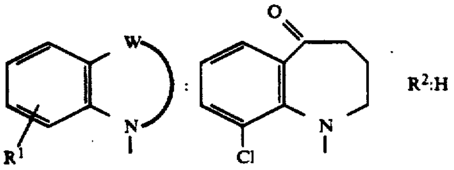

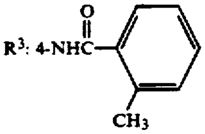

Crystalline form: Pink amorphous
NMR analysis: 179)
Form: Free
Example 969
Structure

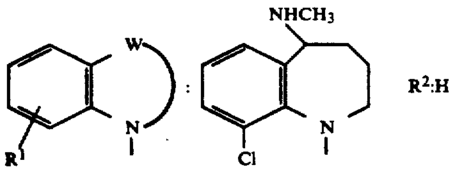

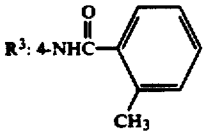

Crystalline form: White powder
Recrystallization solvent: Dichloromethane/diethyl ether
Melting Point: 186–189° C.
Form: Free
Example 970
Structure TABLE 6-continued

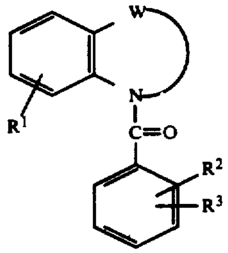

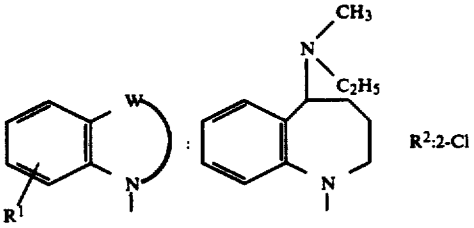

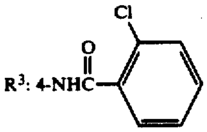

Crystalline form: Colorless prisms
Recrystalization solvent: Ethyl acetate/n-hexane
Melting Point: 211–212° C.
Form: Free
Example 971
Structure

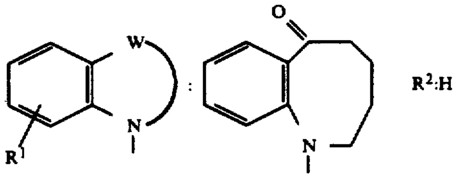

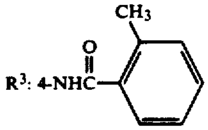

Crystalline form: Colorless amorphous
NMR analysis: 180)
Form: Free
Example 972
Structure

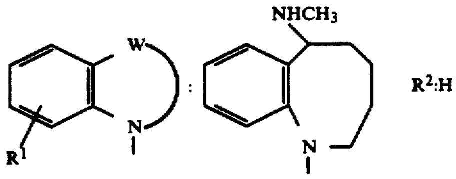

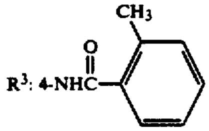

Crystalline form: Colorless needles
Recrystallization solvent: Ethanol

TABLE 6-continued

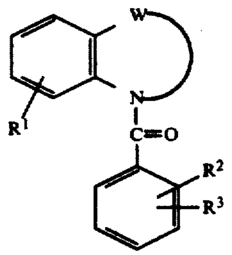

Melting Point: 206–207° C.
Form: Free
Example 973
Structure

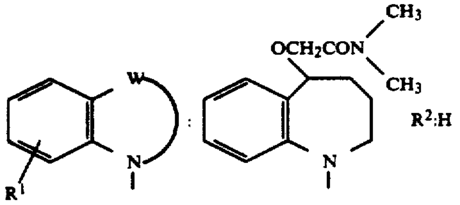

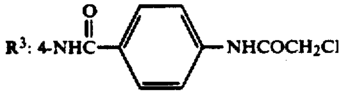

Crystalline form: Colorless amorphous
NMR analysis: 181)
Form: Free
Example 974
Structure

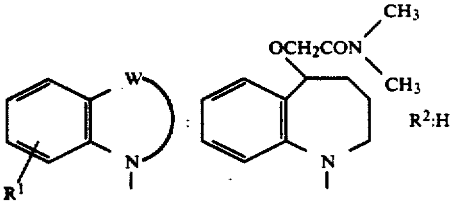

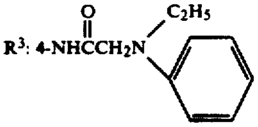

Crystalline form: White powder
Recrystallization solvent: Ethyl acetate/n-hexane
Melting Point: 152–154° C.
Form: Free
Example 975
Structure

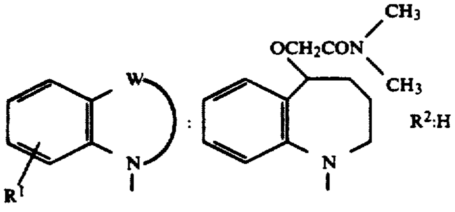

TABLE 6-continued

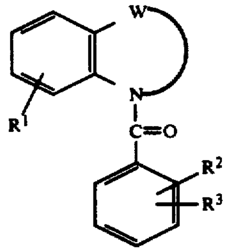

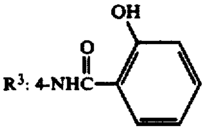

Crystalline form: Colorless amorphous
NMR analysis: 182)
Form: Free
Example 976
Structure

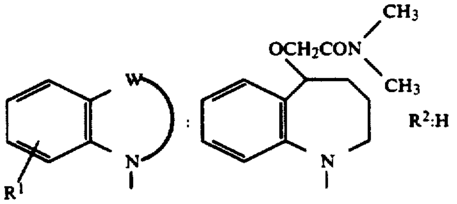

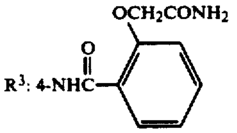

Crystalline form: White powder
Recrystallization solvent: Ethyl acetate/n-hexane
Melting Point: 204–206° C.
Form: Free
Example 977
Structure

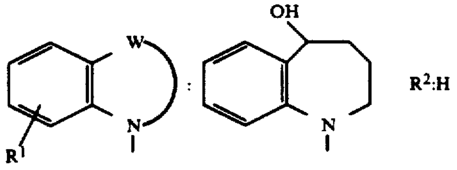

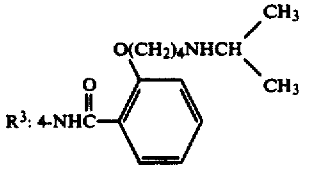

Crystalline form: Colorless needles
Recrystallization solvent: Ethyl acetate/n-hexane
Melting Point: 162–163° C.
Form: Free 167) $^1$H-NMR(CDCl$_3$)δ; 1.14–2.83(13H, m), 2.43(3H, s), 2.95–5.19(4H, m), 4.12(2H, t, J=6.2 Hz), 6.27–6.83(2H, m), 6.83–7.36(6H, m), 7.36–7.67 (4H, m), 7.93–8.11(1H, m), 9.77(1H, brs)

168) $^1$H-NMR(CDCl$_3$)δ; 1.11–2.98(11H, m), 2.80(3H, s), 3.69(2H, s), 2.98–5.24(2H, m), 6.50–7.71 (12H, m), 9.37(1H, brs)

169) $^1$H-NMR(CDCl$_3$)δ; 1.10–2.80(14H, m), 2.99(3H, s), 3.39–5.20(2H, m), 4.00(2H, s), 6.49–7.67

TABLE 6-continued

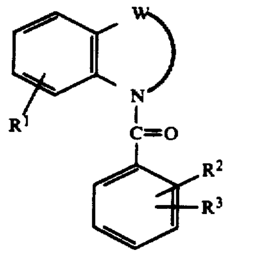

| | |
|---|---|
| | (12H, m), 8.51(1H, brs) |
| 170) | $^1$H-NMR(CDCl$_3$)δ; 1.10–1.98(3H, m), 1.98–2.82 (10H, m), 2.82–3.20(2H, m), 3.34–5.15(2H, m), 6.48–7.68(15H, m), 7.86(1H, brs) |
| 171) | $^1$H-NMR(CDCl$_3$)δ; 1.10–2.84(10H, m), 2.40(3H, s), 2.90–5.20(2H, m), 3.79(2H, d, J=2.7Hz), 4.33 (1H, br), 6.30–7.68(12H, m), 8.67(1H, brs) |
| 172) | $^1$H-NMR(CDCl$_3$)δ; 1.10–2.85(14H, m), 2.72(3H, s), 2.98–5.20(2H, m), 3.62(2H, s), 6.50–7.75 (12H, m), 9.18(1H, brs) |
| 173) | $^1$H-NMR(DMSO-d$_6$)δ; 1.28–2.62(4H, m), 2.07(3H, s), 2.34(6H, s), 3.04–3.57(2H, m), 3.99–4.86 (1H, m), 6.62–7.88(12H, m), 10.12–10.20(2H, m) |
| 174) | $^1$H-NMR(CDCl$_3$)δ; 1.39(3H, t, J=7.1Hz), 1.64–2.68(4H, m), 2.42(6H, s), 3.04–3.58(2H, m), 3.98–5.01(1H, m), 4.38(2H, q, J=7.1Hz), 6.57–8.57(13H, m) |
| 175) | $^1$H-NMR(DMSO-d$_6$)δ; 1.67–5.02(7H, m), 3.35(6H, s), 6.75–8.17(12H, m), 8.46(1H, s), 10.54(1H, s) |
| 176) | $^1$H-NMR(CDCl$_3$)δ; 1.21(3H, t, J=7.1Hz), 1.95–2.30(2H, m), 2.88(2H, t, J=6.2Hz), 3.40–3.65 (2H, m), 3.70–4.50(2H, m), 3.91(2H, s), 6.66 (1H, d, J=8.5Hz), 6.70–7.00(3H, m), 7.10–7.50(7H, m), 7.81(1H, d, J=2.5Hz), 8.44(1H, s) |
| 177) | $^1$H-NMR(CDCl$_3$)δ; 1.21(3H, t, J=7Hz), 1.30–5.20 (11H, m), 3.48(2H, q, J=7Hz), 3.90(2H, s), 6.53 (1H, d, J=8.3Hz), 6.65–7.00(4H, m), 7.00–7.40 (6H, m), 7.51(1H, d, J=2.5Hz), 8.40(1H, s) |
| 178) | $^1$H-NMR(CDCl$_3$)δ; 1.21(3H, t, J=7Hz), 1.20–5.20 (15H, m), 3.90(2H, s), 6.48(1H, d, J=8.3Hz), 6.50–7.70(11H, m), 8.39(1H, s) |
| 179) | $^1$H-NMR(CDCl$_3$)δ; 1.60–2.20(1H, m), 2.10–2.35 (1H, m), 2.45(3H, s), 2.70–2.95(2H, m), 3.25-3.45 (1H, m), 4.60–4.85(1H, m), 7.10–7.80(12H, m) |
| 180) | $^1$H-NMR(CDCl$_3$)δ; 1.65–2.15(4H, m), 2.46(3H, s), 2.6–5.15(4H, m), 6.75–6.95(1H, m), 7.15–7.55 (10H, m), 7.61(1H, s), 7.95–8.1(1H, m) |
| 181) | $^1$H-NMR(CDCl$_3$)δ; 1.60–2.15(3H, m), 2.15–2.90 (2H, m), 2.90–3.22(6H, m), 4.00–4.50(2H, m), 4.13 (2H, s), 4.58–5.22(2H, m), 6.53–6.80(1H, m), 6.90–7.90(7H, m), 8.48(1H, s) |
| 182) | $^1$H-NMR(CDCl$_3$)δ; 1.48–2.20(3H, m), 2.20–2.85 (2H, m), 2.85–3.27(6H, m), 4.05–4.47(2H, m), 4.47–5.22(2H, m), 6.50–6.76(1H, m), 6.76–6.91 (1H, m), 6.91–7.69(9H, m), 7.69–8.13(1H, m), 9.28 (1H, s), 11.87(1H, brs) |

EXAMPLE 978

5-Dimethylamino-1-(2-methyl-4-aminobenzoyl)-2,3,4,5-tetrahydro-1H-benzazepine (H) (1.00 g) is dissolved in dichloromethane (30 ml), and thereto is added triethylamine (0.48 ml) under ice-cooling, and further added dropwise 2-methylbenzoyl chloride (0.44 ml). The mixture is stirred at room temperature for 1 hour. The reaction solution is washed with water, and dried over magnesium sulfate. The solvent is distilled off, and the resulting residue is crystallized by adding thereto ethyl acetate. The precipitated crystal is recrystallized from dichloromethane/ethyl acetate to give 5-dimethylamino-1-[2-methyl-4-(2-methylbenzoylamino)benzoyl]-2,3,4,5-tetrahydro-1H-benzazepine (0.92 g) as white powder, m.p. 191–°192° C.

HPLC retention time: 7.5 minutes

Column; Wakosil II 5C$_{18}$ (trade mark; Wako Pure Chemical Co., Ltd.)

Solvent; acetonitrile : 50 mN aqueous $Na_2SO_4$ solution:acetic acid=27:73:1

Rate; 1.0 ml/min.

[α9 $_D^{22}$=0° (c=1.0, chloroform).

$^1$H-NMR (CDCl$_3$) δ; 1.15-3.25 (17H, m), 3.35-5.14 (2H, m), 6.62-8.05 (12H, m).

Figure 2:
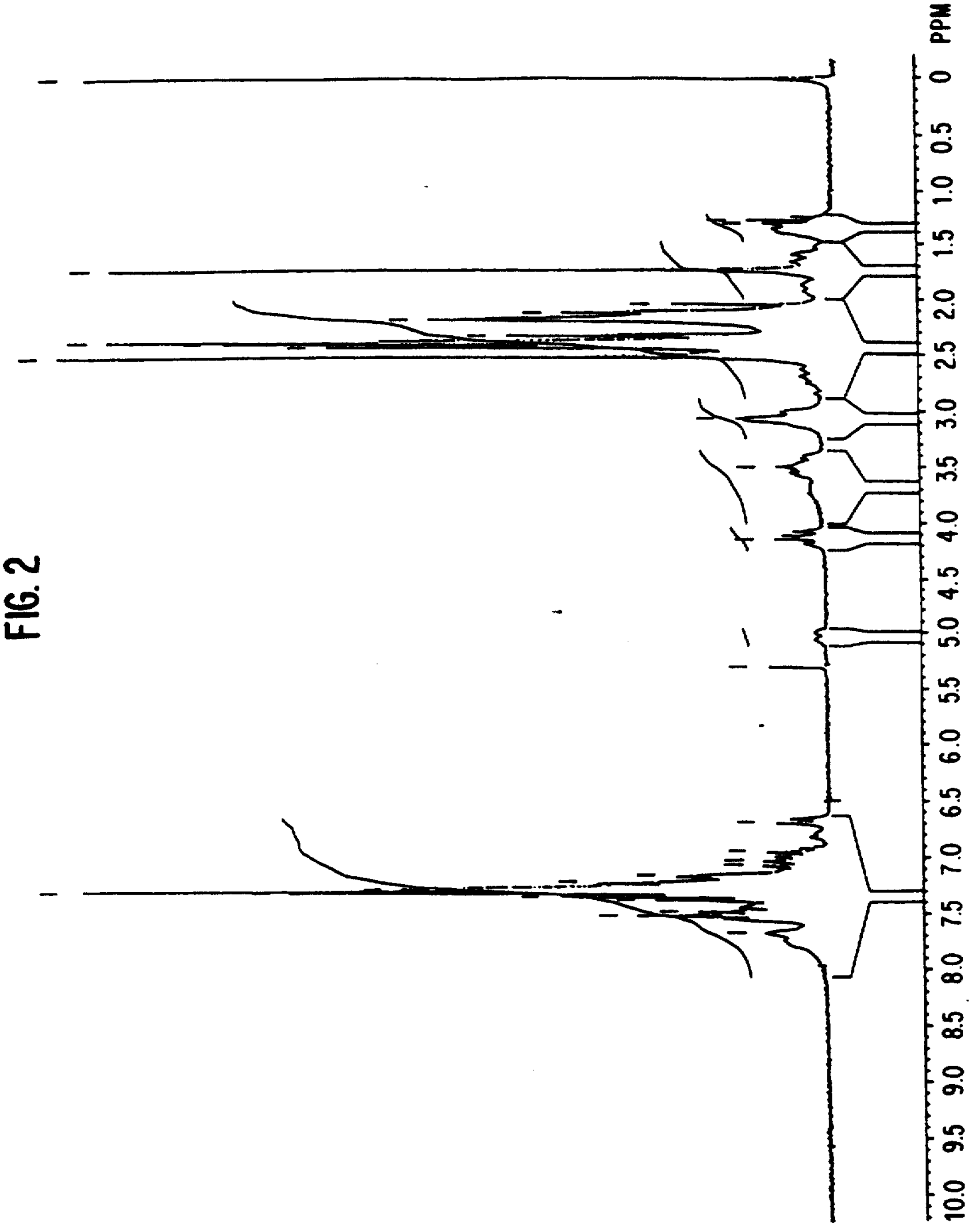

Charts of 1H-NMR (CDCl$_3$) of the starting compound (H) and the compound obtained in Example 978 are shown in FIG. 1 and FIG. 2, respectively.

EXAMPLE 979

Using 5-dimethylamino-1-(2-methyl-4-aminobenzoyl)-2,3,4,5-tetrahydro-1H-benzazepine (G) (1.00 g), 5-dimethyl-amino-1-[2-methyl-4-(2-methylbenzoylamino)benzoyl]-2,3,4,5-tetrahydro-1H-benzazepine (0.48 g) is obtained in the same manner as in Example 978 except that methanol/diethyl ether is used instead of ethyl acetate as recrystallization solvent, as white powder, m.p. 183°-185° C.

HPLC retention time:8.1 minutes (the conditions of HPLC are same as those in Example 978) $[\alpha]_D^{22}=0°$ (c=1.3, chloroform)

$^1$H-NMR (CDCl$_3$) δ; 1.10-3.20 (17H, m), 3.35-5.15 (2H, m), 6.50-6.80 (1H, m), 6.86-7.62 (10H, m), 7.65-8.09 (1H, m).

Figure 3:
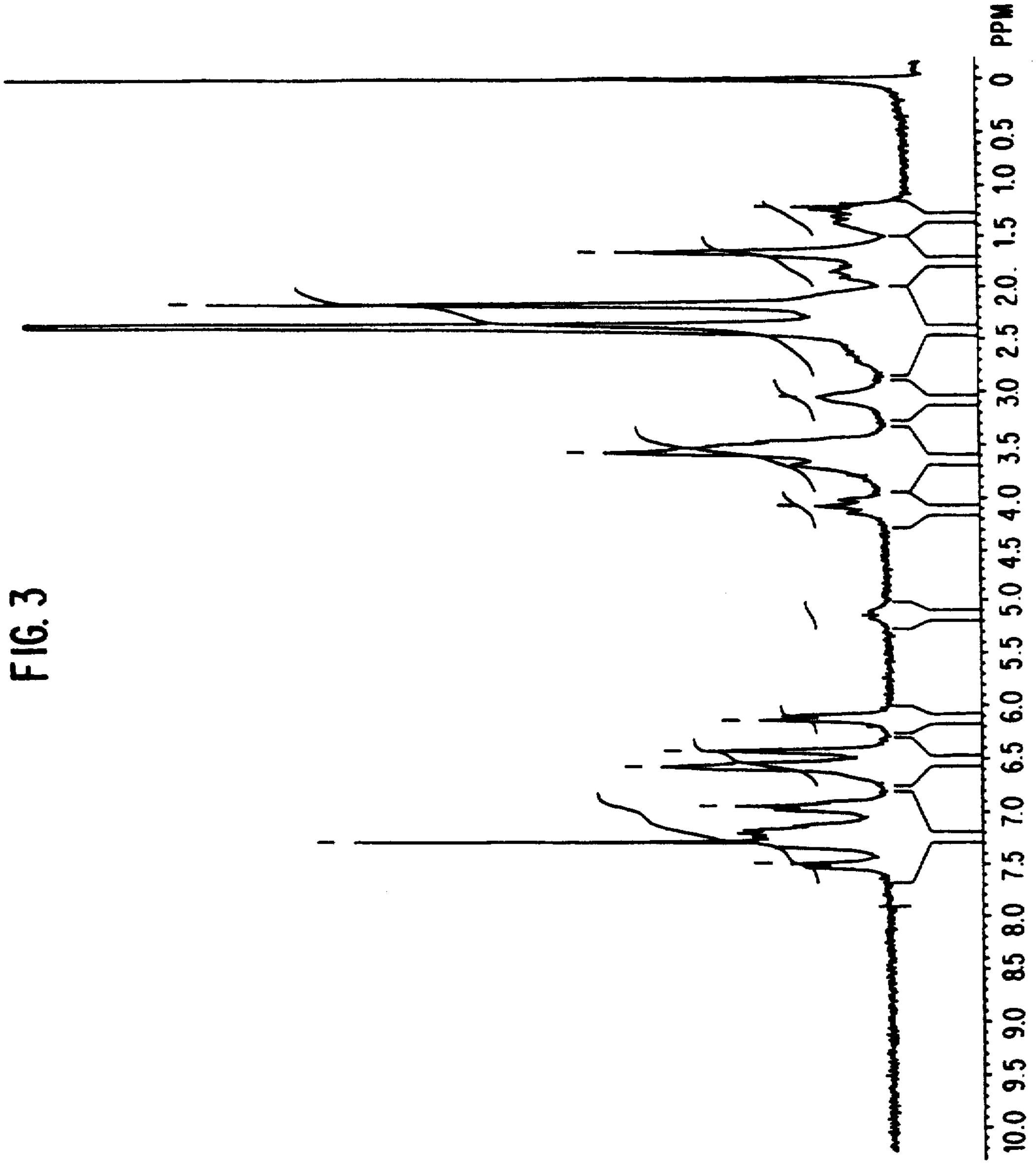
Figure 4:
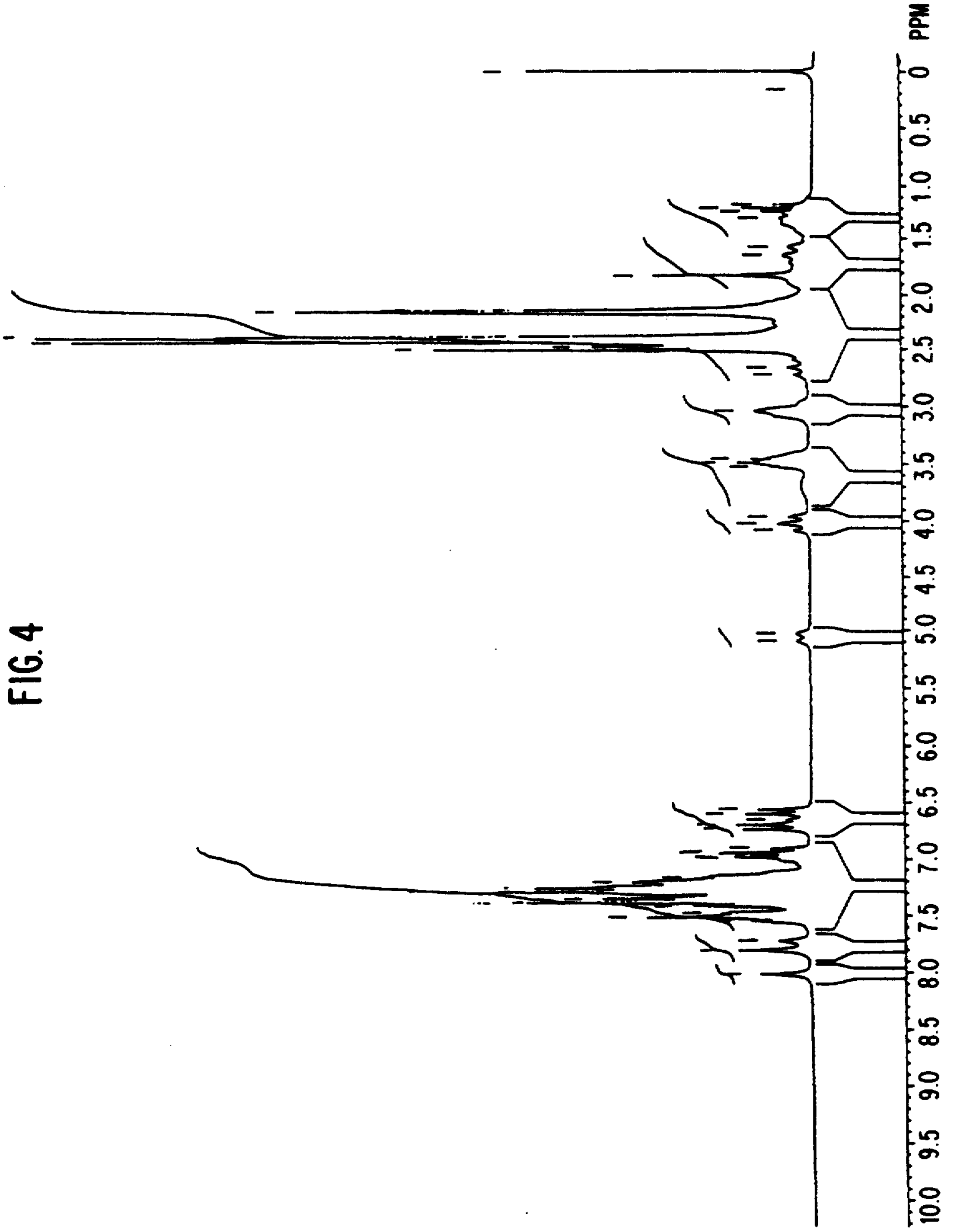

Charts of 1H-NMR (CDCl$_3$) of the starting compound (G) and the compound obtained in Exmaple 979 are shown in FIG. 3 and FIG. 4, respectively.

REFERENCE EXAMPLE 18

Using the suitable starting materials, the following compounds are obtained in the same manner as in Reference Example 1. 7-Methoxy-5-oxo-1-(4-nitrobenzoyl)-2,3,4,5-tetrahydro-1H-benzazepine, colorless needles, m.p. 178–°178.5° C. (recrystallized from ethyl acetate/n-hexane).

7-Methoxy-5-oxo-1-(2-chloro-4-nitrobenzoyl)-2,3,4,5-tetrahydro-1H-benzazepine, white powder, m.p. 150°-151° C. (recrystallized from ethyl acetate/n-hexane).

7-Methoxy-5-oxo-1-(3-methoxy-4-nitrobenzoyl)-2,3,4,5-tetrahydro-1H-benzazepine, white powder, m.p. 116–°118° C. (recrystallized from ethyl acetate/n-hexane).

7-Chloro-5-oxo-1-(3-methoxy-4-nitrobenzoyl)-2,3,4,5-tetrahydro-1H-benzazepine, yellow powder, m.p. 156–°158° C. (recrystallized from diethyl ether/dichloromethane).

REFERENCE EXAMPLE 19

Using the suitable starting materials, the following compounds are obtained in the same manner as in Reference Example 2.

7-Methoxy-5-oxo-1-(4-aminobenzoyl)-2,3,4,5-tetrahydro-1H-benzazepine, white powder, m.p. 172.5–°173.5° C. (recrystallized from ethyl acetate/n-hexane).

7-Methoxy-5-oxo-1-(2-chloro-4-aminobenzoyl)-2,3,4,5-tetrahydro-1H-benzazepine, white powder, m.p. 153–°155° C. (recrystallized from ethyl acetate/n-hexane).

7-Methoxy-5-oxo-1-(3-methoxy-4-aminobenzoyl)-2,3,4,5-tetrahydro-1H-benzazepine, colorless needles, m.p. 170–°171° C. (recrystallized from ethyl acetate/n-hexane). 7-Chloro-5-oxo-1-(3-methoxy-4-aminobenzoyl)-2,3,4,5-tetrahydro-1H-benzazepine, yellow oil $^1$H-NMR ($CDCl_3$) δ; 2.05–2.30 (2H, m), 2.85–3.00 (2H, m), 3.70 (3H, s), 3.85–4.30 (4H, m), 6.42 (1H, d, J=8.1 Hz), 6.64 (1H, dd, J=1.7 Hz, 8.1 Hz), 6.72 (1H, d, J=8.5 Hz), 6.80 (1H, d, J=1.8 Hz), 7.19 (1H, dd, J=2.6 Hz, 8.5 Hz), 7.81 (1H, d, J=2.5 Hz).

Using the suitable starting materials, the compounds of the following Table 7 are obtained in the same manner as in the above Examples 1 and 382.

TABLE 7

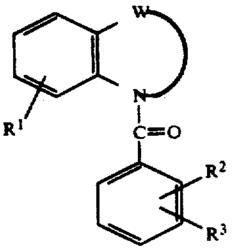

Example 980
Structure

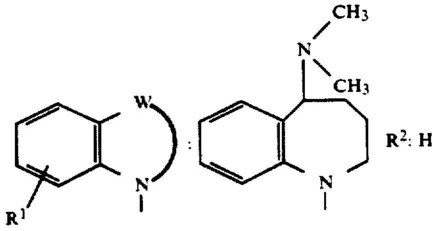

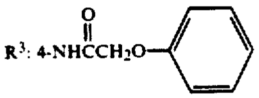

Crystalline form: Colorless amorphous
NMR analysis: 183)
Form: Free
Example 981
Structure

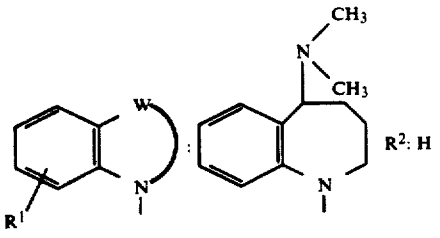

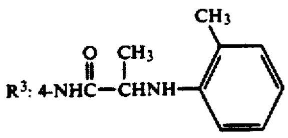

Crystalline form: Colorless amorphous
NMR analysis: 184)
Form: Free
Example 982
Structure TABLE 7-continued

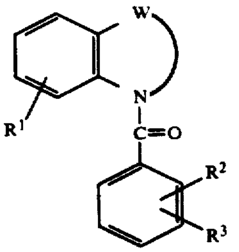

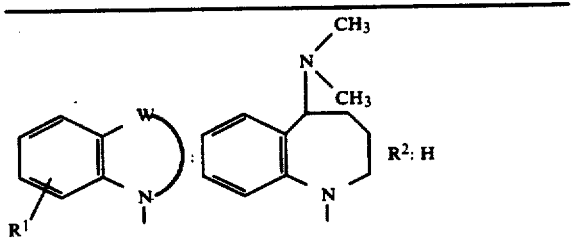

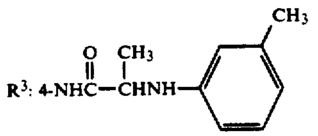

Crystalline form: Colorless amorphous
NMR analysis: 185)
Form: Free
Example 983
Structure

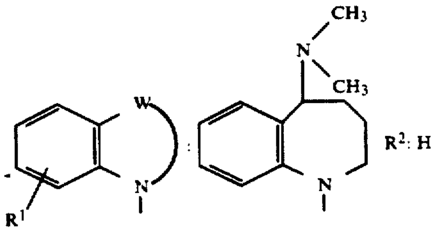

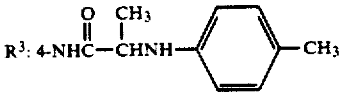

Crystalline form: Colorless amorphous
NMR analysis: 186)
Form: Free
Example 984
Structure

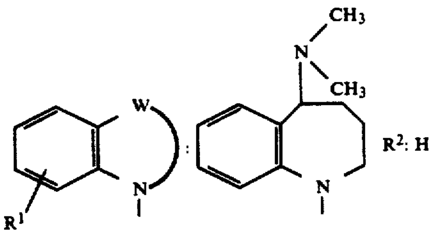

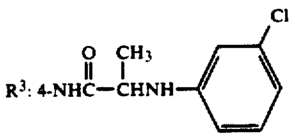

Crystalline form: Colorless amorphous

TABLE 7-continued

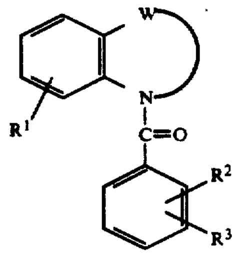

NMR analysis: 187)
Form: Free
Example 985
Structure

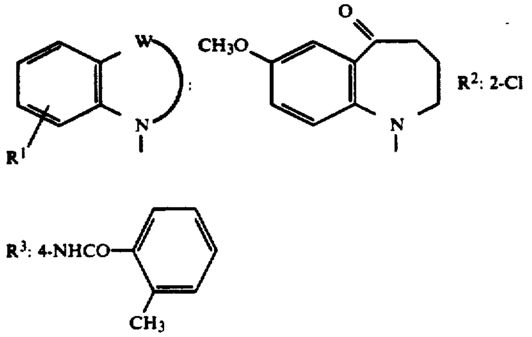

Crystalline form: Colorless amorphous
NMR analysis: 188)
Form: Free
Example 986
Structure

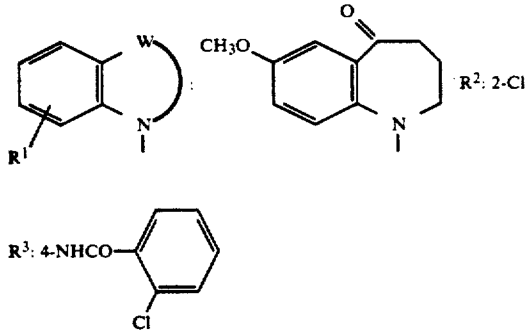

Crystalline form: Colorless amorphous
NMR analysis: 189)
Form: Free
Example 987
Structure

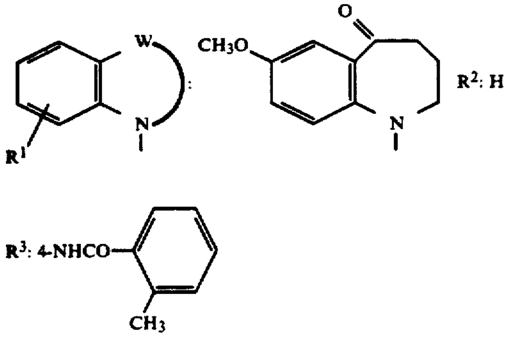

Crystalline form: White powder

TABLE 7-continued

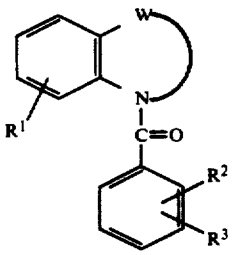

Recrystallization solvent: Ethanol/water
Melting Point: 267-268° C.
Form: Free
Example 988
Structure

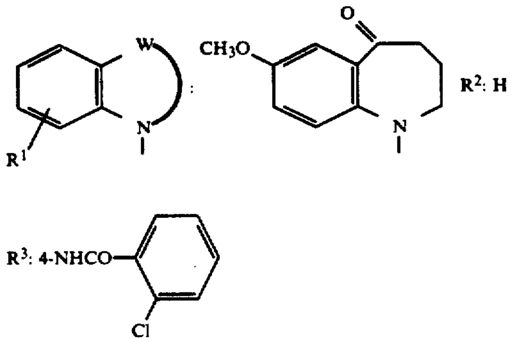

Crystalline form: White powder
Recrystallization solvent: Ethanol/water
Melting Point: 264-266° C.
Form: Free
Example 989
Structure

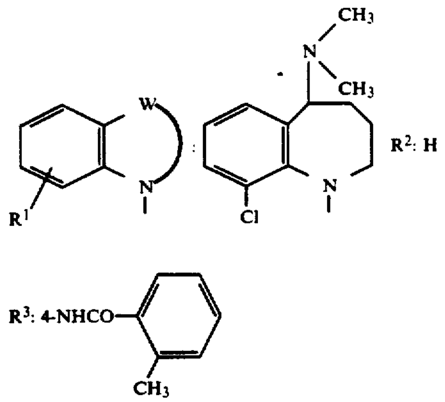

Crystalline form: White powder
Recrystallization solvent: Dichloromethane/diethyl ether
Melting Point: 218-220° C.
Form: Free
Example 990
Structure

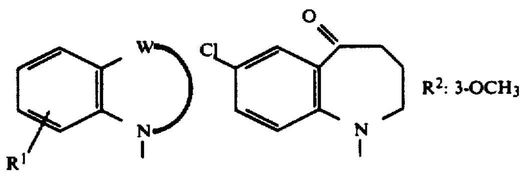

TABLE 7-continued

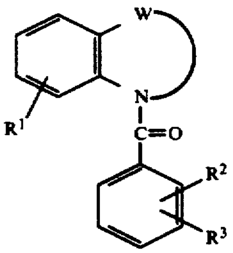

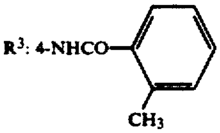

Crystalline form: Yellow oil
NMR analysis: 190)
Form: Free
Example 991
Structure

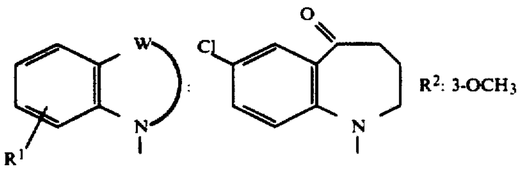

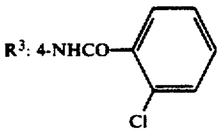

Crystalline form: Yellow oil
NMR analysis: 191)
Form: Free
Example 992
Structure

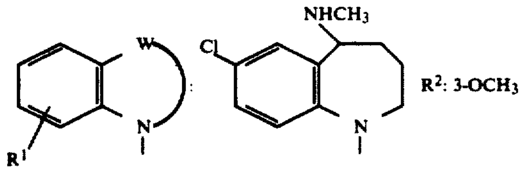

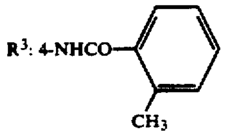

Crystalline form: Yellow powder
Recrystallization solvent: Dichloromethane/diethyl ether
Melting Point: 174-177° C.
Form: Free
Example 993
Structure TABLE 7-continued

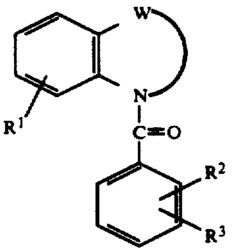

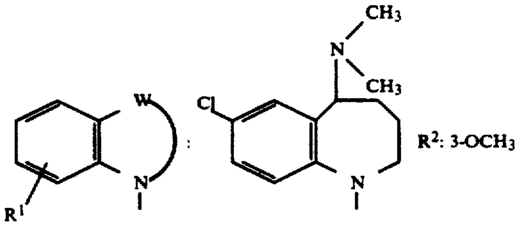

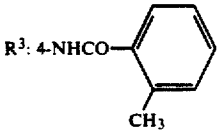

Crystalline form: Yellow amorphous
NMR analysis: 192)
Form: Free
Example 994
Structure

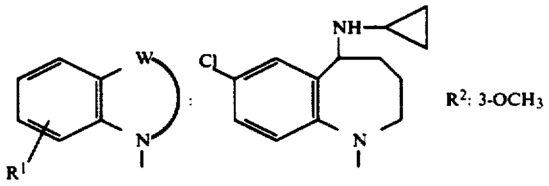

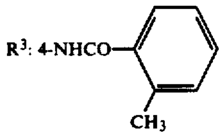

Crystalline form: Colorless amorphous
NMR analysis: 193)
Form: Free
Example 995
Structure

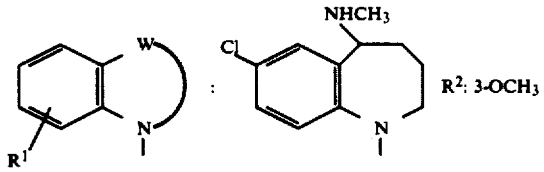

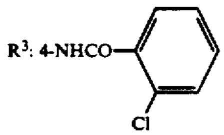

Crystalline form: White powder
Recrystallization solvent: Diethyl ether/dichloromethane TABLE 7-continued

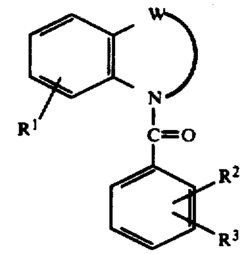

Melting Point: 163-165° C.
Form: Free
Example 996
Structure

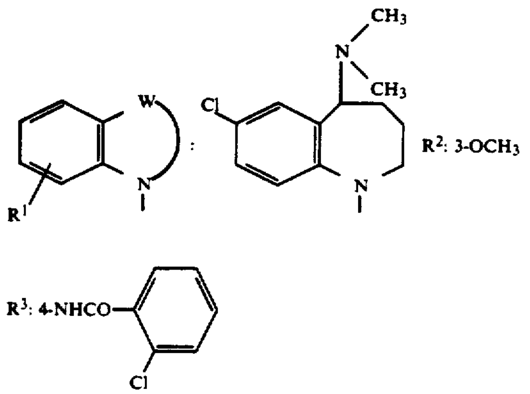

Crystalline form: Colorless amorphous
NMR analysis: 194)
Form: Free
Example 997
Structure

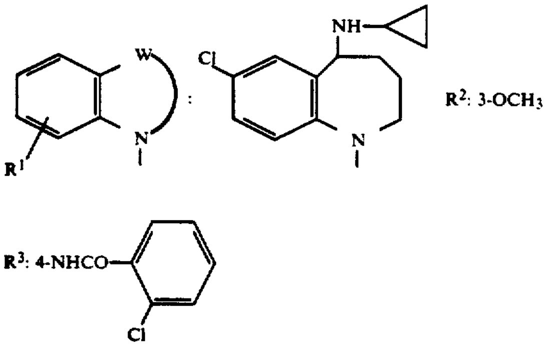

Crystalline form: Colorless amorphous
NMR analysis: 195)
Form: Free

183) ¹H-NMR(CDCl₃)δ; 1.10–2.83(11H, m), 2.96–5.21 (2H, m), 4.55(2H, s), 6.48–7.72(13H, m), 8.30 (1H, brs)

184) ¹H-NMR(CDCl₃)δ; 1.10–2.85(11H, m), 1.58(3H, d, J=6.8Hz), 2.23(3H, s), 2.95–5.19(4H, m), 6.38–7.70(12H, m), 8.69(1H, brs)

185) ¹H-NMR(CDCl₃)δ; 1.10–2.85(14H, m), 2.26(3H, s), 2.96–5.19(4H, m), 6.36–7.68(12H, m), 8.72 (1H, brs)

186) ¹H-NMR(CDCl₃)δ; 1.09–2.72(11H, m), 1.53(3H, d, J=6.9Hz), 2.24(3H, s), 2.93–5.21(4H, m), 6.30–7.78(12H, m), 8.76(1H, brs)

187) ¹H-NMR(CDCl₃)δ; 1.10–2.82(14H, m), 2.96–5.20(4H, m), 6.38–7.70(12H, m), 8.54(1H, brs)

188) ¹H-NMR(CDCl₃)δ; 1.64–2.28(2H, m), 2.41(3H, s), 2.60–2.90(2H, m), 2.90–3.70(1H, m), 3.76(3H, s), 4.10–5.10(1H, m), 6.60–7.70(10H, m), 8.51(1H, s)

TABLE 7-continued

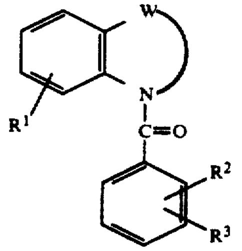

189) ¹H-NMR(CDCl₃)δ; 1.64–2.43(2H, m), 2.67–2.97(2H, m), 3.00–3.70(1H, m), 3.77(3H, s), 4.20–5.10(1H, m), 6.60–7.75(10H, m), 8.51(1H, s)

190) ¹H-NMR(CDCl₃)δ; 2.00–2.35(2H, m), 2.49(3H, s), 2.89(2H, t, J=6.2Hz), 3.72(3H, s), 3.40–4.80(2H, m), 6.74(2H, d, J=8.5Hz), 6.80–7.00(2H, m), 7.25–7.60(5H, m), 7.80(1H, d, J=2.6Hz), 8.16(1H, s), 8.37(1H, d, J=8.6Hz)

191) ¹H-NMR(CDCl₃)δ; 1.90–2.40(2H, m), 2.90(2H, t, J=6.2Hz), 3.75(3H, s), 3.40–4.80(2H, m), 6.74(1H, d, J=8.5Hz), 6.80–7.00(2H, m), 7.10–7.50(4H, m), 7.73(1H, dd, J=2.3Hz, 6Hz), 7.80(1H, d, J=2.5Hz), 8.38(1H, d, J=8.8Hz), 8.65(1H, s)

192) ¹H-NMR(CDCl₃)δ; 1.10–2.10(13H, m), 2.90–5.20(6H, m), 6.56(1H, d, J=8.4Hz), 6.69(1H, d, J=7Hz), 6.85–7.70(7H, m), 8.15(1H, s), 8.31(1H, d, J=8.4Hz)

193) ¹H-NMR(CDCl₃)δ; 0.30–0.65(4H, m), 1.20–2.50(7H, m), 2.50(3H, s), 3.10–5.20(2H, m), 3.75(3H, s), 6.60(1H, d, J=8.3Hz), 6.70–7.60(8H, m), 8.14(1H, s), 8.20–8.40(1H, m)

194) ¹H-NMR(CDCl₃)δ; 0.80–2.50(10H, m), 2.90–4.10(6H, m), 6.50–7.80(9H, m), 8.32(1H, d, J=8Hz), 8.62(1H, s)

195) ¹H-NMR(CDCl₃)δ; 0.30–0.65(4H, m), 0.70–2.40(6H, m), 2.60–5.20(6H, m), 6.50–7.80(9H, m), 8.30(1H, d, J=8Hz), 8.62(1H, s)

REFERENCE EXAMPLE 20

Using the suitable starting materials, the following compounds are obtained in the same manner as in Reference Example 1.

7-Methyl-5--oxo-1-(4-nitrobenzoyl)-2,3,4,5-tetrahydro-1H-benzazepine, white needles ¹H-NMR ($CDCl_3$) δ; 2.20 (2H, brs), 2.32 (3H, s), 2.88 (2H, t, J=6.3 Hz), 3.40–4.79 (2H, m), 6.57 (1H, d, J=8.0 Hz), 7.04 (1H, d, J=7.7 Hz), 7.36 (2H, d, J=8.6 Hz), 7.62 (1H, d, J=1.7 Hz), 8.04 (2H, d, J=8.7 Hz).

7-Dimethylamino-5-oxo-1-(4-nitrobenzoyl)-2,3,4,5-tetrahydro-1H-benzazepine, red brown prisms (recrystallized from dichloromethane/diethyl ether).

¹H-NMR ($CDCl_3$) δ; 1.75–2.47 (2H, m), 2.60–3.62, 4.51–4.92 (total 4H, m), 2.93 (6H, s), 6.46 (1H, dd, J=2.2 Hz, 7.0 Hz), 6.52 (1H, d, J=7.0 Hz), 7.33 (2H, d, J=7.0 Hz), 8.00 (2H, d, J=7.0 Hz).

7-Bromo-5-oxo-1-(4-nitrobenzoyl)-2,3,4,5-tetrahydro-1H-benzazepine, white powder (recrystallized from dichloromethane/diethyl ether), m.p. 177–182° C.

7-Chloro-5-oxo-1-(2-methyl-4-nitrobenzoyl)-2,3,4,5-tetrahydro-1H-benzazepine, white powder (recrystallized from dichloromethane/diethyl ether).

¹H-NMR ($CDCl_3$) δ;1.78–2.37 (2H, m), 2.48 (3H, s), 2.88 (2H, t, J=6.1 Hz), 3.30–5.12 (2H, m), 6.47–6.82 (1H, m), 6.82–7.09 (1H, m), 7.09–7.27 (1H, m), 7.48–8.35 (3H, m).

6-Oxo-1-(2-chloro-4-nitrobenzoyl)-1,2,3,4,5,6-hexahydrobenzazocine, yellow amorphous $^1$H-NMR ($CDCl_3$) δ; 1.7–2.1 (4H, m), 2.85–4.7 (4H, m), 7.12 (1H, d, J=8.4 Hz), 7.17–7.51 (4H, m), 7.89 (1H, dd, J=7.8 Hz, 2.1 Hz), 8.11 (1H, d, J=2.2 Hz).

8-Chloro-6-oxo-1-(2-chloro-4-nitrobenzoyl)-1,2,3,4,5,6-hexahydrobenzazocine, yellow amorphous $^1$H-NMR ($CDCl_3$) δ; 1.7–2.15 (4H, m), 2.85–4.8 (4H, m), 7.14 (1H, d, J=8.5 Hz), 7.16 (1H, d, J=8.4 Hz), 7.34 (1H, dd, J=8.3 Hz, 2.5 Hz), 7.85 (1H, d, J=2.5 Hz), 7.94 (1H, dd, J=8.4 Hz, 2.2 Hz), 8.13 (1H, d, J=2.1 Hz).

8-Methyl-6-oxo-1-(2-chloro-4-nitrobenzoyl)-1,2,3,4,5,6-hexahydrobenzazocine, yellow amorphous $^1$H-NMR ($CDCl_3$) δ; 1.65–2.2 (4H, m), 2.33 (3H, s), 2.7–5.0 (4H, m), 7.0–7.25 (3H, m), 7.67 (1H, d, J=2.0 Hz), 7.89 (1H, dd, J=8.4 Hz, 2.2 Hz), 8.10 (1H, d, J=2.1 Hz).

8-Methoxy-6-oxo-1-[2-chloro-4-nitrobenzoyl)-1,2,3,4,5,6-hexahydrobenzazocine, light yellow amorphous $^1$H-NMR ($CDCl_3$) δ; 1.6–2.05 (4H, m), 2.8–5.2 (4H, m), 3.78 (3H, s), 6.88 (1H, dd, J=8.6 Hz, 3.1 Hz), 7.11 (1H, d, J=8.4 Hz), 7.12 (1H, d, J=8.6 Hz), 7.38 (1H, d, J=3.0 Hz), 7.90 (1H, dd, J=8.4 Hz, 2.2 Hz), 8.11 (1H, d, J=2.2 Hz).

7-Chloro-5-oxo-1-(2-chloro-4-nitrobenzoyl)-2,3,4,5-tetrahydro-1H-benzazepine, yellow powder (recrystallized from diethyl ether/dichloromethane), m.p. 125–°126.5° C.

REFERENCE EXAMPLE 21

Using the suitable starting materials, the following compounds are obtained in the same manner as in Reference Example 2.

7-Methyl-5-oxo-1-(4-aminobenzoyl)-2,3,4,5-tetrahydro-1H-benzazepine, yellow powder $^1$H-NMR ($CDCl_3$) δ; 2.13 (2H, brs), 2.32 (3H, s), 2.86 (2H, t, J=6.2 Hz), 2.89–5.29 (2H, m), 3.86 (2H, brs), 6.41 (2H, m), 6.65 (1H, d, J=8.1 Hz), 7.06 (3H, m), 7.65 (1H, d, J=1.7 Hz).

7-Dimethylamino-5-oxo-1-(4-aminobenzoyl)-2,3,4,5-tetrahydro-1H-benzazepine, yellow needles (recrystallized from dichloromethane/diethyl ether)

$^1$H-NMR ($CDCl_3$)δ; 1.78–2.49(2H, m), 2.64–3.78, 4.07–5.02 (total 4H, m), 2.93 (6H, m), 3.96 (2H, m), 6.38 (2H, d, J=8.7 Hz), 6.55 (1H, dd, J=2.7, 8.7 Hz), 6.62 (1H, d, J=8.7 Hz), 6.96–7.18 (3H, m).

7-Bromo-5-oxo-1-(4-aminobenzoyl)-2,3,4,5-tetrahydro-1H-benzazepine, white powder (recrystallized from methanol/diethyl ether)

$^1$H-NMR ($CDCl_3$)δ; 1.98–2.37 (2H, m), 2.88 (2H, t, J=6.3 Hz), 3.52–4.55 (4H, m), 6.28–6.57 (2H, m), 6.57–6.76 (1H, m), 6.92–7.20 (2H, m), 7.28–7.42 (1H, m), 7.90–8.09 (1H, m).

7-Chloro-5-oxo-1-(2-methyl-4-aminobenzoyl)-2,3,4,5-tetrahydro-1H-benzazepine, white powder (recrystallized from dichloromethane/diethyl ether), m.p. 190°–191° C.

6-Oxo-1-(2-chloro-4-aminobenzoyl)-1,2,3,4,5,6-hexahydrobenzazocine, light yellow amorphous $^1$H-NMR ($CDCl_3$)δ; 1.3–2.25 (4H, m), 2.8–4.4 (6H, m), 6.1–6.9 (3H, m), 6.95–7.75 (3H, m), 7.8–8.3 (1H, m).

8-Chloro-6-oxo-1-(2-chloro-4-aminobenzoyl)-1,2,3,4,5,6-hexahydrobenzazocine, light yellow amorphous $^1$H-NMR ($CDCl_3$)δ; 1.59–2.2 (4H, m), 2.6–4.4 (6H, m), 6.1–6.9 (3H, m), 6.95–7.5 (2H, m), 7.8–8.05 (1H, m).

7-Chloro-5-oxo-1-(2-chloro-4-aminobenzoyl)-2,3,4,5-tetrahydro-1H-benzazepine, yellow powder (recrystallized from diethyl ether/dichloromethane), m.p. 188°–191.5° C.

Using the suitable starting materials, the compounds of the following Table 8 are obtained in the same manner as in above Examples 1 and 382.

TABLE 8

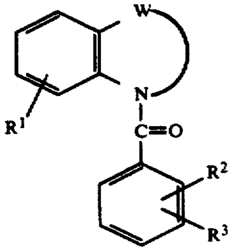

Example 998
Structure

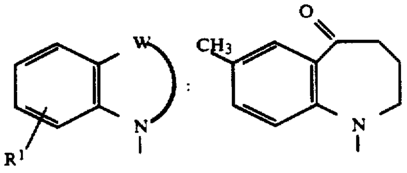

R²: H

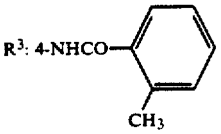

Crystalline form: White Powder
NMR analysis: 196)
Form: Free
Example 999
Structure

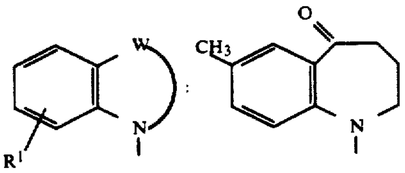

R²: H

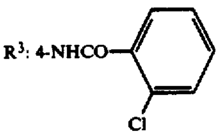

Crystalline form: White powder
NMR analysis: 197)
Form: Free
Example 1000
Structure

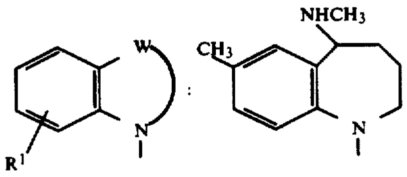

R²: H

TABLE 8-continued

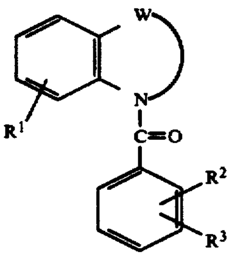

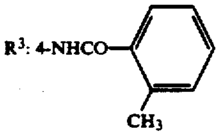

Crystalline form: White powder
Recrystallization solvent: Dichloromethane/diethyl ether
Melting Point: 200–205° C.
Form: Free
Example 1001
Structure

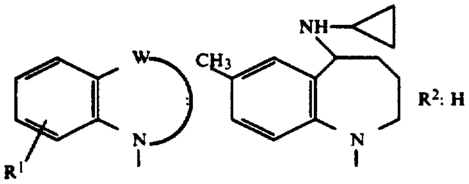

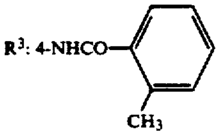

Crystalline form: Colorless amorphous
NMR analysis: 198)
Form: Free
Example 1002
Structure

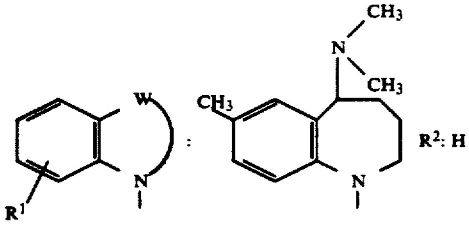

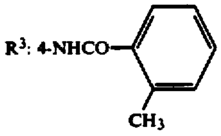

Crystalline form: White powder
Recrystallization solvent: Dichloromethane/diethyl ether
Melting Point: 234–238° C.
Form: Free
Example 1003
Structure TABLE 8-continued

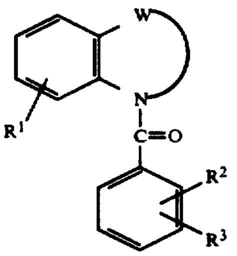

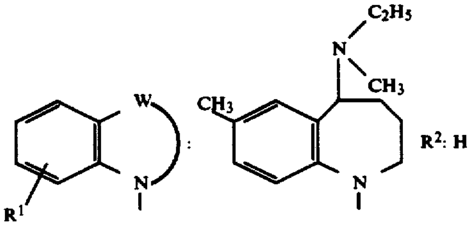

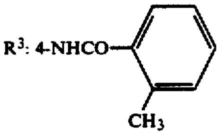

Crystalline form: White powder
Recrystallization solvent: Ethyl acetate/n-hexane
Melting Point: 174–178° C.
Form: Free
Example 1004
Structure

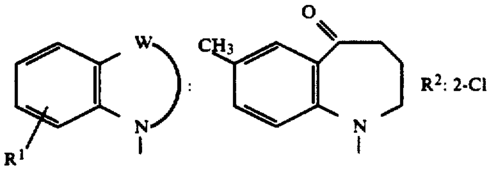

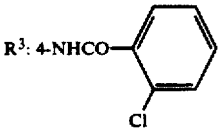

Crystalline form: Light yellow amorphous
NMR analysis: 199)
Form: Free
Example 1005
Structure

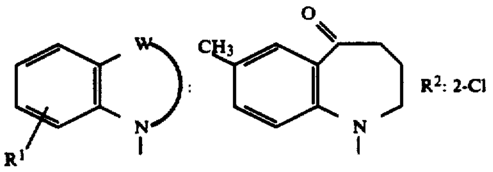

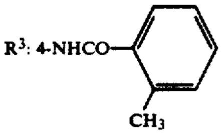

Crystalline form: Light yellow amorphous
NMR analysis: 200)

TABLE 8-continued

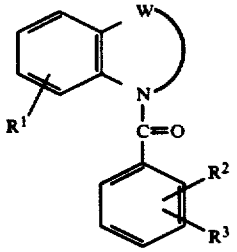

Form: Free
Example 1006
Structure

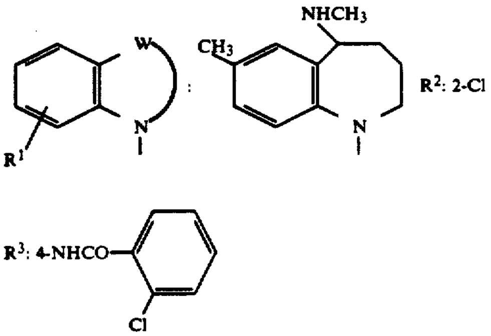

Crystalline form: Light yellow amorphous
NMR analysis: 201)
Form: Free
Example 1007
Structure

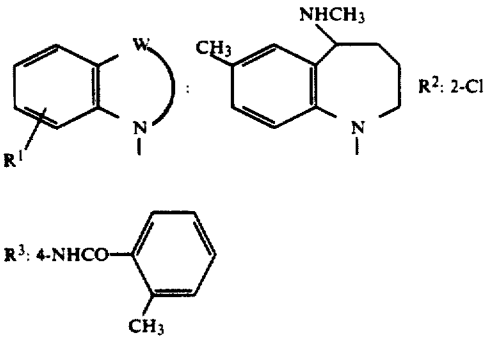

Crystalline form: Light yellow amorphous
NMR analysis: 202)
Form: Free
Example 1008
Structure

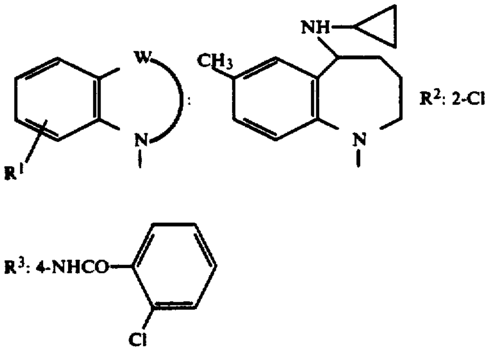

Crystalline form: Light yellow amorphous

TABLE 8-continued

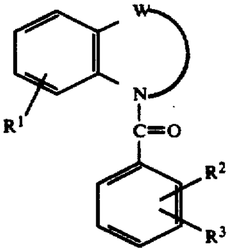

MNR analysis: 203)
Form: Free
Example 1009
Structure.

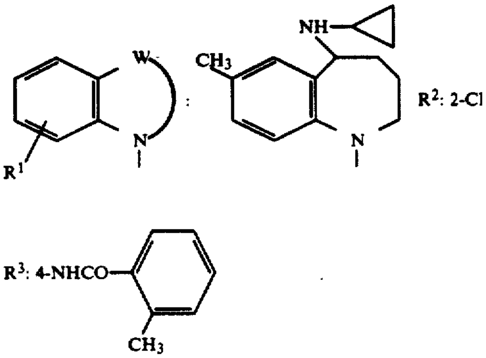

Crystalline form: Light yellow amorphous
NMR analysis: 204)
Form: Free
Example 1010
Structure

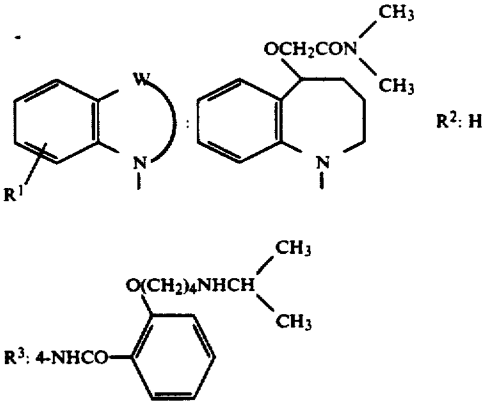

Crystalline form: Colorless amorphous
NMR analysis: 205)
Form: Free
Example 1011
Structure

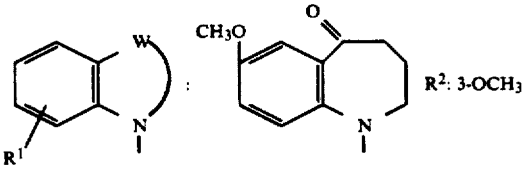

TABLE 8-continued

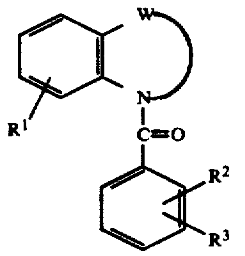

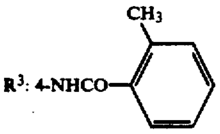

Crystalline form: White powder
Recrystallization solvent: Ethyl acetate/n-hexane
Melting Point: 153-155° C.
Form: Free
Example 1012
Structure

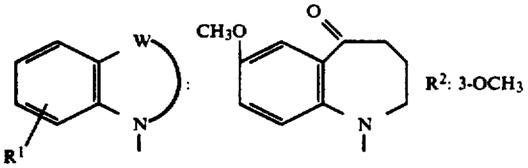

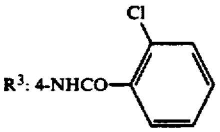

Crystalline form: White powder
Recrystallization solvent: Ethyl acetate/n-hexane
Melting Point: 142-143° C.
Form: Free
Example 1013
Structure

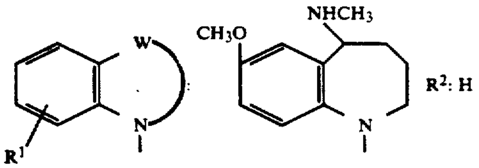

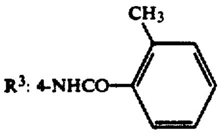

Crystalline form: White powder
Recrystallization solvent: Ethyl acetate/n-hexane
Melting Point: 176-178° C.
Form: Free
Example 1014
Structure

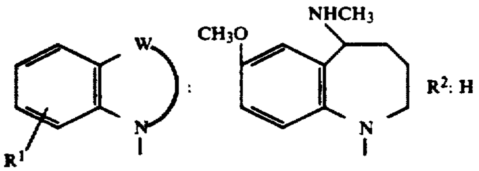

TABLE 8-continued

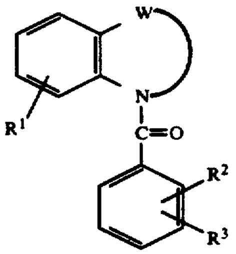

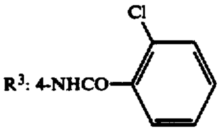

Crystalline form: White powder
Recrystallization solvent: Ethyl acetate/n-hexane
Melting Point: 186-188° C.
Form: Free
Example 1015
Structure

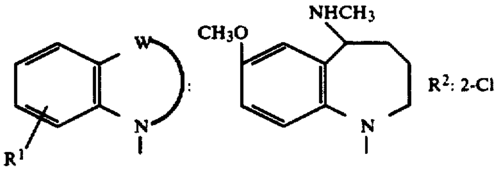

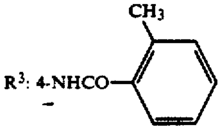

Crystalline form: Colorless amorphous
NMR analysis: 206)
Form: Free
Example 1016
Structure

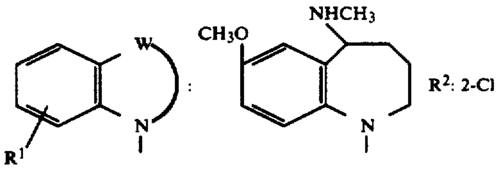

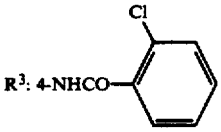

Crystalline form: Colorless amorphous
NMR analysis: 207)
Form: Free
Example 1017
Structure

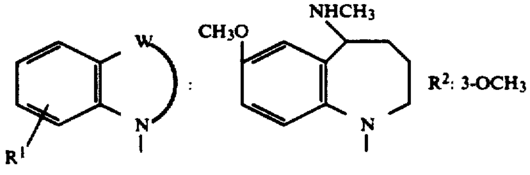

TABLE 8-continued

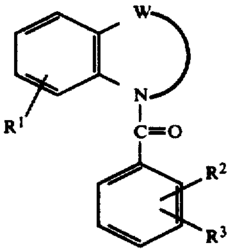

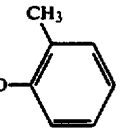
$R^3$: 4-NHCO—

Crystalline form: White powder
Recrystallization solvent: Ethyl acetate/n-hexane
Melting Point: 191-191.5° C.
Form: Free
Example 1018
Structure

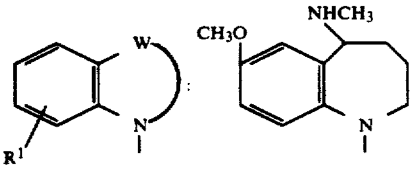
$R^2$: 3-$OCH_3$

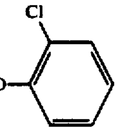
$R^3$: 4-NHCO—

Crystalline form: White powder
Recrystallization solvent: Ethyl acetate/n-hexane
Melting Point: 210-212° C.
Form: Free
Example 1019
Structure

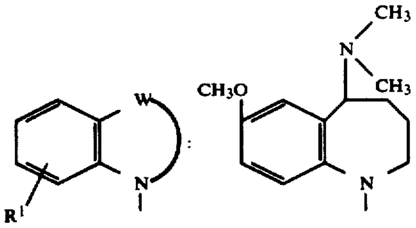
$R^2$: H

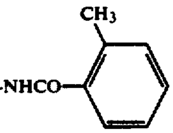
$R^3$: 4-NHCO—

Crystalline form: White powder
Recrystallization solvent: Ethyl acetate/n-hexane
Melting Point: 196-198° C.
Form: Free
Example 1020
Structure TABLE 8-continued

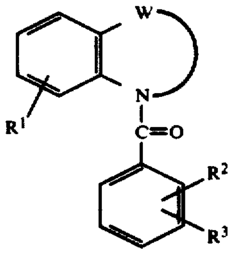

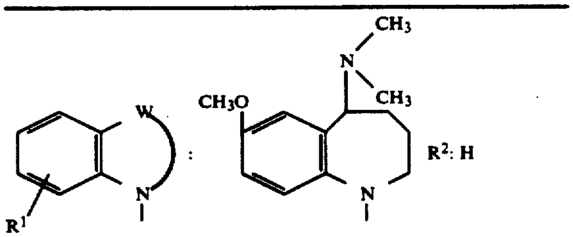
$R^2$: H

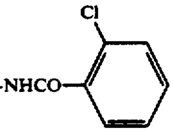
$R^3$: 4-NHCO—

Crystalline form: Colorless amorphous
NMR analysis: 208)
Form: Free
Example 1021
Structure

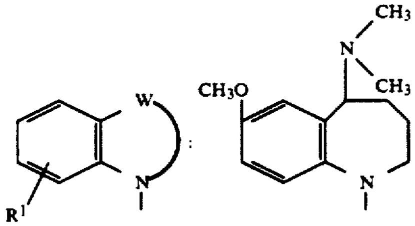
$R^2$: 2-Cl

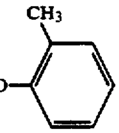
$R^3$: 4-NHCO—

Crystalline form: Colorless amorphous
NMR analysis: 209)
Form: Free
Example 1022
Structure

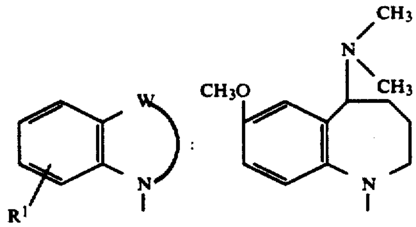
$R^2$: 2-Cl

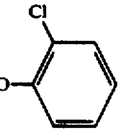
$R^3$: 4-NHCO—

TABLE 8-continued

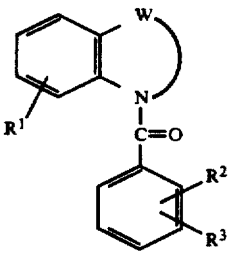

Crystalline form: Colorless amorphous
NMR analysis: 210)
Form: Free
Example 1023
Structure

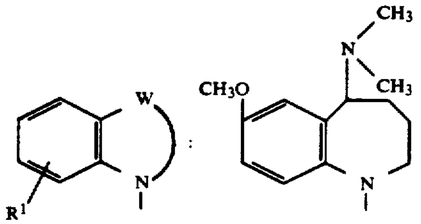

$R^2$: 3-$OCH_3$ $R^3$: 4-NHCO—

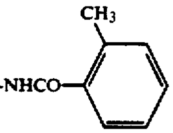

Crystalline form: Colorless amorphous
NMR analysis: 211)
Form: Free
Example 1024
Structure

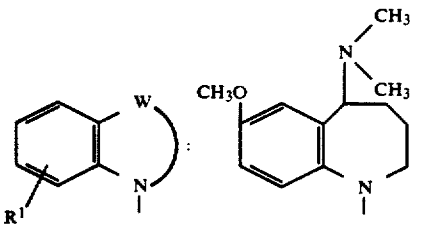

$R^2$: 3-$OCH_3$ $R^3$: 4-NHCO—

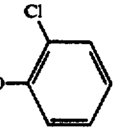

Crystalline form: Colorless amorphous
NMR analysis: 212)
Form: Free
Example 1025
Structure

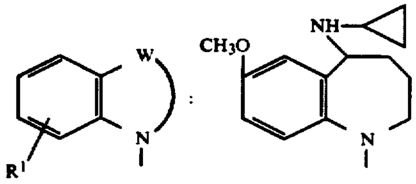

$R^2$: 2-Cl

TABLE 8-continued

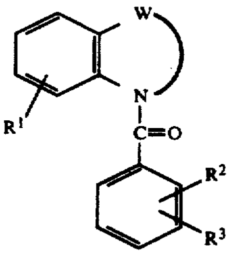

$R^3$: 4-NHCO—

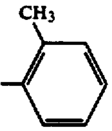

Crystalline form: Colorless amorphous
NMR analysis: 213)
Form: Free
Example 1026
Structure

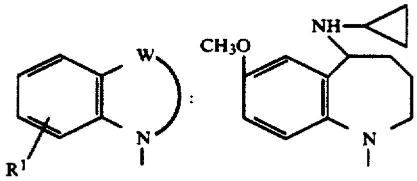

$R^2$: 2-Cl $R^3$: 4-NHCO—

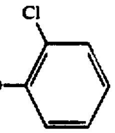

Crystalline form: Colorless amorphous
NMR analysis: 214)
Form: Free
Example 1027
Structure

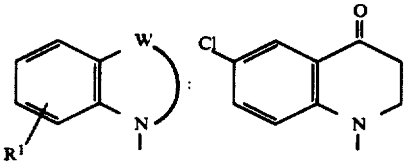

$R^2$: 2-Cl $R^3$: 4-NHCO—

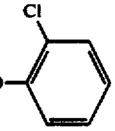

Crystalline form: Colorless prisms
Recrystallization solvent: Ethanol
Melting Point: 207-208° C.
Form: Free
Example 1028
Structure

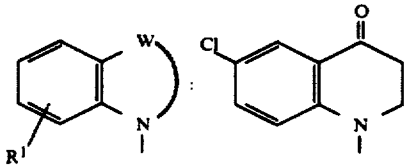

$R^2$: 2-Cl

TABLE 8-continued

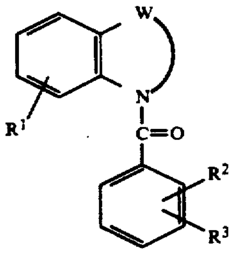

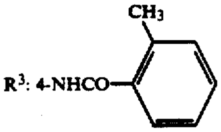

Crystalline form: White powder
Recrystallization solvent: Ethanol
Melting Point: 201-202° C.
Form: Free
Example 1029
Structure

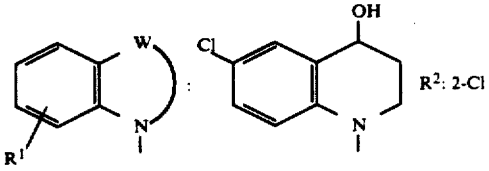

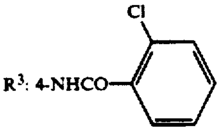

Crystalline form: White powder
Recrystallization solvent: Ethanol
Melting Point: 193-194° C.
Form: Free
Example 1030
Structure

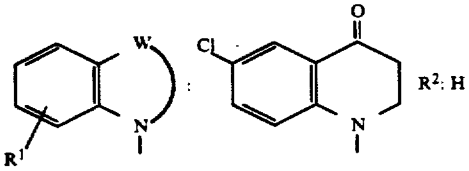

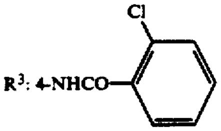

Crystalline form: White powder
Recrystallization solvent: Ethanol
Melting Point: 205-208° C.
Form: Free
Example 1031
Structure

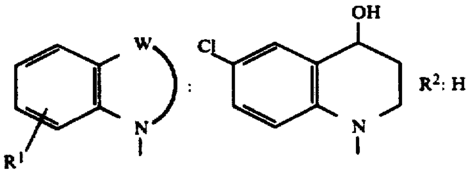

TABLE 8-continued

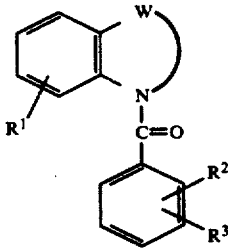

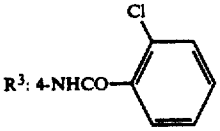

Crystalline form: White powder
Recrystallization solvent: Ethanol
Melting Point: 214-216° C.
Form: Free
Example 1032
Structure

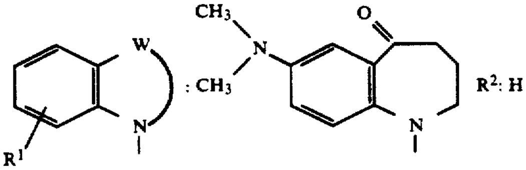

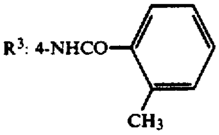

Crystalline form: Yellow needles
Recrystallization solvent: Ethanol
Melting Point: 223-226° C.
Form: Free
Example 1033
Structure

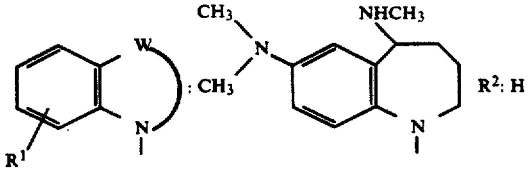

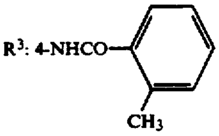

Crystalline form: Colorless needles
Recrystallization solvent: Ethanol/diethyl ether
Melting Point: 203-206° C.
Form: Free
Example 1034
Structure TABLE 8-continued

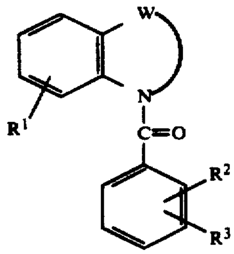

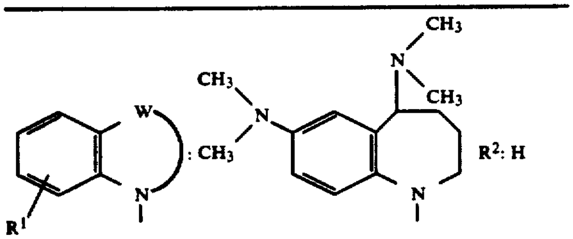

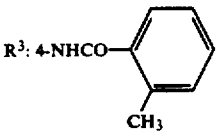

Crystalline form: Colorless needles
Recrystallization solvent: Ethanol/diethyl ether/n-hexane
Melting Point: 168–171° C.
Form: Free
Example 1035
Structure

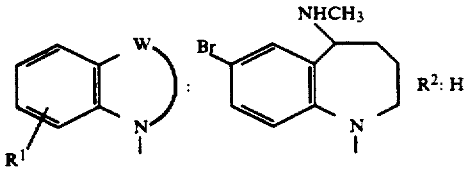

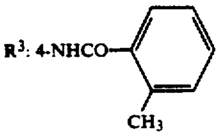

Crystalline form: White powder
Recrystallization solvent: Methanol/diethyl ether
Melting Point: 206–208° C.
Form: Free
Example 1036
Structure

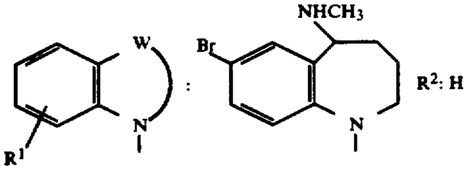

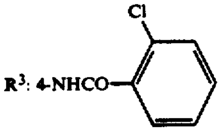

Crystalline form: White powder
Recrystallization solvent: Methanol/diethyl ether TABLE 8-continued

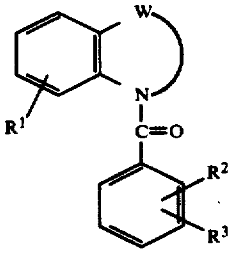

Melting Point: 229–232° C.
Form: Free
Example 1037
Structure

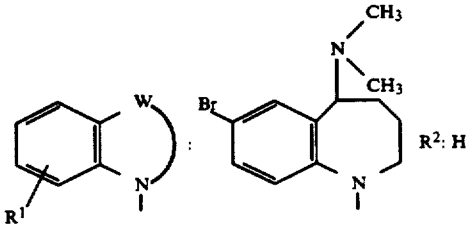

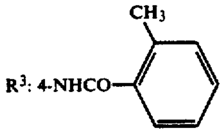

Crystalline form: White powder
Recrystallization solvent: Methanol/diethyl ether
Melting Point: 220–222° C.
Form: Free
Example 1038
Structure

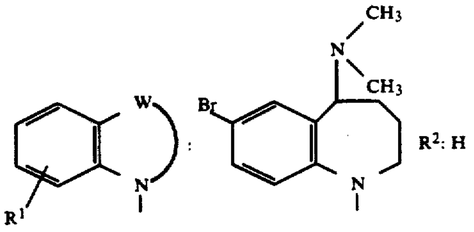

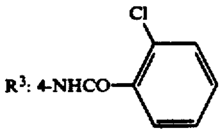

Crystalline form: White powder
Recrystallization solvent: Methanol/diethyl ether
Melting Point: 232–233.5° C.
Form: Free
Example 1039
Structure

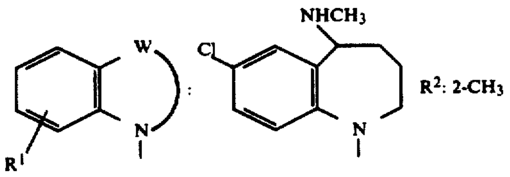

TABLE 8-continued

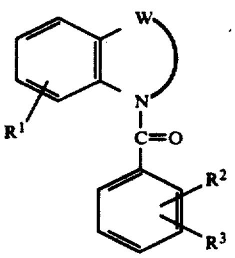

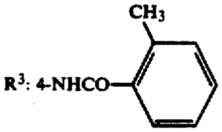

Crystalline form: Colorless amorphous
NMR analysis: 215)
Form: Free
Example 1040
Structure

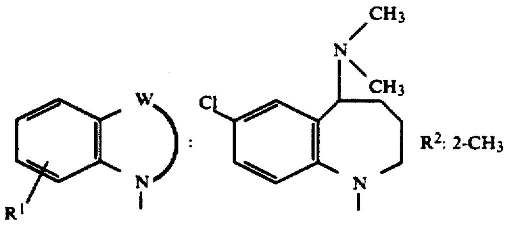

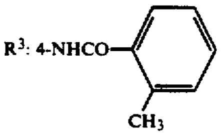

Crystalline form: Colorless amorphous
NMR analysis: 216)
Form: Free
Example 1041
Structure

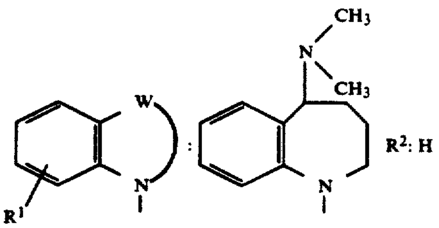

Crystalline form: White powder
Recrystallization solvent: Methanol/diethyl ether
Melting Point: 147-151° C.
Form: Free
Example 1042
Structure TABLE 8-continued

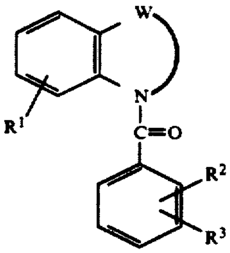

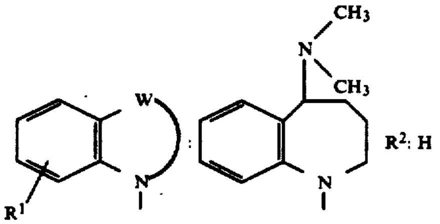

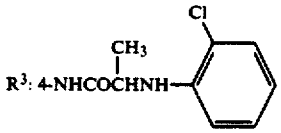

Crystalline form: White powder
Recrystallization solvent: Methanol/n-hexane
Melting Point: 127-129° C.
Form: Free
Example 1043
Structure

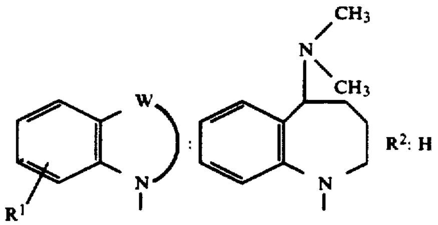

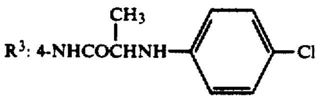

Crystalline form: White powder
Recrystallization solvent: Methanol/n-hexane
Melting Point: 109-112° C.
Form: Free
Example 1044
Structure

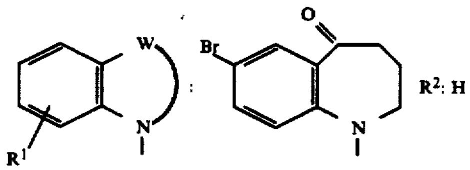

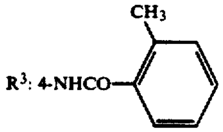

Crystalline form: White powder
Recrystallization solvent: Methanol/diethyl ether TABLE 8-continued

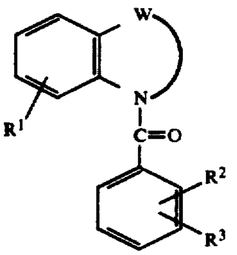

Melting Point: 198-200° C.
Form: Free
Example 1045
Structure

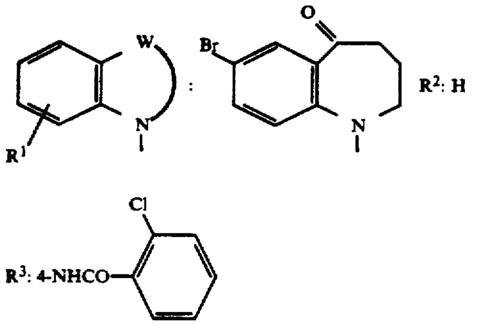

Crystalline form: White powder
Recrystallization solvent: Methanol/diethyl ether
Melting Point: 210-211° C.
Form: Free
Example 1046
Structure

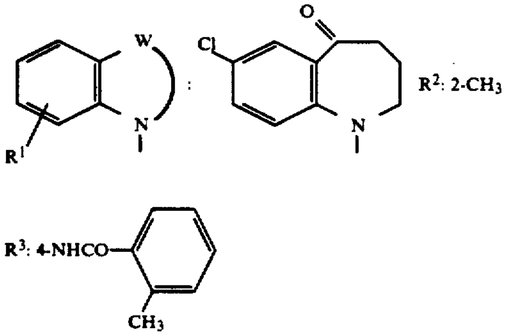

Crystalline form: Colorless amorphous
NMR analysis: 217)
Form: Free
Example 1047
Structure

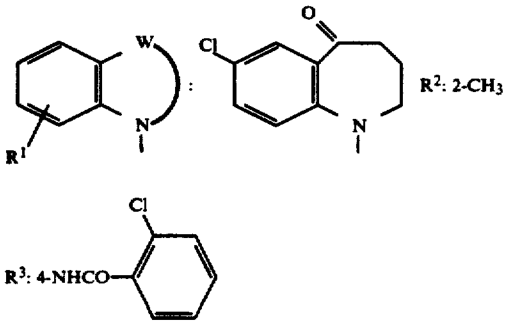

Crystalline form: Colorless amorphous

TABLE 8-continued

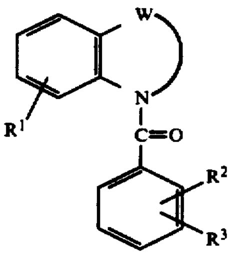

NMR analysis: 218)
Form: Free
Example 1048
Structure

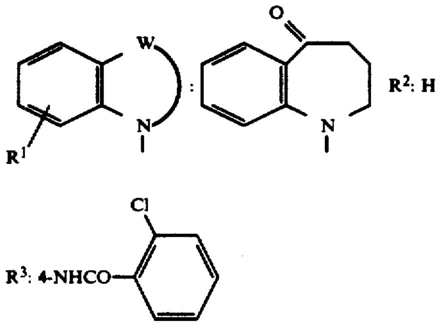

Crystalline form: Colorless amorphous
NMR analysis: 219)
Form: Free
Example 1049
Structure

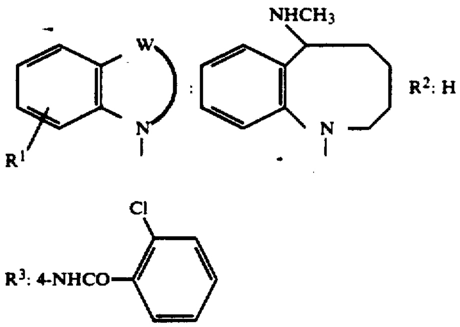

Crystalline form: Colorless needles
Recrystallization solvent: Ethanol
Melting Point: 243-243.5° C.
Form: Free
Example 1050
Structure

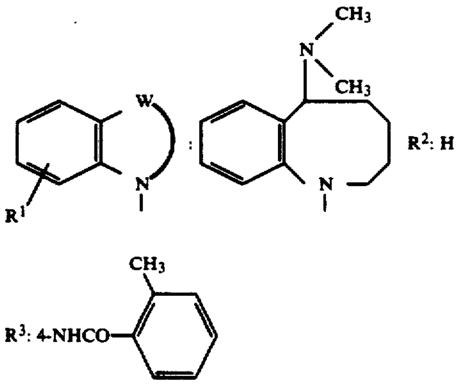

TABLE 8-continued

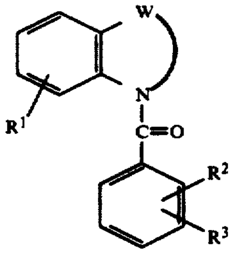

Crystalline form: Colorless prisms
Recrystallization solvent: Ethanol/petroleum ether
Melting Point: 207-209° C.
Form: Free
Example 1051
Structure

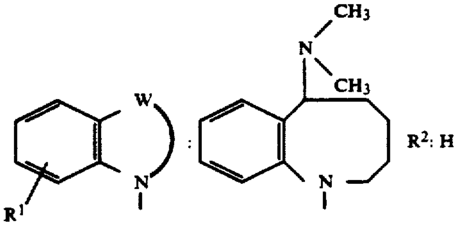

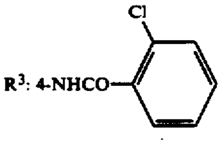

Crystalline form: Colorless needles
Recrystallization solvent: Ethanol/petroleum ether
Melting Point: 239-241° C.
Form: Free
Example 1052
Structure

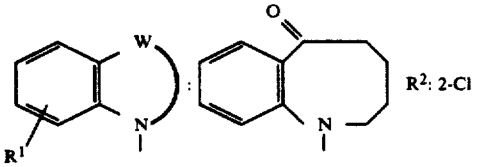

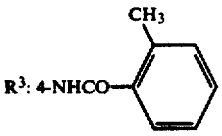

Crystalline form: Colorless amorphous
NMR analysis: 220)
Form: Free
Example 1053
Structure

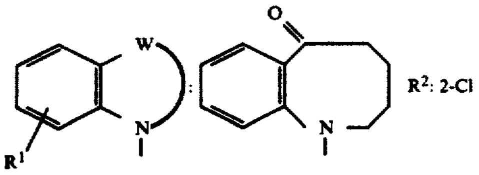

TABLE 8-continued

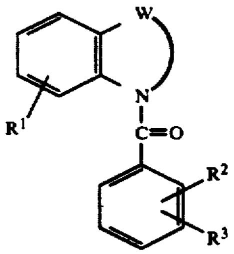

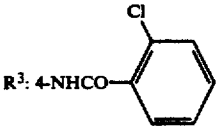

Crystalline form: Colorless amorphous
NMR analysis: 221)
Form: Free
Example 1054
Structure

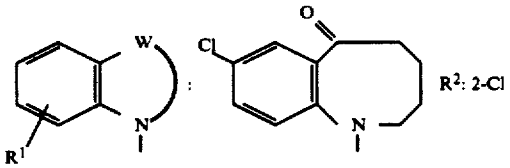

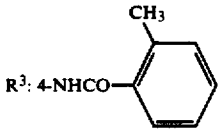

Crystalline form: Light yellow amorphous
NMR analysis: 222)
Form: Free
Example 1055
Structure

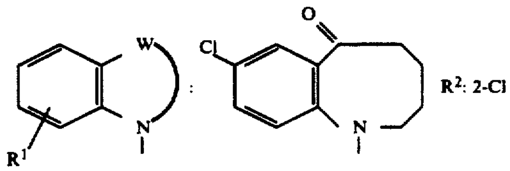

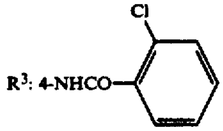

Crystalline form: Light yellow amorphous
NMR analysis: 223)
Form: Free
Example 1056
Structure

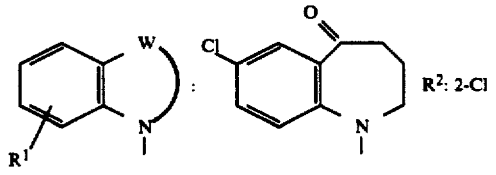

TABLE 8-continued

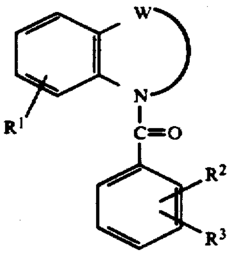

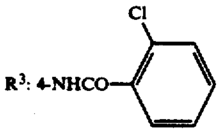

Crystalline form: White powder
Recrystallization solvent: Diethyl ether/dichloromethane
Melting Point: 169.5-173° C.
Form: Free
Example 1057
Structure

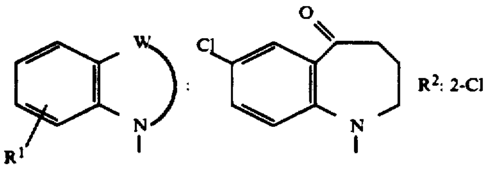

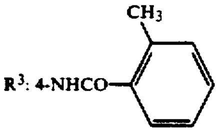

Crystalline form: Colorless amorphous
NMR analysis: 224)
Form: Free
Example 1058
Structure

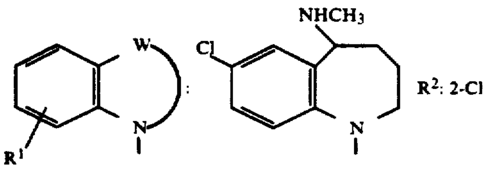

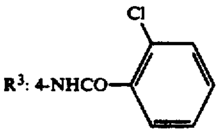

Crystalline form: Colorless amorphous
NMR analysis: 225)
Example 1059
Structure

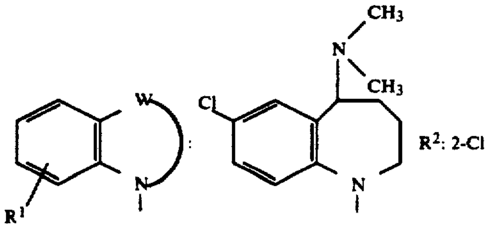

TABLE 8-continued

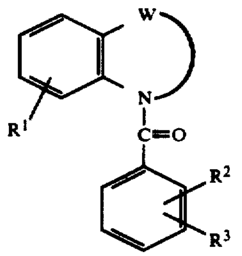

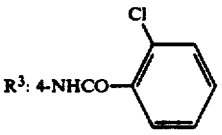

Crystalline form: Colorless amorphous
NMR analysis: 226)
Form: Free
Example 1060
Structure

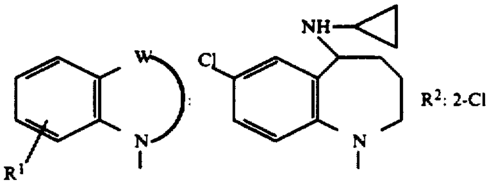

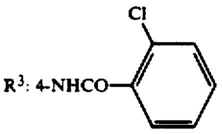

Crystalline form: Colorless amorphous
NMR analysis: 227)
Form: Free
Example 1061
Structure

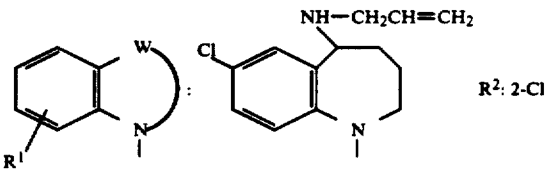

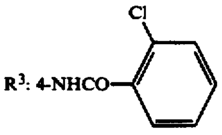

Crystalline form: Colorless amorphous
NMR analysis: 228)
Form: Free
Example 1062
Structure TABLE 8-continued

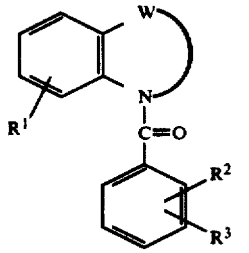

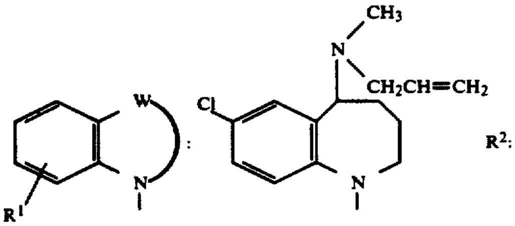

R²: 2-Cl

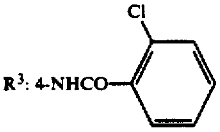

Crystalline form: Colorless amorphous
NMR analysis: 229)
Form: Free
Example 1063
Structure

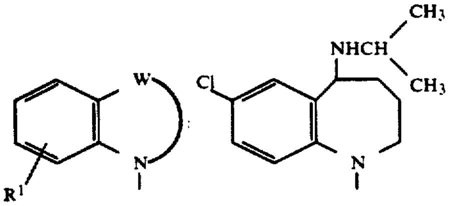

R²: 2-Cl

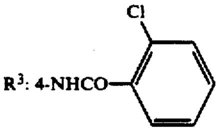

Crystalline form: Colorless amorphous
NMR analysis: 230)
Form: Free
Example 1064
Structure

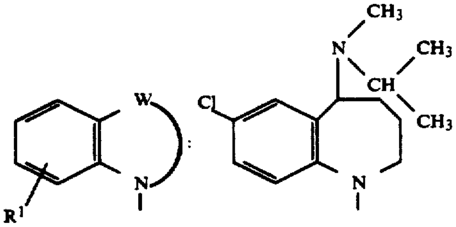

R²: 2-Cl

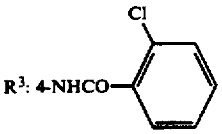

Crystalline form: Colorless amorphous

TABLE 8-continued

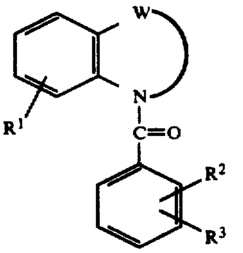

NMR analysis: 231)
Form: Free
Example 1065
Structure

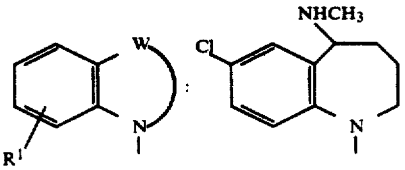

R²: 2-Cl

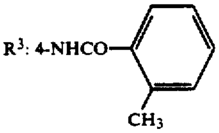

Crystalline form: Colorless amorphous
NMR analysis: 232)
Form: Free
Example 1066
Structure

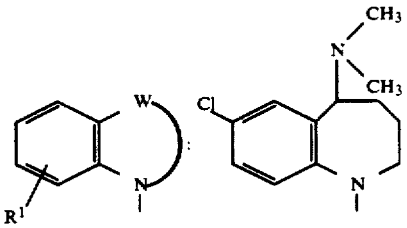

R²: 2-Cl

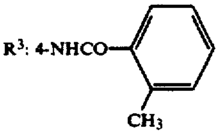

Crystalline form: Colorless amorphous
NMR analysis: 233)
Form: Free
Example 1067
Structure

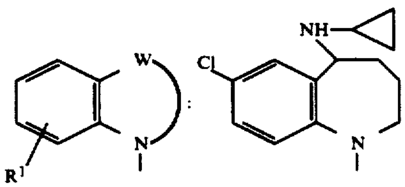

R²: 2-Cl

TABLE 8-continued

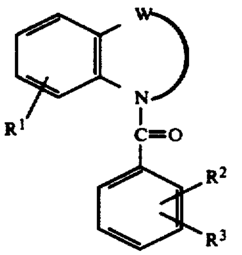

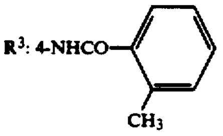

Crystalline form: Colorless amorphous
NMR analysis: 234)
Form: Free
Example 1068
Structure

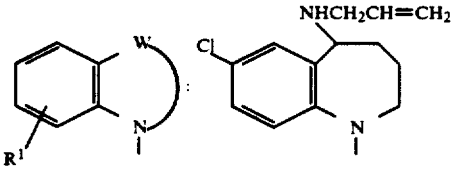

$R^2$: 2-Cl

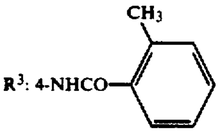

Crystalline form: Colorless amorphous
NMR analysis: 235)
Form: Free
Example 1069
Structure

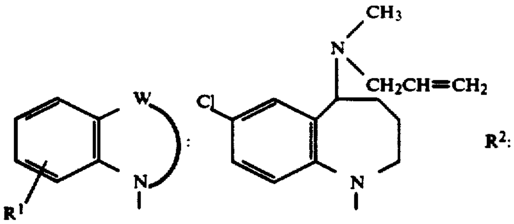

$R^2$: 2-Cl

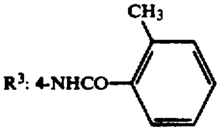

Crystalline form: Colorless amorphous
NMR analysis: 236)
Form: Free
Example 1070
Structure TABLE 8-continued

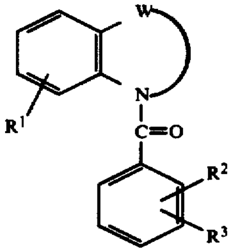

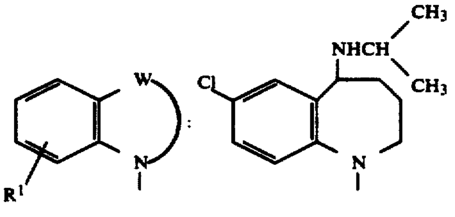

$R^2$: 2-Cl

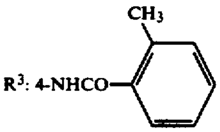

Crystalline form: Colorless amorphous
NMR analysis: 237)
Form: Free

196) $^1$H-NMR(CDCl$_3$)δ; 2.14(2H, brs), 2.33(3H, s), 2.46(3H, s), 2.85(2H, t, J=6.1Hz), 4.83(2H, brs), 6.64(1H, d, J=8.1Hz), 7.07(1H, d, J=8.0Hz), 7.21-7.48(8H, m), 7.65(1H, m), 7.74(1H, brs)
197) $^1$H-NMR(CDCl$_3$)δ; 2.12(2H, brs), 2.33(3H, s), 2.85(2H, t, J=6.2Hz), 2.88-5.28(2H, m), 6.63 (1H, d, J=8.1Hz), 7.06(1H, dd, J=1.7Hz, 8.1Hz), 7.19-7.69(9H, m), 8.26(1H, brs)
198) $^1$H-NMR(CDCl$_3$)δ; 0.49(4H, m), 1.25-5.13(9H, m), 2.33(3H, s), 2.45(3H, s), 6.53(1H, m), 6.79(1H, m), 7.07-7.42(9H, m), 7.73(1H, m)
199) $^1$H-NMR(CDCl$_3$)δ; 2.04(2H, brs), 2.29(3H, s), 2.82(2H, t, J=5.9Hz), 2.85-5.29(2H, m), 6.82-7.69(10H, m), 8.31(1H, brs)
200) $^1$H-NMR(CDCl$_3$)δ; 2.05(2H, brs), 2.29(3H, s), 2.44(3H, s), 2.79(2H, t, J=5.5Hz), 2.82-5.28 (2H, m), 6.82-8.12(11H, m)
201) $^1$H-NMR(CDCl$_3$)δ; 1.40-4.85(11H, m), 2.51(3H, s), 6.78-7.63(10H, m), 8.64(1H, brs)
202) $^1$H-NMR(CDCl$_3$)δ; 1.40-4.85(11H, m), 2.45(3H, s), 2.50(3H, s), 6.78-7.55(10H, m), 8.10(1H, brs)
203) $^1$H-NMR(CDCl$_3$)δ; 0.49(4H, m), 1.25-4.85(9H, 2.28(3H, s), 6.77-7.62(10H, m), 8.64(1H, brs)
204) $^1$H-NMR(CDCl$_3$)δ; 0.48(4H, m), 1.26-4.85(9H, 2.29(3H, s), 2.44(3H, s), 6.78-7.58(10H, m), 8.18(1H, brs)
205) $^1$H-NMR(CDCl$_3$)δ; 1.14(6H, d, J=6.3Hz), 1.52-2.20(7H, m), 2.20-2.60(1H, m), 2.64-3.66(10H, m), 4.00-4.50(4H, m), 4.50-5.23(2H, m), 6.57-7.90 (11H, m), 8.10-8.30(1H, m), 9.97(1H, s)
206) $^1$H-NMR(CDCl$_3$)δ; 1.24-2.08(4H, m), 2.08-2.26 (3H, m), 2.26-3.16(4H, m), 3.47-4.03(4H, m), 4.18-4.92(1H, m), 6.40-7.94(10H, m), 8.45-9.03 (1H, m)
207) $^1$H-NMR(CDCl$_3$)δ; 1.26-2.10(4H, m), 2.10-2.28 (3H, m), 2.28-3.20(1H, m), 3.43-4.06(4H, m), 4.20-4.93(1H, m), 6.40-8.00(10H, m), 8.78-9.30 (1H, m)
208) $^1$H-NMR(CDCl$_3$)δ; 1.10-1.98(4H, m), 1.98-3.10 (7H, m), 3.30-3.90(4H, m), 3.90-5.10(1H, m), 6.45-8.25(12H, m)
209) $^1$H-NMR(CDCl$_3$)δ; 1.06-1.94(4H, m), 1.94-3.19 (10H, m), 3.19-3.90(4H, m), 3.90-5.10(1H, m), 6.44-8.60(11H, m)
210) $^1$H-NMR(CDCl$_3$)δ; 1.06-1.97(4H, m), 1.97-3.20 (7H, m), 3.20-3.92(4H, m), 3.92-5.10(1H, m), 6.44-8.55(11H, m)
211) $^1$H-NMR(CDCl$_3$)δ; 1.07-1.98(4H, m), 1.98-3.10

TABLE 8-continued

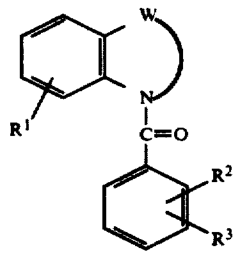

| | |
|---|---|
| | (10H, m), 3.37-5.20(8H, m), 6.44-6.86(3H, m), 6.97-7.60(6H, m), 8.13(1H, s), 8.19-8.38(1H, m) |
| 212) | $^{1}$H-NMR(CDCl$_3$)δ; 1.08-1.99(4H, m), 1.99-3.13 (7H, m), 3.33-5.14(8H, m), 6.40-6.90(3H, m), 6.95-7.56(5H, m), 7.63-7.87(1H, m), 8.17-8.37 (1H, m), 8.60(1H, s) |
| 213) | $^{1}$H-NMR(CDCl$_3$)δ; 0.30-0.64(4H, m), 0.70-3.42 (9H, m), 3.42-5.10(5H, m), 6.40-8.70(11H, m) |
| 214) | $^{1}$H-NMR(CDCl$_3$)δ; 0.30-0.76(4H, m), 0.80-3.43 (6H, m), 3.50-5.00(5H, m), 6.40-9.04(11H, m) |
| 215) | $^{1}$H-NMR(CDCl$_3$)δ; 1.25-3.25(14H, m), 3.55-5.06 (2H, m), 6.43-7.00(2H, m), 7.00-7.71(8H, m), 7.91-8.45(1H, m) |
| 216) | $^{1}$H-NMR(CDCl$_3$)δ; 1.11-3.20(17H, m), 3.28-5.12 (2H, m), 6.41-7.01(2H, m), 7.02-7.63(8H, m), 7.76-8.21(1H, m) |
| 217) | $^{1}$H-NMR(CDCl$_3$)δ; 1.92-2.29(2H, m), 2.36(3H, s), 2.45(3H, s), 2.84(2H, t, J=6.3Hz), 3.32-4.64 (2H, m), 6.40-8.10(11H, m) |
| 218) | $^{1}$H-NMR(CDCl$_3$)δ; 1.92-2.25(2H, m), 2.34(3H, s), 2.83(2H, t, J=6.3Hz), 3.21-4.52(2H, m), 6.39-7.97(10H, m), 8.43(1H, brs) |
| 219) | $^{1}$H-NMR(CDCl$_3$)δ; 1.7-2.15(4H, m), 2.5-5.2(4H, m), 6.75-6.9(1H, m), 7.27-7.6(9H, m), 7.65-7.85 (1H, m), 7.9-8.15(2H, m) |
| 220) | $^{1}$H-NMR(CDCl$_3$)δ; 1.65-2.1(4H, m), 2.44(3H, s), 2.8-4.5(4H, m), 6.75-8.0(12H, m) |
| 221) | $^{1}$H-NMR(CDCl$_3$)δ; 1.65-2.3(4H, m), 2.7-4.8(4H, m), 6.75-8.4(12H, m) |
| 222) | $^{1}$H-NMR(CDCl$_3$)δ; 1.45-2.15(4H, m), 2.45-2.55 (3H, m), 2.85-4.6(4H, m), 6.8-8.25(11H, m) |
| 223) | $^{1}$H-NMR(CDCl$_3$)δ; 1.5-2.2(4H, m), 2.8-4.7(4H, m), 6.8-8.4(11H, m) |
| 224) | $^{1}$H-NMR(CDCl$_3$)δ; 1.75-2.25(2H, m), 2.30-2.70 (3H, m), 2.70-2.95(2H, m), 3.20-5.10(2H, m), 6.70-8.40(11H, m) |
| 225) | $^{1}$H-NMR(CDCl$_3$)δ; 1.20-2.60(8H, m), 2.60-5.10 (3H, m), 6.80-7.90(10H, m), 8.20-8.60(1H, m) |
| 226) | $^{1}$H-NMR(CDCl$_3$)δ; 1.20-2.60(10H, m), 2.60-5.10 (3H, m), 6.80-8.15(11H, m) |
| 227) | $^{1}$H-NMR(CDCl$_3$)δ; 0.30-0.70(4H, m), 1.20-2.45 (6H, m), 2.60-5.10(3H, m), 6.80-7.95(10H, m), 8.15-8.50(1H, m) |
| 228) | $^{1}$H-NMR(CDCl$_3$)δ; 1.20-2.40(5H, m), 2.60-5.35 (7H, m), 5.80-6.15(1H, m), 6.75-7.95(10H, m), 8.20-8.70(1H, m) |
| 229) | $^{1}$H-NMR(CDCl$_3$)δ; 1.20-2.55(7H, m), 2.60-5.35 (7H, m), 5.85-6.05(1H, m), 6.70-7.10(2H, m), 7.10-7.90(8H, m), 8.15-8.60(1H, m) |
| 230) | $^{1}$H-NMR(CDCl$_3$)δ; 1.00-1.20(6H, m), 1.00-2.40 (5H, m), 2.60-5.10(4H, m), 6.80-8.00(10H, m), 8.15-8.65(1H, m) |
| 231) | $^{1}$H-NMR(CDCl$_3$)δ; 0.80-2.50(13H, m), 2.60-5.10 (4H, m), 6.70-8.85(10H, m), 8.25-8.60(1H, m) |
| 232) | $^{1}$H-NMR(CDCl$_3$)δ; 1.30-2.60(11H, m), 2.60-5.10 (3H, m), 6.80-8.15(11H, m) |
| 233) | $^{1}$H-NMR(CDCl$_3$)δ; 1.10-2.50(13H, m), 2.50-5.10 (3H, m), 6.75-8.40(11H, m) |
| 234) | $^{1}$H-NMR(CDCl$_3$)δ; 0.30-0.65(4H, m), 1.20-2.30 (6H, m), 2.35-2.55(3H, m), 2.60-5.10(3H, m), 6.75-8.35(11H, m) |
| 235) | $^{1}$H-NMR(CDCl$_3$)δ; 1.20-2.60(8H, m), 2.60-5.40 (7H, m), 5.80-6.15(1H, m), 6.80-8.20(11H, m) |
| 236) | $^{1}$H-NMR(CDCl$_3$)δ; 1.25-2.60(10H, m), 2.60-5.40 (7H, m), 5.75-6.10(1H, m), 6.75-7.10(2H, m), 7.10-8.40(9H, m) |
| 237) | $^{1}$H-NMR(CDCl$_3$)δ; 0.95-1.20(6H, m), 0.95-2.25 (5H, m), 2.40-2.60(3H, m), 2.60-5.10(4H, m), |

TABLE 8-continued

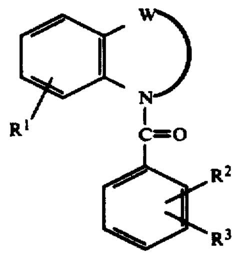

| |
|---|
| 6.75-7.05(2H, m), 7.10-8.30(9H, m) |

REFERENCE EXAMPLE 22

Using the suitable starting materials the following compounds are obtained in the same manner as in Reference Example 1.

8-Chloro-6-oxo-1-(4-nitrobenzoyl)-1,2,3,4,5,6-hexahydrobenzazocine, yellow prisms $^{1}$H-NMR (DMSO-d$_6$)δ; 1.3-2.2 (4H, m), 2.6-5.0 (4H, m), 7.05-8.5 (7H, m).

5-Oxo-7-methyl-1-(2-chloro-4-nitrobenzoyl)-2,3,4,5-tetrahydro-1H-benzazepine, light yellow amorphous $^{1}$H-NMR (CDCl$_3$)δ; 1.71-2.32 (2H, m), 2.29 (3H, s), 2.86 (2H, t, J=6.3 Hz), 3.10-5.30 (2H, m), 6.84-8.38 (6H, m).

5-Oxo-7-methyl-1-(3-methoxy-4-nitrobenzoyl)-2,3,4,5-tetrahydro-1H-benzazepine, light yellow amorphous $^{1}$H-NMR (CDCl$_3$)δ; 2.17 (2H, brs), 2.34 (3H, s), 2.84 (2H, t, J=6.0 Hz), 3.10-5.29 (2H, m), 3.77 (3H, s), 6.67 (1H, d, J=7.9 Hz), 6.85 (2H, m), 7.10 (1H, d, J=8.0 Hz), 7.57-7.65 (2H, m).

5-Oxo-7-dimethylamino-1-(2-chloro-4-nitrobenzoyl)-2,3,4,5-tetrahydro-1H-benzazepine, yellow powder $^{1}$H-NMR (CDCl$_3$)δ; 1.66-2.38 (2H, m), 2.65-2.88 (2H, m), 2.92 (6H, s), 3.08-3.64, 4.58-5.01 (total 2H, m), 6.49 (1H, dd, J=3.1, 8.7 Hz), 6.82 (1H, d, J=8.7 Hz), 6.90 (1H, d, J=3.1 Hz), 7.02-7.37 (1H, m), 7.94 (1H, dd, J=1.9, 8.4 Hz), 8.08 (1H, d, J=1.9 Hz).

REFERENCE EXAMPLE 23

Using the suitable starting materials, the following compounds are obtained in the same manner as in Reference Example 2.

8-Chloro-6-oxo-1-(4-aminobenzoyl)-1,2,3,4,5,6-hexahydrobenzazocine, light yellow amorphous $^{1}$H-NMR (CDCl$_3$)δ; 1.7-2.2 (4H, m), 2.3-4.8 (6H, m), 6.4-6.6 (2H, m), 6.74 (1H, d, J=8.5 Hz), 7.1-7.4 (3H, 7.99 (1H, d, J=2.6 Hz).

8-Methyl-6-oxo-(2-chloro-4-aminobenzoyl)-1,2,3,4,5,6-hexahydrobenzazocine, colorless amorphous $^{1}$H-NMR (CDCl$_3$)δ; 1.4-2.1 (4H, m), 2.15-2.6 (3H, m), 2.7-4.4 (6H, m), 6.15-6.35 (1H, m), 6.51 (1H, s), 6.6-6.85 (1H, m), 6.9-7.25 (2H, m), 7.72 (1H, s).

8-Methoxy-6-oxo-(2-chloro-4-aminobenzoyl)-1,2,3,4,5,6-hexahydrobenzazocine, light yellow amorphous $^{1}$H-NMR (CDCl$_3$)δ; 1.4-2.2 (4H, m), 2.7-5.0 (9H, m), 6.25 (1H, dd, J=8.3 Hz, 2.2 Hz), 6.51 (1H, d, J=2.2 Hz), 6.66 (1H, d, J=8.3 Hz), 6.88 (1H, dd, J=8.6 Hz, 3.0 Hz), 7.23 (1H, d, J=8.6 Hz), 7.43 (1H, d, J=3.0 Hz).

5-Oxo-7-chloro-1-(2-methoxy-4-aminobenzoyl)-2,3,4,5-tetrahydro-1H-benzazepine, colorless particles (recrystallized from methanol/diethyl ether), m.p. 206°-208° C.

5-Oxo-7-methyl-1-(2-chloro-4-aminobenzoyl)-2,3,4,5-tetrahydro-1H-benzazepine, light yellow amorphous $^1$H-NMR ($CDCl_3$)δ; 2.09 (2H, brs), 2.29 (3H, s), 3.10–5.00 (2H, m), 3.78 (2H, brs), 6.34–7.54 (6H, m).

5-Oxo-7-methyl-1-(3-methoxy-4-aminobenzoyl)-2,3,4,5-tetrahydro-1H-benzazepine, light yellow amorphous $^1$H-NMR ($CDCl_3$)δ; 2.12 (2H, brs), 2.32 (3H, s), 2.85 (2H, t, J=5.9 Hz), 3.30–5.00 (2H, m), 3.65 (3H, s), 3.98 (2H, brs), 6.40 (1H, d, J=8.1 Hz), 6.64–6.76 (3H, m), 7.06 (1H, dd, J=1.6, 8.1 Hz), 7.63 (1H, d, J=2.0 Hz).

5-Oxo-7-dimethylamino-1-(2-chloro-4-aminobenzoyl)-2,3,4,5-tetrahydro-1H-benzazepine, yellow amorphous $^1$H-NMR ($CDCl_3$)δ; 1.60–2.32 (2H, m), 2.67–5.13 (4H, m), 2.92 (6H, s), 3.75:(2H, s), 6.31 (1H, dd, J=2.1, 8.3 Hz), 6.46 (1H, d, J=2.1 Hz), 6.48 (1H, dd, J=3.1, 8.7 Hz), 6.66–6.89 (2H, m), 6.95 (1H, d, J=3.1 Hz).

Using the stuitable starting materials, the compounds of the following Table 9 are obtained in the same manner as in above Examples 1 and 382.

TABLE 9

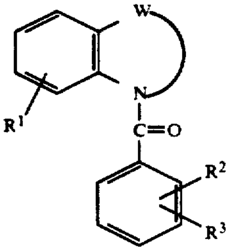

Example 1071
Structure

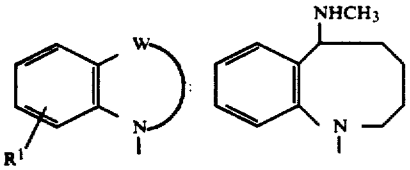

$R^2$: 2-Cl

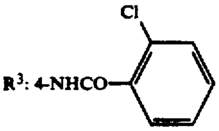

Crystalline form: Colorless prisms
Recrystsllization solvent: Ethanol
Melting Point: 227-230° C.
Form: Free
Example 1072
Structure

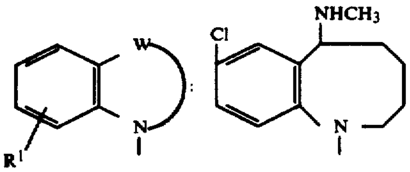

$R^2$: 2-Cl

-continued

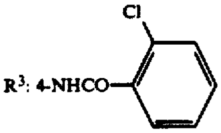

Crystalline form: Colorless needles
Recrystallization solvent: Ethanol/petroleum ether
Melting Point: 216-218° C.
Form: Free
Example 1073
Structure

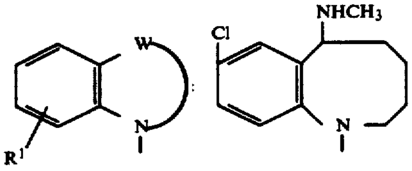

$R^2$: 2-Cl

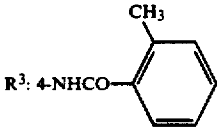

Crystalline form: Colorless prisms
Recrystallization solvent: Ethyl acetate/n-hexane
Melting Point: 227-228° C.
Form: Free
Example 1074
Structure

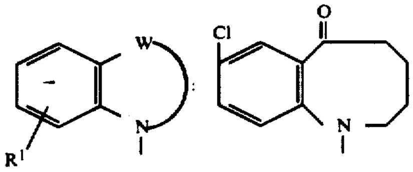

$R^2$: H

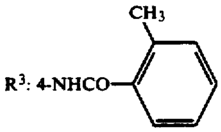

Crystalline form: White powder
NMR analysis: 238)
Form: Free
Example 1075
Structure

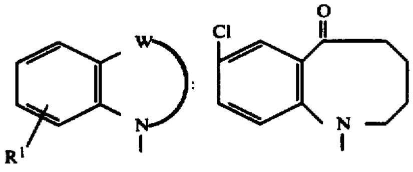

$R^2$: H

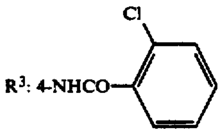

Crystalline form: White powder
NMR analysis: 239)
Form: Free
Example 1076
Structure -continued

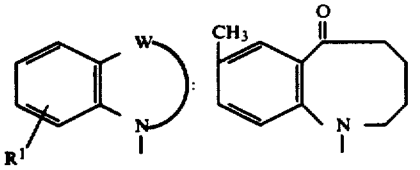

$R^2$: 2-Cl $R^3$: 4-NHCO—
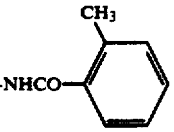

Crystalline form: Light yellow amorphous
NMR analysis: 240)
Form: Free
Example 1077
Structure

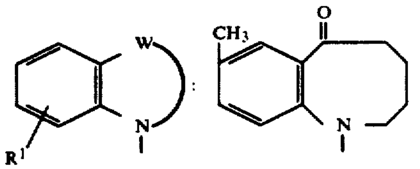

$R^2$: 2-Cl $R^3$: 4-NHCO—
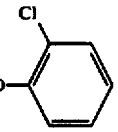

Crystalline form: Light yellow amorphous
NMR analysis: 241)
Form: Free
Example 1078
Structure

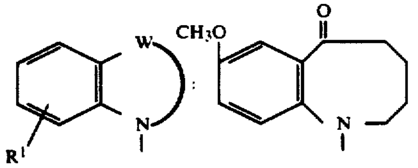

$R^2$: 2-Cl $R^3$: 4-NHCO—
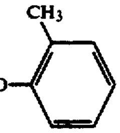

Crystalline form: Colorless amorphous
NMR analysis: 242)
Form: Free
Example 1079
Structure

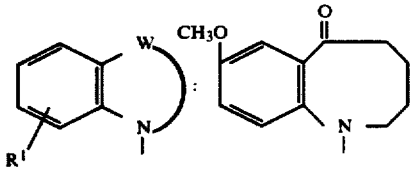

$R^2$: 2-Cl

-continued $R^3$: 4-NHCO—
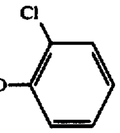

Crystalline form: Colorless amorphous
NMR analysis: 243)
Form: Free
Example 1080
Structure

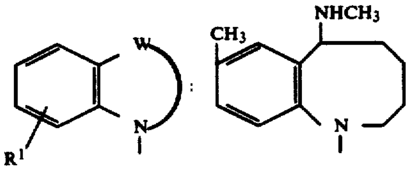

$R^2$: 2-Cl $R^3$: 4-NHCO—
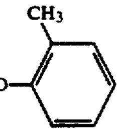

Crystalline form: Light yellow powder
Recrystallization solvent: Ethyl acetate/diethyl ether
Melting Point: 179–181° C.
Form: Free
Example 1081
Structure

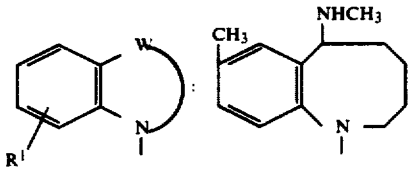

$R^2$: 2-Cl $R^3$: 4-NHCO—
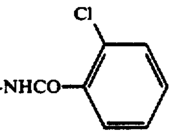

Crystalline form: White powder
Recrystallization solvent: Ethyl acetate/diethyl ether
Melting Point: 213–216° C.
Form: Free
Example 1082
Structure

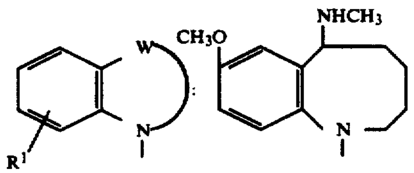

$R^2$: 2-Cl $R^3$: 4-NHCO—
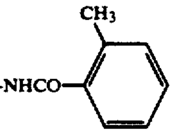

Crystalline form: Light yellow powder
Recrystallization solvent: Ethyl acetate/diethyl ether
Melting Point: 185–187° C.
Form: Free
Example 1083

-continued

Structure

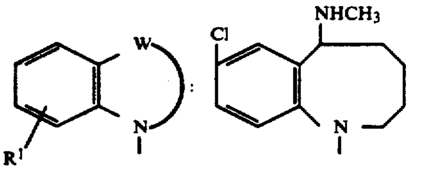

$R^2$: H $R^3$: 4-NHCO—

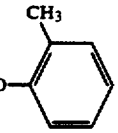

Crystalline form: Colorless prisms
Recrystallization solvent: Ethanol
Melting Point: 249–251° C.
Form: Free
Example 1084
Structure

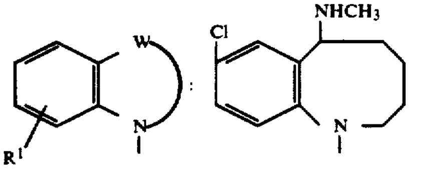

$R^2$: H $R^3$: 4-NHCO—

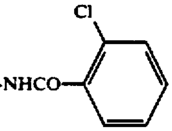

Crystalline form: Colorless needles
Recrystallization solvent: Ethanol
Melting Point: 239–241° C.
Form: Free
Example 1085
Structure

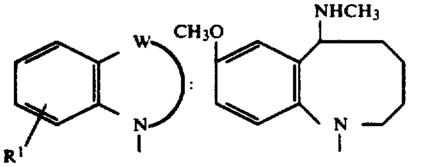

$R^2$: 2-Cl $R^3$: 4-NHCO—

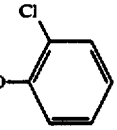

Crystalline form: White powder
Recrystallization solvent: Ethyl acetate/diethyl ether
Melting Point: 208–210° C.
Form: Free
Example 1086
Structure

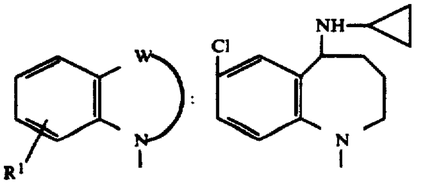

$R^2$: 2-$CH_3$

-continued $R^3$: 4-NHCO—

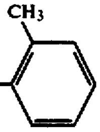

Crystalline form: White powder
Recrystallization solvent: Methanol/n-hexane
Melting Point: 178–180.5° C.
Form: Free
Example 1087
Structure

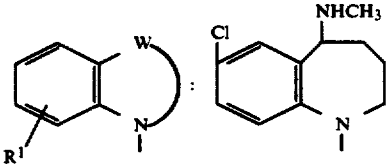

$R^2$: 2-$CH_3$ $R^3$: 4-NHCO—

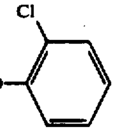

Crystalline form: Colorless amorphous
NMR analysis: 244)
Form: Free
Example 1088
Structure

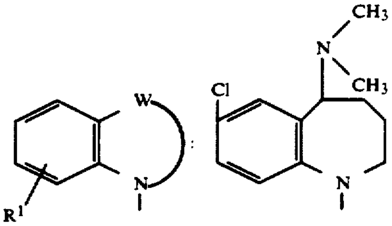

$R^2$: 2-$CH_3$ $R^3$: 4-NHCO—

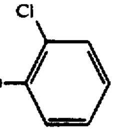

Crystalline form: Colorless amorphous
NMR analysis: 245)
Form: Free
Example 1089
Structure

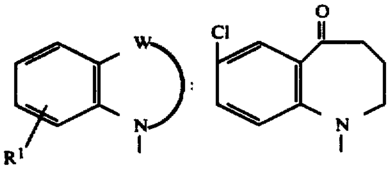

$R^2$: 2-$OCH_3$ $R^3$: 4-NHCOO—$CH_2$—

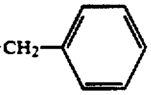

Crystalline form: White powder
Recrystallization solvent: Methanol/diethyl ether
NMR analysis: 246)
Form: Free -continued Example 1090
Structure

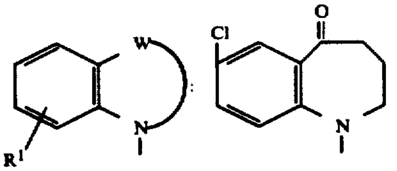

$R^2$: 2-$OCH_3$

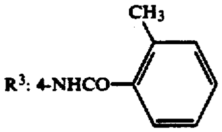

Crystalline form: Colorless amorphous
NMR analysis: 247)
Form: Free
Example 1091
Structure

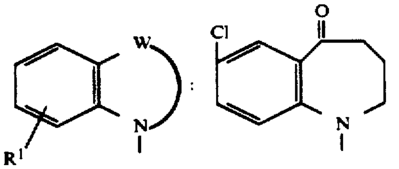

$R^2$: 2-$OCH_3$

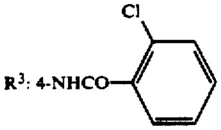

Crystalline form: Colorless amorphous
NMR analysis: 248)
Form: Free
Example 1092
Steucture

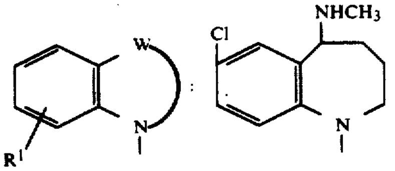

$R^2$: 2-$OCH_3$

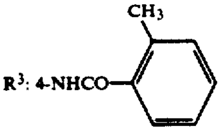

Crystalline form: Colorless amorphous
NMR analysis: 249)
Form: Free
Example 1093
Structure

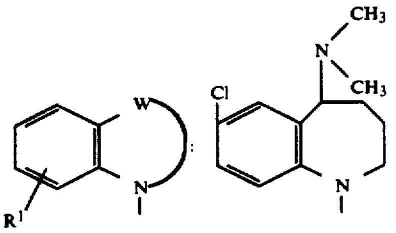

$R^2$: 2-$OCH_3$

-continued

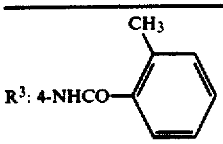

Crystalline form: White powder
Recrystallization solvent: Methanol/diethyl ether
Melting Point: 205-206° C.
Form: Free
Example 1094
Structure

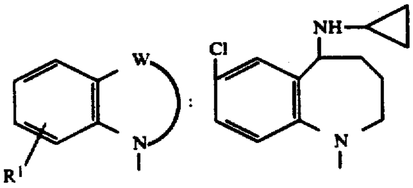

$R^2$: 2-$OCH_3$

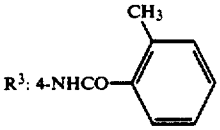

Crystalline form: Colorless amorphous
NMR analysis: 250)
Form: Free
Example 1095
Structure

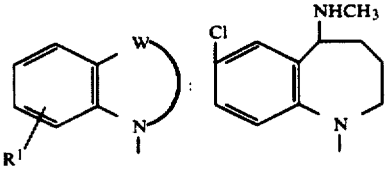

$R^2$: 2-$OCH_3$

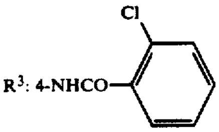

Crystalline form: White powder
Recrystallization solvent: Methanol/n-hexane
Melting Point: 172.5-174° C.
Form: Free
Example 1096
Structure

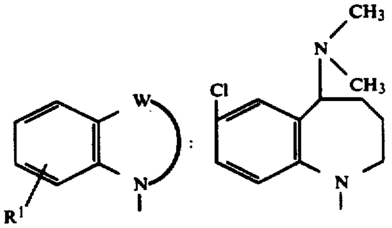

$R^2$: 2-$OCH_3$

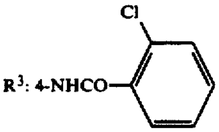

Crystalline form: White powder

-continued

Recrystallization solvent: Methanol/diethyl ether
Melting Point: 215-216.5° C.
Form: Free
Example 1097
Structure

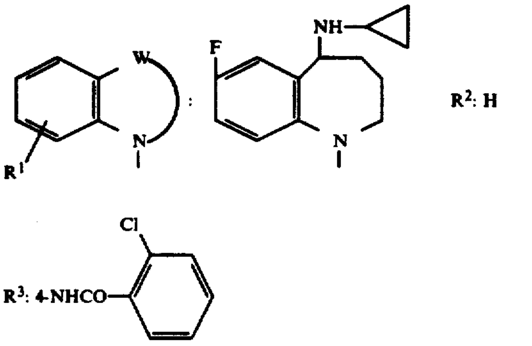

Crystalline form: White powder
Recrystallization solvent: Methanol/diethyl ether
Melting Point: 133-136° C.
Form: Free
Example 1098
Structure

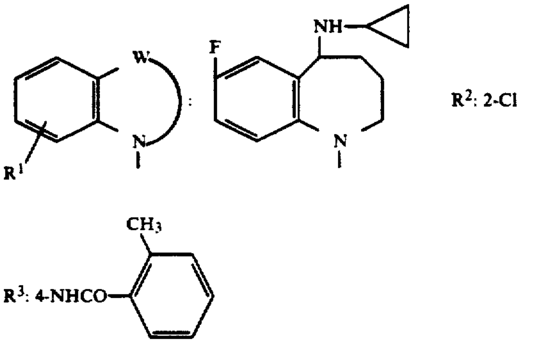

Crystalline form: Colorless amorphous
NMR analysis: 251)
Form: Free
Example 1099
Structure

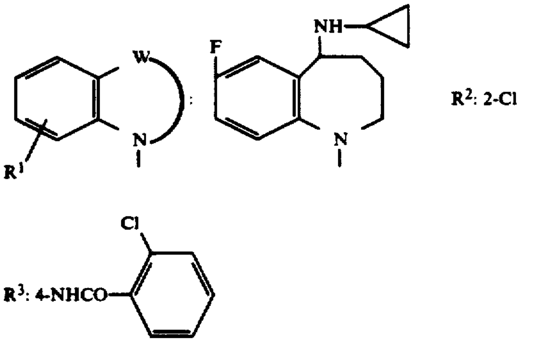

Crystalline form: White powder
Recrystallization solvent: Methanol/n-hexane
Melting Point: 179-180° C.
Form: Free
Example 1100
Structure -continued

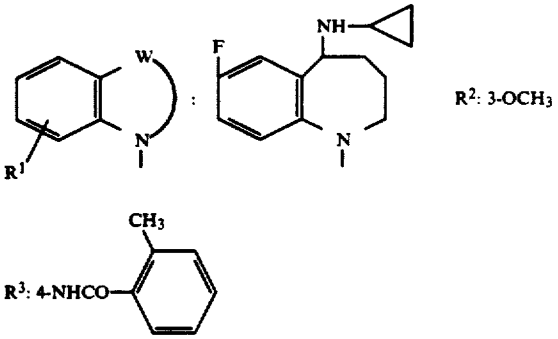

Crystalline form: White powder
Recrystallization solvent: Methanol/n-hexane
Melting Point: 167.5-169.5° C.
Form: Free
Example 1101
Structure

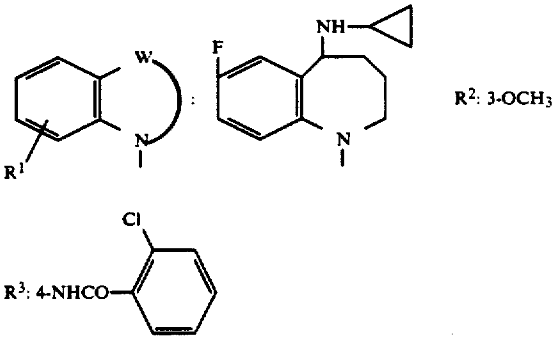

Crystalline form: White powder
Recrystallization solvent: Methanol/diethyl ether
Melting Point: 176-178° C.
Form: Free
Example 1102
Structure

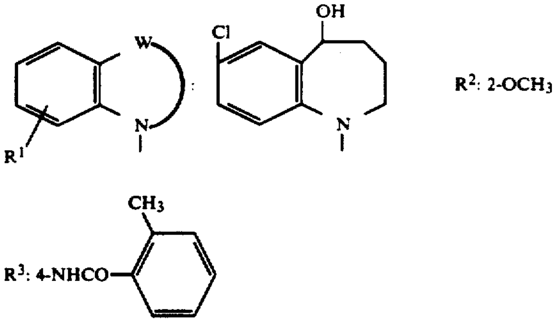

Crystalline form: Colorless amorphous
NMR analysis: 252)
Form: Free
Example 1103
Structure

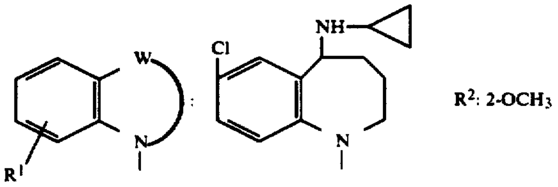

-continued

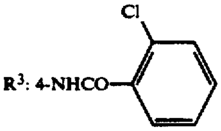

Crystalline form: White powder
Recrystallization solvent: Methanol/diethyl ether
Melting Point: 185-188° C.
Form: Free
Example 1104
Structure

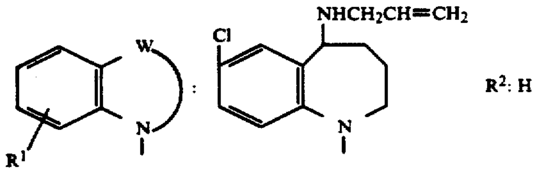

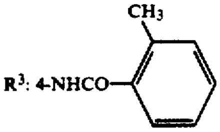

Crystalline form: White powder
Recrystallization solvent: Methanol/diethyl ether
Melting Point: 180-181.5° C.
Form: Free
Example 1105
Structure

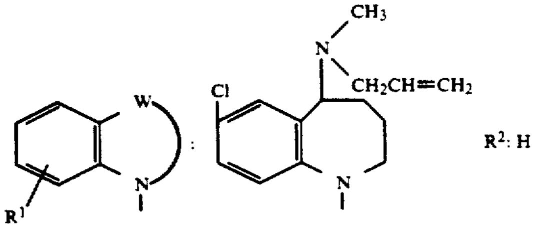

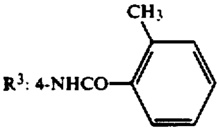

Crystalline form: White powder
Recrystallization solvent: Methanol/diethyl ether
Melting Point: 181-184° C.
Form: Free
Example 1106
Structure

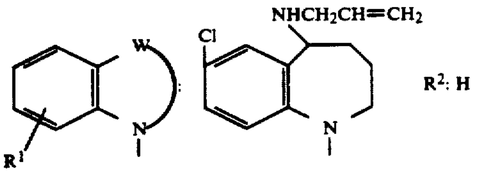

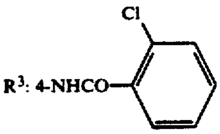

Crystalline form: White powder
Recrystallization solvent: Methanol/diethyl ether -continued Melting Point: 186.5-187° C.
Form: Free
Example 1107
Structure

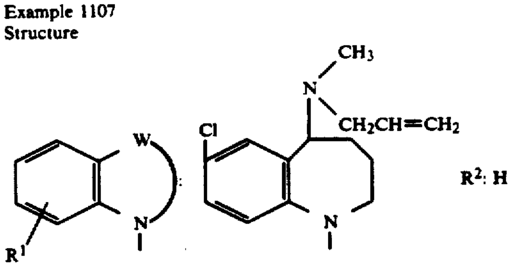

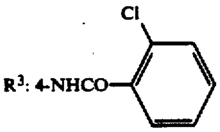

Crystalline form: White powder
Recrystallization solvent: Methanol/diethyl ether
Melting Point: 183-184° C.
Form: Free
Example 1108
Structure

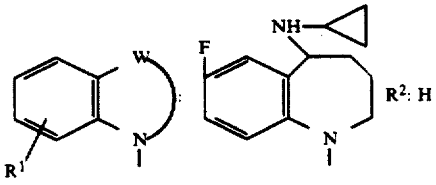

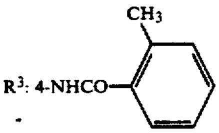

Crystalline form: White powder
Recrystallization solvent: Methanol/diethyl ether
Melting Point: 151-153° C.
Form: Free
Example 1109
Structure

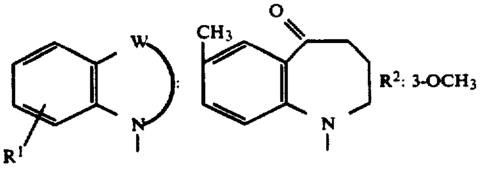

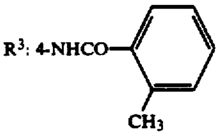

Crystalline form: Colorless amorphous
NMR analysis: 253)
Form: Free

Example 1110
Structure

-continued

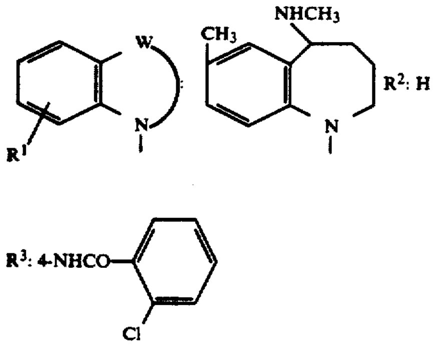

Crystalline form: Colorless amorphous
NMR analysis: 254)
Form: Free
Example 1111
Structure

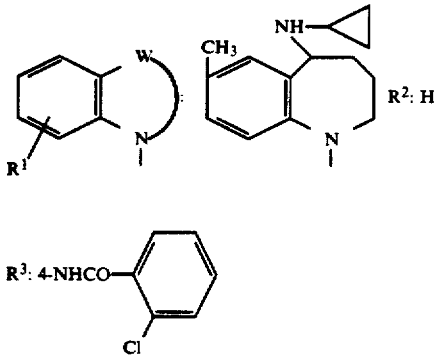

Crystalline form: White needles
Recrystallization solvent: Ethanol/n-hexane
Melting Point: 191-195° C.
Form: Free
Example 1112
Structure

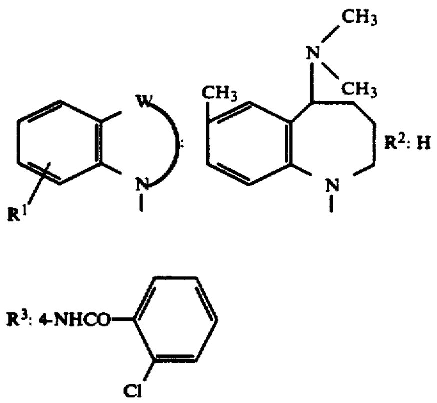

Crystalline form: White powder
Recrystallization solvent: Diethyl ether/n-hexane
Melting Point: 227-230° C.
Form: Free
Example 1113
Structure -continued

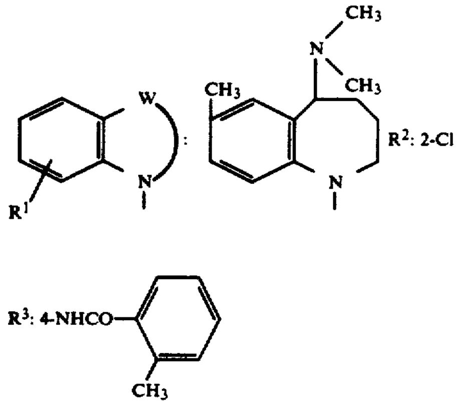

Crystalline form: Colorless amorphous
NMR analysis: 289)
Form: Free
Example 1114
Structure

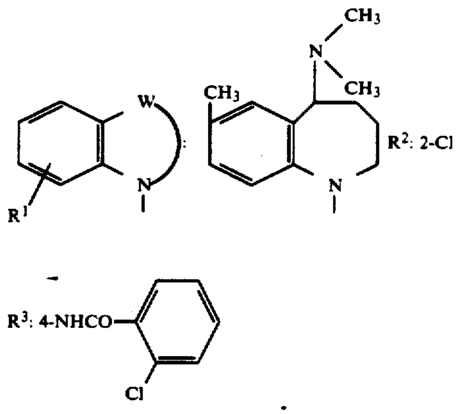

Crystalline form: Light yellow amorphous
NMR analysis: 255)
Example 1115
Structure

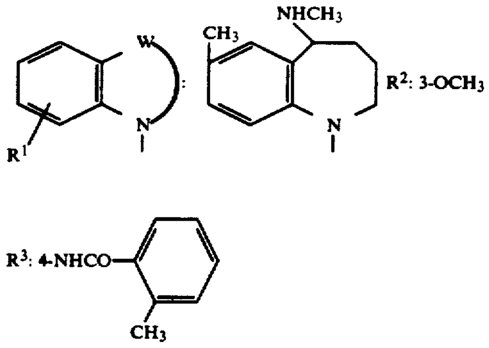

Crystalline form: White powder
Recrystallization solvent: Diethyl ether/n-hexane
Melting Point: 172-174° C.
Form: Free
Example 1116
Structure -continued

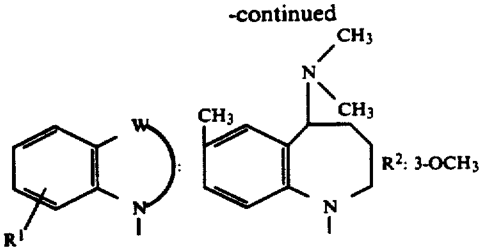

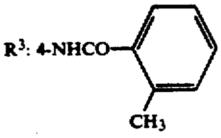

Crystalline form: Colorless amorphous
NMR analysis: 305)
Form: Free
Example 1117
Structure

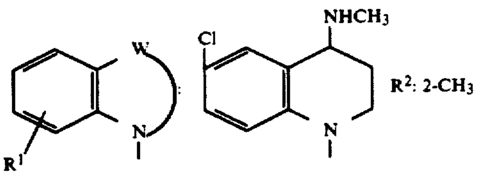

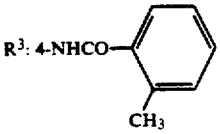

Crystalline form: Colorless amorphous
NMR analysis: 290)
Form: Free
Example 1118
Structure

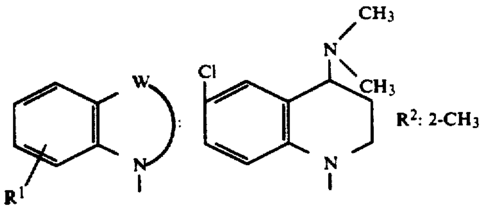

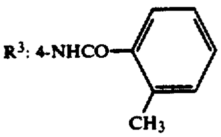

Crystalline form: Colorless amorphous
NMR analysis: 291)
Form: Free
Example 1119
Structure

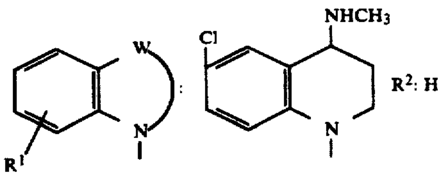

-continued

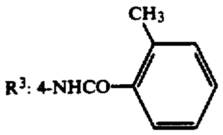

Crystalline form: Colorless amorphous
NMR analysis: 264)
Form: Free
Example 1120
Structure

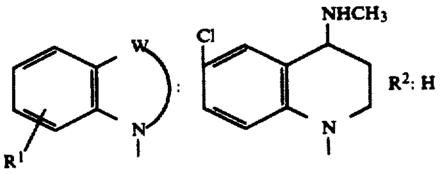

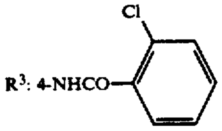

Crystalline form: Colorless amorphous
NMR analysis: 265)
Form: Free
Example 1121
Structure

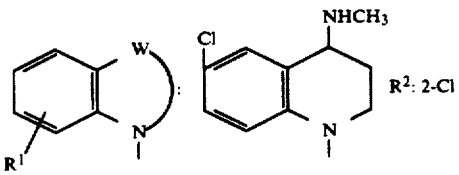

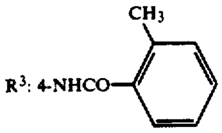

Crystalline form: Colorless amorphous
NMR analysis: 266)
Form: Free
Example 1122
Structure

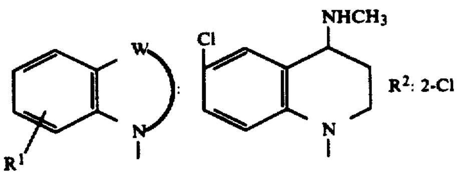

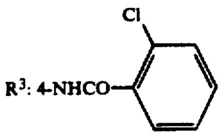

Crystalline form: Colorless amorphous
NMR analysis: 267)
Form: Free
Example 1123
Structure -continued

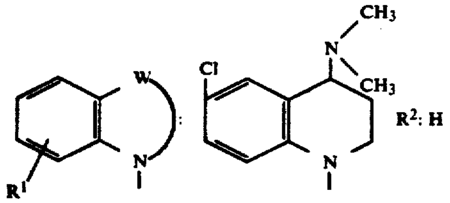

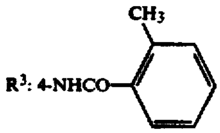

Crystalline form: Colorless amorphous
NMR analysis: 268)
Form: Free
Example 1124
Structure

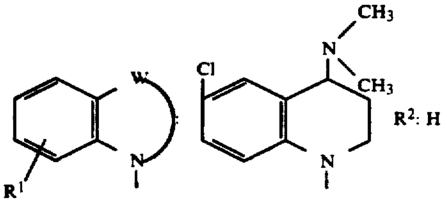

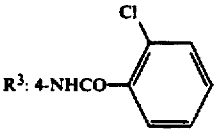

Crystalline form: Colorless amorphous
NMR analysis: 269)
Form: Free
Example 1125
Structure

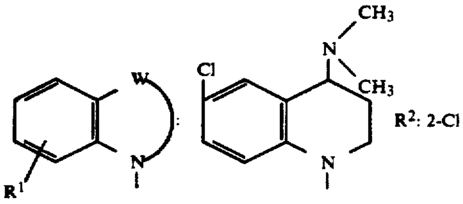

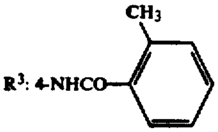

Crystalline form: Colorless amorphous
NMR analysis: 270)
Form: Free
Example 1126
Structure

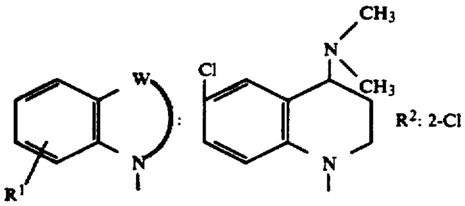

-continued

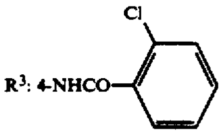

Crystalline form: Colorless amorphous
NMR analysis: 271)
Form: Free
Example 1127
Structure

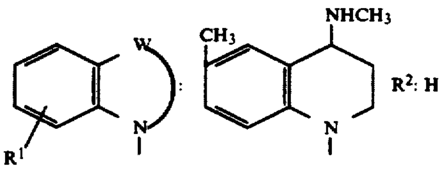

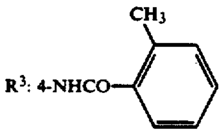

Crystalline form: Colorless amorphous
NMR analysis: 272)
Form: Free
Example 1128
Structure

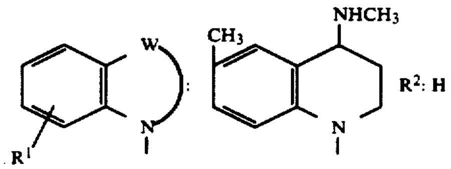

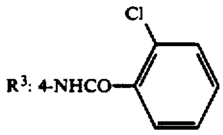

Crystalline form: Colorless amorphous
NMR analysis: 273)
Form: Free
Example 1129
Structure

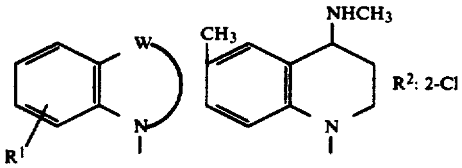

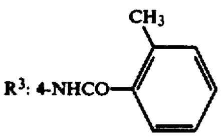

Crystalline form: Colorless amorphous
NMR analysis: 274)
Form: Free
Example 1130
Structure -continued

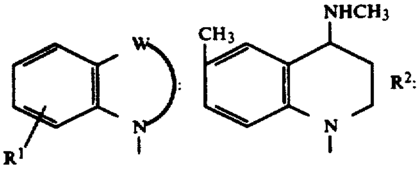

$R^2$: 2-Cl $R^3$: 4-NHCO—
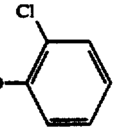

Crystalline form: Colorless amorphous
NMR analysis: 275)
Form: Free
Example 1131
Structure

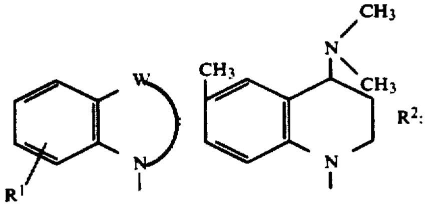

$R^2$: H $R^3$: 4-NHCO—
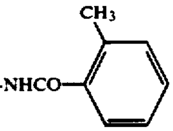

Crystalline form: Colorless amorphous
NMR analysis: 276)
Form: Free
Example 1132
Structure

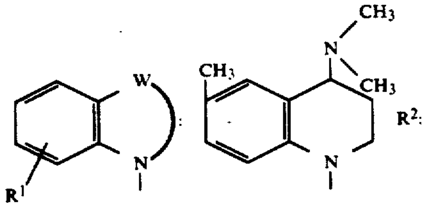

$R^2$: H $R^3$: 4-NHCO—
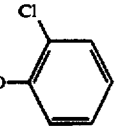

Crystalline form: Colorless amorphous
NMR analysis: 277)
Form: Free
Example 1133
Structure

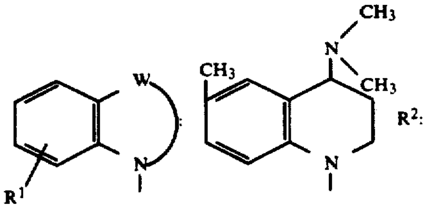

$R^2$: 2-Cl

-continued $R^3$: 4-NHCO—
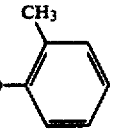

Crystalline form: Colorless amorphous
NMR analysis: 278)
Form: Free
Example 1134
Structure

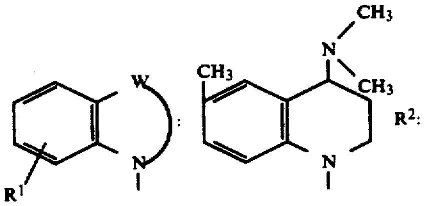

$R^2$: 2-Cl $R^3$: 4-NHCO—
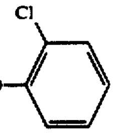

Crystalline form: Colorless amorphous
NMR analysis: 279)
Form: Free
Example 1135
Structure

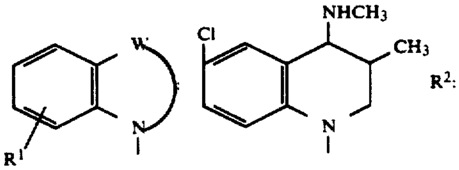

$R^2$: H $R^3$: 4-NHCO—
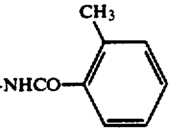

NMR analysis 280)
Form: Free
Example 1136
Structure

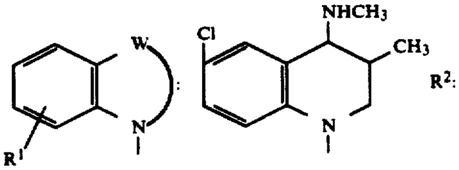

$R^2$: H $R^3$: 4-NHCO—
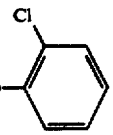

NMR analysis: 281)
Form: Free
Example 1137
Structure

-continued

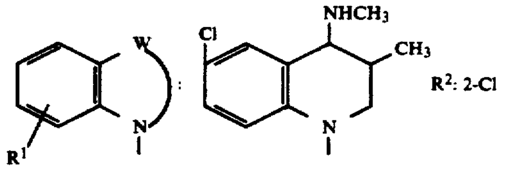

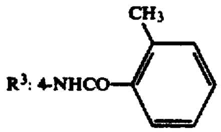

NMR analysis: 282)
Form: Free
Example 1138
Structure

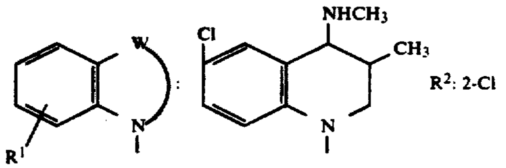

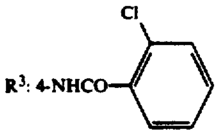

NMR analysis: 283)
Form: Free
Example 1139
Structure

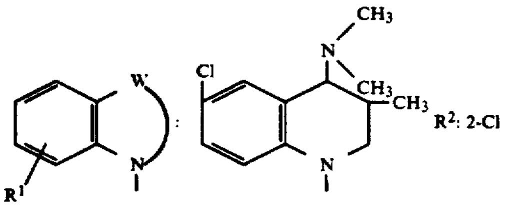

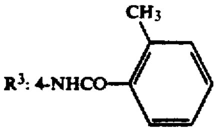

NMR analysis: 306)
Form: Free
Example 1140
Structure

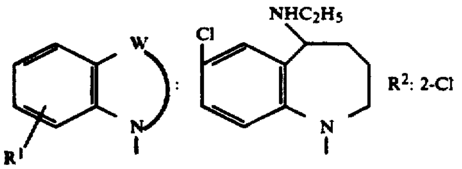

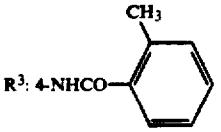

Crystalline form: Colorless amorphous

-continued

NMR analysis: 284)
Form: Free
Example 1141
Structure

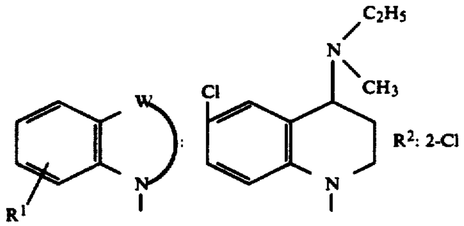

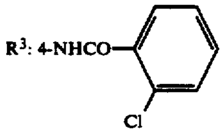

Crystalline form: Colorless amorphous
NMR analysis: 285)
Form: Free
Example 1142
Structure

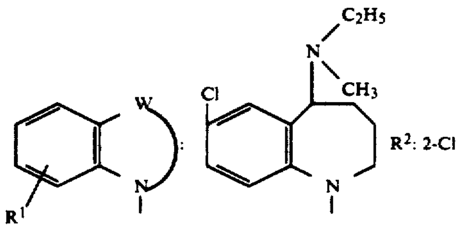

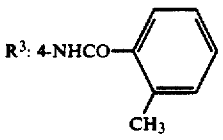

Crystalline form: Colorless amorphous
NMR analysis: 286)
Form: Free
Example 1143
Structure

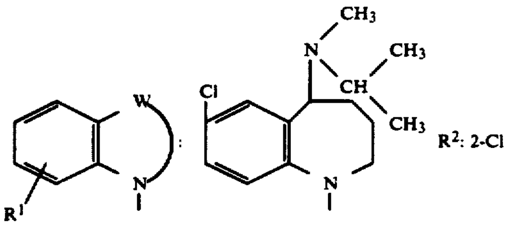

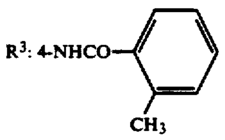

Crystalline form: Colorless amorphous
NMR analysis: 287)
Form: Free
Example 1144
Structure -continued

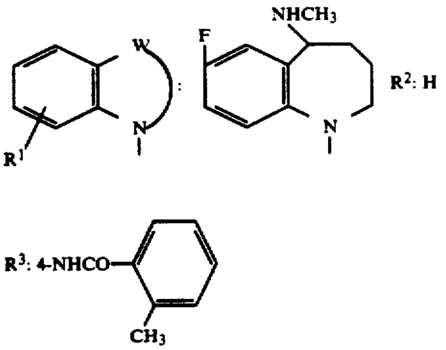

Crystalline form: White powder
Recrystallization solvent: Dichloromethane/diethyl ether
Melting Point: 203–207° C.
Form: Free
Example 1145
Structure

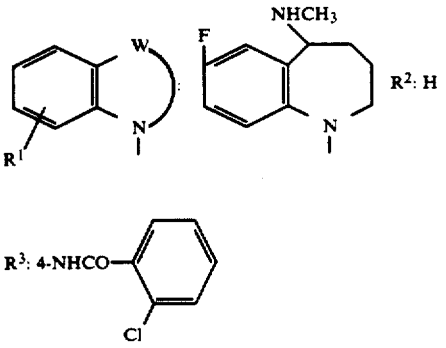

Crystalline form: White powder
Recrystallization solvent: Dichloromethane/diethyl ether
Melting Point: 199–203° C.
Form: Free
Example 1146
Structure

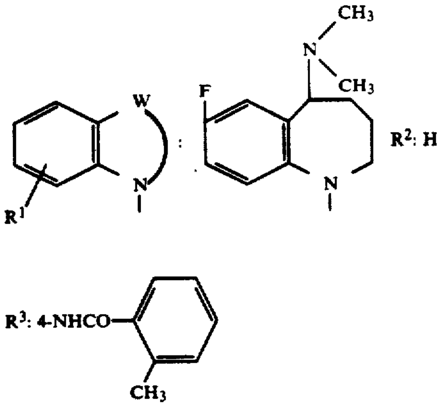

Crystalline form: White powder
Recrystallization solvent: Dichloromethane/diethyl ether
Melting Point: 210–212° C.
Form: Free
Example 1147
Structure -continued

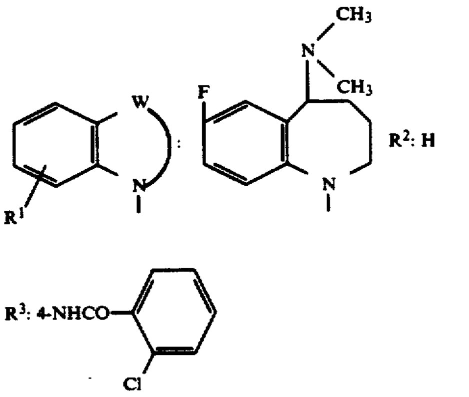

Crystalline form: White powder
Recrystallization solvent: Dichloromethane/diethyl ether
Melting Point: 211–214° C.
Form: Free
Example 1148
Structure

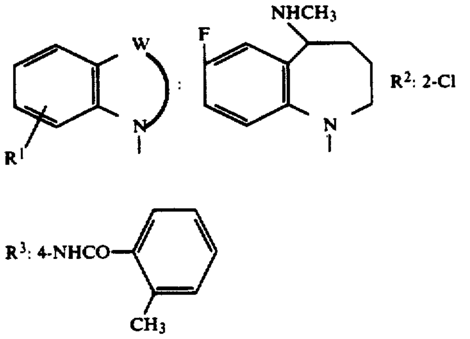

Crystalline form: White powder
Recrystallization solvent: Dichloromethane/diethyl ether
Melting Point: 186–189° C.
Form: Free
Example 1149
Structure

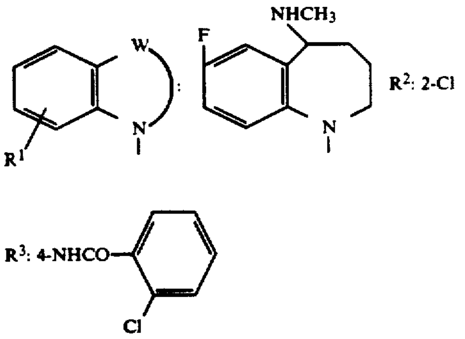

Crystalline form: Colorless amorphous
NMR analysis: 288)
Form: Free

Example 1150
Structure

-continued

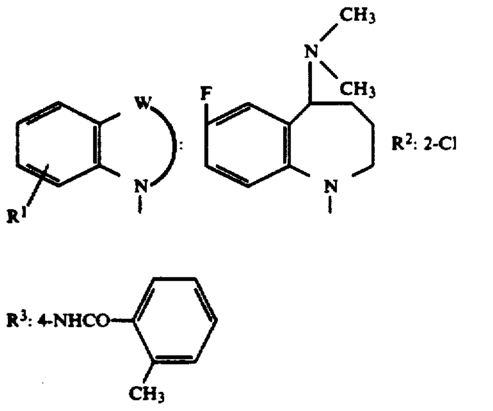

Crystalline form: Colorless amorphous
NMR analysis: 292)
Form: Free
Example 1151
Structure

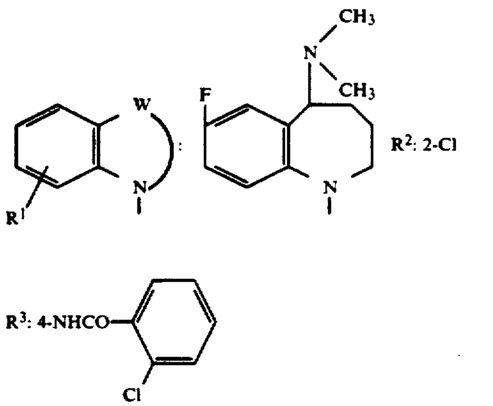

Crystalline form: Colorless amorphous
NMR analysis: 293)
Form: Free
Example 1152
Structure

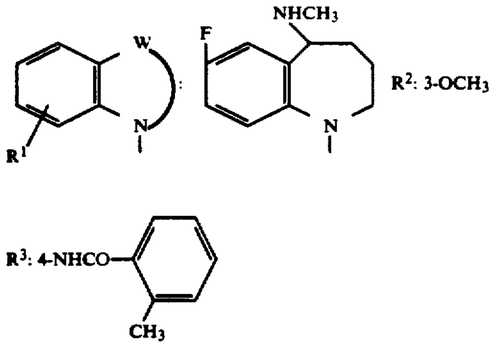

Crystalline form: White powder
Recrystallization solvent: Dichloromethane/diethyl ether
Melting Point: 144–145° C.
Form: Free
Example 1153
Structure -continued

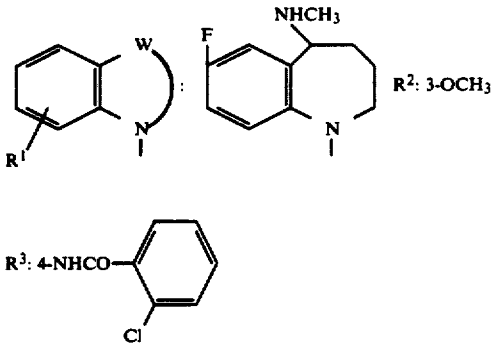

Crystalline form: White powder
Recrystallization solvent: Dichloromethane/diethyl ether
Melting Point: 149–150° C.
Form: Free
Example 1154
Structure

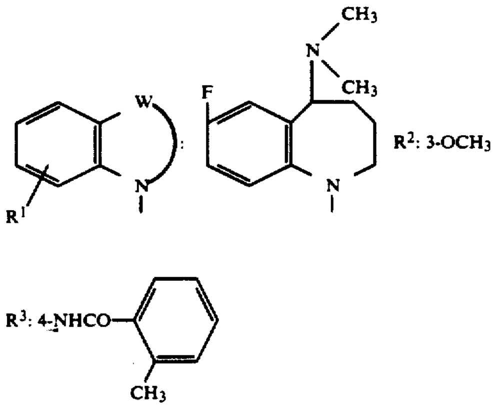

Crystalline form: Colorless amorphous
NMR analysis: 294)
Form: Free
Example 1155
Structure

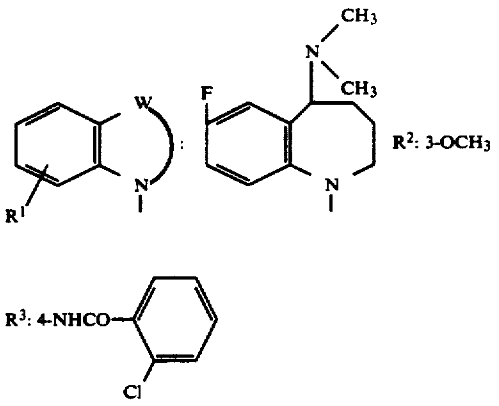

Crystalline form: Colorless amorphous
NMR analysis: 295)
Form: Free
Example 1156
Structure -continued

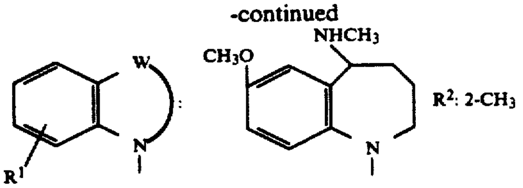

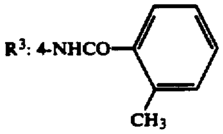

Crystalline form: Colorless amorphous
NMR analysis: 301)
Form: Free
Example 1157
Structure

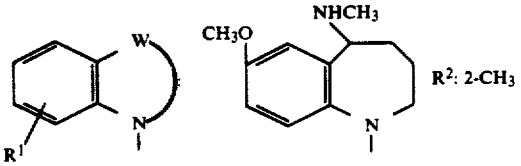

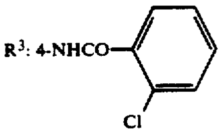

Crystalline form: Colorless amorphous
NMR analysis: 302)
Form: Free
Example 1158
Structure

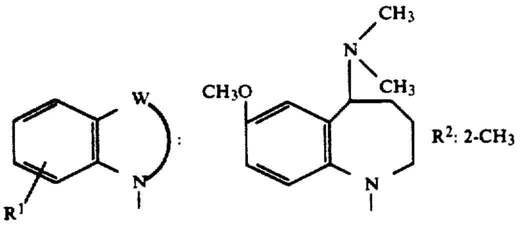

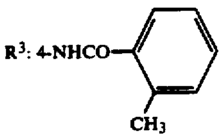

Crystalline form: Colorless amorphous
NMR analysis: 303)
Form: Free
Example 1159
Structure

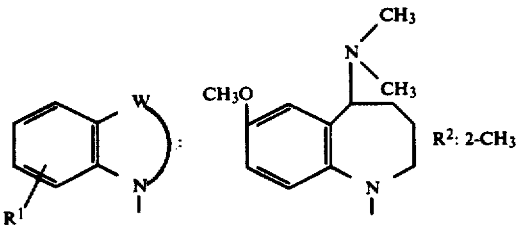

-continued

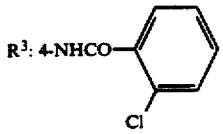

Crystalline form: Colorless amorphous
NMR analysis: 304)
Form: Free
Example 1160
Structure

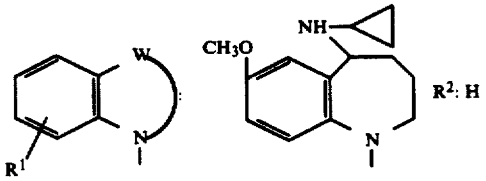

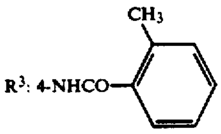

Crystalline form: White powder
Recrystallization solvent: Ethyl acetate/diisopropyl ether
Melting Point: 191–193° C.
Form: Free
Example 1161
Structure

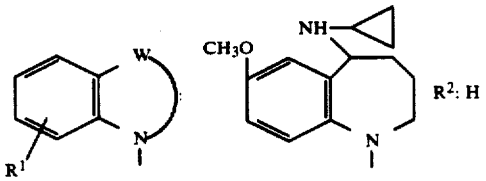

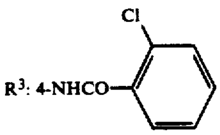

Crystalline form: White powder
Recrystallization solvent: Ethyl acetate/diisopropyl ether
Melting Point: 221–223° C.
Form: Free
Example 1162
Structure

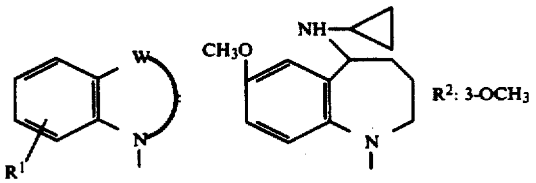

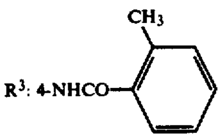

Crystalline form: White powder

-continued

Recrystallization solvent: Ethyl acetate/n-hexane
Melting Point: 159–161° C.
Form: Free
Example 1163
Structure

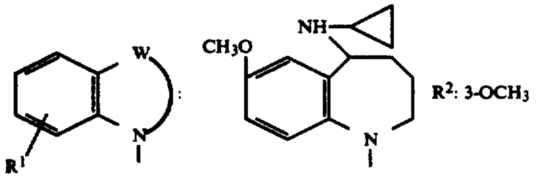

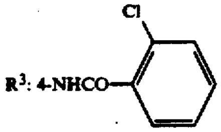

Crystalline form: White powder
Recrystallization solvent: Ethyl acetate/n-hexane
Melting Point: 174–175° C.
Form: Free
Example 1164
Structure

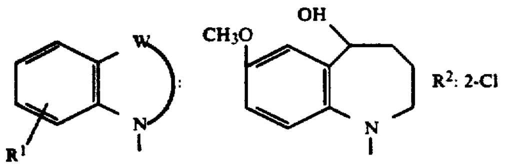

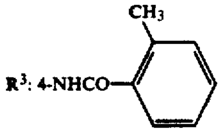

Crystalline form: Colorless amorphous
NMR analysis: 256)
Form: Free
Example 1165
Structure

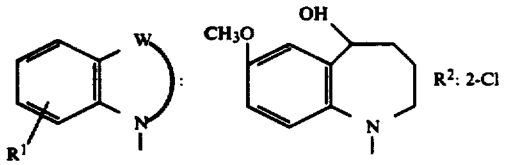

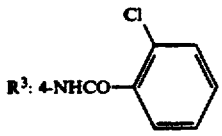

Crystalline form: Colorless amorphous
NMR analysis: 257)
Form: Free
Example 1166
Structure -continued

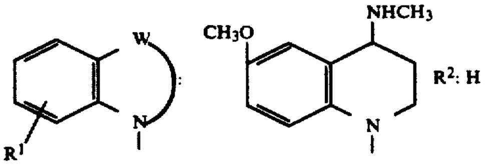

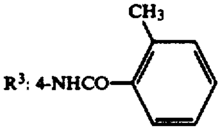

Crystalline form: Colorless amorphous
NMR analysis: 258)
Form: Free
Example 1167
Structure

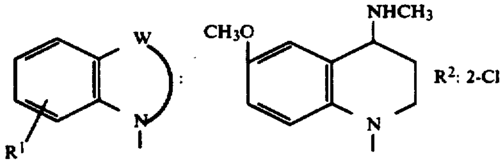

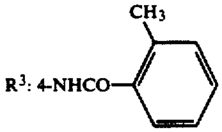

Crystalline form: Colorless amorphous
NMR analysis: 259)
Form: Free
Example 1168
Structure

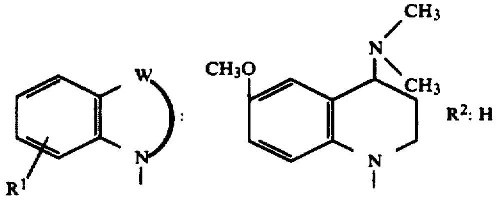

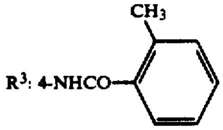

Crystalline form: Colorless amorphous
NMR analysis: 260)
Form: Free
Example 1169
Structure

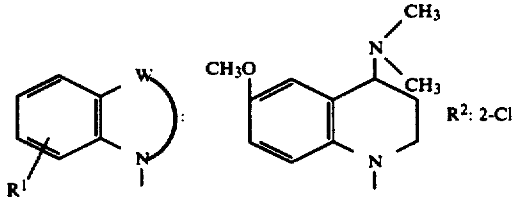

-continued

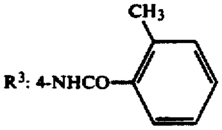

Crystalline form: Colorless amorphous
NMR analysis: 261)
Form: Free
Example 1170
Structure

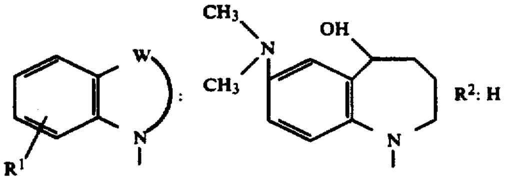

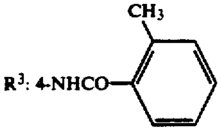

Crystalline form: Colorless amorphous
NMR analysis: 296)
Form: Free
Example 1171
Structure

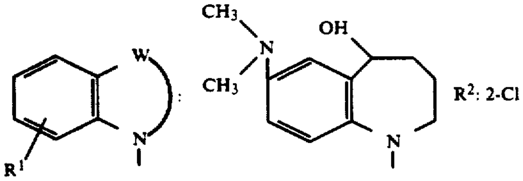

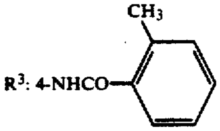

Crystalline form: White powder
Recrystallization solvent: Ethanol/diethyl ether/n-hexane
Melting Point: 159-162° C.
Form: Free
Example 1172
Structure

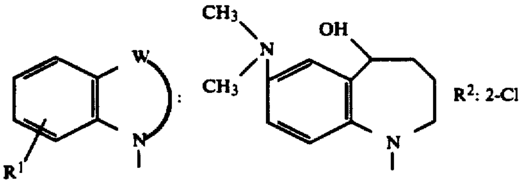

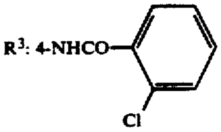

Crystalline form: Colorless needles
Recrystallization solvent: Ethanol/diethyl ether/n-hexane
Melting Point: 221-224° C.
Form: Free -continued Example 1173
Structure

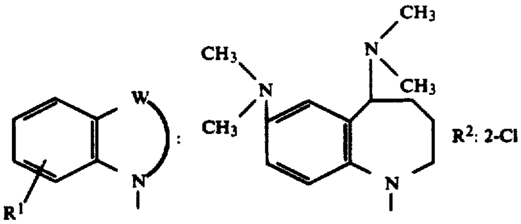

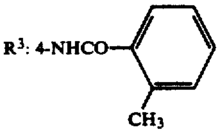

Crystalline form: Colorless prisms
Recrystallization solvent: Ethanol/diethyl ether
Melting Point: 199-202° C.
Form: Free
Example 1174
Structure

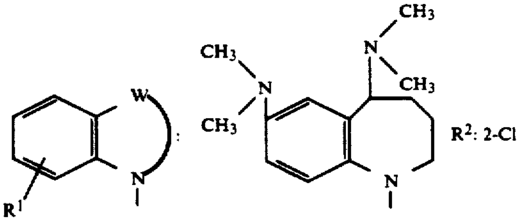

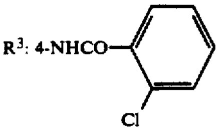

Crystalline form: Colorless prisms
Recrystallization solvent: Ethanol/diethyl ether
Melting Point: 215-218° C.
Form: Free
Example 1175
Structure

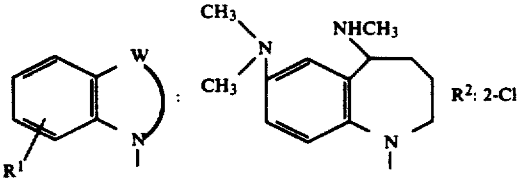

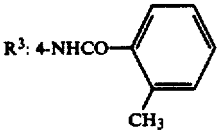

Crystalline form: Colorless needles
Recrystallization solvent: Ethanol/diethyl ether/n-hexane
Melting Point: 167-170° C.
Form: Free
Example 1176
Structure -continued

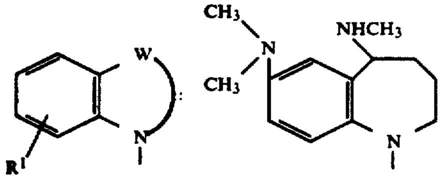

R[2]: 2-Cl

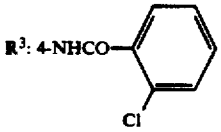

Crystalline form: White powder
Recrystallization solvent: Ethanol/diethyl ether/n-hexane
Melting Point: 191-193° C.
Form: Free
Example 1177
Structure

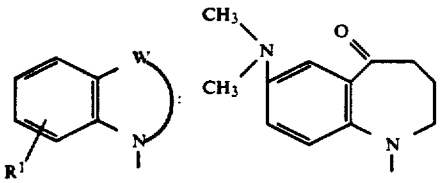

R[2]: 2-Cl

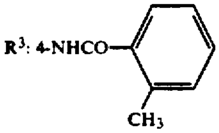

Crystalline form: Light yellow amorphous
NMR analysis: 262)
Form: Free
Example 1178
Structure

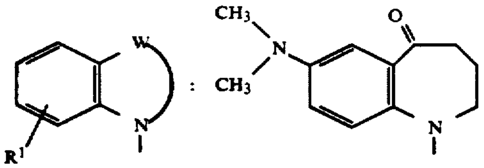

R[2]: 2-Cl

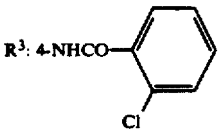

Crystalline form: Light yellow amorphous
NMR analysis: 263)
Form: Free
Example 1179
Structure -continued

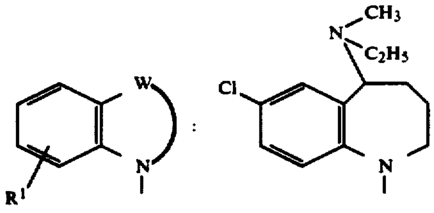

R[2]: 3-OCH$_3$

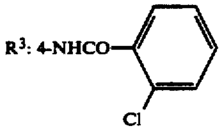

Crystalline form: Colorless amorphous
NMR analysis: 297)
Form: Free
Example 1180
Structure

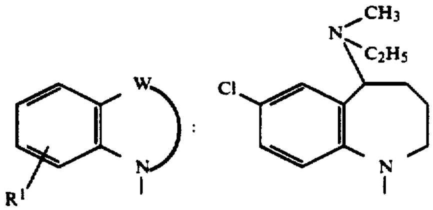

R[2]: 3-OCH$_3$

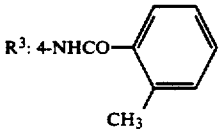

Crystalline form: Colorless amorphous
NMR analysis: 298)
Form: Free
Example 1181
Structure

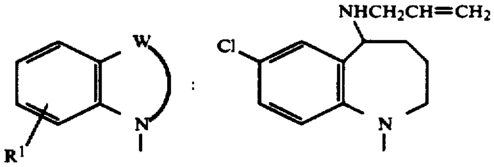

R[2]: 3-OCH$_3$

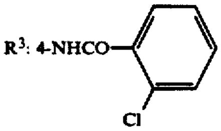

Crystalline form: Colorless amorphous
NMR analysis: 299)
Form: Free
Example 1182
Structure -continued

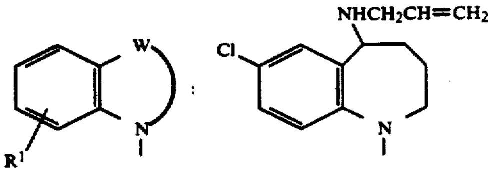

$R^2$: 3-OCH$_3$ $R^3$: 4-NHCO—

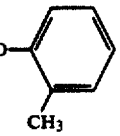

Crystalline form: Colorless amorphous
NMR analysis: 300)
Form: Free
Example 1183
Structure

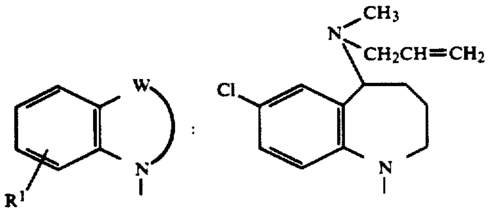

$R^2$: 3-OCH$_3$ $R^3$: 4-NHCO—

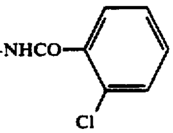

Crystalline form: Colorless amorphous
NMR analysis: 307)
Form: Free
Example 1184
Structure

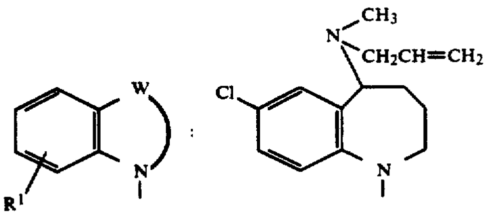

$R^2$: 3-OCH$_3$ $R^3$: 4-NHCO—

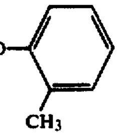

Crystalline form: Colorless amorphous
NMR analysis: 308)
Form: Free
Example 1185
Structure -continued

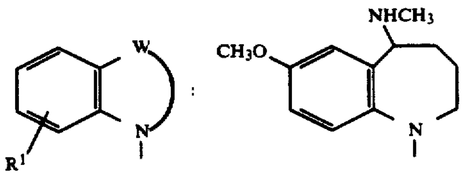

$R^2$: 2-OCH$_3$ $R^3$: 4-NHCO—

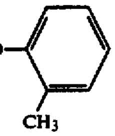

Crystalline form: Colorless amorphous
NMR analysis: 309)
Form: Free
Example 1186
Structure

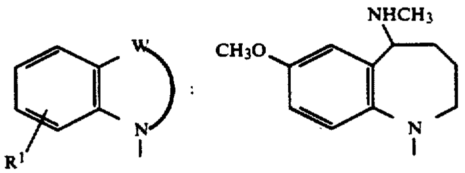

$R^2$: 2-OCH$_3$ $R^3$: 4-NHCO—

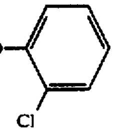

Crystalline form: Colorless amorphous
NMR analysis: 310)
Form: Free
Example 1187
Structure

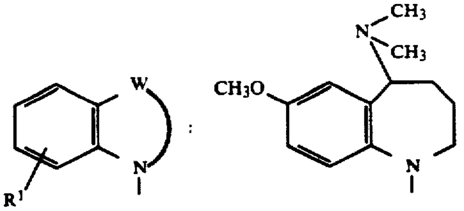

$R^2$: 2-OCH$_3$ $R^3$: 4-NHCO—

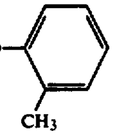

Crystalline form: Colorless amorphous
NMR analysis: 311)
Form: Free
Example 1188
Structure -continued

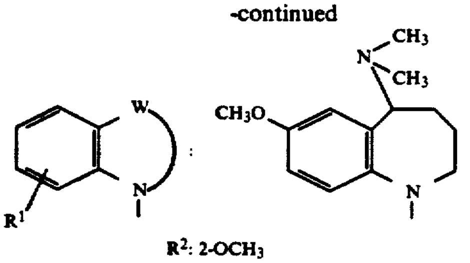

$R^2$: 2-$OCH_3$

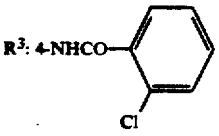

Crystalline form: Colorless amorphous
NMR analysis: 312)
Form: Free

238) $^1$H-NMR (DMSO-$d_6$) δ; 1.4–2.1 (4H, m), 2.34 (3H, s), 2.8–5.4 (4H, m), 7.09 (1H, d, J=8.4 Hz), 7.15–7.7 (9H, m), 7.76 (1H, d, J=2.6 Hz), 10.41 (1H, s)
239) $^1$H-NMR (DMSO-$d_6$) δ; 1.5–2.2 (4H, m), 2.8–5.2 (4H, m), 7.09 (1H, d, J=8.4 Hz), 7.2–7.7 (9H, m), 7.76 (1H, d, J=2.6 Hz), 10.63 (1H, s)
240) $^1$H-NMR ($CDCl_3$) δ; 1.65–2.2 (4H, m), 2.25–2.65 (6H, m), 2.75–4.6 (4H, m), 6.8–8.15 (11H, m)
241) $^1$H-NMR ($CDCl_3$) δ; 1.4–2.25 (4H, m), 2.25–2.55 (3H, m), 2.7–4.8 (4H, m), 6.8–8.3 (11H, m)
242) $^1$H-NMR ($CDCl_3$) δ; 1.4–2.1 (4H, m), 2.35–2.6 (3H, m), 2.8–5.2 (7H, m), 6.8–8.05 (11H, m)
243) $^1$H-NMR ($CDCl_3$) δ; 1.4–2.15 (4H, m), 2.4–5.2 (7H, m), 6.8–7.85 (10H, m), 7.9–8.3 (1H, m)
244) $^1$H-NMR ($CDCl_3$) δ; 1.20–2.38 (11H, M), 2.98–5.10 (3H, m), 6.45–7.04 (2H, m), 7.05–7.86 (8H, m), 8.00–8.50 (1H, m)
245) $^1$H-NMR ($CDCl_3$) δ; 1.05–2.78 (14H, m), 2.78–5.18 (2H, m), 6.36,–7.03 (2H, m), 7.06–7.90 (8H, m), 7.98–8.39 (1H, m)
246) $^1$H-NMR ($CDCl_3$) δ; 1.75–2.54 (2H, m), 2.60–4.03 (4H, m), 3.37 (3H, brs), 5.17 (2H, s), 6.60–6.83 (3H, m), 6.90–7.07 (1H, m), 7.07–7.20 (1H, m), 7.22–7.50 (6H, m),–7.73–7.84 (1H, m)
247) $^1$H-NMR ($CDCl_3$) δ; 1.60–2.40 (2H, m), 2.45 (3H, s), 2.65–3.06 (2H, m), 3.06–5.28 (2H, m), 3.35 (3H, brs), 6.59–7.60 (9H, m), 7.67–7.88 (1H, m), 8.12 (1H, brs)
248) $^1$H-NMR ($CDCl_3$) δ; 1.60–2.52 (2H, m), 2.64–5.32 (4H, m), 3.37 (3H, brs), 6.60–7.98 (10H, m), 8.50 (1H, brs)
249) $^1$H-NMR ($CDCl_3$) δ; 1.18–3.15 (12H, m), 3.40–4.38 (5H, m), 6.58–7.75 (10H, m), 8.30–8.71 (1H, m)
250) $^1$H-NMR ($CDCl_3$) δ; 0.26–0.71 (4H, m), 1.15–3.29 (10H, m), 3.40–4.95 (5H, m), 6.60–7.85 (10H, m), 8.18–8.68 (1H, m)
251) $^1$H-NMR ($CDCl_3$) δ;–0.25–0.72 (4H, m), 1.16–2.35 (6H, m), 2.35–3.30 (4H, m), 3.43–4.98 (2H, m), 6.57–7.94 (10H, m), 8.22–8.89 (1H, m)
252) $^1$H-NMR ($CDCl_3$) δ; 0.69–2.90 (9H, m), 2.90–5.10 (5H, m), 6.40–7.85 (10H, m), 8.25–8.54 (1H, m)
253) $^1$H-NMR ($CDCl_3$) δ; 2.17 (2H, brs), 2.34 (3H, s), 2.49 (3H, s), 2.87 (2H, t, J=6.0 Hz), 3.10–5.00 (2H, m), 3.70 (3H, s), 6.67 (1H, d, J=8.0 Hz), 6.85–6.88 (2H,, m), 7.09 (1H, dd, J=1.5, 8.0 Hz), 7.21–7.50 (4H, m), 7.64 (1H, d, J=1.9 Hz), 8.11 (1H, m), 8.33 (1H, d, J=8.8 Hz)
254) $^1$H-NMR ($CDCl_3$) δ; 1.42–5.06 (13H, m), 6.51 (1H, d, J=7.8 Hz), 6.76 (1H, m), 7.01–7.63 (10H, m), 8.53 (1H, m)
255) $^1$H-NMR ($CDCl_3$) δ1.26–4.93 (16H, M), 6.69–7.73 (10H, m), 8.62–8.84 (1H, m)
256) $^1$H-NMR ($CDCl_3$) δ1.45–1.90 (2H, m), 1.90–2.33 (2H, m), 2.33–3.25 (4H, m), 3.60–3.93 (3H, m), 4.45–5.15 (2H, m), 6.40–8.25 (11H,
257) $^1$H-NMR ($CDCl_3$) δ; 1.49–1.97 (2H,m), 1.97–3.10 (3H, m), 3.58–3.98 (3H, m), 4.60–5.26 (2H, m), 6.44–8.36 (11H, m)
258) $^1$H-NMR ($CDCl_3$) δ; 1.82–2.13 (1H, m), 2.13–2.43 (1H, m), 2.50 (3H, s), 2.57 (3H, s), 3.69–4.06 (3H, m), 3.78 (3H, s), 6.45–6.80 (2H, m), 6.85–7.00 (1H, m), 7.18–7.80 (9H, m)
259) $^1$H-NMR ($CDCl_3$) δ;–1.72–2.05 (1H, M), 2.11–2.40 (1H, m), 2.51 (3H, S), 2.57 (3H, s), 3.40–4.20 (3H, m), 3.77 (3H, s), 6.35–6.64 (1H, m), 6.79–6.96 (1H, m), 7.15–8.13 (9H, m)
260) $^1$H-NMR ($CDCl_3$) δ; 1.71–2.05 (1H, M), 2.07–2.32 (1H, m), 2.33 (6H, s), 2.47 (3H, s), 3.50–3.80 (2H, m), 3.76 (3H, s), 3.95–4.17 (1H, m), 6.40–6.70 (2H, m), 6.90–7.03 (1H, m), 7.14–7.77 (8H, m), 7.90–8.14 (1H, m)
261) $^1$H-NMR ($CDCl_3$) δ; 1.76–2.70 (2H, m), 2.30 (6H, s), 2.47 (3H, s), 3.23–4.40 (3H, m), 3.73 (3H, s), 6.30–6.65 (2H, m), 6.65–8.76 (9H, m)
262) $^1$H-NMR ($CDCl_3$) δ;–1.68–2.35 (2H, m), 2.36–5.11 [13H, m, 2.45 (3H,–s), 2.92 (6H, s)], 6.56 (1H, dd, J=3.1, 8.7 Hz), 6.78–7.06 (2H, m), 6.82 (1H, d, J=8.7 Hz), 7.11–7.68 (6H, m), 7.97 (1H, brs)
263) $^1$H-NMR ($CDCl_3$) δ; 1.69–2.30 (2H, m), 2.59–5.10 [10H, M, 2.92 (6H, s)], 6.56 (1H, dd, J=3.1, 8.8 Hz), 6.72–7.90 (9H, m), 8.42 (1H, brs)
264) $^1$H-NMR ($CDCl_3$) δ; 1.49 (1H, brs), 1.82–2.01 (1H, m), 2.03–2.26 (1H, m), 2.46 (3H, s), 2.54 (3H, s), 3.67–3.76 (1H, m), 3.86 (2H, t, J=6.8 Hz), 6.67 (1H, d, J=8.6 Hz), 6.93 (1H, dd, J=8.6, 2.5 Hz), 7.13–7.43 (9H, m), 8.15 (1H, brs)
265) $^1$H-NMR ($CDCl_3$) δ; 1.58 (1H, brs), 1.86–2.03 (1H, m), 2.08–2.30 (1H, m), 2.56 (3H, s), 3.69–3.78 (1H, m), 3.91 (2H, t, J=6.5 Hz), 6.69 (1H, d, J=8.7 Hz), 6.94 (1H, dd, J=8.6, 2.5 Hz), 7.33–7.47 (6H, m), 7.54–7.63 (2H, m), 7.67–7.77 (1H, m), 8.16 (1H, brs)
266) $^1$H-NMR ($CDCl_3$) δ; 1.50 (1H, brs), 1.76–2.23 (2H, m), 2.42 (3H, s), 2.47 (3H, s), 3.55–3.94 (3H, m), 6.28–7.78 (10H, m), 8.91 (1H, brs)
267) $^1$H-NMR ($CDCl_3$) δ; 1.46 (1H, brs), 1.82–2.28 (2H, m), 2.50 (3H,, s), 3.52–4.08 (3H, m), 6.3.4–7.75 (10H, m), 8.61 (1H, brs)
268) –$^1$H-NMR ($CDCl_3$) δ; 1.80–2.31 (2H, m), 2.32 (3H, s), 2.48 (3H, s), 3.51–3.82 (2H, m), 3.95–4.15 (1H, m), 6.59 (1H, d, J=8.6–Hz), 6.90 (1H, dd, J=8.6, 2.5 Hz), 7.16–7.61 (9H, m), 7.88 (1H, brs)
269) $^1$H-NMR ($CDCl_3$) δ; 1.86–2.04 (1H, m), 2.13–2.31 (1H, m), 2.33 (3H, s), 3.53–3.62 (1H, m), 3.76 (1H, dt, J=12.8, 6.4 Hz), 6.60 (1H, d, J=8.7 Hz), 6.91 (1H, dd, J=8.7, 2.5 Hz), 7.33–7.52 (6H, m), 7.54–7.66 (2H, m), 7.73–7.82 (1H, m), 8.07 (1H, brs)
270) $^1$H-NMR ($CDCl_3$) δ; 1.65–2.27 (2H, m), 2.28 (6H, s), 2.48 (3H, s), 3.37–4.07 (3H, m), 6.33–7.91 (10H, m), 8.20 (1H, brs)
271) $^1$H-NMR ($CDCl_3$) δ; 1.71–2.26 (2H, m), 2.28 (6H, s), 3.36–4.10 (3H, m), 6.35–7.95 (10H, m), 8.59 (1H, brs)
272) $^1$H-NMR ($CDCl_3$) δ; 2.02–2.23 (2H, m), 2.28 (3H, s), 2.47 (3H, s), 2.56–(3H, s), 3.73–4.07 (3H, m), 4.68 (1H, brs), 6.61 (1H, d, J=8.1 Hz), 6.72–6.83 (1H, m), 7.17–7.63 (11H, m), 8.03 (1H, brs)
273) $^1$H-NMR ($CDCl_3$) δ; 1.61 (1H, brs), 1.87–2.25 (2H, m), 2.29 (3H, s), 2.56 (3H, s), 3.67–3.78 (1H, m), 3.91 (2H, t, J=6.9 Hz), 6.52–6.79 (2H, m), 7.09–7.15 (1H, m), 7.30–7.90 (8H, m), 8.23 (1H, brs)
274) $^1$H-NMR ($CDCl_3$) δ; 1.58 (1H, brs), 1.82–2.23 (2H, m), 2.27 (3H,,s), 2.48 (3H, s), 2.50 (3H, s), 3.47–4.05 (3H, m), 6.23–6.83 (2H, m), 7.00–7.50 (7H, m), 7.53–7.74 (1H, m), 8.28 (1H, brs)
275) $^1$H-NMR ($CDCl_3$) δ; 1.60 (1H, brs), 1.82–2.35 (5H, m), 2.49 (3H, s), 3.41–4.08 (3H, m), 6.30–6.80 (1H, m), 6.98–7.68 (8H,–m), 7.31–7.82 (1H, M), 8.77 (1H, brs)
276) $^1$H-NMR ($CDCl_3$) δ; 1.76–2.03 (2H, m), 2.27 (3H, s), 2.32 (6H, s), 2.47 (3H, s), 3.48–3.58 (1H, M), 3.66 (1H, dt, J=12.7, 6.1 Hz), 3.97–4.14 (1H, m), 6.48 (1H, d, J=8.2 Hz), 6.65–6.77 (1H, m), 7.14–7.59 (9H, m), 7.96 (1H, brs)
277) $^1$H-NMR ($CDCl_3$) δ; 1.75–2.04 (2H, m), 2.27 (3H, s), 2.33 (6H, s), 3.48–3.58 (1H, m), 3.67 (1H, dt, J=12.7, 6.1 Hz), 3.98–4.16 (1H, m), 6.48 (1H, d, J=8.2 Hz), 6.72 (1H, dd, J=8.2, 1.9 Hz), 7.16 (1H, d, J=1.9 Hz), 7.27–7.91 (8H, m), 8.31 (1H, brs)

-continued

278) $^{1}$H-NMR (CDCl$_3$) δ; 1.72-2.05 (2H, m), 2.28 (9H, s), 2.47 (3H, s), 3.16-434 (3H, m), 6.38-7.79 (10H, m), 8.37 (1H, brs)

279) $^{1}$H-NMR (CDCl$_3$) δ; 1.65-2.07 (2H, m), 2.28 (9H, s), 3.26-4.38 (3H, 6.34-8.06 (10H, m), 8.53 (1H, brs)

280) Two stereoisomers: Both colorless amorphous

Isomer A:

[α]$_D^{22}$ = 0° (chloroform, c=1.0)

$^{1}$H-NMR (CDCl$_3$) δ; 1.04 (3H, d, J=6.9 Hz), 1.59 (1H, brs), 2.25-2.45 (1H, m), 2.49 (3H, s), 2.52 (3H, s), 3.53-3.69 (2H, m), 3.91 (1H, abq, J=7.2, 12.9 Hz), 6.60 (1H, d, J=8.6 Hz), 6.93 (1H, dd, J=8.6, 2.5 Hz), 7.18-7.60 (9H, m), 7.76 (1H, brs)

Isomer B:

[α]$_D^{22}$ = 0° (chloroform, c=1.0)

$^{1}$H-NMR (CDCl$_3$) δ; 1.06 (3H, d, J=6.9 Hz), 1.60 (1H, brs), 2.21-2.43 (1H, m), 2.47 (3H, s), 2.52 (3H, s), 3.51-3.66 (2H, m), 3.93 (1H, abq, J=7.5, 12.9 Hz), 6.60-6.68 (1H, m), 6.95 (1H, dt, J=7.5, 1.8 Hz), 7.03 (1H, dt, J=7.4, 1.4 Hz), 7.17-7.55 (8H, m), 7.81 (1H, brs)

281) Two stereoisomers: Both colorless amorphous

Isomer A:

[α]$_D^{22}$ = 0° (chloroform, c=1.0)

$^{1}$H-NMR (CDCl$_3$) δ1.04 (3H, d, J=6.9 Hz), 1.55 (1H, brs), 2.23-2.46 (1H, m), 2.53 (3H, s), 3.53-3.67 (2H, m), 3.91 (1H, abq, J=7.1, 12.9 Hz), 6.61 (1H, d, J=8.6 Hz), 6.93 (1H, dd, J=8.6, 2.5 Hz), 7.28-7.52 (6H, m), 7.54-7.65 (2H, m), 7.70-7.79 (1H, m), 8.16 (1H, brs)

Isomer B:

[α]$_D^{22}$ = 0° (chloroform, c=1.0)

$^{1}$H-NMR (CDC13,) 6 ; 1.06 (3H, d, J=6.9 Hz), 1.61 (1H, brs), 2.21-2.42 (1H, m), 2.51 (3H, s), 3.48-3.67 (2H, m), 3.90 (1H, abq, J=7.4, 12.9 Hz), 6.59-6.67 (1H, m), 6.94 (1H, dt, J=7.5, 1.9 Hz), 7.03 (1H, dt, J=7.4, 1.-4 Hz), 7.23-7.75 (8H, m), 8.41 (1H, brs)

282) Two stereoisomers: Both colorless amorphous

Isomer A:

[α]$_D^{22}$ = 0° (chloroform, c=1.0)

$^{1}$H-NMR (CDCl$_3$) δ; 0.99 (3H, d, J=6.5 Hz), 1.37 (1H, brs), 2.16-2.40 -(1H, m), 2.46 (3H, s), 2.48 (3H, s), 3.38-3.96 (3H, m), 6.30-7.28 (10H, m), 8.26 (1H, brs)

Isomer B:

[α]$_D^{22}$ = 0° (chloroform, c=1.0)

$^{1}$H-NMR (CDCl$_3$) δ; 1.03 (3H, d,J=6.7 Hz), 1.44 (1H, brs), 2.17-2.40 (1H, m), 2.45 (3H, s), 2.47 (3H, s), 3.40-3.98 (3H,-m), 6.47-7.73 (10H, m), 8.23 (1H, brs)

283) Two stereoisomers: Both colorless amorphous

Isomer A:

[α]$_D^{22}$ = 0° (chloroform, c=1.0)

$^{1}$H-NMR (CDCl$_3$) δ; 1.00 (3H, d, J=6.6 Hz), 1.40 (1H, brs), 2.18-2.42 (1H, m), 2.47 (3H, s), 3.36-4.02 (3H, m), 6.32-7.78 (10H, m), 8.55 (1H, brs)

Isomer B-

[α]$_D^{22}$ = 0° (chloroform, c=1.0)

$^{1}$H-NMR (CDCl$_3$) δ; 1.03 (3H, d, J=6.5 Hz), 1.39 (1H, brs), 2.14-239 (1H, m), 2.45 (3H, s). 3.34-3.98 (3H, m), 6.53--7.98 (10H, m), 8.78 (1H, brs)

284) $^{1}$H-NMR (CDCl$_3$) δ; 1.05-1.25 (3H, m), 1.25-2.80 (10H, m), 3.00-5.10 (3H, m), 6.75-8.40 (11H, m)

285) $^{1}$H-NMR (CDCl$_3$) δ; 1.00-2.80 (12H, M), 3.00-5.10 (3H, m), 6.70-7.80 (10H, m), 8.30-8.80 (1H, m)

286) $^{1}$H-NMR (CDCl$_3$) δ; 0.95-2.80 (15H, m), 2.80-5.15 (3H, m), 6.70-7.05 (2H, m), 7.10-7.80 (10H, m), 7.95-8.45 (1H, m)

287) $^{1}$H-NMR (CDCl$_3$) δ; 0.80-2.60 (16H, 2.60-5.05 (4H, m), 6.70-7.70 (10H, m), 7.85-8.40 (1H, m)

288) $^{1}$H-NMR (CDCl$_3$) δ; 1.30-2.60 (8H, m), 2.60-5.10 (3H, m), 6.60-7.95 (10H, m), 8.25-8.70 (1H, m)

289) $^{1}$H-NMR (CDCl$_3$) δ; 1.27-4.91 (19H, M), 6.68-7.73 (10H, m), 8.40-8.71 (1H, m)

290) $^{1}$H-NMR (CDCl$_3$) δ; 1.81-2.54 (6H, m), 2.15 (3H, s), 2.41 (3H, s), 2.46 (3H, s), 3.61-3.71 (3H, m), 6.91-7.43 (10H, m), 8.60 (1H, s)

291) $^{1}$H-NMR (CDCl$_3$) δ; 1.86-2.50 (3H, m), 2.28 (9H, s), 2.49 (3H, s), 6.60-7.47 (10H, m), 7.75 (1H, m)

-continued

292) $^{1}$H-NMR (CDCl$_3$) δ; 1.15-2.55 (13H, m), 2.55-5.10 (3H, m), 6.60-8.40 (11H, m)

293) $^{1}$H-NMR (CDCl$_3$) δ; 1.15-2.45 (10H, M), 2.55-5.10 (3H, m), 6.60-7.80 (10H, m), 8.30-8.70 (1H, m)

294) $^{1}$H-NMR (CDCl$_3$) δ; 1.10-2.60 (4H, m), 2.41 (6H, s), 2.49 (3H, S), 3.76 (3H, s), 2.60-5.20 (3H, m), 6.50-6.80 (3H, m),-6.90-7.60 (6H, m), 8.13 (1H, s), 8.30 (1H, d, J=8.5 Hz)

295) $^{1}$H-NMR (CDCl$_3$) δ; 1.15-2.50 (4H, M), 2.41 (6H, s), 2.60-5.20 (3H, m), 3.77 (3H, s), 6.50-7.50 (8H, m), 7.65-7.80 (1H, m), 8.31 (1H, d, J=8.4 Hz), 8.61 (1H, s)

296) $^{1}$H-NMR (CDCl$_3$) δ; 1.55-3.13 (12H, M), 2.44 (3H, s), 4.60-5.14 (2H, m), 6.28 (1H, dd, J=2.5, 8.5 Hz), 6.48 (1H, d, J=8.5 Hz), 6.99 (1H, d, J=2.5 Hz), 7.07-7.58 (8H, m), 7.80 (1H, brs)

297) $^{1}$H-NMR (CDCl$_3$) δ; 1.01-2.88, 3.22-4.41, 4.90-5.28 [total 18H, 1.17 (3H, t, J=7.2 Hz), 2.40 (3H, s), 3.77 (3H, s)], 6.55 (1H, d, J=8.1 Hz), 6.60-7.98 (8H, m), 8.23-8.75 (2H, m)

298) $^{1}$H-NMR (CDCl) δ; 1.00-3.04, 3.24-4.45. 4.91-5.27 [total 21H, m, 1.17 (3H, t, J=7.0 Hz), 2.39 (3H, s), 2.50 (3H, s), 3.75 (3H, s)), 8.56 (1H, d, J=8.3 Hz), 6.69 (1H, d, J=8.3 Hz), 6.82-7.75 (7H, m), 8.05-8.49 (2H, m)

299) $^{1}$H-NMR (CDCl) δ; 1.21-4.62, 4.90-5.43 (total 15H, m), 5.70-6.11 (1H, m), 6.35-7.90 (9H, m), 8.07-8.92 (2H, m)

300) $^{1}$H-NMR (CDCl) δ; 1.20-4.68, 5.01-5.3 [total 18H, m, 2.50 (3H, s)], 5.72-6.14 (1H, m), 6.49-7.69 (9H, m), 8.01-8.58 (2H, m)

301) $^{1}$H-NMR (CDCl$_3$) δ; 1.25-2.80 (14H, m), 3.00-5.10 (6H, m), 6.40-8.00-(11H, m)

302) $^{1}$H-NMR (CDCl$_3$) δ; 1.30-2.90 (11H, m), 3.00-5.10 (6H, m), 6.40-7.80 (10H, m), 8.00-8.35 (1H, m)

303) $^{1}$H-NMR (CDCl$_3$) δ; 1.10-2.80 (16H, m), 2.85-5.15 (6H, m), 6.40-7.80 (11H, m)

304) $^{1}$H-NMR (CDCl$_3$) δ; 1.10-2.80 (13H, m), 2.90-5.10 (6H, m), 6.40-7.85 (10H, m), 7.90-8.20 (1H, m)

305) $^{1}$H-NMR (CDCl$_3$) δ; 1.27-5.28 (19H, m), 3.75 (3H, s), 6.51 (1H, d, J=7.9 Hz), 6.69-6.81 (2H, m), 7.05-7.49 (6H, M), 8.14 (1H, m), 8.27 (1H, d, J=8.4 Hz)

306) Two stereoisomers: Both colorless amorphous

Isomer A:

[α]$_D^{22}$ = 0° (chloroform, c=1.0)

$^{1}$H-NMR (CDCl$_3$) δ; 0.78-1.02 (3H, m), 2.23-2.52 (1H, m), 2.39 (6H, s), 2.48 (3H, s), 3.17-4.30 (3H, m), 6.85-7.84 (10H, m), 8.17 (1H, brs)

Isomer B:

[α]$_D^{22}$ = 0° (chloroform, c=1.0)

$^{1}$H-NMR (CDCl$_3$) δ; 0.73-1.00 (3H, m), 2.17-2.52 (1H, m), 2.39 (6H, s), 2.49 (3H, s), 3.15-4.33 (3H, m), 6.36-7.55,(8H, m), 7.58-7.83 (2H, m), 8.19 (1H, brs)

307) $^{1}$H-NMR (CDCl$_3$) δ; 1.25-4.44, 4.98-5.41 (total 17H, m, 2.40 (3H, s), 3.76 (3H, s)], 5.72-6.13 (1H, m), 6.56 (1H, d, J=8.4-Hz), 6.69 (1H, d, J=7.9 Hz), 6.77-7.93 (7H, m), 8.32 (1H, d, J=8.3 Hz), 8.49-8.95 (1H, m)

308) $^{1}$H-NMR (CDCl$_3$) δ; 1.23-5.42 (20H, m), 5.78-6.09 (1H, M), 6.56 (1H, d, J=8.3 Hz), 6.61-7.82 (8H, m), 8.14 (1H, s), 8.30 (1H, d, J=8 Hz)

309) $^{1}$H-NMR (CDCl$_3$) δ; 1.20-2.70 (11H, M), 2.80-4.90 (9H, m), 6.40-7.70 (10H, m), 8.30-8.70 (1H, m)

310) $^{1}$H-NMR (CDCl$_3$) δ; 1.20-2.80 (8H, m), 2.85-5.05 (9H, m), 6.40-7.80 (10H, m), 8.10-8.50 (1H, m)

311) $^{1}$H-NMR (CDCl$_3$) δ; 1.20-2.75 (13H, m), 2.80-5.10 (9H, m), 6.40-8.00 (11H, m)

312) $^{1}$H-NMR (CDCl$_3$) δ; 1.20-2.80 (10H, m), 2.90-5.10 (9H, m), 6.40-7.80 (10H, M), 8.00-8.40 (1H, m)

EXAMPLE 1189

By using di-p-toluoyl-L-tartaric acid monohydride or di-p-toluoyl-D-tartaric acid monohydride, the compound obtained in above Example 408 is optically resolved to give the following compounds.

(+)-5-Dimethylamino-1-[4-(2-methylbenzoylamino)-benzoyl]-2,3,4,5-tetrahydro-1H-benzazepine hydrochloride White amorphous $[\alpha]_D^{25} = +234°$(methanol, c=0.2)

Purity; more than 99% ee, determined by HPLC using an optical active column

HPLC conditions;

Mobile phase; n-hexane:ethanol:diethylamine =950:50:1

Flow rate; 1.0 ml/min.

Column; CHIRALCEL OD, 25 cm×0.46 cm (manufactured by Daicel Chemical Ind. Ltd.)

Concentration of sample; 0.1% in methanol

Retention time; 34 minutes $^1$H-NMR (DMSO-$d_6$)δ; 0.85-1.20, 1.56-4.06, 4.94-5.21 (total 13H, m), 2.36 (3H, s), 6.79 (1H, d, J=7.6 Hz), 7.12-7.60 (8H, m), 7.62 (2H, d, J=8.4 Hz), 8.00 (1H, d, J=7.6 Hz), 10.43 (1H, s), 11.80 (1H, brs).

(−)-5-Dimethylamino-1-[4-(2-methylbenzoylamino)-benzoyl]-2,3,4,5-tetrahydro-1H-benzazepine hydrochloride White amorphous $[\alpha]_D^{25} = -23.1°$ (methanol, c=0.2)

Purity; more than 99% ee, determined by HPLC using an optical active column, and the conditions are the same as above except that the retention time is 40 minutes.

$^1$H-NMR (DMSO-$d_6$)δ; 0.83-1.19, 1.55-4.06, 4.94-5.20 (total 13H, m), 2.36 (3H, s), 6.80 (1H, d, J=7.8 Hz), 7.12-7.60 (8H, m), 7.63 (2H, d, J=8.5 Hz), 8.00 (1H, d, J=7.8 Hz), 10.44 (1H, s), 11.74 (1H, brs).

PHARMACOLOGICAL TEST

EXPERIMENT 1 : $V_1$ receptor binding assay

Using rat liver plasma membrane preparations prepared according to Ichihara's method [cf: Akira Ichihara, J. Bio. Chem., 258, 9283 (1983)], the plasma membrane (50000dpm, $2\times10^{-10}$ M) of [$^3$H]-Arg-vasopressin and a test compound (60 μg, $10^{-8}$–$10^{-4}$ M) are incubated at 37° C. for 10 minutes in 100 mM Tris-HCl buffer (pH: 8.0, 250 μl) containing 5 mM $MgCl_2$, 1 mM EDTA and 0.1% BSA. After incubation, the mixture is filtered three times using the glass filter (GF/F) so as to separate the membrane preparation combined with vasopressin and then washed with the buffer (5 ml). This glass filter is taken out and mixed with liquid scintillation cocktail. The amount of [$^3$H]-vasopressin combined with the membrane is measured by liquid scintillation counter and the rate of the inhibitory effect of the test compound is estimated according to the following equation.

$$\text{Rate of the inhibitory effect (\%)} = 100 - \frac{C_1 - B_1}{C_0 - B_1} \times 100$$

$C^1$: The amount of [$^3$H]-vasopressin combined with the membrane in the presence of the test compound (in prescribed amount).

$C^0$: The amount of [$^3$H]-vasopressin combined with the membrane in the absence of the test compound.

$B^1$: The amount of [$^3$H]-vasopressin combined with the membrane in the presence of the excess amount of vasopressin ($10^{-6}$ M).

The results are expressed as $IC_{50}$ values, which is the concentration of the test compound required to achieve the inhibitory effect in the rate of 50%.

The results are shown in the following Table 10.

TEST COMPOUND 1. 1-(4-Benzoylaminobenzoyl)-1,2,3,4-tetrahydroquinoline
2. 1-[4-(3-Chlorobenzoylamino)benzoyl]-1,2,3,4-tetrahydroquinoline
3. 1-[4-(3-Methoxybenzoylamino)benzoyl]-1,2,3,4-tetrahydroquinoline
4. 1-[4-(3-Cyanobenzoylamino)benzoyl]-1,2,3,4-tetrahydroquinoline
5. 1-[4-(3-Aminobenzoylamino)benzoyl]-1,2,3,4-tetrahydroquinoline
6. 1-[4-(2,3-Dimethylbenzoylamino)benzoyl]-1,2,3,4-tetrahydroquinoline
7. 1-[4-(2-Methylbenzoylamino)benzoyl]-1,2,3,4-tetrahydroquinoline
8. 1-[4-(2-Trifluoromethylbenzoylamino)benzoyl]-1,2,3,4-tetrahydroquinoline
9. 1-[4-(2-Nitrobenzoylamino)benzoyl]-1,2,3,4-tetrahydroquinoline
10. 1-[4-(3,5-Dichlorobenzoylamino)benzoyl]-1,2,3,4-tetrahydroquinoline
11. 1-[4-(3,3-Dimethylbutyrylamino)benzoyl]-1,2,3,4-tetrahydroquinoline
12. 1-[4-(2-Cyclohexylacetylamino)benzoyl]-1,2,3,4-tetrahydroquinoline
13. 1-[4-(2-Phenylacetylamino)benzoyl]-1,2,3,4-tetrahydroquinoline
14. 1-(4-Cyclohexylcarbonylaminobenzoyl)-1,2,3,4-tetrahydroquinoline
15. 1-(4-Cycloheptylcarbonylaminobenzoyl)-1,2,3,4-tetrahydroquinoline
16. 1-(4-Cyclooctylcarbonylaminobenzoyl)-1,2,3,4-tetrahydroquinoline
17. 1-(4-Tricyclo[3.3.1.1]decanylcarbonylaminobenzoyl)-1,2,3,4-tetrahydroquinoline
18. 1-[4-(α-Naphthylcarbonylamino)benzoyl]-1,2,3,4-tetrahydroquinoline
19. 1-[4-(3-Thenoyl)benzoyl]-1,2,3,4-tetrahydroquinoline
20. 1-[2-(β-Naphthylcarbonylamino)benzoyl]-1,2,3,4-tetrahydroquinoline
21. 1-[4-(4-Methoxyanilinocarbonyl)benzoyl]-1,2,3,4-tetrahydroquinoline
22. 1-[4-(2-Methylanilinocarbonyl)benzoyl]-1,2,3,4-tetrahydroquinoline
23. 1-[4-(3-Chloroanilinocarbonyl)benzoyl]-1,2,3,4-tetrahydroquinoline
24. 1-[4-(3,5-Dichloroanilinocarbonyl)benzoyl]-1,2,3,4-tetrahydroquinoline
25. 1-(4-Cyclohexylaminocarbonylbenzoyl)-1,2,3,4-tetrahydroquinoline
26. 1-(4-Cyclohexylcarbonylaminobenzoyl)-2,3,4,5-tetrahydro-1H-benzazepine
27. 1-(4-Benzoylaminobenzoyl)-2,3,4,5-tetrahydro-1H-benzazepine
28. 1-[4-(2-Methylbenzoylamino)benzoyl]-2,3,4,5-tetrahydro-1H-benzazepine
29. 1-[4-(3-Methoxybenzoylamino)benzoyl]-2,3,4,5-tetrahydro-1H-benzazepine
30. 1-[4-(3-Chlorobenzoylamino)benzoyl]-2,3,4,5-tetrahydro-1H-benzazepine
31. 1-[4-(3-Cyanobenzoylamino)benzoyl]-2,3,4,5-tetrahydro-1H-benzazepine
32. 1-[4-(3,5-Dichlorobenzoylamino)benzoyl]-2,3,4,5-tetrahydro-1H-benzazepine 33. 1-[4-(2,3-Dimethylbenzoylamino)benzoyl]-2,3,4,5-tetrahydro-1H-benzazepine
34. 1-(4-Cyclohexylcarbonylaminobenzoyl)-1,2,3,4,5,6-hexahydrobenzazocine
35. 1-(4-Benzoylaminobenzoyl)-1,2,3,4,5,6-hexahydrobenzazocine
36. 1-[4-(2-Methylbenzoylamino)benzoyl]-1,2,3,4,5,6-hexahydrobenzazocine
37. 1-[4-(3-Methoxybenzoylamino)benzoyl]-1,2,3,4,5,6-hexahydrobenzazocine
38. 1-[4-(2,3-Dimethylbenzoylamino)benzoyl]-1,2,3,4,5,6-hexahydrobenzazocine
39. 1-[4-(3,5-Dichlorobenzoylamino)benzoyl]-1,2,3,4,5,6-hexahydrobenzazocine
40. 1-(4-Cyclohexylcarbonylaminobenzoyl)-1,2,3,5-tntrahydro-4,1-benzoxazepine
41. 1-[4-(3-Methylbenzoylamino)benzoyl]-1,2,3,5-tetrahydro-4,1-benzoxazepine
42. 1-[4-(2,3-Dimethylbenzoylamino)benzoyl]-1,2,3,5-tetrahydro-4,1-benzoxazepine
43. 1-[4-(3,5-Dichlorobenzoylamino)benzoyl]-1,2,3,5-tetrahydro-4,1-benzoxazepine
44. 3-Methyl-1-(4-cyclohexylcarbonylaminobenzoyl)-1,2,3,4-tetrahydroquinoline
45. 3-Methyl-1-(4-benzoylaminobenzoyl)-1,2,3,4-tetrahydroquinoline
46. 3-Methyl-1-[4-(2-methylbenzoylamino)benzoyl]-1,2,3,4-tetrahydroquinoline
47. 3-Methyl-1-[4-(3-methoxybenzoylamino)benzoyl]-1,2,3,4 tetrahydroquinoline
48. 3-Methyl-1-[4-(2,3-dimethylbenzoylamino)-1,2,3,4-tetrahydroquinoline
49. 3-Methyl-1-[4-(3,5-dichlorobenzoylamino)-benzoyl]-1,2,3,4-tetrahydroquinoline
50. 4-Methyl-1-(4-cyclohexylcarbonylaminobenzoyl)-1,2,3,4-tetrahydroquinoxaline
51. 4-Methyl-1-[4-(2-methylbenzoylamino)benzoyl]-1,2,3,4-tetrahydroquinoxaline
52. 4-Methyl-1-[4-(2,3-dimethylbenzoylamino)-benzoyl]-1,2,3,4-tetrahydroquinoxaline
53. 4-Methyl-1-[4-(3,5-dichlorobenzoylamino)-1,2,3,4-tetrahydroquinoxaline
54. 2-Methyl-1-[4-(3,5-dichlorobenzoylamino)-benzoyl]-1,2,3,4-tetrahydroquinoline
55. 4-Methyl-1-[4-(3,5-dichlorobenzoylamino)-benzoyl]-1,2,3,4-tetrahydroquinoline
56. 1-[4-(2-Bromobenzoylamino)benzoyl]-2,3,4,5-tetrahydro-1H-benzazepine
57. 1-[4-(3-Nitrobenzoylamino)benzoyl]-2,3,4,5-tetrahydro-1H-benzazepine
58. 1-[4-(3-Trifluoromethylbenzoylamino)benzoyl]-2,3,4,5-tetrahydro-1H-benzazepine
59. 1-[4-(3-Ethoxybenzoylamino)benzoyl]-2,3,4,5-tetrahydro-1H-benzazepine
60. 1-[4-(3,5-Dimethoxybenzoylamino)benzoyl]-2,3,4,5-tetrahydro-1H-benzazepine
61. 1-[4-(2-Chloro-4-nitrobenzoylamino)benzoyl]-2,3,4,5-tetrahydro-1H-benzazepine
62. 1-[4-(2,4-Dichlorobenzoylamino)benzoyl]-2,3,4,5-tetrahydro-1H-benzazepine
63. 1-[4-(2-Chloro-6-fluorobenzoylamino)benzoyl]-2,3,4,5-tetrahydro-1H benzazepine
64. 1-[4-(2,6-Dimethylbenzoylamino)benzoyl]-2,3,4,5-tetrahydro-1H-benzazepine
65. 1-[4-(2-Chloro-4-aminobenzoylamino)benzoyl]-2,3,4,5-tetrahydro-1H-benzazepine
66. 1-[4-(2-Chloro-4-acetylaminobenzoylamino)-benzoyl]-2,3,4,5-tetrahydro-1H-benzazepine
67. 1-[4-(3-Aminobenzoylamino)benzoyl]-2,3,4,5-tetrahydro-1H-benzazepine
68. 1-{4-[2-(4-Isopropylaminobutoxy)benzoylamino]-benzoyl}-2,3,4,5-tetrahydro-1H-benzazepine hydrochloride
69. 1 -[4-(3-Hydroxybenzoylamino)benzoyl]-2,3,4,5-tetrahydro-1H-benzazepine
70. 1-{4-[2-(4-Aminobutoxy)benzoylamino]benzoyl}-2,3,4,5-tetrahydro-1H-benzazepine
71. 1-{4-[2-(2-Diethylaminoethoxy)benzoylamino]-benzoyl}-2,3,4,5-tetrahydro-1H-benzazepine hydrochloride
72. 1-{4-[2-(4-Acetylaminobutoxy)benzoylamino]-benzoyl}-2,3,4,5-tetrahydro-1H-benzazepine
73. 1-{4-[2-(6-Phthalimidohexyloxy)benzoylamino]-benzoyl}-2,3,4,5-tetrahydro-1H-benzazepine
74. 1-{4-[2-(6-Morpholinohexyloxy)benzoylamino]-benzoyl}-2,3,4,5-tetrahydro-1H-benzazepine
75. 1-{4-[2-(6-[4-Methyl-1-piperazinyl]hexyloxy)-benzoylamino]benzoyl}-2,3,4,5-tetrahydro-1H-benzazepinedihydrochloride
76. 1-(3-Methoxy-4-cyclohexylcarbonylaminobenzoyl)-2,3,4,5-tetrahydro-1H-benzazepine
77. 1-(3-methoxy-4-benzoylamino)benzoyl]-2,3,4,5-tetrahydro-1H-benzazepine
78. 1-[3-Methyl-4-(2-methylbenzoylamino)benzoy]-2,3,4,5-tetrahydro-1H-benzazepine
79. 4-Methyl-1-(4-cyclohexylcarbonylaminobenzoyl)-2,3,4,5-tetrahydro-1H-1,4-benzodiazepine hydrochloride
80. 4-Methyl-1-[4-(3,5-dichlorobenzoylamino)-benzoyl]-2,3,4,5-tetrahydro-1H-1,4-benzodiazepine hydrochloride
81. 4-Methyl-1-[4-(2,3-dimethylbenzoylamino)-benzoyl]-2,3,4,5-tetrahydro-1H-1,4-benzodiazepine hydrochloride
82. 4-Methyl-1-[4-(2-methylbenzoylamino)benzoyl]-2,3,4,5-tetrahydro-1H-1,4-benzodiazepine hydrochloride
83. 4-Methyl-1-[4-(3-methoxybenzoylamino)benzoyl]-2,3,4,5-tetrahydro-1H-1,4-benzodiazepine
84. 4-Methyl-1-[4-(3-chlorobenzoylamino)benzoyl]-2,3,4,5-tetrahydro-1H-1,4-benzodiazepine
85. 4-Methyl-1-[4-(2,3,5-trichlorobenzoylamino)benzoyl]-2,3,4,5-tetrahydro-1H-1,4-benzodiazepine
86. 4-Propyl-1-[4-(2,3-dimethylbenzoylamino)benzoyl]-2,3,4,5-tetrahydro-1H-1,4-benzodiazepine hydrochloride
87. 5-Methyl-1-(4-benzoylaminobenzoyl)-2,3,4,5-tetrahydro-1H-1,5-benzodiazepine
88. 5-Methyl-1-(4-cyclohexylcarbonylaminobenzoyl)-2,3,4,5-tetrahydro-1H-1,5-benzodiazepine
89. 5-Methyl-1-[4-(3,5-dichlorobenzoylamino)benzoyl]-2,3,4,5-tetrahydro-1H-1,5-benzodiazepine
90. 5-Methyl-1-[4-(2-methylbenzoylamino)benzoyl]-2,3,4,5-tetrahydro-1H-1,5-benzodiazepine
91. 5-Methyl-1-[4-(2,3-dimethylbenzoylamino)benzoyl]-2,3,4,5-tetrahydro-1H-1,5-benzodiazepine
92. 4-Methyl-1-[3-methoxy-4-(3,5-dichlorobenzoylamino)benzoyl]-2,3,4,5-tetrahydro-1H-1,4-benzodiazepine
93. 3-(1-Pyrrolidinyl)-1-[4-(2,3-dimethylbenzoylamino)-benzoyl]-1,2,3,4-tetrahydroquinoline
94. 6-Methyl-1-[4-(3,5-dichlorobenzoylamino)benzoyl]-1,2,3,4-tetrahydroquinoline
95. 6-Methoxy-1-[4-(3,5-dichlorobenzoylamino)benzoyl]-1,2,3,4-tetrahydroquinoline 96. 3-Hydroxymethyl-1-[4-(3,5-dichlorobenzoylamino)-benzoyl]-1,2,3,4-tetrahydroquinoline 97. 4-Methylamino-1-[4-(3,5-dichlorobenzoylamino)-benzoyl]-1,2,3,4-tetrahydroquinoline 98. 3-Amino-1-[4-(3,5-dichlorobenzoylamino)benzoyl]-1,2,3,4-tetrahydroquinoline 99. 3-Acetylamino-1-[4-(3,5-dichlorobenzoylamino)-benzoyl]-1,2,3,4-tetrahydroquinoline 100. 4-Dimethylamino-1-[4-(3,5-dichlorobenzoylbenzoyl]-1,2,3,4-tetrahydroquinoline 101. 1-[4-(2-t-Butylaminoacetylamino)benzoyl]-2,3,4,5-tetrahydroquinoline-1H-benzazepine 102. 1-{4-[2-(N-Cyclohexyl-N-ethyl)acetylamino]benzoyl}-2,3,4,5-tetrahydro-1H-benzazepine 103. 1-{4-[2-(1-Piperidinyl)acetylamino]benzoyl}-2,3,4,5-tetrahydro-1H-benzazepine 104. 1-[4-(2-Phenoxyacetylamino)benzoyl]-2,3,4,5-tetrahydro-1H-benzazepine 105. 1-[4-(2-Phthalimidoacetylamino)benzoyl]-2,3,4,5-tetrahydro-1H-benzazepine 106. 1-{4-[2-(1,1-Dimethyl-2-phenoxyethyl-)aminoacetylamino]benzoyl}-2,3,4,5-tetrahydro-1H-benzazepine 107. 1-{4-[2-(3-Methylphenoxy)acetylamino]benzoyl}-2,3,4,5-tetrahydro-1H-benzazepine 108. 1-{4-[2-(3-Methoxyanilino)acetylamino]benzoyl}-2,3,4,5-tetrahydro-1H-benzazepine 109. 1-{4-[2-(β-Naphthyloxy)acetyamino]benzoyl}-2,3,4,5-tetrahydro-1H-benzazepine 110. 1-{4-[2-(4-Methylanilino)acetylamino]benzoyl}-2,3,4,5-tetrahydro-1H-benzazepine 111. 1-{4-[2-(3-Methoxyphenoxy)acetylamino]benzoyl}-2,3,4,5-tetrahydro-1H-benzazepine 112. 1-[4-(4-Pyridylcarbonylaminobenzoyl]-2,3,4,5-tetrahydro-1H-benzazepine 113. 1-{4-[2-(2,4-Dimethylanilino)acetylamino]benzoyl]-2,3,4,5-tetrahydro-1H-benzazepine 114. 1-(4-[2-(N-Ethylanilino)acetylamino]benzoyl}]-2,3,4,5-tetrahydro-1H-benzazepine 115. 1-{4-[2-(N-Allylanilino)acetylamino]benzoyl}]-2,3,4,5-tetrahydro-1H-benzazepine 116. 1-(4-[2-(2-Chloroanilino)acetylamino]benzoyl}]-2,3,4,5-tetrahydro-1H-benzazepine 117. 1-{4-[2-(4-Acetyloxybutoxy)benzoylamino]benzoyl}-2,3,4,5-tetrahydro-1H-benzazepine 118. 1-[4-(2-Carboxymethoxybenzoylamino)benzoyl]-2,3,4,5-tetrahydro-1H-benzazepine 119. 1-[4-(2-Carbamoylmethoxybenzoylamino)benzoyl]-2,3,4,5-tetrahydro-1H-benzazepine 120. 1-{4-[2-(4-Hydroxybutoxy)benzoylamino]-benzoyl}-2,3,4,5-tetrahydro-1H-benzazepine 121 1-[4-(2-Ethoxycarbonylmethoxybenzoylamino)benzoyl]-2,3,4,5-tetrahydro-1H-benzazepine 122. 6-Fluoro-1-[4-(3,5-dichlorobenzoylamino)benzoyl]-1,2,3,4-tetrahydroquinoline 123. 6-Fluoro-1-{4[di-(3,5-dichlorobenzoyl)amino]-benzoyl}-1,2,3,4-tetrahydroquinoline 124. 1-[4-(2-Diethylaminocarbonylmethoxybenzoylamino)benzoyl]-2,3,4,5-tetrahydro-1H-benzazepine 125. 1-{4-[2-(2-[(N-(2-hydroxyethyl)-N-methylamino]ethoxy)benzoylamino]benzoyl}-2,3,4,5-tetrahydro-1H-benzoazepine hydrochloride 126. 1-[4-(2-Methylanilinocarbonylamino)benzoyl]-2,3,4,5-tetrahydro-1H-benzazepine 127. 1-[4-(2-Chlorophenylsulfonylamino)benzoyl]-2,3,4,5-tetrahydro-1H-benzazepine 128. 1-{4-[2-(4-Aminomethylanilino)acetylamino]benzoyl}-2,3,4,5-tetrahydro-1H-benzazepine 129. 1-{4-[2-(N-Phenyl-N-(3-acetylaminopropyl-)amino)acetylamino]benzoyl}-2,3,4,5-tetrahydro-1H-benzazepine 130. 1-{4-[2-(N-Phenyl-N-propargylamino)acetylamino]benzoyl}-2,3,4,5-tetrahydro-1H-benzazepine 131. 4-(N-Methyl-N-ethylamino)-1-[4-(3,5-dichlorobenzoylamino)benzoyl]-1,2,3,4-tetrahydroquinoline 132. 5-Dimethylamino-1-[4-(2,4-dichlorobenzoylamino)benzoyl]-2,3,4,5-tetrahydro-1H-benzazepine 133. 4-Dimethylamino-1-[3-methoxy-4-(2-methylbenzoylamino)benzoyl]-1,2,3,4-tetrahydroquinoline 134. 5-Dimethylamino-1-[3-methoxy-4-(2-chlorobenzoylamino)benzoyl]-2,3,4,5-tetrahydro-1H-benzazepine 135. 1-[4-(2,3-Dimethylbenzoylamino)benzoyl]-4-ethyl-2,3,4,5-tetrahydro-1H-1,4-benzodiazepine 136. 1-[4-(3,5-Dichlorobenzoylamino)benzoyl]-4-isopropyl-2,3,4,5-tetrahydro-1H-1,4-benzodiazepine 137. 1-[4-(2-Methylbenzoylamino)benzoyl]-5-methyl-1,2,3,4,5,6-hexahydro-1,5-benzodiazocine 138. 1-[4-(2-Methylbenzoylamino)benzoyl]-1,2,3,4-tetrahydro-5,1-benzoxazepine 139. 5-Oxo-1-[4-(3,5-dichlorobenzoylamino)benzoyl]-2,3,4,5-tetrahydro-1H-benzazepine 140. 4-Methyl-1-[2-chloro-4-(3,5-dichlorobenzoylamino)benzoyl]-2,3,4,5-tetrahydro-1H-1,4-benzodiazepine 141. 5-Methylamino-1-[4-(3,5-dichlorobenzoylamino)-benzoyl]-2,3,4,5-tetrahydro-1H-benzazepine 142. 5-(N-Acetyl-N-methylamino)-1-[4-(3,5-dichlorobenzoylamino)benzoyl]-2,3,4,5-tetrahydro-1H-benzazepine 143.5-Hydroxy-1-[4-(2-methylbenzoylamino)benzoyl]-2,3,4,5-tetrahydro-1H-benzazepine 144. 4-Dimethylamino-1-[3-methoxy-4-(2,3-dimethylbenzoylamino)benzoyl]-1,2,3,4-tetrahydroquinoline 145. 4-Dimethylaminomethyl-1-[4-(2-methylbenzoylamino)benzoyl]-1,2,3,4-tetrahydroquinoline 146. 4-Dimethylaminomethyl-1-[4-(3,5-dichlorobenzoylamino)benzoyl]-1,2,3,4-tetrahydroquinoline 147. 5-Methoxy-1-[4-(2-methylbenzoylamino)benzoyl]-2,3,4,5-tetrahydro-1H-benzazepine 148. 4-Methyl-1-[3-methyl-4-(2,4-dichlorobenzoylamino)benzoyl]-2,3,4,5-tetrahydro-1H-1,4-benzodiazepine 149 5-Methoxy-1-[4-(2,4-dichlorobenzoylamino)benzoyl]-2,3,4,5-tetrahydro-1H-benzazepine 150. 4-Dimethylamino-1-[4-(2-chlorobenzoylamino)-benzoyl] -2,3,4,5-tetrahydro-1H-benzazepine 151. 4-Acetyloxy-1-[4-(2-methylbenzoylamino)benzoyl]-1,2,3,4-tetrahydroquinoline 152. 5-Hydroxyimino-1-[4-(3,5-dichlorobenzoylamino)-benzoyl]-2,3,4,5-tetrahydro-1H-benzazepine 153. 5-Acetyloxy-1-[4-(2-chlorobenzoylamino)benzoyl]-2,3,4,5-tetrahydro-1H-benzazepine 154. 5-Ethoxycarbonylmethoxy-1-[4-(2,4-dichlorobenzoylamino)benzoyl]-2,3,4,5-tetrahydro-1H-benzazepine 155. 4-Allylamino-1-[4-(3,5-dichlorobenzoylamino)benzoyl]-2,3,4,5-tetrahydro-1H-benzazepine 156. 5-Dimethylamino-1-[3-methoxy-4-(2,3,5-trichlorobenzoylamino)benzoyl]-2,3,4,5-tetrahydro-1H-benzazepine 157. 4-[4-(2-Methylbenzoylamino)benzoyl]-3,4-dihydro-2H-1,4-benzothiazine 158. 5-Dimethylamino-1-[2-chloro-4-(2-methylbenzoylamino)benzoyl]-2,3,4,5-tetrahydro-1H-benzazepine 159. 5-Dimethylamino-1-[4-(2-methylanilinocarbonyl)-benzoyl]-2,3,4,5-tetrahydro-1H-benzazepine 160. 5-Ethoxycarbonylmethoxy-1-[4-(2-methylbenzoylamino)benzoyl]-2,3,4,5-tetrahydro-1H-benzazepine 161. 5-(4-dimethylaminobutoxy)-1-[4-(2-methylbenzoylamino)benzoyl]-2,3,4,5-tetrahydro-1H-benzazepine 162. 5-Carboxymethoxy-1-[4-(2-chlorobenzoylamino)-benzoyl]-2,3,4,5-tetrahydro-1H-benzazepine 163. 5-Dimethylaminocarbonylmethoxy-1-[4-(2-methylbenzoylamino)benzoyl]-2,3,4,5-tetrahydro-1H-benzazepine 164. 5-Carbamoylmethoxy-1-[4-(2-chlorobenzoylamino)benzoyl]-2,3,4,5-tetrahydro-1H-benzazepine 165. 5-Dimethylamino-1-[3-ethoxy-4-(2-methylbenzoylamino)benzoyl]-2,3,4,5-tetrahydro-1H-benzazepine 166. 5-[4-(2-Methylbenzoylamino)benzoyl]-2,3,4,5-tetrahydro-1,5-benzothiazepine 167. 5-Amino-1-[4-(2-methylbenzoylamino)benzoyl]-2,3,4,5-tetrahydro-1H-benzazepine 168. 5-Dimethylamino-1-[3-hydroxy-4-[2-methylbenzoylamino)benzoyl]-2,3,4,5-tetrahydro-1H-benzazepine 169. 5 n-Propylamino-1-[4-(2,4-dichlorobenzoylamino)-benzoyl]-2,3,4,5-tetrahydro-1H-benzazepine 170. 5-Dimethylamino-1-[3-benzyloxy-4-(2-methylbenzoylamino)benzoyl]-2,3,4,5-tetrahydro-1H-benzazepine 171. 5-[4-(2-Methylbenzoylamino)benzoyl]-2,3,4,5-tetrahydro-1,5-benzothiazepin-1-oxide 172. 5-[3-(Phthalimid-1-yl)-propoxy]-1-[4-(2-methylbenzoylamino)benzoyl]-2,3,4,5-tetrahydro-1H-benzazepine 173. 5 (3-Aminopropoxy)-1-[4-(2-methylbenzoylamino)benzoyl]-2,3,4,5-tetrahydro-1H-benzazepine 174. 5-(3-Acetylaminopropoxy)-1-[4-(2-methylbenzoylamino)benzoyl]-2,3,4,5-tetrahydro-1H-benzazepine 175. 5-Dimethylamino-1-[2-chloro-4-(2-t-butylbenzoylamino)benzoyl]-2,3,4,5-tetrahydro-1H-benzazepine 176. 5-Methylamino-1-[2-chloro-4-(2-chlorobenzoylamino)benzoyl]-2,3,4,5-tetrahydro-1H-benzazepine 177. 5-Dimethylamino-1-[2-methoxy-4-(2-chlorobenzoylamino)benzoyl]-2,3,4,5-tetrahydro-1H-benzazepine 178. 5-Hydroxy-1-[4-(3,5-dichlorobenzoylamino)benzoyl]-2,3,4,5-tetrahydro-1H-benzazepine 179. 5-Dimethylamino-1-[4-(2-methylbenzoylamino)-benzoyl]-2,3,4,5-tetrahydro-1H-benzazepine 180. 5-Dimethylamino-1-[4-(2-chlorobenzoylamino)-benzoyl]-2,3,4,5-tetrahydro-1H-benzazepine 181. 5-Methylamino-1-[4-(2-chlorobenzoylamino)benzoyl]-2,3,4,5-tetrahydro-1H-benzazepine 182. 5-Methylamino-1-[2-chloro-4-(2-methylbenzoylamino)benzoyl]-2,3,4,5-tetrahydro-1H-benzazepine 183. 5-Dimethylamino-1-[2-methoxy-4-(2-methylbenzoylamino)benzoyl]-2,3,4,5-tetrahydro-1H-benzazepine 184. 5-Dimethylamino-1-[2-chloro-4-(2-chlorobenzoylamino)benzoyl]-2,3,4,5-tetrahydro-1H-benzazepine 185.5-Methylamino-1-[2-chloro-4-(2-methylbenzoylamino)benzoyl]-2,3,4,5-tetrahydro-1H-benzazepine 186. 5-Cyclopropylamino-1-[2-chloro-4-(2,4-dichlorobenzoylamino)benzoyl]-2,3,4,5-tetrahydro-1H-benzazepine 187. 5-Dimethylaminocarbonyloxy-1-[4-(2-methylbenzoylamino)benzoyl] -2,3,4,5-tetrahydro-1H-benzazepine 188. 5-Dimethylamino-1-[4-(2-trifluoromethylbenzoylamino)benzoyl]-2,3,4,5-tetrahydro-1H-benzazepine 189. 5-Dimethylamino-1-[3-(2-chlorobenzoyloxy)-4-(2-chlorobenzoylamino)benzoyl]-2,3,4,5-tetrahydro-1H-benzazepine 190. 5-(N-Methyl-N-Allylamino)-1-[2-chloro-4-(2-methylbenzoylamino)benzoyl]-2,3,4,5-tetrahydro-1H-benzazepine 191. 5-Carbamoyloxy-1-[4-(2-methylbenzoylamino)benzoyl]-2,3,4,5-tetrahydro-1H-benzazepine 192. 1-[4-(2-Methylbenzoylamino)benzoyl]-1,2,3,5-tetrahydro-4,1-benzothiazepine 193. 4-Oxo-1-[4-(2-methylbenzoylamino)benzoyl]-2,3,4,5-tetrahydro-1H-benzazepine 194. 1-[4-(2-Methylbenzoylamino)benzoyl]-1,2,3,5-tetrahydro-4,1-benzothiazepine-1,1-dioxide 195. 5-Methylaminocarbonylmethoxy-1-[4-(2-chlorobenzoylamino)benzoyl]-2,3,4,5-tetrahydro-1H-benzazepine 196. 5-Methylaminocarbonyloxy-1-[4-(2-methylbenzoylamino)benzoyl]-2,3,4,5-tetrahyro-1H-benzazepine 197. 5-Dimethylamino-1-[2-dimethylamino-4-(2-methylbenzoylamino)benzoyl]-2,3,4,5-tetrahydro-1H-benzazepine 198. 5-Methylamino-1-[2-chloro-4-(2-trifluoromethylbenzoylamino)benzoyl]-2,3,4,5-tetrahydro-1H-benzazepine 199. 5-Cycloropropylamino-1-[2-chloro-4-(2-methylbenzoylamino)benzoyl]-2,3,4,5-tetrahydro-1H-benzazepine 200. 5-Cyclopropylamino-1-[2-chloro-4-(2-chlorobenzoylamino)benzoyl]-2,3,4,5-tetrahydro-1H-benzazepine 201. 5-Allylamino-1-[2-chloro-4-(2-methylbenzoylamino)benzoyl]-2,3,4,5-tetrahydro-1H-benzazepine 202. 5-(1-Piperidinyl)-1-[4-(2-chlorobenzoylamino)benzoyl]-2,3,4,5-tetrahydro-1H-benzazepine 203.5-(4-Benzyl-1-piperazinyl)-1-[4-(2-chlorobenzoylamino)benzoyl]-2,3,4,5-tetrahydro-1H-benzazepine 204. 5-(1-Pyrrolidinyl)-1-[4-(2-chlorobenzoylamino)-benzoyl]-2,3,4,5-tetrahydro-1H-benzazepine 205. 5-(4-Acetyl-1-piperazinyl)-1-[4-(2-chlorobenzoylamino)benzoyl]-2,3,4,5-tetrahydro-1H-benzazepine 206. 5-(4-Methyl-1-piperazinyl)-1-[4-(2-chlorobenzoylamino)benzoyl]-2,3,4,5-tetrahydro-1H-benzazepine 207. 1-[4-(2-Chlorobenzoylamino)benzoyl]-2,3-dihydro-1H-benzazepine 208. 5-Methyl-1-[4-(2-methylbenzoylamino)benzoyl]-2,3,4,5-tetrahydro-1H-benzazepine
209. 5-Methylidene-1-[4-(2-methylbenzoylamino)benzoyl]-2,3,4,5-tetrahydro-1H-benzazepine
210. 5-Hydroxy-1-[2-chloro-4-(2-methylbenzoylamino)-benzoyl]-2,3,4,5-tetrahydro-1H-benzazepine
211. 5-(1-Morpholino)-1-[4-(2-chlorobenzoylamino)-benzoyl]-2,3,4,5-tetrahydro-1H-benzazepine
212. 5-Dimethylamino-1-[4-(2-fluorobenzoylamino)benzoyl]-2,3,4,5-tetrahydro-1H-benzazepine
213. 5-Dimethylamino-1-[4-(2,4-difluorobenzoylamino)benzoyl]-2,3,4,5-tetrahydro-1H-benzazepine
214. 4-Hydroxy-1-[4-(2-methylbenzoylamino)benzoyl]-2,3,4,5-tetrahydro-1H-benzazepine
215. 5-Hydroxymethyl-1-[4-(2-methylbenzoylamino)-benzoyl]-2,3,4,5-tetrahydro-1H-benzazepine
216. 5-Dimethylamino-4-hydroxy-1-[4-(2-chlorobenzoylamino)benzoyl]-2,3,4,5-tetrahydro-1H-benzazepine
217. 1-[4-(2-Methylbenzoylamino)benzoyl]-1,2-dihydroquinoline
218. 5-Dimethylamino-1-[2-methyl-4-(2-methylbenzoylamino)benzoyl]-2,3,4,5-tetrahydro-1H-benzazepine (the compound of Example 979)
219. 5-Dimethylamino-1-[2-methyl-4-(2-chlorobenzoylamino)benzoyl]-2,3,4,5-tetrahydro-1H-benzazepine
220. 5-Dimethylamino-1-[2-methyl-4-(2,4-dichlorobenzoylamino)benzoyl]-2,3,4,5-tetrahydro-1H-benzazepine
221. 5-Methylamino-1-{2-chloro-4-[2-(N-ethylanilino)acetylamino]benzoyl}-2,3,4,5-tetrahydro-1H-benzazepine
222. 5-Hydroxy-1-{2-chloro-4-[2-(N-ethylanilino)acetylamino]benzoyl}-2,3,4,5-tetrahydro-1H-benzazepine
223. 5-Dimethylamino-1-[2-fluoro-4-(2-chlorobenzoylamino)benzoyl] -2,3,4,5-tetrahydro-1H-benzazepine
224. 5-Methylamino-4-hydroxy-1-[2-chloro-4-(2-chlorobenzoylamino)benzoyl]-2,3,4,5-tetrahydro-1H-benzazepine . hydrochloride
225. 5-Hydroxymethyl-5-hydroxy-1-[2-chloro-4-(2-methylbenzoylamino)benzoyl]-2,3,4,5-tetrahydro-1H-benzazepine
226. 5-Dimethylamino-1-[2-fluoro-4-(2-methylbenzoylamino)benzoyl]-2,3,4,5-tetrahydro-1H-benzazepine
227. 5-Dimethylamino-1-[3-methyl-4-(2,4-dichlorobenzoylamino)benzoyl]-2,3,4,5-tetrahydro-1H-benzazepine
228. 5-(N-Methyl-N-ethylamino)-1-[4-(2-methylbenzoylamino)benzoyl]-2,3,4,5-tetrahydro-1H-benzazepine
229. 5-Ethylamino-1-[4-(2-methylbenzoylamino)benzoyl]-2,3,4,5-tetrahydro-1H-benzazepine
230. 5-Dimethylamino-1-[4-(3,5-difluorobenzoylamino)benzoyl]-2,3,4,5-tetrahydro-1H-benzazepine
231. 5-Acetyloxymethyl-1-[4-(2-methylbenzoylamino)-benzoyl]-2,3,4,5-tetrahydro-1H-benzazepine
232. 5-Dimethylamino-1-[3-fluoro-4-(2-methylbenzoylamino)benzoyl]-2,3,4,5-tetrahydro-1H-benzazepine
233. 4,4-Dimethoxy-1-[4-(2-methylbenzoylamino)benzoyl]-2,3,4,5-tetrahydro-1H-benzazepine
234. 5-Acetyloxyimino-1-[4-(2-chlorobenzoylamino)-benzoyl]-2,3,4,5-tetrahydro-1H-benzazepine
235. 5-Methylsulfonyloxymethyl-1-[4-(2-methylbenzoylamino)benzoyl] -2,3,4,5-tetrahydro-1H-benzazepine
236. 5,5-Epoxy-1-[4-(2-methylbenzoylamino)benzoyl]-2,3,4,5-tetrahydro-1H-benzazepine
237. 5-Hydroxymethyl-5-hydroxy-1-[4-(2-methylbenzoylamino)benzoyl]-2,3,4,5-tetrahydro-1H-benzazepine
238. 5-Hydroxy-1-[2-methoxy-4-(2-methylbenzoylamino)benzoyl]-2,3,4,5-tetrahydro-1H-benzazepine
239. 5-Dimethylamino-1-[4-(2-carbamoylmethoxybenzoylamino)benzoyl]-2,3,4,5-tetrahydro-1H-benzazepine
240. 5-Hydroxy-6-methyl-1-[2-chloro-4-(2-methylbenzoylamino)benzoyl]-2,3,4,5-tetrahydro-1H-benzazepine
241. 5-(2-Dimethylaminoethyl)amino-1-[2-chloro-4-(2-methylbenzoylamino)benzoyl]-2,3,4,5-tetrahydro-1H-benzazepine
242. 5-Hydroxymethyl-5-methylamino-1-[4-(2-methylbenzoylamino)benzoyl]-2,3,4,5-tetrahydro-1H-benzazepine
243. 5-Methylaminomethyl-5-hydroxy-1-[4-(2-methylbenzoylamino)benzoyl]-2,3,4,5-tetrahydro-1H-benzazepine
244. 5-Aminomethyl-1-[4-(2-methylbenzoylamino)benzoyl]-2,3,4,5-tetrahydro-1H-benzazepine
245. 5-[N-Methyl-N-(3-methoxy-2-hydroxypropyl)amino]-1-[4-(2-methylbenzoylamino)benzoyl]-2,3,4,5-tetrahydro-1H-benzazepine
246. 5-[N-Methyl-N-(3-diethylamino-2-hydroxypropyl)amino]-1-[4-(2-methylbenzoylamino)benzoyl]-2,3,4,5-tetrahydro-1H-benzazepine
247. 5-Dimethylamino-1-[3-methoxy-4-(2-methylbenzoylamino)benzoyl]-2,3,4,5-tetrahydro-1H-benzazepine
248. 5-Dimethylamino-1-[3-methoxy-4-(2,4-dichlorobenzoylamino)benzoyl]-2,3,4,5-tetrahydro-1H-benzazepine
249. 5-Dimethylamino-1-[4-(2-methylbenzoylamino)-benzoyl]-2,3,4,5-tetrahydro-1H-benzazepine.hydrochloride
250. 5-Azidomethyl-1-[4-(2-methylbenzoylamino)benzoyl]-2,3,4,5-tetrahydro-1H-benzazepine
251. 7-[4-(2-Chlorobenzoylamino)benzoyl]-1-methyl-1,2,3,4a,5,6,7,11b-octahydro-3-oxo[1]benzazepino[4,5-b-]-[1,4]oxazine
252. 5-Benzylamino-1-[4-(2-chlorobenzoylamino)benzoyl]-2,3,4,5-tetrahydro-1H-benzazepine
253. 5-Amino-1-[4-(2-chlorobenzoylamino)benzoyl]-2,3,4,5-tetrahydro-1H-benzazepine
254. 5-Dimethylamino-4-methyl-1-[4-(2-methylbenzoylamino)benzoyl]-2,3,4,5-tetrahydro-1H-benzazepine
255. 5-Acetylaminomethyl-1-[4-(2-methylbenzoylamino)benoyl]-2,3,4,5-tetrahydro-1H-benzazepine
256. 5-Hydroxy-4-methyl-1-[4-(2-methylbenzoylamino)benzoyl]-2,3,4,5-tetrahydro-1H-benzazepine
257. 5-[2-(2-Pyridyl)ethylamino]-1-[4-(2-chlorobenzoylamino)benzoyl]-2,3,4,5-tetrahydro-1H-benzazepine 258. 5-(N-Methyl-N-methanesulfonylamino)-1-[4-(2-methylbenzoylamino)benzoyl]-2,3,4,5-tetrahydro-1H-benzazepine 259. 5-(N-Methyl-N-benozylamino)-1-[4-(2-methylbenzoylamino)benzoyl]-2,3,4,5-tetrahydro-1H-benzazepine 260. 5-Ethoxycarbonylamino-1-[4-(2-methylbenzoylamino)benzoyl]-2,3,4,5-tetrahydro-1H-benzazepine 261. 5-Methyl-5-hydroxy-1-[4-(2-methylbenzoylamino)-benzoyl]-2,3,4,5-tetrahydro-1H-benzazepine 262. 5-(N-Methyl-N-ethoxycarbonylmethylamino)-1-[4-(2-methylbenzoylamino)benzoyl]-2,3,4,5-tetrahydro-1H-benzazepine 263. 5-Cyclopentylamino-1-[2-chloro-4-(2-methylbenzoylamino)benzoyl]-2,3,4,5-tetrahydro-1H-benzazepine 264. 5-[N-Methyl-N-(2,3-dihydroxypropyl)amino]-1-[4-(2-methylbenzoylamino)benzoyl]-2,3,4,5-tetrahydro-1H-benzazepine 265. 5-(N-Methyl-N-cyanomethylamino)-1-[4-(2-methylbenzoylamino)benzoyl]-2,3,4,5-tetrahydro-1H-benzazepine 266. 5-(N-Methyl-N-carbamoylmethylamino)-1-[4-(2-methylbenzoylamino)benzoyl]-2,3,4,5-tetrahydro-1H-benzazepine 267. 5-{N-Methyl-N-[3-(3,4,5,6-tetrahydro-2H-pyran-2-yloxy)propyl]amino}-1-[4-(2-methylbenzoylamino)-benzoyl]-2,3,4,5-tetrahydro-1H-benzazepine 268. 5-Dimethylaminomethyl-1-[4-(2-methylbenzoylamino)benzoyl]-2,3,4,5-tetrahydro-1H-benzazepine 269. 5-Formylaminomethyl-1-[4-(2-methylbenzoylamino)benzoyl]-2,3,4,5-tetrahydro-1H-benzazepine 270. 5-[N-Methyl-N-(3-acetyloxypropyl)amino]-1-[4-(2-methylbenzoylamino)benzoyl]-2,3,4,5-tetrahydro-1H-benzazepine 271. 5-[N-Methyl-N-(3-hydroxypropyl)amino]-1-[4-(2-methylbenzoylamino)benzoyl]-2,3,4,5-tetrahydro-1H-benzazepine 272. Potassium {1-[2-chloro-4-(2-methylbenzoylamino)-benzoyl]-2,3,4,5-tetrahydro-1H-benzazepin-5-yl}imino-o-sulfonate 273. 5-Dimethylamino-1-(4-benzoylaminobenzoyl)-2,3,4,5-tetrahydro-1H-benzazepine 274. 5-(1-Benzyl-4-piperidinyl)amino-1-[4-(2-methylbenzoylamino)benzoyl]-2,3,4,5-tetrahydro-1H-benzazepine 275. 5-(2-Dimethylaminoacetyloxy)-1-[4-(2-methylbenzoylamino)benzoyl]-2,3,4,5-tetrahydro-1H-benzazepine 276. 5-Dimethylamino-1-[4-(3-methoxybenzoylamino)-benzoyl]-2,3,4,5-tetrahydro-1H-benzazepine 277. 5-[(4-Methyl-1-piperazinyl)carbonylmethoxy]-1-[4-(2-methylbenzoylamino)benzoyl]-2,3,4,5-tetrahydro-1H-benzazepine 278. 5-Morpholinocarbonylmethoxy-1-[4-(2-methylbenzoylamino)benzoyl]-2,3,4,5-tetrahydro-1H-benzazepine 279. 5-Thiomorpholinocarbonylmethoxy-1-[4-(2-methylbenzoylamino)benzoyl]-2,3,4,5-tetrahydro-1H-benzazepine 280. 5-Anilinocarbonylamino-1-[4-(2-methylbenzoylamino)benzoyl]-2,3,4,5-tetrahydro-1H-benzazepine 281. 5-(1-Oxothiomorpholino)carbonylmethoxy-1-[4-(2-methylbenzoylamino)benzoyl]-2,3,4,5-tetrahydro-1H-benzazepine 282. 5-Hydrazino-1-[4-(2-methylbenzoylamino)benzoyl]-2,3,4,5-tetrahydro-1H-benzazepine 283. 5-Methylaminocarbonylamino-1-[4-(2-methylbenzoylamino)benzoyl]-2,3,4,5-tetrahydro-1H-benzazepine 284. 5-[(2-α-Carbamoyl-1-pyrrolidinyl)carbonylmethoxy]-1-[4-(2-methylbenzoylamino)benzoyl]-2,3,4,5-tetrahydro-1H-benzazepine 285. 5-(Carbamoylmethylaminocarbonylmethoxy)-1-[4-(2-methylbenzoylamino)benzoyl]-2,3,4,5-tetrahydro-1H-benzazepine 286. 5-(1,1-Dioxothiomorpholino)carbonylmethoxy-1-[4-(2-methylbenzoylamino)benzoyl]-2,3,4,5-tetrahydro-1H-benzazepine 287. 7-Chloro-5-methylamino-1-[4-(2-methylbenzoylamino)benzoyl]-2,3,4,5-tetrahydro-1H-benzazepine 288. 5-[(4-Acetyl-1-piperazinyl)carbonylmethoxy]-1-[4-(2-methylbenzoylamino)benzoyl]-2,3,4,5-tetrahydro-1H-benzazepine 289. 5-Dimethylamino-1-[4-(3-nitrobenzoylamino)benzoyl]-2,3,4,5-tetrahydro-1H-benzazepine 290. 5-[(4-Pyridyl)methylaminocarbonylmethoxy]-1-[4-(2-methylbenzoylamino)benzoyl]-2,3,4,5-tetrahydro-1H-benzazepine 291. 5-[2-(Methylamino)acetylamino]-1-[4-(2-methylbenzoylamino)benzoyl]-2,3,4,5-tetrahydro-1H-benzazepine 292. 5-Dimethylamino-1-[4-(3-aminobenzoylamino)benzoyl]-2,3,4,5-tetrahydro-1H-benzazepine 293. 5-{[N-Methyl-N-(2-hydroxyethyl)amino]carbonylmethoxy}-1-[4-(2-methylbenzoylamino)benzoyl]-2,3,4,5-tetrahydro-1H-benzazepine 294. 5-Dimethylamino-1-[3-(2-diethylaminoethoxy)-4-(2-methylbenzoylamino)benzoyl]-2,3,4,5-tetrahydro-1H-benzazepine 295. 5-[N-Methyl-N-(dimethylaminocarbonylmethyl-)amino]-1-[4-(2-methylbenzoylamino)benzoyl]-2,3,4,5-tetrahydro-1H-benzazepine 296. Potassium 2-[N-methyl-N-{1-[4-(2-methylbenzoylamino)benzoyl]-2,3,4,5-tetrahydro-1H-benzazepin-5-yl}amine]acetate 297. 5-{N-Methyl-N-[2-(1-imidazolyl)acetyl]amino}-1-[4-(2-methylbenzoylamino)benzoyl]-2,3,4,5-tetrahydro-1H-benzazepine 298. 5-Dimethylamino-1-[4-(2-dimethylaminobenzoylamino)benzoyl]-2,3,4,5-tetrahydro-1H-benzazepine 299. 5-[(2-Aminoacetyl)amino]-1-[4-(2-methylbenzoylamino)benzoyl] -2,3,4,5-tetrahydro-1H-benzazepine 300. 5-Dimethylamino-1-[4-(3-acetylaminobenzoylamino)benzoyl]-2,3,4,5-tetrahydro-1H-benzazepine 301. 5-(2-t-Butoxycarbonylaminoacetylamino)-1-[4-(2-methylbenzoylamino)benzoyl]-2,3,4,5-tetrahydro-1H-benzazepine 302. 5-Methylamino-7-chloro-1-[4-(2-chlorobenzoylamino)benzoyl]-2,3,4,5-tetrahydro-1H-benzazepine 303. 5-Dimethylamino-7-chloro-1-[4-(2-methylbenzoylamino)benzoyl]-2,3,4,5-tetrahydro-1H-benzazepine 304. 5-Dimethylamino-7-chloro-1-[4-(2-chlorobenzoylamino)benzoyl]-2,3,4,5-tetrahydro-1H-benzazepine 305. 5-Dimethylamino-1-[4-(phenylacetylamino)benzoyl]-2,3,4,5-tetrahydro-1H-benzazepine 306. 5-Dimethylamino-1-[4-(3-phenylpropionylamino)-benzoyl]-2,3,4,5-tetrahydro-1H-benzazepine 307. 5-Methylamino-7-chloro-1-{4-[(N-ethylanilino)acetylamino]benzoyl}-2,3,4,5-tetrahydro-1H-benzazepine 308. 5-Dimethylamino-7-chloro-1-{4-[(N-ethylanilino)acetylamino]benzoyl}-2,3,4,5-tetrahydro-1H-benzazepine 309. 5-Dimethylamino-1-[4-(2-bromobenzoylamino)-benzoyl]-2,3,4,5-tetrahydro-1H-benzazepine 310. 5-Cyclopropylamino-7-chloro-1-[4-(2-methylbenzoylamino)benzoyl]-2,3,4,5-tetrahydro-1H-benzazepine 311. 5-Cyclopropylamino-7-chloro-1-[4-(2-chlorobenzoylamino)benzoyl]-2,3,4,5-tetrahydro-1H-benzazepine 312. 5-hydroxy-1-{4-[2-(4-isopropylaminobutoxy)benzoylamino]benzoyl}-2,3,4,5-tetrahydro-1H-benzazepine 313. 5-Dimethylaminocarbonylmethoxy-1-{4-[(N-ethylanilino)acetylamino]benzoyl}-2,3,4,5-tetrahydro-1H-benzazepine 314. 5-(N-Methyl-N-ethylamino)-1-[2-chloro-4-(2-chlorobenzoylamino)benzoyl]-2,3,4,5-tetrahydro-1H-benzazepine 315. 5-Dimethylamino-1-{4-[(2-chloroanilino)acetylamino]benzoyl}-2,3,4,5-tetrahydro-1H-benzazepine 316. 5-Dimethylamino-1-{4-[(2-methylanilino)acetylamino]benzoyl}-2,3,4,5-tetrahydro-1H-benzazepine 317. 5-Dimethylamino-1-{4-[(N-methyl-2-methylanilino)acetylamino]benzoyl}-2,3,4,5-tetrahydro-1H-benzazepine 318. 5-Methylamino-9-chloro-1-[4-(2-methylbenzoylamino)benzoyl]-2,3,4,5-tetrahydro-1H-benzazepine 319. 5-Dimethylamino-1-[4-(phenoxyacetylamino)benzoyl]-2,3,4,5-tetrahydro-1H-benzazepine 320. 6-Methylamino-1-[4-(2-methylbenzoylamino)benzoyl]-1,2,3,4,5,6-hexahydrobenzazocine 321. 5-Methylamino-7-chloro-1-[3-methoxy-4-(2-chlorobenzoylamino)benzoyl]-2,3,4,5-tetrahydro-1H-benzazepine 322. 5-Cyclopropylamino-7-chloro-1-[3-methoxy-4-(2-chlorobenzoylamino)benzoyl] -2,3,4,5-tetrahydro-1H-benzazepine 323. 5-Methylamino-7-chloro-1-[3-methoxy-4-(2-methylbenzoylamino)benzoyl]-2,3,4,5-tetrahydro-1H-benzazepine

TABLE 10

| Test Comp. No. | $IC_{50}$ (μM) |
|---|---|
| 26 | 0.071 |
| 27 | 0.095 |
| 28 | 0.056 |
| 29 | 0.15 |
| 30 | 0.15 |
| 32 | 0.30 |
| 33 | 0.092 |
| 36 | 0.41 |
| 46 | 0.40 |
| 56 | 0.025 |
| 57 | 0.46 |
| 58 | 0.40 |
| 59 | 0.31 |
| 60 | 0.18 |
| 62 | 0.098 |
| 63 | 0.14 |
| 64 | 0.069 |
| 67 | 0.34 |
| 68 | 0.013 |
| 69 | 0.066 |
| 70 | 0.041 |
| 71 | 0.18 |
| 72 | 0.12 |
| 74 | 0.10 |
| 75 | 0.069 |
| 76 | 0.042 |
| 77 | 0.085 |
| 78 | 0.10 |
| 88 | 0.34 |
| 90 | 0.38 |
| 114 | 0.011 |
| 115 | 0.012 |
| 116 | 0.04 |
| 117 | 0.22 |
| 119 | 0.049 |
| 120 | 0.29 |
| 121 | 0.45 |
| 124 | 0.15 |
| 125 | 0.091 |
| 130 | 0.023 |
| 143 | 0.15 |
| 147 | 0.28 |
| 161 | 0.14 |
| 163 | 0.22 |
| 164 | 0.15 |
| 172 | 0.26 |
| 173 | 0.15 |
| 174 | 0.14 |
| 187 | 0.45 |
| 188 | 0.47 |
| 192 | 0.054 |
| 193 | 0.17 |
| 195 | 0.17 |
| 196 | 0.40 |
| 207 | 0.16 |
| 208 | 0.11 |
| 209 | 0.074 |
| 214 | 0.27 |
| 215 | 0.13 |
| 222 | 0.096 |
| 231 | 0.16 |
| 235 | 0.088 |
| 236 | 0.16 |
| 238 | 0.39 |
| 244 | 0.23 |
| 250 | 0.19 |
| 252 | 0.36 |
| 255 | 0.046 |
| 256 | 0.049 |
| 266 | 0.29 |
| 269 | 0.48 |
| 274 | 0.11 |
| 275 | 0.18 |
| 277 | 0.23 |
| 278 | 0.30 |
| 279 | 0.15 |
| 280 | 0.47 |
| 281 | 0.18 |
| 284 | 0.29 |
| 285 | 0.18 |
| 286 | 0.40 |
| 287 | 0.064 |
| 288 | 0.26 |
| 290 | 0.21 |
| 293 | 0.19 |
| 298 | 0.29 |
| 302 | 0.071 |
| 303 | 0.19 |
| 304 | 0.21 |

TABLE 10-continued

| Test Comp. No. | $IC_{50}$ ($\mu M$) |
|---|---|
| 307 | 0.024 |
| 308 | 0.11 |
| 309 | 0.43 |
| 310 | 0.065 |
| 311 | 0.078 |
| 312 | 0.056 |
| 313 | 0.032 |
| 315 | 0.38 |
| 316 | 0.47 |
| 321 | 0.059 |
| 322 | 0.044 |
| 323 | 0.064 |

PHARMACOLOGICAL TEST

Experiment 2: $V_2$ receptor binding assay

Using rat kidney plasma membrane preparations prepared according to O. Hechter's method [cf: J. Bio. Chem., 253, 3211 (1978)], the plasma membrane (100000dpm, $4\times10^{-10}M$) of $[^3H]$-Arg-vasopressin and a test compound (0.6 mg, $10^{-10}$-$10^{-5}M$) are incubated at 4° C. for 3 hours in 100 mM Tris-HCl buffer (pH: 8.0, 250 $\mu$l) containing 5 mM $MgCl_2$, 1 mM EDTA and 0.1% BSA. After incubation, the mixture if filtered using the glass filter (GF/F) so as to separate the membrane preparation combined with vasopressin and then washed twice with the buffer (5 ml). This glass filter is taken out and mixed with liquid scintillation cocktail. The amount of $[^3H]$-vasopressin combined with the membrane is measured by liquid scintillation counter and the rate of the inhibitory effect of the test compound is estimated according to the following equation.

$$\text{Rate of the inhibitory effect (\%)} = 100 - \frac{C_1 - B_1}{C_0 - B_1} \times 100$$

$C^1$: The amount of $[^3H]$-vasopressin combined with the membrane in the presence of the test compound (in prescribed amount).

$C^0$: The amount of $[^3H]$-vasopressin combined with the membrane in the absence of the test compound.

$B^1$: The amount of $[^3H]$-vasopressin combined with the membrane in the presence of the excess amount of vasopressin ($10^{-6}M$). The results are expressed as $IC_{50}$ values, which is the concentration of the test compound required to achieve the inhibitory effect in the rate of 50%. The results are shown in the following Table 11.

TABLE 11

| Test Comp. No. | $IC_{50}$ ($\mu M$) |
|---|---|
| 1 | 0.98 |
| 2 | 0.20 |
| 3 | 0.40 |
| 4 | 0.58 |
| 5 | 1.2 |
| 6 | 0.076 |
| 7 | 0.20 |
| 8 | 0.32 |
| 9 | 0.53 |
| 10 | 0.082 |
| 11 | 1.05 |
| 12 | 1.97 |

TABLE 11-continued

| Test Comp. No. | $IC_{50}$ ($\mu M$) |
|---|---|
| 13 | 1.02 |
| 14 | 0.23 |
| 15 | 0.13 |
| 16 | 0.17 |
| 17 | 0.23 |
| 18 | 1.0 |
| 19 | 1.7 |
| 20 | 1.4 |
| 21 | 1 |
| 22 | 0.33 |
| 23 | 1.07 |
| 24 | 1.09 |
| 25 | 1.67 |
| 26 | 0.025 |
| 27 | 0.070 |
| 28 | 0.018 |
| 29 | 0.069 |
| 30 | 0.029 |
| 31 | 0.098 |
| 32 | 0.016 |
| 33 | 0.007 |
| 34 | 0.049 |
| 35 | 0.20 |
| 36 | 0.028 |
| 37 | 0.16 |
| 38 | 0.029 |
| 39 | 0.071 |
| 40 | 0.33 |
| 41 | 0.20 |
| 42 | 0.063 |
| 43 | 0.17 |
| 44 | 0.050 |
| 45 | 0.19 |
| 46 | 0.018 |
| 47 | 0.20 |
| 48 | 0.021 |
| 49 | 0.063 |
| 50 | 1.3 |
| 51 | 0.40 |
| 52 | 0.32 |
| 53 | 1.6 |
| 54 | 0.11 |
| 55 | 0.091 |
| 56 | 0.037 |
| 57 | 0.16 |
| 58 | 0.14 |
| 59 | 0.24 |
| 60 | 0.15 |
| 61 | 0.090 |
| 62 | 0.023 |
| 63 | 0.046 |
| 64 | 0.007 |
| 65 | 0.081 |
| 66 | 0.45 |
| 67 | 0.050 |
| 68 | 0.19 |
| 69 | 0.12 |
| 70 | 0.012 |
| 71 | 0.085 |
| 72 | 0.16 |
| 74 | 0.51 |
| 75 | 0.30 |
| 76 | 0.017 |
| 77 | 0.090 |
| 78 | 0.084 |
| 79 | 0.53 |
| 80 | 0.070 |
| 81 | 0.15 |
| 82 | 0.17 |
| 83 | 0.73 |
| 84 | 0.11 |
| 85 | 0.068 |
| 86 | 0.58 |
| 87 | 0.046 |
| 88 | 0.021 |
| 89 | 0.035 |
| 90 | 0.014 |
| 91 | 0.005 |
| 92 | 0.41 |

TABLE 11-continued

| Test Comp. No. | $IC_{50}$ (μM) |
|---|---|
| 93 | 0.52 |
| 94 | 0.095 |
| 95 | 0.089 |
| 96 | 0.039 |
| 97 | 0.024 |
| 98 | 0.45 |
| 99 | 1.6 |
| 100 | 0.011 |
| 101 | 0.60 |
| 102 | 0.29 |
| 103 | 0.54 |
| 104 | 0.37 |
| 105 | 0.72 |
| 106 | 0.44 |
| 107 | 0.032 |
| 108 | 0.12 |
| 109 | 0.49 |
| 110 | 0.044 |
| 111 | 0.087 |
| 112 | 0.29 |
| 113 | 0.28 |
| 114 | 0.006 |
| 115 | 0.006 |
| 116 | 0.039 |
| 117 | 0.24 |
| 118 | 0.55 |
| 119 | 0.059 |
| 120 | 0.28 |
| 121 | 0.18 |
| 122 | 0.10 |
| 123 | 0.10 |
| 124 | 0.13 |
| 125 | 0.28 |
| 126 | 0.062 |
| 127 | 0.99 |
| 128 | 0.23 |
| 129 | 0.29 |
| 130 | 0.007 |
| 131 | 0.027 |
| 132 | 0.013 |
| 133 | 0.022 |
| 134 | 0.048 |
| 135 | 0.081 |
| 136 | 0.18 |
| 137 | 0.41 |
| 138 | 0.11 |
| 139 | 0.10 |
| 140 | 0.024 |
| 141 | 0.010 |
| 142 | 0.008 |
| 143 | 0.008 |
| 144 | 0.02 |
| 145 | 0.06 |
| 146 | 0.056 |
| 147 | 0.009 |
| 148 | 0.34 |
| 149 | 0.004 |
| 150 | 0.14 |
| 151 | 0.18 |
| 152 | 0.039 |
| 153 | 0.063 |
| 154 | 0.063 |
| 155 | 0.028 |
| 156 | 0.15 |
| 157 | 0.38 |
| 158 | 0.018 |
| 159 | 0.020 |
| 160 | 0.020 |
| 161 | 0.009 |
| 162 | 0.059 |
| 163 | 0.009 |
| 164 | 0.010 |
| 165 | 0.098 |
| 166 | 0.070 |
| 167 | 0.032 |
| 168 | 0.083 |
| 169 | 0.071 |
| 170 | 0.25 |
| 171 | 0.87 |

TABLE 11-continued

| Test Comp. No. | $IC_{50}$ (μM) |
|---|---|
| 172 | 0.023 |
| 173 | 0.008 |
| 174 | 0.007 |
| 175 | 0.038 |
| 176 | 0.004 |
| 177 | 0.15 |
| 178 | 0.012 |
| 179 | 0.040 |
| 180 | 0.034 |
| 181 | 0.038 |
| 182 | 0.005 |
| 183 | 0.26 |
| 184 | 0.023 |
| 185 | 0.005 |
| 186 | 0.030 |
| 187 | 0.029 |
| 188 | 0.039 |
| 189 | 0.087 |
| 190 | 0.082 |
| 191 | 0.009 |
| 192 | 0.011 |
| 193 | 0.036 |
| 194 | 0.21 |
| 195 | 0.010 |
| 196 | 0.013 |
| 197 | 0.99 |
| 198 | 0.040 |
| 199 | 0.019 |
| 200 | 0.024 |
| 201 | 0.023 |
| 202 | 0.14 |
| 203 | 0.070 |
| 204 | 0.11 |
| 205 | 0.074 |
| 206 | 0.088 |
| 207 | 0.045 |
| 208 | 0.007 |
| 209 | 0.004 |
| 210 | 0.004 |
| 211 | 0.12 |
| 212 | 0.035 |
| 213 | 0.033 |
| 214 | 0.058 |
| 215 | 0.006 |
| 216 | 0.91 |
| 217 | 0.37 |
| 218 | 0.022 |
| 219 | 0.023 |
| 220 | 0.026 |
| 221 | 0.024 |
| 222 | 0.010 |
| 223 | 0.022 |
| 224 | 0.38 |
| 225 | 0.030 |
| 226 | 0.019 |
| 227 | 0.029 |
| 228 | 0.029 |
| 229 | 0.029 |
| 230 | 0.020 |
| 231 | 0.007 |
| 232 | 0.020 |
| 233 | 0.15 |
| 234 | 0.14 |
| 235 | 0.006 |
| 236 | 0.006 |
| 237 | 0.041 |
| 238 | 0.020 |
| 239 | 0.17 |
| 240 | 0.022 |
| 241 | 0.006 |
| 242 | 0.17 |
| 243 | 0.40 |
| 244 | 0.018 |
| 245 | 0.059 |
| 246 | 0.027 |
| 247 | 0.048 |
| 248 | 0.060 |
| 250 | 0.12 |
| 251 | 0.094 |

TABLE 11-continued

| Test Comp. No. | $IC_{50}$ (μM) |
|---|---|
| 252 | 0.063 |
| 253 | 0.052 |
| 254 | 0.016 |
| 255 | 0.005 |
| 256 | 0.004 |
| 257 | 0.045 |
| 258 | 0.20 |
| 259 | 0.25 |
| 260 | 0.13 |
| 261 | 0.011 |
| 262 | 0.029 |
| 263 | 0.053 |
| 264 | 0.030 |
| 265 | 0.025 |
| 266 | 0.013 |
| 267 | 0.12 |
| 268 | 0.018 |
| 269 | 0.003 |
| 270 | 0.046 |
| 271 | 0.030 |
| 272 | 0.40 |
| 273 | 0.027 |
| 274 | 0.024 |
| 275 | 0.018 |
| 276 | 0.032 |
| 277 | 0.016 |
| 278 | 0.013 |
| 279 | 0.008 |
| 280 | 0.045 |
| 281 | 0.011 |
| 282 | 0.38 |
| 283 | 0.096 |
| 284 | 0.019 |
| 285 | 0.008 |
| 286 | 0.019 |
| 287 | 0.007 |
| 288 | 0.015 |
| 289 | 0.071 |
| 290 | 0.021 |
| 291 | 0.13 |
| 292 | 0.18 |
| 293 | 0.065 |
| 294 | 0.33 |
| 295 | 0.026 |
| 296 | 0.25 |
| 297 | 0.051 |
| 298 | 0.10 |
| 299 | 0.22 |
| 300 | 0.48 |
| 301 | 0.14 |
| 302 | 0.011 |
| 303 | 0.025 |
| 304 | 0.024 |
| 305 | 0.038 |
| 306 | 0.077 |
| 307 | 0.010 |
| 308 | 0.023 |
| 309 | 0.015 |
| 310 | 0.008 |
| 311 | 0.013 |
| 312 | 0.29 |
| 313 | 0.012 |
| 314 | 0.096 |
| 315 | 0.025 |
| 316 | 0.060 |
| 317 | 0.072 |
| 318 | 0.060 |
| 319 | 0.058 |
| 320 | 0.039 |
| 321 | 0.012 |
| 322 | 0.025 |
| 323 | 0.014 |

EXPERIMENT 3: Anti-antidiuretic activity (effect on endogenous ADH)

A test compound or solvent (dimethylformamide) is administered into a caudal vein of untreated, unrestrained SD rats (male, weight: 300–350 g) and the amount of urine, which is spontaneously excreted for a period of 2 hours thereafter, is collected and measured by using a metabolic gauge. During this measurement, the rats are allowed to take water and feed freely.

The amount of urine of control rats (solvent-treated group) is regarded as 100%, and the results are expressed as $ED_3$ value, which is the dose of the test compound to be required to excrete the urine by three times than that of the control rats. The results are shown in the following Table 12.

TABLE 12

| Test compound No. | $ED_3$ (mg/kg) |
|---|---|
| 6 | 10 |
| 33 | 1.9 |
| 178 | 4.2 |
| 249 | 0.4*) |

*)Physicological saline solution was used as a solvent instead of dimethylformamide.

Using the suitable starting materials, the compounds of the following Table 13 are obtained in the same manner as in Examples 1 and 382.

TABLE 13

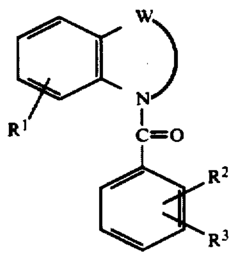

Example 1190
Structure

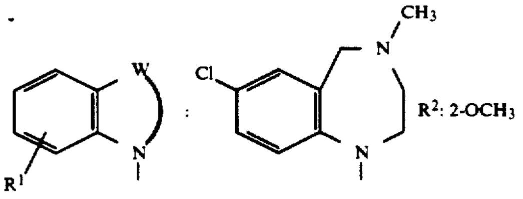

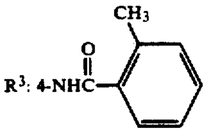

Crystalline form: White powder
Recrystallization solvent: Dichloromethane/diethyl ether
Melting Point: 210–213° C.
Form: Free
Example 1191
Structure

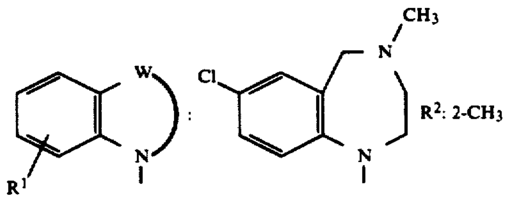

TABLE 13-continued

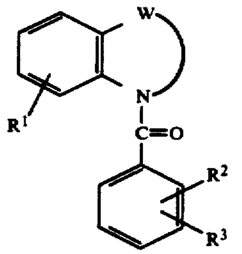

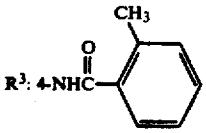

Crystalline form: White powder
Recrystallization solvent: Dichloromethane/diethyl ether
Melting Point: 184.5-186° C.
Form: Free
Example 1192
Structure

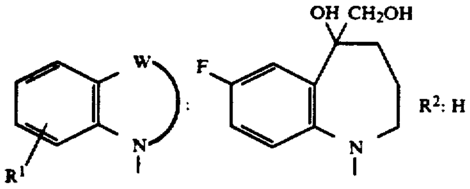

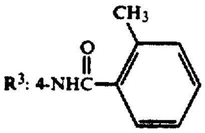

Crystalline form: White powder
Recrystallization solvent: Dichloromethane/diethyl ether
Melting Point: 201.5-202.5° C.
Form: Free
Example 1193
Structure

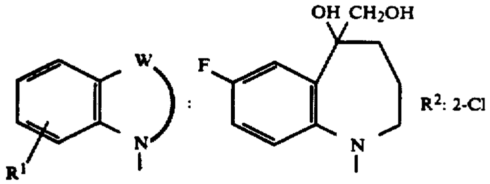

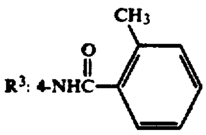

Crystalline form: White powder
Recrystallization solvent: Dichloromethane/diethyl ether
Melting Point: 159-162° C. (decomposed)
Form: Free
Example 1194
Structure TABLE 13-continued

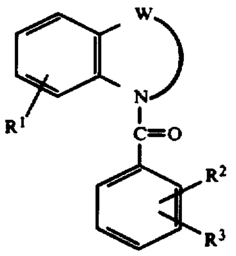

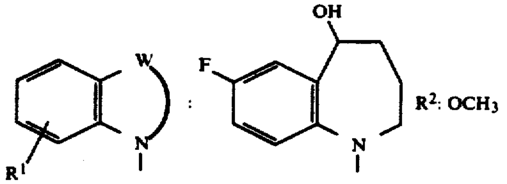

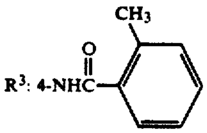

Crystalline form: White powder
Recrystallization solvent: Diethyl ether/dichloromethane
Melting Point: 237-240° C.
Form: Free
Example 1195
Structure

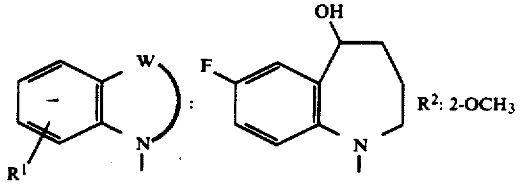

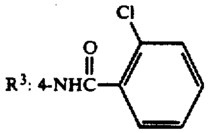

Crystalline form: White powder
Recrystallization solvent: Diethyl ether/dichloromethane
Melting Point: 269-272.5° C.
Form: Free
Example 1196
Structure

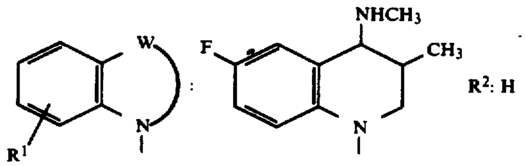

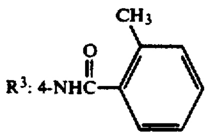

Crystalline form: Colorless prisms
Recrystallization solvent: Ethanol/dichloromethane
Melting Point: 201-202° C.
Form: Free TABLE 13-continued

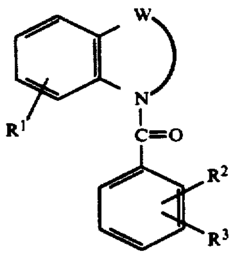

Example 1197
Structure

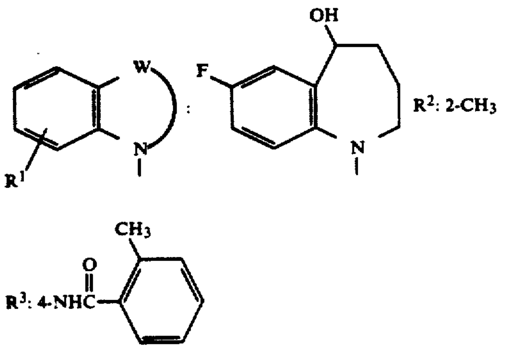

Crystalline form: White powder
Recrystallization solvent: Methanol
Melting Point: 204–206° C.
Form: Free
Example 1198
Structure

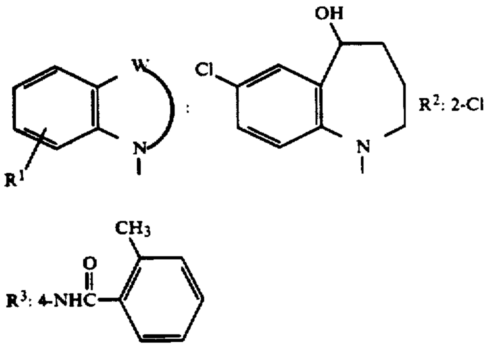

Crystalline form: Colorless amorphous
NMR analysis: 313)
Form: Free
Example 1199
Structure

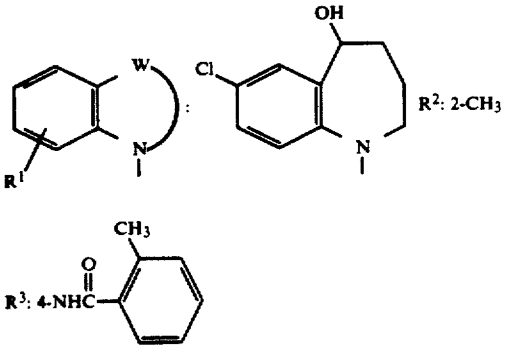

Crystalline form: Colorless amorphous

TABLE 13-continued

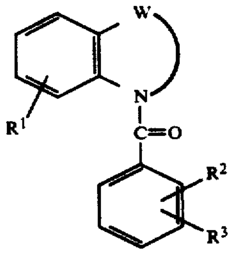

NMR analysis: 314)
Form: Free
Example 1200
Structure

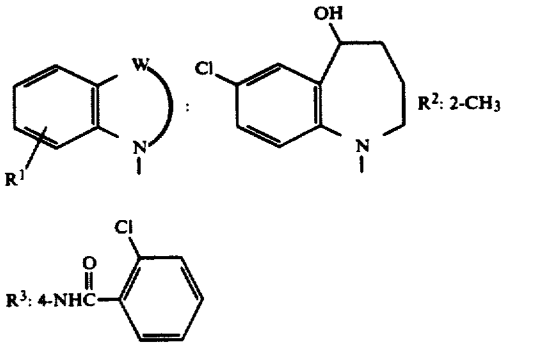

Crystalline form: Colorless amorphous
NMR analysis: 315)
Form: Free
Example 1201
Structure

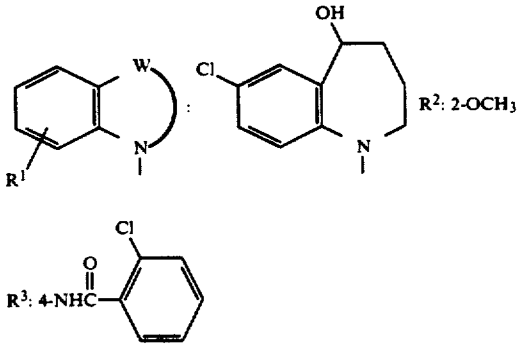

Crystalline form: Colorless amorphous
NMR analysis: 316)
Form: Free
Example 1202
Structure

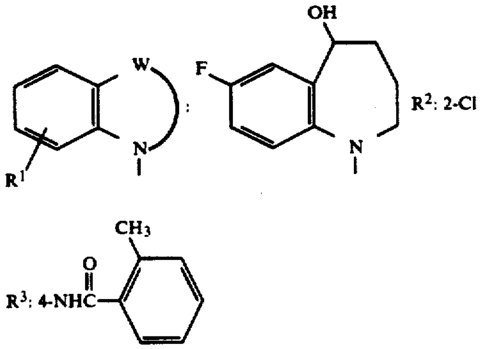

TABLE 13-continued

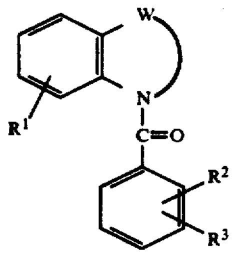

Crystalline form: Colorless amorphous
NMR analysis: 317)
Form: Free

Example 1203

Structure

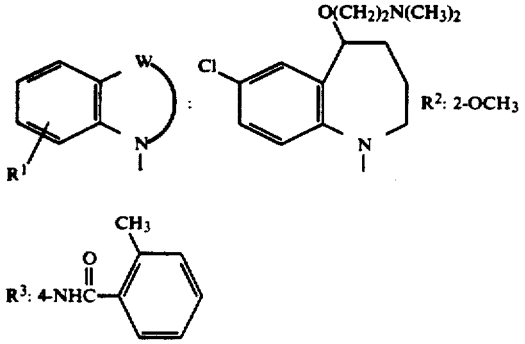

Crystalline form: Light brown amorphous
NMR analysis: 318)
Form: Hydrochloride

Example 1204

Structure

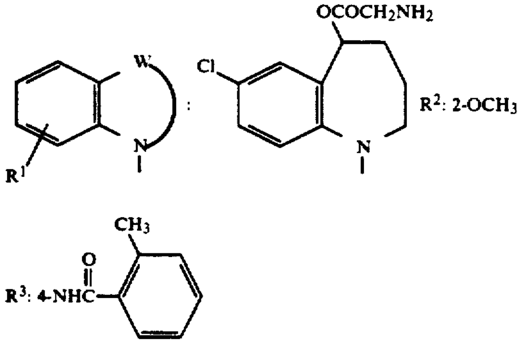

Crystalline form: Colorless amorphous
NMR analysis: 319)
Form: Free

Example 1205

Structure

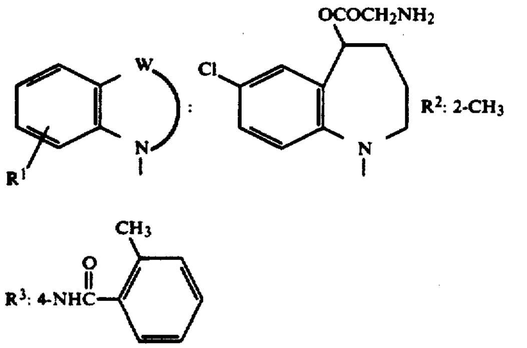

TABLE 13-continued

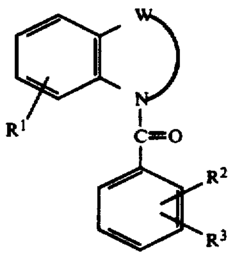

Crystalline form: Colorless amorphous
NMR analysis: 320)
Form: Hydrochloride

Example 1206

Structure

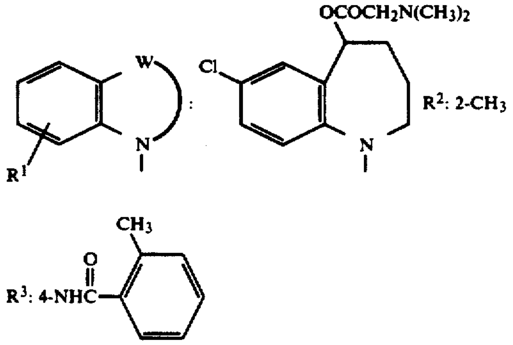

Crystalline form: Colorless amorphous
NMR analysis: 321)
Form: Hydrochloride

Example 1207

Structure

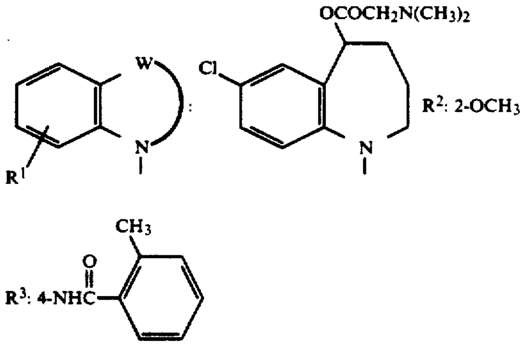

Crystalline form: Colorless amorphous
NMR analysis: 322)
Form: Free

Example 1208

Structure

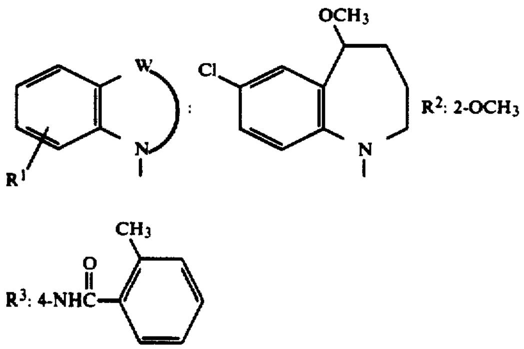

TABLE 13-continued

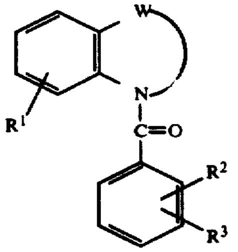

Crystalline form: Light yellow prisms
Recrystallization solvent: Ethyl acetate/n-hexane
Melting Point: 187-189° C.
Form: Free
Example 1209
Structure

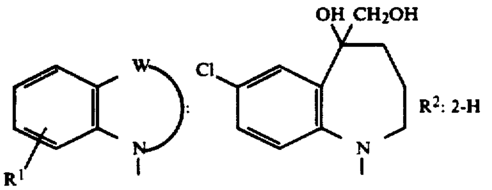

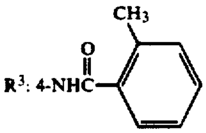

Crystalline form: White powder
Recrystallization solvent: Methanol/diethyl ether
Melting Point: 227-231° C.
Form: Free
Example 1210
Structure

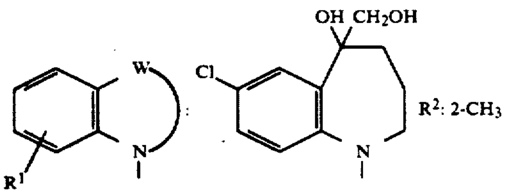

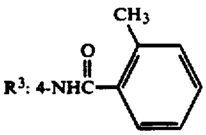

Crystalline form: White powder
Recrystallization solvent: Methanol/diethyl ether
Melting Point: 191-192° C.
Form: Free
Example 1211
Structure

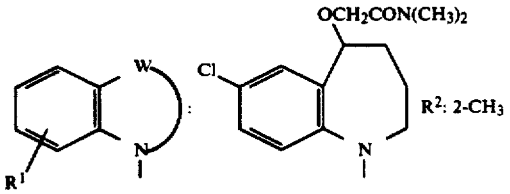

TABLE 13-continued

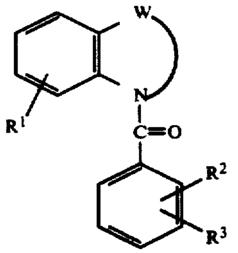

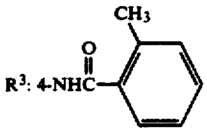

Crystalline form: Colorless amorphous
NMR analysis: 323)
Form: Free
Example 1212
Structure

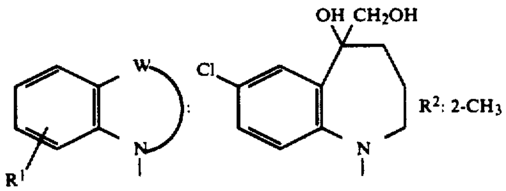

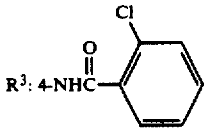

Crystalline form: Colorless amorphous
NMR analysis: 324)
Form: Free
Example 1213
Structure

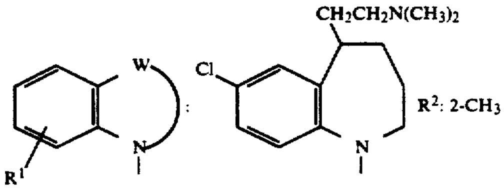

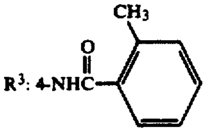

Crystalline form: White amorphous
NMR analysis: 325)
Form: Hydrochloride

313) $^{1}$H-HMR(CDCl$_3$)δ; 1.40-2.30(4H, m), 2.36(3H, s), 2.60-2.92(2H, m), 4.35-5.18(2H, m), 6.69-6.87(1H, m), 6.87-7.04(1H, m), 7.05-8.06(8H, m), 8.25-8.60 (1H, m)

314) $^{1}$H-NMR(CDCl$_3$)δ; 1.43-2.26(4H, m), 2.38(3H, s), 2.42(3H, s), 2.61-2.91(1H, m), 2.91-3.40(1H, m), 4.49-5.08(2H, m), 6.40-7.68(10H, m), 7.68-7.93(1H, m)

315) $^{1}$H-NMR(CDCl$_3$)δ; 1.32-2.25(4H, m), 2.25-2.54(3H, m), 2.59-3.42(2H, m), 4.45-5.08(2H, m), 6.40-7.80 (10H, m), 8.00-8.38(1H, m)

316) $^{1}$H-NMR(CDCl$_3$)δ; 1.42-1.89(2H, m), 1.90-2.30(2H, m), 2.57-2.95(2H, m), 3.36-3.64(3H, m), 4.51-5.17

TABLE 13-continued

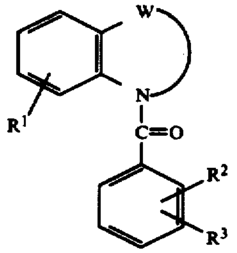

| | |
|---|---|
| | (2H, m), 6.52–7.80(10H, m), 8.11–8.41(1H, m) |
| 317) | ¹H-NMR(CDCl₃)δ; 1.18–2.25(4H, m), 2.25–2.59(3H, m), 2.59–2.88(1H, m), 2.88–4.32(1H, m), 4.32–5.05 (2H, m), 6.44–8.08(10H, m), 8.52–9.00(1H, m) |
| 318) | ¹H-NMR(DMSO-d₆)δ; 1.35–2.45(7H, m), 2.6–3.0(8H, m), 3.2–4.2(6H, m), 4.45–4.85(2H, m), 6.75–7.7(11H, m) |
| 319) | ¹H-NMR(CDCl₃)δ; 1.20–2.89, 3.22–4.33, 4.48–5.05, 5.75–6.32[total 17H, m{2.45(s)}], 6.52–7.78(10H, m), 8.10–8.71(1H, m) |
| 320) | ¹H-NMR(DMSO-d₆)δ; 1.49–3.05[11H, m{2.35(s), 2.40 (s)}], 3.71–5.04(3H, m), 5.28–5.88(1H, m), 6.64–7.98 (10H, m), 8.58(3H, brs), 10.32, 10.48(total 1H, each s) |
| 321) | ¹H-NMR(DMSO-d₆)δ; 1.50–3.70[17H, m{2.36, 2.40 (each s), 2.87, 2.89, 2.94(each s)}], 4.05–5.08(3H, m), 5.90–6.28(1H, m), 6.62–7.98(10H, m), 10.36, 10.52(total 1H, each brs), 10.94(1H, brs) |
| 322) | ¹H-NMR(CDCl₃)δ; 1.53–2.91[14H, m{2.42, 2.47(each s)}], 3.09–4.27(5H, m), 4.70–5.12(1H, m), 5.89–6.36 (1H, m), 6.57–7.94(11H, m) |
| 323) | ¹H-NMR(CDCl₃)δ; 1.32–2.23(2H, m), 2.23–2.68(7H, m), 2.68–3.84(8H, m), 3.84–5.23(4H, m), 6.47–7.88 (11H, m) |
| 324) | ¹H-NMR(CDCl₃)δ; 1.45–2.32(5H, m), 2.44(3H, s), 2.63–3.21(1H, m), 3.40–5.01(4H, m), 6.28–7.93(10H, m), 8.10–8.43(1H, m) |
| 325) | ¹H-NMR(DMSO-d₆)δ; 0.71–3.46, 4.15–4.44[total 23H, 2.35(s), 2.42(s), 2.86(s)], 6.71–7.88(10H, m), 10.16–10.58(2H, m) |

What is claimed is:

1. A benzoheterocyclic compound of the following formula:

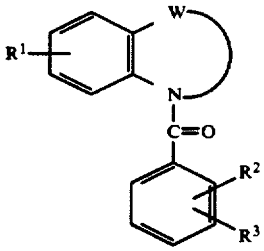

(1)

wherein $R^1$ is a hydrogen atom, a halogen atom, a lower alkyl, an amino having optionally a lower alkyl substituent, or a lower alkoxy, $R^2$ is a hydrogen atom, a halogen atom, a lower alkoxy, a phenyl(lower)alkoxy, hydroxy, a lower alkyl, an amino having optionally a lower alkyl substituent, a carbamoyl-substituted lower alkoxy, an amino-substituted lower alkoxy having optionally a lower alkyl substituent, or a benzoyloxy which has optionally a halogen substituent on the phenyl ring, $R^3$ is a group of the formula:

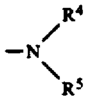

or a group of the formula:

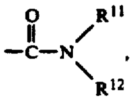

$R^4$ is a hydrogen atom, a benzoyl which has optionally a halogen substituent on the phenyl ring, or a lower alkyl, $R^5$ is a group of the formula:

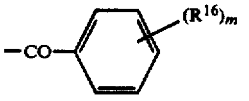

{wherein $R^{16}$ is a halogen atom; a lower alkyl which has optionally a substituent selected from a halogen atom and hydroxy; hydroxy; a lower alkoxy; a lower alkanoyloxy; a lower alkylthio; a lower alkanoyl; carboxy; a lower alkoxycarbonyl; cyano; nitro; an amino which has optionally a substituent selected from a lower alkyl and a lower alkanoyl; phenyl; a $C_3$–$C_8$ cycloalkyl; a lower alkanoyloxy-substituted lower alkoxy; a carboxy-substituted lower alkoxy; a halogen-substituted lower alkoxy; a carbamoyl-substituted lower alkoxy; a hydroxy-substituted lower alkoxy; a lower alkoxycarbonyl-substituted lower alkoxy; a phthalimido-substituted lower alkoxy; an aminocarbonyl-lower alkoxy having a lower alkyl substituent; or a group of the formula:

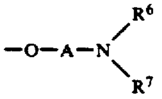

(A is a lower alkylene, and $R^6$ and $R^7$ are the same or different and are each a hydrogen atom, a lower alkyl having optionally a hydroxy substituent, a lower alkanoyl, or benzoyl, or $R^6$ and $R^7$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino, and has optionally a substituent selected from piperidinyl and a lower alkyl); and m is an integer of 0 to 3}, a phenyl-lower alkoxycarbonyl, a lower alkanoyl, a phenyl-lower alkanoyl, a $C_3$–$C_8$ cycloalkyl-lower alkanoyl, a $C_3$–$C_8$ cycloalkylcarbonyl, tricyclo[3.3.1.1.]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

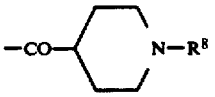

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent from a halogen atom and a lower alkyl on the phenyl ring, quinolylsulfonyl, or a group of the formula:

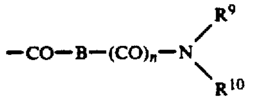

(wherein B is a lower alkylene, n is an integer of 0 or 1, and $R^9$ and $R^{10}$ are the same or different and are each a hydrogen atom, a lower alkyl having optionally a hydroxy substituent, a $C_3$-$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl a lower alkoxycarbonyl and piperdinyl), $R^{11}$ is a hydrogen atom or a lower alkyl, $R^{12}$ is a $C_3$-$C_8$ cycloalkyl, or a phenyl which has optionally 1 to 3 substituents selected from a lower alkoxy, a lower alkyl and a halogen atom, W is a group of the formula: $-(CH_2)_p-$ (p is an integer of 3 to 5) or a group of the formula: $-CH{=}CH-(CH_2)_q-$ (q is an integer of 1 to 3), said $-(CH_2)_p$ group and said $-CH{=}CH-(CH_2)_q-$ group have optionally 1 to 3 substituents selected from a lower alkyl having optionally a hydroxy substituent, a lower alkoxycarbonyl, carboxy, hydroxy, oxo, a lower alkanoyloxy having optionally a halogen substituent, an amino-lower alkyl having optionally a substituent selected from a lower alkyl and a lower alkanoyl, a lower alkanoyloxy-substituted lower alkyl, a lower alkylsulfonyloxy-lower alkyl, an azido-lower alkyl, an aminocarbonyloxy having optionally a lower alkyl substituent, a lower alkoxy, a lower alkoxycarbonyl-substituted lower alkoxy, a carboxy-substituted lower alkoxy, an aminocarbonyl-lower alkoxy having optionally a lower alkyl substituent, an amino-lower alkoxy having optionally a substituent selected from a lower alkyl and a lower alkanoyl, a phthalimido-substituted lower alkoxy, hydroxyimino, a lower alkanoyloxy-imino, a lower alkylidene, a halogen atom, azido, sulfoxyimino, a group of the formula:

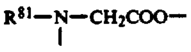

($R^{81}$ is a hydrogen atom or a lower alkyl), hydrazino, pyrrolyl, an amino-lower alkanoyloxy having optionally a lower alkyl substituent, a group of the formula:

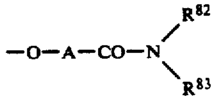

(A is as defined above, and $R^{82}$ and $R^{83}$ are the same or different and are each a hydrogen atom, a lower alkyl, a carbamoyl-substituted lower alkyl, a hydroxy-substituted lower alkyl, or a pyridyl-lower alkyl, or $R^{82}$ and $R^{83}$ may bind together with the nitrogen atom to which they bond to form a 5- or 6-membered saturated heterocyclic group with or without being intervened with a nitrogen, an oxygen or a sulfur atom wherein the heterocyclic group is one member selected from the group consisting of pyrrolidinyl, piperidinyl, piperazinyl, morpholino, and thiomorpholino and has optionally a substituent selected from oxo, a lower alkyl, a lower alkanoyl, and carbamoyl), and a group of the formula:

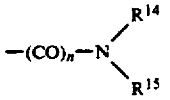

(wherein n is as defined above, and $R^{14}$ and $R^{15}$ are the same or different and are each a hydrogen atom, a lower alkyl, a lower alkenyl, a lower alkanoyl, a $C_3$-$C_8$ cycloalkyl, an oxiranyl-substituted lower alkyl, a lower alkyl having 1 to 2 substituents selected from a lower alkoxy, hydroxy and an amino having optionally a lower alkyl substituent, a phenyl-lower alkyl, a pyridyl-lower alkyl, a lower alkylsulfonyl, benzoyl, a lower alkoxycarbonyl, anilinocarbonyl, an aminocarbonyl having optionally a lower alkyl substituent, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperidinyl having optionally a phenyl-lower alkyl substituent on the piperidinyl ring, a halogen-substituted lower alkanoyl, an imidazolyl-substituted lower alkanoyl, an amino-lower alkanoyl having optionally a substituent selected from a lower alkyl and a lower alkoxycarbonyl, an aminocarbonyl-lower alkyl having optionally a lower alkyl substituent, or a phenyl-lower alkoxycarbonyl, or $R^{14}$ and $R^{15}$ may bind together with the nitrogen atom to which they bond to form a 5- or 6-membered saturated heterocyclic group with or without being intervened with a nitrogen or an oxygen atom, wherein the heterocyclic group is one member selected from the group consisting of pyrrolidinyl, piperidinyl, piperazinyl, and morpholino, and may optionally have a substituent selected from a lower alkyl, a phenyl-lower alkyl or a lower alkanoyl), or a salt thereof.

2. The compound according to claim 1, wherein $R^1$ in the formula (1) is hydrogen atom, or a salt thereof.

3. The compound according to claim 1, wherein $R^1$ in the formula (1) is a halogen atom, and a salt thereof.

4. The compound according to claim 1, wherein $R^1$ in the formula (1) is a lower alkyl, an amino having optionally a lower alkyl substituent, or a lower alkoxy, or a salt thereof.

5. The compound according to claim 2, wherein $R^2$ is hydrogen atom, or a salt thereof.

6. The compound according to claim 2, wherein $R^2$ is a halogen atom, a lower alkoxy, or a lower alkyl, or a salt thereof.

7. The compound according to claim 2, wherein $R^2$ is a phenyl-lower alkoxy; hydroxy; an amino having optionally a lower alkyl substituent; a carbamoyl-substituted lower alkoxy; an amino-substituted lower alkoxy having optionally a lower alkyl substituent; or a benzoyloxy having optionally a halogen substituent on the phenyl ring thereof, or a salt thereof.

8. The compound according to claim 3, wherein $R^2$ is a hydrogen atom, or a salt thereof.

9. The compound according to claim 3, wherein $R^2$ is a halogen atom, a lower alkoxy, or a lower alkyl, or a salt thereof.

10. The compound according to claim 3, wherein $R^2$ is a phenyl-lower alkoxy; hydroxy; an amino having optionally a lower alkyl substituent; a carbamoyl-substituted lower alkoxy; an amino-substituted lower alkoxy having optionally a lower alkyl substituent; or a benzoyloxy having optionally a halogen substituent on the phenyl ring thereof, or a salt thereof.

11. The compound according to claim 4, wherein $R^2$ is hydrogen atom, or a salt thereof.

12. The compound according to claim 4, wherein $R^2$ is a halogen atom, a lower alkoxy, or a lower alkyl, or a salt thereof.

13. The compound according to claim 4, wherein $R^2$ is a phenyl-lower alkoxy; hydroxy; an amino having optionally a lower alkyl substituent; a carbamoyl-substituted lower alkoxy; an amino-substituted lower alkoxy having optionally a lower alkyl substituent; or a benzoyloxy having optionally a halogen substituent on the phenyl ring thereof, or a salt thereof.

14. The compound according to claim 5, wherein $R^3$ is a group of the formula: —$NR^4R^5$ ($R^4$ and $R^5$ are as defined in claim 1), or a salt thereof.

15. The compound according to claim 5, wherein $R^3$ is a group of the formula: —CO—$NR^{11}R^{12}$ ($R^{11}$ and $R^{12}$ are as defined in claim 1), or a salt thereof.

16. The compound according to claim 6, wherein $R^3$ is a group of the formula: —$NR^4R^5$ ($R^4$ and $R^5$ are as defined in claim 1), or a salt thereof.

17. The compound according to claim 6, wherein $R^3$ is a group of the formula: —CO—$NR^{11}R^{12}$ ($R^{11}$ and $R^{12}$ are as defined in claim 1), or a salt thereof.

18. The compound according to claim 8, wherein $R^3$ is a group of the formula: —$NR^4R^5$ ($R^4$ and $R^5$ are as defined in claim 1), and a salt thereof.

19. The compound according to claim 8, wherein $R^3$ is a group of the formula: —CO—$NR^{11}R^{12}$ ($R^{11}$ and $R^{12}$ are as defined in claim 1), or a salt thereof.

20. The compound according to claim 9, wherein $R^3$ is a group of the formula: —$NR^4R^5$ ($R^4$ and $R^5$ are as defined in claim 1), or a salt thereof.

21. The compound according to claim 9, wherein $R^3$ is a group of the formula: —CO—$NR^{11}R^{12}$ ($R^{11}$ and $R^{12}$ are as defined in claim 1), or a salt thereof.

22. The compound according to claim 14, wherein $R^4$ is a hydrogen atom, and $R^5$ is a group of the formula:

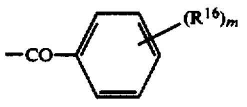

(wherein $R^{16}$ and m are as defined in claim 1), or a salt thereof.

23. The compound according to claim 14, wherein $R^4$ is a hydrogen atom and $R^5$ is a phenyl-lower alkoxycarbonyl, a lower alkanoyl, a phenyl-lower alkanoyl, a $C_3$-$C_8$ cycloalkyl-lower alkanoyl, a $C_3$-$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy, and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

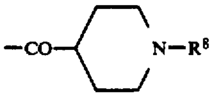

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

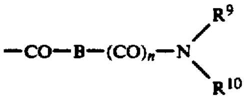

(wherein B is a lower alkylene, n is an integer of 0 or 1, and $R^9$ and $R^{10}$ are the same or different and are each a hydrogen atom, a lower alkyl having optionally a hydroxy substituent, a $C_3$-$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

24. The compound according to claim 14, wherein $R^4$ is a lower alkyl, or a salt thereof.

25. The compound according to claim 16, wherein $R^4$ is a hydrogen atom, and $R^5$ is a group of the formula:

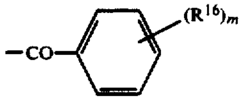

(wherein $R^{16}$ and m are as defined in claim 1), or a salt thereof.

26. The compound according to claim 16, wherein $R^4$ is a hydrogen atom and $R^5$ is a phenyl-lower alkoxycarbonyl, a lower alkanoyl, a phenyl-lower alkanoyl, a $C_3$–$C_8$ cycloalkyl-lower alkanoyl, a $C_3$–$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy, and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

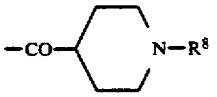

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

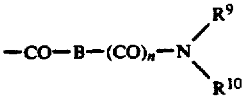

(wherein B is a lower alkylene, n is an integer of 0 or 1, and $R^9$ and $R^{10}$ are the same or different and are each a hydrogen atom, a lower alkyl having optionally a hydroxy substituent, a $C_3$–$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

27. The compound according to claim 16, wherein $R^4$ is a lower alkyl, or a salt thereof.

28. The compound according to claim 7, wherein $R^4$ is hydrogen atom, or $R^5$ is a group of the formula:

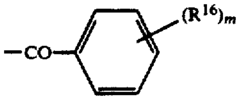

(wherein $R^{16}$ and m are as defined in claim 1), and a salt thereof.

29. The compound according to claim 7, wherein $R^4$ is a hydrogen atom and $R^5$ is a phenyl-lower alkoxycarbonyl, a lower alkanoyl, a phenyl-lower alkanoyl, a $C_3$–$C_8$ cycloalkyl-lower alkanoyl, a $C_3$–$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy, and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

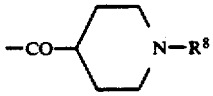

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

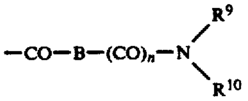

(wherein B is a lower alkylene, n is an integer of 0 or 1, and $R^9$ and $R^{10}$ are the same or different and are each a hydrogen atom, a lower alkyl having optionally a hydroxy substituent, a $C_3$–$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

30. The compound according to claim 7, wherein $R^4$ is a lower alkyl, or a salt thereof.

31. The compound according to claim 18, wherein $R^4$ is hydrogen atom, and $R^5$ is a group of the formula:

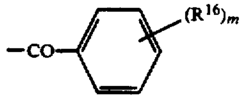

(wherein $R^{16}$ and m are as defined in claim 1), or a salt thereof.

32. The compound according to claim 18, wherein $R^4$ is a hydrogen atom and $R^5$ is a phenyl-lower alkoxycarbonyl, a lower alkanoyl, a phenyl-lower alkanoyl, a $C_3$-$C_8$ cycloalkyl-lower alkanoyl, a $C_3$-$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy, and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

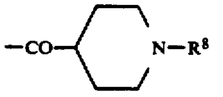

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

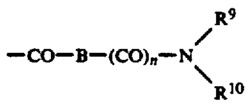

(wherein B is a lower alkylene, n is an integer of 0 or 1, and $R^9$ and $R^{10}$ are the same or different and are each a hydrogen atom, a lower alkyl having optionally a hydroxy substituent, a $C_3$-$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

33. The compound according to claim 18, wherein $R^4$ is a lower alkyl, or a salt thereof.

34. The compound according to claim 20, wherein $R^4$ is a hydrogen atom, and $R^5$ is a group of the formula:

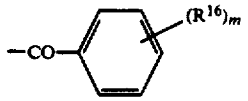

(wherein $R^{16}$ and m are as defined in claim 1), or a salt thereof.

35. The compound according to claim 20, wherein $R^4$ is a hydrogen atom and $R^5$ is a phenyl-lower alkoxycarbonyl, a lower alkanoyl, a phenyl-lower alkanoyl, a $C_3$-$C_8$ cycloalkyl-lower alkanoyl, a $C_3$-$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy, and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

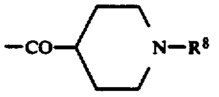

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

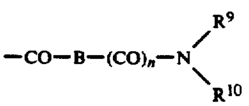

(wherein B is a lower alkylene, n is an integer of 0 or 1, and $R^9$ and $R^{10}$ are the same or different and are each a hydrogen atom, a lower alkyl having optionally a hydroxy substituent, a $C_3$-$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

36. The compound according to claim 20, wherein $R^4$ is a lower alkyl, or a salt thereof.

37. The compound according to claim 10, wherein $R^4$ is a hydrogen atom, and $R^5$ is a group of the formula:

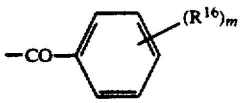

(wherein $R^{16}$ and m are as defined in claim 1), or a salt thereof.

38. The compound according to claim 10, wherein $R^4$ is a hydrogen atom and $R^5$ is a phenyl-lower alkoxycarbonyl, a lower alkanoyl, a phenyl-lower alkanoyl, a $C_3$-$C_8$ cycloalkyl-lower alkanoyl, a $C_3$-$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy, and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

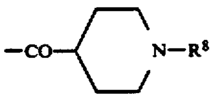

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

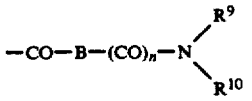

(wherein B is a lower alkylene, n is an integer of 0 or 1, and $R^9$ and $R^{10}$ are the same or different and are each a hydrogen atom, a lower alkyl having optionally a hydroxy substituent, a $C_3$-$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

39. The compound according to claim 10, wherein $R^4$ is a lower alkyl, or a salt thereof.

40. The compound according to claim 11, wherein $R^4$ is hydrogen atom, and $R^5$ is a group of the formula:

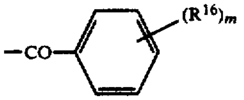

(wherein $R^{16}$ and m are as defined in claim 1), or a salt thereof.

41. The compound according to claim 11, wherein $R^4$ is a hydrogen atom and $R^5$ is a phenyl-lower alkoxycarbonyl, a lower alkanoyl, a phenyl-lower alkanoyl, a $C_3$-$C_8$ cycloalkyl-lower alkanoyl, a $C_3$-$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

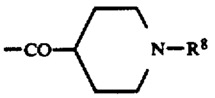

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

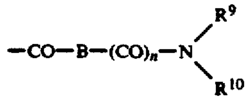

(where B is a lower alkylene, n is an integer of 0 or 1, and $R^9$ and $R^{10}$ are the same or different and are each a hydrogen atom, a lower alkyl having optionally a hydroxy substituent, a $C_3$–$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

42. The compound according to claim 11, wherein $R^4$ is a lower alkyl, or a salt thereof.

43. The compound according to claim 12, wherein $R^4$ is hydrogen atom, and $R^5$ is a group of the formula:

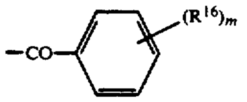

(wherein $R^{16}$ and m are as defined in claim 1), or a salt thereof.

44. The compound according to claim 12, wherein $R^4$ is a hydrogen atom and $R^5$ is a phenyl-lower alkoxycarbonyl, a lower alkanoyl, a phenyl-lower alkanoyl, a $C_3$–$C_8$ cycloalkyl-lower alkanoyl, a $C_3$–$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

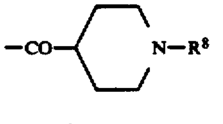

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

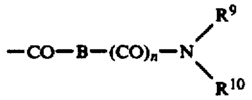

(where B is a lower alkylene, n is an integer of 0 or 1, and $R^9$ and $R^{10}$ are the same or different and are each a hydrogen atom, a lower alkyl having optionally a hydroxy substituent, a $C_3$–$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

45. The compound according to claim 12, wherein $R^4$ is a lower alkyl, or a salt thereof.

46. The compound according to claim 13, wherein $R^4$ is a hydrogen atom, and $R^5$ is a group of the formula:

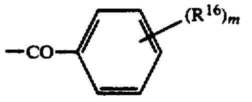

(wherein $R^{16}$ and m are as defined in claim 1), or a salt thereof.

47. The compound according to claim 13, wherein $R^4$ is a hydrogen atom and $R^5$ is a phenyl-lower alkoxycarbonyl, a lower alkanoyl, a phenyl-lower alkanoyl, a $C_3$–$C_8$ cycloalkyl-lower alkanoyl, a $C_3$–$C_8$ cycloalkylcarbonyl, tricyclo[3.3.1.1]decanylcarbonyl, naphthylcarbonyl, pyridylcarbonyl, furoyl, thenoyl, a phenoxy-lower alkanoyl which phenyl ring has optionally 1 to 3 substituents selected from a lower alkyl, a lower alkoxy and an amino having optionally a lower alkanoyl substituent, a phthalimido-substituted lower alkanoyl, a lower alkoxycarbonyl-lower alkanoyl, a carboxy-lower alkanoyl, a naphthyloxy-lower alkanoyl, a halogen-substituted lower alkanoyl, a group of the formula:

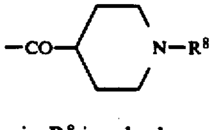

(wherein $R^8$ is a hydrogen atom, a lower alkyl, a phenyl-lower alkoxycarbonyl, a carbamoyl-lower alkyl, an amino-lower alkanoyl having optionally a lower alkyl substituent, or a lower alkanoyl), an anilinocarbonyl which has optionally a lower alkyl substituent on the phenyl ring, phenoxycarbonyl, a phenylsulfonyl which has optionally a substituent selected from a halogen atom and a lower alkyl on the phenyl ring, quinolylsulfonyl, or a group of the formula:

$$—CO—B—(CO)_n—N\begin{matrix} R^9 \\ R^{10} \end{matrix}$$

(where B is a lower alkylene, n is an integer of 0 or 1, and $R^9$ and $R^{10}$ are the same or different and are each a hydrogen atom, a lower alkyl having optionally a hydroxy substituent, a $C_3$–$C_8$ cycloalkyl, a phenyl-lower alkyl, a lower alkanoyl, a lower alkenyl, a phenoxy-lower alkyl, a phenyl which has optionally 1 to 3 substituents selected from an amino-lower alkyl having optionally a lower alkanoyl substituent, a lower alkyl, a lower alkoxy and a halogen atom, a phthalimido-substituted lower alkyl, an amino-lower alkyl having optionally a lower alkanoyl substituent, a lower alkynyl, or an amino-lower alkyl having optionally a lower alkyl substituent, or $R^9$ and $R^{10}$ may bind together with the nitrogen atom to which they bond to form a 5- or 6-membered saturated heterocyclic group with or without being intervened with a nitrogen or an oxygen atom wherein the heterocyclic group is one member selected from the group consisting of pyrrolidinyl, piperidinyl, piperazinyl, and morpholino and has optionally a substituent selected from a lower alkyl, a lower alkoxycarbonyl and piperidinyl), or a salt thereof.

48. The compound according to claim 13, wherein $R^4$ is a lower alkyl, or a salt thereof.

49. The compound according to claim 22, wherein $R^{16}$ is a halogen atom, or a lower alkyl having optionally a substituent selected from a halogen atom and hydroxy, or a salt thereof.

50. The compound according to claim 25, wherein $R^{16}$ is a halogen atom, or a lower alkyl having optionally a substituent selected from a halogen atom and hydroxy, or a salt thereof.

51. The compound according to claim 31, wherein $R^{16}$ is a halogen atom, or a lower alkyl having optionally a substituent selected from a halogen atom and hydroxy, or a salt thereof.

52. The compound according to claim 34, wherein $R^{16}$ is a halogen atom, or a lower alkyl having optionally a substituent selected from a halogen atom and hydroxy, or a salt thereof.

53. The compound according to claim 1, wherein W is a group of the formula: $—(CH_2)_p—$ (p is an integer of 3 to 5) and said $—(CH_2)_p—$ group has optionally 1 to 3 substituents selected from a lower alkyl having optionally a hydroxy substituent, a lower alkoxycarbonyl, carboxy, hydroxy, oxo, a lower alkanoyloxy having optionally a halogen substituent, an amino-lower alkyl having optionally a substituent selected from a lower alkyl and a lower alkanoyl, a lower alkanoyl-substituted lower alkyl, a lower alkyl-sulfonyloxy-lower alkyl, an azido-lower alkyl, an aminocarbonyloxy having optionally a lower alkyl substituent, a lower alkoxy, a lower alkoxycarbonyl-substituted lower alkoxy, a carboxy-substituted lower alkoxy, an aminocarbonyl-lower alkoxy having optionally a lower alkyl substituent, an amino-lower alkoxy having optionally a substituent selected from a lower alkyl and a lower alkanoyl, a phthalimido-substituted lower alkoxy, hydroxyimino, a lower alkanoyloxy-imino, a lower alkylidene, a halogen atom, azido, sulfoxyimino, a group of the formula:

$$R^{81}—\underset{|}{N}—CH_2COO—$$

($R^{81}$ is a hydrogen atom or a lower alkyl), hydrazino, pyrrolyl, an amino-lower alkanoyloxy having optionally a lower alkyl substituent, a group of the formula:

$$—O—A—CO—N\begin{matrix} R^{82} \\ R^{83} \end{matrix}$$

(A is as defined above, and $R^{82}$ and $R^{83}$ are the same or different and are each a hydrogen atom, a lower alkyl, a carbamoyl-substituted lower alkyl, a hydroxy-substituted lower alkyl, or a pyridyl-lower alkyl, or $R^{82}$ and $R^{83}$ may bind together with the nitrogen atom to which they bond to form a 5- or 6-membered saturated heterocyclic group with or without being intervened with a nitrogen, an oxygen or a sulfur atom wherein the heterocyclic group is one member selected form the group consisting of pyrrolidinyl, piperidinyl, piperazinyl, morpholino, and thiomorpholino and has optionally a substituent selected from oxo, a lower alkyl, a lower alkanoyl, and carbamoyl), and a group of the formula:

$$—(CO)_n—N\begin{matrix} R^{14} \\ R^{15} \end{matrix}$$

(wherein n is as defined above, and $R^{14}$ and $R^{15}$ are the same or different and are each a hydrogen atom, a lower alkyl, a lower alkenyl, a lower alkanoyl, a $C_3$–$C_8$ cycloalkyl, an oxiranyl-substituted lower alkyl, a lower alkyl having 1 to 2 substituents selected from a lower alkoxy, hydroxy and an amino having optionally a lower alkyl substituent, a phenyl-lower alkyl, a pyridyl-lower alkyl, a lower alkylsulfonyl, benzoyl, a lower alkoxycarbonyl, anilinocarbonyl, an aminocarbonyl having optionally a lower alkyl substituent, a cyano-substituted lower alkyl, a lower alkoxycarbonyl-substituted lower alkyl, a carbamoyl-substituted lower alkyl, a carboxy-substituted lower alkyl, a tetrahydro-pyranyloxy-substituted lower alkyl, a lower alkanoyloxy-substituted lower alkyl, a piperindinyl having optionally a phenyl-lower alkyl substituent on the piperidinyl ring, a halogen-substituted lower alkanoyl, an imidazolyl-substituted lower alkanoyl, an amino-lower alkanoyl having optionally a substituent selected from a lower alkyl and a lower alkoxycarbonyl, an aminocarbonyl-lower alkyl having optionally a lower alkyl substituent, or a phenyl-lower alkoxycarbonyl, or $R^{14}$ and $R^{15}$ may bind together with the nitrogen atom to which they bond to form a 5- or 6-membered saturated heterocyclic group with or without being intervened with a nitrogen or an oxygen atom, wherein the heterocyclic group is one member selected from the group consisting of pyrrolidinyl, piperidinyl, piperazinyl, and morpholino, and may optionally have a substituent selected from a lower alkyl, a phenyl-lower alkyl or a lower alkanoyl), or a salt thereof.

54. The compound according to claim 1, wherein W is a group of the formula: —$(CH_2)_p$— wherein p is 4 and said —$(CH_2)_p$— group has 1 to 3 substituents selected from a lower alkyl having optionally a hydroxy substituent, hydroxy, an amino-lower alkyl having optionally a substituent selected from a lower alkyl and a lower alkanoyl, an amino-lower alkanoyloxy having optionally a lower alkyl substituent, and a group of the formula:

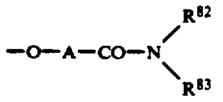

(wherein $R^{82}$, $R^{83}$ and A are as defined above), or a salt thereof.

55. The compound according to claim 1, wherein W is a group of the formula: —$(CH_2)_p$— wherein p is 4 and said —$(CH_2)_p$— group has 1 to 3 substituents selected from a lower alkyl having optionally a hydroxy substituent, and hydroxy, or a salt thereof.

56. 7-Chloro-5-hydroxy-1-[2-methyl-4-(2-methylbenzoylamino)benzoyl]-2,3,4,5-tetrahydro-1H-benzazepine.

57. 7-Chloro-5-hydroxy-1-[2-methoxy-4-(2-methylbenzoylamino)benzoyl]-2,3,4,5-tetrahydro-1H-benzazepine.

58. 7-Fluoro-5-hydroxy-1-[2-chloro-4-(2-methylbenzoylamino)benzoyl]-2,3,4,5-tetrahydro-1H-benzazepine.

59. 7-Fluoro-5-hydroxymethyl-5-hydroxy-1-[2-chloro-4-(2-methylbenzoylamino)benzoyl]-2,3,4,5-tetrahydro-1H-benzazepine.

60. The compound according to claim 1, wherein W is a group of the formula: —CH═CH—$(CH_2)_q$— (q is an integer of 1 to 3), and said —CH═CH—$(CH_2)_q$— group has optionally 1 to 3 substituents selected from a lower alkyl having optionally a hydroxy substituent, a lower alkoxycarbonyl, carboxy, hydroxy, oxo, a lower alkanoyloxy having optionally a halogen substituent, an amino-lower alkyl having optionally a substituent selected from a lower alkyl and a lower alkanoyl, a lower alkanoyl-substituted lower alkyl, a lower alkyl-sulfonyloxy-lower alkyl, an azido-lower alkyl, an aminocarbonyloxy having optionally a lower alkyl substituent, a lower alkoxy, a lower alkoxycarbonyl-substituted lower alkoxy, a carboxy-substituted lower alkoxy, an aminocarbonyl-lower alkoxy having optionally a lower alkyl substituent, an amino-lower alkoxy having optionally a substituent selected from a lower alkyl and a lower alkanoyl, a phthalimido-substituted lower alkoxy, hydroxyimino, a lower alkanoyloxy-imino, a lower alkylidene, a halogen atom, azido, sulfoxyimino, a group of the formula:

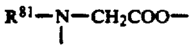

($R^{81}$ is a hydrogen atom or a lower alkyl), hydrazino, pyrrolyl, an amino-lower alkanoyloxy having optionally a lower alkyl substituent, a group of the formula:

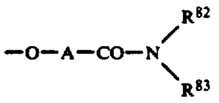

(A is as defined above, and $R^{82}$ and $R^{83}$ are the same or different and are each a hydrogen atom, a lower alkyl, a carbamoyl-substituted lower alkyl, a hydroxy-substituted lower alkyl, or a pyridyl-lower alkyl, or $R^{82}$ and $R^{83}$ may bind together with the nitrogen atom to which they bond to form a 5- or 6-membered saturated heterocyclic group with or without being intervened with a nitrogen, an oxygen or a sulfur atom wherein the heterocyclic group is one member selected form the group consisting of pyrrolidinyl, piperidinyl, piperazinyl, morpholino, and thiomorpholino and has optionally a substituent selected from oxo, a lower alkyl, a lower alkanoyl, and carbamoyl), and a group of the formula:

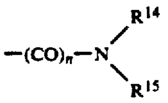

(wherein n is as defined above, and $R^{14}$ and $R^{15}$ are the same or different and are each a hydrogen atom, a lower alkyl, a lower alkenyl, a lower alkanoyl, a $C_3$–$C_8$ cycloalkyl, an oxiranyl-substituted lower alkyl, a lower alkyl having 1 to 2 substituents selected from a lower alkoxy, hydroxy and an amino having optionally a lower alkyl substituent, a phenyl-lower alkyl, a pyridyl-lower alkyl, a lower alkylsulfonyl, benzoyl, a lower alkoxycarbonyl, anilinocarbonyl, an aminocarbonyl having optionally a lower alkyl substituent, a cyano-substituted lower alkyl, a lower alkoxycarbonyl-substituted lower alkyl, a carbamoyl-substituted lower alkyl, a carboxy-substituted lower alkyl, a tetrahydropyranyloxy-substituted lower alkyl, a lower alkanoyloxy-substituted lower alkyl, a piperindinyl having optionally a phenyl-lower alkyl substituent on the piperidinyl ring, a halogen-substituted lower alkanoyl, an imidazolyl-substituted lower alkanoyl, an amino-lower alkanoyl having optionally a substituent selected from a lower alkyl and a lower alkoxycarbonyl, an aminocarbonyl-lower alkyl having optionally a lower alkyl substituent, or a phenyl-lower alkoxycarbonyl, or $R^{14}$ and $R^{15}$ may bind together with the nitrogen atom to which they bond to form a 5- or 6-membered saturated heterocyclic group with or without being intervened with a nitrogen or an oxygen atom, wherein the heterocyclic group is one member selected from the group consisting of pyrrolidinyl, piperidinyl, piperazinyl, and morpholino, and may optionally have a substituent selected from a lower alkyl, a phenyl-lower alkyl or a lower alkanoyl), or a salt thereof.

61. The compound according to claim 60, wherein q in the group: —CH═CH—$(CH_2)_q$— is 1, or a salt thereof.

62. The compound according to claim 60, wherein q in the group: —CH═CH—$(CH_2)_q$— is 2, or a salt thereof.

63. The compound according to claim 60, wherein q in the group: —CH═CH—$(CH_2)_q$— is 3, or a salt thereof.

64. The compound according to claim 62, wherein the heterocyclic group of the formula:

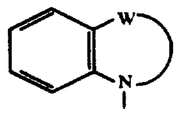

is 2,3-dihydro-1H-benzazepine, or a salt thereof.

65. The compound according to claim 53, wherein p in the group: —$(CH_2)_p$— is 3 and the group has no substituent, or a salt thereof.

66. The compound according to claim 53, wherein p in the group: —$(CH_2)_p$— is 3 and the group has a substituent of a group of the formula:

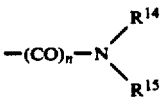

(wherein $R^{14}$, $R^{15}$, or n is as defined in claim 1, and a salt thereof.

67. The compound according to claim 53, wherein p in the group: —$(CH_2)_p$— is 4 and the group has no substituent, or a salt thereof.

68. The compound according to claim 53, wherein p in the group: —$(CH_2)_p$— is 4 and the group has a substituent of a group of the formula:

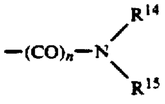

(wherein $R^{14}$, $R^{15}$, and n is as defined in claim 1, or a salt thereof.

69. The compound according to claim 53, wherein p in the group: —$(CH_2)_p$— is 5, and a salt thereof.

70. The compound according to claim 66 or 68, wherein n in the substituent,

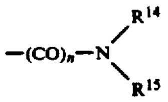

is 0, and $R^{14}$ and $R^{15}$ are the same or different and are each hydrogen atom, a lower alkyl, or a cycloalkyl, and a salt thereof.

71. 5-Dimethylamino-1-[4-(2-methylbenzoylamino)-benzoyl]-2,3,4,5-tetrahydro-1H-benzazepine.

72. 5-Dimethylamino-1-[2-chloro-4-(2-methylbenzoylamino)benzoyl]-2,3,4,5-tetrahydro-1H-benzazepine.

73. 5-Methylamino-1-[2-chloro-4-(2-methylbenzoylamino)benzoyl]-2,3,4,5-tetrahydro-1H-benzazepine.

74. 5-Cyclopropylamino-1-[2-chloro-4-(2-methylbenzoylamino)benzoxyl]-2,3,4,5-tetrahydro-1H-benzazepine.

75. 5-Cyclopropylamino-1-[2-chloro-4-(2-chlorobenzoylamino)benzoxyl]-2,3,4,5-tetrahydro-1H-benzazepine.

76. 5-Dimethylamino-1-[2-methyl-4-(2-methylbenzoylamino)benzoyl]-2,3,4,5-tetrahydro-1H-benzazepine.

77. 5-Dimethylamino-1-[2-methoxy-4-(2-methylbenzoylamino)benzoyl]-1,2,3,4-tetrahydroquinoline.

78. 7-Chloro-5-methylamino-1-[4-(2-methylbenzoylamino)benzoxyl]-2,3,4,5-tetrahydro-1H-benzazepine.

79. 7-Chloro-5-methylamino-1-[4-(2-chlorobenzoylamino)benzoxyl]-2,3,4,5-tetrahydro-1H-benzazepine.

* * * * *

UNITED STATES PATENT AND TRADEMARK OFFICE

CERTIFICATE OF CORRECTION

PATENT NO. : 5,258,510
APPLICATION NO. : 07/851541
DATED : November 2, 1993
INVENTOR(S) : Hidenori Ogawa et al.

It is certified that error appears in the above-identified patent and that said Letters Patent is hereby corrected as shown below:

On the title page item [63], Related U.S. Application Data should read:
Continuation-in-part of Ser. No. 762,015, Jun. 19, 1991, abandoned, which is a national stage entry of PCT/JP90/01340, filed Oct. 18, 1990.

Col. 1, line 4, should read:
This is a continuation-in-part application of U.S. Pat. Ser. No. 07/762,015 filed on Jun. 19, 1991, now abandoned, which is a national stage entry of PCT/JP90/01340, filed Oct. 18, 1990.

Signed and Sealed this

Twenty-fourth Day of July, 2007

JON W. DUDAS
*Director of the United States Patent and Trademark Office*